(12) United States Patent
Besenbruch et al.

(10) Patent No.: US 12,160,579 B2
(45) Date of Patent: Dec. 3, 2024

(54) IMAGE COMPRESSION AND DECODING, VIDEO COMPRESSION AND DECODING: METHODS AND SYSTEMS

(71) Applicant: DEEP RENDER LTD, London (GB)

(72) Inventors: Chri Besenbruch, London (GB); Ciro Cursio, London (GB); Christopher Finlay, London (GB); Vira Koshkina, London (GB); Alexander Lytchier, London (GB); Jan Xu, London (GB); Arsalan Zafar, London (GB)

(73) Assignee: DEEP RENDER LTD., London (GB)

( * ) Notice: Subject to any disclaimer, the term of this patent is extended or adjusted under 35 U.S.C. 154(b) by 0 days.

(21) Appl. No.: 18/230,277

(22) Filed: Aug. 4, 2023

(65) Prior Publication Data

US 2023/0388501 A1   Nov. 30, 2023

Related U.S. Application Data

(63) Continuation of application No. 18/055,666, filed on Nov. 15, 2022, which is a continuation of application
(Continued)

(30) Foreign Application Priority Data

Apr. 29, 2020   (GB) .................................... 2006275
Jun. 2, 2020   (GB) .................................... 2008241
(Continued)

(51) Int. Cl.
*H04N 19/126*     (2014.01)
*G06N 3/045*     (2023.01)
(Continued)

(52) U.S. Cl.
CPC ............ *H04N 19/126* (2014.11); *G06N 3/045* (2023.01); *G06N 3/084* (2013.01); *G06T 3/4046* (2013.01);
(Continued)

(58) Field of Classification Search
CPC .... G06N 3/0454; G06N 3/084; G06V 10/774; H04N 19/126; H04N 19/13
See application file for complete search history.

(56) References Cited

U.S. PATENT DOCUMENTS 5,048,095 A  *  9/1991  Bhanu ................... G06V 10/26
                                                                   382/173
9,990,687 B1     6/2018  Kaufhold et al.
(Continued)

OTHER PUBLICATIONS

Chen, et al., "Neural ordinary differential equations," Advances in neural information processing systems; 31 (2018).
(Continued)

*Primary Examiner* — Boubacar Abdou Tchoussou
(74) *Attorney, Agent, or Firm* — Saul Ewing LLP

(57) ABSTRACT

There is disclosed a computer-implemented method for lossy image or video compression, transmission and decoding, the method including the steps of: (i) receiving an input image at a first computer system; (ii) encoding the input image using a first trained neural network, using the first computer system, to produce a latent representation; (iii) quantizing the latent representation using the first computer system to produce a quantized latent; (iv) entropy encoding the quantized latent into a bitstream, using the first computer system; (v) transmitting the bitstream to a second computer system; (vi) the second computer system entropy decoding the bitstream to produce the quantized latent; (vii) the second computer system using a second trained neural network to produce an output image from the quantized latent, wherein the output image is an approximation of the
(Continued)

input image. Related computer-implemented methods, systems, computer-implemented training methods and computer program products are disclosed.

14 Claims, 126 Drawing Sheets

Related U.S. Application Data

No. 17/740,716, filed on May 10, 2022, now Pat. No. 11,677,948, which is a continuation of application No. PCT/GB2021/051041, filed on Apr. 29, 2021.

(60) Provisional application No. 63/053,807, filed on Jul. 20, 2020, provisional application No. 63/017,295, filed on Apr. 29, 2020.

(30) Foreign Application Priority Data

| Jul. 20, 2020 | (GB) | 2011176 |
|---|---|---|
| Aug. 11, 2020 | (GB) | 2012461 |
| Aug. 11, 2020 | (GB) | 2012462 |
| Aug. 11, 2020 | (GB) | 2012463 |
| Aug. 11, 2020 | (GB) | 2012465 |
| Aug. 11, 2020 | (GB) | 2012467 |
| Aug. 11, 2020 | (GB) | 2012468 |
| Aug. 11, 2020 | (GB) | 2012469 |
| Oct. 23, 2020 | (GB) | 2016824 |
| Dec. 10, 2020 | (GB) | 2019531 |

(51) Int. Cl.
| | |
|---|---|
| *G06N 3/084* | (2023.01) |
| *G06T 3/4046* | (2024.01) |
| *G06T 9/00* | (2006.01) |
| *G06V 10/774* | (2022.01) |
| *H04N 19/13* | (2014.01) |

(52) U.S. Cl.
CPC ............ *G06T 9/002* (2013.01); *G06V 10/774* (2022.01); *H04N 19/13* (2014.11)

(56) References Cited

U.S. PATENT DOCUMENTS

| 10,373,300 | B1 | 8/2019 | Besenbruch et al. |
|---|---|---|---|
| 10,489,936 | B1 | 11/2019 | Zafar et al. |
| 10,880,551 | B2 | 12/2020 | Topiwala et al. |
| 10,886,943 | B2 | 1/2021 | Choi et al. |
| 10,930,263 | B1 | 2/2021 | Mahyar |
| 10,965,948 | B1 | 3/2021 | Appalaraju et al. |
| 11,310,509 | B2 | 4/2022 | Topiwala et al. |
| 11,330,264 | B2 | 5/2022 | Zhou et al. |
| 11,375,194 | B2 | 6/2022 | Liu et al. |
| 11,388,416 | B2 | 7/2022 | Habibian et al. |
| 11,445,222 | B1 | 9/2022 | Andreopoulos et al. |
| 11,481,633 | B2 | 10/2022 | Krishnamoorthy |
| 11,526,734 | B2 | 12/2022 | Yang et al. |
| 11,544,536 | B2 | 1/2023 | Gesmundo |
| 11,610,154 | B1 | 3/2023 | Teig et al. |
| 11,748,615 | B1 | 9/2023 | Wu et al. |
| 2010/0332423 | A1 | 12/2010 | Kapoor et al. |
| 2016/0292589 | A1 | 10/2016 | Taylor et al. |
| 2017/0230675 | A1 | 8/2017 | Wierstra et al. |
| 2018/0139450 | A1* | 5/2018 | Gao ............... H04N 19/147 |
| 2018/0176578 | A1* | 6/2018 | Rippel ............... G06N 20/00 |
| 2019/0188573 | A1 | 6/2019 | Lehman et al. |
| 2019/0289296 | A1 | 9/2019 | Kottke et al. |
| 2020/0021865 | A1 | 1/2020 | Topiwala et al. |
| 2020/0027247 | A1 | 1/2020 | Minnen et al. |
| 2020/0090069 | A1 | 3/2020 | Mandt et al. |
| 2020/0097742 | A1 | 3/2020 | Ratnesh Kumar et al. |
| 2020/0104640 | A1 | 4/2020 | Poole et al. |
| 2020/0111501 | A1 | 4/2020 | Sung et al. |
| 2020/0226421 | A1 | 7/2020 | Almazan et al. |
| 2020/0304802 | A1 | 9/2020 | Habibian et al. |
| 2020/0364574 | A1 | 11/2020 | Kim et al. |
| 2020/0372686 | A1 | 11/2020 | Wen et al. |
| 2020/0401916 | A1 | 12/2020 | Rolfe et al. |
| 2021/0004677 | A1 | 1/2021 | Menick et al. |
| 2021/0042606 | A1 | 2/2021 | Bai et al. |
| 2021/0067808 | A1 | 3/2021 | Schroers et al. |
| 2021/0142534 | A1 | 5/2021 | Liu et al. |
| 2021/0152831 | A1 | 5/2021 | Liu et al. |
| 2021/0166151 | A1 | 6/2021 | Kennel et al. |
| 2021/0211741 | A1 | 7/2021 | Andreopoulos et al. |
| 2021/0281867 | A1 | 9/2021 | Golinski et al. |
| 2021/0286270 | A1 | 9/2021 | Middlebrooks et al. |
| 2021/0360259 | A1 | 11/2021 | Wang et al. |
| 2021/0366161 | A1 | 11/2021 | Wong |
| 2021/0390335 | A1 | 12/2021 | Du et al. |
| 2021/0397895 | A1 | 12/2021 | Sun et al. |
| 2022/0101106 | A1 | 3/2022 | Van Der Wilk et al. |
| 2022/0103839 | A1 | 3/2022 | Van Rozendaal et al. |
| 2022/0327363 | A1 | 10/2022 | Xu et al. |
| 2023/0093734 | A1 | 3/2023 | Zheng et al. |

OTHER PUBLICATIONS

Elsken, et al., "Neural architecture search: A survey,"The Journal of Machine Learning Research, 1997-2017 (2019).

Li, et al., "Sgas: Sequential Greedy Architecture Search," In Proceedings of the IEEE/CVF Conf of Computer Vision and Pattern Recognition, pp. 1620-1630 (2020).

Molina, et al., "Pade Activation Units: End-to-end Learning of Flexible Activation Functions in Deep Networks," arXiv preprint arXiv: 1907.06732 (2019).

Ziegler, et al., "Latent normalizing flows for discrete sequences," Intl. Conf. on Machine Learning; PMLR (2019).

Balle et al., "End-to-end optimized image compression," arXiv preprint arXiv: 1611.01704 (2016).

Cheng et al., "Energy compaction-based image compression using convolutional autoencoder," IEEE Transactions on Multimedia 22.4, pp. 860-873 (2019).

Habibian, Amirhossein, et al., "Video Compression with Rate-Distortion Autoencoders," arxiv.org, Cornell Univ. Library (Aug. 14, 2019) XP081531236.

Han, Jun, et al., "Deep Probabilistic Video Compression," arxiv. org, Cornell Univ. Library, (Oct. 5, 2018) XP080930310.

Yan et al., "Deep autoencoder-based lossy geometry compression for point clouds," arXiv preprint arXiv: 1905.03691 (2019).

Leon-Garcia, "Probability and random processes for electrical engineering," Pearson Education India (1994).

\* cited by examiner

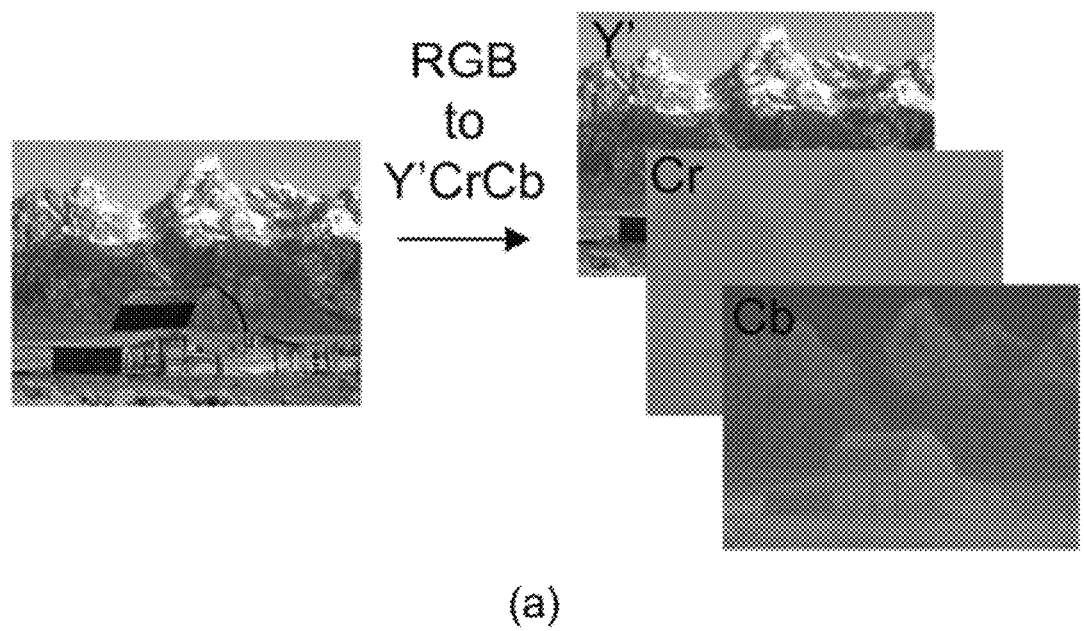
(a)
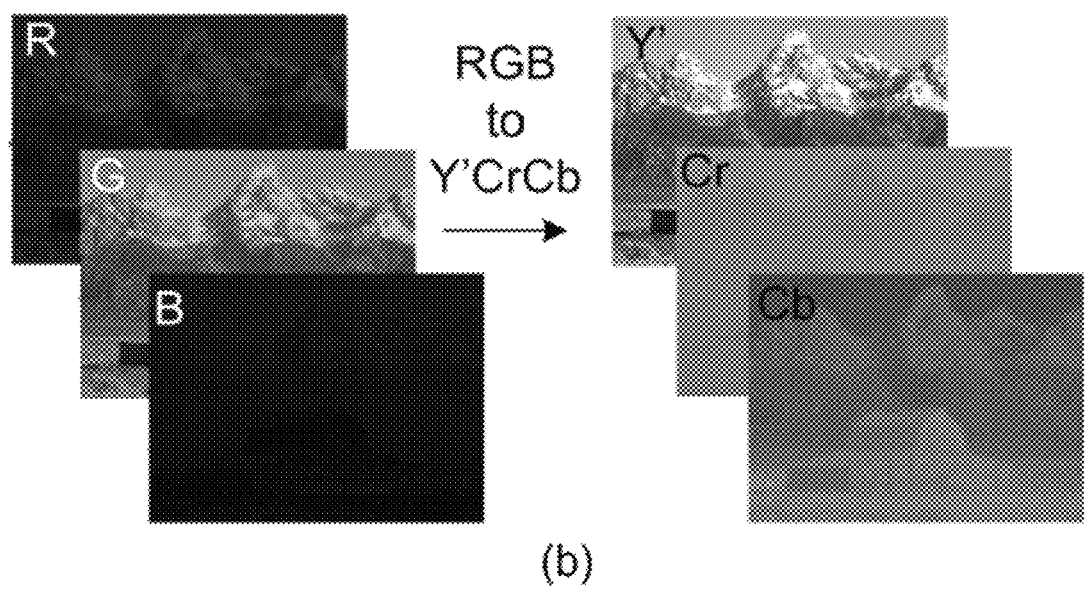
(b)
FIGURE 13

| Distribution family | Probability density function $p(x)$ | Parameters $\phi$ |
|---|---|---|
| Normal (Gaussian) | $\frac{1}{\sqrt{2\pi}\sigma}\exp\left(-\frac{1}{2}\left(\frac{x-\mu}{\sigma}\right)^2\right)$ | $\mu, \sigma > 0$ |
| Laplace | $\frac{1}{2b}\exp\left(-\frac{|x-\mu|}{b}\right)$ | $\mu, b > 0$ |
| Cauchy | $\frac{1}{\pi\gamma\left[1+\left(\frac{x-x_0}{\gamma}\right)^2\right]}$ | $x_0, \gamma > 0$ |
| Logistic | $\frac{\exp(-\frac{x-\mu}{s})}{s\left(1+\exp(-\frac{x-\mu}{s})\right)^2}$ | $\mu, s > 0$ |
| Student's $t$ | $\frac{\Gamma(\frac{\nu+1}{2})}{\sqrt{\nu\pi}\,\Gamma(\frac{\nu}{2})}\left(1+\frac{x^2}{\nu}\right)^{-\frac{\nu+1}{2}}$ | $\nu > 0$ |
| Gumbel | $\frac{1}{\beta}\exp\left(\frac{x-\mu}{\beta} - \exp\left(\frac{x-\mu}{\beta}\right)\right)$ | $\mu, \beta > 0$ |
| Asymmetric Laplace | $\left(\frac{\lambda}{\kappa+\frac{1}{\kappa}}\right)\exp\left(-\lambda(x-m)\operatorname{sign}(x-m)\kappa^{\operatorname{sign}(x-m)}\right)$ | $m, \lambda > 0, \kappa > 0$ |
| Skew normal | $\frac{1}{\sqrt{2\pi}\omega}\exp\left(-\frac{1}{2}\left(\frac{x-\xi}{\omega}\right)^2\right)\left[1+\operatorname{erf}\left(\frac{\alpha}{\sqrt{2}}\left(\frac{x-\xi}{\omega}\right)\right)\right]$ | $\xi, \omega > 0, \alpha$ |
| Exponential power | $\frac{\beta}{2\alpha\Gamma(\frac{1}{\beta})}\exp\left(-\left(\frac{|x-\mu|}{\alpha}\right)^\beta\right)$ | $\mu, \alpha > 0, \beta > 0$ |
| Johnson's $S_U$ | $\frac{\delta}{\lambda\sqrt{2\pi}}\frac{1}{\sqrt{1+\left(\frac{x-\xi}{\lambda}\right)^2}}e^{-\frac{1}{2}\left(\gamma+\delta\sinh^{-1}\left(\frac{x-\xi}{\lambda}\right)\right)^2}$ | $\gamma, \xi, \delta > 0, \lambda > 0$ |
| Generalised normal | $\frac{\exp(-\frac{y^2}{2})}{\sqrt{2\pi}(\alpha-\kappa(x-\xi))}, y = \begin{cases}\frac{1}{\kappa}\ln\left[1-\frac{\kappa(x-\xi)}{\alpha}\right] & \text{if } \kappa \neq 0 \\ \frac{x-\xi}{\alpha} & \text{if } \kappa = 0\end{cases}$ | $\xi, \alpha > 0, \kappa$ |
| Generalised hyperbolic | $\frac{\left(\sqrt{\alpha^2-\beta^2}/\delta\right)^\lambda}{\sqrt{2\pi}K_\lambda(\delta\sqrt{\alpha^2-\beta^2})}e^{\beta(x-\mu)} \times \frac{K_{\lambda-1/2}\left(\alpha\sqrt{\delta^2+(x-\mu)^2}\right)}{\left(\sqrt{\delta^2+(x-\mu)^2}/\alpha\right)^{1/2-\lambda}}$ | $\lambda, \alpha, \beta, \delta, \mu$ |

FIGURE 20

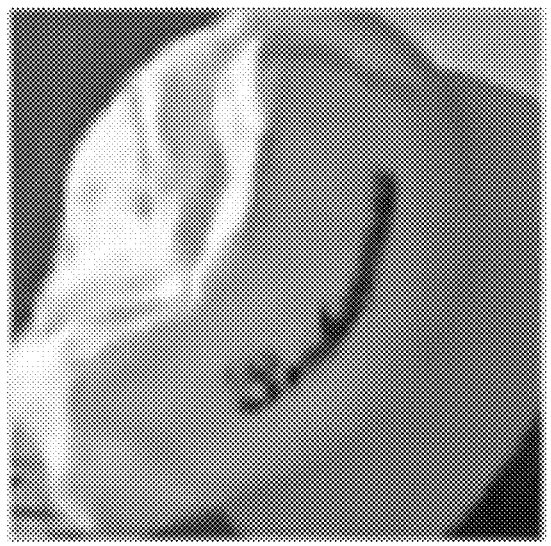
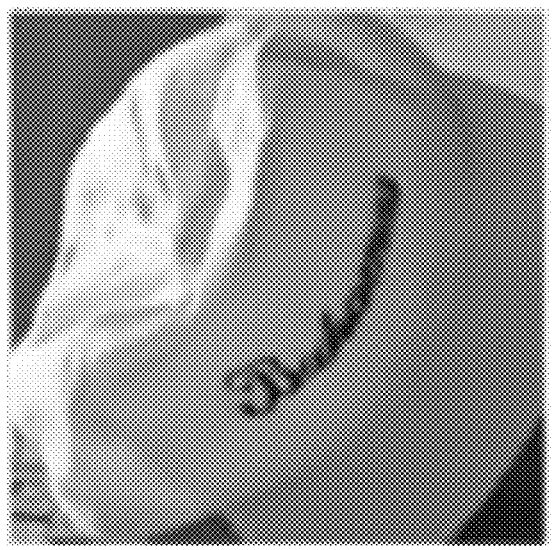
FIGURE 29

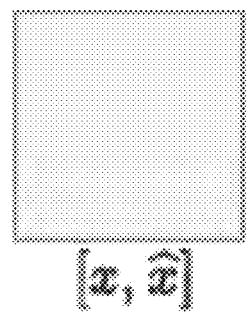 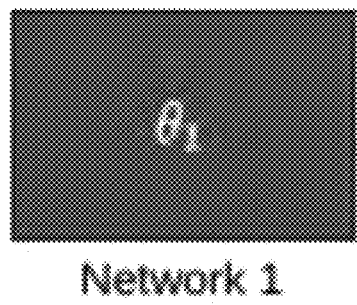
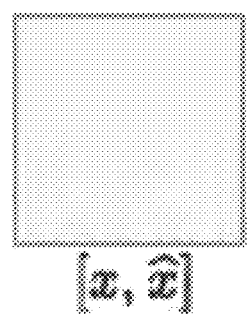 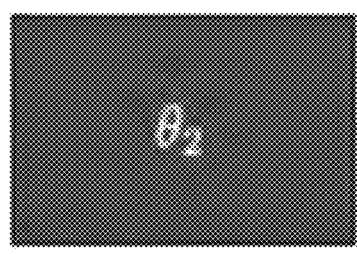
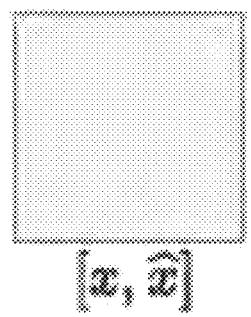 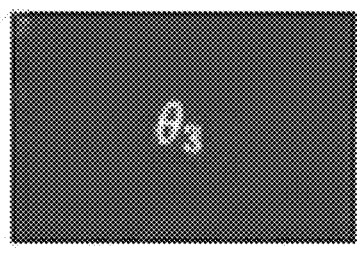
FIGURE 32

| Quantisation proxy | Forward function $\tilde{Q}(\cdot)$ | Gradient overriding? |
|---|---|---|
| (Uniform) noise quantisation | $\tilde{Q}(y_i) = y_i + \varepsilon_i,$ $\varepsilon_i \sim \mathcal{U}(-0.5, +0.5)$ | none |
| Straight-through estimator (STE) | $\tilde{Q}(y_i) = \lfloor y_i \rceil$ | $\frac{\partial \tilde{Q}}{\partial y_i} = 1$ |
| STE with mean subtraction | $\tilde{Q}(y_i, \mu_i) = \lfloor y_i - \mu_i \rceil + \mu_i$ | $\frac{\partial \tilde{Q}}{\partial y_i} = 1, \ \frac{\partial \tilde{Q}}{\partial \mu_i} = 0$ |
| Universal quantisation | $\tilde{Q}(y_i) = \lfloor y_i - \varepsilon_i \rceil + \varepsilon_i,$ $\varepsilon_i \sim \mathcal{U}(-0.5, +0.5)$ | $\frac{\partial \tilde{Q}}{\partial y_i} = 1$ |
| Stochastic rounding | $\tilde{Q}(y_i) = \begin{cases} \lceil y_i \rceil, & \text{if } p \geq y_i - \lfloor y_i \rfloor \\ \lfloor y_i \rfloor, & \text{if } p < y_i - \lfloor y_i \rfloor \end{cases}$ $p \sim \mathcal{U}(0,1)$ | $\frac{\partial \tilde{Q}}{\partial y_i} = 1$ |
| Soft rounding | $\tilde{Q}(y_i) = \lfloor y_i \rfloor + \frac{\tanh(\alpha(y_i - \lfloor y_i \rfloor - \frac{1}{2}))}{2\tanh(\frac{\alpha}{2})} + \frac{1}{2}$ $\alpha > 0$ | none |
| Soft scalar/vector quantisation | $\tilde{Q}(y_i) = \sum_{j=1}^{L} \frac{c_j \exp(-\sigma \|y_i - c_j\|^2)}{\sum_{k=1}^{L} \exp(-\sigma \|y_i - c_k\|^2)}$ $\sigma > 0, \ [c_1, ..., c_L] \in \mathbb{R}_Q^L$ | none |

FIGURE 37

$$U = \begin{bmatrix} u_{11} & u_{12} & u_{13} & \cdots & \cdots & u_{1n} \\ 0 & u_{22} & u_{23} & \cdots & \cdots & \cdots \\ 0 & 0 & u_{33} & \cdots & \cdots & \cdots \\ \vdots & \vdots & \vdots & \ddots & \cdots & \cdots \\ \vdots & \vdots & \vdots & \cdots & \ddots & \vdots \\ 0 & 0 & 0 & \cdots & 0 & u_{nn} \end{bmatrix}$$

$$L = \begin{bmatrix} l_{11} & 0 & 0 & \cdots & \cdots & 0 \\ l_{21} & l_{22} & 0 & \cdots & \cdots & \cdots \\ l_{31} & l_{32} & l_{33} & \cdots & \cdots & \cdots \\ \vdots & \vdots & \vdots & \ddots & \cdots & \vdots \\ \vdots & \vdots & \vdots & \cdots & \ddots & 0 \\ l_{n1} & \cdots & \cdots & \cdots & \cdots & l_{nn} \end{bmatrix}$$

FIGURE 56

$$J(x_1, x_2, x_3, \ldots, x_n) = \begin{bmatrix} \frac{\partial f_1}{\partial x_1} & \frac{\partial f_1}{\partial x_2} & \frac{\partial f_1}{\partial x_3} & \cdots & \frac{\partial f_1}{\partial x_n} \\ \frac{\partial f_2}{\partial x_1} & \frac{\partial f_2}{\partial x_2} & \frac{\partial f_2}{\partial x_3} & \cdots & \frac{\partial f_2}{\partial x_n} \\ \frac{\partial f_3}{\partial x_1} & \frac{\partial f_3}{\partial x_2} & \frac{\partial f_3}{\partial x_3} & \cdots & \frac{\partial f_3}{\partial x_n} \\ \vdots & \vdots & \vdots & \ddots & \vdots \\ \frac{\partial f_n}{\partial x_1} & \frac{\partial f_n}{\partial x_2} & \frac{\partial f_n}{\partial x_3} & \cdots & \frac{\partial f_n}{\partial x_n} \end{bmatrix}$$

FIGURE 57

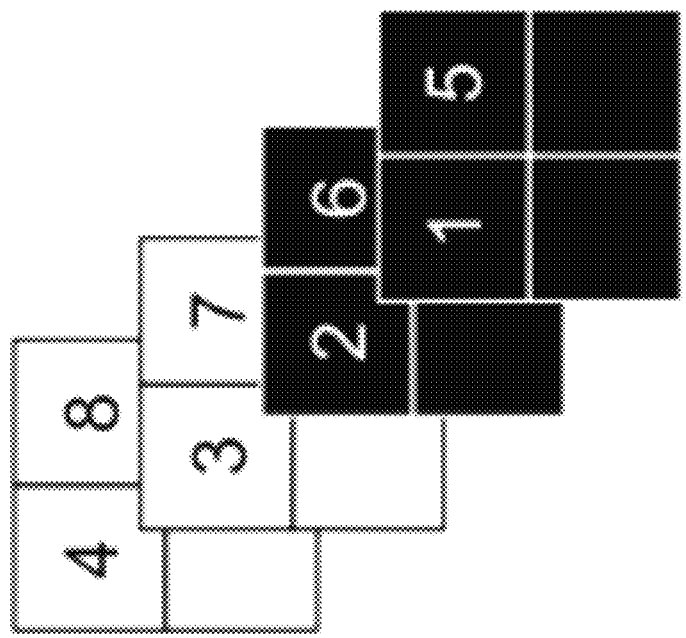
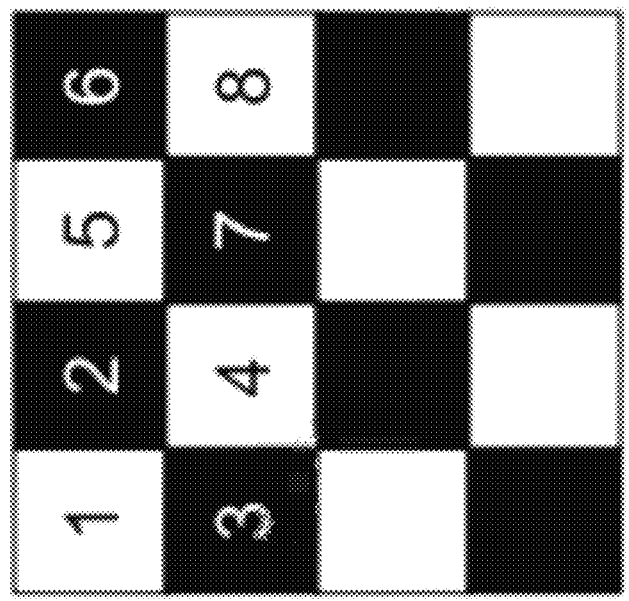
FIGURE 58

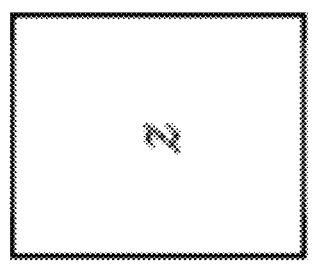 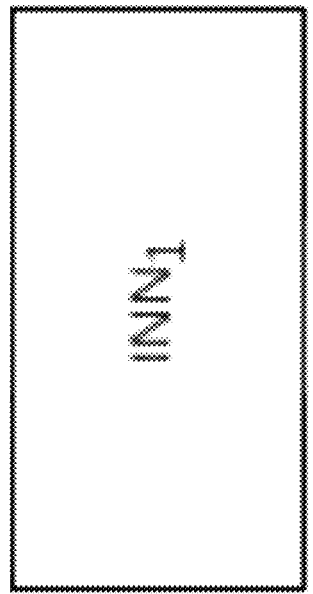 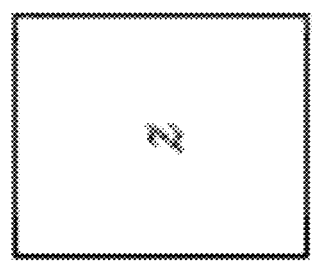 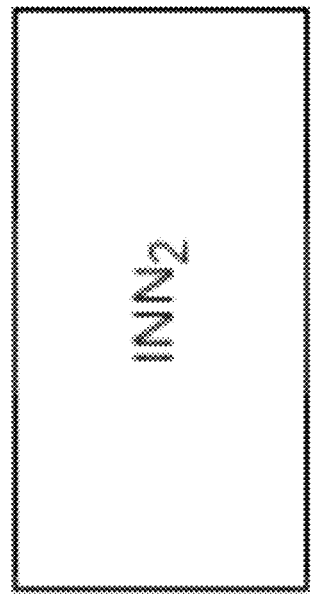
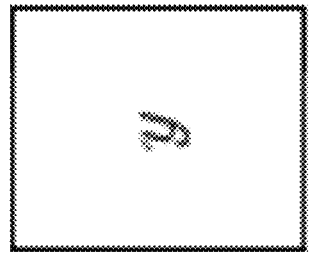 
FIGURE 66

| Loss | Objective Function ($D := D(x; \phi)$) |
|---|---|
| Bernoulli loss | $\pi \mathbb{E}_{p^*(x)}[-\log D] + (1-\pi)\mathbb{E}_{q_\phi(x)}[-\log(1-D)]$ |
| Brier score | $\pi \mathbb{E}_{p^*(x)}[(1-D)^2] + (1-\pi)\mathbb{E}_{q_\phi(x)}[D^2]$ |
| Exponential loss | $\pi \mathbb{E}_{p^*(x)}\left[\left(\frac{1-D}{D}\right)^{\frac{1}{2}}\right] + (1-\pi)\mathbb{E}_{q_\phi(x)}\left[\left(\frac{D}{1-D}\right)^{\frac{1}{2}}\right]$ |
| Misclassification | $\pi \mathbb{E}_{p^*(x)}[\mathbb{I}[D \leq 0.5]] + (1-\pi)\mathbb{E}_{q_\phi(x)}[\mathbb{I}[D > 0.5]]$ |
| Hinge loss | $\pi \mathbb{E}_{p^*(x)}\left[\max\left(0, 1 - \log\frac{D}{1-D}\right)\right] + (1-\pi)\mathbb{E}_{q_\phi(x)}\left[\max\left(0, 1 + \log\frac{D}{1-D}\right)\right]$ |
| Spherical | $\pi \mathbb{E}_{p^*(x)}[-\alpha D] + (1-\pi)\mathbb{E}_{q_\phi(x)}[-\alpha(1-D)]; \quad \alpha = (1 - 2D + 2D^2)^{-1/2}$ |

FIGURE 76

| Multi-Image Lens Distortion Model | | |
|---|---|---|
| Layer | Filter Dim | Concat |
| Conv0_b1 | 7x7x3x16 | - |
| Conv1_b1 | 7x7x16x16 | - |
| Conv2_b1 | 7x7x32x16 | [0_b1] |
| Conv3_b1 | 7x7x48x16 | [1_b1,0_b1] |
| Conv4_b1 | 7x7x16x16 | - |
| Conv5_b1 | 7x7x16x16 | - |
| Conv6_b1 | 7x7x32x16 | [4_b1] |
| Conv7_b1 | 7x7x48x16 | [5_b1,4_b1] |
| downsample_0 | 1x1x32x32 | [3_b1] |
| Conv0_b2 | 5x5x64x32 | [$\bar{o}$] |
| Conv1_b2 | 5x5x16x32 | - |
| Conv2_b2 | 5x5x32x32 | [0_b2] |
| Conv3_b2 | 5x5x48x32 | [1_b2,0_b2] |
| Conv4_b2 | 5x5x16x32 | - |
| Conv5_b2 | 5x5x16x32 | - |
| Conv6_b2 | 5x5x32x32 | [4_b2] |
| Conv7_b2 | 5x5x48x32 | [5_b2,4_b2] |
| downsample_1 | 1x1x128x96 | [3_b2,$\bar{o}$] |
| Conv0_b3 | 3x3x192x64 | [$\bar{o}$] |
| Conv1_b3 | 3x3x16x64 | - |
| Conv2_b3 | 3x3x32x64 | [0_b3] |
| Conv3_b3 | 3x3x48x64 | [1_b3,0_b3] |
| Conv4_b3 | 3x3x16x64 | - |
| Conv5_b3 | 3x3x16x64 | - |
| Conv6_b3 | 3x3x32x64 | [4_b3] |
| Conv7_b3 | 3x3x48x64 | [5_b3,4_b3] |
| downsample_3 | 1x1x320x64 | [3_b3, $\bar{o}$] |
| compress_layer_3 | 1x1x64x3 | - |

FIGURE 97

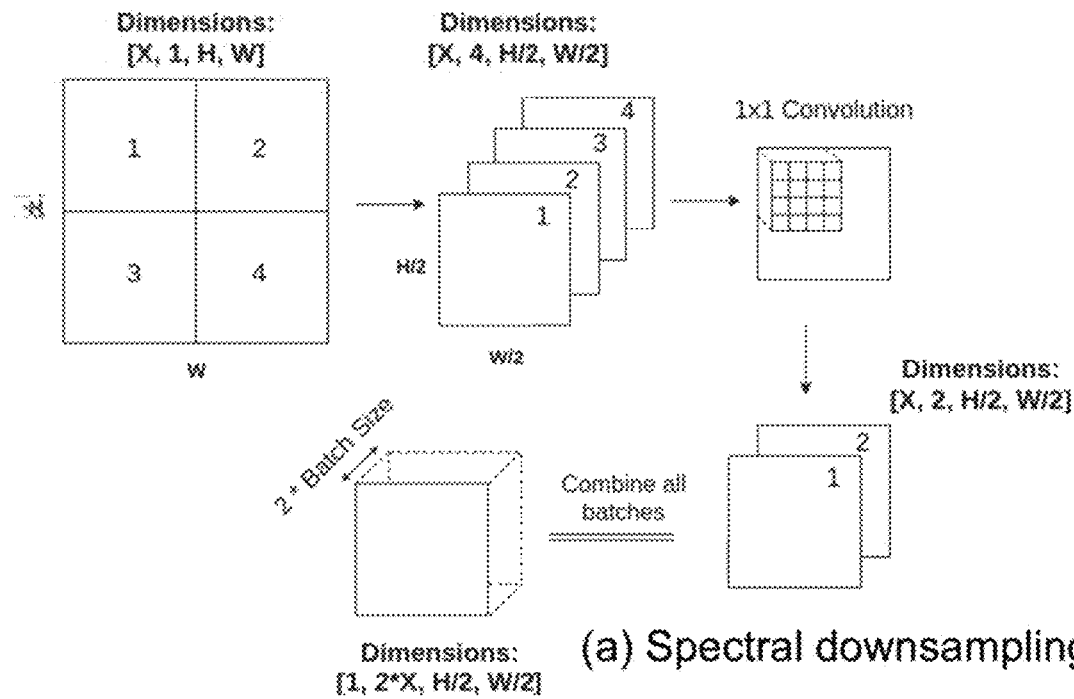
(a) Spectral downsampling
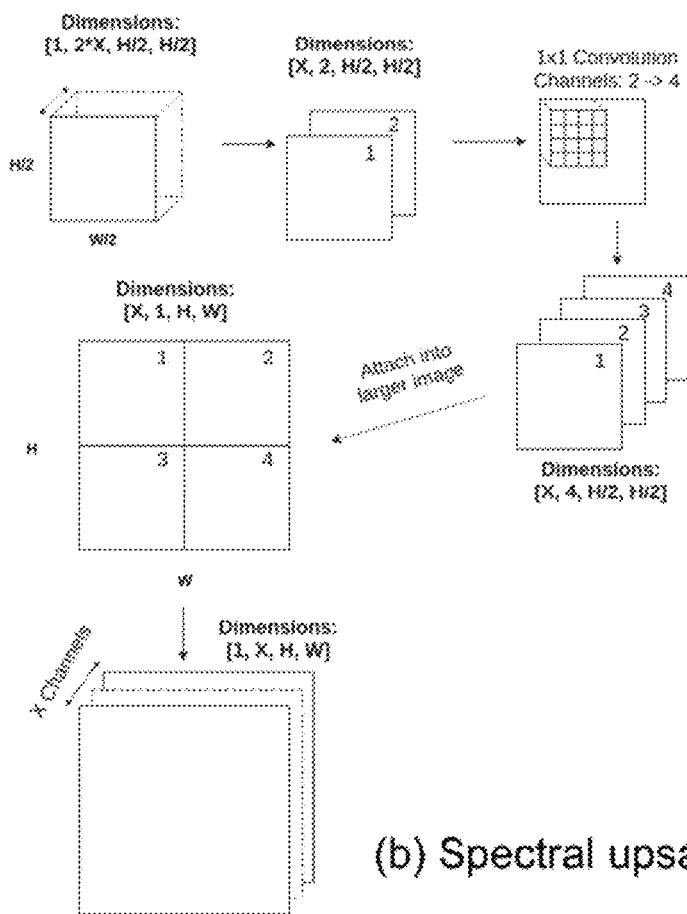
(b) Spectral upsampling
FIGURE 100

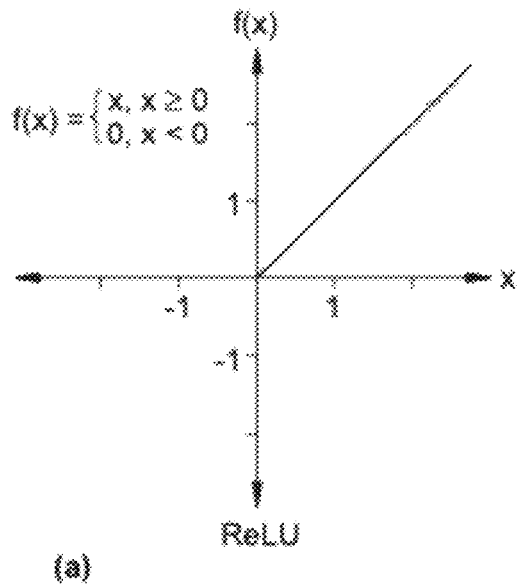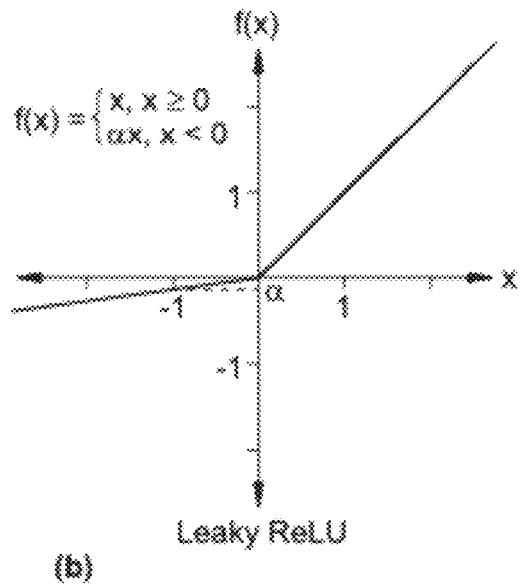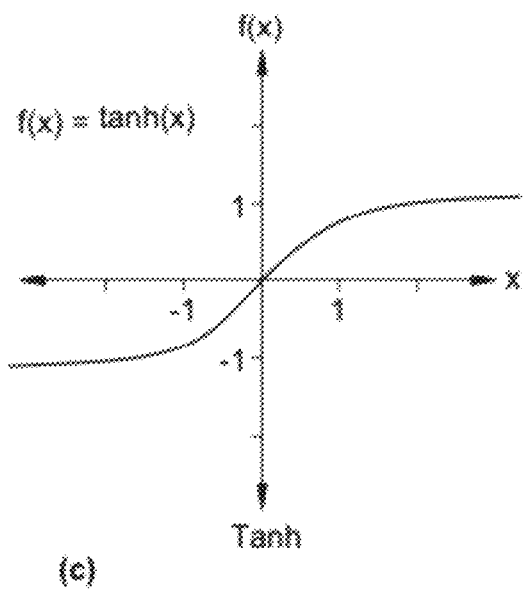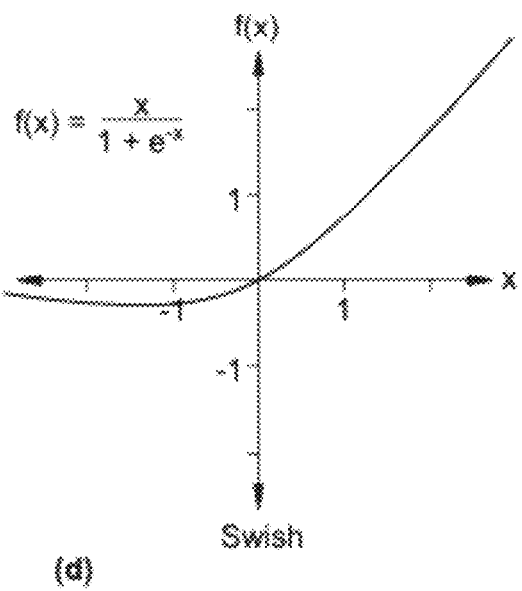
FIGURE 117

$$g(f(x)) = h(x)$$

$$pad(W_g) * flip(W_f) = W_h$$

FIGURE 119

IMAGE COMPRESSION AND DECODING, VIDEO COMPRESSION AND DECODING: METHODS AND SYSTEMS

CROSS REFERENCE TO RELATED APPLICATIONS

This is a continuation of U.S. application Ser. No. 18/055,666, filed on Nov. 15, 2022, which is a continuation of U.S. application Ser. No. 17/740,716, filed on May 10, 2022, which is a continuation of International Application No. PCT/GB2021/051041, filed on Apr. 29, 2021, which claims priority to GB Application No. 2006275.8, filed on Apr. 29, 2020; GB Application No. 2008241.8, filed on Jun. 2, 2020; GB Application No. 2011176.1, filed on Jul. 20, 2020; GB Application No. 2012461.6, filed on Aug. 11, 2020; GB Application No. 2012462.4, filed on Aug. 11, 2020; GB Application No. 2012463.2, filed on Aug. 11, 2020; GB Application No. 2012465.7, filed on Aug. 11, 2020; GB Application No. 2012467.3, filed on Aug. 11, 2020; GB Application No. 2012468.1, filed on Aug. 11, 2020; GB Application No. 2012469.9, filed on Aug. 11, 2020; GB Application No. 2016824.1, filed on Oct. 23, 2020; GB Application No. 2019531.9, filed on Dec. 10, 2020; U.S. Provisional Application No. 63/017,295, filed on Apr. 29, 2020; and U.S. Provisional Application No. 63/053,807, filed Jul. 20, 2020, the entire contents of each of which being fully incorporated hereby by reference.

BACKGROUND OF THE INVENTION

1. Field of the Invention

The field of the invention relates to computer-implemented methods and systems for image compression and decoding, to computer-implemented methods and systems for video compression and decoding, and to related computer-implemented training methods.

2. Technical Background

There is increasing demand from users of communications networks for images and video content. Demand is increasing not just for the number of images viewed, and for the playing time of video; demand is also increasing for higher resolution, lower distortion content, if it can be provided. This places increasing demand on communications networks, and increases their energy use, for example, which has adverse cost implications, and possible negative implications for the environment, through the increased energy use.

Although image and video content is usually transmitted over communications networks in compressed form, it is desirable to increase the compression, while preserving displayed image quality, or to increase the displayed image quality, while not increasing the amount of data that is actually transmitted across the communications networks. This would help to reduce the demands on communications networks, compared to the demands that otherwise would be made.

3. Discussion of Related Art

U.S. Ser. No. 10/373,300B1 discloses a system and method for lossy image and video compression and transmission that utilizes a neural network as a function to map a known noise image to a desired or target image, allowing the transfer only of hyperparameters of the function instead of a compressed version of the image itself. This allows the recreation of a high-quality approximation of the desired image by any system receiving the hyperparameters, provided that the receiving system possesses the same noise image and a similar neural network. The amount of data required to transfer an image of a given quality is dramatically reduced versus existing image compression technology. Being that video is simply a series of images, the application of this image compression system and method allows the transfer of video content at rates greater than previous technologies in relation to the same image quality.

U.S. Ser. No. 10/489,936B1 discloses a system and method for lossy image and video compression that utilizes a metanetwork to generate a set of hyperparameters necessary for an image encoding network to reconstruct the desired image from a given noise image.

SUMMARY OF THE INVENTION

According to a first aspect of the invention, there is provided a computer-implemented method for lossy image or video compression, transmission and decoding, the method including the steps of:
  (i) receiving an input image at a first computer system;
  (ii) encoding the input image using a first trained neural network, using the first computer system, to produce a latent representation;
  (iii) quantizing the latent representation using the first computer system to produce a quantized latent;
  (iv) entropy encoding the quantized latent into a bitstream, using the first computer system;
  (v) transmitting the bitstream to a second computer system;
  (vi) the second computer system entropy decoding the bitstream to produce the quantized latent;
  (vii) the second computer system using a second trained neural network to produce an output image from the quantized latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein in step (vii) the output image is stored.

The method may be one wherein in step (iii), quantizing the latent representation using the first computer system to produce a quantized latent comprises quantizing the latent representation using the first computer system into a discrete set of symbols to produce a quantized latent.

The method may be one wherein in step (iv) a predefined probability distribution is used for the entropy encoding and wherein in step (vi) the predefined probability distribution is used for the entropy decoding.

The method may be one wherein in step (iv) parameters characterizing a probability distribution are calculated, wherein a probability distribution characterised by the parameters is used for the entropy encoding, and wherein in step (iv) the parameters characterizing the probability distribution are included in the bitstream, and wherein in step (vi) the probability distribution characterised by the parameters is used for the entropy decoding.

The method may be one wherein the probability distribution is a (e.g. factorized) probability distribution.

The method may be one wherein the (e.g. factorized) probability distribution is a (e.g. factorized) normal distribution, and wherein the obtained probability distribution parameters are a respective mean and standard deviation of each respective element of the quantized y latent.

The method may be one wherein the (e.g. factorized) probability distribution is a parametric (e.g. factorized) probability distribution.

The method may be one wherein the parametric (e.g. factorized) probability distribution is a continuous parametric (e.g. factorized) probability distribution.

The method may be one wherein the parametric (e.g. factorized) probability distribution is a discrete parametric (e.g. factorized) probability distribution.

The method may be one wherein the discrete parametric distribution is a Bernoulli distribution, a Rademacher distribution, a binomial distribution, a beta-binomial distribution, a degenerate distribution at x0, a discrete uniform distribution, a hypergeometric distribution, a Poisson binomial distribution, a Fisher's noncentral hypergeometric distribution, a Wallenius' noncentral hypergeometric distribution, a Benford's law, an ideal and robust soliton distributions, Conway-Maxwell-Poisson distribution, a Poisson distribution, a Skellam distribution, a beta negative binomial distribution, a Boltzmann distribution, a logarithmic (series) distribution, a negative binomial distribution, a Pascal distribution, a discrete compound Poisson distribution, or a parabolic fractal distribution.

The method may be one wherein parameters included in the parametric (e.g. factorized) probability distribution include shape, asymmetry, skewness and/or any higher moment parameters.

The method may be one wherein the parametric (e.g. factorized) probability distribution is a normal distribution, a Laplace distribution, a Cauchy distribution, a Logistic distribution, a Student's t distribution, a Gumbel distribution, an Asymmetric Laplace distribution, a skew normal distribution, an exponential power distribution, a Johnson's SU distribution, a generalized normal distribution, or a generalized hyperbolic distribution.

The method may be one wherein the parametric (e.g. factorized) probability distribution is a parametric multivariate distribution.

The method may be one wherein the latent space is partitioned into chunks on which intervariable correlations are ascribed; zero correlation is prescribed for variables that are far apart and have no mutual influence, wherein the number of parameters required to model the distribution is reduced, wherein the number of parameters is determined by the partition size and therefore the extent of the locality.

The method may be one wherein the chunks can be arbitrarily partitioned into different sizes, shapes and extents.

The method may be one wherein a covariance matrix is used to characterise the parametrisation of intervariable dependences.

The method may be one wherein for a continuous probability distribution with a well-defined PDF, but lacking a well-defined or tractable formulation of its CDF, numerical integration is used through Monte Carlo (MC) or Quasi-Monte Carlo (QMC) based methods, where this can refer to factorized or to non-factorisable multivariate distributions.

The method may be one wherein a copula is used as a multivariate cumulative distribution function.

The method may be one wherein to obtain a probability density function over the latent space, the corresponding characteristic function is transformed using a Fourier Transform to obtain the probability density function.

The method may be one wherein to evaluate joint probability distributions over the pixel space, an input of the latent space into the characteristic function space is transformed, and then the given/learned characteristic function is evaluated, and the output is converted back into the joint-spatial probability space.

The method may be one wherein to incorporate multimodality into entropy modelling, a mixture model is used as a prior distribution.

The method may be one wherein to incorporate multimodality into entropy modelling, a mixture model is used as a prior distribution, comprising a weighted sum of any base (parametric or non-parametric, factorized or non-factorisable multivariate) distribution as mixture components.

The method may be one wherein the (e.g. factorized) probability distribution is a non-parametric (e.g. factorized) probability distribution.

The method may be one wherein the non-parametric (e.g. factorized) probability distribution is a histogram model, or a kernel density estimation, or a learned (e.g. factorized) cumulative density function.

The method may be one wherein the probability distribution is a non-factorisable parametric multivariate distribution.

The method may be one wherein a partitioning scheme is applied on a vector quantity, such as latent vectors or other arbitrary feature vectors, for the purpose of reducing dimensionality in multivariate modelling.

The method may be one wherein parametrisation and application of consecutive Householder reflections of orthonormal basis matrices is applied.

The method may be one wherein evaluation of probability mass of multivariate normal distributions is performed by analytically computing univariate conditional parameters from the parametrisation of the multivariate distribution.

The method may be one including use of iterative solvers.

The method may be one including use of iterative solvers to speed up computation relating to probabilistic models.

The method may be one wherein the probabilistic models include autoregressive models.

The method may be one in which an autoregressive model is an Intrapredictions, Neural Intrapredictions and block-level model, or a filter-bank model, or a parameters from Neural Networks model, or a Parameters derived from side-information model, or a latent variables model, or a temporal modelling model.

The method may be one wherein the probabilistic models include non-autoregressive models.

The method may be one in which a non-autoregressive model is a conditional probabilities from an explicit joint distribution model.

The method may be one wherein the joint distribution model is a standard multivariate distribution model.

The method may be one wherein the joint distribution model is a Markov Random Field model.

The method may be one in which a non-autoregressive model is a Generic conditional probability model, or a Dependency network.

The method may be one including use of iterative solvers.

The method may be one including use of iterative solvers to speed up inference speed of neural networks.

The method may be one including use of iterative solvers for fixed point evaluations.

The method may be one wherein a (e.g. factorized) distribution, in the form of a product of conditional distributions, is used.

The method may be one wherein a system of equations with a triangular structure is solved using an iterative solver.

The method may be one including use of iterative solvers to decrease execution time of the neural networks.

The method may be one including use of context-aware quantisation techniques by including flexible parameters in the quantisation function.

The method may be one including use of dequantisation techniques for the purpose of assimilating the quantisation residuals through the usage of context modelling or other parametric learnable neural network modules.

The method may be one wherein the first trained neural network is, or includes, an invertible neural network (INN), and wherein the second trained neural network is, or includes, an inverse of the invertible neural network.

The method may be one wherein there is provided use of FlowGAN, that is an INN-based decoder, and use of a neural encoder, for image or video compression.

The method may be one wherein normalising flow layers include one or more of additive coupling layers; multiplicative coupling layers; affine coupling layers; invertible 1×1 convolution layers.

The method may be one wherein a continuous flow is used.

The method may be one wherein a discrete flow is used.

The method may be one wherein there is provided meta-compression, where the decoder weights are compressed with a normalising flow and sent along within the bitstreams.

The method may be one wherein encoding the input image using the first trained neural network includes using one or more univariate or multivariate Padé activation units.

The method may be one wherein using the second trained neural network to produce an output image from the quantized latent includes using one or more univariate or multivariate Padé activation units.

The method may be one wherein steps (ii) to (vii) are executed wholly or partially in a frequency domain.

The method may be one wherein integral transforms to and from the frequency domain are used.

The method may be one wherein the integral transforms are Fourier Transforms, or Hartley Transforms, or Wavelet Transforms, or Chirplet Transforms, or Sine and Cosine Transforms, or Mellin Transforms, or Hankel Transforms, or Laplace Transforms.

The method may be one wherein spectral convolution is used for image compression.

The method may be one wherein spectral specific activation functions are used.

The method may be one wherein for downsampling, an input is divided into several blocks that are concatenated in a separate dimension; a convolution operation with a 1×1 kernel is then applied such that the number of channels is reduced by half, and wherein the upsampling follows a reverse and mirrored methodology.

The method may be one wherein for image decomposition, stacking is performed.

The method may be one wherein for image reconstruction, stitching is performed.

The method may be one wherein a prior distribution is imposed on the latent space, which is an entropy model, which is optimized over its assigned parameter space to match its underlying distribution, which in turn lowers encoding computational operations.

The method may be one wherein the parameter space is sufficiently flexible to properly model the latent distribution.

The method may be one wherein the first computer system is a server, e.g. a dedicated server, e.g a machine in the cloud with dedicated GPUs e.g Amazon Web Services, Microsoft Azure, etc, or any other cloud computing services.

The method may be one wherein the first computer system is a user device.

The method may be one wherein the user device is a laptop computer, desktop computer, a tablet computer or a smart phone.

The method may be one wherein the first trained neural network includes a library installed on the first computer system.

The method may be one wherein the first trained neural network is parametrized by one or several convolution matrices $\theta$, or wherein the first trained neural network is parametrized by a set of bias parameters, non-linearity parameters, convolution kernel/matrix parameters.

The method may be one wherein the second computer system is a recipient device.

The method may be one wherein the recipient device is a laptop computer, desktop computer, a tablet computer, a smart TV or a smart phone.

The method may be one wherein the second trained neural network includes a library installed on the second computer system.

The method may be one wherein the second trained neural network is parametrized by one or several convolution matrices $\Omega$, or wherein the first trained neural network is parametrized by a set of bias parameters, non-linearity parameters, convolution kernel/matrix parameters.

An advantage of the above is that for a fixed file size ("rate"), a reduced output image distortion may be obtained. An advantage of the above is that for a fixed output image distortion, a reduced file size ("rate") may be obtained.

According to a second aspect of the invention, there is provided a system for lossy image or video compression, transmission and decoding, the system including a first computer system, a first trained neural network, a second computer system and a second trained neural network, wherein (i) the first computer system is configured to receive an input image;
(ii) the first computer system is configured to encode the input image using the first trained neural network, to produce a latent representation;
(iii) the first computer system is configured to quantize the latent representation to produce a quantized latent;
(iv) the first computer system is configured to entropy encode the quantized latent into a bitstream;
(v) the first computer system is configured to transmit the bitstream to the second computer system;
(vi) the second computer system is configured to entropy decode the bitstream to produce the quantized latent;
(vii) the second computer system is configured to use the second trained neural network to produce an output image from the quantized latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The system may be one wherein the system is configured to perform a method of any aspect of the first aspect of the invention.

According to a third aspect of the invention, there is provided a first computer system of any aspect of the second aspect of the invention.

According to a fourth aspect of the invention, there is provided a second computer system of any aspect of the second aspect of the invention.

According to a fifth aspect of the invention, there is provided a computer implemented method of training a first neural network and a second neural network, the neural networks being for use in lossy image or video compression, transmission and decoding, the method including the steps of (i) receiving an input training image;
(ii) encoding the input training image using the first neural network, to produce a latent representation;
(iii) quantizing the latent representation to produce a quantized latent;
(iv) using the second neural network to produce an output image from the quantized latent, wherein the output image is an approximation of the input image;
(v) evaluating a loss function based on differences between the output image and the input training image;
(vi) evaluating a gradient of the loss function;
(vii) back-propagating the gradient of the loss function through the second neural network and through the first neural network, to update weights of the second neural network and of the first neural network; and
(viii) repeating steps (i) to (vii) using a set of training images, to produce a trained first neural network and a trained second neural network, and
(ix) storing the weights of the trained first neural network and of the trained second neural network.

An advantage of the invention is that, when using the trained first neural network and the trained second neural network, for a fixed file size ("rate"), a reduced output image distortion is obtained; and for a fixed output image distortion, a reduced file size ("rate") is obtained.

The method may be one wherein the loss function is evaluated as a weighted sum of differences between the output image and the input training image, and the estimated bits of the quantized image latents.

The method may be one wherein the steps of the method are performed by a computer system.

The method may be one wherein the loss function is a weighted sum of a rate and a distortion.

The method may be one wherein for differentiability, actual quantisation is replaced by noise quantisation.

The method may be one wherein the noise distribution is uniform, Gaussian or Laplacian distributed, or a Cauchy distribution, a Logistic distribution, a Student's t distribution, a Gumbel distribution, an Asymmetric Laplace distribution, a skew normal distribution, an exponential power distribution, a Johnson's SU distribution, a generalized normal distribution, or a generalized hyperbolic distribution, or any commonly known univariate or multivariate distribution.

The method may be one including the steps of:
(iii-a) entropy encoding the quantized latent into a bitstream;
(iii-b) entropy decoding the bitstream to produce the quantized latent.

The method may be one including use of an iterative solving method.

The method may be one in which the iterative solving method is used for an autoregressive model, or for a non-autoregressive model.

The method may be one wherein an automatic differentiation package is used to back propagate loss gradients through the calculations performed by an iterative solver.

The method may be one wherein another system is solved iteratively for the gradient.

The method may be one wherein the gradient is approximated and learned using a proxy-function, such as a neural network.

The method may be one including using a quantisation proxy.

The method may be one wherein an entropy model of a distribution with an unbiased (constant) rate loss gradient is used for quantisation.

The method may be one including use of a Laplacian entropy model.

The method may be one wherein the twin tower problem is prevented or alleviated, such as by adding a penalty term for latent values accumulating at the positions where the clustering takes place.

The method may be one wherein split quantisation is used for network training, with a combination of two quantisation proxies for the rate term and the distortion term.

The method may be one wherein noise quantisation is used for rate and STE quantisation is used for distortion.

The method may be one wherein soft-split quantisation is used for network training, with a combination of two quantisation proxies for the rate term and for the distortion term.

The method may be one wherein noise quantisation is used for rate and STE quantisation is used for distortion.

The method may be one wherein either quantisation overrides the gradients of the other.

The method may be one wherein the noise quantisation proxy overrides the gradients for the STE quantisation proxy.

The method may be one wherein QuantNet modules are used, in network training for learning a differentiable mapping mimicking true quantisation.

The method may be one wherein learned gradient mappings are used, in network training for explicitly learning the backward function of a true quantisation operation.

The method may be one wherein an associated training regime is used, to achieve such a learned mapping, using for instance a simulated annealing approach or a gradient-based approach.

The method may be one wherein discrete density models are used in network training, such as by soft-discretisation of the PDF.

The method may be one wherein context-aware quantisation techniques are used.

The method may be one wherein a parametrisation scheme is used for bin width parameters.

The method may be one wherein context-aware quantisation techniques are used in a transformed latent space, using bijective mappings.

The method may be one wherein dequantisation techniques are used for the purpose of modelling continuous probability distributions, using discrete probability models.

The method may be one wherein dequantisation techniques are used for the purpose of assimilating the quantisation residuals through the usage of context modelling or other parametric learnable neural network modules.

The method may be one including modelling of second-order effects for the minimisation of quantisation errors.

The method may be one including computing the Hessian matrix of the loss function.

The method may be one including using adaptive rounding methods to solve for the quadratic unconstrained binary optimisation problem posed by minimising the quantisation errors.

The method may be one including maximising mutual information of the input and output by modelling the difference $\hat{x}$ minus $x$ as noise, or as a random variable.

The method may be one wherein the input $x$ and the noise are modelled as zero-mean independent Gaussian tensors.

The method may be one wherein the parameters of the mutual information are learned by neural networks.

The method may be one wherein an aim of the training is to force the encoder-decoder compression pipeline to maximise the mutual information between $x$ and $\hat{x}$.

The method may be one wherein the method of training directly maximises mutual information in a one-step training process, where the $x$ and noise are fed into respective probability networks S and N, and the mutual information over the entire pipeline is maximised jointly.

The method may be one wherein firstly, the network S and N is trained using negative log-likelihood to learn a useful representation of parameters, and secondly, estimates of the parameters are then used to estimate the mutual information and to train the compression network, however gradients only impact the components within the compression network; components are trained separately.

The method may be one including maximising mutual information of the input and output of the compression pipeline by explicitly modelling the mutual information using a structured or unstructured bound.

The method may be one wherein the bounds include Barber & Agakov, or InfoNCE, or TUBA, or Nguyen-Wainwright-Jordan (NWJ), or Jensen-Shannon (JS), or TNCE, or BA, or MBU, or Donsker-Varadhan (DV), or IWHV, or SIVI, or IWAE.

The method may be one including a temporal extension of mutual information that conditions the mutual information of the current input based on N past inputs.

The method may be one wherein conditioning the joint and the marginals is used based on N past data points.

The method may be one wherein maximising mutual information of the latent parameter $y$ and a particular distribution P is a method of optimising for rate in the learnt compression pipeline.

The method may be one wherein maximising mutual information of the input and output is applied to segments of images.

The method may be one wherein encoding the input image using the first neural network includes using one or more univariate or multivariate Padé activation units.

The method may be one wherein using the second neural network to produce an output image from the quantized latent includes using one or more univariate or multivariate Padé activation units.

The method may be one wherein when back-propagating the gradient of the loss function through the second neural network and through the first neural network, parameters of the one or more univariate or multivariate Padé activation units of the first neural network are updated, and parameters of the one or more univariate or multivariate Padé activation units of the second neural network are updated.

The method may be one wherein in step (ix), the parameters of the one or more univariate or multivariate Padé activation units of the first neural network are stored, and the parameters of the one or more univariate or multivariate Padé activation units of the second neural network are stored.

An advantage of the above is that, when using the trained first neural network and the trained second neural network, for a fixed file size ("rate"), a reduced output image distortion may be obtained; and for a fixed output image distortion, a reduced file size ("rate") may be obtained.

According to a sixth aspect of the invention, there is provided a computer program product for training a first neural network and a second neural network, the neural networks being for use in lossy image or video compression, transmission and decoding, the computer program product executable on a processor to:
  (i) receive an input training image;
  (ii) encode the input training image using the first neural network, to produce a latent representation;
  (iii) quantize the latent representation to produce a quantized latent;
  (iv) use the second neural network to produce an output image from the quantized latent, wherein the output image is an approximation of the input image;
  (v) evaluate a loss function based on differences between the output image and the input training image;
  (vi) evaluate a gradient of the loss function;
  (vii) back-propagate the gradient of the loss function through the second neural network and through the first neural network, to update weights of the second neural network and of the first neural network; and
  (viii) repeat (i) to (vii) using a set of training images, to produce a trained first neural network and a trained second neural network, and
  (ix) store the weights of the trained first neural network and of the trained second neural network.

The computer program product may be one wherein the loss function is evaluated as a weighted sum of differences between the output image and the input training image, and the estimated bits of the quantized image latents.

The computer program product may be executable on the processor to perform a method of any aspect of the fifth aspect of the invention.

According to a seventh aspect of the invention, there is provided a computer-implemented method for lossy image or video compression, transmission and decoding, the method including the steps of
  (i) receiving an input image at a first computer system;
  (ii) encoding the input image using a first trained neural network, using the first computer system, to produce a y latent representation;
  (iii) quantizing the y latent representation using the first computer system to produce a quantized y latent;
  (iv) encoding the quantized y latent using a third trained neural network, using the first computer system, to produce a z latent representation;
  (v) quantizing the z latent representation using the first computer system to produce a quantized z latent;
  (vi) entropy encoding the quantized z latent into a second bitstream, using the first computer system;
  (vii) the first computer system processing the quantized z latent using a fourth trained neural network to obtain probability distribution parameters of each element of the quantized y latent, wherein the probability distribution of the quantized y latent is assumed to be represented by a (e.g. factorized) probability distribution of each element of the quantized y latent;
  (viii) entropy encoding the quantized y latent, using the obtained probability distribution parameters of each element of the quantized y latent, into a first bitstream, using the first computer system;
  (ix) transmitting the first bitstream and the second bitstream to a second computer system;
  (x) the second computer system entropy decoding the second bitstream to produce the quantized z latent;

(xi) the second computer system processing the quantized z latent using a trained neural network identical to the fourth trained neural network to obtain the probability distribution parameters of each element of the quantized y latent;

(xii) the second computer system using the obtained probability distribution parameters of each element of the quantized y latent, together with the first bitstream, to obtain the quantized y latent;

(xiii) the second computer system using a second trained neural network to produce an output image from the quantized y latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein in step (xiii) the output image is stored.

The method may be one wherein in step (iii), quantizing the y latent representation using the first computer system to produce a quantized y latent comprises quantizing the y latent representation using the first computer system into a discrete set of symbols to produce a quantized y latent.

The method may be one wherein in step (v), quantizing the z latent representation using the first computer system to produce a quantized z latent comprises quantizing the z latent representation using the first computer system into a discrete set of symbols to produce a quantized z latent.

The method may be one wherein in step (vi) a predefined probability distribution is used for the entropy encoding of the quantized z latent and wherein in step (x) the predefined probability distribution is used for the entropy decoding to produce the quantized z latent.

The method may be one wherein in step (vi) parameters characterizing a probability distribution are calculated, wherein a probability distribution characterised by the parameters is used for the entropy encoding of the quantized z latent, and wherein in step (vi) the parameters characterizing the probability distribution are included in the second bitstream, and wherein in step (x) the probability distribution characterised by the parameters is used for the entropy decoding to produce the quantized z latent.

The method may be one wherein the (e.g. factorized) probability distribution is a (e.g. factorized) normal distribution, and wherein the obtained probability distribution parameters are a respective mean and standard deviation of each respective element of the quantized y latent.

The method may be one wherein the (e.g. factorized) probability distribution is a parametric (e.g. factorized) probability distribution.

The method may be one wherein the parametric (e.g. factorized) probability distribution is a continuous parametric (e.g. factorized) probability distribution.

The method may be one wherein the parametric (e.g. factorized) probability distribution is a discrete parametric (e.g. factorized) probability distribution.

The method may be one wherein the discrete parametric distribution is a Bernoulli distribution, a Rademacher distribution, a binomial distribution, a beta-binomial distribution, a degenerate distribution at x0, a discrete uniform distribution, a hypergeometric distribution, a Poisson binomial distribution, a Fisher's noncentral hypergeometric distribution, a Wallenius' noncentral hypergeometric distribution, a Benford's law, an ideal and robust soliton distributions, Conway-Maxwell-Poisson distribution, a Poisson distribution, a Skellam distribution, a beta negative binomial distribution, a Boltzmann distribution, a logarithmic (series) distribution, a negative binomial distribution, a Pascal distribution, a discrete compound Poisson distribution, or a parabolic fractal distribution.

The method may be one wherein parameters included in the parametric (e.g. factorized) probability distribution include shape, asymmetry and/or skewness parameters.

The method may be one wherein the parametric (e.g. factorized) probability distribution is a normal distribution, a Laplace distribution, a Cauchy distribution, a Logistic distribution, a Student's t distribution, a Gumbel distribution, an Asymmetric Laplace distribution, a skew normal distribution, an exponential power distribution, a Johnson's SU distribution, a generalized normal distribution, or a generalized hyperbolic distribution.

The method may be one wherein the parametric (e.g. factorized) probability distribution is a parametric multivariate distribution.

The method may be one wherein the latent space is partitioned into chunks on which intervariable correlations are ascribed; zero correlation is prescribed for variables that are far apart and have no mutual influence, wherein the number of parameters required to model the distribution is reduced, wherein the number of parameters is determined by the partition size and therefore the extent of the locality.

The method may be one wherein the chunks can be arbitrarily partitioned into different sizes, shapes and extents.

The method may be one wherein a covariance matrix is used to characterise the parametrisation of intervariable dependences.

The method may be one wherein for a continuous probability distribution with a well-defined PDF, but lacking a well-defined or tractable formulation of its CDF, numerical integration is used through Monte Carlo (MC) or Quasi-Monte Carlo (QMC) based methods, where this can refer to factorized or to non-factorisable multivariate distributions.

The method may be one wherein a copula is used as a multivariate cumulative distribution function.

The method may be one wherein to obtain a probability density function over the latent space, the corresponding characteristic function is transformed using a Fourier Transform to obtain the probability density function.

The method may be one wherein to evaluate joint probability distributions over the pixel space, an input of the latent space into the characteristic function space is transformed, and then the given/learned characteristic function is evaluated, and the output is converted back into the joint-spatial probability space.

The method may be one wherein to incorporate multimodality into entropy modelling, a mixture model is used as a prior distribution.

The method may be one wherein to incorporate multimodality into entropy modelling, a mixture model is used as a prior distribution, comprising a weighted sum of any base (parametric or non-parametric, factorized or non-factorisable multivariate) distribution as mixture components.

The method may be one wherein the (e.g. factorized) probability distribution is a non-parametric (e.g. factorized) probability distribution.

The method may be one wherein the non-parametric (e.g. factorized) probability distribution is a histogram model, or a kernel density estimation, or a learned (e.g. factorized) cumulative density function.

The method may be one wherein a prior distribution is imposed on the latent space, in which the prior distribution is an entropy model, which is optimized over its assigned parameter space to match its underlying distribution, which in turn lowers encoding computational operations.

The method may be one wherein the parameter space is sufficiently flexible to properly model the latent distribution.

The method may be one wherein encoding the quantized y latent using the third trained neural network, using the first computer system, to produce a z latent representation, includes using an invertible neural network, and wherein the second computer system processing the quantized z latent to produce the quantized y latent, includes using an inverse of the invertible neural network.

The method may be one wherein a hyperprior network of a compression pipeline is integrated with a normalising flow.

The method may be one wherein there is provided a modification to the architecture of normalising flows that introduces hyperprior networks in each factor-out block.

The method may be one wherein there is provided meta-compression, where the decoder weights are compressed with a normalising flow and sent along within the bitstreams.

The method may be one wherein encoding the input image using the first trained neural network includes using one or more univariate or multivariate Padé activation units.

The method may be one wherein using the second trained neural network to produce an output image from the quantized latent includes using one or more univariate or multivariate Padé activation units.

The method may be one wherein encoding the quantized y latent using the third trained neural network includes using one or more univariate or multivariate Padé activation units.

The method may be one wherein using the fourth trained neural network to obtain probability distribution parameters of each element of the quantized y latent includes using one or more univariate or multivariate Padé activation units.

The method may be one wherein steps (ii) to (xiii) are executed wholly in a frequency domain.

The method may be one wherein integral transforms to and from the frequency domain are used.

The method may be one wherein the integral transforms are Fourier Transforms, or Hartley Transforms, or Wavelet Transforms, or Chirplet Transforms, or Sine and Cosine Transforms, or Mellin Transforms, or Hankel Transforms, or Laplace Transforms.

The method may be one wherein spectral convolution is used for image compression.

The method may be one wherein spectral specific activation functions are used.

The method may be one wherein for downsampling, an input is divided into several blocks that are concatenated in a separate dimension; a convolution operation with a 1xi kernel is then applied such that the number of channels is reduced by half; and wherein the upsampling follows a reverse and mirrored methodology.

The method may be one wherein for image decomposition, stacking is performed.

The method may be one wherein for image reconstruction, stitching is performed.

The method may be one wherein the first computer system is a server, e.g. a dedicated server, e.g a machine in the cloud with dedicated GPUs e.g Amazon Web Services, Microsoft Azure, etc, or any other cloud computing services.

The method may be one wherein the first computer system is a user device.

The method may be one wherein the user device is a laptop computer, desktop computer, a tablet computer or a smart phone.

The method may be one wherein the first trained neural network includes a library installed on the first computer system.

The method may be one wherein the first trained neural network is parametrized by one or several convolution matrices $\theta$, or wherein the first trained neural network is parametrized by a set of bias parameters, non-linearity parameters, convolution kernel/matrix parameters.

The method may be one wherein the second computer system is a recipient device.

The method may be one wherein the recipient device is a laptop computer, desktop computer, a tablet computer, a smart TV or a smart phone.

The method may be one wherein the second trained neural network includes a library installed on the second computer system.

The method may be one wherein the second trained neural network is parametrized by one or several convolution matrices $\Omega$, or wherein the first trained neural network is parametrized by a set of bias parameters, non-linearity parameters, convolution kernel/matrix parameters.

An advantage of the above is that for a fixed file size ("rate"), a reduced output image distortion may be obtained. An advantage of the above is that for a fixed output image distortion, a reduced file size ("rate") may be obtained.

According to an eighth aspect of the invention, there is provided a system for lossy image or video compression, transmission and decoding, the system including a first computer system, a first trained neural network, a second computer system, a second trained neural network, a third trained neural network, a fourth trained neural network and a trained neural network identical to the fourth trained neural network, wherein:

(i) the first computer system is configured to receive an input image;

(ii) the first computer system is configured to encode the input image using a first trained neural network, to produce a y latent representation;

(iii) the first computer system is configured to quantize the y latent representation to produce a quantized y latent;

(iv) the first computer system is configured to encode the quantized y latent using a third trained neural network, to produce a z latent representation;

(v) the first computer system is configured to quantize the z latent representation to produce a quantized z latent;

(vi) the first computer system is configured to entropy encode the quantized z latent into a second bitstream;

(vii) the first computer system is configured to process the quantized z latent using the fourth trained neural network to obtain probability distribution parameters of each element of the quantized y latent, wherein the probability distribution of the quantized y latent is assumed to be represented by a (e.g. factorized) probability distribution of each element of the quantized y latent;

(viii) the first computer system is configured to entropy encode the quantized y latent, using the obtained probability distribution parameters of each element of the quantized y latent, into a first bitstream;

(ix) the first computer system is configured to transmit the first bitstream and the second bitstream to the second computer system;

(x) the second computer system is configured to entropy decode the second bitstream to produce the quantized z latent;

(xi) the second computer system is configured to process the quantized z latent using the trained neural network identical to the fourth trained neural network to obtain the probability distribution parameters of each element of the quantized y latent;
(xii) the second computer system is configured to use the obtained probability distribution parameters of each element of the quantized y latent, together with the first bitstream, to obtain the quantized y latent;
(xiii) the second computer system is configured to use the second trained neural network to produce an output image from the quantized y latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The system may be one wherein the system is configured to perform a method of any aspect of the seventh aspect of the invention.

According to a ninth aspect of the invention, there is provided a first computer system of any aspect of the eighth aspect of the invention.

According to a tenth aspect of the invention, there is provided a second computer system of any aspect of the eighth aspect of the invention.

According to an eleventh aspect of the invention, there is provided a computer implemented method of training a first neural network, a second neural network, a third neural network, and a fourth neural network, the neural networks being for use in lossy image or video compression, transmission and decoding, the method including the steps of:
(i) receiving an input training image;
(ii) encoding the input training image using the first neural network, to produce a y latent representation;
(iii) quantizing the y latent representation to produce a quantized y latent;
(iv) encoding the quantized y latent using the third neural network, to produce a z latent representation;
(v) quantizing the z latent representation to produce a quantized z latent;
(vi) processing the quantized z latent using the fourth neural network to obtain probability distribution parameters of each element of the quantized y latent, wherein the probability distribution of the quantized y latent is assumed to be represented by a (e.g. factorized) probability distribution of each element of the quantized y latent; (vii) entropy encoding the quantized y latent, using the obtained probability distribution parameters of each element of the quantized y latent, into a bitstream;
(ix) processing the quantized z latent using the fourth neural network to obtain the probability distribution parameters of each element of the quantized y latent;
(x) using the obtained probability distribution parameters of each element of the quantized y latent, together with the bitstream, to obtain the quantized y latent;
(xi) using the second neural network to produce an output image from the quantized y latent, wherein the output image is an approximation of the input training image;
(xii) evaluating a loss function based on differences between the output image and the input training image;
(xiii) evaluating a gradient of the loss function;
(xiv) back-propagating the gradient of the loss function through the second neural network, through the fourth neural network, through the third neural network and through the first neural network, to update weights of the first, second, third and fourth neural networks; and
(xv) repeating steps (i) to (xiv) using a set of training images, to produce a trained first neural network, a trained second neural network, a trained third neural network and a trained fourth neural network, and
(xvi) storing the weights of the trained first neural network, the trained second neural network, the trained third neural network and the trained fourth neural network.

An advantage of the invention is that, when using the trained first neural network, the trained second neural network, the trained third neural network and the trained fourth neural network, for a fixed file size ("rate"), a reduced output image distortion is obtained; and for a fixed output image distortion, a reduced file size ("rate") is obtained.

The method may be one wherein the loss function is evaluated as a weighted sum of differences between the output image and the input training image, and the estimated bits of the quantized image latents.

The method may be one wherein the steps of the method are performed by a computer system.

The method may be one wherein the loss function is a weighted sum of a rate and a distortion.

The method may be one wherein for differentiability, actual quantisation is replaced by noise quantisation.

The method may be one wherein the noise distribution is uniform, Gaussian or Laplacian distributed, or a Cauchy distribution, a Logistic distribution, a Student's t distribution, a Gumbel distribution, an Asymmetric Laplace distribution, a skew normal distribution, an exponential power distribution, a Johnson's SU distribution, a generalized normal distribution, or a generalized hyperbolic distribution, or any commonly known univariate or multivariate distribution.

The method may be one wherein encoding the input training image using the first neural network includes using one or more univariate or multivariate Padé activation units.

The method may be one wherein using the second neural network to produce an output image from the quantized y latent includes using one or more univariate or multivariate Padé activation units.

The method may be one wherein encoding the quantized y latent using the third neural network includes using one or more univariate or multivariate Padé activation units.

The method may be one wherein using the fourth neural network to obtain probability distribution parameters of each element of the quantized y latent includes using one or more univariate or multivariate Padé activation units.

The method may be one wherein when back-propagating the gradient of the loss function through the second neural network, through the fourth neural network, through the third neural network and through the first neural network, parameters of the one or more univariate or multivariate Padé activation units of the first neural network are updated, parameters of the one or more univariate or multivariate Padé activation units of the third neural network are updated, parameters of the one or more univariate or multivariate Padé activation units of the fourth neural network are updated, and parameters of the one or more univariate or multivariate Padé activation units of the second neural network are updated.

The method may be one wherein in step (ix), the parameters of the one or more univariate or multivariate Padé activation units of the first neural network are stored, the parameters of the one or more univariate or multivariate Padé activation units of the second neural network are stored, the parameters of the one or more univariate or multivariate Padé activation units of the third neural network are stored, and the parameters of the one or more univariate or multivariate Padé activation units of the fourth neural network are stored.

An advantage of the above is that, when using the trained first neural network, the trained second neural network, the trained third neural network and the trained fourth neural network, for a fixed file size ("rate"), a reduced output image distortion may be obtained; and for a fixed output image distortion, a reduced file size ("rate") may be obtained.

According to a twelfth aspect of the invention, there is provided a computer program product for training a first neural network, a second neural network, a third neural network, and a fourth neural network, the neural networks being for use in lossy image or video compression, transmission and decoding, the computer program product executable on a processor to:
  (i) receive an input training image;
  (ii) encode the input training image using the first neural network, to produce a y latent representation;
  (iii) quantize the y latent representation to produce a quantized y latent;
  (iv) encode the quantized y latent using the third neural network, to produce a z latent representation;
  (v) quantize the z latent representation to produce a quantized z latent;
  (vi) processing the quantized z latent using the fourth neural network to obtain probability distribution parameters of each element of the quantized y latent, wherein the probability distribution of the quantized y latent is assumed to be represented by a (e.g. factorized) probability distribution of each element of the quantized y latent;
  (vii) entropy encode the quantized y latent, using the obtained probability distribution parameters of each element of the quantized y latent, into a bitstream;
  (ix) processing the quantized z latent using the fourth neural network to obtain the probability distribution parameters of each element of the quantized y latent;
  (x) process the obtained probability distribution parameters of each element of the quantized y latent, together with the bitstream, to obtain the quantized y latent;
  (xi) use the second neural network to produce an output image from the quantized y latent, wherein the output image is an approximation of the input training image;
  (xii) evaluate a loss function based on differences between the output image and the input training image;
  (xiii) evaluate a gradient of the loss function;
  (xiv) back-propagate the gradient of the loss function through the second neural network, through the fourth neural network, through the third neural network and through the first neural network, to update weights of the first, second, third and fourth neural networks; and
  (xv) repeat (i) to (xiv) using a set of training images, to produce a trained first neural network, a trained second neural network, a trained third neural network and a trained fourth neural network, and
  (xvi) store the weights of the trained first neural network, the trained second neural network, the trained third neural network and the trained fourth neural network.

The computer program product may be one wherein the loss function is evaluated as a weighted sum of differences between the output image and the input training image, and the estimated bits of the quantized image latents.

The computer program product may be executable on the processor to perform a method of any aspect of the eleventh aspect of the invention.

According to a thirteenth aspect of the invention, there is provided a computer-implemented method for lossy image or video compression, transmission and decoding, the method including the steps of
  (i) receiving an input image at a first computer system;
  (ii) the first computer system segmenting the input image into a plurality of image segments using a segmentation algorithm;
  (iii) encoding the image segments using a first trained neural network, using the first computer system, to produce a latent representation, wherein the first trained neural network was trained based on training image segments generated using the segmentation algorithm;
  (iv) quantizing the latent representation using the first computer system to produce a quantized latent;
  (v) entropy encoding the quantized latent into a bitstream, using the first computer system;
  (vi) transmitting the bitstream to a second computer system;
  (vii) the second computer system entropy decoding the bitstream to produce the quantized latent;
  (viii) the second computer system using a second trained neural network to produce an output image from the quantized latent, wherein the second trained neural network was trained based on training image segments generated using the segmentation algorithm; wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein in step (viii) the output image is stored.

The method may be one wherein the segmentation algorithm is a classification-based segmentation algorithm, or an object-based segmentation algorithm, or a semantic segmentation algorithm, or an instance segmentation algorithm, or a clustering based segmentation algorithm, or a region-based segmentation algorithm, or an edge-detection segmentation algorithm, or a frequency based segmentation algorithm.

The method may be one wherein the segmentation algorithm is implemented using a neural network.

The method may be one wherein Just Noticeable Difference (JND) masks are provided as input into a compression pipeline.

The method may be one wherein JND masks are produced using Discrete Cosine Transform (DCT) and Inverse DCT on the image segments from the segmentation algorithm.

The method may be one wherein the segmentation algorithm is used in a bi-level fashion.

According to a fourteenth aspect of the invention, there is provided a computer implemented method of training a first neural network and a second neural network, the neural networks being for use in lossy image or video compression, transmission and decoding, the method including the steps of:
  (i) receiving an input training image;
  (ii) segmenting the input training image into training image segments using a segmentation algorithm;
  (iii) encoding the training image segments using the first neural network, to produce a latent representation;
  (iv) quantizing the latent representation to produce a quantized latent;
  (v) using the second neural network to produce an output image from the quantized latent, wherein the output image is an approximation of the input training image;

(vi) evaluating a loss function based on differences between the output image and the input training image;
(vii) evaluating a gradient of the loss function;
(viii) back-propagating the gradient of the loss function through the second neural network and through the first neural network, to update weights of the second neural network and of the first neural network; and
(ix) repeating steps (i) to (viii) using a set of training images, to produce a trained first neural network and a trained second neural network, and
(x) storing the weights of the trained first neural network and of the trained second neural network.

An advantage of the invention is that, when using the trained first neural network and the trained second neural network, for a fixed file size ("rate"), a reduced output image distortion is obtained; and for a fixed output image distortion, a reduced file size ("rate") is obtained.

The method may be one wherein the loss function is evaluated as a weighted sum of differences between the output image and the input training image, and the estimated bits of the quantized image latents.

The method may be one wherein the steps of the method are performed by a computer system.

The method may be one wherein the loss function is a sum of respective rate and respectively weighted respective distortion, over respective training image segments, of a plurality of training image segments.

The method may be one wherein a higher weight is given to training image segments which relate to human faces.

The method may be one wherein a higher weight is given to training image segments which relate to text.

The method may be one wherein the segmentation algorithm is implemented using a neural network.

The method may be one wherein the segmentation algorithm neural network is trained separately to the first neural network and to the second neural network.

The method may be one wherein the segmentation algorithm neural network is trained end-to-end with the first neural network and the second neural network.

The method may be one wherein gradients from the compression network do not affect the segmentation algorithm neural network training, and the segmentation network gradients do not affect the compression network gradients.

The method may be one wherein the training pipeline includes a plurality of Encoder; Decoder pairs, wherein each Encoder; Decoder pair produces patches with a particular loss function which determines the types of compression distortion each compression network produces.

The method may be one wherein the loss function is a sum of respective rate and respectively weighted respective distortion, over respective training image segments, of a plurality of training image colour segments.

The method may be one wherein an adversarial GAN loss is applied for high frequency regions, and an MSE is applied for low frequency areas.

The method may be one wherein a classifier trained to identify optimal distortion losses for image or video segments is used to train the first neural network and the second neural network.

The method may be one wherein the segmentation algorithm is trained in a bi-level fashion.

The method may be one wherein the segmentation algorithm is trained in a bi-level fashion to selectively apply losses for each segment during training of the first neural network and the second neural network.

An advantage of the above is that, when using the trained first neural network and the trained second neural network, for a fixed file size ("rate"), a reduced output image distortion may be obtained; and for a fixed output image distortion, a reduced file size ("rate") may be obtained.

According to a fifteenth aspect of the invention, there is provided a classifier trained to identify optimal distortion losses for image or video segments, and usable in a computer implemented method of training a first neural network and a second neural network of any aspect of the fourteenth aspect of the invention.

According to a sixteenth aspect of the invention, there is provided a computer-implemented method for training a neural network to predict human preferences of compressed image segments for distortion types, the method including the steps of (i) receiving input data comprised of segments of compressed images along with human preferences for each segment at a computer system;
(ii) the data is sent through the neural network in the computer system;
(iii) a loss is computed based on the human preference prediction of the neural network and the real human preference in the data;
(iv) the computer system evaluating a gradient of the loss function;
(v) back-propagating the gradient of the loss function through the neural network, to update weights of the neural network; and
(vi) repeating steps (i) to (v) using a set of data, to produce a trained neural network, and
(viii) storing the weights of the trained neural network.

According to a seventeenth aspect of the invention, there is provided a computer-implemented method for training neural networks for lossy image or video compression, trained with a segmentation loss with variable distortion based on estimated human preference, the method including the steps of (i) receiving an input training image at a first computer system;
(ii) the first computer system segmenting the input image into image segments using a segmentation algorithm;
(iii) a second computer system using a second neural network to estimate human preferences for a set of distortion types for each image segment;
(iv) encoding the training image using the first neural network, using the first computer system, to produce a latent representation;
(v) quantizing the latent representation using the first computer system to produce a quantized latent;
(vi) a third computer system using a third neural network to produce an output image from the quantized latent, wherein the output image is an approximation of the input training image;
(vii) the third computer system evaluating an aggregated loss function, wherein the image distortion is computed for each segment based on the predicted segment distortion types by the second neural network;
(viii) the third computer system evaluating a gradient of the loss function;
(ix) back-propagating the gradient of the loss function through the neural network, to update weights of the third neural network and of the first neural network; and
(x) repeating steps (i) to (ix) using a set of training images, to produce a trained first neural network and a trained third neural network, and
(xi) storing the weights of the trained first neural network and of the trained third neural network.

The method may be one wherein the loss function is evaluated as a weighted sum of differences between the output image and the input training image, and the estimated bits of the quantized image latents.

According to an eighteenth aspect of the invention, there is provided a computer implemented method of training a first neural network and a second neural network based on training images in which each respective training image includes human scored data relating to a perceived level of distortion in the respective training image as evaluated by a group of humans, the neural networks being for use in lossy image or video compression, transmission and decoding, the method including the steps of:

(i) receiving an input training image;
(ii) encoding the input training image using the first neural network, to produce a latent representation;
(iii) quantizing the latent representation to produce a quantized latent;
(iv) using the second neural network to produce an output image from the quantized latent, wherein the output image is an approximation of the input image;
(v) evaluating a loss function based on differences between the output image and the input training image;
(vi) evaluating a gradient of the loss function;
(vii) back-propagating the gradient of the loss function through the second neural network and through the first neural network, to update weights of the second neural network and of the first neural network; and
(viii) repeating steps (i) to (vii) using a set of training images, to produce a trained first neural network and a trained second neural network, and
(ix) storing the weights of the trained first neural network and of the trained second neural network;
wherein the loss function is a weighted sum of a rate and a distortion, and wherein the distortion includes the human scored data of the respective training image.

An advantage of the invention is that, when using the trained first neural network and the trained second neural network, for a fixed file size ("rate"), a reduced output image distortion is obtained; and for a fixed output image distortion, a reduced file size ("rate") is obtained.

The method may be one wherein the loss function is evaluated as a weighted sum of differences between the output image and the input training image, and the estimated bits of the quantized image latents.

The method may be one wherein the steps of the method are performed by a computer system.

The method may be one wherein at least one thousand training images are used.

The method may be one wherein the training images include a wide range of distortions.

The method may be one wherein the training images include mainly distortions introduced using AI-based compression encoder-decoder pipelines.

The method may be one wherein the human scored data is based on human labelled data.

The method may be one wherein in step (v) the loss function includes a component that represents the human visual system.

According to a nineteenth aspect of the invention, there is provided a computer-implemented method of learning a function from compression specific human labelled image data, the function suitable for use in a distortion function which is suitable for training an AI-based compression pipeline for images or video, the method including the steps of (i) passing image data and human labelled image data through a neural network, wherein the image data and human labelled image data are combined in the neural network, to output a visual quality score for the human labelled image data, wherein only the images are passed through the neural network, and
(ii) using a supervised training scheme using standard and widely known deep learning methods, such as stochastic gradient decent or back propagation, to train the neural network, wherein human labelled scores are used in the loss function to provide the signal to drive the learning.

The method may be one wherein other information (e.g. saliency masks), can be passed into the network along with the images too.

The method may be one wherein rate is used as a proxy to generate and automatically label data in order to pre-train the neural network.

The method may be one wherein ensemble methods are used to improve the robustness of the neural network.

The method may be one wherein multi-resolution methods are used to improve the performance of the neural network.

The method may be one wherein Bayesian methods are applied to the learning process.

The method may be one wherein a learned function is used to train a compression pipeline.

The method may be one wherein a learned function and MSE/PSNR are used to train a compression pipeline.

According to a twentieth aspect of the invention, there is provided a computer-implemented method for lossy image or video compression, transmission and decoding, the method including the steps of (i) receiving an input pair of stereo images $x_1$, $x_2$ at a first computer system;
(ii) encoding the input images using a first trained neural network, using the first computer system, to produce a latent representation;
(iii) quantizing the latent representation using the first computer system to produce a quantized latent;
(iv) entropy encoding the quantized latent into a bitstream, using the first computer system;
(v) transmitting the bitstream to a second computer system;
(vi) the second computer system entropy decoding the bitstream to produce the quantized latent;
(vii) the second computer system using a second trained neural network to produce an output pair of stereo images $\hat{x}_1$, $\hat{x}_2$ from the quantized latent, wherein the output pair of stereo images $\hat{x}_1$, $\hat{x}_2$ is an approximation of the input pair of stereo images $x_1$, $x_2$.

An advantage of the invention is that for a fixed file size ("rate"), a reduced output images distortion $\hat{x}_1$, $\hat{x}_2$ is obtained. An advantage of the invention is that for a fixed output images $\hat{x}_1$, $\hat{x}_2$ distortion, a reduced file size ("rate") is obtained.

The method may be one wherein in step (vii) the output pair of stereo images is stored.

The method may be one wherein ground-truth dependencies between $x_1$, $x_2$ are used as additional input.

The method may be one wherein depth maps of $x_1$, $x_2$ are used as additional input.

The method may be one wherein optical flow data of $x_1$, $x_2$ are used as additional input.

According to a 21st aspect of the invention, there is provided a computer implemented method of training a first neural network and a second neural network, the neural networks being for use in lossy image or video compression, transmission and decoding, the method including the steps of (i) receiving an input pair of stereo training images $x_1$, $x_2$;
(ii) encoding the input pair of stereo training images using the first neural network, to produce a latent representation;
(iii) quantizing the latent representation to produce a quantized latent;
(iv) using the second neural network to produce an output pair of stereo images $\hat{x}_1$, $\hat{x}_2$ from the quantized latent, wherein the output pair of stereo images is an approximation of the input images;
(v) evaluating a loss function based on differences between the output pair of stereo images $\hat{x}_1$, $\hat{x}_2$ and the input pair of stereo training images $x_1$, $x_2$;
(vi) evaluating a gradient of the loss function;
(vii) back-propagating the gradient of the loss function through the second neural network and through the first neural network, to update weights of the second neural network and of the first neural network; and
(viii) repeating steps (i) to (vii) using a set of pairs of stereo training images, to produce a trained first neural network and a trained second neural network, and
(ix) storing the weights of the trained first neural network and of the trained second neural network.

An advantage of the invention is that, when using the trained first neural network and the trained second neural network, for a fixed file size ("rate"), a reduced output images $\hat{x}_1$, $\hat{x}_2$ distortion is obtained; and for a fixed output images $\hat{x}_1$, $\hat{x}_2$ distortion, a reduced file size ("rate") is obtained.

The method may be one wherein the loss function is evaluated as a weighted sum of differences between the output images and the input training images, and the estimated bits of the quantized image latents.

The method may be one wherein the steps of the method are performed by a computer system.

The method may be one wherein the loss function includes using a single image depth-map estimation of $x_1$, $x_2$, $\hat{x}_1$, $\hat{x}_2$ and then measuring the distortion between the depths maps of $x_1$, $\hat{x}_1$ and $x_2$, $\hat{x}_2$.

The method may be one wherein the loss function includes using a reprojection into the 3-d world using $x_1$, $x_2$, and one using $\hat{x}_1$, $\hat{x}_2$ and a loss measuring the difference of the resulting 3-d worlds.

The method may be one wherein the loss function includes using optical flow methods that establish correspondence between pixels in $x_1$, $x_2$ and $\hat{x}_1$, $\hat{x}_2$, and a loss to minimise these resulting flow-maps.

The method may be one wherein positional location information of the cameras/images and their absolute/relative configuration are encoded in the neural networks as a prior through the training process.

According to a 22nd aspect of the invention, there is provided a computer-implemented method for lossy image or video compression, transmission and decoding, the method including the steps of (i) receiving N multi-view input images at a first computer system;
(ii) encoding the N multi-view input images using a first trained neural network, using the first computer system, to produce a latent representation;
(iii) quantizing the latent representation using the first computer system to produce a quantized latent;
(iv) entropy encoding the quantized latent into a bitstream, using the first computer system;
(v) transmitting the bitstream to a second computer system;
(vi) the second computer system entropy decoding the bitstream to produce the quantized latent;
(vii) the second computer system using a second trained neural network to produce N multi-view output images from the quantized latent, wherein the N multi-view output images are an approximation of the input N multi-view images.

An advantage of the invention is that for a fixed file size ("rate"), a reduced N multiview output images distortion is obtained. An advantage of the invention is that for a fixed N multi-view output images distortion, a reduced file size ("rate") is obtained.

The method may be one wherein in step (vii) the N multi-view output images are stored.

The method may be one wherein ground-truth dependencies between the N multiview images are used as additional input.

The method may be one wherein depth maps of the N multi-view images are used as additional input.

The method may be one wherein optical flow data of the N multi-view images are used as additional input.

According to a 23rd aspect of the invention, there is provided a computer implemented method of training a first neural network and a second neural network, the neural networks being for use in lossy image or video compression, transmission and decoding, the method including the steps of:

(i) receiving N multi-view input training images;
(ii) encoding the N multi-view input training images using the first neural network, to produce a latent representation;
(iii) quantizing the latent representation to produce a quantized latent;
(iv) using the second neural network to produce N multi-view output images from the quantized latent, wherein the N multi-view output images are an approximation of the N multi-view input images;
(v) evaluating a loss function based on differences between the N multi-view output images and the N multi-view input images;
(vi) evaluating a gradient of the loss function;
(vii) back-propagating the gradient of the loss function through the second neural network and through the first neural network, to update weights of the second neural network and of the first neural network; and
(viii) repeating steps (i) to (vii) using a set of N multi-view input training images, to produce a trained first neural network and a trained second neural network, and
(ix) storing the weights of the trained first neural network and of the trained second neural network.

An advantage of the invention is that, when using the trained first neural network and the trained second neural network, for a fixed file size ("rate"), a reduced N multiview output images distortion is obtained; and for a fixed N multi-view output images distortion, a reduced file size ("rate") is obtained.

The method may be one wherein the loss function is evaluated as a weighted sum of differences between the output images and the input training images, and the estimated bits of the quantized image latents.

The method may be one wherein the steps of the method are performed by a computer system.

The method may be one wherein the loss function includes using a single image depth-map estimation of the N multi-view input training images and the N multi-view output images and then measuring the distortion between the depth maps of the N multi-view input training images and the N multi-view output images.

The method may be one wherein the loss function includes using a reprojection into the 3-d world using N multi-view input training images and a reprojection into the 3-d world using N multi-view output images and a loss measuring the difference of the resulting 3-d worlds.

The method may be one wherein the loss function includes using optical flow methods that establish correspondence between pixels in N multi-view input training images and N multi-view output images and a loss to minimise these resulting flow-maps.

The method may be one wherein positional location information of the cameras/images and their absolute/relative configuration are encoded in the neural networks as a prior through the training process.

According to a 24th aspect of the invention, there is provided a computer-implemented method for lossy image or video compression, transmission and decoding, the method including the steps of
(i) receiving an input satellite/space, hyperspectral or medical image at a first computer system;
(ii) encoding the input image using a first trained neural network, using the first computer system, to produce a latent representation;
(iii) quantizing the latent representation using the first computer system to produce a quantized latent;
(iv) entropy encoding the quantized latent into a bitstream, using the first computer system;
(v) transmitting the bitstream to a second computer system;
(vi) the second computer system entropy decoding the bitstream to produce the quantized latent;
(vii) the second computer system using a second trained neural network to produce an output satellite/space, hyperspectral or medical image from the quantized latent, wherein the output satellite/space, hyperspectral or medical image is an approximation of the input satellite/space, hyperspectral or medical image.

An advantage of the invention is that for a fixed file size ("rate"), a reduced output satellite/space or medical image distortion is obtained. An advantage of the invention is that for a fixed output satellite/space or medical image distortion, a reduced file size ("rate") is obtained.

The method may be one wherein the output satellite/space, hyperspectral or medical image is stored.

According to a 25th aspect of the invention, there is provided a computer implemented method of training a first neural network and a second neural network, the neural networks being for use in lossy image or video compression, transmission and decoding, the method including the steps of:
(i) receiving an input satellite/space, hyperspectral or medical training image;
(ii) encoding the input satellite/space, hyperspectral or medical training image using the first neural network, to produce a latent representation;
(iii) quantizing the latent representation to produce a quantized latent;
(iv) using the second neural network to produce an output satellite/space, hyperspectral or medical image from the quantized latent, wherein the output satellite/space, hyperspectral or medical image is an approximation of the input image;
(v) evaluating a loss function based on differences between the output satellite/space, hyperspectral or medical image and the input satellite/space, hyperspectral or medical training image;
(vi) evaluating a gradient of the loss function;
(vii) back-propagating the gradient of the loss function through the second neural network and through the first neural network, to update weights of the second neural network and of the first neural network; and
(viii) repeating steps (i) to (vii) using a set of satellite/space, hyperspectral or medical training images, to produce a trained first neural network and a trained second neural network, and
(ix) storing the weights of the trained first neural network and of the trained second neural network.

An advantage of the invention is that, when using the trained first neural network and the trained second neural network, for a fixed file size ("rate"), a reduced output satellite/space or medical image distortion is obtained; and for a fixed output satellite/space or medical image distortion, a reduced file size ("rate") is obtained.

The method may be one wherein the loss function is evaluated as a weighted sum of differences between the output image and the input training image, and the estimated bits of the quantized image latents.

The method may be one wherein the steps of the method are performed by a computer system.

According to a 26th aspect of the invention, there is provided a computer implemented method of training a first neural network and a second neural network, the neural networks being for use in lossy image or video compression, transmission and decoding, the method including the steps of:
(i) receiving an input training image;
(ii) encoding the input training image using the first neural network, to produce a latent representation;
(iii) using the second neural network to produce an output image from the latent representation, wherein the output image is an approximation of the input image;
(iv) evaluating a loss function based on differences between the output image and the input training image, plus a weighted term which evaluates entropy loss with respect to the latent representation;
(v) evaluating a first gradient of the loss function with respect to parameters of the first neural network, and a second gradient of the loss function with respect to parameters of the second neural network;
(vi) back-propagating the first gradient of the loss function through the first neural network, and back-propagating the second gradient of the loss function through the the second neural network to update parameters of the first neural network and of the second neural network; and
(vii) repeating steps (i) to (vi) using a set of training images, to produce a trained first neural network and a trained second neural network, and
(viii) storing the weights of the trained first neural network and of the trained second neural network.

An advantage of the invention is that, when using the trained first neural network and the trained second neural network, for a fixed file size ("rate"), a reduced output image distortion is obtained; and for a fixed output image distortion, a reduced file size ("rate") is obtained.

The method may be one wherein the loss function is evaluated as a weighted sum of differences between the output image and the input training image, and the estimated bits of the quantized image latents.

The method may be one wherein the steps of the method are performed by a computer system.

The method may be one wherein the entropy loss includes moment matching.

According to a 27th aspect of the invention, there is provided a computer implemented method of training a first neural network and a second neural network, the method including the use of a discriminator neural network, the first neural network and the second neural network being for use in lossy image or video compression, transmission and decoding, the method including the steps of:
(i) receiving an input training image;
(ii) encoding the input training image using the first neural network, to produce a latent representation;
(iii) using the second neural network to produce an output image from the latent representation, wherein the output image is an approximation of the input image;
(iv) evaluating a loss function based on differences between the output image and the input training image;
(v) evaluating a first gradient of the loss function with respect to parameters of the first neural network, and a second gradient of the loss function with respect to parameters of the second neural network;
(vi) back-propagating the first gradient of the loss function through the first neural network, and back-propagating the second gradient of the loss function through the the second neural network to update parameters of the first neural network and of the second neural network;
(vii) sampling a sample from a predefined prior distribution;
(viii) feeding the sample to the discriminator neural network to obtain a sample realness score;
(ix) feeding the latent representation to the discriminator neural network to obtain a latent representation realness score;
(x) evaluating a discriminator loss, which is a function of the sample realness score, and the latent representation realness score, multiplied by a weight factor;
(xi) evaluating a generator loss, which is a function of the sample realness score, and the latent representation realness score, multiplied by the weight factor;
(xii) using the generator loss to calculate a third gradient of the loss function with respect to parameters of the first neural network;
(xiii) using the discriminator loss to calculate a fourth gradient of the loss function with respect to parameters of the discriminator neural network;
(xiv) back-propagating the third gradient of the loss function to update parameters of the first neural network;
(xv) back-propagating the fourth gradient of the loss function to update parameters of the discriminator neural network;
(xvi) repeating steps (i) to (xv) using a set of training images, to produce a trained first neural network, a trained second neural network, and a trained discriminator neural network;
(xvii) storing the parameters of the trained first neural network, and of the trained second neural network.

An advantage of the invention is that, when using the trained first neural network and the trained second neural network, for a fixed file size ("rate"), a reduced output image distortion is obtained; and for a fixed output image distortion, a reduced file size ("rate") is obtained.

The method may be one wherein the steps of the method are performed by a computer system.

The method may be one wherein the parameters of the trained discriminator neural network are stored.

According to a 28th aspect of the invention, there is provided a computer implemented method of training a first neural network and a second neural network, the neural networks being for use in lossy image or video compression, transmission and decoding, the method including the steps of
(i) receiving an input training image;
(ii) encoding the input training image using the first neural network, to produce a latent representation;
(iii) using the second neural network to produce an output image from the latent representation, wherein the output image is an approximation of the input image;
(iv) evaluating a first loss function based on differences between the output image and the input training image;
(v) evaluating a first gradient of the first loss function with respect to parameters of the first neural network, and a second gradient of the first loss function with respect to parameters of the second neural network;
(vi) back-propagating the first gradient of the first loss function through the first neural network, and back-propagating the second gradient of the first loss function through the second neural network, to update parameters of the first neural network and of the second neural network;
(vii) sampling a sample from a predefined prior distribution;
(viii) evaluating a second loss function, which is an entropy loss, which is a function of the latent representation and of the sample, multiplied by a weight factor;
(ix) using the second loss function to calculate a third gradient of the second loss function with respect to parameters of the first neural network;
(x) back-propagating the third gradient of the second loss function to update parameters of the first neural network;
(xi) repeating steps (i) to (x) using a set of training images, to produce a trained first neural network and a trained second neural network, and
(xii) storing the parameters of the trained first neural network and of the trained second neural network.

An advantage of the invention is that, when using the trained first neural network and the trained second neural network, for a fixed file size ("rate"), a reduced output image distortion is obtained; and for a fixed output image distortion, a reduced file size ("rate") is obtained.

The method may be one wherein the loss function is evaluated as a weighted sum of differences between the output image and the input training image, and the estimated bits of the quantized image latents.

The method may be one wherein the steps of the method are performed by a computer system.

According to a 29th aspect of the invention, there is provided a computer-implemented method for lossy image or video compression, transmission and decoding, the method including the steps of
(i) receiving an input image at a first computer system;
(ii) the first computer system passing the input image through a routing network, the routing network comprising a router and a set of one or more function blocks, wherein each function block is a neural network, wherein the router selects a function block to apply, and passes the output from the applied function block back to the router recursively, terminating when a fixed recursion depth is reached, to produce a latent representation;
(iii) quantizing the latent representation using the first computer system to produce a quantized latent;
(iv) entropy encoding the quantized latent into a bitstream, using the first computer system, and including in the bitstream metainformation relating to routing data of the routing network;
(v) transmitting the bitstream to a second computer system;
(vi) the second computer system entropy decoding the bitstream to produce the quantized latent, and to produce the metainformation relating to the routing data of the routing network;
(vii) the second computer system using the metainformation relating to the routing data of the routing network to use a trained neural network to produce an output image from the quantized latent representation, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein in step (vii) the output image is stored.

The method may be one wherein the routing network is trained using reinforcement learning.

The method may be one wherein the reinforcement learning includes continuous relaxation.

The method may be one wherein the reinforcement learning includes discrete k-best choices.

The method may be one wherein the training approach for optimising the loss/reward function for the routing module includes using a diversity loss.

The method may be one wherein the diversity loss is a temporal diversity loss, or a batch diversity loss.

According to a 30th aspect of the invention, there is provided a computer-implemented method, using a neural network architecture search (NAS) of determining one or multiple candidate architectures for a neural network for performing AI-based Image/Video Compression, the method including the steps of:
(i) maintaining a sequence of neural layer (or operator) selection processes;
(ii) repeatedly performing a candidate architecture forward pass;
(iii) updating a Neural Architecture Search system by using the feedback of the current candidate sets, and
(iv) selecting one, or a group, of candidates of neural architectures as a final AI-based Image/Video Compression sub-system; or selecting one, or a group, of candidates of neural architectures as a particular function module for a final AI-based Image/Video compression sub-system.

The method may be one wherein the method is applied to operator selection, or optimal neural cell creation, or optimal micro neural search, or optimal macro neural search.

The method may be one wherein a set of possible operators in the network is defined, wherein the problem of training the network is a discrete selection process and Reinforcement Learning tools are used to select a discrete operator per function at each position in the neural network.

The method may be one wherein the Reinforcement Learning treats this as an agent-world problem in which an agent has to choose the proper discrete operator, and the agent is training using a reward function.

The method may be one wherein Deep Reinforcement Learning, or Gaussian Processes, or Markov Decision Processes, or Dynamic Programming, or Monte Carlo Methods, or a Temporal Difference algorithm, are used.

The method may be one wherein a set of possible operators in the network is defined, wherein to train the network, Gradient-based NAS approaches are used by defining a specific operator as a linear (or non-linear) combination over all operators of the set of possible operators in the network; then, gradient descent is used to optimise the weight factors in the combination during training.

The method may be one wherein a loss is included to incentive the process to become less continuous and more discrete over time by encouraging one factor to dominate (e.g. GumbelMax with temperature annealing).

The method may be one wherein a neural architecture is determined for one or more of an Encoder, a Decoder, a Quantisation Function, an Entropy Model, an Autoregressive Module and a Loss Function.

The method may be one wherein the method is combined with auxiliary losses for AI-based Compression for compression-objective architecture training.

The method may be one wherein the auxiliary losses are runtime on specific hardware-architectures and/or devices, FLOP-count, memory-movement.

According to a 31st aspect of the invention, there is provided a computer-implemented method for lossy image or video compression, transmission and decoding, the method including the steps of
(i) receiving an input image at a first computer system;
(ii) encoding the input image using a first trained neural network, using the first computer system, to produce a latent representation;
(iii) quantizing the latent representation using the first computer system to produce a quantized latent;
(iv) in a loop, modifying the quantized latent, so as to progressively reduce a finetuning loss, to return a finetuned quantized latent;
(v) entropy encoding the finetuned quantized latent into a bitstream, using the first computer system;
(vi) transmitting the bitstream to a second computer system;
(vii) the second computer system entropy decoding the bitstream to produce the finetuned quantized latent;
(viii) the second computer system using a second trained neural network to produce an output image from the finetuned quantized latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein the finetuning loss measures one of, or a combination of: a rate of the modified quantized latent, or a distortion between the current decoder prediction of the output image and the input image, or a distortion between the current decoder prediction of the output image and a decoder prediction of the output image using the quantized latent from step (iii).

The method may be one wherein the loop in step (iv) ends when the modified quantized latent satisfies an optimization criterion.

The method may be one wherein in step (iv), the quantized latent is modified using a 1st-order optimization method, or using a 2nd-order optimization method, or using Monte-Carlo, Metropolis-Hastings, simulated annealing, or other greedy approaches.

According to a 32nd aspect of the invention, there is provided a computer-implemented method for lossy image or video compression, transmission and decoding, the method including the steps of
(i) receiving an input image at a first computer system;
(ii) encoding the input image using a first trained neural network, using the first computer system, to produce a latent representation;
(iii) in a loop, modifying the latent representation, so as to progressively reduce a finetuning loss, to return a finetuned latent representation;
(iv) quantizing the finetuned latent representation using the first computer system to produce a quantized latent;
(v) entropy encoding the quantized latent into a bitstream, using the first computer system;
(vi) transmitting the bitstream to a second computer system;
(vii) the second computer system entropy decoding the bitstream to produce the quantized latent;
(viii) the second computer system using a second trained neural network to produce an output image from the quantized latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein the finetuning loss measures one of, or a combination of a rate of the quantized latent, or a distortion between the current decoder prediction of the output image and the input image, or a distortion between the current decoder prediction of the output image and a decoder prediction of the output image using the quantized latent from step (iv).

The method may be one wherein the loop in step (iii) ends when the modified latent satisfies an optimization criterion.

The method may be one wherein in step (iii), the latent is modified using a 1st-order optimization method, or using a 2nd-order optimization method, or using Monte-Carlo, Metropolis-Hastings, simulated annealing, or other greedy approaches.

According to a 33rd aspect of the invention, there is provided a computer-implemented method for lossy image or video compression, transmission and decoding, the method including the steps of
(i) receiving an input image at a first computer system;
(ii) in a loop, modifying the input image, so as to progressively reduce a finetuning loss, to return a finetuned input image;
(iii) encoding the finetuned input image using a first trained neural network, using the first computer system, to produce a latent representation;
(iv) quantizing the latent representation using the first computer system to produce a quantized latent;
(v) entropy encoding the quantized latent into a bitstream, using the first computer system;
(vi) transmitting the bitstream to a second computer system;
(vii) the second computer system entropy decoding the bitstream to produce the quantized latent;
(viii) the second computer system using a second trained neural network to produce an output image from the quantized latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein the finetuning loss measures one of, or a combination of a rate of the quantized latent, or a distortion between the current decoder prediction of the output image and the input image, or a distortion between the current decoder prediction of the output image and a decoder prediction of the output image using the quantized latent from step (iv).

The method may be one wherein the loop in step (ii) ends when the modified input image satisfies an optimization criterion.

The method may be one wherein in step (ii), the input image is modified using a 1st-order optimization method, or using a 2nd-order optimization method, or using Monte-Carlo, Metropolis-Hastings, simulated annealing, or other greedy approaches.

According to a 34th aspect of the invention, there is provided a computer-implemented method for lossy image or video compression, transmission and decoding, the method including the steps of
(i) receiving an input image at a first computer system;
(ii) encoding the input image using a first trained neural network, using the first computer system, to produce a latent representation;
(iii) quantizing the latent representation using the first computer system to produce a quantized latent;
(iv) entropy encoding the quantized latent into a bitstream, using the first computer system;
(v) transmitting the bitstream to a second computer system;
(vi) the second computer system entropy decoding the bitstream to produce the quantized latent;
(vii) the second computer system analyzing the quantized latent to produce parameters;
(viii) the second computer system using the produced parameters to modify weights of a second trained neural network;
(ix) the second computer system using the second trained neural network including the modified weights to produce an output image from the quantized latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein the parameters are a discrete perturbation of the weights of the second trained neural network.

The method may be one wherein the weights of the second trained neural network are perturbed by a perturbation function that is a function of the parameters, using the parameters in the perturbation function.

According to a 35th aspect of the invention, there is provided a computer-implemented method for lossy image or video compression, transmission and decoding, the method including the steps of:
(i) receiving an input image at a first computer system;
(ii) encoding the input image using a first trained neural network, using the first computer system, to produce a latent representation;
(iii) quantizing the latent representation using the first computer system to produce a quantized latent;

(iv) the first computer system optimizing a binary mask using the quantized latent;
(iv) entropy encoding the quantized latent and the binary mask into a bitstream, using the first computer system;
(vi) transmitting the bitstream to a second computer system;
(vi) the second computer system entropy decoding the bitstream to produce the quantized latent, and to produce the binary mask;
(vii) the second computer system using the binary mask to modify a convolutional network of a second trained neural network;
(ix) the second computer system using the second trained neural network including the modified a convolutional network to produce an output image from the quantized latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein in step (iv), the binary mask is optimized using a ranking based method, or using a stochastic method, or using a sparsity regularization method.

According to a 36th aspect of the invention, there is provided a computer-implemented method for lossy image or video compression, transmission and decoding, the method including the steps of
(i) receiving an input image at a first computer system;
(ii) encoding the input image using a first trained neural network, using the first computer system, to produce a latent representation, and to identify nonlinear convolution kernels;
(iii) quantizing the latent representation using the first computer system to produce a quantized latent;
(iv) entropy encoding the quantized latent and an identification of the identified nonlinear convolution kernels into a bitstream, using the first computer system;
(v) transmitting the bitstream to a second computer system;
(vi) the second computer system entropy decoding the bitstream to produce the quantized latent, and to identify the nonlinear convolution kernels;
(vii) the second computer system conditioning a second trained neural network using the identified nonlinear convolution kernels, to produce a linear neural network;
(viii) the second computer system using the second trained neural network which has been conditioned using the identified nonlinear convolution kernels to produce a linear neural network, to produce an output image from the quantized latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein the linear neural network is a purely linear neural network.

According to a 37th aspect of the invention, there is provided a computer-implemented method for lossy image or video compression, transmission and decoding, the method including the steps of:
(i) receiving an input image at a first computer system;
(ii) encoding the input image using a first trained neural network, using the first computer system, to produce a latent representation, and to identify adaptive (or input-specific) convolution (activation) kernels;
(iii) quantizing the latent representation using the first computer system to produce a quantized latent;
(iv) entropy encoding the quantized latent and an identification of the identified adaptive (or input-specific) convolution (activation) kernels into a bitstream, using the first computer system;
(v) transmitting the bitstream to a second computer system;
(vi) the second computer system entropy decoding the bitstream to produce the quantized latent, and to identify the adaptive (or input-specific) convolution (activation) kernels;
(vii) the second computer system conditioning a second trained neural network using the identified adaptive (or input-specific) convolution (activation) kernels, to produce a linear neural network;
(viii) the second computer system using the second trained neural network which has been conditioned using the identified adaptive (or input-specific) convolution (activation) kernels to produce a linear neural network, to produce an output image from the quantized latent, wherein the output image is an approximation of the input image.

An advantage of the invention is that for a fixed file size ("rate"), a reduced output image distortion is obtained. An advantage of the invention is that for a fixed output image distortion, a reduced file size ("rate") is obtained.

The method may be one wherein the linear neural network is a purely linear neural network.

According to a 38th aspect of the invention, there is provided a computer implemented method of training a first neural network, a second neural network, a third neural network, and a fourth neural network, the neural networks being for use in lossy image or video compression, transmission and decoding, the method including the steps of:
(i) receiving an input training image;
(ii) encoding the input training image using the first neural network, to produce a y latent representation;
(iii) quantizing the y latent representation to produce a quantized y latent;
(iv) encoding the y latent using the third neural network, to produce a k latent representation;
(v) quantizing the k latent representation to produce a quantized k latent;
(vi) processing the quantized k latent using the fourth neural network to obtain parameters identifying nonlinear convolution kernels of the y latent;
(vii) conditioning the second neural network, wherein the second neural network includes a plurality of units arranged in series, each unit comprising a convolutional layer followed by an activation kernel, wherein the units are conditioned using the identified nonlinear convolution kernels to produce a linear neural network;
(viii) using the conditioned the second neural network to produce an output image from the quantized y latent, wherein the output image is an approximation of the input training image;
(ix) evaluating a loss function based on differences between the output image and the input training image;
(x) evaluating a gradient of the loss function;
(xi) back-propagating the gradient of the loss function through the second neural network, through the fourth neural network, through the third neural network and through the first neural network, to update weights of the first, second, third and fourth neural networks; and (xii) repeating steps (i) to (x₁) using a set of training images, to produce a trained first neural network, a trained second neural network, a trained third neural network and a trained fourth neural network, and (xiii) storing the weights of the trained first neural network, the trained second neural network, the trained third neural network and the trained fourth neural network.

According to a 39th aspect of the invention, there is provided a computer implemented method of training a first neural network, a second neural network, a third neural network, and a fourth neural network, the neural networks being for use in lossy image or video compression, transmission and decoding, the method including the steps of:

(i) receiving an input training image;

(ii) encoding the input training image using the first neural network, to produce a y latent representation;

(iii) quantizing the y latent representation to produce a quantized y latent;

(iv) encoding the y latent using the third neural network, to produce a k latent representation;

(v) quantizing the k latent representation to produce a quantized k latent;

(vi) processing the quantized k latent using the fourth neural network to obtain parameters identifying adaptive (or input-specific) convolution (activation) kernels of the y latent;

(vii) conditioning the second neural network, wherein the second neural network includes a plurality of units arranged in series, each unit comprising a convolutional layer followed by an activation kernel, wherein the units are conditioned using the identified adaptive (or input-specific) convolution (activation) kernels to produce a linear neural network;

(viii) using the conditioned the second neural network to produce an output image from the quantized y latent, wherein the output image is an approximation of the input training image;

(ix) evaluating a loss function based on differences between the output image and the input training image;

(x) evaluating a gradient of the loss function;

(xi) back-propagating the gradient of the loss function through the second neural network, through the fourth neural network, through the third neural network and through the first neural network, to update weights of the first, second, third and fourth neural networks; and (xii) repeating steps (i) to (xi) using a set of training images, to produce a trained first neural network, a trained second neural network, a trained third neural network and a trained fourth neural network, and (xiii) storing the weights of the trained first neural network, the trained second neural network, the trained third neural network and the trained fourth neural network.

An advantage of each of the above two inventions is that, when using the trained first neural network, the trained second neural network, the trained third neural network and the trained fourth neural network, for a fixed file size ("rate"), a reduced output image distortion is obtained; and for a fixed output image distortion, a reduced file size ("rate") is obtained.

The method may be one wherein the loss function is evaluated as a weighted sum of differences between the output image and the input training image, and the estimated bits of the quantized image latents.

The method may be one wherein the steps of the method are performed by a computer system.

The method may be one wherein initially the units are stabilized by using a generalized convolution operation, and then after a first training the weights of the trained first neural network, the trained third neural network and the trained fourth neural network, are stored and frozen; and then in a second training process the generalized convolution operation of the units is relaxed, and the second neural network is trained, and its weights are then stored.

The method may be one wherein the second neural network is proxy trained with a regression operation.

The method may be one wherein the regression operation is linear regression, or Tikhonov regression.

The method may be one wherein initially the units are stabilized by using a generalized convolution operation or optimal convolution kernels given by linear regression and/or Tikhonov stabilized regression, and then after a first training the weights of the trained first neural network, the trained third neural network and the trained fourth neural network, are stored and frozen; and then in a second training process the generalized convolution operation is relaxed, and the second neural network is trained, and its weights are then stored.

The method may be one wherein in a first training period joint optimization is performed for a generalised convolution operation of the units, and a regression operation of the second neural network, with a weighted loss function, whose weighting is dynamically changed over the course of network training, and then the weights of the trained first neural network, the trained third neural network and the trained fourth neural network, are stored and frozen; and then in a second training process the generalized convolution operation of the units is relaxed, and the second neural network is trained, and its weights are then stored.

Aspects of the invention may be combined.

In the above methods and systems, an image may be a single image, or an image may be a video image, or images may be a set of video images, for example.

The above methods and systems may be applied in the video domain.

For each of the above methods, a related system may be provided.

For each of the above training methods, a related computer program product may be provided.

BRIEF DESCRIPTION OF THE FIGURES

Aspects of the invention will now be described, by way of example(s), with reference to the following Figures, in which:

FIG. 13 shows a visual example of RGB and YCbCr components of an image. (a) Conversion of RGB image to YCbCr colour-space. (b) Representation of an RGB image as separate colour channels, converted into YCbCr colour-space; note that a combination of all the colour channel RGB are used for the YCbCr channels.

FIG. 20 shows typical parametric distributions considered under an outlined method. This list is by no means exhaustive, and is mainly included to showcase viable examples of parametric distributions that can be used as prior distribution.

FIG. 23 shows an example of how a 2D-Copula could look like.

FIG. 29 shows example 2FAC: $\hat{x}_{1,A}$ and $\hat{x}_{1,B}$ represent two version of an image with various levels of AI based compression distortion applied. h represent the results humans assessors would give the image for visual quality, where a value of 1 would mean the human prefers that image over other. x here is the GT image.

FIG. 32 shows an example in which the parameters $\theta$ of the three networks are randomly initialised. During training, the output of each network, from $s_1$ to $s_3$ is used along with the GT values to create three loss functions $L_1$ to $L_3$ used to optimise the parameters of their respective networks.

FIG. 37 shows example typical quantisation proxies that are conventionally employed. Unless specified under the "Gradient overriding?" column, the backward function is the analytical derivative of the forward function. This listing is not exhaustive and serves as a showcase of viable examples for quantisation proxies.

FIG. 56 shows an upper triangular matrix form U and a lower triangular matrix form L.

FIG. 57 shows a general Jacobian form for mapping from $\mathfrak{R}^N$ to $\mathfrak{R}^N$.

FIG. 58 shows an example of a diagram of a squeezing operation. Input feature map on left, output on right. Note, the output has a quarter of the spatial resolution, but double the number of channels.

FIG. 66 shows an example illustration of MI, where p(y) and p(y|x) is computed using INN transformations. Here [x, y] represents a depth concatenation of the inputs.

FIG. 76 shows a list of losses that can be used in adversarial setups framed as class probability estimation (for example, vanilla GAN).

FIG. 97 shows a list, in which all conv. layers have a stride of 1 and all downsample layers have a stride of 2. The concat column represents the previous layers which are depth-concatenated with the current input, a dash (-) represents no concatenation operation. Filter dim is in the format [filter height, filter width, input depth, output depth]. $\bar{o}$ represents the globally averaged state from output of all previous blocks. The compress layer is connected with a fully connected layer with a thousand units, which are all connected to one unit which regresses the parameter.

FIG. 100 shows an example of spectral upsampling & downsampling methods visualized in a tensor perspective where the dimensions are as follows [batch, channel, height, width].

FIG. 117 shows example nonlinear activation functions. (a) Visualisation of ReLU. (b) Visualisation of Leaky ReLU. (c) Visualisation of Tanh. (d) Visualisation of Swish.

FIG. 119 shows an example visualisation of a composition between two convolution operations, f and g, with convolution kernels $W_f$ and $W_g$ respectively, which encapsulates the composite convolution operation h with convolution kernel $W_h$.

FIGS. 120A and 120B show schematics of an example training configuration of a KNet-based compressive autoencoder, where each KNet module compresses and decompresses meta-information regarding the activation kernels $K_i$ in the decoder.

Figure 121A:
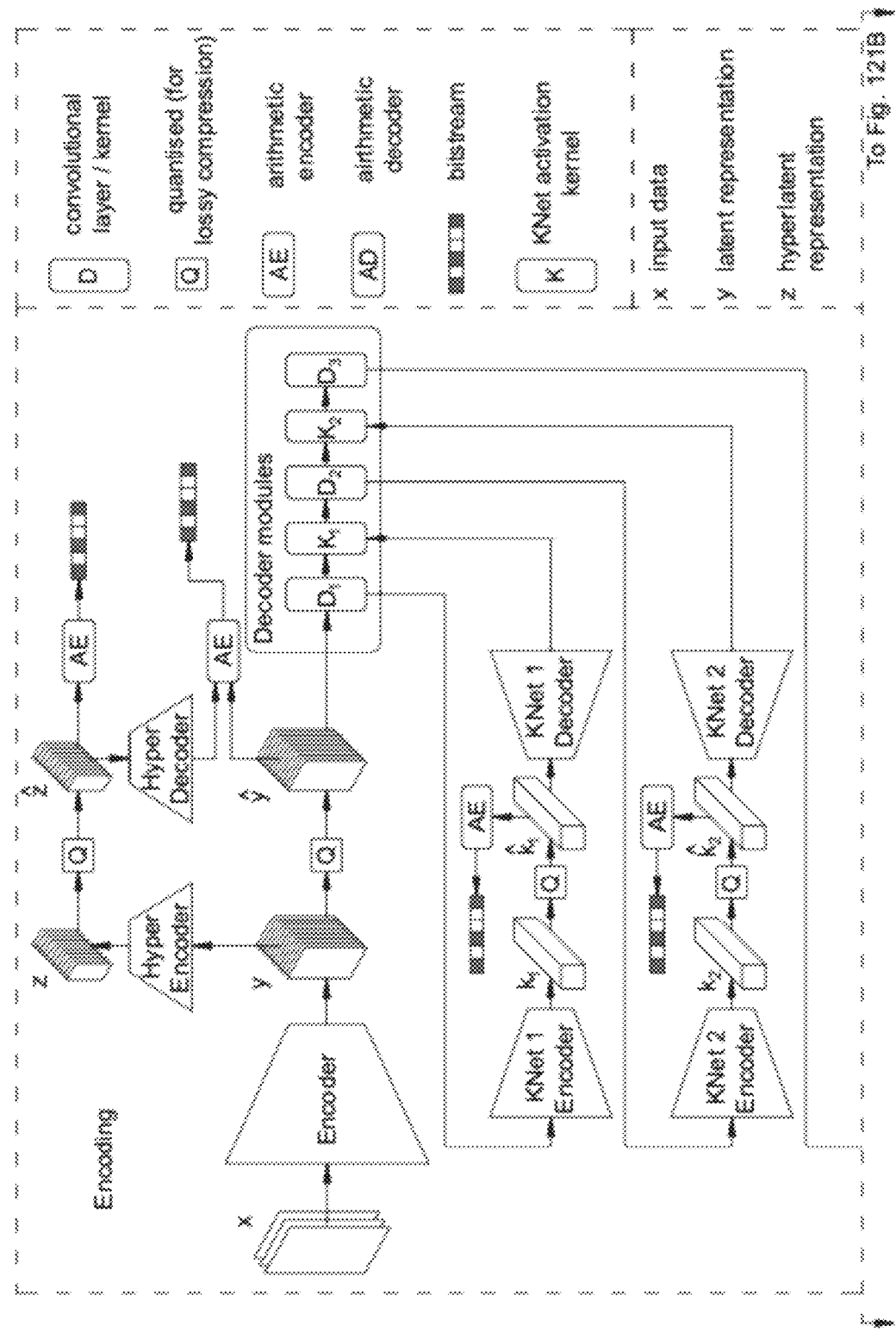
Figure 121B:
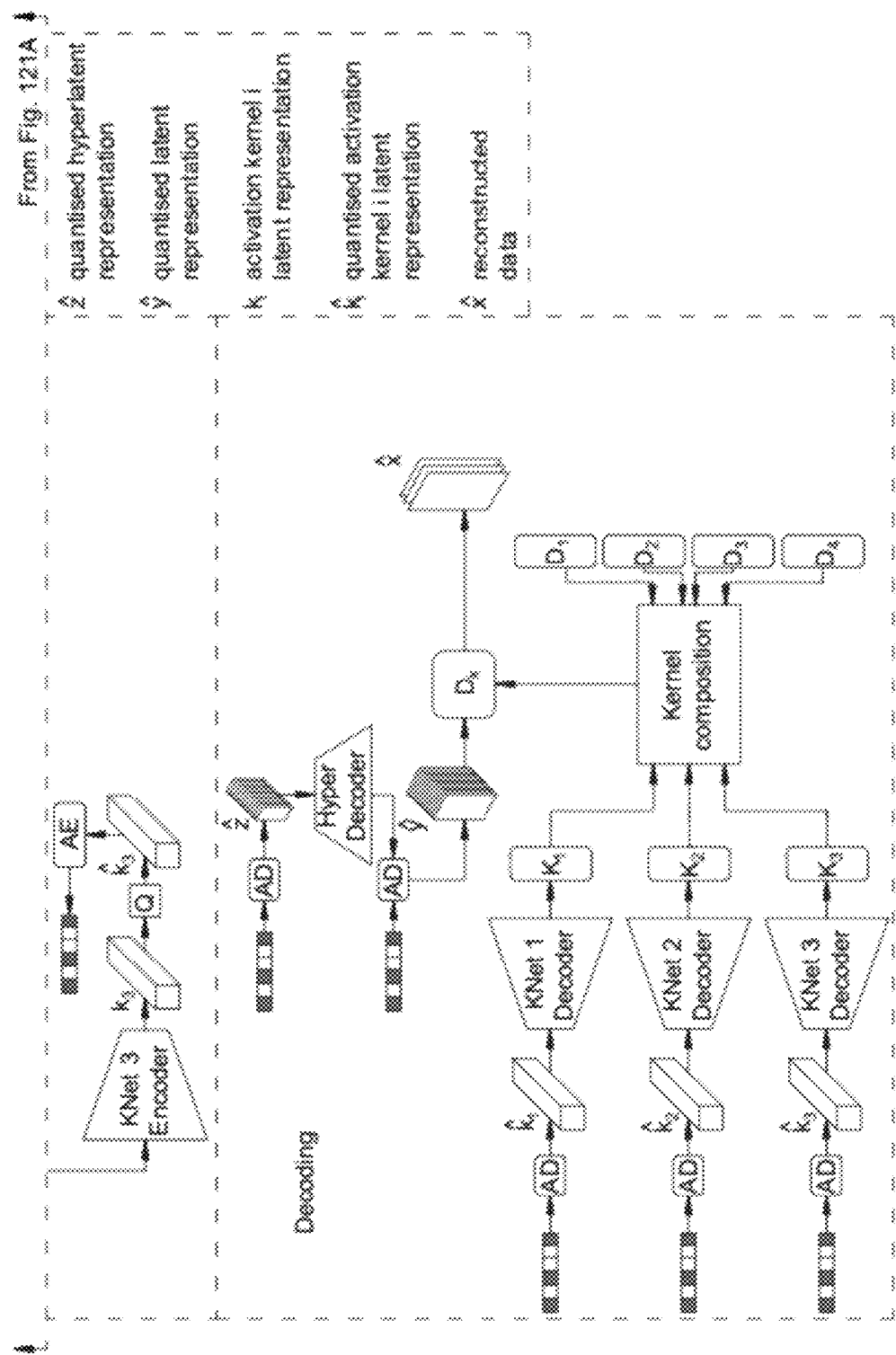

FIGS. 121A and 121B show schematics of an example inference configuration of a KNet-based compressive autoencoder. The encoding side demonstrates input data x being deconstructed into bitstreams that are encoded and thereafter transmitted. The decoding side details the reconstruction of the original input data from the obtained bitstreams, with the output of the KNet modules being composed together with the decoder convolution weight kernels and biases to form a single composite convolution operation, $D_k$. Note how the decoding side has much lower complexity relative to the encoding side.

Figure 122:
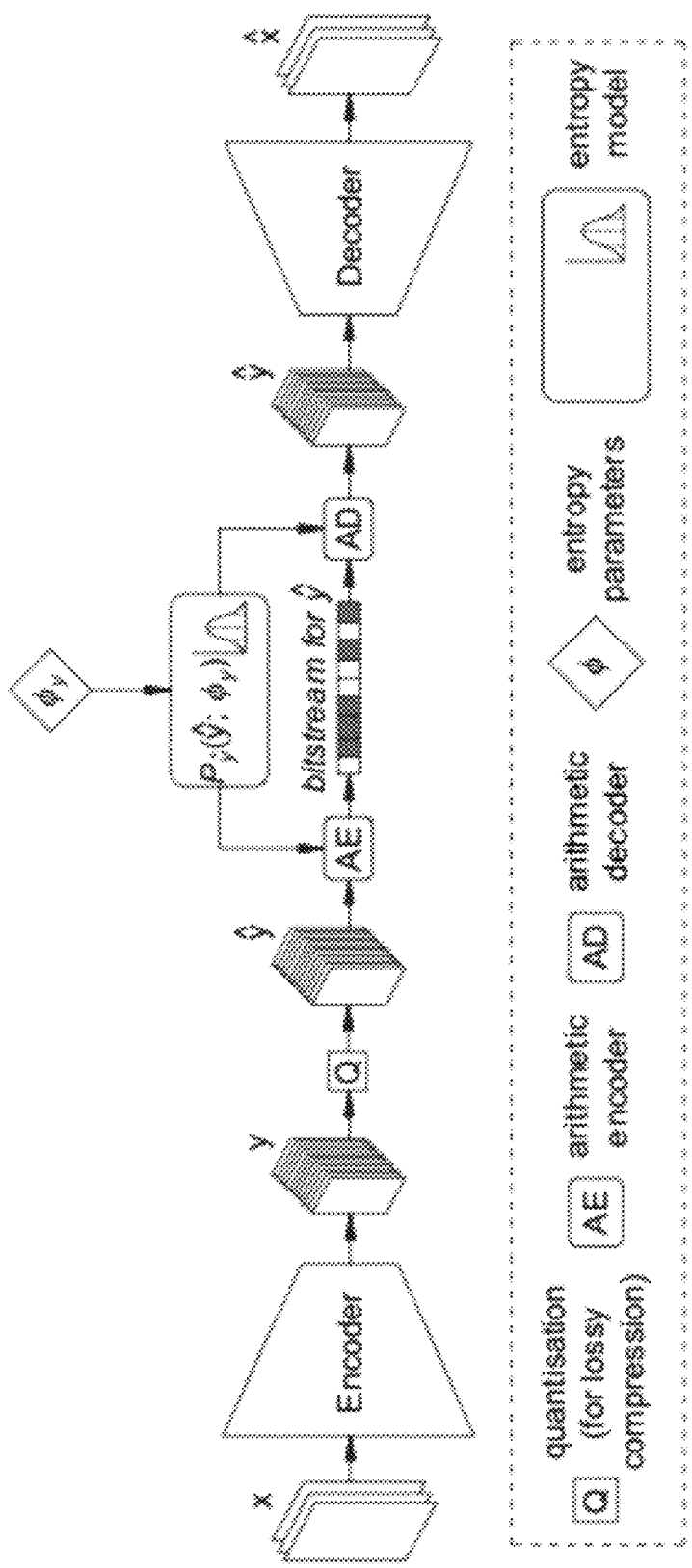

FIG. 122 shows an example structure of an autoencoder without a hyperprior. The model is optimised for the latent entropy parameters $\phi_y$, directly during training.

Figure 123:
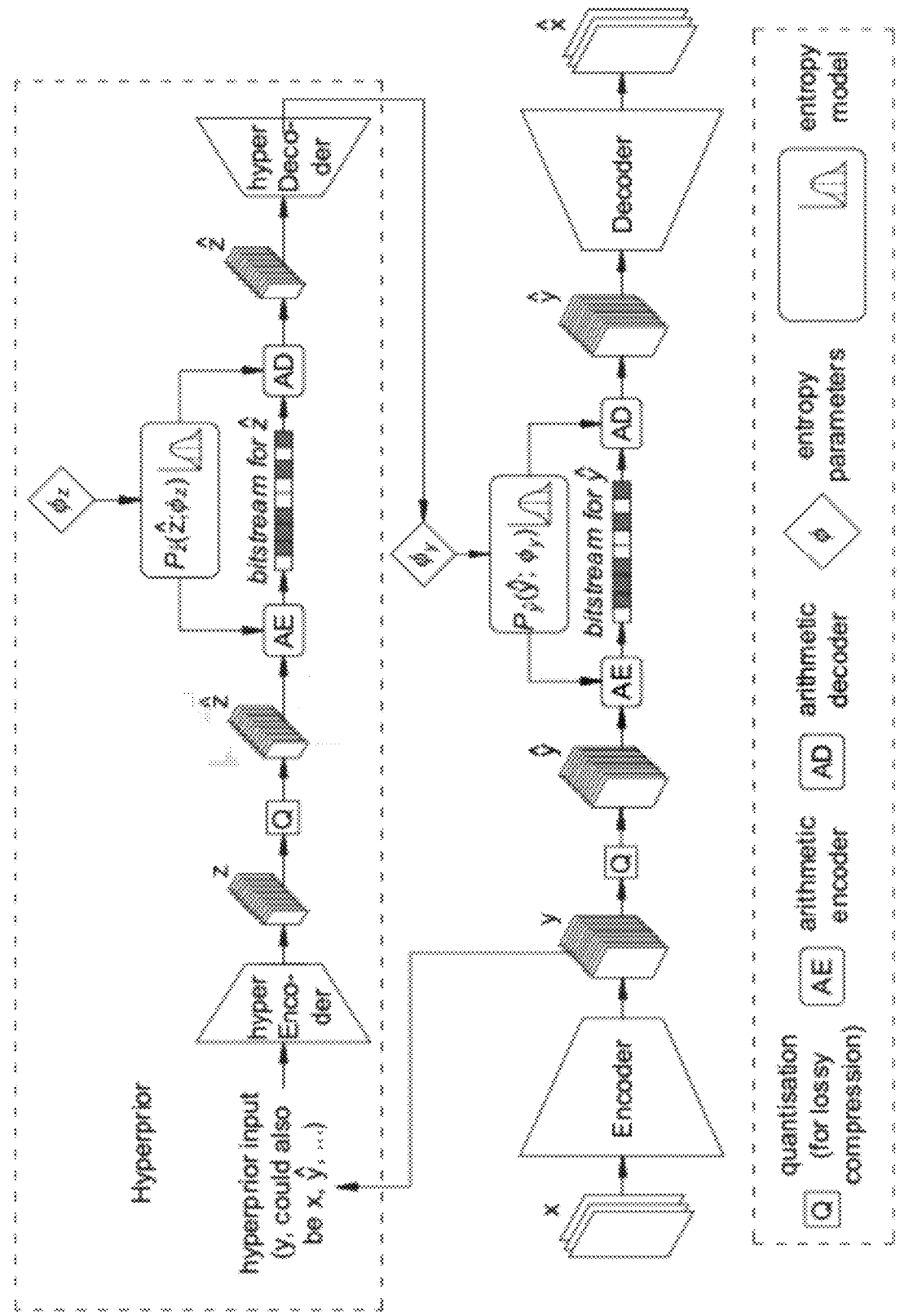

FIG. 123 shows an example structure of an autoencoder with a hyperprior, where hyperlatents 'z' encodes information regarding the latent entropy parameters $\phi_y$. The model optimises over the parameters of the hyperencoder and hyperdecoder, as well as hyperlatent entropy parameters $\phi_z$.

Figure 124:
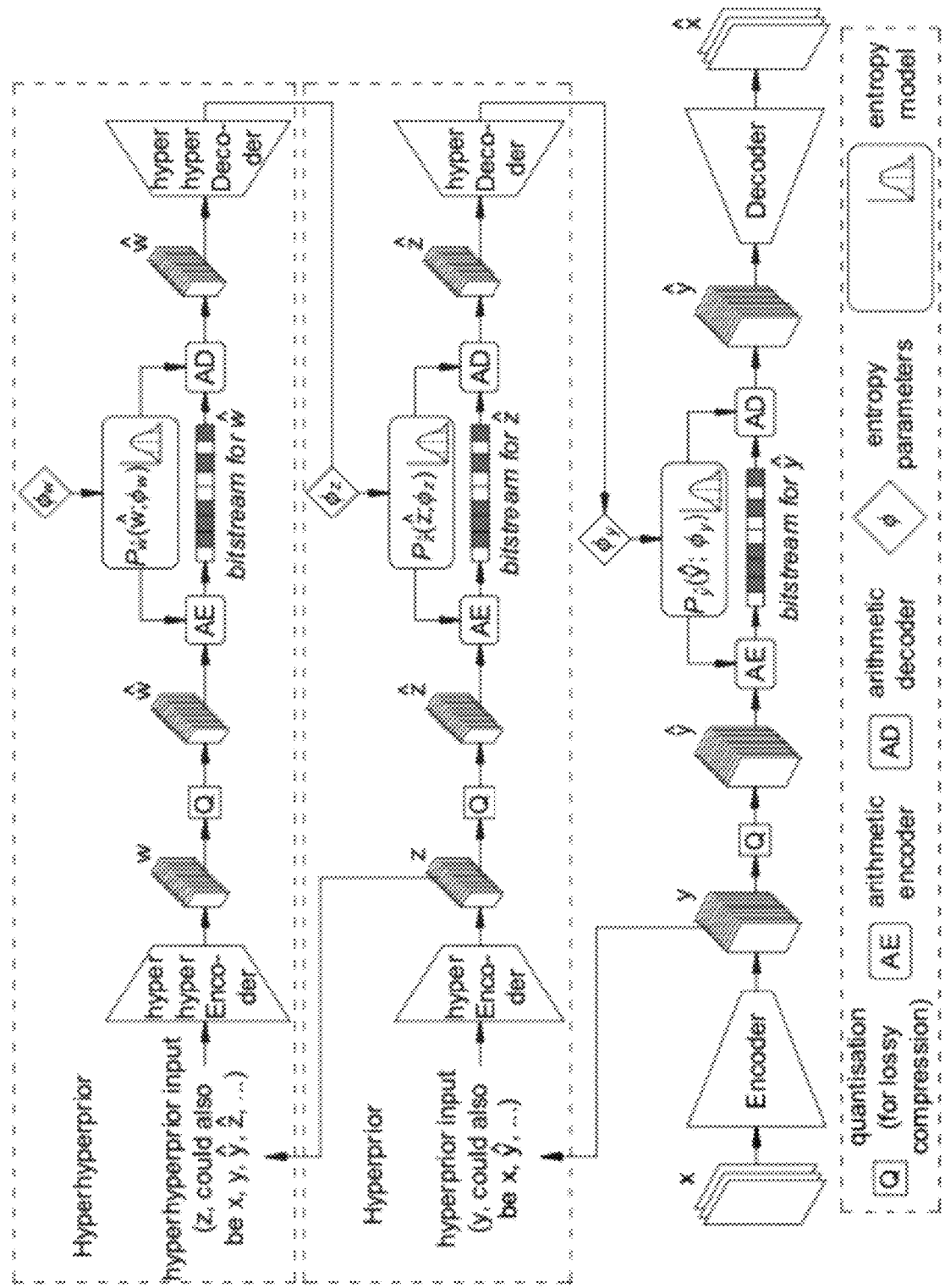

FIG. 124 shows an example structure of an autoencoder with a hyperprior and a hyperhyperprior, where hyperhyperlatents 'w' encodes information regarding the latent entropy parameters $\phi_z$, which in turn allows for the encoding/decoding of the hyperlatents 'z'. The model optimises over the parameters of all relevant encoder/decoder modules, as well as hyperhyperlatent entropy parameters $\phi_w$. Note that this hierarchical structure of hyperpriors can be recursively applied without theoretical limitations.

DETAILED DESCRIPTION

Technology Overview

We provide a high level overview of our artificial intelligence (AI)-based (e.g. image and/or video) compression technology.

In general, compression can be lossless, or lossy. In lossless compression, and in lossy compression, the file size is reduced. The file size is sometimes referred to as the "rate".

But in lossy compression, it is possible to change what is input. The output image $\hat{x}$ after reconstruction of a bitstream relating to a compressed image is not the same as the input image x. The fact that the output image $\hat{x}$ may differ from the input image x is represented by the hat over the "x". The difference between x and i may be referred to as "distortion", or "a difference in image quality". Lossy compression may be characterized by the "output quality", or "distortion".

Although our pipeline may contain some lossless compression, overall the pipeline uses lossy compression.

Usually, as the rate goes up, the distortion goes down. A relation between these quantities for a given compression scheme is called the "rate-distortion equation". For example, a goal in improving compression technology is to obtain reduced distortion, for a fixed size of a compressed file, which would provide an improved rate-distortion equation. For example, the distortion can be measured using the mean square error (MSE) between the pixels of x and $\hat{x}$, but there are many other ways of measuring distortion, as will be clear to the person skilled in the art. Known compression and decompression schemes include for example, JPEG, JPEG2000, AVC, IHEVC, AVI.

Our approach includes using deep learning and AI to provide an improved compression and decompression scheme, or improved compression and decompression schemes.

In an example of an artificial intelligence (AI)-based compression process, an input image x is provided. There is provided a neural network characterized by a function E( . . . ) which encodes the input image x. This neural network E( . . . ) produces a latent representation, which we call y. The latent representation is quantized to provide $\hat{y}$, a quantized latent. The quantized latent goes to another neural network characterized by a function D( . . . ) which is a decoder. The decoder provides an output image, which we call $\hat{x}$. The quantized latent $\hat{y}$ is entropy-encoded into a bitstream.

For example, the encoder is a library which is installed on a user device, e.g. laptop computer, desktop computer, smart phone. The encoder produces the y latent, which is quantized to $\hat{y}$, which is entropy encoded to provide the bitstream, and the bitstream is sent over the internet to a recipient device. The recipient device entropy decodes the bitstream to provide $\hat{y}$, and then uses the decoder which is a library installed on a recipient device (e.g. laptop computer, desktop computer, smart phone) to provide the output image $\hat{x}$.

E may be parametrized by a convolution matrix $\theta$ such that $y=E_\theta(x)$.

D may be parametrized by a convolution matrix $\Omega$ such that $\hat{x}=D_\Omega(\hat{y})$.

We need to find a way to learn the parameters $\theta$ and $\Omega$ of the neural networks.

The compression pipeline may be parametrized using a loss function L. In an example, we use back-propagation of gradient descent of the loss function, using the chain rule, to update the weight parameters of $\theta$ and $\Omega$ of the neural networks using the gradients $\partial L/\partial w$.

The loss function is the rate-distortion trade off. The distortion function is $\mathcal{D}$ (x, $\hat{x}$), which produces a value, which is the loss of the distortion $L_\mathcal{D}$. The loss function can be used to back-propagate the gradient to train the neural networks.

So for example, we use an input image, we obtain a loss function, we perform a backwards propagation, and we train the neural networks. This is repeated for a training set of input images, until the pipeline is trained. The trained neural networks can then provide good quality output images.

An example image training set is the KODAK image set (e.g. at www.cs.albany.edu/~xypan/research/snr/Kodak.html). An example image training set is the IMAX image set. An example image training set is the Image-net dataset (e.g. at www.image-net.org/download). An example image training set is the CLIC Training Dataset P ("professional") and M ("mobile") (e.g. at http://challenge.compression.cc/tasks/).

In an example, the production of the bitstream from y is lossless compression.

Based on Shannon entropy in information theory, the minimum rate (which corresponds to the best possible lossless compression) is the sum from i=1 to N of $(p_{\hat{y}}(\hat{y}_i)*\log_2(p_{\hat{y}}(\hat{y}_i)))$ bits, where $p_{\hat{y}}$ is the probability of $\hat{y}$, for different discrete $\hat{y}$ values $\hat{y}_i$, where $\hat{y}=\{\hat{y}_1, \hat{y}_2 \ldots \hat{y}_N\}$, where we know the probability distribution p. This is the minimum file size in bits for lossless compression of $\hat{y}$.

Various entropy encoding algorithms are known, e.g. range encoding/decoding, arithmetic encoding/decoding.

In an example, entropy coding EC uses $\hat{y}$ and $p_{\hat{y}}$ to provide the bitstream. In an example, entropy decoding ED takes the bitstream and $p_{\hat{y}}$ and provides $\hat{y}$. This example coding/decoding process is lossless.

How can we get filesize in a differentiable way? We use Shannon entropy, or something similar to Shannon entropy. The expression for Shannon entropy is fully differentiable. A neural network needs a differentiable loss function. Shannon entropy is a theoretical minimum entropy value. The entropy coding we use may not reach the theoretical minimum value, but it is expected to reach close to the theoretical minimum value.

In the pipeline, the pipeline needs a loss that we can use for training, and the loss needs to resemble the rate-distortion trade off.

A loss which may be used for neural network training is Loss=$\mathcal{D}+\lambda *R$, where $\mathcal{D}$ is the distortion function, $\lambda$ is a weighting factor, and R is the rate loss. R is related to entropy. Both $\mathcal{D}$ and R are differentiable functions.

There are some problems concerning the rate equation.

The Shannon entropy H gives us some minimum file size as a function of $\hat{y}$ and $p_{\hat{y}}$ i.e. $H(\hat{y}, p_{\hat{y}})$. The problem is how can we know $p_{\hat{y}}$, the probability distribution of the input? Actually, we do not know $p_{\hat{y}}$. So we have to approximate $p_{\hat{y}}$. We use $q_{\hat{y}}$ as an approximation to $p_{\hat{y}}$. Because we use $q_{\hat{y}}$ instead of $p_{\hat{y}}$, we are instead evaluating a cross entropy rather than an entropy. The cross entropy $CE(\hat{y}, q_{\hat{y}})$ gives us the minimum filesize for $\hat{y}$ given the probability distribution $q_{\hat{y}}$.

There is the Relation $$H(\hat{y},p_{\hat{y}})=CE(\hat{y},q_{\hat{y}})+KL(p_{\hat{y}}\|q_{\hat{y}})$$

Where KL is the Kullback-Leibler divergence between $p_{\hat{y}}$ and $q_{\hat{y}}$. The KL is zero, if $p_{\hat{y}}$ and $q_{\hat{y}}$ are identical.

In a perfect world we would use the Shannon entropy to train the rate equation, but that would mean knowing $p_{\hat{y}}$, which we do not know. We only know $q_{\hat{y}}$, which is an assumed distribution.

So to achieve small file compression sizes, we need $q_{\hat{y}}$ to be as close as possible to $p_{\hat{y}}$. One category of our inventions relates to the $q_{\hat{y}}$ we use.

In an example, we assume $q_{\hat{y}}$ is a factorized parametric distribution.

One of our innovations is to make the assumptions about $q_{\hat{y}}$ more flexible. This can enable ay to better approximate $p_{\hat{y}}$, thereby reducing the compressed filesize.

As an example, consider that $p_{\hat{y}}$ is a multivariate normal distribution, with a mean $\mu$ vector and a covariant matrix $\Sigma$. $\Sigma$ has the size N×N, where N is the number of pixels in the latent space. Assuming $\hat{y}$ with dimensions 1×12×512×512 (relating to images with e.g. 512×512 pixels), then $\Sigma$ has the size 2.5 million squared, which is about 5 trillion, so therefore there are 5 trillion parameters in $\Sigma$ we need to estimate. This is not computationally feasible. So, usually, assuming a multivariate normal distribution is not computationally feasible.

Let us consider $p_{\hat{y}}$, which as we have argued is too complex to be known exactly. This joint probability density function $p(\hat{y})$ can be represented as a conditional probability function, as the second line of the equation below expresses.

$$p(\hat{y}) = p((\hat{y}_1 \hat{y}_2 \ldots \hat{y}_N) = p(\hat{y}_1)*p(\hat{y}_2 | \hat{y}_1)*p(\hat{y}_3 | \{\hat{y}_1, \hat{y}_2\})*\ldots$$

Very often $p(\hat{y})$ is approximated by a factorized probability density function $$p(\hat{y}_1)*p(\hat{y}_2)*p(\hat{y}_3)* \ldots p(\hat{y}_N)$$

The factorized probability density function is relatively easy to calculate computationally. One of our approaches is to start with a q which is a factorized probability density function, and then we weaken this condition so as to approach the conditional probability function, or the joint probability density function $p(\hat{y})$, to obtain smaller compressed filzesizes. This is one of the class of innovations that we have.

Distortion functions $\mathcal{D}(x, \hat{x})$, which correlate well with the human vision system, are hard to identify. There exist many candidate distortion functions, but typically these do not correlate well with the human vision system, when considering a wide variety of possible distortions.

We want humans who view picture or video content on their devices, to have a pleasing visual experience when viewing this content, for the smallest possible file size transmitted to the devices. So we have focused on providing improved distortion functions, which correlate better with the human vision system. Modern distortion functions very often contain a neural network, which transforms the input and the output into a perceptual space, before comparing the input and the output. The neural network can be a generative adversarial network (GAN) which performs some hallucination. There can also be some stabilization. It turns out it seems that humans evaluate image quality over density functions. We try to get $p(\hat{x})$ to match $p(x)$, for example using a generative method eg. a GAN.

Hallucinating is providing fine detail in an image, which can be generated for the viewer, where all the fine, higher spatial frequencies, detail does not need to be accurately transmitted, but some of the fine detail can be generated at the receiver end, given suitable cues for generating the fine details, where the cues are sent from the transmitter.

How should the neural networks E( ... ), D( ... ) look like? What is the architecture optimization for these neural networks? How do we optimize performance of these neural networks, where performance relates to filesize, distortion and runtime performance in real time? There are trade offs between these goals. So for example if we increase the size of the neural networks, then distortion can be reduced, and/or filesize can be reduced, but then runtime performance goes down, because bigger neural networks require more computational resources. Architecture optimization for these neural networks makes computationally demanding neural networks run faster.

We have provided innovation with respect to the quantization function Q. The problem with a standard quantization function is that it has zero gradient, and this impedes training in a neural network environment, which relies on the back propagation of gradient descent of the loss function. Therefore we have provided custom gradient functions, which allow the propagation of gradients, to permit neural network training.

We can perform post-processing which affects the output image. We can include in the bitstream additional information. This additional information can be information about the convolution matrix $\Omega$, where D is parametrized by the convolution matrix $\Omega$.

The additional information about the convolution matrix $\Omega$ can be image-specific. An existing convolution matrix can be updated with the additional information about the convolution matrix $\Omega$, and decoding is then performed using the updated convolution matrix.

Another option is to fine tune the y, by using additional information about E. The additional information about E can be image-specific.

The entropy decoding process should have access to the same probability distribution, if any, that was used in the entropy encoding process. It is possible that there exists some probability distribution for the entropy encoding process that is also used for the entropy decoding process. This probability distribution may be one to which all users are given access; this probability distribution may be included in a compression library; this probability distribution may be included in a decompression library. It is also possible that the entropy encoding process produces a probability distribution that is also used for the entropy decoding process, where the entropy decoding process is given access to the produced probability distribution. The entropy decoding process may be given access to the produced probability distribution by the inclusion of parameters characterizing the produced probability distribution in the bitstream. The produced probability distribution may be an image-specific probability distribution.

Figure 1:
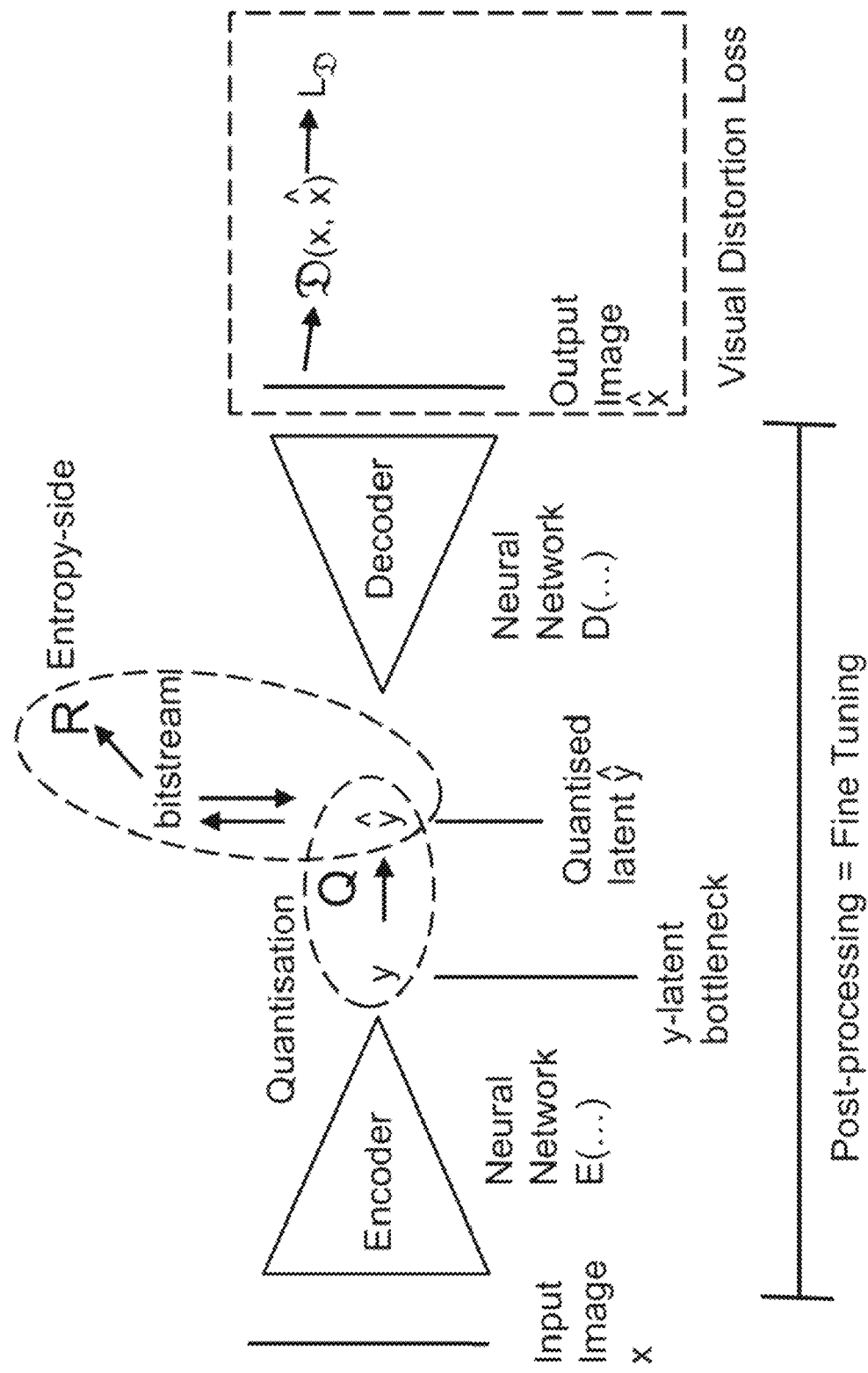
FIG. 1 shows a schematic diagram of an artificial intelligence (AI)-based compression process, including encoding an input image x using a neural network E( . . . ), and decoding using a neural network D( . . . ), to provide an output image x̂. Runtime issues are relevant to the Encoder. Runtime issues are relevant to the Decoder. Examples of issues of relevance to parts of the process are identified.

FIG. 1 shows a schematic diagram of an artificial intelligence (AI)-based compression process, including encoding an input image x using a neural network, and decoding using a neural network, to provide an output image $\hat{x}$.

In an example of a layer in an encoder neural network, the layer includes a convolution, a bias and an activation function. In an example, four such layers are used.

In an example, we assume that q, is a factorized normal distribution, where $y=\{y_1, y_2 \ldots y_N\}$, and $\hat{y}=\{\hat{y}_1, \hat{y}_2 \ldots \hat{y}_N\}$. We assume each $\hat{y}_i$ (i=1 to N) follows a normal distribution N e.g. with a mean μ of zero and a standard deviation σ of 1. We can define $\hat{y}=Int(y-\mu)+\mu$, where Int( ) is integer rounding.

The rate loss in the quantized latent space comes from, summing (Σ) from i=1 to N, Rate=$(\Sigma \log_2(q_{\hat{y}}(\hat{y}_i)))/N=(\Sigma N(\hat{y}_i|\mu=0,\sigma=1))/N$ The output image $\hat{x}$ can be sent to a discriminator network, e.g. a GAN network, to provide scores, and the scores are combined to provide a distortion loss.

We want to make the $q_{\hat{y}}$ flexible so we can model the $p_{\hat{y}}$ better, and close the gap between the Shannon entropy and the cross entropy. We make the q more flexible by using meta information. We have another neural network on our y latent space which is a hyper encoder. We have another latent space called z, which is quantized to $\hat{z}$. Then we decode the z latent space into distribution parameters such as μ and σ. These distribution parameters are used in the rate equation.

Now in the more flexible distribution, the rate loss is, summing (Σ) from i=1 to N, Rate=$(\Sigma N(\hat{y}_i|\mu_i,\sigma_i))/N$ So we make the $q_{\hat{y}}$ more flexible, but the cost is that we must send meta information. In this system, we have bitstream$_{\hat{y}}=EC(\hat{y},q_{\hat{y}}(\mu,\sigma))$ $\hat{y}=ED$(bitstream$_{\hat{y}},q_{\hat{y}}(\mu,\sigma)$)

Here the z latent gets its own bitstream$_{\hat{z}}$ which is sent with bitstream$_{\hat{y}}$. The decoder then decodes bitstream$_{\hat{z}}$ first, then executes the hyper decoder, to obtain the distribution parameters (μ, σ), then the distribution parameters (μ, σ) are used with bitstream$_{\hat{y}}$ to decode the $\hat{y}$, which are then executed by the decoder to get the output image $\hat{x}$.

Although we now have to send bitstream$_{\hat{z}}$, the effect of bitstream$_{\hat{z}}$ is that it makes bitstream$_{\hat{y}}$ smaller, and the total of the new bitstream$_{\hat{y}}$ and bitstream$_{\hat{z}}$ is smaller than bitstream$_{\hat{y}}$ without the use of the hyper encoder. This is a powerful method called hyperprior, and it makes the entropy model more flexible by sending meta information. The loss equation becomes Loss=$\mathcal{D}(x,\hat{x})+\lambda_1 *R_y+\lambda_2 *R_z$ It is possible further to use a hyper hyper encoder for z, optionally and so on recursively, in more sophisticated approaches.

The entropy decoding process of the quantized z latent should have access to the same probability distribution, if any, that was used in the entropy encoding process of the quantized z latent. It is possible that there exists some probability distribution for the entropy encoding process of the quantized z latent that is also used for the entropy decoding process of the quantized z latent. This probability distribution may be one to which all users are given access; this probability distribution may be included in a compression library; this probability distribution may be included in a decompression library. It is also possible that the entropy encoding process of the quantized z latent produces a probability distribution that is also used for the entropy decoding process of the quantized z latent, where the entropy decoding process of the quantized z latent is given access to the produced probability distribution. The entropy decoding process of the quantized z latent may be given access to the produced probability distribution by the inclusion of parameters characterizing the produced probability distribution in the bitstream. The produced probability distribution may be an image-specific probability distribution.

Figure 2:
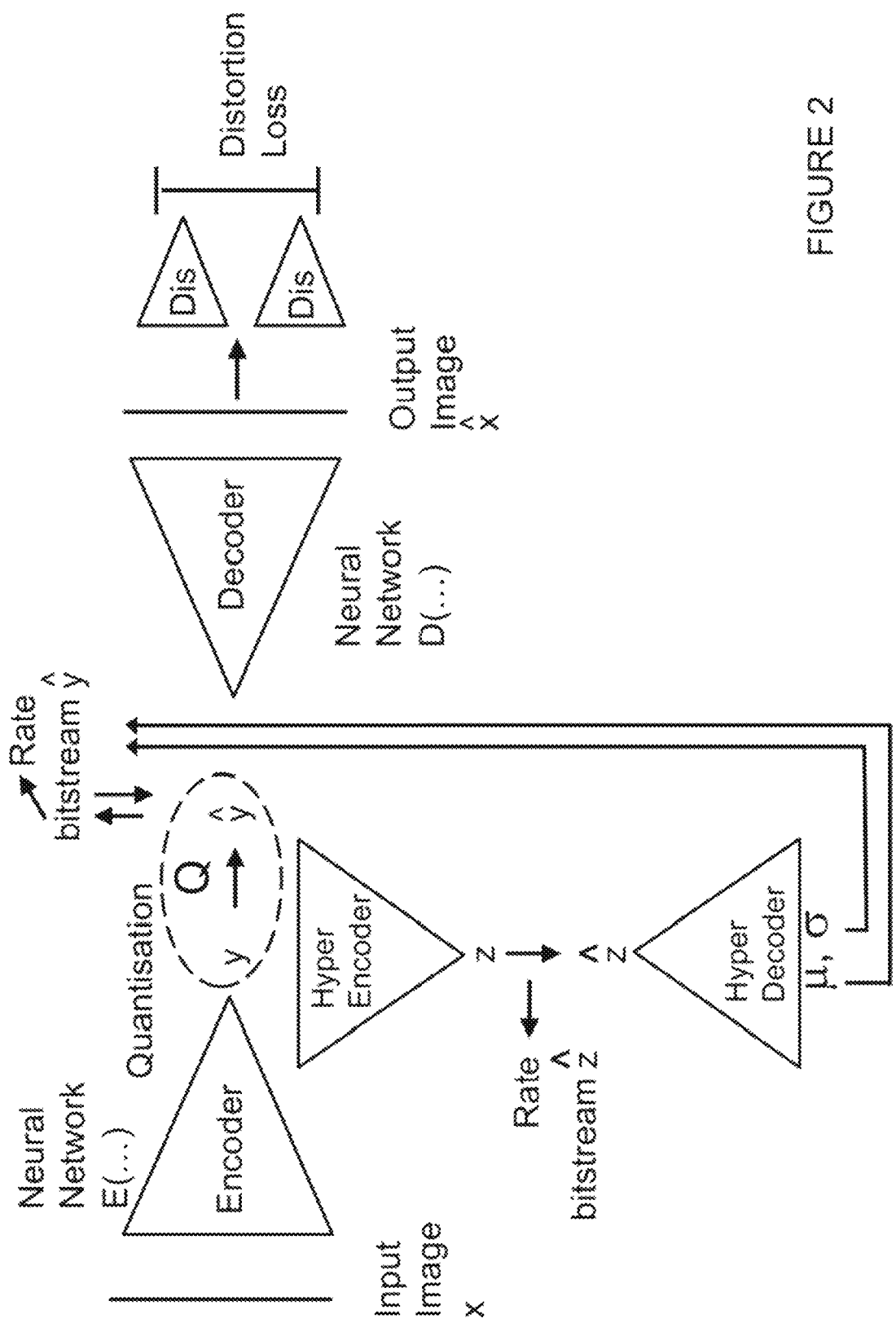
FIG. 2 shows a schematic diagram of an artificial intelligence (AI)-based compression process, including encoding an input image x using a neural network E( . . . ), and decoding using a neural network D( . . . ), to provide an output image x̂, and in which there is provided a hyper encoder and a hyper decoder. "Dis" denotes elements of a discriminator network.

FIG. 2 shows a schematic diagram of an artificial intelligence (AI)-based compression process, including encoding an input image x using a neural network, and decoding using a neural network, to provide an output image $\hat{x}$, and in which there is provided a hyper encoder and a hyper decoder.

In a more sophisticated approach, the distortion function $\mathcal{D}(x, \hat{x})$ has multiple contributions. The discriminator networks produce a generative loss $L_{GEN}$. For example a Visual Geometry Group (VGG) network may be used to process x to provide m, and to process $\hat{x}$ to provide $\hat{m}$, then a mean squared error (MSE) is provided using m and $\hat{m}$ as inputs, to provide a perceptual loss. The MSE using x and $\hat{x}$ as inputs, can also be calculated. The loss equation becomes Loss=$\lambda_1 *R_y+\lambda_2 *R_z+\lambda_3 *MSE(x,\hat{x})+\lambda_4 *L_{GEN}+\lambda_5 * VGG(x,\hat{x})$, where the first two terms in the summation are the rate loss, and where the final three terms in the summation are the distortion loss $\mathcal{D}(x, \hat{x})$. Sometimes there can be additional regularization losses, which are there as part of making training stable.

Notes Re HyperPrior and HyperHyperPrior

Regarding a system or method not including a hyperprior, if we have a y latent without a HyperPrior (i.e. without a third and a fourth network), the distribution over the y latent used for entropy coding is not thereby made flexible. The HyperPrior makes the distribution over the y latent more flexible and thus reduces entropy/filesize. Why? Because we can send y-distribution parameters via the HyperPrior. If we use a HyperPrior, we obtain a new, z, latent. This z latent has the same problem as the "old y latent" when there was no hyperprior, in that it has no flexible distribution. However, as the dimensionality re z usually is smaller than re y, the issue is less severe.

We can apply the concept of the HyperPrior recursively and use a HyperHyperPrior on the z latent space of the HyperPrior. If we have a z latent without a HyperHyperPrior (i.e. without a fifth and a sixth network), the distribution over the z latent used for entropy coding is not thereby made flexible. The HyperHyperPrior makes the distribution over the z latent more flexible and thus reduces entropy/filesize. Why? Because we can send z-distribution parameters via the HyperHyperPrior. If we use the HyperHyperPrior, we end up with a new w latent. This w latent has the same problem as the "old z latent" when there was no hyperhyperprior, in that it has no flexible distribution. However, as the dimensionality re w usually is smaller than re z, the issue is less severe. An example is shown in FIG. 124.

The above-mentioned concept can be applied recursively. We can have as many HyperPriors as desired, for instance:

a HyperHyperPrior, a HyperHyperHyperPrior, a HyperHyperHyperHyperPrior, and so on.

Notes Re Training

Regarding seeding the neural networks for training, all the neural network parameters can be randomized with standard methods (such as Xavier Initialization). Typically, we find that satisfactory results are obtained with sufficiently small learning rates.

Note

It is to be understood that the arrangements referenced herein are only illustrative of the application for the principles of the present inventions. Numerous modifications and alternative arrangements can be devised without departing from the spirit and scope of the present inventions. While the present inventions are shown in the drawings and fully described with particularity and detail in connection with what is presently deemed to be the most practical and preferred examples of the inventions, it will be apparent to those of ordinary skill in the art that numerous modifications can be made without departing from the principles and concepts of the inventions as set forth herein.

1. HVS Inspired Variable Loss Segmentation for Learnt Image & Video Compression

1.1 Introduction

Within the domain of learnt image and video compression, progress may be essentially measured jointly by two orthogonal metrics: perceptual quality and the compression factor of images. Perceptual quality can be hard to measure; a function for it may be completely intractable. Nevertheless, it is well known that the sensitivity of the human visual system (HVS) to different attributes in images, such as textures, colours and various objects, are different-humans are more likely to be able to identify an alteration performed to a human face compared to a patch of grass. By producing segments of images to which the HVS is more or less sensitive we can therefore improve the overall perceptual experience of the compressed media by optimising the learnt compression pipeline to follow heuristics from the HVS. We provide a modifications to the learnt compression pipeline that utilises a generic family of segmentation based approaches to allow the optimisation of the learnt compression network to more closely follow the heuristics of the HVS, achieving better perceptual quality at the same or at a higher compression factor.

Modern machine learning algorithms are optimised using a method called stochastic gradient descent. This method allows us to update the parameters of our model to a user-specific, desired goal. The goal is controlled by defining a loss-function that the network uses for backpropagation. Every parameter in the network is updated such that the loss is decreased as the network trains. In typical compression networks the same loss $\mathcal{L}$ is applied to the entire image, see Equation (1.1).

1.1.1 Loss Function

The loss function within learnt compression can in its simplest form be considered to be composed of two different terms: one term that controls the distortion of the compressed image or video, D, and another term that controls the size of the compressed media (rate) R which is typically measured as the number of bits required per pixel (bpp). An uncompressed image requires 24 bpp, most compressed images are below 0.5 bpp. The $\lambda$ parameter controls the trade-off between the size of the image and the compression distortions. For example, in the extreme case that $\lambda=10^6$, the value of R can become very large (lossless compression), since $\lambda D$ will be very large. In the other extreme $\lambda=10^{-6}$, the network will be forced to learn such that R becomes very small (since $\lambda D$ is already minuscule).

$$\mathcal{L} = R + \lambda D \tag{1.1}$$

In the standard learnt compression pipelines for image and video, Equation (1.1) is applied to train the network: $\mathcal{L}$ is minimised. However a key question in the equation above is how the distortion D is estimated. Almost universally, the distortion of the media D, is computed in the same way across the entire image or video. Similarly, the constraint on the size R is computed the same for the entire image. Intuitively, it should be clear that some parts of the image should be assigned more bits, and some regions of the image should be prioritised in terms of image quality.

The reason for this intuition comes from the human visual system (HVS). It has been shown that humans are more susceptible to image degradations (such as compression artifacts) introduced in parts of the image that are more visually sensitive to the HVS. For example, the degradation of human faces or low frequency areas in the image are more noticeable to the HVS, and is therefore more likely to reduce the perceptual quality of the media. A mechanism of improving perceptual quality is thus to optimise parts of the image with different losses. To do this, we provide a generic modifications to the learnt compression pipeline powered by image segmentation operations, to compute dynamic losses optimised for the HVS.

1.1.2 Image Segmentation

In this section, a short introduction to the meaning of image segmentation within the field of computer vision is provided.

Figure 3:
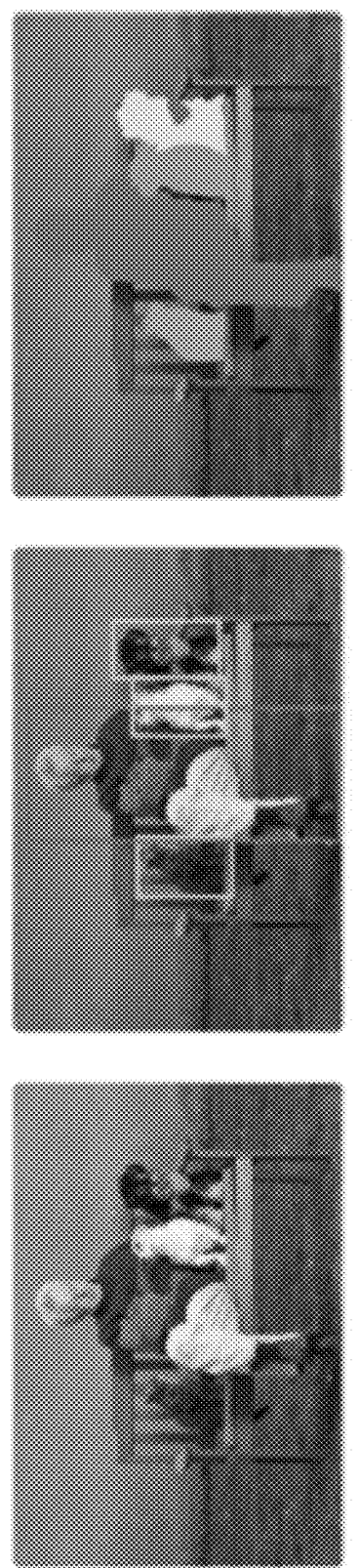
FIG. 3 shows an example of three types of image segmentation approaches: classification, object detection, and instance segmentation.

In the field of computer vision, image segmentation is a process that involves dividing a visual input into different segments based on some type of image analysis. Segments represent object or parts of objects, and comprise sets or groups of pixels. Image segmentation is a method of grouping pixels of the input into larger components. In the computer vision there are many different methods in which the segmentation may be performed to generate a grouping of pixels. A non-exhaustive list is provided below to provide examples:

1. Classification Based: the entire image is grouped into a certain type, e.g. this is an image of a person, this is an image of a dog, or this is an outdoors scene.
2. Object Detection Based: based on images detected and identified in the image, bounding boxes can be drawn around each object. Each bounding box around the identified object now represents a segment.
3. Segmentation: segmentation here refers to the process of identifying which pixels in the image belongs to a particular class. There are two major types of segmentation:
   (a) Semantic: classifies all pixels of an image into different classes.
   (b) Instance: for each object that is identified in an image, the pixels that belong to each object are grouped separately. This is different from semantic segmentation, where all objects of a particular class (e.g. all cats) will be assigned the same group. For instance segmentation, each cat is assigned its own segment or group as in (C) in the FIG. 3, where each dog has its own segment.

The segmented images are typically produced by a neural network. However for the pipeline presented here, the segmentation operator can be completely generic.

1.2 An Innovation

1.2.1 Image Segmentation for Perceptual Compression

Figure 4:
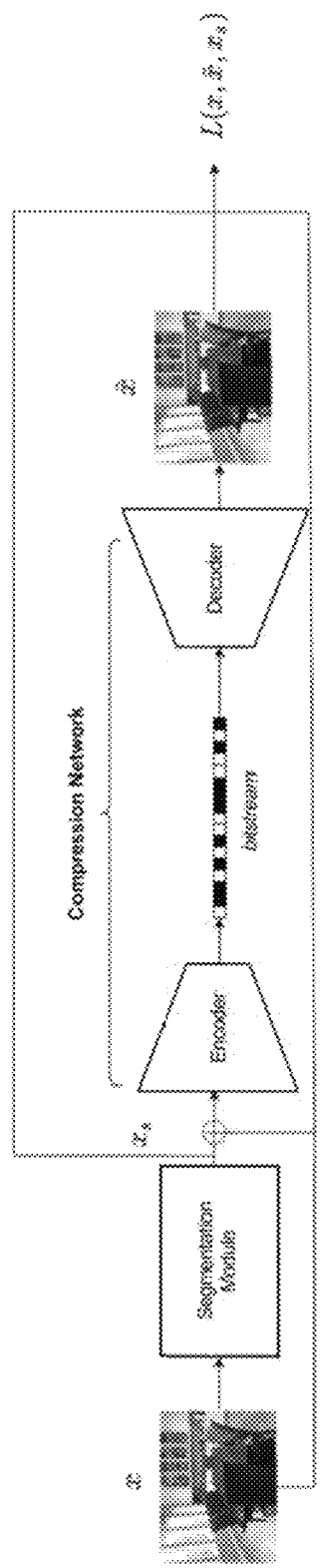
FIG. 4 shows an example of a generic segmentation and compression pipeline which sends the image through a segmentation module to produce a useful segmented image. The output of the segmentation pipeline is provided into the compression pipeline and also used in the loss computation for the network. The compression pipeline has been generalised and simplified into two individual modules called the Encoder and Decoder which may in turn be composed of submodules.

An example of a generic pipeline is shown in FIG. 4. There are two separate processes shown in the figure. Firstly, the segmentation operation and transformation. This process segments the image using some mechanism and may optionally apply an additional transformation to the segmented data. The segmented image and the output of the segmented operation is used as an input to the compression network. During the training of the learnt compression pipeline the loss function can therefore be modified to take the segmentation input into consideration.

The loss function shown above in Equation (1.1) can therefore be modified as follows:

$$\mathcal{L} = \sum_i^n c_i(R_i + \lambda_i D_i) \quad (1.2)$$

where n refers to the number of segments in the image, $R_i$ is the rate for a particular segment, $D_i$ is the distortion for a particular segment, $\lambda_i$ is the Lagrange multiplier and $c_i$ a constant, for segment i. This means that for each segment i in the image a different method of computing rate R and distortion D can be applied. For example, the distortion metric for texts may utilise an MSE loss, whereas for faces it utilises a mixture of perceptual and adversarial losses.

Furthermore, the computation of $R_i$ means that each segment can have a variable rate. For example, assigning more bits to regions with higher sensitivity for the HVS, such as the faces and texts, or any other salient region in the image, will improve perceptual quality without increasing the total number of bits required for the compressed media.

This generic pipeline has been exemplified with 4 different segmentation approaches in the next section, however it extends to all types of segmentation, in addition to the 4 examples provided, such as clustering based segmentation, region-based segmentation, edge-detection segmentation, frequency based segmentation, any type of neural network powered segmentation approach, etc.

1.2.2 Segmentation Module

Figure 9:
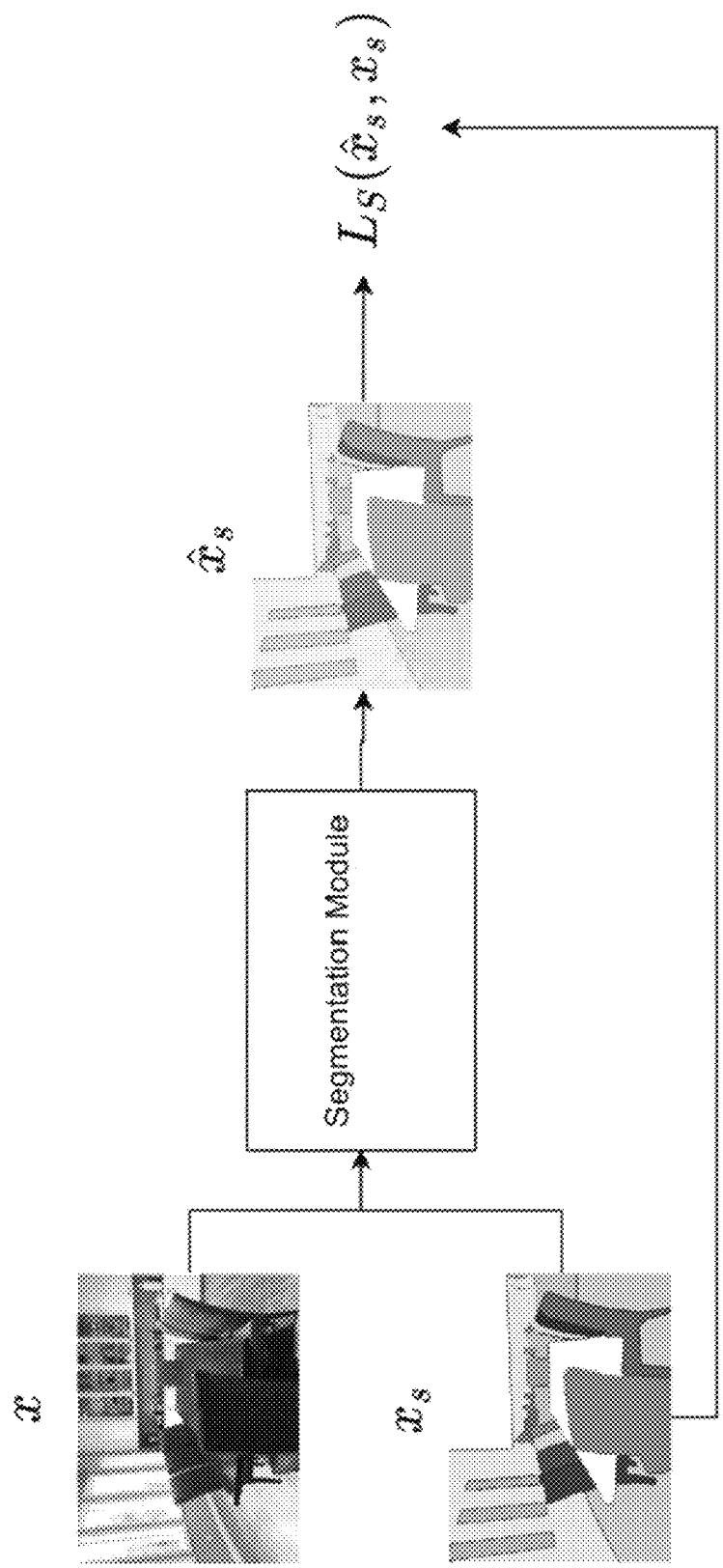
FIG. 9 shows an example pipeline of the training of the Segmentation Module in FIG. 4, if the module is parameterized as a neural network, where $L_S$ is the loss. The segmentation ground truth label $x_s$ may be of any type required by the segmentation algorithm. This figure uses instance segmentation as an example.

The segmentation module in FIG. 4 is a generic component that groups pixels in the input based on some type of algorithm. Non-exhaustive examples of such algorithms were given in the introduction. Training of the segmentation module, if it is parameterised as a neural network, may be performed separately or during the training of the compression network itself—referred to as end-to-end. End-to-end training of the segmentation network together with the compression network may require ground truth labels for the desired segmentation output, or some type of ground truth label that can guide the segmentation module, whilst the compression network is training simultaneously. The training follows the bi-level principle, meaning that gradients from the compression network do not affect the segmentation module training, and the segmentation network gradients do not affect the compression network gradients. Therefore the end-to-end training of the segmentation and the compression network can still be isolated separately in terms of gradient influences. The training of the segmentation network in the end-to-end scheme can thus be visualised as in FIG. 9 (the usage of instance segmentation is only an example, and it may be trained for any type of segmentation task), which replaces the Segmentation Module in FIG. 4. In the bi-level training scheme, the segmentation network is trained, following this the compression network is trained using a segmentation mask from the segmentation module, as shown in Algorithm 1.2.

---

Algorithm 1.1 Pseudocode that outlines the training of the compression network using the output from the segmentation operators. It assumes the existence of 2 functions backpropagate and step. backpropagate will use back-propagation to compute gradients of all parameters with respect to the loss. step performs an optimization step with the selected optimizer. Lastly the existence of a context Without Gradients that ensures gradients for operations within the context are not computed.

---

Parameters:
Segmentation Module: $f_\phi$
Compression Network: $f_\theta$
Compression Network Optimizer: $opt_{f\theta}$
Compression Loss Function: $\mathcal{L}_C$
Input image: $x \in \mathbb{R}^{H \times W \times C}$
Segmentation Network:
Without Gradients:
$\hat{x}_s \leftarrow f_\phi(x)$
Compression Network:
$\hat{x} \leftarrow f_\theta(x, \hat{x}_s)$
backpropagate($\mathcal{L}_C(\hat{x}, x, \hat{x}_s)$)
step($opt_{f\theta}$)

---

Algorithm 1.2 Pseudocode that outlines the training of the compression network and the segmentation module in an end-to-end scenario. It assumes the existence of 2 functions backpropagate and step. backpropagate will use back-propagation to compute gradients of all parameters with respect to the loss. step performs an optimization step with the selected optimizer. Lastly the existence of a context Without Gradients that ensures gradients for operations within the context are not computed.

---

Parameters:
Segmentation Module: $f_\phi$
Segmentation Module Optimizer: $opt_{f\phi}$
Compression Network: $f_\theta$
Compression Network Optimizer: $opt_{f\theta}$
Compression Loss Function: $\mathcal{L}_c$
Segmentation Loss Function: $\mathcal{L}_s$
Input image for compression: $x \in \mathbb{R}^{H \times W \times C}$
Input image for segmentation: $x_s \in \mathbb{R}^{H \times W \times C}$
Segmentation labels: $y_s \in \mathbb{R}^{H \times W \times C}$
Segmentation Network Training:
$\hat{x}_s \leftarrow f_\phi(x_s)$
backpropagate($\mathcal{L}_s(\hat{x}_s, y_s)$)
step($opt_{f\phi}$)
Compression Network:
Without Gradients:
$\hat{x}_s \leftarrow f_\phi(x)$
$\hat{x} \leftarrow f_\theta(x, \hat{x}_s)$
backpropagate($\mathcal{L}_c(\hat{x}_s, x, \hat{x}_s)$)
step($opt_{f\theta}$)

1.2.3 Segmentation Examples

Figure 5:
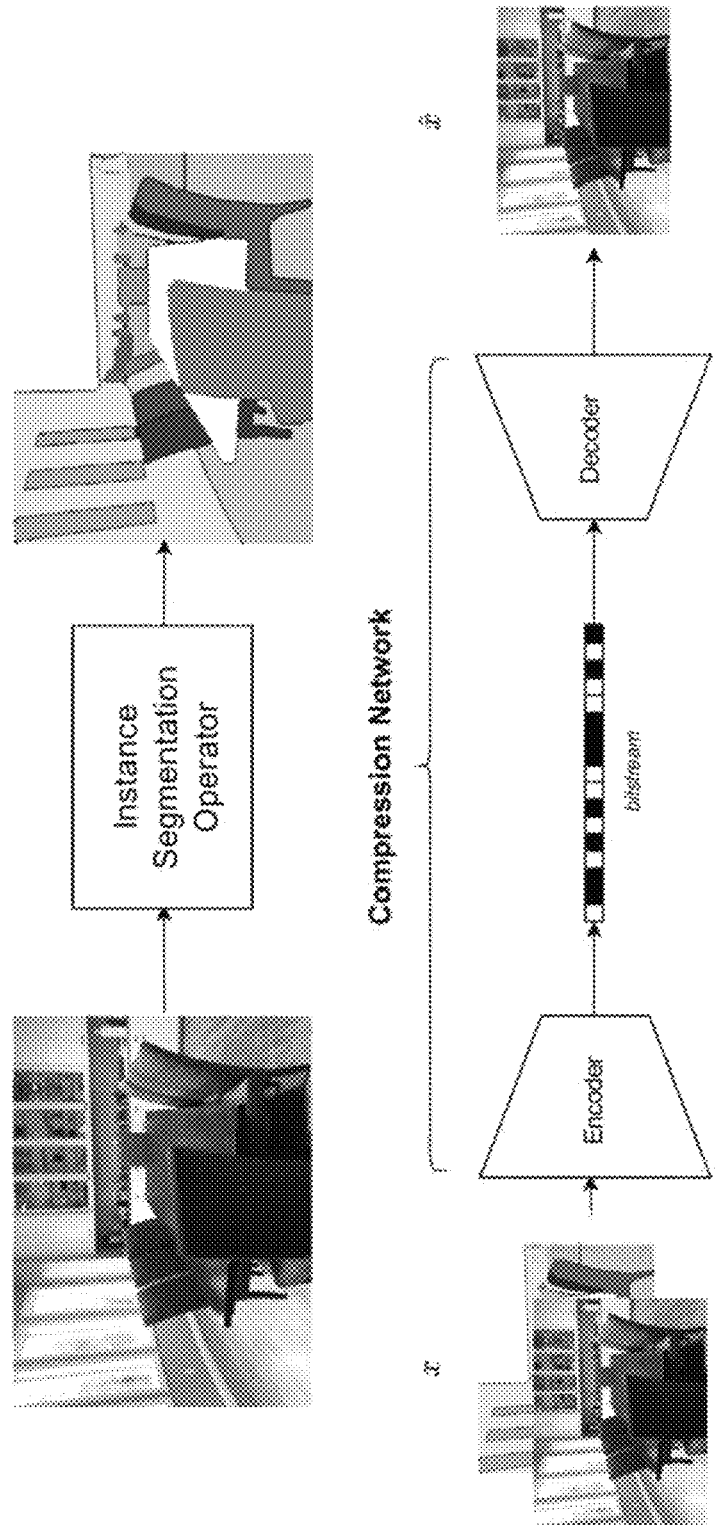
FIG. 5 shows an example of instantiation of the generic segmentation and compression pipeline from FIG. 4 where instance segmentation is utilised.
Figure 6:
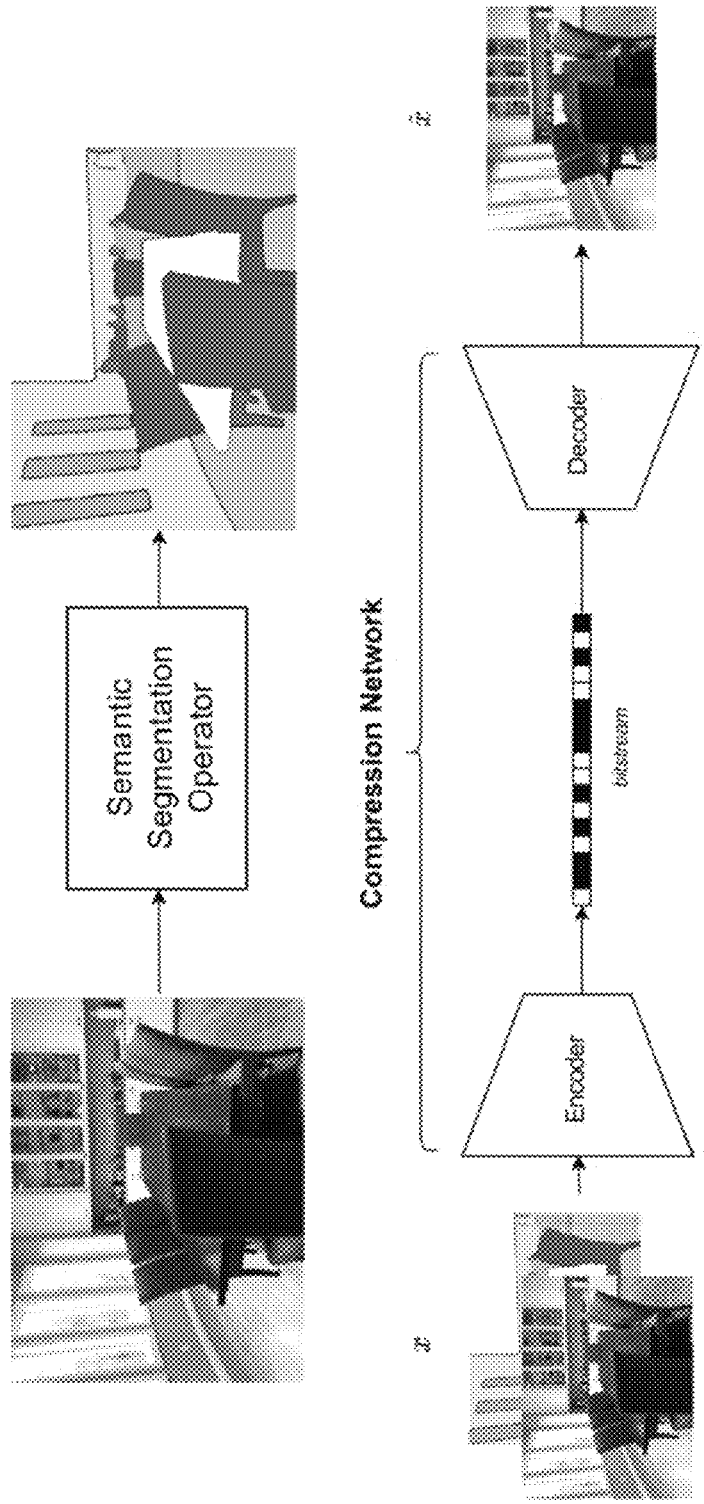
FIG. 6 shows an example of instantiation of the generic segmentation and compression pipeline from FIG. 4 where semantic segmentation is utilised.
Figure 7:
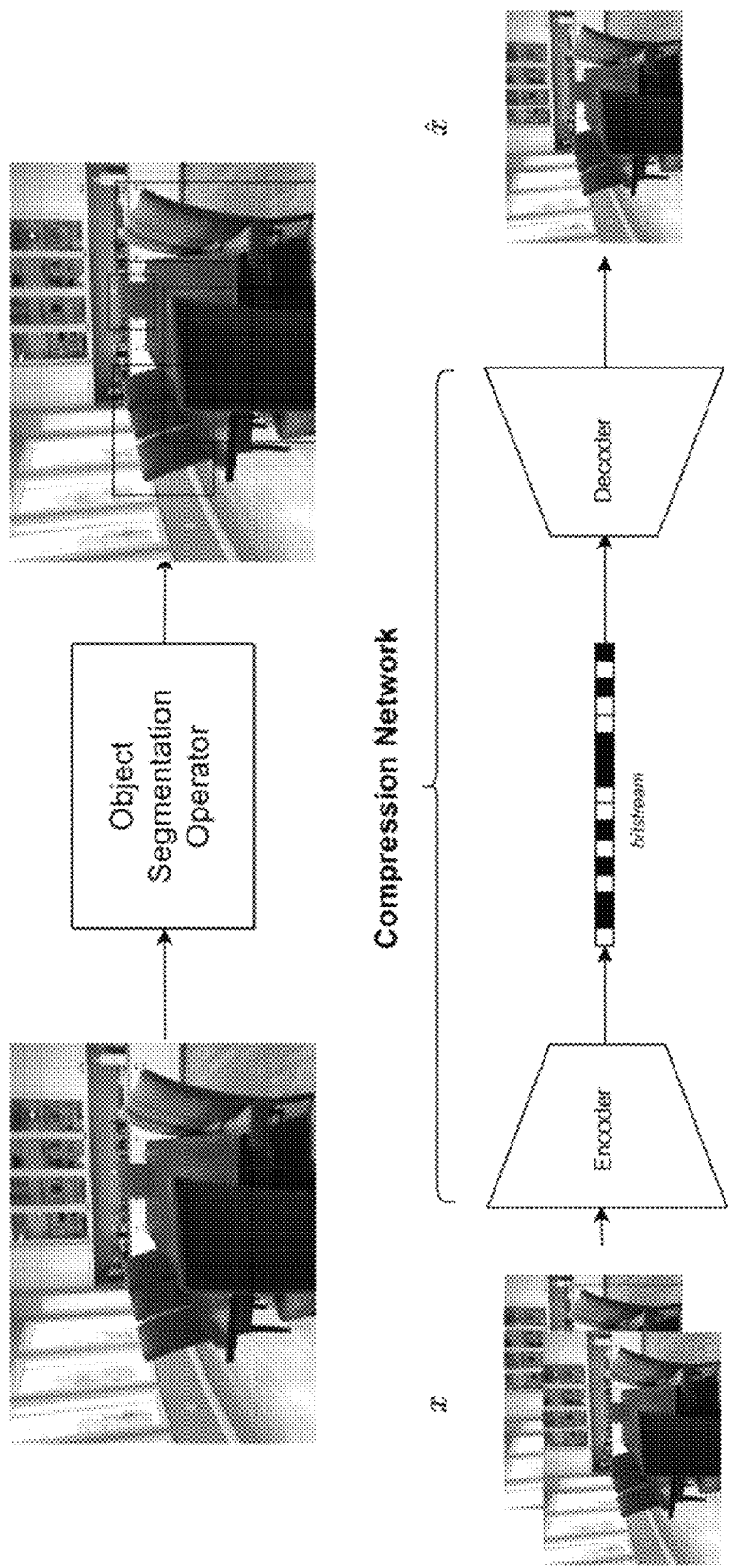
FIG. 7 shows an example of instantiation of the generic segmentation and compression pipeline from FIG. 4 where object segmentation is utilised.
Figure 8:
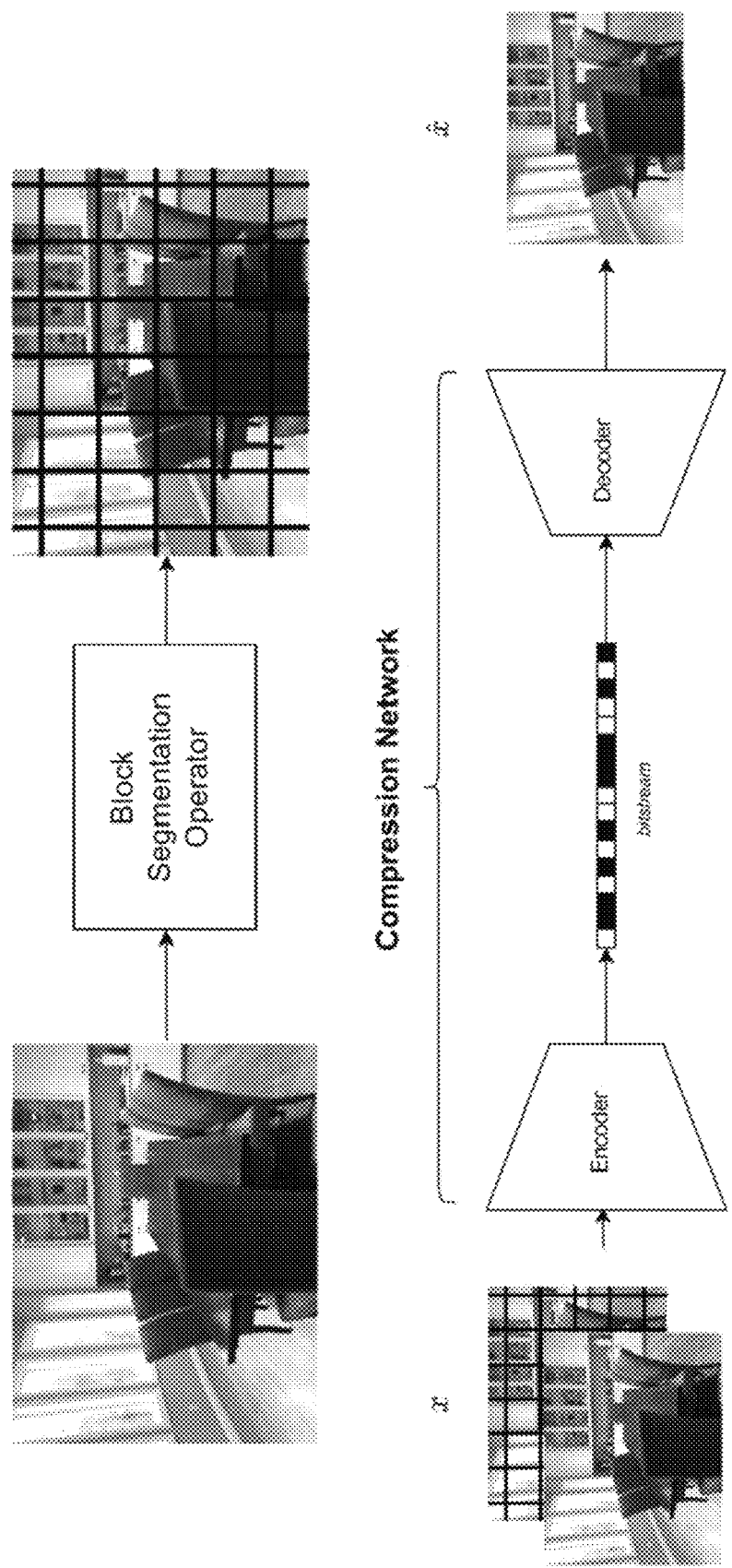
FIG. 8 shows an example of instantiation of the generic segmentation and compression pipeline from FIG. 4 where block-based segmentation is utilised.

In FIG. 5 the segmentation operator uses the instance segmentation method, and in the FIGS. 6, 7, 8 the semantic, object and block based approaches are used. In general, any type of segmentation approach is applicable to this pipeline.

Frequency-Based Transformation

It is well known that the HVS is more sensitive to changes in low frequency regions, such as uniform areas, compared to changes in high frequency regions such as in patches of grass. In general, for most images the majority of high frequencies can be removed within any noticeable difference in the image. Based on this intuition, it is therefore possible to create Just Noticeable Difference (JND) masks, based on segments of frequencies in the image, that indicate which parts of the image are most likely to be noticed by the HVS if distorted. One method by which the masks may be computed is using Algorithm 1.3.

Based on Algorithm 1.3, an example method of producing JND masks, is to use the Discrete Cosine Transform (DCT) and Inverse DCT on the segments from the segmentation operator. The JND masks may then be provided as input into the compression pipeline, for example, as shown in FIG. 4. This segmentation approach allows distortion metrics to be selected to better match the HVS heuristics. For example, an adversarial GAN loss may be applied for high frequency regions, and an MSE for low frequency areas. The method described above that utilises the DCT is a naive approach to produce JND masks; this method is not restricted to that particular realization of Algorithm 1.3 below.

---

Algorithm 1.3 Pseudocode for
computation of JND masks

---

Parameters:
Segmentation Operator: $f_\phi$
JND Transform: jnd, $f : \mathbb{R}^N \to \mathbb{R}^N$
Input Image: $x \in \mathbb{R}^{H \times W \times C}$
JND Heatmaps:
$x_b, m \leftarrow f_\phi(x)$
$x_{jnd} \leftarrow \text{jnd}(x_b)$

---

1.2.4 Loss Function Classifier

Figure 10:
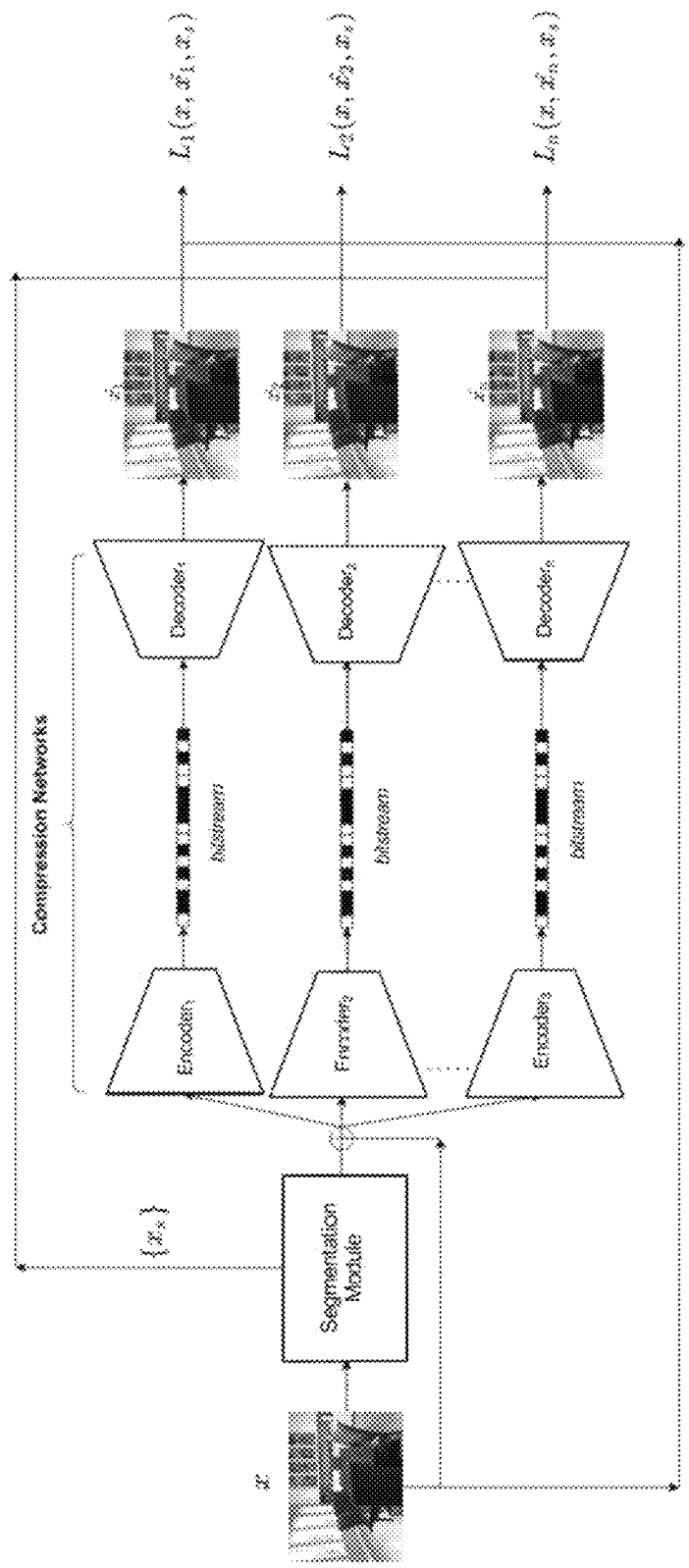
FIG. 10 shows an example training pipeline to produce the segments used to train the classifier as shown in FIG. 11. Each pair of Encoder; Decoder produces patches with a particular loss function $L_i$ which determines the types of compression distortion each compression network produces.
Figure 11:
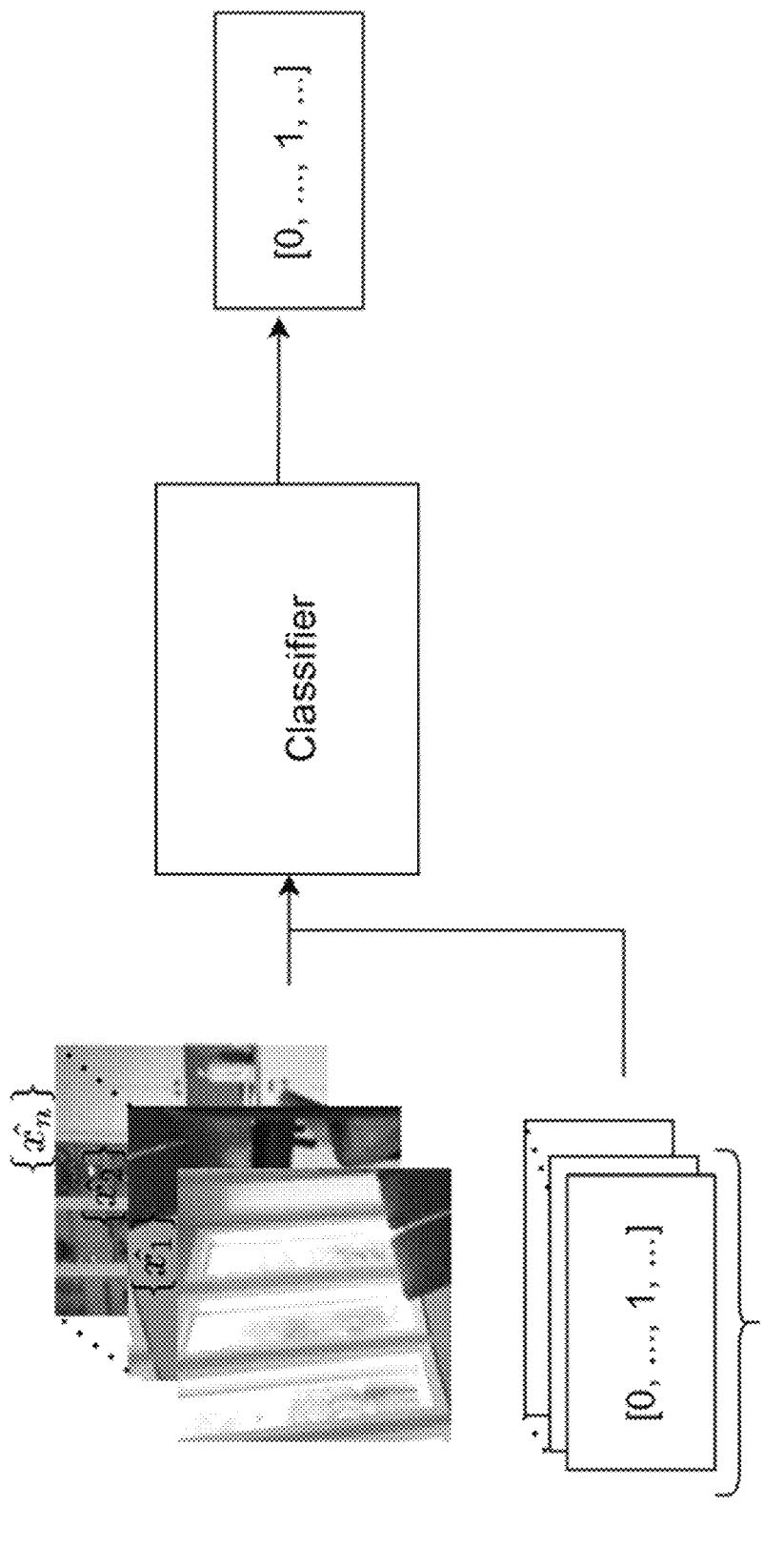
FIG. 11 shows an example of a loss classifier which is trained on the patches produced by the set of networks in FIG. 10. $\{\hat{x}_i\}$ is a set of the same ground truth patch produced by all the n compression networks in FIG. 10 with different losses. The classifier is trained to select the optimal distortion type based on selections performed by humans. The Human Preference Data is collected from a human study. The classifier must learn to select the distortion type preferred by humans.
Figure 12:
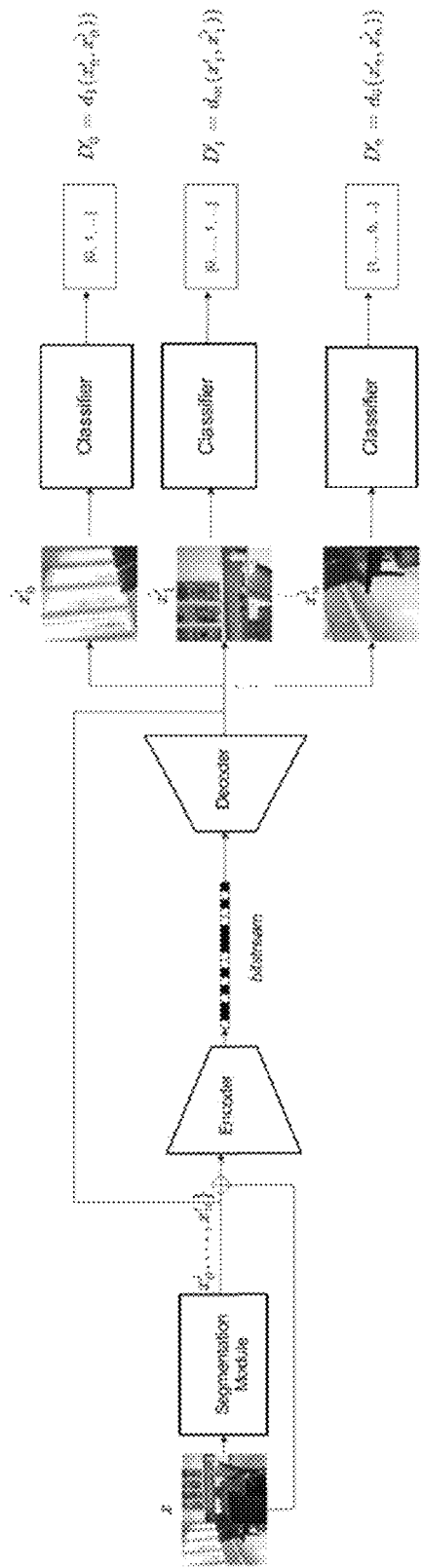
FIG. 12 shows an example of dynamic distortion loss selections for image segments. The trained classifier from FIG. 11 is used to select the optimal distortion type for each image segment. $d_i$ indicates the distortion function and $D_i'$ indicates the distortion loss for patch $\hat{x}$.

A different type of segmentation approach that more directly targets the HVS is to utilise a number of different learnt compression pipelines with distinctly different distortion metrics applied on the same segmentations of the images. Once trained, human raters are asked in a 2AFC selection procedure to indicate which patch from the trained compression pipelines produces the perceptually most pleasing image patch. For example, if there are 4 distortion metrics $\{d_0, d_1, d_2, d_3\}$, there will be 4 predicted patches, $\{\hat{x}_0, \hat{x}_1, \hat{x}_2, \hat{x}_3\}$, one from each metric trained with the different distortion losses $\{L_0, L_1, L_2, L_3\}$, as shown in FIGS. 10 and 12. Given a large number of human raters and large number of image patches, a large dataset with image patches and labels is then formed, where the label indicates which distortion metric is preferred by the HVS for the patch. A neural network classifier is then trained to predict the optimal distortion metric for each patch of the predicted outputs of the learnt compression pipeline, as shown in FIG. 11 for example. Once the classifier has been trained, it can be used to predict optimal distortion losses for individual image segments as shown in FIG. 12 for example.

1.2.5 Colour-Space Segmentation

The image segmentation approaches discussed above segments pixels across the channels within the RGB colour space. However an alternative colour-space representation is known as YCbCr, where Y represents the luma component of the image; CbCr the chroma information of the image. Given a particular distortion metric that only operates on a certain portion of the colour space, a natural segmentation of the total distortion loss of the network is then an expectation of some number of distortion metrics across the colour space, where each component of the colour space may have a different distortion metric. That is, for example, some particular set of distortion metrics may operate on the luma component, whereas some other set may operate on the chroma part. The loss operating on each component has been optimized for the colour space in which it operates (or may not even be applicable outside the given space).

That is, the loss function may be re-written as below $$\mathcal{L} = \sum_i^n R_i + \lambda_i D_i \quad (1.3)$$

where i is now an index into the colour space, where $R_i$, $\lambda_i$ and $D_i$ refer to colour-space specific metrics.

The idea of colour-space segmentation is not limited to RGB and YCbCr, and is easily applied to any colour-space, such as CMYK, scRGB, CIE RGB, YPbPr, xvYCC, HSV, HSB, HSL, HLS, HSI, CIEXYZ, sRGB, ICtCp, CIELUV, CIEUVW, CIELAB, etc, as shown in FIG. 13 for example.

1.2.6 Concepts

1. A classifier trained to identify optimal distortion losses for image or video segments used for to train a learnt image and video compression pipeline
2. Segmentation operator (such as, but not limited to, instance, classification, semantic, object detection) applied or trained in a bi-level fashion with a learnt compression pipeline for images and video to selectively apply losses for each segment during training of the compression network
3. Colour-space segmentation to dynamically apply different losses to different segments of the colour-space

2. Flexible Entropy Modelling of Latent Distributions

2.1 Introduction

Accurate modelling of the true latent distribution is instrumental for minimising the rate term in a dual rate-distortion optimisation objective. A prior distribution imposed on the latent space, the entropy model, optimises over its assigned parameter space to match its underlying distribution, which in turn lowers encoding costs. Thus, the parameter space must be sufficiently flexible in order to properly model the latent distribution; here we provide a range of various methods to encourage flexibility in the entropy model.

In AI-based data compression, an autoencoder is a class of neural network whose parameters are tuned, in training, primarily to perform the following two tasks jointly:

1. Find a compressed latent representation of the input data such that the description of that representation is as short as possible;
2. Given the latent representation of the data, transform it back into its input either exactly (lossless compression) or approximately (lossy compression).

Here we assume a lossy compression pipeline, however it should be noted that many concepts presented here are also applicable in lossless compression. The aforementioned tasks form the framework of a joint optimisation problem of two loss terms commonly found in compression problems, namely the minimisation of metrics representing rate, R(•), and distortion, D(•), respectively. The rate-distortion minimisation objective can mathematically be expressed in form of a weighted sum denoted by $\mathcal{L}(\bullet)$ $$\min_{x,\theta} \mathcal{L}(x, \theta) = R(x, \theta) + \lambda D(x, \theta) \qquad (2.1)$$

where x is the input data, θ is the network parameters and λ is a weighting factor that controls the rate-distortion balance. The rate loss is directly controlled by the ability of the network to accurately model the distribution of the latent representations of the input data, which brings forward the notion of entropy modelling which shall be outlined and justified in detail. In theory, the more accurately the entropy model matches the true latent distribution, the lower the rate term is. Note that the distortion term is also influenced indirectly as a result from the joint rate-distortion minimisation objective. However, for the sake of clarity, we will largely ignore the distortion term or any consequential impact of it from minimising the rate here.

The focus here is to
(a) introduce and explain the theory and practical implementation of entropy modelling of the latent distribution in AI-based data compression;
(b) describe and exemplify a number of novel methods and technologies that introduces additional flexibility in entropy modelling of the latent distribution in AI-based data compression.

2.2 Preliminaries

Below follows a detailed section on mathematical preliminaries that will act as a helpful guide. One common conventionality adopted is that the array data format of a quantity (scalars, vectors, matrices, etc.) is independent of the data itself. This means that if a quantity is fundamentally one-dimensional, such as a vector x of length N, then it can either be represented directly as a vector format $x \in \mathbb{R}^N$ or as an array (or tensor) format $x \in \mathbb{R}^{H \times W \times 3}$ (where $N = H \times W \times 3$). In other words, no matter how we organise x into different data structures, the fundamental variables contained within a particular instance of x are not mutated.

The following is a list of how various quantity types encountered within the text body are conventionally denoted:

Scalars are 0-dimensional and denoted in italic typeface, both in lowercase and uppercase Roman or Greek letters. They typically comprise of individual elements, constants, indices, counts, eigenvalues and other single numbers. Example notation: i, N, λ

Vectors are 1-dimensional and denoted in boldface and lowercase Roman or Greek letters. They typically comprise of inputs, biases, feature maps, latents, eigenvectors and other quantities whose intervariable relationships are not explicitly represented. Example notation: x, μ, ŷ, σ

Matrices are 2-dimensional and denoted in boldface and uppercase Roman or Greek letters. They typically comprise of weight kernels, covariances, correlations, Jacobians, eigenbases and other quantities that explicitly model intervariable relationships. Example notation: W, B, Σ, $J_f$ Parameters are a set of arbitrarily grouped vector and/or matrix quantities that encompasses for example all the weight matrices and biases vectors of a network, or the parametrisation of a probability model which could consist of a mean vector and a covariance matrix. They will conventionally be denoted in the text by either of the Greek letters θ (typically network parameters), ϕ (typically probability model parameters) and ψ (a placeholder parameter).

The rest of the symbols commonly encountered relate to functions, operations or mappings, which follows the standardised form as detailed below:

Functions will typically have enclosing brackets indicating the input, which evaluates to a predefined output. Most generically, this could look like $f_{enc}(\bullet)$ or $R(\bullet)$ where the dot denotes an arbitrary input.

Probability density functions (PDFs) are commonly (but not always!) denoted as lowercase p with a subscript denoting the distributed variable, and describes the probability density of a continuous variable. It usually belongs to a certain distribution type that is typically predefined in the text. For instance, if $\hat{y}_i$ follows a univariate normal distribution, we could write $\hat{y}_i \sim \mathcal{N}(\mu, \sigma)$; then, $p_{\hat{y}_i}(\hat{y}_i; \phi)$ would represent the PDF of a univariate normal distribution, implicitly parametrised by $\phi = (\mu, \sigma)$.

Probability mass functions (PMFs) are analogous to probability density functions, but describe the probability mass (or just probability) of a discrete variable. They are commonly denoted as uppercase P, but not always, with a subscript denoting the distributed variable.

Expectations are commonly denoted as $\mathbb{E}_{x \sim p_x}[\cdot]$. They refer to the average value of the quantity enclosed within the brackets across all instances x in the distribution $p_x$. If the expectation is taken across a valid probability distribution, like in this case, then the following is equivalent: $\mathbb{E}_{x \sim p_x}[f(x)] = \int_x p_x(x_i) f(x_i) dx_i$ (for continuous distributions) and $\mathbb{E}_{x \sim P_x}[f(x)] = \sum_{x_i} P_x(x_i) f(x_i)$ (for discrete distributions).

Other commonly seen symbols include rounding (up or down) to nearest integer $\lfloor \cdot \rceil$, flooring (round down to nearest integer) operation $\lfloor \cdot \rfloor$, flooring (round up to nearest integer) operation $\lceil \cdot \rceil$, the convolution operator *, the point-wise (Hadamard) multiplication operator ⊙ and point-wise division operator /

The standard convention for index subscripts is the following: to index an individual element in a vector x, the subscript i is used for the column index (e.g. $x_i$). To index an individual element in a matrix Σ, the subscripts i, j and lowercase letters are used for the row and column index, respectively (e.g. $\sigma_{i,j}$). Quantities with bracketed superscripts are associated with additional partitioning or groupings of vectors/matrices, such as latent space partitioning (often with index [b]) or base distribution component of a mixture model (often with index [k]). For example, indexing can look like $y^{[b]}, \forall b \in \{1, \ldots, B\}$ and $\mu^{[k]}, \forall k \in \{1, \ldots, K\}$.

2.3 Entropy Modelling of Latent Distribution

This section serves to inform about the fundamentals of rate minimisation through entropy modelling of the latent distribution. We describe the various components in the network that this affects, why these components are necessary and the theory that underpins them. Demonstrative examples are also included as a guide.

2.3.1 Components of the Autoencoder

Figure 14:
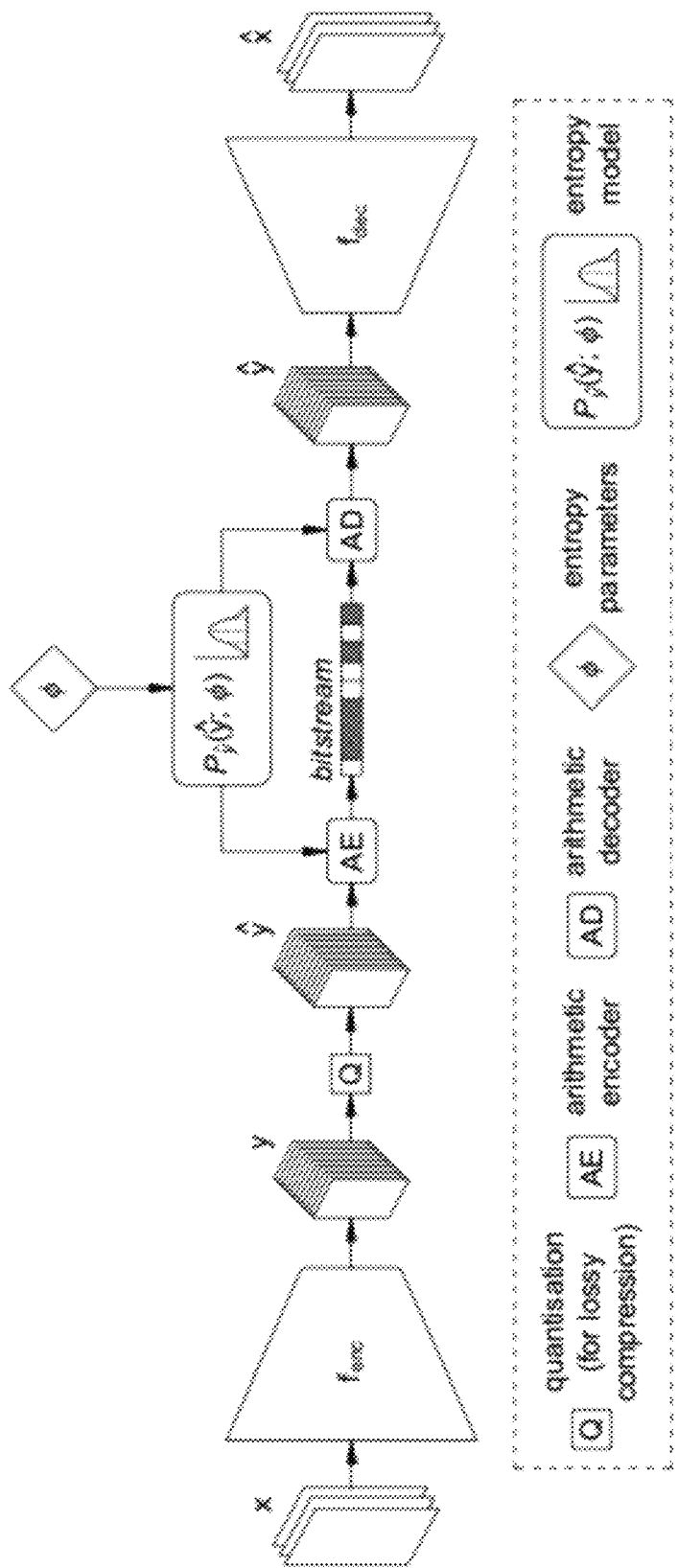
FIG. 14 shows an example flow diagram of components of a typical autoencoder.

The autoencoder for AI-based data compression, in a basic form, includes four main components:
1. Encoder $y = f_{enc}(x)$: analysis transform of input vector x to latent vector y 2. Quantisation $\hat{y}=Q(y)$: discretisation process of binning continuous latents into discrete centroids
3. Entropy model $P_{\hat{y}}(\hat{y}; \phi)$: prior distribution on the true quantised latent distribution
4. Decoder $\hat{x}=f_{dec}(\hat{y})$: synthesis transform of quantised latents $\hat{y}$ to approximate input vector $\hat{x}$ FIG. 14 shows an example of the forward flow of data through the components. Here, we mainly focus on the entropy model and the mechanisms that take place there. However, to facilitate understanding of the ensuing discussions around that topic, the next paragraphs will describe how these components relate to each other and how that gives rise to the so called latent space, on which the entropy model operates. The exact details regarding network architecture and hyperparameter selection are abstracted away.

The encoder transforms an N-dimensional input vector x to an M-dimensional latent vector y, hence the encoder transforms a data instance from input space to latent space (also called "bottleneck") $f_{enc}: \mathbb{R}^N \to \mathbb{R}^M$. M is generally smaller than N, although this is by no means necessary. The latent vector, or just the latents, acts as the transform coefficient which carries the source signal of the input data. Hence, the information in the data transmission emanates from the latent space.

As produced by the encoder, the latents generally comprise continuous floating point values. However, the transmission of floating point values directly is costly, since the idea of entropy coding does not lend itself well to continuous data. Hence, one technique is to discretise the latent space in a process called quantisation $Q: \mathbb{R}^M \to \mathbb{R}_Q^M$ (where $\mathbb{R}_Q^M$ denotes the quantised M-dimensional vector space, $\mathbb{R}_Q^M \subset \mathbb{R}^M$). During quantisation, latents are clustered into predetermined bins according to their value, and mapped to a fixed centroid of that bin. One way of doing this is by rounding the latents to the nearest integer value. The overall effect is that the set of possible values for the latents is reduced significantly which allows for shorter descriptors, but this also curbs expressiveness due to the irrecoverable information loss. We normally denote quantities that have undergone quantisation with a hat symbol, such as $\hat{y}$.

Once the latents are discretised, we can encode them into a bitstream. This process is called entropy coding which is a lossless encoding scheme; examples include arithmetic/range coding and Huffman coding. The entropy code comprises a codebook which uniquely maps each symbol (such as an integer value) to a binary codeword (comprised by bits, so 0s and 1s). These codewords are uniquely decodable, which essentially means in a continuous stream of binary codewords, there exists no ambiguity of the interpretation of each codeword. The optimal entropy code has a codebook that produces the shortest bitstream. This can be done by assigning the shorter codewords to the symbols with high probability, in the sense that we would transmit those symbols more times than less probable symbols. However, this requires knowing the probability distribution in advance.

This is where the entropy model comes in. It defines a prior probability distribution over the quantised latent space $P_{\hat{y}}(\hat{y}; \phi)$, parametrised by the entropy parameters $\phi$. The prior aims to model the true quantised latent distribution, also called the marginal distribution $m(\hat{y})$ which arises from what actually gets outputted by the encoder and quantisation steps, as closely as possible. The marginal is an unknown distribution; hence, the codebook in our entropy code is determined by the prior distribution whose parameters we can optimise for during training. The closer the prior models the marginal, the more optimal our entropy code mapping becomes which results in lower bitrates.

It is assumed that the codebook defined by the entropy model exists on both sides of the transmission channel. Under this condition, the transmitter can map a quantised latent vector into a bitstream, send it across the channel. The receiver can then decode the quantised latent vector from the bitstream losslessly, pass it through the decoder which transforms it into an approximation of the input vector $\hat{x}$, $f_{dec}: \mathbb{R}_Q^M \to \mathbb{R}^N$.

2.3.2 Ensuring Differentiability During Network Training

What has been presented thus far is how a typical compression pipeline would work in practical application. However, during gradient descent-based training, we must ensure differentiability throughout the entire autoencoder in order for the loss gradients to back propagate and update the network parameters. However, essential steps such as quantisation and entropy coding are usually non-differentiable and break the flow of gradient information during back-propagation. Therefore, an autoencoder often trains with proxy operations that mimic the prohibited operations whilst ensuring differentiability throughout the network. Specifically, we need to estimate the rate given our entropy model and simulate the effects of quantisation in a differentiable manner. Once the network has finished training, non-differentiable operations can be permitted for inference and real-life application.

Hence, we need to pay attention to the different "modes" of the network when it processes data; the particular "mode" of the network governs how certain operations behave within the network (see Table 2.1):

Training: as batches of training data are inputted through the network, the rate and distortion loss metrics evaluated on the output spur gradient signals that back propagate through the network and update its parameters accordingly. This is referred to as a training pass. In order for the gradients to propagate through the network, all operations must be differentiable.

Inference: normally refers to validation or test passes. During inference, data is inputted through the network and the rate and distortion loss metrics are evaluated. However, no backpropagation or parameter updates occurs. Thus, non-differentiable operations pose no issue.

Deployment: refers to the neural network being put into use in practical, real-life application. The loss metric is disregarded, and the encode pass and decode pass are now different and must be separated. The former inputs the original data into the encoder and produces an actual bitstream from the encoded latents through entropy coding. The latter admits this bitstream, decodes the latents through the reverse entropy coding process, and generates the reconstructed data from the decoder.

Figure 15:
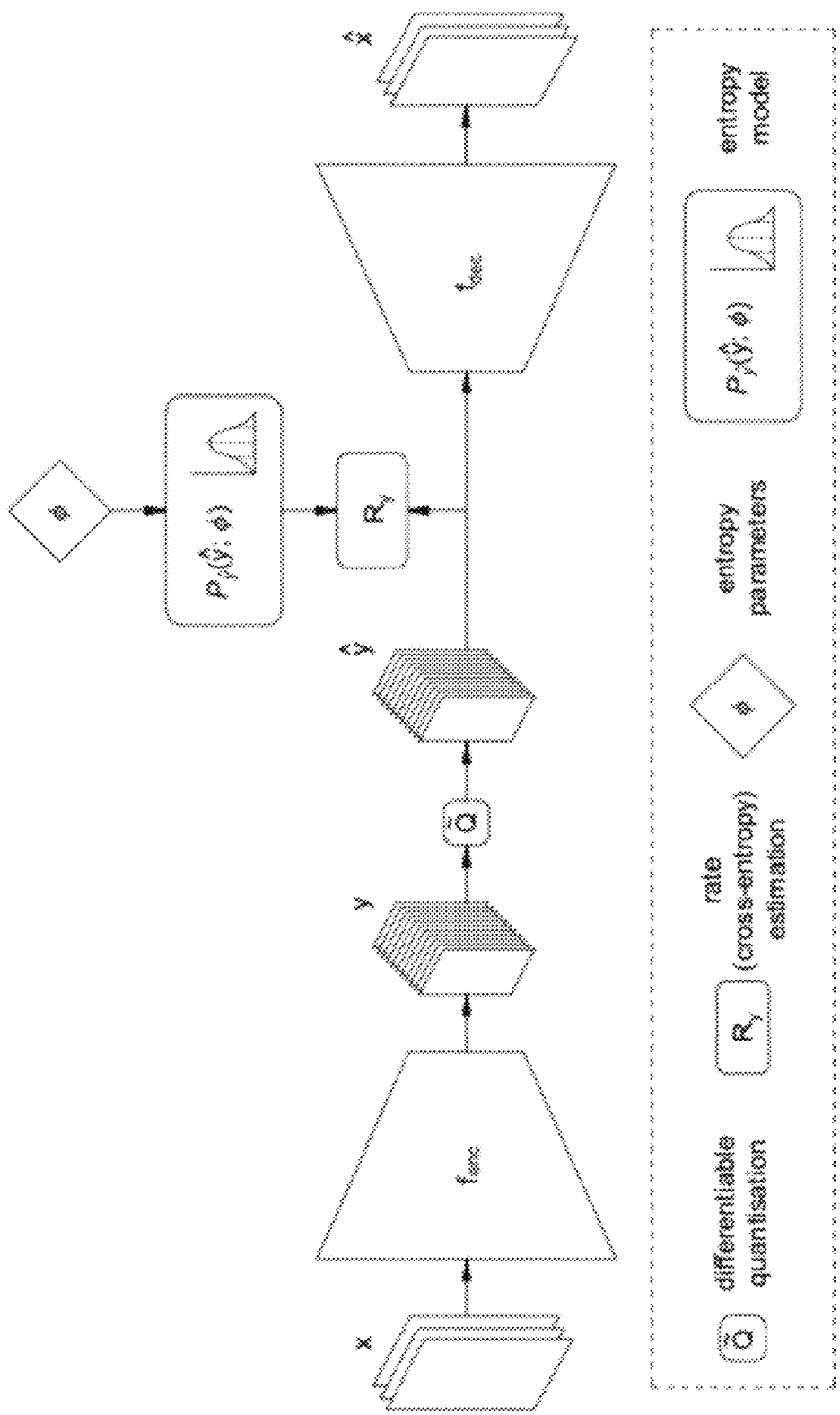
FIG. 15 shows an example flow diagram of a typical autoencoder at network training mode.

FIG. 15 shows an example of a flow diagram of a typical autoencoder at network training mode.

TABLE 2.1

Depending on the mode of the neural network, different implementations of certain operations are used.

| Network mode | Quantisation | Rate evaluation |
| --- | --- | --- |
| Training | noise approximation | cross-entropy estimation |
| Inference | rounding | cross-entropy estimation |
| Deployment | rounding | entropy coding |

Estimating Rate with Cross-Entropy

Information theory states that given a PMF $M_X(x)$ describing the probability distribution of the discrete random variable X, the shortest average message length that unambiguously relays information about a sample $x_i$ drawn from it is equal to the Shannon entropy of that distribution. The Shannon entropy is defined as $$H(M_X) \equiv -\sum_{x_i} M_X(x_i) \log_b M_X(x_i) = -\mathbb{E}_{x_i \sim M_X}[\log_b M_X(x_i)] \quad (2.2)$$

where b denotes the base of the logarithm. If b=2, the unit of this entropy is bits. This is where the notion of the optimal codebook in entropy coding, as well as the term entropy modelling, are derived from.

However, suppose we do not know the exact probability distribution of states ($M_X$ is unknown), but build our codebook with another known distribution $P_X(x)$, the average message length that unambiguously relays information about a sample $x_i$ drawn from $M_X$ is then equal to the cross-entropy of the distribution $P_X$ over $M_X$:

$$H(M_X, P_X) \equiv -\sum_{x_i} M_X(x_i) \log_b P_X(x_i) = -\mathbb{E}_{x_i \sim M_X}[\log_b P_X(x_i)] \quad (2.3)$$

The cross-entropy can be rephrased in terms of the Kullback-Leibler (KL) divergence, which is always nonnegative and can be interpreted as measuring how different two distributions are to one and another:

$$H(M_X, P_X) \equiv H(M_X) + D_{KL}(M_X \| P_X) \quad (2.4)$$

From this, it is evident that the cross-entropy term is lower bounded by the Shannon entropy. If the cross-entropy reduces as a consequence of configuring $P_X$, the KL divergence reduces commensurately, implying that $P_X$ is becoming more similar to $M_X$. It is now clear what the motivation for learning a prior distribution $P_{\hat{y}}$ for the quantised latent space that ideally should match the unknown marginal distribution $m_{\hat{y}}$. The cross-entropy of $P_{\hat{y}}$ over $m_{\hat{y}}$ acts as a theoretical measure for the achieved bitrate if we were to perform entropy coding with it, which is differentiable since it only depends on a logarithm operator and expectation operation! Hence, we can define our rate loss R by estimating the cross-entropy of the prior over the marginal:

$$R = H(m_{\hat{y}}, P_{\hat{y}}) = -\mathbb{E}_{\hat{y} \sim m}[\log_2 P_{\hat{y}}(\hat{y})] \quad (2.5)$$

Effects of Quantisation on Entropy Modelling

Note that quantisation, whilst closely related to the entropy model, is a significant separate topic of its own. However, since quantisation influences certain aspects of entropy modelling, it is therefore important to briefly discuss the topic here. Specifically, they relate to
(a) differentiability of the assumed probability model;
(b) differentiability of the quantisation operation.

Figure 16:
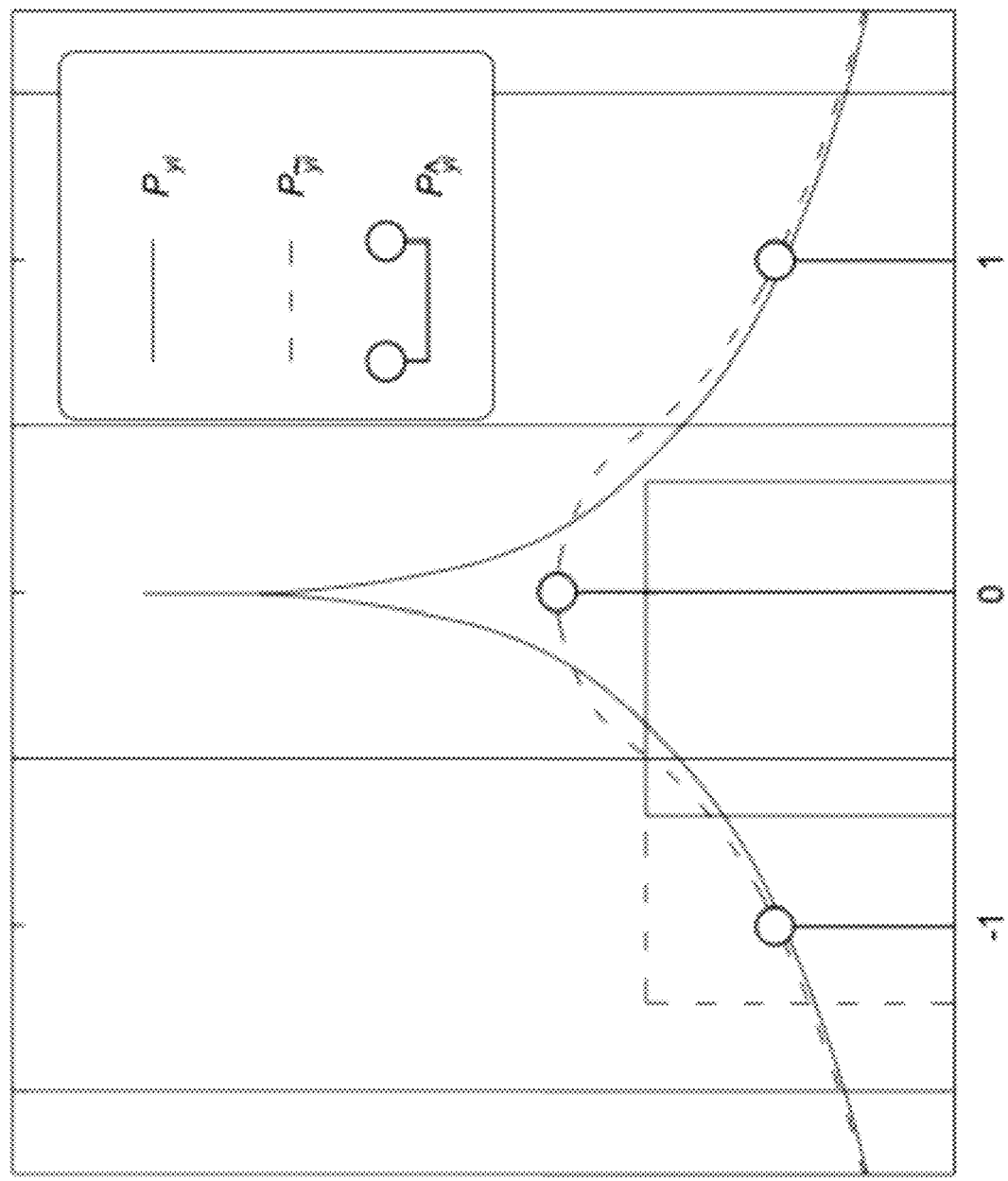
FIG. 16 shows a PDF of a continuous prior, $p_{y_i}$, which describes the distribution of the raw latent $y_i$. Upon integer-rounding quantisation, the PMF $P_{\hat{y}_i}$ is obtained though non-differentiable (seen by the discrete bars). By simulating quantisation through additive noise perturbation, in this example from a unit-width uniform distribution (solid box, scaled down for visualisation), we obtain a continuously relaxed quantised prior distribution $p_{\tilde{y}_i} = p_{y_i} * U(-1/2, 1/2)$.

So far, we have only considered discrete probability distributions as entropy models. This is due to quantisation, which discretises the continuous vector space for the (raw) latents y. However, discrete distributions do not lend themselves well to gradient-based approaches due to their discontinuities. It is also possible to pick a continuous distribution as a prior, with the PDF $p_y(y; \phi)$ that is parametrised by $\phi$, on the latent space. We can simply account for quantisation in the entropy model by evaluating probability masses over $p_y$, by integrating over a zero-centred integration region $\Omega$ for each quantisation interval. For example, for a single variable $\hat{y}_i$ (so in 1-D), the PMF can be defined as $$P_{\hat{y}_i}(\hat{y}_i) = \int_{\hat{y}_i + a_i}^{\hat{y}_i + b_i} p_{y_i}(y) dy, \forall \hat{y}_i \in \mathbb{R}_Q \quad (2.6)$$

where the integration region per quantisation bin is defined by its bounds $\Omega_i = [a_i, b_i]$. In other words, the effect of quantisation on entropy modelling is that probability masses for each quantised state must be computed (for example, see FIG. 16) For continuous distributions with a closed-form expression for its cumulative density function (CDF), $F_{y_i}$, Equation (2.6) is simplified as:

$$P_{\hat{y}_i}(\hat{y}_i) = F_{y_i}(\hat{y}_i + b_i) - F_{y_i}(\hat{y}_i + a_i), \forall \hat{y}_i \in \mathbb{R}_Q \quad (2.7)$$

Example: Suppose the entropy model $p_{y_i}$ comprises a univariate normal distribution per variable as prior distribution on the latents, $y_i \sim \mathcal{N}(\mu_i, \sigma_i)$. Its CDF is denoted by $$F_{y_i}(y_i) = \Phi\left(\frac{y_i - \mu_i}{\sigma_i}\right),$$

where $\Phi(\bullet)$ is the CDF of the standard normal distribution. Then, assuming regular integer-sized quantisation bins $$\left(\text{so } \Omega_i = \left[-\frac{1}{2}, \frac{1}{2}\right]\right),$$

we calculate the probability masses as follows:

$$P_{\hat{y}_i}(\hat{y}_i) = \Phi\left(\frac{\hat{y}_i + \frac{1}{2} - \mu_i}{\sigma_i}\right) - \Phi\left(\frac{\hat{y}_i - \frac{1}{2} - \mu_i}{\sigma_i}\right), \forall \hat{y}_i \in \mathbb{R}_Q$$

The second point becomes slightly more involved. Here we will not discuss differentiable quantisation in more detail than necessary. The main discussion point revolve around perturbing $y \in \mathbb{R}^M$ with additive noise to simulate the effects of quantisation (there exist other differentiable quantisation methods which are known to the skilled person). Certain quantisation operations can be seen as having similar effects. Hence, when differentiability is imperative, we can substitute actual quantisation with noise quantisation $\ddot{Q}: y \mapsto \ddot{y}$ $$\ddot{Q}(y) = \ddot{y} = y + \varepsilon_Q \quad (2.8)$$

where $\varepsilon_Q$ is drawn from any random noise source distribution $\Theta$, ideally similarly bounded as the perturbation emerging from actual quantisation though this is not a necessity. The simulated noise source $\Theta$ could theoretically have different distribution characteristics from the true quantisation perturbation source (it could for instance be Uniform, Gaussian or Laplacian distributed).

One key feature with this type of quantisation simulation is the effect it has on the (continuous) prior distribution. Unlike actual quantisation, $\ddot{Q}$ maps a vector from $\mathbb{R}^M$ to $\mathbb{R}^M$, and not to the centroid of some quantisation bin. If we select the random noise source to be a uniform distribution with a width equal to the quantisation interval, the distribution of $\ddot{y}$, $p_{\ddot{y}}(\ddot{y})$ becomes a continuous relaxation of the probability mass formulation (Equation (2.6)). This can be understood by viewing the prior distribution as being convolved with the uniform distribution, which acts as a box-car smoothing filter (see rectangular box in FIG. 16, for example). In fact, this also works for any $\Theta$, such that $$p_{\ddot{y}}(\ddot{y}) = (p_y * p_{\varepsilon_Q})(\ddot{y}) \quad (2.9)$$

Example: Suppose that the actual quantisation operation is rounding to the nearest integer, $Q(y)=\lfloor y \rceil$. This can be seen as adding a half-integer bounded noise vector $$\epsilon_Q \in \left[-\frac{1}{2}, \frac{1}{2}\right]^M.$$

Hence, we can simulate the quantisation perturbation in training by adding a uniformly distributed random noise vector c, each element sampled from $$\epsilon_{Q,i} \sim \mathcal{U}\left(-\frac{1}{2}, \frac{1}{2}\right).$$

This results in the continuously relaxed probability model $$p_{\tilde{y}}(\tilde{y}) = \left(p_y * \mathcal{U}\left(-\frac{1}{2}, \frac{1}{2}\right)\right)(\tilde{y})$$

2.3.3 Properties of Latent Distribution

The true latent distribution of $y \in \mathbb{R}^M$ can be expressed, without loss of generality, as a joint (multivariate) probability distribution with conditionally dependent variables $$p(y) \equiv p(y_1, y_2, \ldots, y_M) \quad (2.10)$$

which models the probability density over all sets of realisations of y. Therefore, it captures how each variable is distributed independently of the others as well as any intervariable dependencies between pairs of variables. However, since M is often very large, modelling intervariable dependencies between M variables would require enormous computational resources.

Another way to phrase a joint distribution is to evaluate the product of conditional distributions of each individual variable, given all previous variables:

$$p(y_1, y_2, \ldots, y_M) \equiv p(y_1) \cdot p(y_2 | y_1) \cdot p(y_3 | y_1, y_2) \cdot \ldots \cdot p(y_M | y_1, \ldots, y_{M-1}) \quad (2.11)$$

We can model each conditional distribution $p(y_i | y_1, \ldots, y_{i-1})$ using a so-called conditional or context model $f_{context}(\bullet)$, which is a function mapping that takes in the previous variables and outputs the entropy parameters of the current variable: $\phi_i = f_{context}(\{y_1, \ldots, y_{i-1}\})$. In practice, $\phi_i$ would be evaluated one by one, which implies a serial encoding and decoding process. Assuming ideal parametrisation of the conditional distributions (which is rarely the case), we would be able to model the joint distribution perfectly. Unfortunately, serial encoding and decoding processes are very slow to execute, especially over a large number of dimensions.

Figure 17:
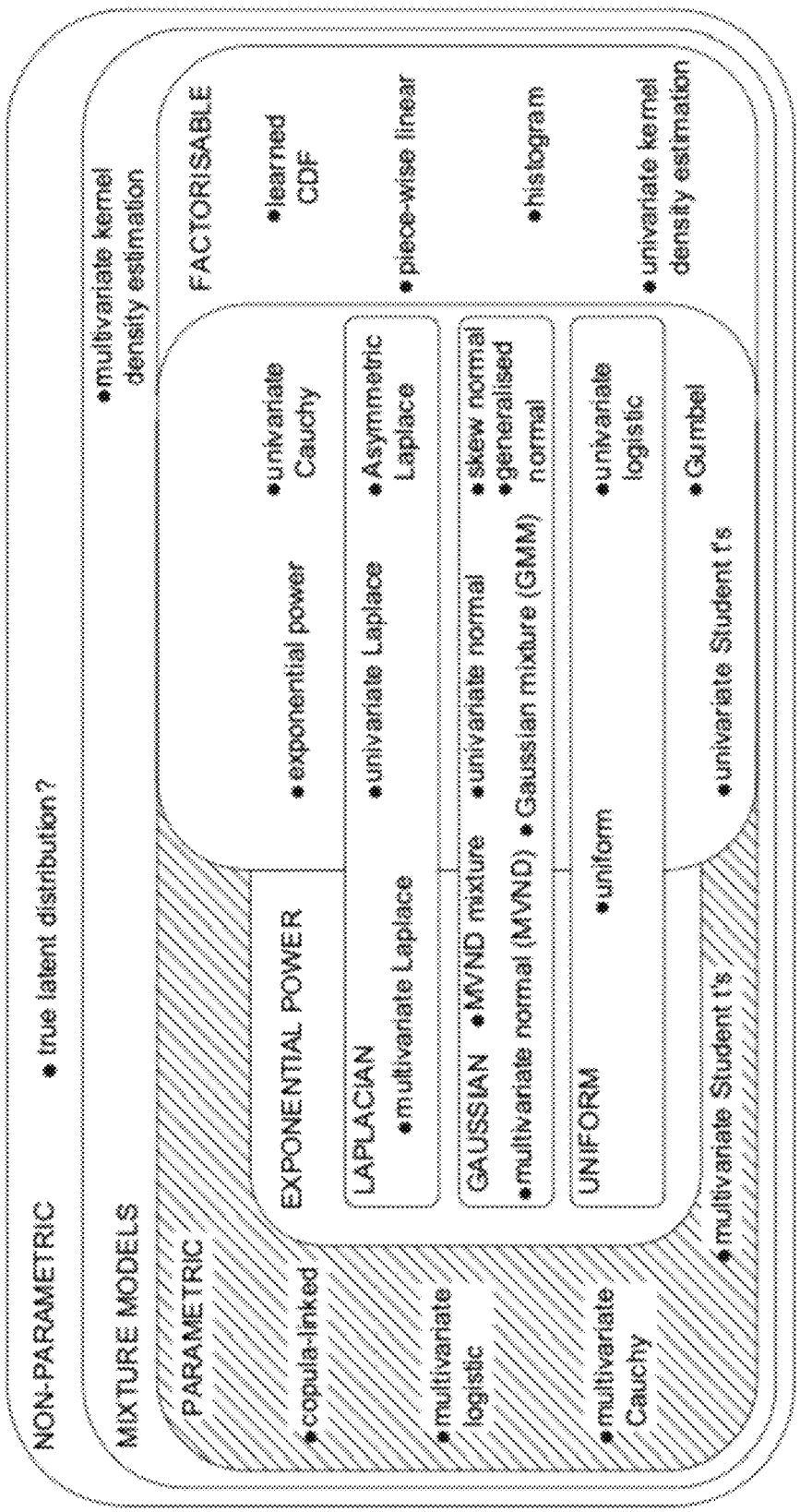
FIG. 17 shows an example Venn diagram showcasing relationship between different classes of (continuous) probability distributions. The true latent distribution exists within this map of distribution classes; the job of the entropy model is to get as close as possible to it. Note that all distributions are non-parametric (since these generalise parametric distributions), and all parametric and factorisable distributions can constitute at least one component of a mixture model.

Thus, in order to ensure realistic runtime of the operations, it is possible to ignore the conditioned variables, and model the latent distribution as a product of independent, univariate distributions $$p(y) = p(y_1) \cdot p(y_2) \cdot p(y_3) \cdot \ldots \cdot p(y_M) \quad (2.12)$$

where each distribution $p(y_i)$ can be parametrised by entropy parameters $\phi_i$. This type of entropy model is called factorised prior, since we can evaluate the factors (probability masses) for each variable individually (i.e. the joint is factorisable). The entropy parameters $\phi$ can be included with the network parameters that are optimised over during training, for which the term fully factorised is often used. The distribution type may be either parametric or non-parametric, with potentially multiple peaks and modes. See FIG. 17 for example.

Figure 18:
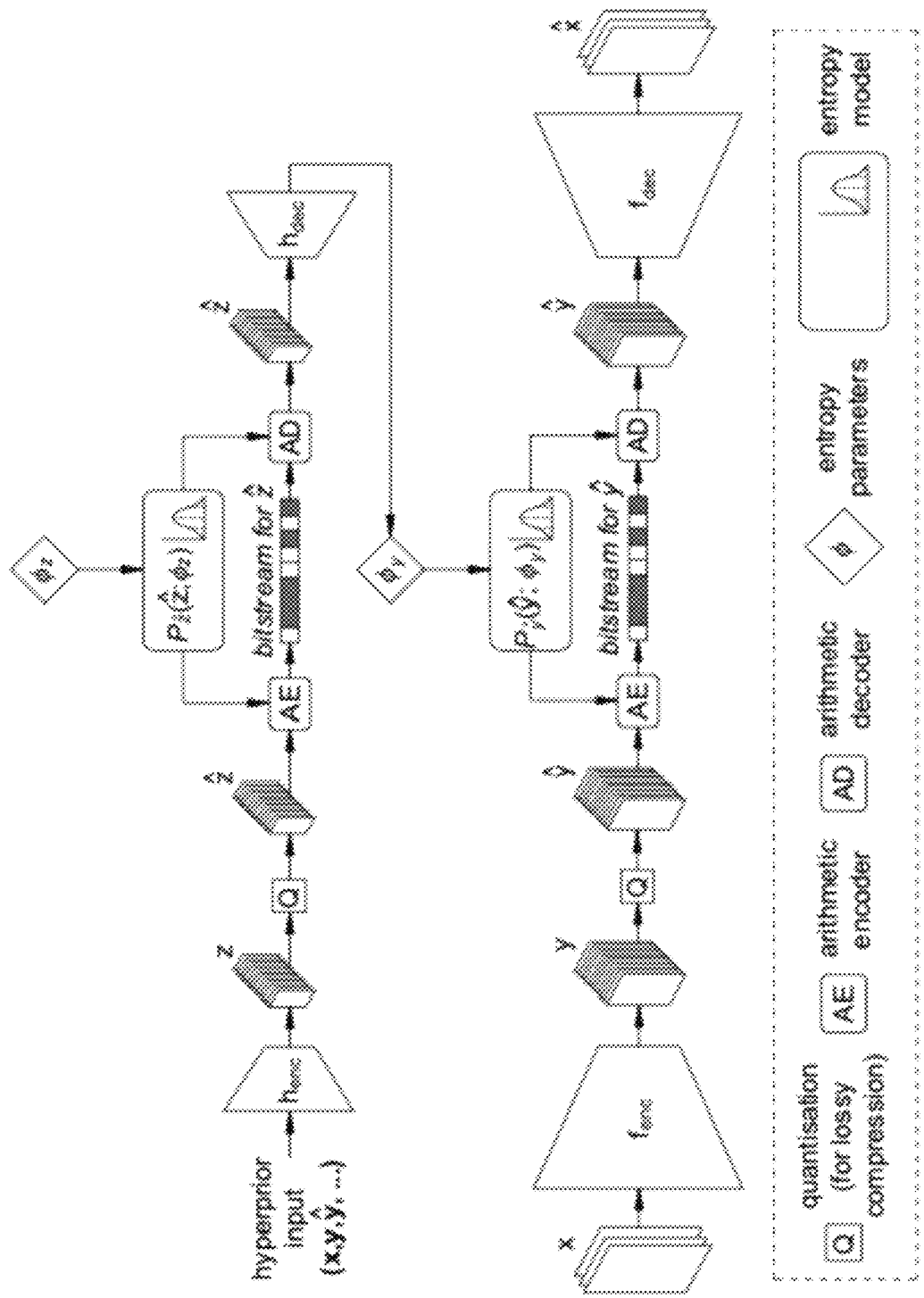
FIG. 18 shows an example flow diagram of an autoencoder with a hyperprior as entropy model to latents y. Note how the architecture of the hypernetwork mirrors that of the main autoencoder. The inputs to the hyperencoder $h_{enc}(\cdot)$ can be arbitrary, so long as they are available at encoding. The hyperentropy model of $\hat{z}$ can be modelled as a factorised prior, conditional model, or even another hyperprior. Ultimately, the hyperdecoder $h_{dec}(\hat{z})$ outputs the entropy parameters for the latents, $\phi_y$.

AI-based data compression architectures may contain an additional autoencoder module, termed a hypernetwork. A hyperencoder $h_{enc}(\bullet)$ compresses metainformation in the form of hyperlatents z analogously to the main latents. Then, after quantisation, the hyperlatents are transformed through a hyperdecoder $h_{dec}(\bullet)$ into instance-specific entropy parameters $\phi$ (see FIG. 18 for example). The metainformation represents a prior on the entropy parameters of the latents, rendering it an entropy model that is normally termed hyperprior.

Figure 19:
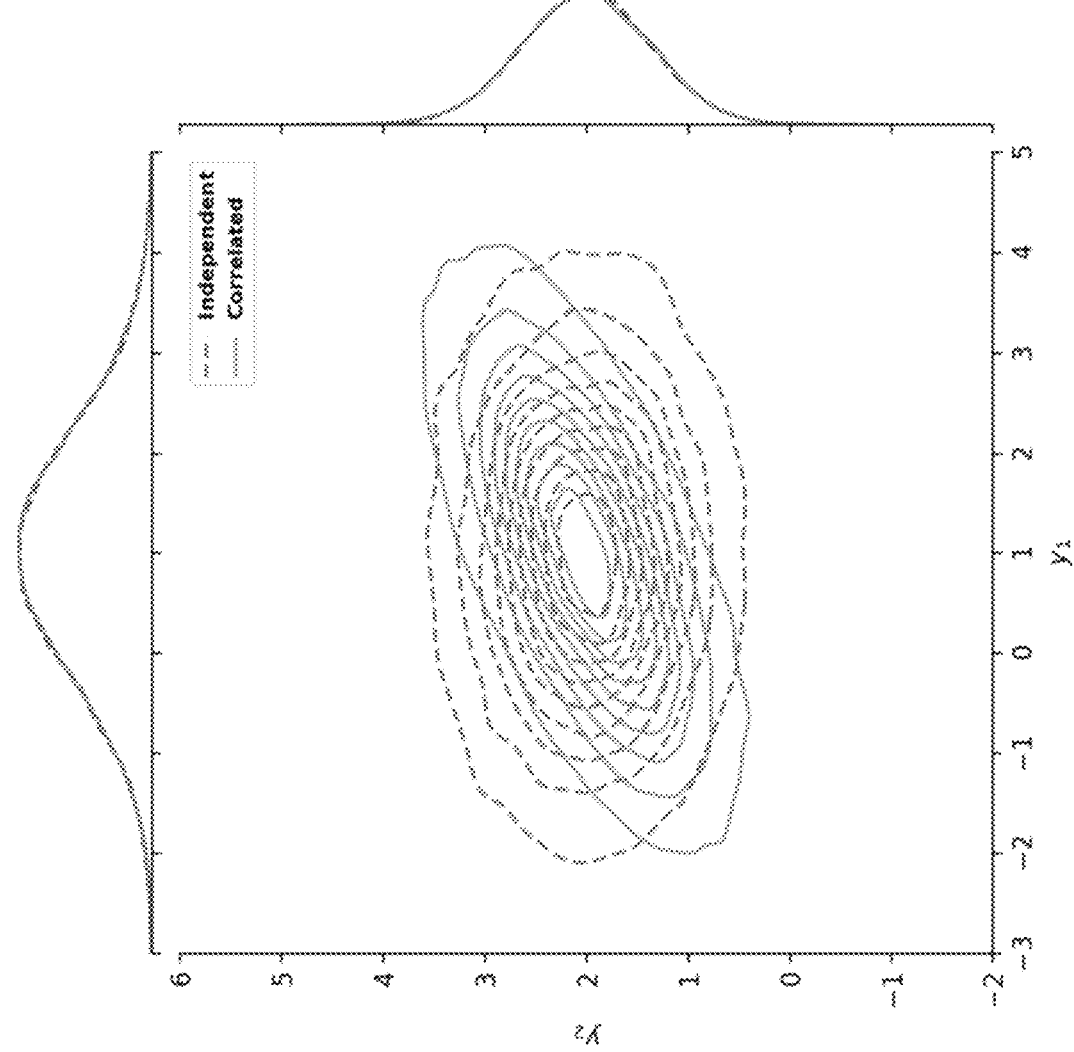
FIG. 19 shows a demonstration of an unsuitability of a factorisable joint distribution (independent) to adequately model a joint distribution with dependent variables (correlated), even with the same marginal distributions.

However, a factorised prior ignores the notion of any dependency structure. This means that if the true latent distribution does have intervariable dependencies, a factorised prior would not be able to model these; the equal sign in Equation (2.12) would become an approximation sign. Thus, by Equation (2.4), it would never attain optimal compression performance (see FIG. 19 for example).

2.4 Innovations

We have been very prolific in pushing the frontiers of entropy modelling by rigorous development of theory and experimental tests. This section introduces a range of innovations in this field. Outlined innovations are segmented in different categories, which are accordingly presented in the upcoming subsections. The categories are:
1. More flexible parametric distributions as factorised entropy models;
2. Multivariate entropy modelling through parametric multivariate distributions;
3. Mixture models;
4. Non-parametric (factorised and multivariate) density functions.

2.4.1 Flexible Parametric Distributions for Factorised Entropy Modelling

Some entropy models in AI-based data compression pipelines include factorised priors $p_{y_i}(y_i; \phi_i)$, i.e. each variable in the latent space is modelled independently from other latent variables. The factorised prior is often parametrised by a parametric family of distributions, such as Gaussian, Laplacian, Logistic, etc. Many of these distribution types have simple parametrisation forms, such as a mean (or location) parameter and a variance (or scale) parameter. These distribution types often have specific characteristics which typically impose certain constraints on the entropy model, such as unimodality, symmetry, fixed skewness and kurtosis. This impacts modelling flexibility as it may restrain its capacity to model the true latent distribution, which hurts compression performance.

Therefore, we incorporate more flexibility in entropy modelling by using parametric distributions as factorised prior. We achieve this by employing distributions with many degrees of freedom in the parametrisation, including shape, asymmetry and skewness. Note that the innovation is formulated irrespective of the method with which the parameters $\phi$ are produced; these may be learned directly as fixed parameters (fully factorised prior), predicted by a hypernetwork (hyperprior) or by a context model (conditional model).

An example of parametric distribution families for factorised entropy modelling covered by this innovation, with the respective parametrisations for each distribution, can be seen in FIG. 20, in which $K_\lambda$ denotes the modified Bessel function of the second kind. Note that if a closed-form expression for the CDF is undefined or intractable, there still exist methods to evaluate probability masses (as seen in Section 2.4.2), which are part of our innovations in flexible entropy modelling of latent distributions.

Example: The exponential power distribution is a parametric family of continuous symmetric distributions. Apart from a location parameter µ and scale parameter α, it also includes a shape parameter β>0. The PDF $p_y(y)$, in the 1-D case, can be expressed as $$p_y(y) = \frac{\beta}{2\alpha\Gamma\left(\frac{1}{\beta}\right)} \exp\left(-\left(\frac{|y-\mu|}{\alpha}\right)^\beta\right)$$

where Γ(•) denotes the gamma function. The shape parameter can be modulated so as to attain probability densities from the normal (β=2), Laplace (β=1) and uniform (β=∞) distribution families, and a continuum of densities for any arbitrary β value.

We have put a lot of effort into extending this approach to allow the quantised latent space to be modelled using discrete parametric probability distributions, as opposed to continuous probability distributions. Amongst others, we have tested and modified the following distributions to work in an AI-based data compression pipeline:

TABLE 2.2

List of typical discrete parametric probability distributions considered under the outlined method.
Discrete parametric distributions The Bernoulli distribution
The Rademacher distribution
The binomial distribution
The beta-binomial distribution,
The degenerate distribution at x0
The discrete uniform distribution
The hypergeometric distribution
The Poisson binomial distribution
Fisher's noncentral hypergeometric distribution
Wallenius' noncentral hypergeometric distribution
Benford's law
The ideal and robust soliton distributions
Conway-Maxwell-Poisson distribution
Poisson distribution
Skellam distribution
The beta negative binomial distribution
The Boltzmann distribution
The logarithmic (series) distribution
The negative binomial distribution
The Pascal distribution
The discrete compound Poisson distribution
The parabolic fractal distribution Hyperpriors and Hyperhyperpriors The entropy parameters in a compression pipeline define a probability distribution that we can evaluate likelihood on. With the evaluated likelihoods, we can arithmetically encode the quantised latent representation $\hat{y}$ into a bitstream, and assuming that the identical likelihoods are evaluated on the decoding side, the bitstream can be arithmetically decoded into $\hat{y}$ exactly (i.e. losslessly) (for example, see FIG. 122). A hyperprior is a separate neural network module whose purpose is to encode metainformation in the form of a quantised hyperlatent representation $\hat{z}$, which is encoded and decoded in a similar fashion to the latents, and outputting entropy parameters for the latent representation $\hat{y}$ (for example, see FIG. 123). We can also apply a hyperprior on top of the hyperprior (which we can call hyperhyperprior), whose purpose is to encode metainformation in the form of a quantised hyperhyperlatent representation $\hat{w}$, which also is encoded and decoded in a similar fashion to $\hat{y}$ and $\hat{z}$, and outputting entropy parameters of $\hat{z}$ (for example, see FIG. 124). This hierarchical process can be applied recursively, such that any hyperprior module encodes and decodes metainformation regarding the entropy parameters of the lower-level latent or hyperlatent representation.

2.4.2 Parametric Multivariate Distributions

We have considered that the latent distribution is most likely a joint distribution with conditionally dependent variables. That is, the variables of $\hat{y}=\{\hat{y}_1, \ldots, \hat{y}_N\}^T$ have statistical dependencies between each other; they are correlated. As previously visited, with a factorised assumption, the dependency structure is not directly modelled. Hence, if the true latent distribution $m_{\hat{y}}(\hat{y})$ does contain statistical dependencies, a factorised assumption on the entropy model $p_{\hat{y}}$ will never attain optimal compression performance (see FIG. 19 for example).

By leveraging parametric multivariate distributions, we can capture these statistical dependencies in our entropy modelling if the correlations are modelled adequately. For example, the multivariate normal distribution (MVND), denoted by $\mathcal{N}(\mu, \Sigma)$, can be used as a prior distribution. The MVND is parametrised by a mean vector $\mu \in \mathbb{R}^N$ and covariance matrix $\Sigma \in \mathbb{R}^{N \times N}$. A comprehensive list of examples of parametric multivariate distributions under consideration for the methods outlined below can be seen in Table 2.3.

However, there are three leading problems with directly incorporating intervariable dependencies in our entropy model:

TABLE 2.3

List of typical parametric multivariate distributions considered under the outlined method.
Parametric multivariate distributions Multivariate normal distribution
Multivariate Laplace distribution
Multivariate Cauchy distribution
Multivariate logistic distribution
Multivariate Student's t-distribution
Multivariate normal-gamma distribution
Multivariate normal-inverse-gamma distribution
Generalised multivariate log-gamma distribution
Multivariate symmetric general hyperbolic distribution
Correlated marginal distributions with Gaussian copulas 1. Previously, without regard for intervariable dependencies, we normally require $O(N)$ distribution parameters (for instance, $\mu \in \mathbb{R}^N$ and $\sigma \in \mathbb{R}_+^N$ for a factorised normal distribution). However, we require $O(N^2)$ distribution parameters in order to take intervariable dependencies into account. Since N is already a large number for most purposes, a squaring of the dimensionality becomes unwieldy in practical applications.

2. The quantity expressing intervariable dependencies, normally a covariance matrix or correlation matrix, introduces additional complexities to the system. This is because its formulation requires strong adherence to certain mathematical principles that, if violated, will trigger mathematical failure mechanisms (similar to dividing by zero). In other words, we not only need a correct parametrisation of the intervariable dependencies but also a robust one.

3. Evaluating the probability mass of a parametric multivariate distribution is complicated. In many cases, there exists no closed-form expression of the CDF. Furthermore, most approximations involve non-differentiable operations such as sampling, which is not backpropagatable during network training.

We have sought to find a remedy to these challenges, and the next subsections will shed light on the methods and technologies that enable or facilitate the employment of parametric multivariate distributions in entropy modelling for AI-based compression. Throughout these subsections, examples are provided of how each method is applied assuming MVND as prior distribution.

Latent Space Partitioning for Tractable Dimensionality

In order to take on the challenge of the exploding dimensionality of the latent space, we provide a way to partition the latent space into smaller chunks on which we ascribe intervariable correlations. Ideally, these chunks encompass variables that indeed demonstrate correlative responses, such as locally in the spatial and channel axes (when expressed in array format). By doing so, we prescribe zero correlation for variables that are far apart and clearly have no mutual influence. This drastically reduces the number of parameters required to model the distribution, which is determined by the partition size and therefore the extent of the locality.

It should be noted that the chunks can be arbitrarily partitioned into different sizes, shapes and extents. For instance, assuming array format of the latent space, one may divide the variables into contiguous blocks, either 2D (along the height and width axes) or 3D (including the channel axis). The partitions may even be overlapping; in which case, the correlations ascribed to each pair of variables should ideally be identical or similar irrespective of the partition of which both variables are a member of. However, this is not a necessary constraint.

Figure 21:
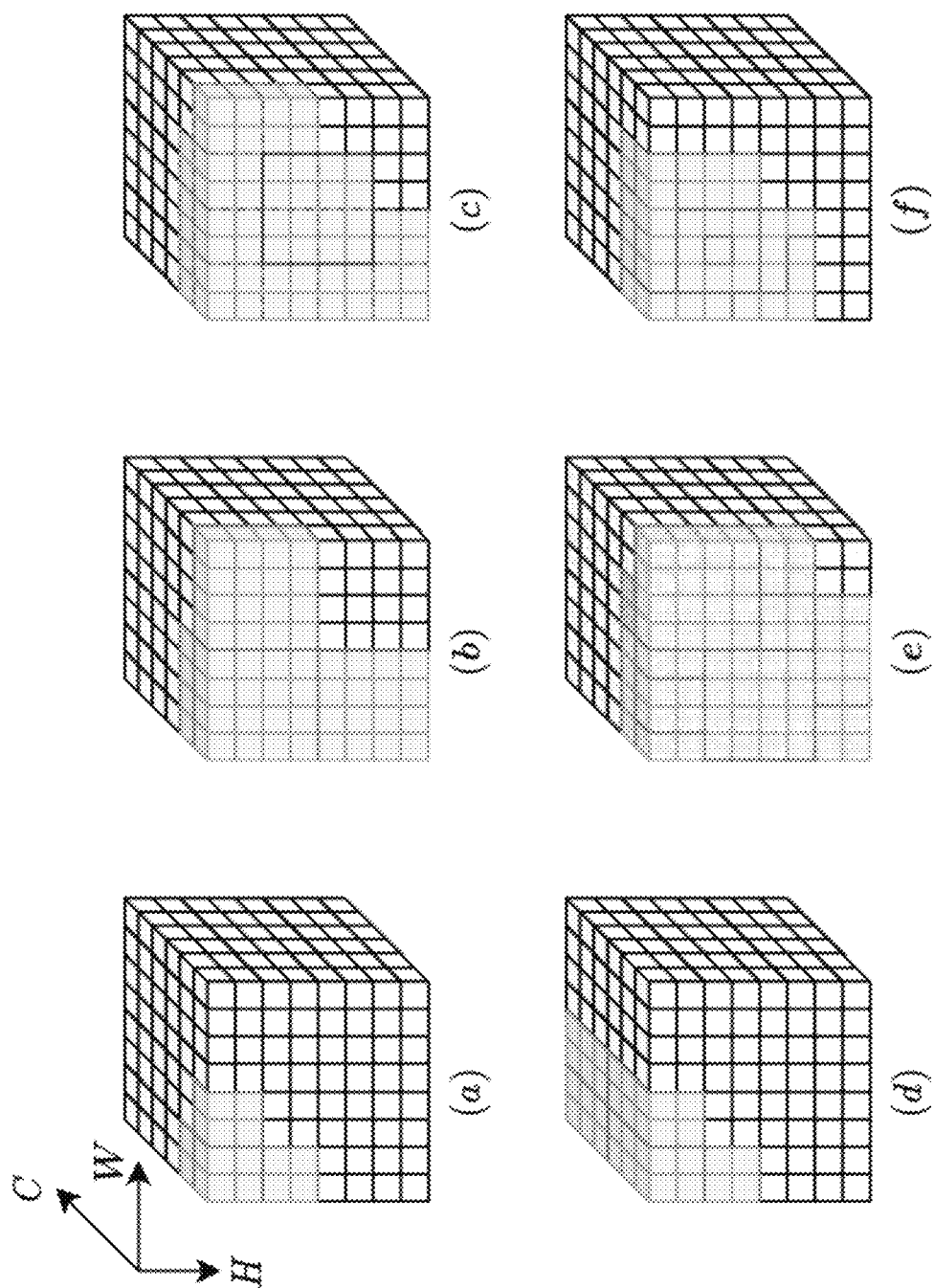
FIG. 21 shows different partitioning schemes of a feature map in array format. (a) 2D contiguous 2×2-block partitioning. (b) 2D contiguous 4×4-block partitioning. (c) 2D overlapping 4×4-block partitioning (borders) with a stride size of 2 (dashed lines) along spatial dimensions. (d) 3D contiguous 2×2×3-block partitioning. (e) various contiguous block sizes and shapes, similar to coding tree unit structures utilised in H.265 and H.266 compression engines. (f) an arbitrary, seemingly unstructured but equally valid partitioning scheme as the others.

The effects of the reduced number of parameters required using a partitioning scheme can be understood by an example. Using MVND as an entropy model imposed on latent space $\hat{y} \in \mathbb{R}^N$, we can split up the latent space into B contiguous partitions of size m=16 or blocks of 4×4 variables (pixels) along the spatial axes (as seen in the first example in FIG. 21), such that N=Bm since the partitions are non-overlapping. Then, for each block partition $b \in \{1, \ldots, B\}$, we require the MVND parameters $\mu^{[b]} \in \mathbb{R}^m$ and $\Sigma^{[b]} \in \mathbb{R}^{m \times m}$. Whereas a single MVND entropy model on the entire latent space requires N+N(2 parameters (the second term is because the covariance matrix is symmetric), a partitioned latent space with B MVND entropy models require $$N + \frac{N(N+1)}{2}$$

parameters in total.

$$B\left(m + \frac{m(m+1)}{2}\right) = N + \frac{N(m+1)}{2}$$

Although in this example we have been focused on partitioning of the latent space for tractable dimensionality, the same principle could be applied for any vector space encountered in AI-based data compression.

Parametrisation of Intervariable Dependencies

Depending on the parametric distribution type adopted, the quantity expressing the intervariable dependencies may have different constraints. For instance, the absolute magnitude of the elements in a correlation matrix can never exceed one, and the diagonal elements are exactly one. Some expressions of intervariable dependencies include, but are not limited to, the covariance matrix $\Sigma$, the correlation matrix R and the precision matrix $\Lambda$. Note that these quantities are closely linked, since they describe the same property of the distribution:

Correlations are simply covariances that have been standardised by their respective standard deviations:

$$\rho_{i,j} = \frac{\Sigma_{i,j}}{\sigma_{i,i}\sigma_{j,j}}$$

The precision matrix is precisely the inverse of the covariance matrix: $\Lambda = \Sigma^{-1}$ Apart from this, all three expressions share common mathematical properties such as symmetry and positive definiteness. Therefore, it makes sense to narrow in on a single expression when discussing the parametrisation of intervariable dependencies. In this case, we will focus on the covariance matrix $\Sigma$.

There are multiple ways that we could parametrise $\Sigma$ whilst satisfying its intrinsic properties. Here are some examples that we have successfully used to date, which are by no means exhaustive.

By matrix $A \in \mathbb{R}^{N \times N}$ such that $\Sigma = A^T A + \varepsilon I_N$, where s is a positive stability term to avoid degenerate cases (when $\Sigma$ becomes singular and non-invertible);

By matrix $A \in \mathbb{R}^{N \times N}$ and perform point-wise multiplication with a lower triangular matrix of ones, $M \in \mathbb{R}^{N \times N}$, to obtain $L = A \odot M$, and then by Cholesky decomposition obtain $\Sigma = LL^T$;

Same as the previous point, but L is constructed directly (ideally as a vector whose elements are indexed into a lower triangular matrix form) instead of the masking strategy;

---

Algorithm 2.1 Mathematical procedure of computing an orthonormal matrix B through consecutive House-holder reflections. The resulting matrix can be seen as an eigenvector basis which is advantageous in inferring the covariance matrix. The input vectors can therefore be seen as part of the parametrisation of the covariance matrix, which are learnable by a neural network.

1: Inputs:
   Normal vectors of reflection hyperplanes $\{v_i\}_{i=1}^{N-1}$, $v_i \in \mathbb{R}^{N+1-i}$
2: Outputs:
   Orthonormal matrix $B \in \mathbb{R}^{N \times N}$
3: Initialise:
   $B \leftarrow I_N$
4: for $i \leftarrow 1$ to $N - 1$ do
5:  $u \leftarrow v_i$
6:  $n \leftarrow N + 1 - i$               ▷ Equals length of vector u
7:  $u_1 \leftarrow u_1 - \text{sign}(u_1)\|u\|_2$
8:  $H \leftarrow I_n - 2\frac{uu^T}{\|u\|_2^2}$    ▷ Householder matrix
9:  $Q \leftarrow I_N$
10: $Q_{\geq i, \geq i} \leftarrow H$       ▷ Embedding Householder matrix in bottom-right corner of reflection -continued Algorithm 2.1 Mathematical procedure of computing an orthonormal matrix B through consecutive House-holder reflections. The resulting matrix can be seen as an eigenvector basis which is advantageous in inferring the covariance matrix. The input vectors can therefore be seen as part of the parametrisation of the covariance matrix, which are learnable by a neural network.

11:  B ← BQ        ▷ Householder reflection of
                   dimensionality n.
12: end for By the eigende composition of $\Sigma$, which is a parametrisation comprising eigenvalues $s \in \mathbb{R}_+^N$ and eigenbasis $B \in \mathbb{R}^{N \times N}$ of the covariance matrix. The eigenbasis is comprised by eigenvectors along its columns. Since B is always orthonormal, we can parametrise this through a process termed consecutive Householder reflections (outlined in Algorithm 2.1), which takes in a set of normal vectors of reflection hyperplanes to construct an arbitrary orthonormal matrix. Then, by embedding the eigenvalues as a diagonal matrix $S \in \mathbb{R}^{N \times N}$, $\mathrm{diag}(S) = s$, the covariance matrix is finally computed via $\Sigma = BSB^{-1}$ (where $B^{-1} = B^T$ holds since B is orthogonal). One advantage with this parametrisation is that the inverse of the covariance matrix (the precision matrix) is easy to evaluate, since $\Sigma^{-1} = BS^{-1}B^{-1}$.

Example: Suppose our entropy model $p_y$ over a (partitioned) latent space is an N-dimensional MVND, $y \sim \mathcal{N}(\mu, \Sigma)$. We will assume that $\Sigma$ is parametrised by its eigendecomposition, the eigenvalues s and eigenbasis B (by Householder). Then, we can perform PCA whitening to decorrelate the zero-centred variables $y - \mu$ by transforming with the inverse of the eigenbasis $$z = B^{-1}(y-\mu) = B^T(y-\mu)$$

where z is the decorrelated latent vector. The decorrelated latent variables are now all mutually independent, and distributed as an uncorrelated MVND with eigenvalues as its variances s $$z \sim \mathcal{N}(0, Is)$$

whose probability mass can be evaluated as a joint factorised normal distribution:

$$P_z = \prod_{i=1}^{N} P_{z_i}(z_i), \quad z_i \sim \mathcal{N}(0, s_i)$$

Approximate Evaluation of Probability Mass

To engage with multivariate distributions in an entropy coding setting, we must be able to unambiguously evaluate probability masses. Normally, for simple univariate parametric distributions, there often exists a closed-form expression for the CDF (Equation (2.7)), which provides easy probability evaluation. This is no longer the case for multivariate parametric distributions.

For any continuous probability distribution with a well-defined PDF, but lacking a well-defined or tractable formulation of its CDF, we can use numerical integration through Monte Carlo (MC) or Quasi-Monte Carlo (QMC) based methods. These methods estimate the probability mass over a hyperrectangular integration region $\Omega \subset \mathbb{R}^N$ on the N-dimensional PDF $p_y(y; \phi)$. These methods rely on uniform sampling of a large number, say M, of pseudo-random or quasi-random perturbation vectors within a zero-centred integration domain, expressed over the dimensions in product form as $\Omega = \prod_{i=1}^{N}[a_i, b_i] = [a_1, b_1] \times [a_2, b_2] \times \ldots \times [a_N, b_N]$. Then, given a sufficiently large sampling size, the probability mass associated with an arbitrary centroid $\hat{y}_n$ over the integration domain $\Omega$ can be approximated by $$P(\hat{y}_n) = V(\Omega) \cdot \mathbb{E}_{\epsilon \sim \mathcal{U}(\Omega)}[p_y(\hat{y}_n + \epsilon)] \approx \frac{V(\Omega)}{M} \sum_{j=1}^{M} p_y(\hat{y}_n + \epsilon_j) \quad (2.13)$$

where $V(\Omega) = \prod_{i=1}^{N}(b_i - a_i)$ is the integration volume over $\Omega$ and the perturbation vector is sampled uniformly within the integration boundaries $\epsilon_j \sim \mathcal{U}(\Omega)$.

Note that MC- and QMC-based evaluation of probability mass can be done both for univariate and multivariate distributions. This method is also not directly backpropagatable because of the sampling process, however it would be feasible to employ this method in gradient-based training by using gradient overwriting. Furthermore, to avoid non-deterministic probability mass evaluations between encoding and decoding, the same pseudo- or quasi-random process must be agreed upon between either sides of the transmission channel.

In the special case for an MVND, there exists another way of evaluating an approximate probability mass (apart from the PCA whitening approach as explained in previous section) which actually is differentiable. The method will be described in the example below.

Example: A joint distribution p(y) that belongs to the family of MVND, has the property that the conditional distributions of its variables are also normally distributed. That is, the conditional distribution of a variable, given the previous variables, $p(y_i | y_1, \ldots, y_{i-1})$ is a univariate Gaussian with the conditional parameters $\phi_i = (\overline{\mu}_i, \overline{\sigma}_i)$. Assuming the usual parametrisation of our MVND, $\mu$ and $\Sigma$, the conditional parameters can be retrieved as such $$\overline{\mu}_i = \mu_i + C_i \left( \begin{bmatrix} y_1 \\ y_2 \\ \vdots \\ y_{i-1} \end{bmatrix} - \begin{bmatrix} \mu_1 \\ \mu_2 \\ \vdots \\ \mu_{i-1} \end{bmatrix} \right)$$

$$\overline{\sigma}_i^2 = \Sigma_{i,i} - C_i \begin{bmatrix} \Sigma_{1,i} \\ \Sigma_{2,i} \\ \vdots \\ \Sigma_{i-1,i} \end{bmatrix}$$

where $C_i$ is the matrix of regression coefficients $$C_i = \begin{bmatrix} \Sigma_{1,i} & \Sigma_{2,i} & \cdots & \Sigma_{i-1,i} \end{bmatrix} \begin{bmatrix} \Sigma_{1,1} & \Sigma_{1,2} & \cdots & \Sigma_{1,i-1} \\ \Sigma_{1,2} & \Sigma_{2,2} & \cdots & \Sigma_{2,i-1} \\ \vdots & \vdots & \ddots & \vdots \\ \Sigma_{1,i-1} & \Sigma_{2,i-1} & \cdots & \Sigma_{i-1,i-1} \end{bmatrix}^{-1}$$

and where the inverse operation is the generalised (Moore-Penrose) pseudoinverse.

With the conditional parameters, the probability mass would be estimated in the same way as a univariate normal distribution. Importantly, this formulation is only approximate since the conditioning occurs over a single point, whereas in reality, the probability mass is evaluated over a closed interval on the probability density function. In practice however, as long as the distribution is not converging towards a degenerate case, this method provides a useful approximation for probability mass evaluation whenever E is obtained directly and rate evaluation requires differentiability.

Figure 22:
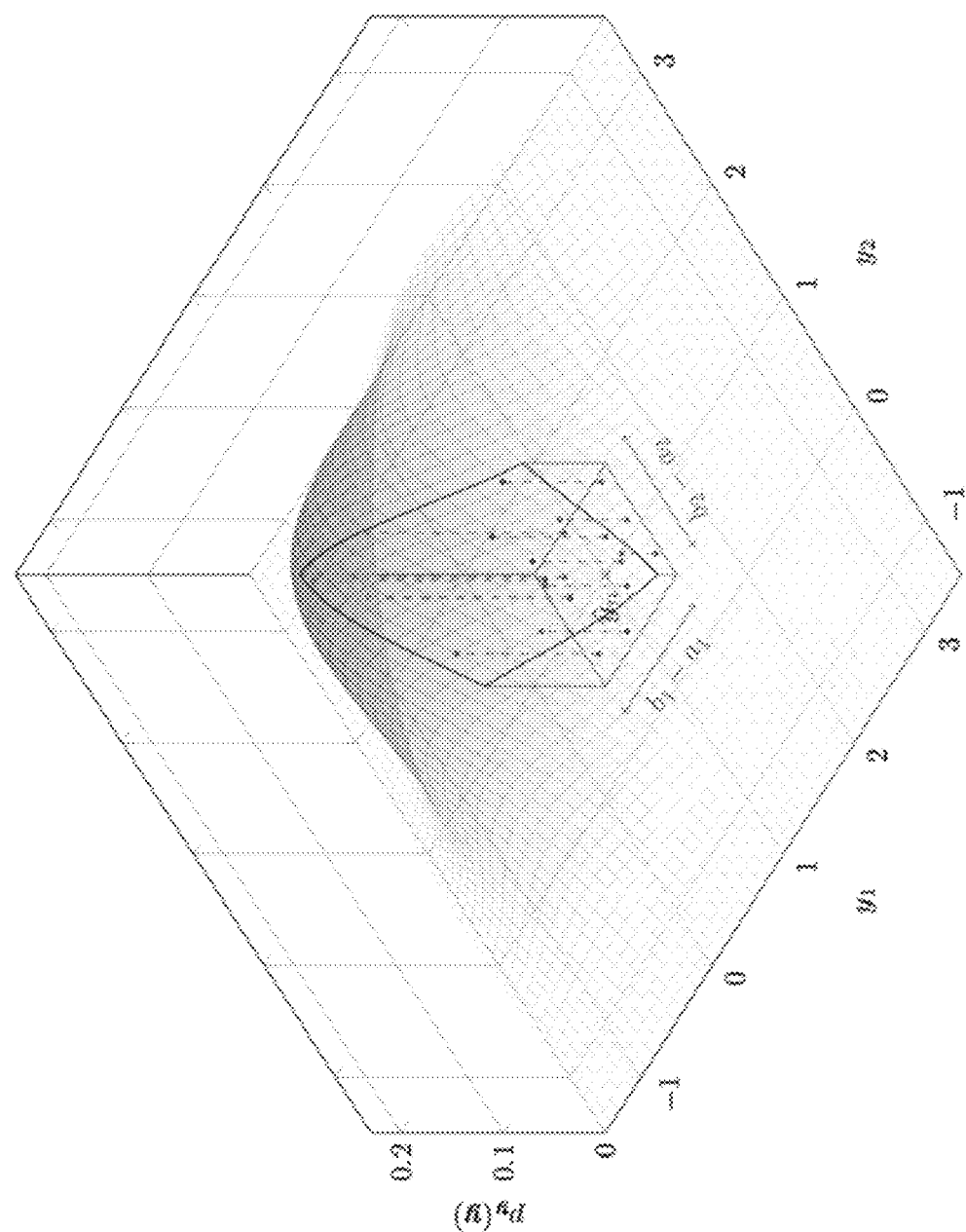
FIG. 22 shows an example visualisation of a MC- or QMC-based sampling process of a joint density function in two dimensions. The samples are about a centroid $\hat{y}$ with integration boundary $\Omega$ marked out by the rectangular area of width $(b_1-a_1)$ and $(b_2-a_2)$. As per Equation (2.13), the probability mass equals the average of all probability density evaluations within $\Omega$ times the rectangular area.

FIG. 22 shows an example visualisation of a MC- or QMC-based sampling process of a joint density function in two dimensions. The samples are about a centroid ŷ with integration boundary Ω marked out by the rectangular area of width ($b_1-a_1$) and ($b_2-a_2$). As per Equation (2.13), the probability mass equals the average of all probability density evaluations within Ω times the rectangular area.

Copulas

We established that multivariate probability density distributions are hard to learn and evaluate with naive methods and require specific approaches to make them work. One of these is using Copula.

In probability theory and statistics, a copula is a multivariate cumulative distribution function for which the marginal probability distribution of each variable is uniform on the interval [0, 1]. Copulas are used to describe the dependence between random variables. In short, Copula is a way to get value from a joint probability distribution using marginal distributions plus a couple-function (→the Copula). This couple function is there to introduce correlation/dependencies between the marginals.

Let's assume we modelled the latent space with a factorised distribution $\{P_{y1}, \ldots, P_{yN}\}$, but we want to model it using a joint distribution $P_y(\cdot)$. If we assume that our factorised distributions are the marginal distribution of the joint distribution, we can use Copula. Note that this assumption is not always valid, but there are classes of distributions for which this holds, e.g. the multivariate normal distribution, the multivariate Laplace distribution, and others. If we want the joint (multivariate) cumulative distribution function $\text{CumP}_y(y_1, y_2, \ldots, y_N) = \text{Prob}(Y_1 \leq y_1, \ldots, Y_N \leq y_N)$, we can express $\text{CumP}_y(\cdot)$ as a Copula function C with inputs being the evaluation of the marginal cumulative distributions:

$$\text{CumP}_y(y_1, y_2, \ldots, y_N) = C(\text{CumP}_{Y_1}(y_1), \ldots, \text{CumP}_{Y_N}(y_N)) \quad (2.14)$$

Moreover, we can get the density function of the joint distribution by simply differentiating the copula function. Let $P_y$ be the joint density function and $P_{yi}$ the factorised density functions. To illustrate:

$$P_y(y_1, y_2, \ldots, y_N) = c(\text{CumP}_{Y_1}(y_1), \ldots, \text{CumP}_{Y_N}(y_N)) \cdot P_{Y_1}(y_1) \ldots P_{Y_N}(y_N) \quad (2.15)$$

Figure 23:
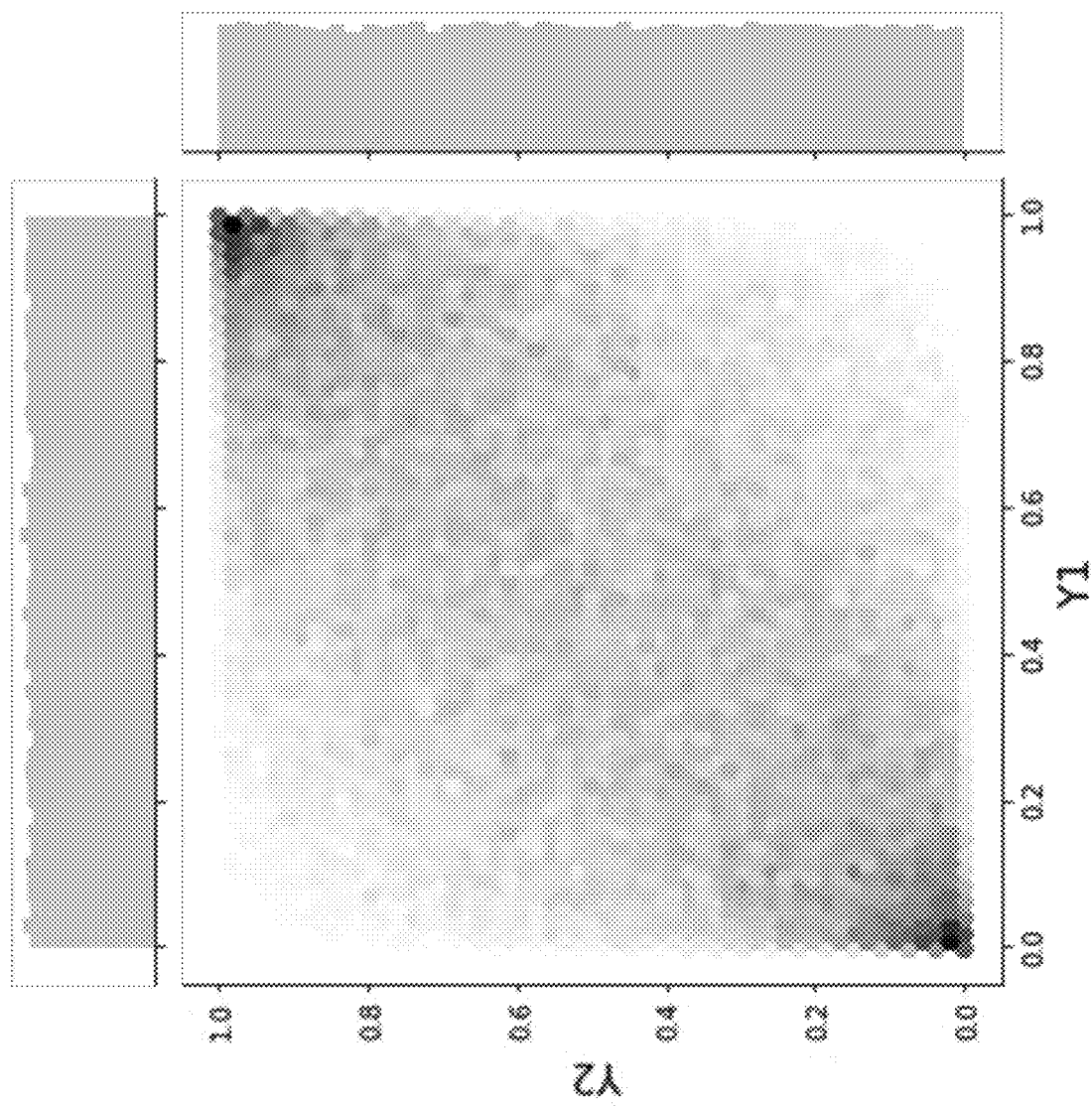

The above equation states that the properties of dependence are often efficiently analysed using copulas. An n-dimensional copula is just a fancy name for a joint probability distribution on the unit square $[0, 1]^2$ with uniform marginals. FIG. 23 visualises a bivariate Copula.

So what is the Copula function C(·), and how to create it? The copula C contains all information on the dependence structure between the components of $(Y_1, Y_2, \ldots, Y_N)$. The Copula C(·) is the joint distribution of the cumulative transformed marginals.

The transformed marginals into [0, 1] (probability space):

$$(U_1, \ldots, U_N) = (\text{CumP}_{Y_1}(y_1), \ldots, \text{CumP}_{Y_N}(y_N)) \quad (2.16)$$

The Copula function:

$$C(u_1, \ldots, u_N) = \text{Prob}(U_1 \leq u_1, \ldots, U_N \leq u_N) \quad (2.17)$$

Let's go through an example to build an intuition behind what Copula is. It is often used to generate correlated random variables of "difficult" distributions. Let's assume we want correlated random variables from a joint (multivariate) hyperbolic distribution. Well, no library can quickly generate these, so what can we do?

Figure 24:
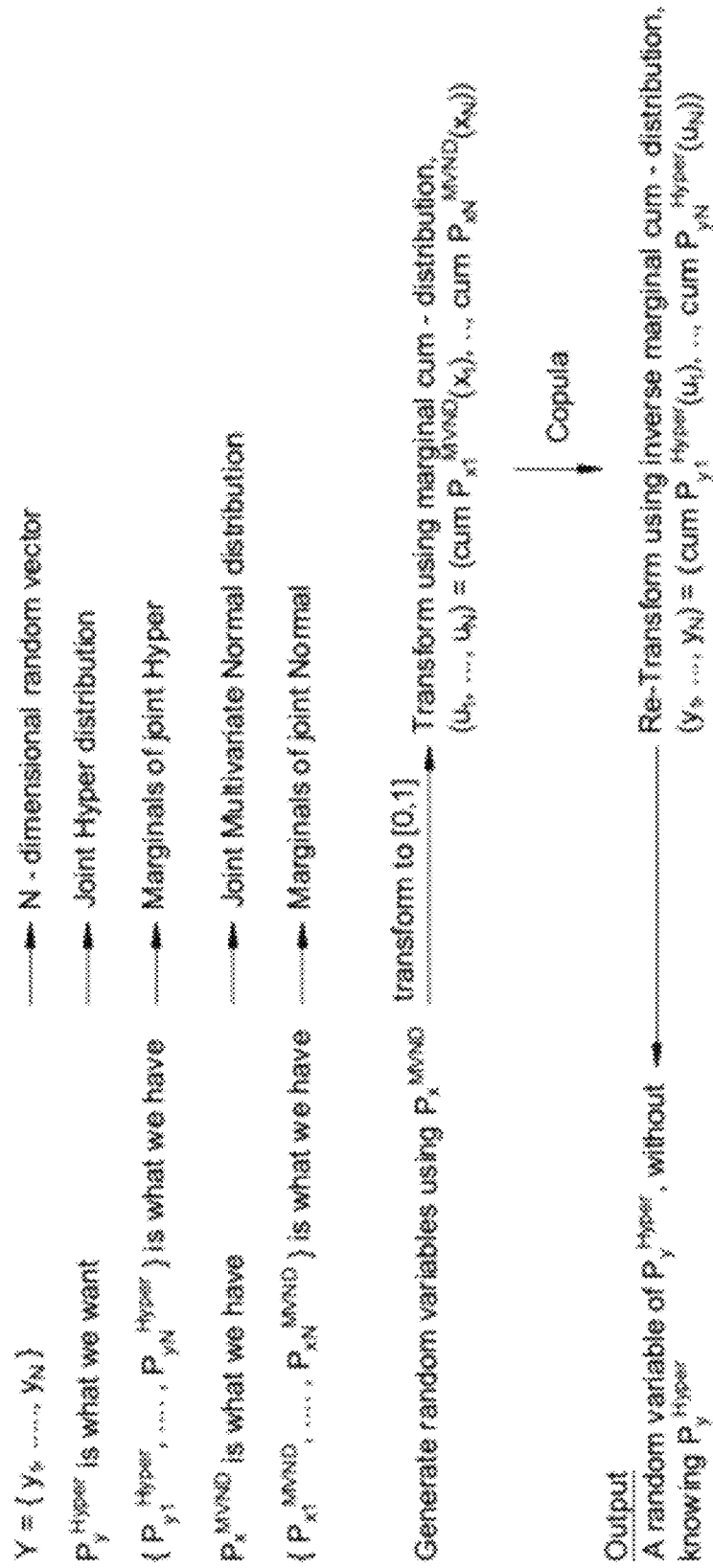
FIG. 24 shows an example of how to use Copula to sample correlated random variables of an arbitrary distribution.

If we know the marginal (factorised) distributions of the joint distribution and the correlation that we want, the task is possible. We simulate random correlated variables given the joint multivariate distribution. We transform them to correlated variables in [0,1] using the joint normal distribution's marginals' cumulative distributions. We re-transform these values in a joint hyperbolic distribution by using the inverse marginal cumulative distributions of the joint hyperbolic. FIG. 24 illustrates an example of this process.

This process is only possible by using the Copula approach.

Our innovation is to use Copula for latent distribution modelling in two ways:

1. It gives us an effective way to create an n-dimensional correlated random variable of an arbitrary distribution (see FIG. 24 for example). This is tremendously useful to model "better" noise when using multivariate joint distributions for latent modelling. When we train our neural network, we have to use noise to guarantee a Gradient flow. If we are in the n-dimensional world, our noise must be correlated, and Copula lets us generate and learn such noise.

2. If we want to learn a joint probability distribution, either discrete or continuous, Copula gives us an effective way of imposing marginal distribution constraints on the learned joint distribution. Usually, when learning a joint distribution, we can not control the marginals. However, we can use the Equation (2.15) to impose marginal constraints. In this case, we would learn the Copula (joint uniform distribution), have our marginals given and combine them to a joint distribution that respects our marginals.

Characteristic Functions

In our world, for everything, there is a dual-representation or duality. For instance, in Physics, we have the Wave-particle duality; for images, we have their representation in the spatial or the frequency domain, and for probability distributions, we have their characteristic functions. Usually, in one world, we can evaluate points easily but struggle with their impact on the surrounding area (particles, spatial domain, probability functions); whereas in the other, we can evaluate their waveform easily but struggle with their impact at a specific point (waves, frequency domain, characteristic functions).

If a random variable admits a density function, then the characteristic function is its dual, in the sense that each of them is a Fourier transform of the other. Let $\varphi_X(t)$ be the characteristic function at (wave) position t for random variable X. If the random variable X has the probability density function $f_X(x)$ and the cumulative distribution function $F_X(x)$, then the characteristic function is defined as follows:

$$\varphi_X(t) = E[e^{itX}] = \int_{\mathbb{R}} e^{itx} dF_X(x) = \int_{\mathbb{R}} e^{itx} f_X(x) dx \quad (2.18)$$

The following table summarises the above paragraph. Note that point evaluation in the spatial domain is equivalent to wave evaluation in the wave domain. The wave evaluation in the spatial domain is equal to point evaluation in the wave domain.

|  | Probability Density Functions | Characteristic Functions |
| --- | --- | --- |
| Point Evaluations in Spatial Domain: | Easy | Hard |
| Wave Evaluations in Spatial Domain: | Hard | Easy |
| Point Evaluations in Wave Domain: | Hard | Easy |
| Wave Evaluations in Wave Domain: | Easy | Hard |

Figure 25:
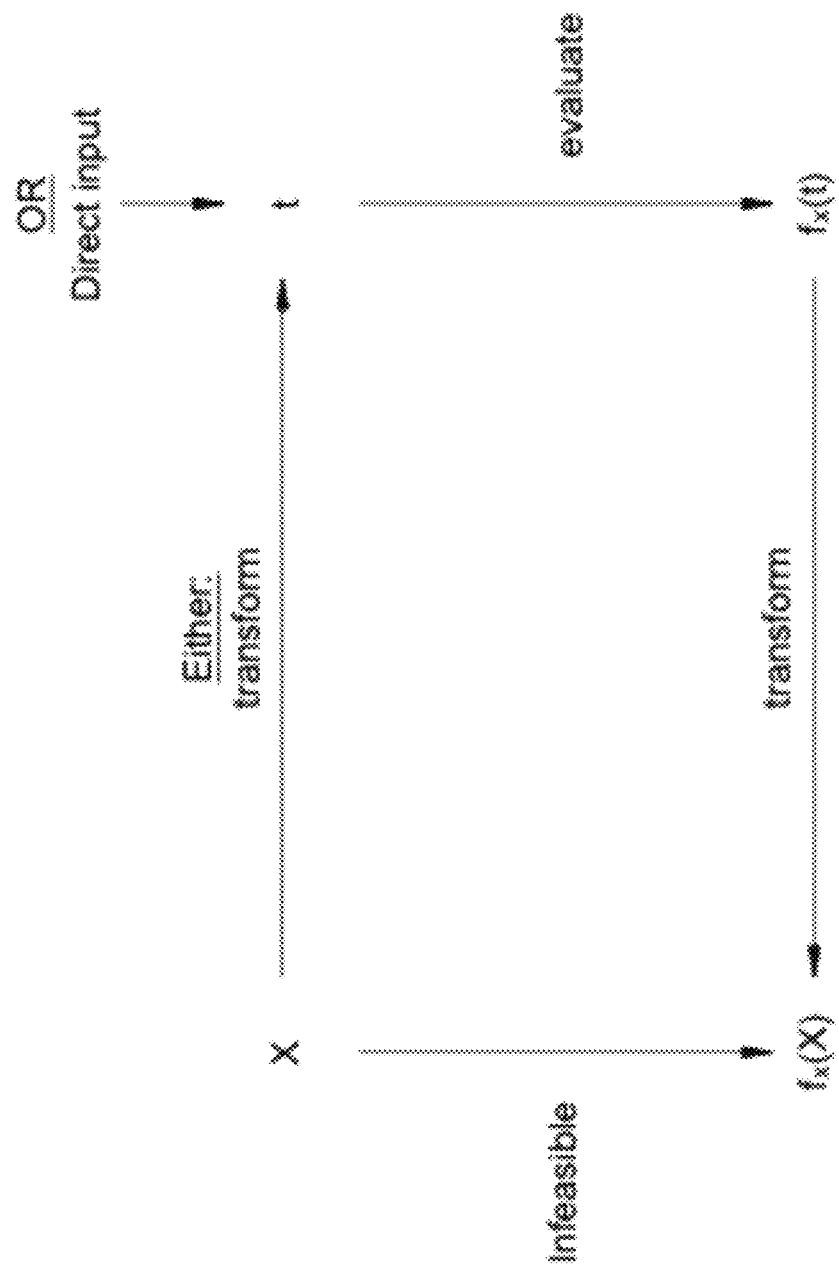
FIG. 25 shows an indirect way to get a joint distribution using characteristic functions.

Our innovation is to combine our latent density modelling with the characteristic function in multiple ways:
1. Suppose we want to learn a probability density function over the latent space. In that case, it is often easier to learn its characteristic function instead and then transform the learned characteristic function into a density function using the Fourier Transform. Why is this helpful? The purpose of characteristic functions is that they can be used to derive the properties of distributions in probability theory. Thus, it is straightforward to integrate desired probability function constraints, e.g. restrictions on the moment-generating function, $\varphi_X(-it)=M_X(t)$, into the learning procedure. In fact, combining characteristic functions with a learning-based approach gives us a straightforward way of integrating prior knowledge into the learned distribution.
2. Using probability density functions, we are in the dual-formulation of the spatial world. Point-evaluations are easy (e.g. factorised models), group-/wave-evaluations are hard (e.g. joint probability models). Using characteristic functions is precisely the opposite. Thus, we can use characteristic functions as an easy route to evaluate joint probability distributions over the pixel space x by evaluating factorised distributions over the wave space t. For this, we transform the input of the latent space into the characteristic function space, then evaluate the given/learned characteristic function, and convert the output back into the joint-spatial probability space. FIG. 25 visualises an example of this process.

2.4.3 Mixture Models

Most of the parametric distributions that have been explored here thus far exhibit unimodality, i.e. their PDF formulation has at most a single peak or cluster. There is nothing that restricts the true latent distribution from being multimodal, or having multiple distinct peaks. In fact, this is especially true for multidimensional latent spaces since signals tend to aggregate into clusters if they carry similar information, and separate from others if the information is dissimilar. This creates a natural proclivity for multimodality of the latent space. If the latent space truly is multimodal, a unimodal entropy model will not be able to model it perfectly.

In order to incorporate multimodality to entropy modelling, it is possible to employ mixture models as prior distribution. A mixture model is comprised by K number of mixture components, which are base distributions either from the same family of distributions or different, including non-parametric families of distribution (see Section 2.4.4). The PDF $p_y$ is then a weighted sum of each mixture component, indexed by [k]

$$p_y(y) = \pi^{[1]} p_y^{[1]}(y) + \pi^{[2]} p_y^{[2]}(y) + \ldots + \pi^{[K]} p_y^{[K]}(y) = \sum_{k=1}^{K} \pi^{[k]} p_y^{[k]}(y) \quad (2.19)$$

where $\pi^{[k]} \in [0, 1]$ represents the mixture weight for the PDF of the kth component $p_y^{[k]}$. All mixture components must be defined over the same vector space, and all mixture weights have to sum up to one to ensure a proper probability distribution $\mathbf{1}[k]=1$ (which can be done with a simple softmax operation). This implies that a mixture model actually generalises all distributions (see FIG. 17 for example), since it can easily model unimodal distributions by setting all r[k] but one to zero.

Figure 26:
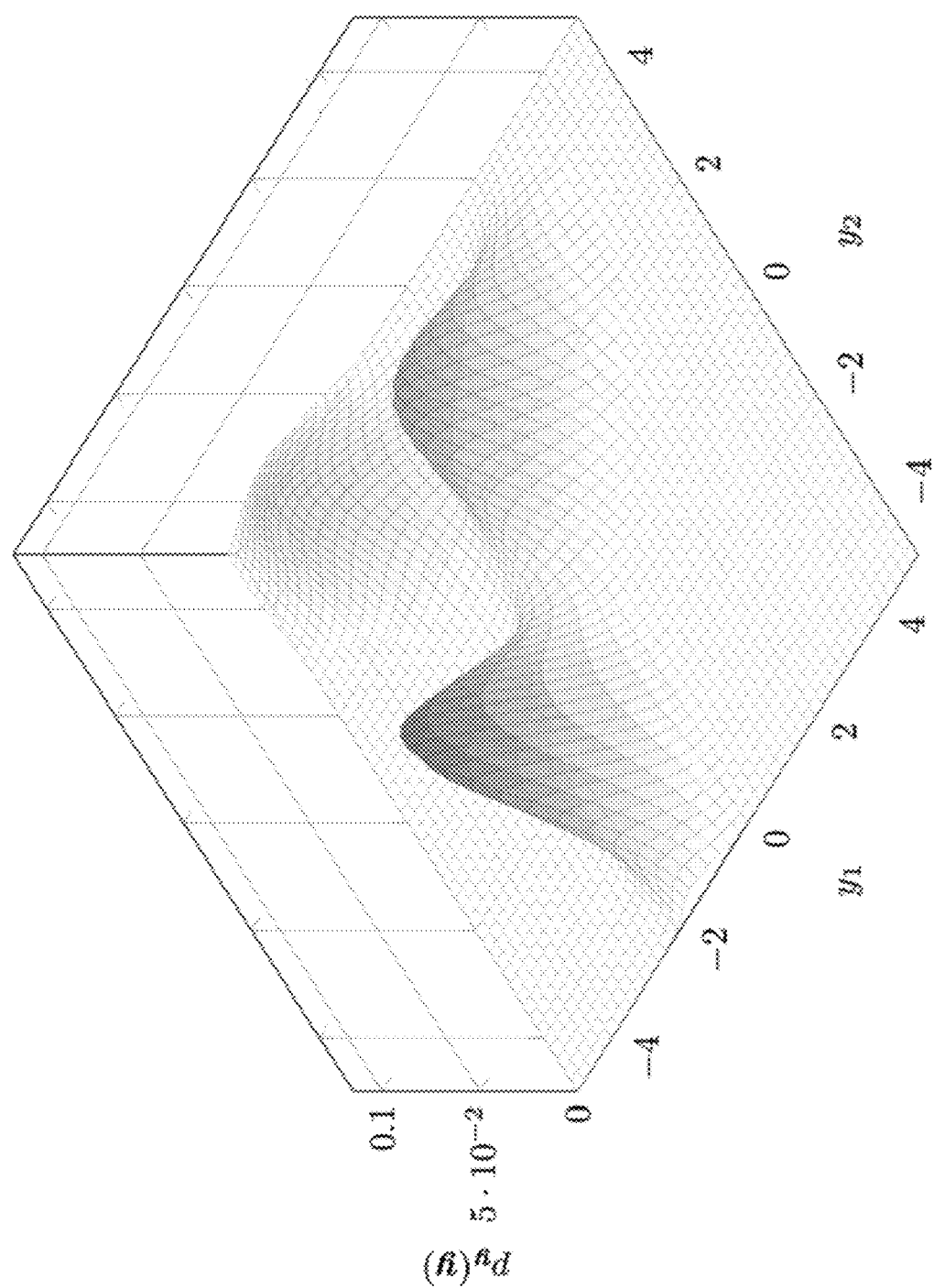
FIG. 26 shows a mixture model comprising three MVNDs, each parametrisable as individual MVNDs, and then summed with weightings.

FIG. 26 shows an example of a mixture model comprising 3 MVNDs, each parametrisable as individual MVNDs, and then summed with weightings.

2.4.4 Non-Parametric Probability Distributions

A main drawback with parametric probability distributions is that they, ironically, impose a prior on the distribution it tries to model. If the distribution type is not compatible with the optimal latent space configuration, the prior effectively stifles the learning process.

We have investigated the generation of non-parametric probability distributions for entropy modelling. Non-parametric probability models are not defined a priori by a parametric family of distributions, but are instead inferred from the data itself. This gives the network many more degrees of freedom to learn the specific distribution that it needs to model the data accurately. The more samples per unit interval, the more flexible the distribution. Important examples are histogram models and kernel density estimation.

There are multiple ways of modelling the distribution without a parametric form. One simple way is to train a neural network l=fgp(t), parametrised by network weights, biases and activations p which takes the range of values with non-zero probability as input t and outputs logits l for discrete probability masses for the range. For example, if the quantised latents $\hat{y} \in \mathbb{Q}$ consist of rounded integers with minimum and maximum ($\hat{y}_{min}$, $\hat{y}_{max}$) respectively, then t={$\hat{y}_{min}$, $\hat{y}_{min}+1$, ..., $y_{max}-1$, $y_{max}$}. The outputted logits would be of the same size as its input $f_\psi: \mathbb{R}_Q^{|t|} \to \mathbb{R}^{|t|}$, where |t| denotes the number of elements in the vector t. To ensure that we obtain a valid probability distribution, the logits must sum up to one either by normalisation $$P(y_i) = \frac{\text{abs}(l_i)}{\sum_{j=1}^{|t|} \text{abs}(l_j)} \text{ or } P(y_i) = \frac{l_i^2}{\sum_{j=1}^{|t|} l_j^2}$$

or using the softmax operation $$P(y_i) = \frac{\exp(l_i)}{\sum_{j=1}^{|t|} \exp(l_j)}$$

Figure 27:
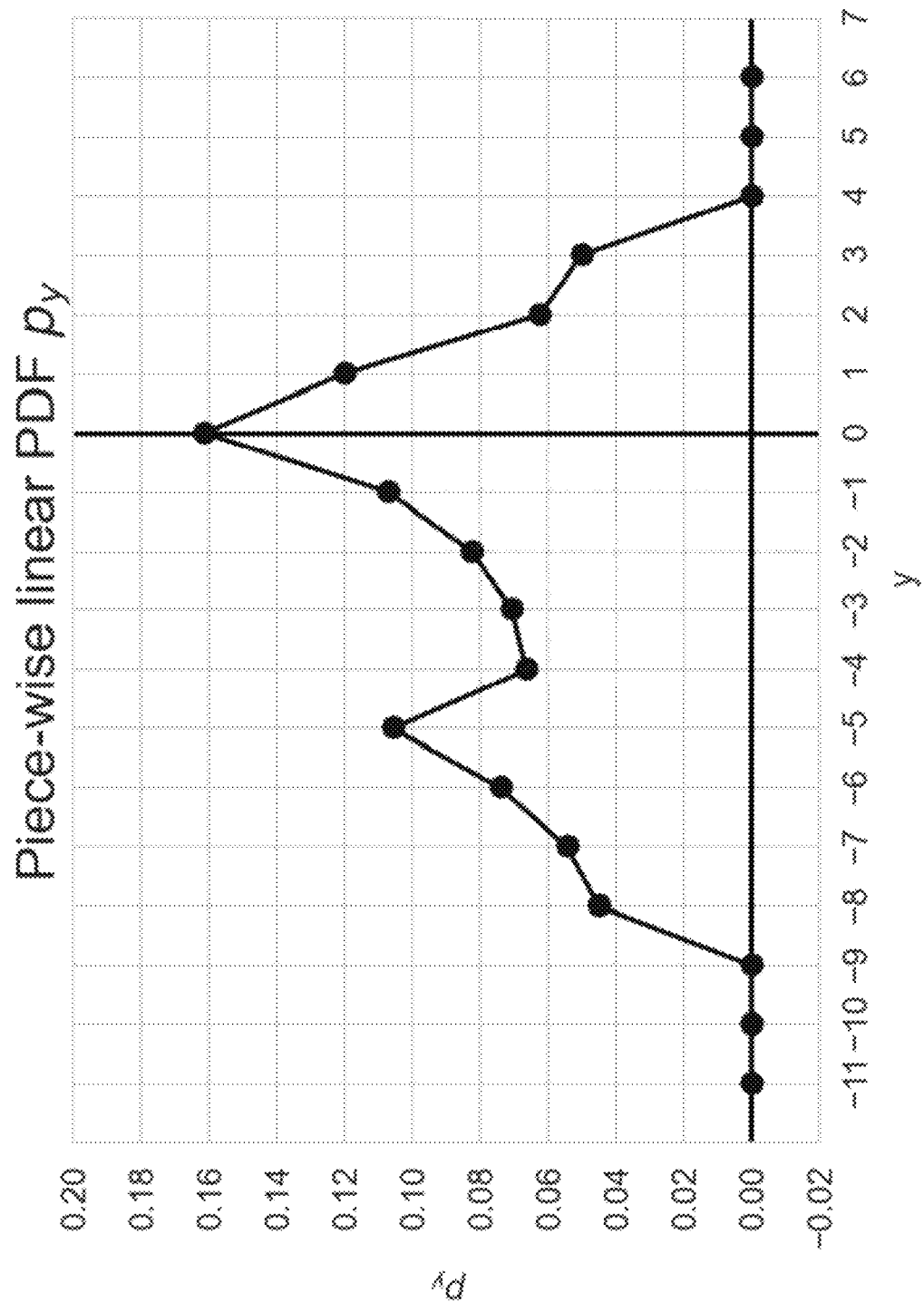
FIG. 27 shows an example of a PDF for a piece-wise linear distribution, a non-parametric probability distribution type, defined across integer values along the domain.

This strategy of learning a discrete PMF can be extended to learning a continuous PDF by interpolating the values between adjacent discrete points ($P(y_i)$, $P(y_{i+1})$) that are obtained. Extra care must be taken to ensure that the probability density integrates up to one. If linear (spline) interpolation is used, we obtain a piece-wise linear density function whose integral can be easily evaluated using the trapezoidal rule (see FIG. 27 for example). If spline interpolation of a higher order is used, more powerful numerical integration methods such as Simpson's rule or other Newton-Cotes formulas (up to a small degree of error) may be used.

However, this strategy comes with two problems; the range of values t must be finite and known in advance, and the array indexing operations (which is inherently discrete)

that is required to infer probabilities does not lend itself well to automatic differentiation frameworks. Hence, another method of interest is learning a 1-D (factorisable) cumulative density function (CDF) which can then be used with Equation (2.7) for rate evaluation. This method relies on designing, parametrising and training a neural network that maps a value directly to a continuous CDF, $f_\psi: \mathbb{R} \to [0, 1]$ which satisfies two constraints:

Cumulative density bounds: $f_\psi(-\infty)=0$; $f_\psi(\infty)=1$
Monotonicity:

$$\frac{\partial f_\psi}{\partial y_i} = p_\psi(y_i) \geq 0$$

The first constraint can be satisfied by performing a sigmoid operation $$\sigma(x) = \frac{1}{1 + \exp(-x)}$$

on the return value, or any other range-constraining operation (such as clipping, projection, etc). For the second constraint, there are many possibilities to satisfy this which depends on the network architecture of $f_\psi$. For instance, if the network is comprised by a composition of K vector functions (convolutions, activations, etc)

$$f_\psi = f_K \circ f_{K-1} \circ \ldots \circ f_1 \quad (2.20)$$

its partial derivative with respect to the input, i.e. the PDF $p_\psi$, is defined as a chain of matrix multiplications of the Jacobian matrices (which describes partial derivatives with respect to a vector-valued function) of all function components:

$$p_\psi = J_{f_K} J_{f_{K-1}} \ldots J_{f_1} \quad (2.21)$$

Without loss of generality, to satisfy the monotonicity constraint, we must ensure that the Jacobian matrix of each function component with respect to the input is non-negative. Examples how this is ensured is by using monotonic (strictly increasing) activation function such as ReLU, Leaky ReLU (with a positive slope), sigmoid and the hyperbolic tangent, and ensuring that all elements in weight matrices of the linear layers are non-negative. Since the method with which the CDF constraints are satisfied varies with the network architecture of $f_\psi$, the details of how this is implemented is not the important aspect, but rather the step of satisfying these constraint to admit a proper CDF is important.

2.5 Concepts

In this section, we present the following concepts regarding flexible entropy modelling of latent distributions for AI-based data compression with details outlined in the referenced sections. These are considered under the context of entropy modelling of the latent distributions as well as the wider domain of AI-based data compression.

Section 2.4.1, "Flexible Parametric Distributions for Factorised Entropy Modelling"
  Application of continuous parametric distributions for entropy modelling and the wider domain of AI-based compression, and any associated parametrisation processes therein, including parametric distribution families that generalises the landscape of admissible distributions for entropy modelling (such as the family of exponential power distributions);
  Application of continuous parametric distributions, and any associated parametrisation processes therein, for entropy modelling associated with a "shape", "asymmetry" and/or "skewness" parameter;
  Application of discrete parametric distributions, and any associated parametrisation processes therein, for entropy modelling.

Section 2.4.2, "Parametric multivariate distributions"
  Application of parametric multivariate distributions, factorisable as well as non-factorisable, and any associated parametrisation processes therein, for AI-based data compression; including, but not limited to, the distribution types listed in Table 2.3;

Section 2.4.2, "Latent Space Partitioning for Tractable Dimensionality"
  Application of a partitioning scheme on any vector quantity, including latent vectors and other arbitrary feature vectors, for the purpose of reducing dimensionality in multivariate modelling.

Section 2.4.2, "Parametrisation of intervariable dependencies"
  Parametrisation and application of consecutive Householder reflections of orthonormal basis matrices, e.g. Algorithm 2.1;
  Evaluation of probability mass of multivariate normal distributions leveraging the PCA whitening transformation of the variates.

Section 2.4.2, "Approximate evaluation of probability mass"
  Application of deterministic or stochastic MC and QMC-based methods for evaluation of probability mass of any arbitrary multivariate probability distribution.
  Evaluation of probability mass of multivariate normal distributions by analytically computing conditional parameters from the distribution parametrisation.

Section 2.4.2, "Copulas"
  We can use Copula to generate an n-dimensional noise vector of arbitrary distribution with arbitrary correlation. Among others, we can use this noise vector for better quantisation-residual modelling training the AI-based Compression Pipeline.
  If we use a multivariate distribution for latent space modelling and require constraints on the joint distribution's marginal distributions, we can use Copula to enforce our restrictions.

Section 2.4.2, "Characteristic Functions"
  Instead of learning the density function of our distribution for latent space modelling, we can learn its characteristic function. This is the same as there is a unique link between both. However, learning the characteristic function gives us a more straightforward way to integrate distribution constraints (e.g. on the moments) into the probability function.
  Learning the characteristic function is more powerful than learning the probability function, as the former generalises the latter. Thus, we get more flexible entropy modelling.
  Learning the characteristic function gives us a more accessible and more potent way to model multivariate distributions, as waves (n-dimension input) are modelled as points in the frequency domain. Thus, a factorised characteristic function distribution equals a joint spatial probability function.

Section 2.4.3, "Mixture models"
  Application of mixture models comprised by any arbitrary number of mixture components described by univariate distributions, and any associated parametrisation processes therein, for entropy modelling and the wider domain of AI-based compression.

Application of mixture models comprised by any arbitrary number of mixture components described by multivariate distributions, and any associated parametrisation processes therein, for entropy modelling and the wider domain of AI-based compression.

Section 2.4.4, "Non-parametric probability distributions"

Application of probability distributions parametrised by a neural network in the form of spline interpolated discrete probability distribution, and any associated parametrisation and normalisation processes therein, for entropy modelling and the wider domain of AI-based compression.

Application of probability distributions parametrised by a neural network in the form of continuous cumulative density function, and any associated parametrisation processes therein, for entropy modelling and the wider domain of AI-based compression.

3. Accelerating AI-Based Image and Video Compression Neural Networks

3.1 Introduction

Real-time performance and fast end-to-end training are two major performance requirements of an AI-based compression pipeline. To these ends, we have incorporated fast iterative solvers into a compression pipeline, accelerating both inference, leading to real-time performance, and accelerating the end-to-end training of the compression pipeline. In particular, iterative solvers are used to speed up probabilistic models, including autoregressive models, and other probabilistic models used in the compression pipeline. Additionally, iterative solvers are used to accelerate the inference speed of neural networks.

AI-based compression algorithms have achieved remarkable results in recent years, surpassing traditional compression algorithms both as measured in file size and visual quality. However, for AI-based compression algorithms to be truly competitive, they must also run in real-time (typically >30 frames-per-second). To date, the run-time issue has been almost completely ignored by the academic research community, with no published works detailing a viable real-time AI-based compression pipeline.

We have however made significant progress towards achieving a real-time AI-based compression pipeline. Here we outline one of our methods for attaining real-time AI-based compression, namely: accelerating AI-based compression using iterative methods for solving linear and non-linear equations. Iterative methods for equation solving improve several aspects of the AI-based compression pipeline. In particular they speed up the execution of Neural Networks, and significantly reduce the computational burden of using various probabilistic models, including autoregressive models.

Moreover, aside from improving inference speeds (leading to real-time performance), iterative methods can significantly reduce the end-to-end training times of an AI-based compression pipeline, which we will also discuss.

3.1.1 Iterative Methods for Equation Solving

First we review iterative methods for solving systems of equations. Suppose we have a set of N variables $x_1, x_2, \ldots, x_N$. Suppose also we have M functions, $f_1, \ldots, f_M$, each of which takes in the N variables and outputs a scalar (a single number). This defines a system of equations $$f_1(x_1, x_2, \ldots, x_N) = 0$$
$$f_2(x_1, x_2, \ldots, x_N) = 0$$
$$\vdots$$
$$f_M(x_1, x_2, \ldots, x_N) = 0$$

For brevity we can write this system in vector notation. Define the vector $x=(x_1, \ldots, x_N)$ and the vector-valued function $f=(f_1, \ldots, f_M)$. Then the system is simply written $$f(x)=0 \quad (3.1)$$

A solution to (3.1) is a particular x that, when evaluated by $f$, makes (3.1) true. Importantly, not all x are solutions. Finding solutions to (3.1) is in fact difficult, in general. Only in very special cases, when the system of equations has special structural properties (such as triangular systems), can a solution to (3.1) be solved exactly, and even then, exact solutions may take a very long time to compute.

This is where iterative methods for equation solving arise. An iterative method is able to compute (possibly approximate) solutions to (3.1) quickly by performing a sequence of computations. The method begins with a (possibly random) guess as to what the solution of (3.1) is. Then, each computation (iteration) in the sequence of computations updates the approximate solution, bringing the iterations closer and closer to satisfying (3.1).

Take for example, the method of fixed-point iteration (sometimes called Jacobi iteration). This method works as follows. An first guess at a solution $x^0$ is initialized (e.g. by drawing ---
Algorithm 3.1
Fixed Point Iteration Given tolerance $\epsilon$; start point $x^0$
Initialize $x \leftarrow x^0$
while $\|f(x)\| > \epsilon$ do
    $x \leftarrow f(x)$
end while
--- variables randomly, or by setting the initial iterate to zero). Then, for all following iterations t=1, 2, ... the iterate is set as $x^{t+1}=f(x^t)$. Under suitable conditions, the sequence of iterates will converge to a solution of (3.1). The iterations are terminated when the approximate solution is close enough to the true solution (usually measured via the residual $\|f(x^t)\|$). Fixed point iteration is guaranteed to converge if the function $f$ is contractive (its global Lipschitz constant is less than one).

Fixed point iteration is a very basic method and more sophisticated approaches are available. These include Gauss-Seidel, in which portions of the current iterate $x^t$ are used to compute the previous iterate $x^{t-1}$ Inexact Newton's methods, in which (3.1) is linearly approximated at each iterate, and the new iterate is chosen to reduce the residual of the linear approximation. Some example Inexact Newton's methods are: Broyden's method, BFGS, L-BFGS Methods which seek to minimize a (scalar) merit function, which measures how close the iterates are to being a solution (such as the sum-of-squares $\Sigma_{i=1}^M f_i(x)^2$). These include:

Trust-region methods, in which the next iterate is chosen to decrease a quadratic model of the merit function in a small neighbourhood about the current iterate.

Line-search methods, in which the next iterate is chosen to decrease the merit function along a search direction. The search direction is chosen by approximating the merit function using a quadratic model.

methods that approximate the Hessian (matrix of second derivatives) of the merit function with a low-rank approximation first order methods which only use gradient or sub-gradients. In this setting, the solution of the system is found by reformulating the problem as finding the minimum of a scalar objective function (such as a merit function). Then, a variable is optimized using a (sub-)gradient-based optimization rule. A basic form of this is gradient descent. However more powerful techniques are available, such as proximal-based methods, and operator splitting methods (when the objective function is the sum of several terms, some terms may only have sub-gradients but closed-form proximal operators).

Each of these methods can be shown to converge to a solution, given particular constraints on the function $f$. Often these constraints involve calculating bounds on the minimum and maximum eigenvalues of the Jacobian of $f$. Convexity requirements may be required for convergence to a unique solution, but are not in general needed for convergence to a solution.

3.2 Innovation: Iterative Solvers for Autoregressive Models in a Compression Pipeline In an AI-based compression pipeline, we seek to compress an image or video $x=(x_1, x_2, \ldots, x_N)$, where x is a vectorized representation of the image or video. Each component $x_1$ of the vector is a pixel of the image (or frame, if discussing videos). To encode the image or video as an image, we need a joint probability model $p(x)$ which measures the likelihood of the image occurring. The filesize of the encoded image is bounded above by the (cross-)entropy of the probability model—the closer the probability model is to the true distribution of images, the better the compression rate (filesize).

However, working with the joint distribution is difficult. Instead, we may exploit the chain rule of probability: the joint distribution is equal to a product of conditional distributions. That is, we will factorize the joint distribution as follows:

$$p(x) = p(x_1, x_2, \ldots, x_n)$$
$$= p(x_1)p(x_2 \mid x_1)p(x_3 \mid x_2, x_1) \ldots p(x_N \mid x_{N-1}, x_{N-2}, \ldots, x_1)$$
$$= \prod_{i=1}^{N} p(x_i \mid x_{1:i-1})$$

Each of the $p(x_i \mid x_{1:i-1})$ are conditional probabilities. They measure the probability that pixel $x_i$ occurs, given that the value of the preceding pixels $x_{1:i-1}$.

This factorized distribution, as a product of conditional distributions, is in general much easier to work with. This is especially true in image and video compression. When an image is compressed, and sent as a bitstream, it is not the value of the pixels x that is sent, but rather a vector of conditional probability values that is actually converted to a bitstream. This conditional probability vector is defined as $$\hat{p} = \begin{bmatrix} p(x_1) \\ p(x_2 \mid x_1) \\ p(x_3 \mid x_2, x_1) \\ \vdots \\ p(x_{N-1} \mid x_{N-2}, \ldots, x_1) \\ p(x_N \mid x_{N-1}, \ldots, x_1) \end{bmatrix} \quad (3.2)$$

To emphasize, the vector $\hat{p}$ is the quantity that is actually compressed (by sending it to for example an arithmetic encoder). At decode time, when the image is to be recovered, we must recover x from the conditional probability vector. In other words, we must solve for x from the system of equations $$p(x_1) = \hat{p}_1 \quad (3.3)$$
$$p(x_2 \mid x_1) = \hat{p}_2$$
$$p(x_3 \mid x_2, x_1) = \hat{p}_3$$
$$\vdots$$
$$p(x_{N-1} \mid x_{N-2}, \ldots, x_1) = \hat{p}_{N-1}$$
$$p(x_N \mid x_{N-1}, \ldots, x_1) = \hat{p}_N$$

This is an inverse problem, a system of equations that can be solved using one of the iterative methods described above. To make the link to Equation (3.1) clear, we could define the vector valued function $f$ as the vector of conditional probability functions minus $\hat{p}$. Then the system of equations is in the form of (3.1):

$$f(x) := \begin{bmatrix} p(x_1) \\ p(x_2 \mid x_1) \\ p(x_3 \mid x_2, x_1) \\ \vdots \\ p(x_{N-1} \mid x_{N-2}, \ldots, x_1) \\ p(x_N \mid x_{N-1}, \ldots, x_1) \end{bmatrix} - \hat{p} = 0 \quad (3.4)$$

Note that system (3.4) has a triangular structure: the i-th conditional probability depends only on the value of the previous variables. This makes it particularly easy to solve, especially using the Jacobi iterative method (fixed point iteration). In fact, with an autoregressive model, the Jacobi iterative method is guaranteed to converge to the true solution in at most N steps. In practice however, an acceptable approximate solution can be achieved in significantly fewer steps, depending on the tolerance threshold E (refer to Algorithm 3.1).

3.2.1 Solver Speed

Triangular systems can also be solved serially, one equation at a time. In a linear system, this is called forward substitution (backward substitution). In a serial solution method, first $x_1$ is solved from the equation $p(x_1)=\hat{p}_1$. Then, $x_1$ is substituted into the equation $p(x_2 \mid x_1)=\hat{p}_2$, which is then solved for $x_2$. Both $x_1$ and $x_2$ are substituted into the third equation, which is then solved for $x_3$. The process is continued serially through all equations until finally the entire vector x is recovered.

Unfortunately, this serial process is very slow. It requires exactly N steps, and cannot be done with any fewer calculations. Contrast this with an iterative method, which can converge to an acceptable solution in significantly fewer than N iterations. Moreover, the serial procedure's computations are applied one element (pixel) at a time. In contrast, the iterations of the fixed point scheme (or any iterative method) are applied to the entire image, and can exploit parallelization routines of modern hardware (such as Graphics Processing Unit or a Neural Processing Unit).

3.2.2 Types of Autoregressive Models

What form do the conditional probability functions $p(x_1|x_{1:i-1})$ take? We now review types of autoregressive probabilistic models that may be used in a compression pipeline. One useful approach is to model the probability function is with a basic 1-dimensional probability function with parameters θ. The parameters θπwill be the functions of the preceding $x_{1:i-1}$ variables. So for example, we could model $p(x_i|x_{1:i-1})$ with the Normal distribution $$p(x_i|x_{1:i-1})=\mathcal{N}(x_i;\mu(x_{1:i-1}),\sigma(x_{1:i-1})) \tag{3.5}$$

Here the mean parameter p and the variance parameter σ are the output of functions of $x_{1:i-1}$. In an AI-based compression pipeline, typically neural networks are used for these functions.

There are many possible choices of autoregressive models that can be used to encode the variable into a bitstream. They are all variants of the choice of function used to model the conditional probabilities. The following is a non-exhaustive list. (In the following examples we use the Normal distribution as the "base" distribution, but any distribution could be used)

- Intrapredictions and block-level models In Intrapredictions and its variants, an image is chopped into blocks (rectangles, or squares, of pixels). The idea is to build an autoregressive model at the block level. Pixels from preceding blocks are used to create an autoregressive model for each pixel in the current block. Typically only adjacent blocks preceding the current block are used.
- The autoregressive function could be chosen from a family of functions, chosen so that the likelihood of the current block is maximized. When the autoregressive function is a maximum over a family of functions, the family may be a countable (discrete, possibly finite) or uncountable set (in which case the family is parameterized by a continuous indexing variable). In classical Intrapredictions the family of functions is discrete and finite. The argmax can be viewed as a type of side-information that will also need to be encoded in the bitstream (see last point).
- Filter-bank models The autoregressive function could be chosen from a set of "filter-banks", i.e. where the parameters of the distribution are chosen from a set of models (which could be linear). The filter-bank is chosen to maximize the probability. For example, $$p(x_i|x_{1:i-1}) = \max_k \mathcal{N}(x_i; L^k x_{1:i-1}, M^k x_{1:i-1}) \tag{3.6}$$

where each $L^k$ and $M^k$ are filter-bank models (possible linear functions).
- Parameters from Neural Networks The parameters could be functions of Neural Networks, including convolutional NNs. For example, $$p(x_i|x_{1:i-1})=\mathcal{N}(x_i;\mu(x_{1:i-1}),\sigma(x_{1:i-1})) \tag{3.7}$$

where μ(•) and σ(•) are Neural Networks (possibly convolutional).
- Parameters derived from side-information The parameters of the probability model could also depend on stored meta-information (side-information that is also encoded in the bitstream). For example, the distribution parameters (such as μ and σ) could be functions of both the previous variables $x_{1:i-1}$, and a variable z that has been encoded and decoded in the bitstream.

$$p(x_i|x_{1:i-1})=\mathcal{N}(x_i;\mu(x_{1:i-1},z),\sigma(x_{1:i-1},z)) \tag{3.8}$$

A simple example of this is the case where μ and σ are a linear functions of $x_{1:i-1}$, where the linear functions are themselves outputs of non-linear functions of z (such as a neural network)

$$p(x_i|x_{1:i-1})=\mathcal{N}(x_i;L(z)x_{1:i-1},M(z)x_{1:i-1}) \tag{3.9}$$

Note that the discussion up until this point has been focused on using autoregressive models for probabilistic modelling on an input image x. However, there are many other variables that autoregressive models can be used on:
- Latent variables: modeling latent variables is a very typical use-case here. The latent variables y are the quantized (integer rounded) outputs of a Encoder neural network.
- Temporal modeling In video compression, there are many correlations between video frames located temporally close. Autoregressive models can be used to model likelihoods of the current frame given past (or future) frames.

3.2.3 Autoregressive Normalizing Flows

Although conditional probability distributions are a main component of the compression pipeline, Deep Render still has use for joint probability estimation (estimating the unfactorized joint probability p(x)). This can be done using a Normalizing Flow (refer to our PCT patent "Invertible Neural Networks for Image and Video Compression", and for a discussion of use-cases). Recall that a joint probability distribution can be estimated by a change of variables $f: x \in \mathbb{R} \mapsto z \in \mathbb{R}^N$:

$$p(x) = \mathcal{N}(f(x); 0, I)\left|\det\frac{df(x)}{dx}\right| \tag{3.10}$$

Here $\mathcal{N}(f(x); 0, I)$ is the standard multivariate normal distribution, and $$\left|\det\frac{df(x)}{dx}\right|$$

is the determinant of the Jacobian of the transformation $f$.

Typically, $f$ is constructed to be easily invertible, and also to have a tractable determinant formula. This can be done using an autoregressive model. The function $f$ could be made of a series of transformations: $f(x)=f_N \circ f_{N-1} \circ \ldots \circ f_2 \circ f_1(x)$. Each of the $f_i$'s has an autoregressive structure:

$$f_i(y)=g(y_{1:i-1};\theta_i) \tag{3.11}$$

where y is the input to the function at the i-th composition. In other words, the function at the i-th place in the chain of compositions only depends on the preceding i−1 variables. The function g could be any function parameterized by θ that is invertible (bijective). So described, this is an Autoregressive Flow.

The process of inverting an autoregressive flow is to solve the system $$f(x)=z \tag{3.12}$$

for x given z. This can of course be done with an iterative solver, and in particular, since the system is triangular (autoregressive), it can be solved easily with fixed-point iteration (Jacobi iteration). Note that in an autoregressive flow, the computing the forward map $z=f(x)$ is typically quick and computationally easy, whereas inverting the system (3.12) is hard and computationally more difficult.

An example where the opposite is true is the inverse autoregressive flow. In this setup, the inverse function $f^{-1}(z)=x$ is modeled as a composition of functions. $f^{-1}(z)= f_1^{-1} \circ f_2^{-1} \circ \ldots \circ f_{N-1}^{-1} \circ f_N^{-1}(z)$. Each of the inverse $f_i^{-1}$'s has an autoregressive structure:

$$f_i^{-1}(y) = g(y_{1:i-1}; \theta_i) \quad (3.13)$$

Again, the function g should be bijective so that it can be inverted. In this case the change of variables formula is $$p(f^{-1}(z)) = \mathcal{N}(z; 0, I) \left| \det \frac{df^{-1}(z)}{dz} \right|^{-1} \quad (3.14)$$

And now generating x from z is easy, whereas finding z from x is difficult and involves solving the system $$f^{-1}(z) = x \quad (3.15)$$

This system can be solved using an iterative solver.

Continuous Normalizing Flows

One possible variant of the normalizing flow framework is to define the composition of functions as infinitesimal steps of an continuous flow. In this setting the final variable z is the solution to an Ordinary Differential Equation $\dot{z}=f(z; \theta)$ with initial condition $z(0)=x$. The function $f$ may have an autoregressive structure. Continuous normalizing flows are appealing in that they are easily inverted (by simply running the ODE backward in time) and have a tractable Jacobian determinant formula.

3.3 Innovation: Iterative Solvers for Non-Autoregressive Probabilistic Models in a Compression Pipeline The bulk of this section has focused on autoregressive models, their use in compression pipeline, and how they define systems of equations that can be solved using iterative methods. However, many of the autoregressive methods can be generalized to non-autoregressive methods. This section will illustrate some non-autoregressive modeling tasks that can be solved using iterative methods.

3.3.1 Conditional Probabilities from an Explicit Joint Distribution

Rather than modeling the joint distribution p(x) as an autoregressive factorization of (autoregressive) conditional probabilities, we may simply model the conditional probabilities explicitly from a defined joint distribution.

For example, suppose we model the joint distribution with a standard multivariate distribution, such as the Multivariate Normal Distribution.

$$p(x) = \mathcal{N}(x; \mu, \Sigma) = \frac{1}{Z} \exp\left(-(x-\mu)^T \Sigma^{-1}(x-\mu)\right)$$

Here $\Sigma$ is the covariance matrix and $\mu$ is a mean vector. The constant Z is a normalizing constant so that the RHS has unit mass.

The conditional probabilities are defined via the following formula (here $x_{\backslash i}=(x_1, x_2, \ldots, x_{i-1}, x_{i+1}, \ldots, x_N)$ is the vector missing the i-th component)

$$p(x_i \mid x_{\backslash i}) = \frac{p(x)}{p(x_{\backslash i})} \quad (3.16)$$
$$= \frac{p(x)}{\int p(x) dx_i}$$

The denominator is obtained by marginalizing out the i-th variable. Notice that the conditional probability model here depends both on past and future elements (pixels). This is a significantly more powerful framework than an autoregressive model. Notice also that integration constants cancel here. So for example, with a Multivariate Normal Distribution, the conditional probability density is $$p(x_i \mid x_{\backslash i}) = \frac{\exp\left(-(x-\mu)^T \Sigma^{-1}(x-\mu)\right)}{\int \exp\left(-(x-\mu)^T \Sigma^{-1}(x-\mu)\right) dx_i} \quad (3.17)$$

The denominator here has a closed form, analytic expression, and so the conditional probability is simple to evaluate. In a compression pipeline, under this framework, to encode a variable x we would construct a vector of conditional probabilities $\hat{p}$, using the tractable formula for conditional probabilities (either (3.16) in general, or (3.17) if using Multivariate Normal). Then, at decode time, the vector x is recovered by solving the system $$\begin{bmatrix} p(x_1 \mid x_{\backslash 1}) \\ p(x_2 \mid x_{\backslash 2}) \\ \vdots \\ p(x_{N-1} \mid x_{\backslash N-1}) \\ p(x_N \mid x_{\backslash N}) \end{bmatrix} - \hat{p} = 0 \quad (3.18)$$

for x using an iterative method.

The parameters of the joint distribution (such as for example the precision matrix $\Sigma^{-1}$ and the mean $\mu$) can be produced by a function of side (or meta-information) also included in the bitstream. For example we could model the joint distribution as $$p(x) = \frac{1}{Z} \exp\left(-(x-\mu(z))^T M(z)(x-\mu(z))\right)$$

where z is the side-information variable, and $\mu(\cdot)$ and $\Sigma^{-1}=M(\cdot)$ are the outputs of functions (possibly neural networks) of the side-information.

3.3.2 Markov Random Fields

Rather than modeling the joint probability distribution with a "standard" multivariate distribution, we can model the joint distribution with a Markov Random Field. A Markov Random Field (sometimes called a Gibbs distribution) defines a joint probability distribution over a set of variables embedded in an undirected graph $\mathcal{G}$. This graphical structure encodes conditional dependencies between random variables. So for instance, in an image, the graph variables could be all pixels in the image, and the graph vertices could be all pairwise adjacent pixels.

Contrast this with autoregressive models: autoregressive models are defined on directed acyclic graphs; whereas Markov Random Fields are defined on undirected (possibly cyclic) graphs. Essentially, a Markov Random Field is a rigorous mathematical tool for defining a joint probability model that uses both past and future information (which is not possible with an autoregressive model).

The unnormalized probability density (sometimes called a score) of a Markov Random Field can be defined as $$\tilde{p}(x) = \prod_{c \in cl(\mathcal{G})} \phi_c(x_c) \qquad (3.19)$$

Here $cl(\mathcal{G})$ are the cliques of the graph. In a graph defined on an image, with edges between pairwise pixels, the cliques are simply the set of all pairwise adjacent pixels. The definition of a clique is well know in the field of graph theory, and is defined a subset of vertices of a graph such that all variables (vertices) of the clique are adjacent to each other. The functions $\phi_c$ are called clique potentials. Often they are defined via an exponential $\phi_c(x_c) = \exp(f_c(x_c))$. In our compression pipeline, the functions $\{f_c\}$ could be for example quadratic functions, neural networks, or a sum of absolute values. The functions $f_c$ could be parameterized by a set of parameters $\theta$ (which may be learned), or the parameters could be the function of some side information.

The joint probability density function is defined by normalizing (3.19) so that it has unit probability mass. This is typically quite difficult, but since in compression we are mainly dealing with conditional probabilities, it turns out this normalization constant is not needed.

To illustrate how conditional probabilities are calculated, let's consider a simple graph of four random variables (A, B, C, D), with edges $\{(A, B), (B, C), (C, D), (D, A)\}$. Note that in this example the cliques are just the edges. The score function is $\tilde{p}(a, b, c, d) = \phi_1(a, b) \phi_2(b, c) \phi_3(c, d) \phi_4(d, a)$. The conditional probability, say $p(a|b, c, d)$ is given by $$p(a \mid b, c, d) = \frac{p(a, b, c, d)}{\int p(A, b, c, d) dA} = \frac{\phi_1(a, b)\phi_4(d, a)}{\int \phi_1(A, b)\phi_4(A, a) dA} \qquad (3.20)$$

since cliques without vertex A cancel, and the integration constant cancels as well. Thus conditional probabilities can be easily calculated with an analytic expression, provided the integral in the denominator is tractable.

Therefore, just like with an autoregressive model, Markov Random Fields can be used to encode a variable x via a conditional probability vectors. And, just like with an autoregressive model, the variable x may be reconstructed at decode time by solving a system of equations for x in terms of P. Just like an autoregressive model, the variable to be encoded need not be an image, but could be a latent variable, or could model temporal frames in a video (or latent variables of a video). We remark that other probabilistic quantities can be easily derived from Markov Random Fields using iterative methods. For example, the marginal probabilities can be obtained using belief propagation, and other message passing algorithms, which are specific iterative methods designed for Markov Random Fields.

3.3.3 Generic Conditional Probability Models, or Dependency Networks

The conditional probabilities need not be modeled explicitly from a known joint distribution. Instead, we may simply model each of the conditional probabilities via a function $f_i$: $\mathbb{R}^N \mapsto [0, 1]$. The vector valued function is defined as $f = (f_1, \ldots, f_N)$. Each of the functions $f_i$ could be parameterized via a parameter $\theta$, such as in a neural network. Then on encode the conditional probability vector is calculated as $\hat{p} = f(x; \theta)$. The function $f$ may depend on side information $z$ also encoded in the bitstream. Then, on decode, the variable x is recovered by solving the system $\hat{p} = f(x; \theta)$ for x. This approach is sometimes called a Dependency Network.

This process could be inverted, so that a system is solved iteratively at encode time. Then at decode time, the variable $\hat{x}$ may be recovered quickly without using an iterative solver. In this setup, we define a bijective function $g:[0, 1]^N \mapsto \mathbb{R}^N$. At encode time, the conditional probabilities are given by solving the system $g(\hat{p}) = x$ for $\hat{p}$ using an iterative solver, given an image x. (Essentially inverting $\hat{p} = g^{-1}(x)$. Then, at decode time, the variable is reconstructed by simply calling the function $x = g(\hat{p})$.

3.4 Innovation: Iterative Solvers for Evaluating Neural Networks

Finally, we note that iterative solvers need not be used only for probabilistic modelling. In fact, iterative solvers can be used to decrease execution time of neural networks themselves. The execution path of a feed-forward neural network itself has a triangular (autoregressive structure). For example, let $x_0$ be the input to the first layer of a neural network. Let $f_1, \ldots, f_L$ be the layers of a neural network. Then the output y of a feed forward neural network is given by the following non-linear autoregressive (triangular) system $$f_1(x_0) = x_1 \qquad (x0)$$
$$f_2(x_0, x_1) = x_2$$
$$\vdots$$
$$f_L(x_0, \ldots, x_{L-1}) = y$$

Notice that this system is triangular (autoregressive): each line depends only on the preceding variables. Therefore, a solution can be given by using an iterative method tailored to autoregressive structures, such as fixed-point (Jacobi) iteration. In practice, we have found that this approach can lead to significant speed ups in inference and training times.

Differentiation and training may be accomplished using any of the methods discussed in the next section.

3.5 Training Models that are Solved Using Iterative Methods

Using iterative methods inside an end-to-end compression pipeline has numerous advantages. Among the foremost advantages is a reduction in training times. For example:

In autoregressive models, solutions can be obtained either using an iterative method (the approach of this patent), or serially (described in Section 3.2). Because iterative methods are in general much faster than serial methods (cf Sec 3.2), this gives a corresponding speed-up to end-to-end training times. This speed-up can be massive, on the order of over several magnitudes.

In non-autoregressive models, solutions cannot be found without using an iterative solver. Thus, it is simply not possible to use a non-autoregressive model in an end-to-end training framework, unless iterative solvers are used. Many powerful modeling techniques (such as all of those outlined in Section 3.3) are completely out of reach unless iterative methods are used.

However using iterative methods inside a neural network presents some challenges, especially in regards to end-to-end training of a compression pipeline. We have taken a number of steps to alleviate these problems. The main challenges (and their solutions) of end-to-end training with iterative solvers are the following.

3.5.1 Gradient Calculation

In end-to-end training of a compression pipeline with an iterative solver, we must compute gradients of the solutions outputted by the iterative solver. There are several ways to do this:

- Use an automatic differentiation package to back propagate loss gradients through the calculations performed by the iterative solver. This is typically very slow, and memory intensive, but it is the most accessible approach. It can be implemented for example using PyTorch or Tensorflow.
- Solve another system (iteratively) for the gradient. For example, suppose $\ell$ is a scalar loss that depends on the solution $x^*$ to the system of equations $f(x^*; \theta)=0$. And suppose we want to differentiate $\ell$ with respect to a generic variable $\theta$, i.e. compute $$\frac{dl}{d\theta}.$$

Then, from basic rules of calculus, we first use implicit differentiation on the system:

$$\frac{df}{d\theta} = \frac{\partial f}{\partial x}\frac{\partial x}{\partial \theta} + \frac{\partial f}{\partial \theta} = 0$$

The unknown variable in this system is $$\frac{\partial x}{\partial \theta}.$$

It can be solved for using an iterative solver (while the expression $$\frac{\partial f}{\partial x}\frac{\partial x}{\partial \theta}$$

is a Jacobian-vector product and can be easily evaluated with automatic differentiation). Once a solution is found, then it is dropped in, via the chain rule, to calculate $$\frac{dl}{d\theta} = \frac{\partial l}{\partial x}\frac{\partial x}{\partial \theta}$$

The gradient can be approximated and learned using an proxy-function (such as a neural network). In probabilistic modeling this is called score-matching, whereby the gradients of the log-likelihood are learned by minimizing the difference between the grad log-likelihood and the proxy-function.

3.5.2 Access to Ground Truth Quantized Variables

Often in an AI-based compression pipeline, the variable to be solved for in a system of equations is a quantization of another variable. However, during training, it is not feasible to access (calculate) the quantized variable—it would simply take too long, making training unfeasible. Typically the quantized variable in question is a quantized latent $\hat{y}=Q(y)$. This is the problem of accessing the ground-truth quantized latent during training. Several approaches have been developed to overcome this problem during our training, including:

- Approximating the ground truth quantized latent (variable) by adding noise to the unquantized latent (variable), e.g. $\hat{y}=y+\eta$, where $\eta$ is sampled as a random variable from some distribution, such as uniform noise.
- Predict $\hat{y}$ using an auxiliary function, $\hat{y}=f_\theta(y)$, where $f_\theta$ is function parameterized by $\theta$ (such as a neural network). The auxiliary function can be trained in a bi-level fashion, i.e. it can be trained concurrently with the main compression pipeline. The auxiliary function can be trained to minimize a loss such as MSE or any other distance metric; or it can be trained using a Generative Adversarial Network (GAN) based approach.

All iterative solvers in this document can be adapted to solve for quantized variables, if during training the solvers given access to a simulated (approximate) quantized variable.

Of course, ideally the ground-truth quantized latent would be used, but in general this is difficult, and remains an active area of research.

3.6 Concepts

1. Using iterative methods for speedup during inference in the AI-based Compression pipeline for non-autoregressive components.
2. Using iterative methods for speedup during inference for auto-regressive approaches in the AI-based Compression pipeline.
3. Using iterative methods for speedup during inference for auto-regressive approaches in general.
4. Using iterative methods for speedup during training the AI-based Compression pipeline for non-autoregressive components.
5. Using iterative methods for speedup during training for auto-regressive approaches in the AI-based Compression pipeline.
6. Using iterative methods for speedup during training for auto-regressive approaches in general.
7. Using custom gradient-overwrite methods to get the gradients of black-box iterative solvers for speedup during training for auto-regressive approaches (see section 3.1)
8. Using custom gradient-overwrite methods to get the gradients of black-box iterative solvers for speedup during training for auto-regressive approaches (see section 3.1)
9. Modelling the (required) ground truth quantized latent for autoregressive approaches in the AI-based Compression pipeline via generative or discriminative methods (see section 3.2)

4. Learning a Perceptual Metric

4.1 Introduction

In AI-based compression, the rate and distortion are the two main objectives we aim to optimise. The rate aims to make the message we are streaming as small as possible in size (bits), while the distortion aims to keep the fidelity of the received message as close to that of the sent message. Translating this to the transmission of an image, the sender encoding the image using the codec, hoping to reduce it's file size as much as possible, streams it to the receiver, who decodes the image and hopes that the quality of the image is as good as the original. However, these two aims of reducing the file size and maintaining the quality are at odds with each other. Reducing the file size of an image makes the quality of the image worse (lossy compression).

There are multiple ways to define a distortion/fidelity metric in AI-based training, and the only requirement they have is that they be smooth and differentiable in order for us to to be able to differentiate them with respect to their inputs. This makes training our AI-based compression pipeline feasible. Along with this, another aspect that has recently been considered important for a distortion metric is that it must be tuned to the human visual system. In other words, differentiability is not the only criteria for our distortion metric, but it must now take into account the human visual system. Asking a mathematical function to take into account the human visual system is impossible currently, as it firstly assumes we understand how humans perceive images (what they prefer in an image and what they discard), and secondly that we can build such a complex function in a differentiable way.

The method aims to solve this problem by learning a function that takes as input a distorted and ground truth (GT) image, and outputs a score which indicated how a human viewer would perceive the image (1 is poor quality, 10 is indistinguishable from GT). A requirement is that we have some human labelled data to teach our function. Furthermore, we outline some training strategies and methods to enhance our results.

Ultimately, the function learnt, called Deep Visual Loss (DVL) acts as the distortion metric and is used to train a compression pipeline for image and video compression.

4.2 Data Acquisition

We learn to approximate the human visual system in a supervised fashion, where we define a function $f$ and subsequently teach it to fit the human labelled data. For this learning process, we must first acquire the data. In this section, we outline some methods to acquire the data.

The primary method for acquiring data is through human labelling. Here, we collect a wide variety of images across different quality levels and present them to humans and ask them to assess the quality using one of the following methods (these methods are well understood and commonly used in literature of human quality assessment):

Single stimulus
Double stimulus
Force alternative choice
Similarity judgments

In these test, we ask candidates to select the preferred image or rate an image on a scale of 0 to 5, which gives us a label per image. We do this over thousands of candidates and images (to get statistical significance) and use statistical methods such as Z-score and extreme value analysis to reject outliers. The result of this is a collection of human labelled images.

A key component of the data acquisition process is collecting the distorted image samples humans will assess the quality of. These samples have to be representative of what will be seen when the compression pipeline is being trained. To understand this intuitively, think of the function as a mapping from an image to a value. If the input image has previously been seen during the training of this function, we are able to perform the mapping from image to value accurately. However, if the image it too dissimilar from what was used to train our function, the mapping can suffer from inaccuracies, ultimately leading to difficulties in the training of our compression pipeline.

To mitigate this, we ensure our dataset used to train our function includes a wide range of distortions and mainly, distortions introduced using AI-based compression encoder-decoder pipelines. This is done through simply forward passing a set of images through a trained AI-based compression pipeline. Alternative, it is also possible to saves images at different time steps of an AI-based compression pipeline training, as this will provide better coverage of images we are likely to see. When saving images during the training of a pipeline, we propose to use all all existing distortion functions.

From herein, this data consisting of images of different qualities and their respective human labels will be referred to as acquired data or human labelled data (HLD).

Figure 28:
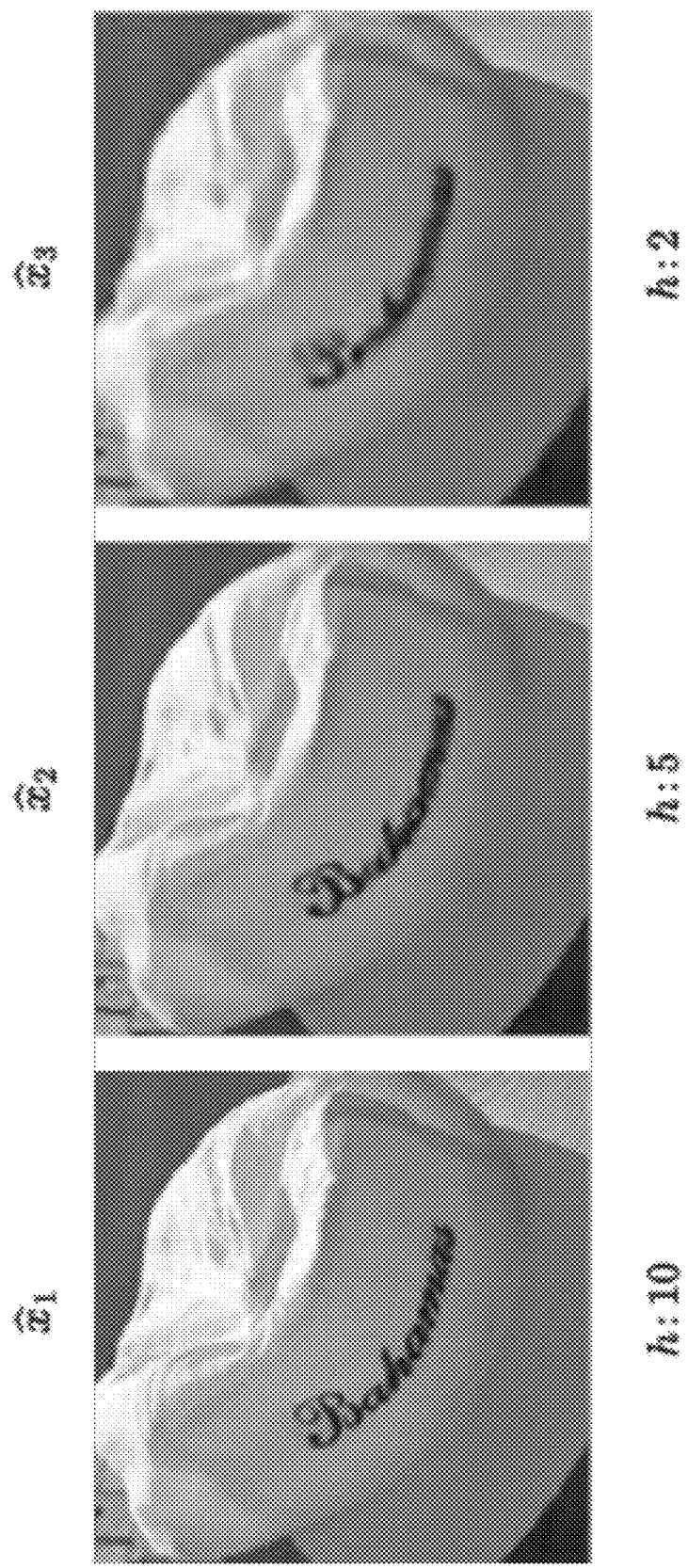
FIG. 28 shows example stimulus tests: $\hat{x}_1$ to $\hat{x}_3$ represent images with various levels of AI based compression distortion applied. h represent the results humans assessors would give the image for visual quality.

FIG. 28 and FIG. 29 show examples of what the acquired data looks like through stimulus tests, and alternative forced choice (AFC). It is not clear how to learn a function from AFC results. We provide two methods to achieve this. Firstly, we convert rankings into scores to be used for training our function $f$. Multiple methods can be employed to achieve this, and we use the Bradley-Terry or Thurstone-Mosteller method to achieve this. Secondly, we provide an architecture where we can learn from AFC results. This is explained further in section 4.3.1.

4.3 Function Fitting

In this section, we will detail the methods used to learn $f$ from HLD. Since we have image data and a value to map to, there are many methods that can be used here. We outline the details of neural networks and regression based methods.

4.3.1 Deep Neural Network

We propose to use neural networks to learn from the HLD. We refer to this network as a Deep Visual Loss (DVL) network. Neural networks are termed as universal function approximators, which essentially means that given a neural network with enough parameters, we can model an arbitrarily complex function.

This makes them attractive as function approximators. There are many configurations we can use when it comes to defining this neural network, and our claim does not limit us to any particular configuration. However, FIG. 30 shows an example of an instantiation of what such a method could look like.

Figure 30:
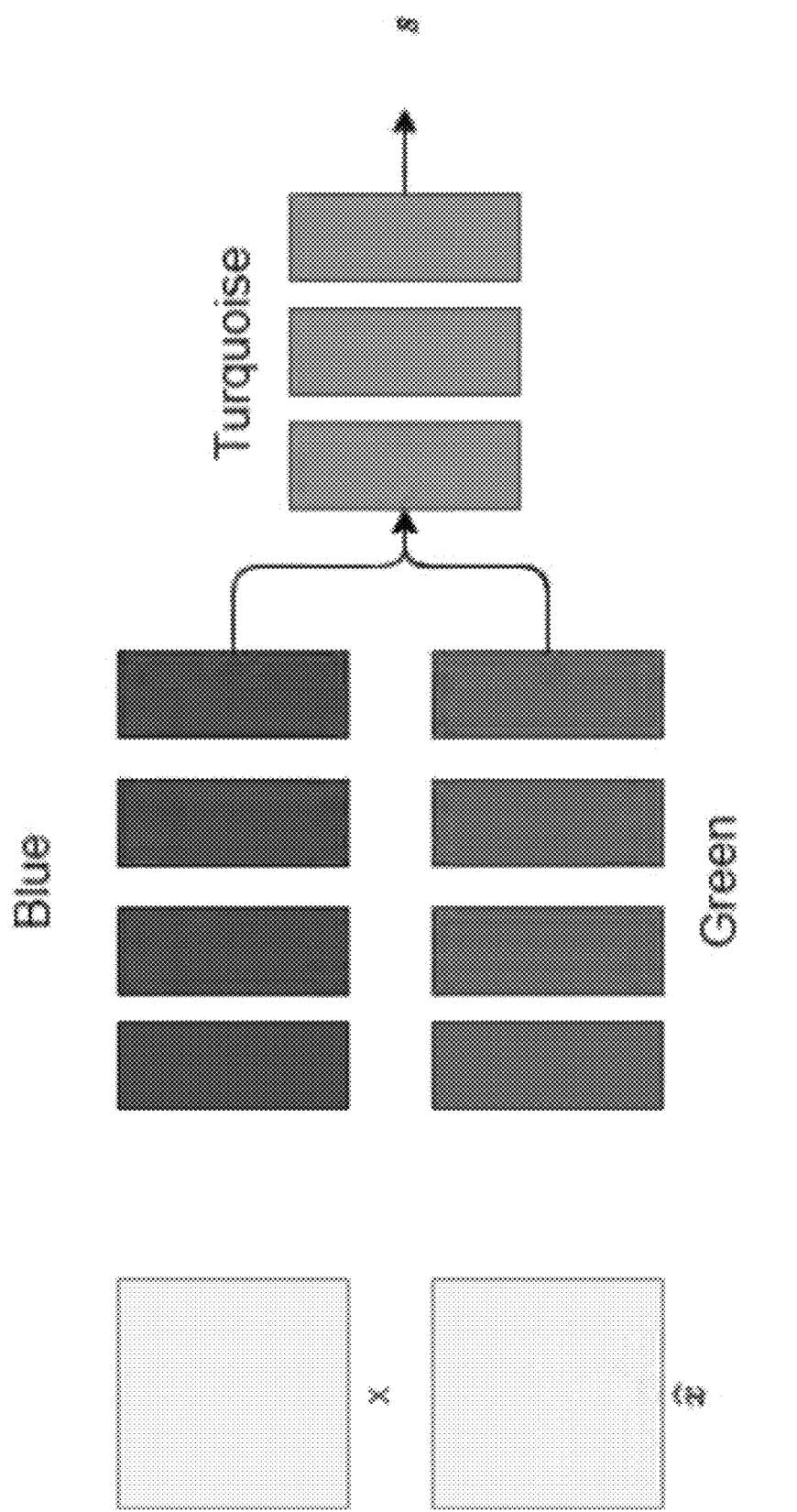
FIG. 30 shows an example in which x represents the ground truth images, $\hat{x}$ represents the distorted images and s represents the visual loss score. This figure represents a possible architecture to learn visual loss score. The blue, green and turquoise block could represent conv+relu+batchnorm block or any other combination of neural network layers. The output value can be left free, or bounded using (but not limited to) a function such as tan h or sigmoid.

In FIG. 30, the x and $x_{hat}$ are passed through separate branches of a deep neural network (blue and green), whose output features are then combined and passed into the same network (turquoise). The output of this network is the visual quality score for the image $x_{hat}$. It is not necessary for x and $x_{hat}$ to be passed in through separate network branches, they can be concatenated and passed in through the same branch.

Once we have defined such a network, we train it using the HLD in a supervised training scheme using standard and widely known deep learning methods such as (but not limited to) stochastic gradient decent and back propagation.

Training of Deep Visual Loss Network

As mentioned above, we train our Deep Neural network on HLD to predict the labels of HLD, which gives us an indication of how a human would rate them image. In this section, we outline some methods to improve our training. The pseudo-code shown in Algorithm 4.1 below shows how the training scheme may look like.

---

Algorithm 4.1 Training algorithm for learning a Deep Visual Loss (DVL) from HLD.

Inputs:
Ground truth image: x
Distorted image: $\hat{x}$
Human label for $\hat{x}$: h
Step:
s ← $DVL_\theta(x, \hat{x})$
L ← Loss_Function(s, h)

$\dfrac{dL}{d\theta}$ ← backpropagate $(L)$ $\theta \leftarrow \text{optimizer.step}\left(\theta, \dfrac{dL}{d\theta}\right)$ Repeat Step until convergence.

---

Pre-Training

The data acquisition stage is expensive, especially if we want to get a sufficient amount of data and capture a wide range of distortions. It is also the case that the more data deep neural networks have for training, the better they perform. We provide an automated method to generate labelled data, which is used to pre-train our DVL network before it is trained on HLD. It is widely acknowledged that pre-training can help with learning and generalisation. In order to generate this data for pretraining, we use bit allocation (rate) as a proxy for perceptual quality. During this method, we generate the labels for our distorted data using the bit-rate. Our AI based compression pipeline can be conditioned on or trained for several lambda values. These values determine the trade-off between the rate (bits allocated to the image) and distortion (visual quality). We use a range of lambda, from low to high, to generate distorted images. For our case, higher lambda values generate visually pleasing images while lower lambda values generate visually distorted images. We can pair these lambda values with an appropriate visual quality value, giving the lowest lambda 1 and the highest lambda value of 9, and the ground truth value of 10. Here, 10 represents the best visual image and 1 represents the worst image.

This method provides us with a plethora of labelled data, without the need for human evaluators. This labelled data can be used to train and pre-train our DVL network.

Multiresolution

Figure 31:
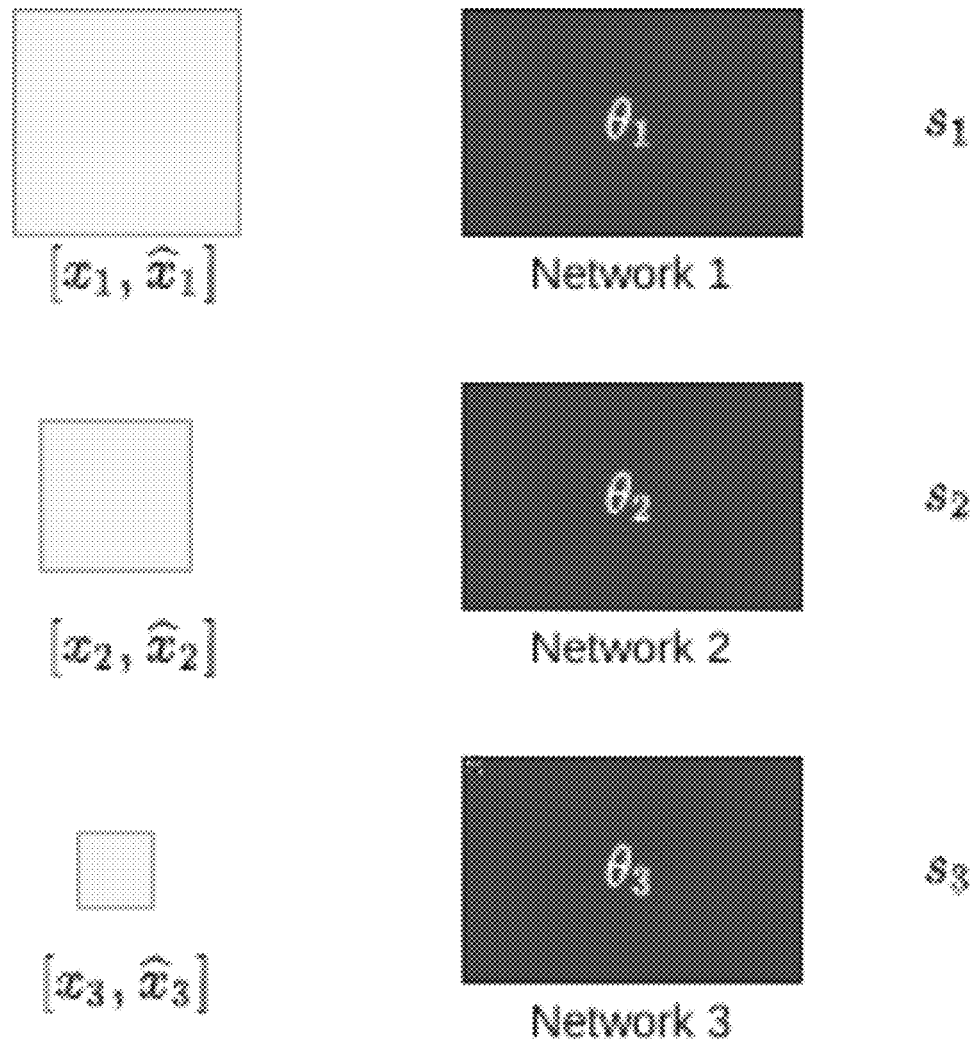
FIG. 31 shows an example in which $x_2$ and $x_3$ represent downsampled versions of the same input image, $x_1$. The networks with parameters $\theta$ are initialised randomly. The output of each network, from $s_1$ to $s_1$ is averaged, and used as input to the L value as shown in Algorithm 4.1.

We propose to make DVL multi-resolution. FIG. 32 shows what a possible multiresolution architecture can look like, however, our proposed method is not limited to just this instantiation. In general, the aim is to initialise multiple DVL networks, each of which receives a subsampled version of the input images. This means we are judging the image across multiple resolutions, and the final score is an average of all resolutions leading to a more robust score. The result is averaged during the training and prediction of these networks. This means that s in Algorithm 4.1 would be computed as:

$$s = \dfrac{1}{N}\sum_{i=1}^{N} DVL_{\theta_j}(x_i, \hat{x}_j),$$

where N is the number of resolutions. FIG. 31 shows a related example.

Ensemble Training

We enhance the training of DVL through initialising and training multiple networks on the data separately. This method is generally referred to as an ensemble of networks in literature, and it makes the predictions more robust, since each of the DVL is randomly initialised, and will find a different minimum on the loss surface. Therefore, averaging the results of these various instantiations, has the affect of increasing robustness through decreasing variance and ignoring outliers.

Apart from random initialization of the same network, we use multiple models with varying architectures in our ensemble. This is known as model variation ensembles.

During the training of an ensemble of these network, we compute the loss of each network separately using its output score s and the respective GT value h. However, during inference, we use the average result.

Network Training

Depending on the data acquisition method, we acquire different formats of training data labels. For examples, when considering single and double stimulus tests, we will receive a score for each image, between 0-5 (where 0 represents bad quality, and 5 represents good quality). When considering alternative forced choice, we will get a binary output, showing which image is superior.

Figure 33:
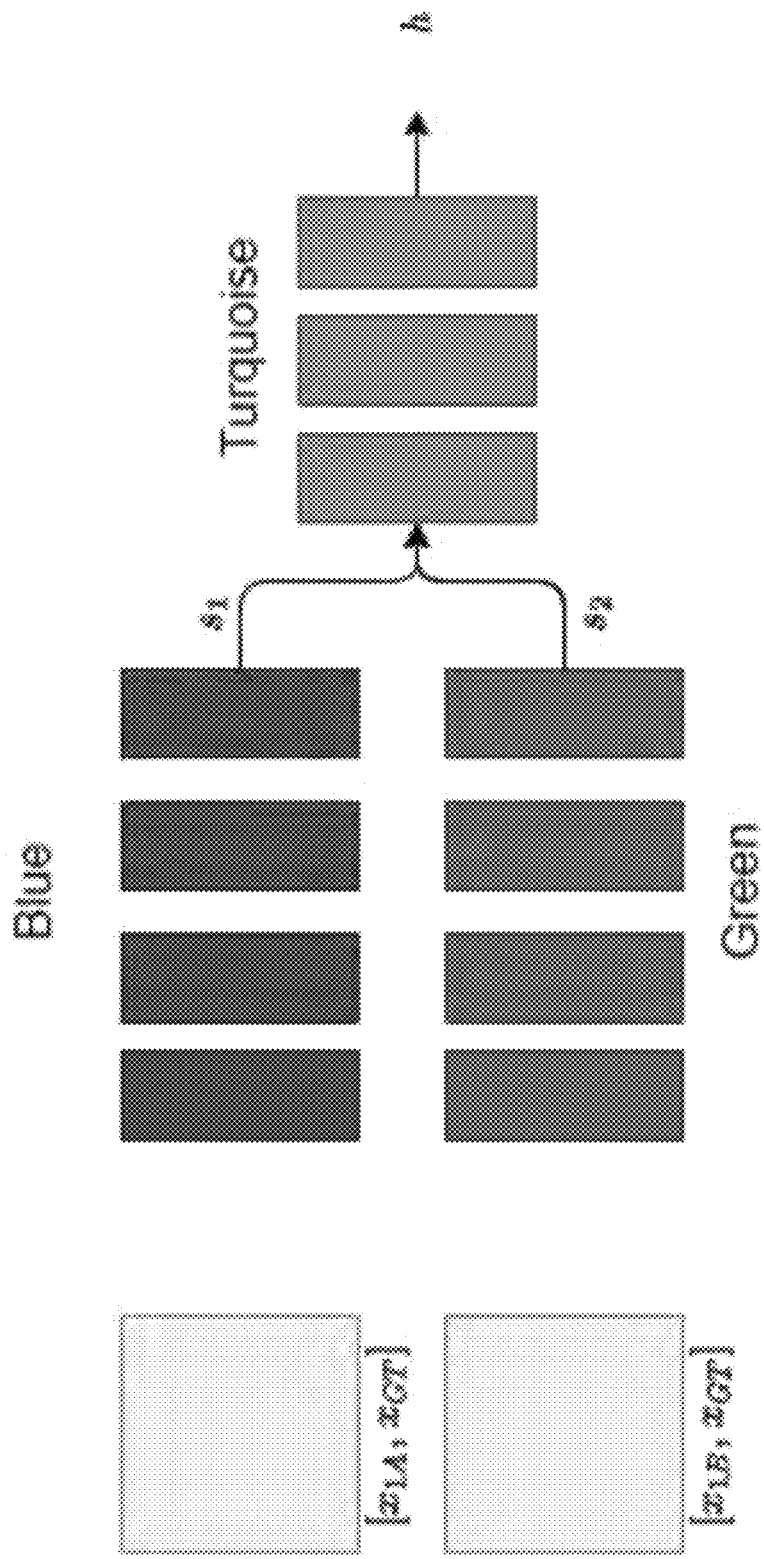
FIG. 33 shows an example in which the blue and green blocks represent convolution+relu+batchnorm blocks while the turquoise blocks represent fully connected layers. The alternatives choices. Square brackets represent depth concatenation. Here $x_1$ and $x_2$ represent distorted images, and $x_{GT}$ represents the ground truth image.

Training of DVL network can be performed on any one of the data acquisition methods. To learn on 2FAC data, we are able to convert the 2FAC rankings into per image score (using methods existing in literature such as Thurstone-Mosteller or bradley terry), which the DVL network can regress. Alternatively, we can also employ a method by which we feed in all three images of the 2FAC into a network, asking the network to predict distances for each, which we send into a fully connected network to predict the result of the 2FAC. FIG. 33 shows a possible configuration for this method.

Here the blue and green convolution blocks share weights, and once the network is trained, we can use the score s to train our compression pipeline.

4.3.2 Regression

Besides using neural networks directly on the images to predict visual loss scores, we are also able to use a weighted mixture of multiple existing loss functions to predict the visual loss score. When employing these methods, we refer to the visual loss score as DMOS.

Specifically speaking, we provide an aggregate visual loss function which is based on a set of individual distortion loss metrics, each of which is evaluated for the distorted image with reference to the original image and multiplied with a coefficient before being summed together. The coefficients are found by regression analysis between the individual distortion losses and subjective opinion scores, ensuring that the final visual loss score correlates highly with HLD. The following sections will act as a high-level description of the regression based visual loss function.

Given a GT image x, its distorted counterpart $\hat{x}$, an enumerated set of N different distortion loss functions $\{L_i\}_{i=1}^N$ (outlined in a later section) and a set of regressed (polynomial) loss coefficients $\{\{p_{ij}\}_{j=0}^m\}_{i=1}^N$ and an intercept value C, the DMOS loss can be expressed as a sum of polynomials $$DMOS(x, \hat{x}) = C + \sum_{i=1}^N \sum_{j=0}^m p_{ij} L_i(x, \hat{x})^j \qquad (4.1)$$

The individual loss functions $\{L_i\}_{i=1}^N$ utilised in the DMOS include, but are not limited to, the following:
PSNR
MS-SSIM
SSIM
Gradient Magnitude Similarity (GMS)
- Using various filters for gradient estimation such as Scharr, Sobel, Prewitt, Laplacian and Roberts of various sizes, but specifically 3×3, 5×5 and 7×7;
- Using different pooling techniques such as average pooling (GMSM) and standard deviation (GMSD);
- Evaluating, weighing and summing GMS components at multiple different spatial scales (resolutions).

PSNR-HVS losses
- Include PSNR-HVS, PSNR-HVS-M, PSNR-HVS-A and PSNR-HVS-MA, in the same methodology and weightings as in the original papers, but not limited to any modifications in these parameters.

Perceptual losses, including the feature loss as described in existing literature between all intermediate layers of, but not limited to, any layers of a pre-trained classification networks:
VGG-16 and VGG-19
ResNet-34, ResNet-50, ResNet-101 and ResNet-152
AlexNet
MobileNet v2
InceptionNet
SENet
- Encoder or Decoder layers of a compression network train on rate on the rate distortion loss objective. Essentially we are using the layers of a trained compression network rather then one trained on classification.

Adversarial losses, such as LSGan losses, discriminator losses, generator losses etc.
Variations on the structural similarity index, including:
Gradient-based structural similarity (G-SSIM)
Feature Similarity Index (FSIM)
Information Content Weighted Multiscale SSIM (IW-SSIM)
Visual Information Fidelity
Geometric Structural Distortion (GSD)
Information Fidelity Criterion (IFC)
Most Apparent Distortion (MAD)

The aforementioned losses are so-called full-reference image quality assessment algorithms, which means the distorted image is compared to its reference counterpart. However, DMOS is also intended to incorporate no-reference image quality assessment algorithms, including, but not limited to:
RankIQA
Natural Image Quality Evaluator (NIQE)
Visual Parameter Measurement Index (VPMI)
Entropy-based No-reference Image Quality Assessment (ENIQA)
Blind/Referenceless Image Spatial Quality Evaluator (BRISQUE)

The coefficients $\{C_i\}_{i=0}^N$ are optimised for using various types of regression analysis against HLD. The goodness-of-fit is assessed by computing various correlation coefficients, such as Pearson, Spearman and Kendall rank correlations, as well as root mean squared error (RMSE). The types of regressions may be used singularly or in combination with each other and include:
Linear (ordinary least-squares) regression;
Robust regression, utilising these weight functions:
Andrews;
Bisquare;
Cauchy;
Fair;
Huber;
Logistic;
Talwar;
Welsch;
Nonlinear regression, including, but not limited to:
Exponential regression;
Logistic regression;
Asymptotic regression;
Segmented regression;
Polynomial and rational function regression;
Stepwise regression;
Lasso, Ridge and ElasticNet regression.
Bayesian linear regression
Gaussian process regression One of the provided methods above is to apply Bayesian methods (Bayesian linear regression & Gaussian process regression) in a similar fashion as described above. The key here is that we get an uncertainty measure with each prediction. This uncertainty measure indicated how certain the model is about a particular prediction. This allows us to modify how we update our compression network. For example, If we are really certain that our prediction of the visual loss score is correct, we use the gradients to update our compression network, however, if we are not sure, we can skip that gradient step since it is likely to be incorrect information. This is particularly useful when there is not a lot of data available as it is more likely that the model will encounter samples it is uncertain about.

4.3.3 Training of the Compression Pipeline

Finally, once we have a function $f$ trained, our objective is now to train our compression pipeline through using this $f$. Below we outline how we do this and some additional training strategies.

Building Composite Losses

When training our compression pipeline using $f$, we add additional terms to the distortion loss such as but not limited to MSE. These additional terms, which are computed as using the GT and predicted images, are used along with the visual loss score obtained from one of the methods above to train our compression pipeline. This has the benefit of acting as a regulariser to the visual loss learnt from HLD. For example, in the case where visual loss is uncertain, this regulariser loss steps in to provide gradients for the compression network that are still meaningful. We propose to use any combination and number of losses here, for examples, one possible combination is to DMOS using deep pre-trained features whose weights are learnt using linear regression along with PSNR. Another alternative is the use of DVL network with MSE or PSNR.

Adding this additional loss term also helps with stability in training of the compression pipeline using $f$.

Pre-Training

Rather then training using the learnt $f$ from scratch, we train our network using MSE or another distortion function initially for some number of iterations, and introduce $f$ in slowly when the network has stabilised. This method help stabilise training.

Skipping Gradients

It is possible for us to skip the gradients of images we are uncertain about, or give them a low weighting. This can be done through using the uncertainty measure output by Bayesian methods, where is the uncertainty value $\sigma^2$ is high, we can skip the gradients from the distortion, or specifically, $f$.

4.3.4 Use Cases

We use this method in AI based image and video compression as well as niche markets such an AR/VR, self driving cars, satellite and medical image and video compression.

4.3.5 Concepts

Main Concepts

We learn a function from compression specific human labelled data to be used as part of the distortion function for training AI based compression pipeline.

Sub Concepts

We learn a neural network on human labelled data

We use rate as a proxy to generate and automatically label data in order to pre-train our neural network We use Ensemble methods to improve the robustness of our neural network We use multi-resolution methods to improve the performance of our neural network We learn from FAC as well as stimulus test date We learn the mixtures weights of existing losses such as deep features to predict humans scores.

We apply Bayesian methods to this learning process

We use the learnt $f$ to train our compression pipeline

We use a combination of $f$ learnt on human data and MSE/PSNR to train our compression pipeline

5. Mind the Gaps: Closing the Three Gaps of Quantisation

5.1 Introduction

Quantisation plays an integral role in compression tasks and enables efficient coding of the latent space. However, it also induces irreversible information losses, and encumbers gradient-based network optimisation due to its uninformative gradients. The causes for the coding inadequacies due to quantisation and the methods with which we can alleviate these, including innovations and technologies, are described.

Formally, for input data of any type (image, video, audio, text, etc.), data compression is the task of jointly minimising the description length of a compact representation of that data and the distortion of a recovered version of that data. In effect, we have two terms, the rate R and the distortion D, that we simultaneously are finding a minimum for as means of a weighted loss sum $\mathcal{L}$ and a trade-off parameter A that describes the relative weighting of each term:

$$\mathcal{L} = R + \lambda D \quad (5.1)$$

Whether it is the traditional or modern kind, the idea of lossy compression is nevertheless incredibly likely to host some form of discretisation procedure. This is called quantisation, which entails the mapping of a value from a large set, say, the number 3.1415926536 (if the set is all multiples of 0.0000000001), and assigning it to one of many predetermined states, say the number 3.14, from a countably smaller set (multiples of 0.01). Naturally, there are many, many more states of the former set than the latter (more exactly, 100 million times more).

Quantisation has strong implications on the compression objective as a whole, especially in the latent space where it is applied. With fewer states to consider, the ability to describe a state from the quantised set is more convenient from an information theoretical perspective. This facilitates the task of reducing the description length of the compressed bitstream, or simply put the rate term. On the other hand, assuming that the original state contains very particular information about the source data, quantisation irrevocably discards some of that information as a consequence. If this information cannot be retrieved from elsewhere, we cannot reconstruct the source data without inducing distortions in our approximation.

Figure 34:
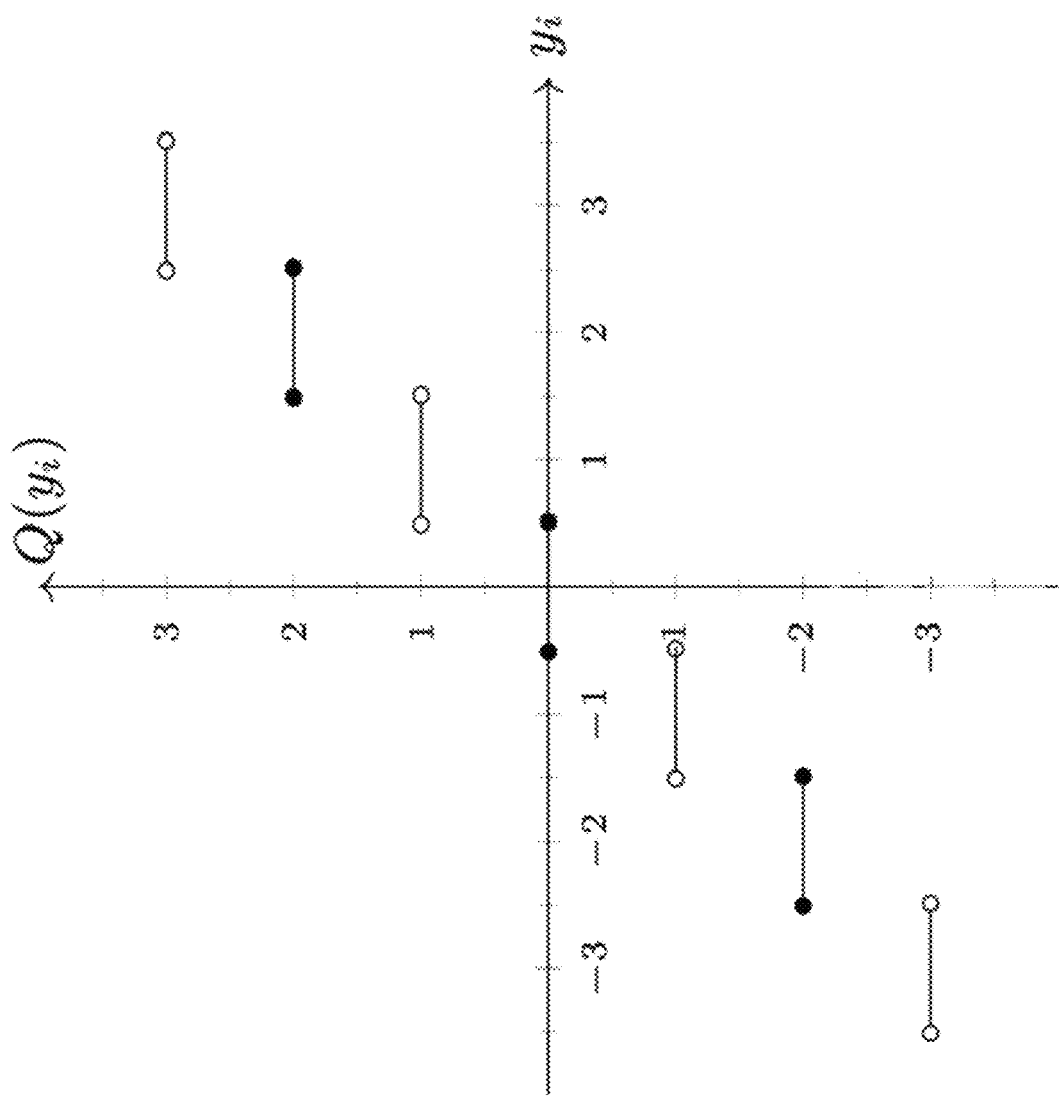
FIG. 34 shows a plot of the rounding function to nearest integer (with the "round-to-even" convention) $Q(y_i)=\lfloor y_i \rceil$. Note how the gradient of the function is zero almost everywhere, with exceptions of half-integers where the gradient is infinity.

FIG. 34 shows a plot of the rounding function to nearest integer (with the "round-to-even" convention) $Q(y_i) = \lfloor y_i \rceil$. Note how the gradient of the function is zero almost everywhere, with exceptions of half-integers where the gradient is infinity.

Perhaps the most typical form of quantisation in this context is rounding. In compression, it manifests in the rounding of latent variables in the bottleneck, for instance to the nearest (even) integer point, such that the latent space is discretised into finite states which lend itself well to entropy coding. Since entropy coding is an integral component of the compression pipeline, we cannot get away without incorporating quantisation under this framework.

The problem, in particular for AI-based compression, is that gradient-based network training requires differentiability through all the relevant operations. Unfortunately, this gives rise to incompatibilities with quantisation operations, since most do not have useful gradients that are necessary for backpropagation. For example, as seen in FIG. 34, the rounding function has a zero gradient almost everywhere, except for the half-integer points (the quantisation boundaries) where the gradient is infinity. We therefore require alternative methods that can relay gradient signals through the quantisation operation, without sacrificing the intended effect of quantisation. These alternative methods form the bulk of the provided methods outlined here.

The focus here is to
(a) introduce, explain and justify the theoretical aspects and practical details of quantisation in AI-based data compression in its present form;
(b) present a holistic theoretical framework of quantisation, the so-called 3 gaps of quantisation, around which our innovations are based;
(c) describe and exemplify a number of novel methods and technologies that deals with the closing of these gaps of quantisation in the context of AI-based data compression.

The discussions herein mainly focus on quantisation in the latent (and hyperlatent) spaces for the purpose of the rate component. However, it should be noted that quantisation also can be applied to feature and parameter spaces, the latter of which forms the framework of low-bit neural networks. We provide a particular set of tools used for quantisation, irrespective of where it is applied.

5.2 Preliminaries

See section 2.2 for a detailed section on mathematical preliminaries.

5.3 the Role of Quantisation

In this section, we justify the vital role of quantisation in lossy image compression from the viewpoint of the latent space. We characterise the different types of quantisation, and talk about how quantisation impacts a gradient-based network training process. We present some quantisation strategies known to existing literature, and draw parallels with the variational inference framework of posterior distribution matching. Lastly, we introduce the three gaps of quantisation and their implications in neural networks for AI-based data compression.

Figure 35:
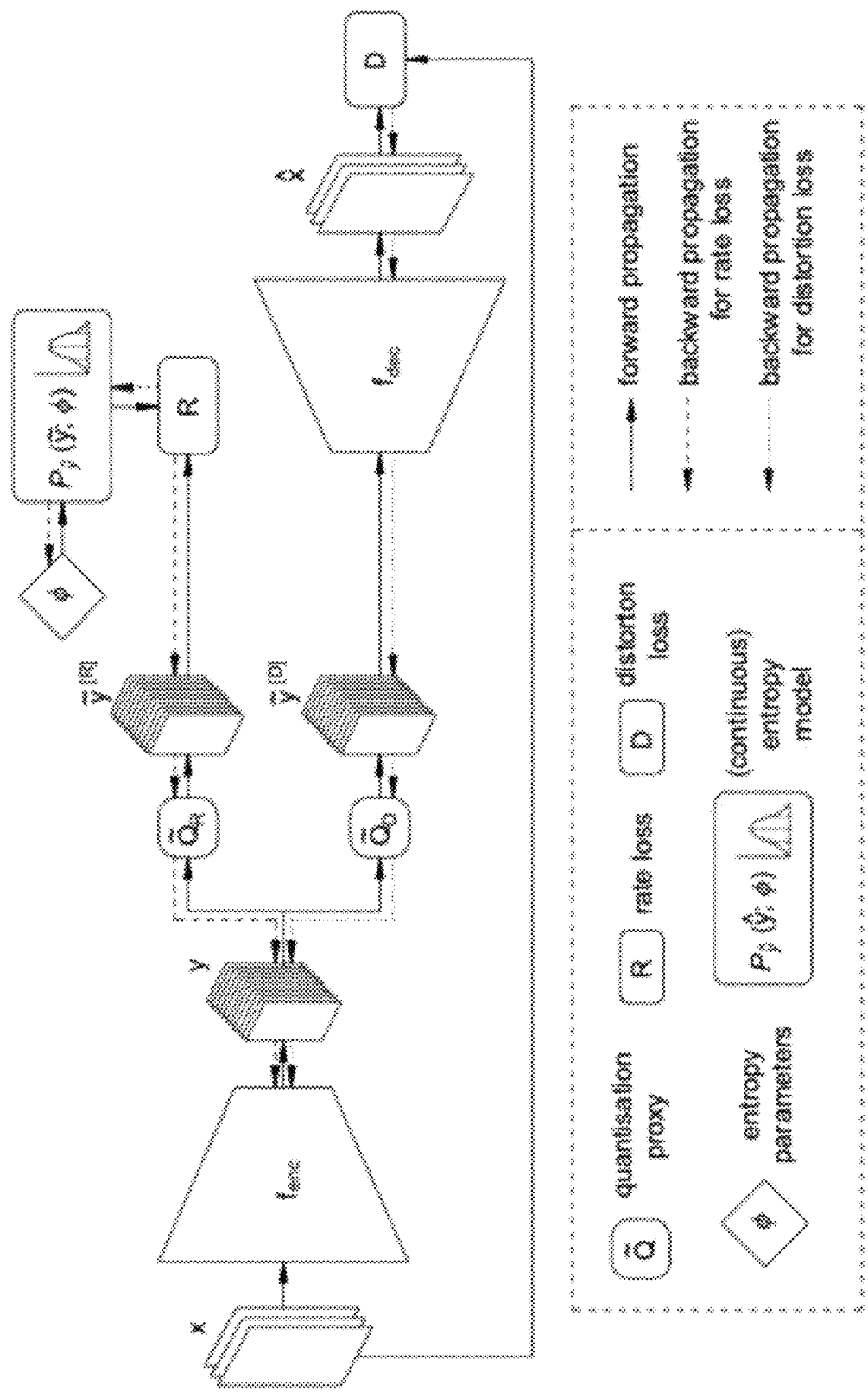
FIG. 35 shows an example of a flow diagram of a typical autoencoder under its training regime. The diagram outlines the pathway for forward propagation with data to evaluate the loss, as well as the backward flow of gradients emanating from each loss component.

FIG. 35 is an example of a flow diagram of a typical autoencoder under its training regime. The diagram outlines the pathway for forward propagation with data to evaluate the loss, as well as the backward flow of gradients emanating from each loss component. It summarises many key points explicitly discussed next, and is a useful reference for the following subsections.

5.3.1 Quantising the Latent Space

The latent vector $y \in \mathbb{R}^M$, or just latents, acts as the transform coefficient which carries the source signal of the input data x. It is often, but not necessarily, retrieved from an analysis transform of the data, $y = f_{enc}(x)$; hence, the information in the data transmission emanates from the latent space.

The latents generally consists of continuous floating point values. However, the transmission of floating point values directly is costly, since the idea of entropy coding does not lend itself well to continuous data. Hence, it is possible to discretise the latent space in a process called quantisation Q: $\mathbb{R}^M \to \mathbb{R}_Q^M$ (where $\mathbb{R}_Q^M$ denotes the quantised M-dimensional vector space, $\mathbb{R}_Q^M \subset \mathbb{R}^M$). During quantisation, latents are clustered into predefined bins according to their value, and mapped to a fixed centroid of that bin (such as rounding to nearest integer). We normally denote quantised quantities with a hat symbol, such as $\hat{y}$.

Figure 36:
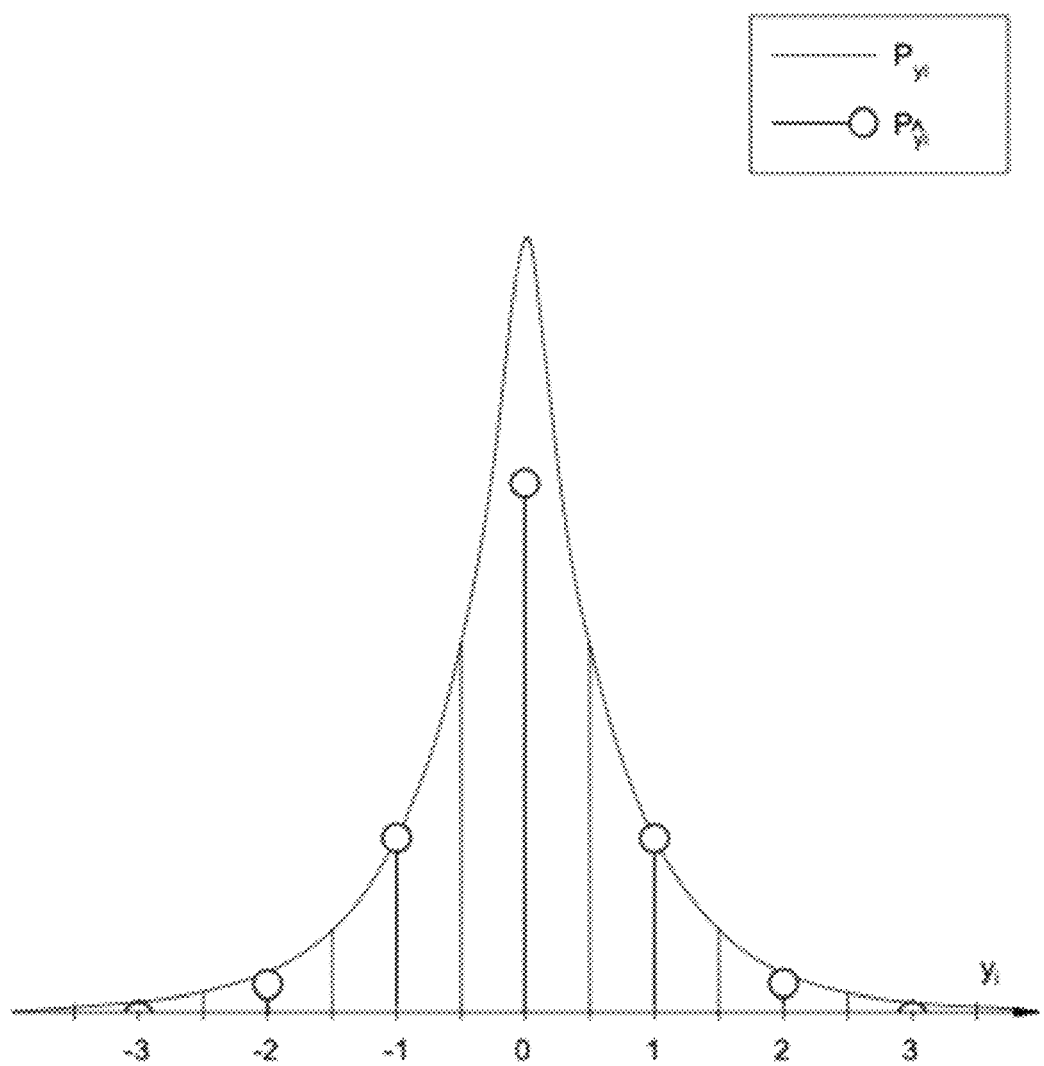
FIG. 36 shows an example of how quantisation discretises a continuous probability density $p_{yi}$ into discrete probability masses $P_{\hat{y}i}$. Each probability mass is equal to the area $p_{yi}$ for the quantisation interval, $\Delta_i$ (here equal to 1.0).

From a probability perspective, the consequence of a discretisation process is that a continuous density collapses to a discrete probability mass model. For instance, if the latent variable $y_i$ is distributed according to a continuous probability model $p_{\hat{y}_i}$, a quantisation process such as integer rounding will aggregate the probability density into masses at each integer location $P_{\hat{y}_i}$. FIG. 36 shows an example of how quantisation discretises a continuous probability density $p_{y_i}$ into discrete probability masses $P_{\hat{y}_i}$. Each probability mass is equal to the area below $p_{y_i}$ for the quantisation interval, $\Delta_i$ (here equal to 1.0).

The effect of quantisation on the assigned quantisation task is dual. On one hand, the set of possible values for the latents is reduced significantly, allowing for compatibility with entropy modelling which enables shorter descriptors of the latents. On the other hand, the process induces irrecoverable information loss, which significantly limits expressiveness of the latent variables. This manifests in corruptions and artefacts in the reconstructed image obtained from the decoder $\hat{x} = f_{dec}(\hat{y})$. Very broadly speaking, the coarseness of quantisation (for instance, the width of the bins) has the capacity to determine the rate-distortion tradeoff levels. The coarser the quantisation, the lower the bitrates achievable but the larger the distortion. The effects are reversed for finer quantisation.

5.3.2 Scalar Versus Vector Quantisation

In this section, we clarify the distinction between scalar and vector quantisation given an M-dimensional vector with continuous elements $y = [y_1\ y_2\ \ldots\ y_M]$. Scalar quantisation trivially means that each element is quantised individually as if they were scalars, without regard for other elements in y. Each element can have $C_i$ arbitrary centroids, but the centroids pertain to their own dimension only, $\hat{y}_i \in \{\hat{y}_i^{[c]}\}_{c=1}^{C_i} \subset \mathbb{R}$, $\forall i \in [1\ \ldots\ M]$. Thus, quantisation entails a mapping to the nearest centroid in each dimension.

Vector quantisation, on the other hand, is a mapping to centroids with explicit multiple dimensionality. It considers partitions (or the entirety) of the vector, $\{y^{[b]}\}_{b=1}^B$ where B is the number of vector partitions. Each partitioned vector is quantised to a set of $C_b$ centroids, $\hat{y}^{[b]} \in \{\hat{y}^{[b],\ [c]}\}_{c=1}^{C_b} \subset \mathbb{R}^{|y^{[b]}|}$, $\forall b \in [1\ \ldots\ B]$. These centroids can be fixed, learned or inferred.

Moving forwards, when discussing the methods and technologies here, the scalar quantisation framework will be assumed. Nevertheless, all of the presented methods and technologies work equally well with a vector quantisation assumption, and all the concepts pertaining to these should also encompass their extension to vector quantisation.

5.3.3 Effects on Gradient-Based Optimisation

Conventionally, the optimisation or training of a neural network $g(\cdot)$ is done according to the principle of the chain rule. It assumes a composition of differentiable functions $f_k$ during forward propagation of the data to evaluate the output, conventionally a loss metric $$g = f_K \circ f_{K-1} \circ \ldots \circ f_1 \qquad (5.2)$$

where each function outputs a hidden state $h_k$ which acts as the input for the next function:

$$h_k = f_k(h_{k-1}) \qquad (5.3)$$

Gradient-based optimisation of neural networks relies on computing the first-order gradients of some loss function $\mathcal{L} = g(x)$. These gradients then flow backwards through the differentiable operations in a process called backpropagation by virtue of the chain rule (making the independent variable a scalar for visibility)

$$\frac{\partial \mathcal{L}}{\partial h_{k-1}} = \frac{\partial \mathcal{L}}{\partial h_k} \frac{\partial h_k}{\partial h_{k-1}}$$

where $$\frac{\partial h_k}{\partial h_{k-1}}$$

is simply the derivative of $f_k$ with respect to the input. The gradient signal cascades backwards and updates the learnable network parameters as it goes. For this to work effectively, the derivative of each function component in the neural network must be well-defined. Unfortunately, most practical quantisation functions have extremely ill-defined derivatives (see FIG. 34 as such an example), which means that all gradient signals would be cancelled beyond this point in backpropagation. This suggests that gradient-based optimisation and true quantisation are mutually incompatible; hence, we need to work around either of them.

We start by exploring whether we would be able to replace gradient-based optimisation. Given a set of M continuous latent variables, assume that the optimal quantised latent configuration is retrieved by either rounding up or down to the nearest integer. This task can be formulated as an integer or discrete optimisation problem, which is clearly intractable (a so-called NP-hard problem): the possible evaluation points would be of order $2^M$, where M is already a large number (in the order of $10^4$ to $10^5$). Consequently, it seems most likely that we have to find workarounds for the non-differentiability property of quantisation functions.

5.3.4 Quantisation Proxies

Can we make quantisation differentiable? It certainly seems so; let us take the example of the integer rounding function as quantisation function, and rewrite it like this:

$$Q(y_i) = \lfloor y_i \rceil = y_i + (\lfloor y_i \rceil - y_i) = y_i + \varepsilon(y_i) \tag{5.5}$$

Here, we have defined the function $\varepsilon: \mathbb{R} \to [-0.5, +0.5]$ as the quantisation residual, the difference between the quantised and unquantised variable (for integer rounding). Under these circumstances, the quantisation residual is limited in magnitude, and can be seen as an additive term to the original input. Hence, we can model the effects of quantisation with a quantisation proxy $$\tilde{Q}(y_i) = y_i + \varepsilon_i \tag{5.6}$$

where $\varepsilon_i$ is no longer input-dependent but is rather a noise vector sampled from an arbitrary distribution, such as a uniform one, $\varepsilon_i \sim \mathcal{U}(-0.5, +0.5)$. Since we do not need gradients for the sampled noise, we can see that this quantisation proxy has a well-defined gradient:

$$\frac{\partial \tilde{Q}}{\partial y_i} = 1 \tag{5.7}$$

From here on in, it becomes convenient to distinguish between true quantisation operations and quantisation proxies. The former refers to operations that actually discretises the space, making it convenient for entropy coding and other desirable properties during inference and deployment. The latter refers to differentiable stand-in functions that mimic the behaviour of the discretisation process, whilst retaining a continuous space to allow for network training or applications where gradient propagation is required.

Indeed, automatic differentiation packages allow for customisation of backward functions. In other words, we could define a functional expression for $$\frac{\partial \tilde{Q}}{\partial y_i}$$

that would allow gradients to pass through in any desired manner. This is called gradient overriding which also has the ability to form valid quantisation proxies.

FIG. 37 outlines a number of possible quantisation proxies that can be used in network training.

5.3.5 Relation to Variational Inference

Data compression is related to a variational inference framework, through its aim of minimising the Kullback-Leibler (KL) divergence between the true posterior distribution $p_\theta(\tilde{y}|x)$ and an approximate variational distribution $q_\phi(\tilde{y}|x)$ (obtained from the encoder after quantisation). The optimisation problem is traditionally posed as such $$\min_{\phi,\theta} \mathbb{E}_{x \sim p_x}[D_{KL}(q_\phi(\tilde{y}|x) \| p_\theta(\tilde{y}|x))] \tag{5.8}$$

where the expectation is taken over the empirical data distribution $p_x(x)$ and $\phi$ and $\theta$ are the parameters for the inference and generative models, respectively. The objective function in Equation (5.8) can be expanded to form a sum of loss terms:

$$\begin{aligned}\mathbb{E}_{x \sim p_x}[D_{KL}(q_\phi(\tilde{y}|x) \| p_\theta(\tilde{y}|x))] &= \mathbb{E}_{x \sim p_x}\left[q_\phi(\tilde{y}|x) \log \frac{q_\phi(\tilde{y}|x)}{p_\theta(\tilde{y}|x)}\right] = \\ &= \mathbb{E}_{x \sim p_x}\mathbb{E}_{\tilde{y} \sim q_\phi}[\log q_\phi(\tilde{y}|x) \\ &\quad - \log q_\theta(\tilde{y}|x)] = \\ &= \mathbb{E}_{x \sim p_x}\mathbb{E}_{\tilde{y} \sim q_\phi}[\log q_\phi(\tilde{y}|x) = \\ &= -\log \frac{p_\theta(x|\tilde{y})p_\theta(\tilde{y})}{p_\theta(x)}\Big] \\ &= \mathbb{E}_{x \sim p_x}\mathbb{E}_{\tilde{y} \sim q_\phi}[\log q_\phi(\tilde{y}|x) - \\ &\quad \log p_\theta(x|\tilde{y}) - \log p_\theta(\tilde{y}) + \log p_\theta(x)]\end{aligned} \tag{5.9}$$

It can indeed be shown that each of these terms relate to specific loss terms occurring in data compression. For instance, the likelihood term (the second one) log $p_\theta(x|\tilde{y})$ is related to the distortion or reconstruction loss, and the differential entropy term (the third one) represents the encoding costs of $\tilde{y}$. The last term log $p_\theta(x)$ is simply the marginal distribution of the observed data, which we cannot influence; hence, we can drop this term from the scope of optimisation.

The focus for quantisation falls on the first term, log $q_\phi(\tilde{y}|x)$, which is the logarithm of the conditional distribution of the approximate latents given the data input. Since an encoder normally maps our input to raw latents, $y = f_{enc}(x)$, the conditional distribution becomes dependent on the quantisation that is imposed on the latents. In many instances, independent uniform noise quantisation is assumed as the quantisation proxy which yields the following property for $q_\phi(\tilde{y}|x)$:

$$q_\phi(\tilde{y}|x) = \prod_i \mathcal{U}\left(\tilde{y}_i \Big| y_i - \frac{1}{2}, y_i + \frac{1}{2}\right) \tag{5.10}$$

It can be argued that since a uniform distribution with unit width has constant probability density of 1, the logarithm of this density evaluates to zero. However, this is not a trivial assumption; without this assumption for your quantisation proxy, this term cannot be ignored. Our studies indicate that the noise distribution is neither factorised nor symmetric, and may indeed be highly context-dependent. We mean that the distribution of quantisation residuals contain certain statistical dependencies, which suggests that if we are able to model them during training, the optimisation process would imitate the compression task with true quantisation more closely.

5.3.6 the Three Gaps of Quantisation

In the field of AI-based data compression where gradient-based optimisation and quantisation both play integral roles, but are mutually incompatible, the discretisation process introduces certain inadequacies that manifest as differences between the ideal case and practical case. We can identify and characterise three such gaps:

1. The discretisation gap: Represents the misalignment in the forward-functional behaviour of the quantisation operation we ideally want to use versus the one used in practice.
2. The entropy gap: Represents the mismatch of the cross-entropy estimation on a discrete probability distribution versus a continuously relaxed version of it.
3. The gradient gap: Represents the mismatch in the backward-functional behaviour of the quantisation operation with respect to its forward-functional behaviour.

TABLE 5.1

Typical quantisation proxies and whether they suffer from any of the three gaps of quantisation.

| Quantisation proxy | Discretisation gap | Entropy gap | Gradient gap |
|---|---|---|---|
| (Uniform) noise quantisation | ✓ | ✓ | x |
| Straight-through estimator (STE) | x | x | ✓ |
| STE with mean subtraction | x | x | ✓ |
| Universal quantisation | ✓ | ✓ | ✓ |
| Stochastic rounding | ✓ | x | ✓ |
| Soft rounding | ✓ | ✓ | x |
| Soft scalar/vector quantisation | ✓ | ✓ | x |

The Discretisation Gap

Under many deep learning applications, it is ideal to work with continuous (real) values. Since a discretisation process such as rounding breaks the continuity, it does not lend itself well to gradient-based network optimisation. One way we could remedy this is by substituting the true quantisation operation $Q(\bullet)$ with a quantisation proxy $\tilde{Q}(\bullet)$ during network training. In inference and deployment, we do not require differentiability, during which we would revert back to using $Q(\bullet)$. Thus, the discretisation gap refers to the misalignment in the outputs $\hat{y}_i$ and $\ddot{y}_i$, produced by $Q(\bullet)$ and $\tilde{Q}(\bullet)$, respectively. An example of a quantisation proxy that yields a discretisation gap is noise quantisation, $\tilde{Q}(y_i) = y_i + \varepsilon_i = \ddot{y}_i$ where $\varepsilon_i$ are random samples drawn from an arbitrary noise source (the selection of the noise source is a design choice). While it is intended to simulate the effects of true quantisation such as rounding, $Q(y_i) = \lfloor y_i \rceil = \hat{y}_i$, it is clear that in general $\ddot{y}_i \neq \hat{y}_i$.

Since the loss function consists of two components, the rate R and distortion D, both of which is dependent on the quantised latent variable, the misalignment in the quantisation output propagates onward to each of the loss component. Crucially, the quantised latents conditioning each component do not need to be the same. Past the quantisation function, the algorithm branches out where, on one hand, the entropy model computes the rate term from the first version of the quantised latents $\hat{y}^{[R]}$, and on the other hand, the decoder (or hyperdecoder) admits the second version of the quantised latents $\hat{y}^{[D]}$. This implies that we, in fact, have two discretisation gaps to consider for each set of latents (see FIG. 35 for example).

The Entropy Gap

Figure 38:
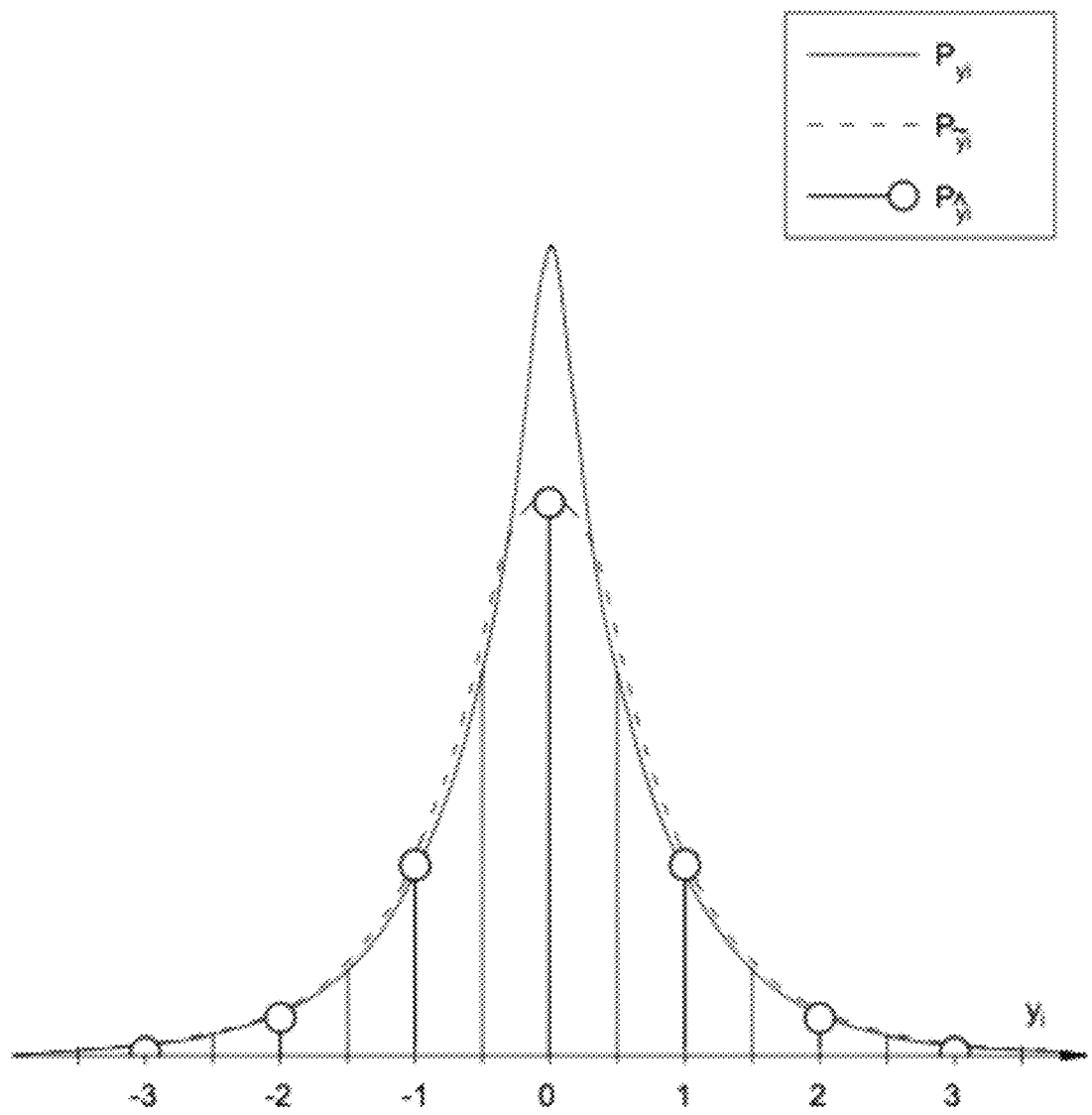
FIG. 38 shows an example of uniform noise quantisation $\ddot{Q}(y_i)=y_i+\varepsilon_i$, $\varepsilon_i\sim U(-0.5, +0.5)$ gives rise to a continuous relaxation of the PMF $P_{\hat{y}i}$. The resulting distribution is equivalent of the base distribution convolved with a unit uniform distribution, $p_{\hat{y}i}=p_{yi}*U(-0.5, +0.5)$, and coincides with all values of the PMF.

Most entropy coding schemes are only defined for discrete variables, and therefore require a discrete probability model (or entropy model). The problem is that discrete probability models do not provide useful gradients for continuous inputs. Usually, a continuous relaxation of the entropy model is adopted, for instance by employing uniform noise quantisation as quantisation proxy. If the true quantisation is integer rounding, uniform noise quantisation with noise sampled from $\mathcal{U}(-0.5, 0.5)$ has the property that the resulting continuous density coincides with the discrete probability distribution. FIG. 38 shows an example in which uniform noise quantisation $\tilde{Q}(y_i) = y_i + \varepsilon_i$, $\varepsilon_i \sim \mathcal{U}(-0.5, +0.5)$ gives rise to a continuous relaxation of the PMF $P_{\hat{y}_i}$. The resulting distribution is equivalent of the base distribution convolved with a unit uniform distribution, $p_{\ddot{y}_i} = p_{\hat{y}_i} * \mathcal{U}(-0.5, +0.5)$, and coincides with all values of the PMF.

However, the differences in the character of the probability distributions give rise to misalignment in the likelihood evaluation between the continuous and discrete models. This inadequacy is termed the entropy gap.

Although the entropy gap might seem related to the discretisation gap, there are a couple of fundamental differences. Most importantly, the discrepancy manifests itself in the evaluated likelihood for the rate term, where the continuous approximation will in most cases underestimate this quantity. Secondly, whilst the discretisation gap pertains to both the rate term and distortion term, the entropy gap only concerns effects on the rate.

The Gradient Gap

The gradient gap arises when the gradient function of the assumed quantisation proxy has been overridden with a custom backward function. For instance, since the rounding function has zero-gradients almost everywhere, the STE quantisation proxy $\tilde{Q}(\bullet)$ assumes its derivative to be equal to be one, such that $$\frac{\partial \tilde{Q}}{\partial \cdot} = 1$$

Figure 39:
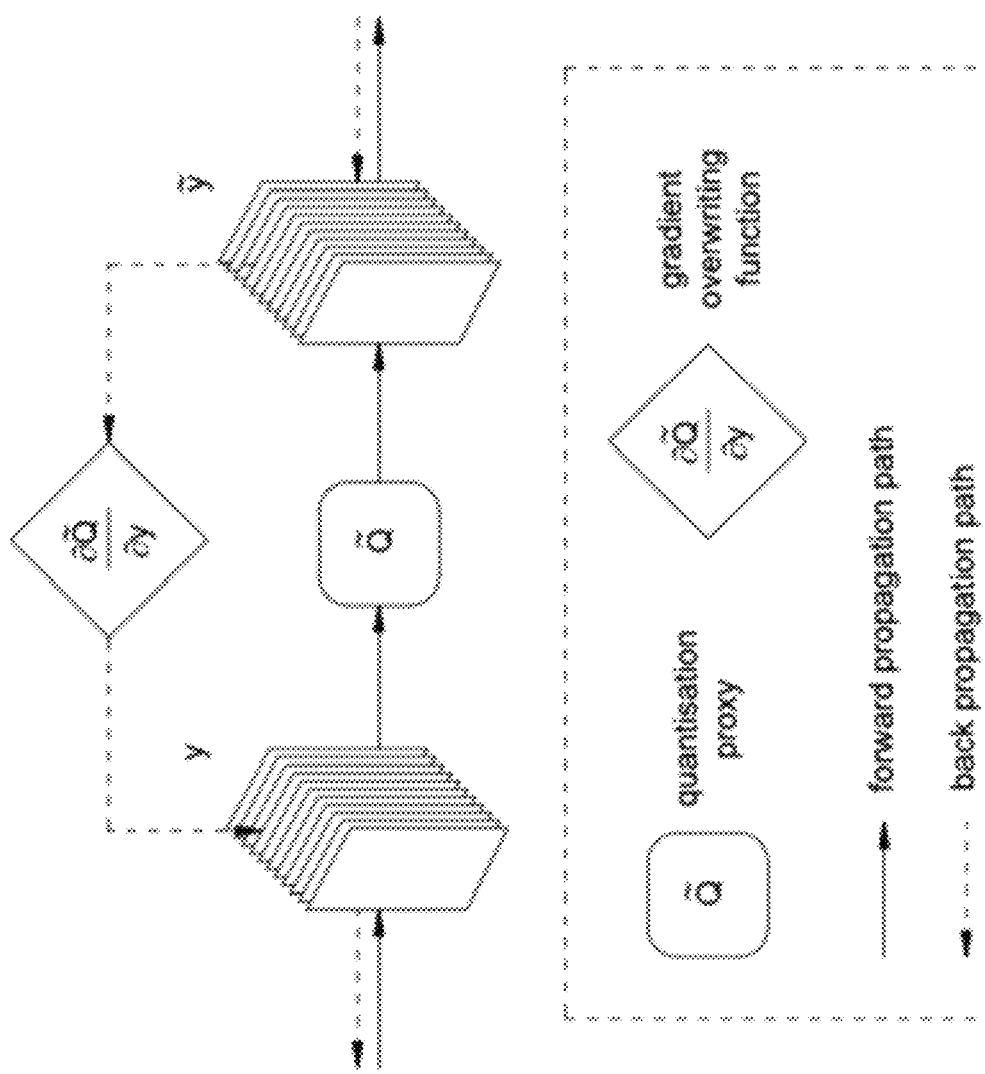
FIG. 39 shows an example flow diagram of the forward propagation of the data through the quantisation proxy, and the backpropagation of gradients through a custom backward (gradient overwriting) function.

(see FIG. 39 for example). Under these circumstances, the encoder will receive gradient signals from the loss function as if it had produced quantised variables directly.

For every quantisation proxy that is defined with its own custom backward function that is misaligned with the forward function's analytical derivative, the gradient gap is manifested.

5.4 Innovations

We have been very prolific in pushing the frontiers of quantisation for AI-based data compression by our rigorous development of theory and experimental tests. This section introduces a range of innovations. These are all presented thematically in their own individual subsections below.

5.4.1 Eliminating Gradient Bias with Laplacian Entropy Model

Choosing the family of parametric distributions for the entropy model may at first glance appear to be detached from quantisation. However, as shall be seen momentarily, the choice of the parametrisation for the entropy model assumed for the latent distribution $p_y$ matters a great deal for quantisation, especially with regards to eliminating gradient biases that arise from the quantised variable.

Consider the rate loss function of the continuously relaxed likelihood $p(\ddot{y}_i; \phi_i)$ which is a cross-entropy term $$\mathcal{L}_R = -\log_2 p(\ddot{y}_i; \phi_i) \quad (5.11)$$

where the likelihood is often evaluated as a difference in CDFs of half a quantisation bin's distance from the evaluation point, $$\frac{\Delta_i}{2}$$

$$p(\ddot{y}_i; \phi_i) = F_{\phi_i}\left(\ddot{y}_i + \frac{\Delta_i}{2}\right) - F_{\phi_i}\left(\ddot{y}_i + \frac{\Delta_i}{2}\right) \quad (5.12)$$

Differentiating $\mathcal{L}_R$ with respect to $\ddot{y}_i$ (and assigning $p_{\ddot{y}_i} = p(\ddot{y}_i; \phi_i)$ for short-hand), we obtain:

$$\frac{\partial \mathcal{L}_R}{\partial \tilde{y}_i} = -\frac{1}{\ln(2)p_{\tilde{y}i}}\frac{\partial p_{\tilde{y}i}}{\partial \tilde{y}_i} = -\frac{1}{\ln(2)p_{\tilde{y}i}}\left(\frac{\partial F_{\phi_i}}{\partial \tilde{y}_i}\bigg|_{\tilde{y}_i+\frac{\Delta_i}{2}} - \frac{\partial F_{\phi_i}}{\partial \tilde{y}_i}\bigg|_{\tilde{y}_i+\frac{\Delta_i}{2}}\right) \quad (5.13)$$

Using the fact that the gradient of the CDF is equal to the PDF, $$\frac{\partial F_{\phi_i}}{\partial \tilde{y}_i} = p_{\phi_i},$$

we obtain $$\frac{\partial \mathcal{L}_R}{\partial \tilde{y}_i} = -\frac{1}{\ln(2)p_{\tilde{y}_i}}\frac{\partial p_{\tilde{y}i}}{\partial \tilde{y}_i} = -\frac{1}{\ln(2)p_{\tilde{y}_i}}\left(p_{\phi_i}\left(\tilde{y}_i + \frac{\Delta_i}{2}\right) - p_{\phi_i}\left(\tilde{y}_i - \frac{\Delta_i}{2}\right)\right) \quad (5.14)$$

For a univariate Laplacian distribution, the PDF $p(\ddot{y}_i; \mu_i, b_i)$ and CDF $F(\ddot{y}_i; \mu_i, b_i)$ have the analytical formulae $$p(\tilde{y}_i; \mu_i, b_i) = \frac{1}{2b_i}\exp\left(-\frac{|\tilde{y}_i - \mu_i|}{b_i}\right) \quad (5.15)$$

$$F(y_i; \mu_i, b_i) = \frac{1}{2} + \frac{1}{2}\text{sign}(\tilde{y}_i - \mu_i)\left(1 - \exp\left(-\frac{|\tilde{y}_i - \mu_i|}{b_i}\right)\right) \quad (5.16)$$

Assuming integer quantisation ($\Delta_i = 1.0$) and plugging in these equations into Equation (5.14), we get $$\frac{\partial \mathcal{L}_R}{\partial \tilde{y}_{0,i}} = \quad (5.17)$$

$$-\frac{(b_i\ln(2))^{-1}\exp\left(-\frac{|\tilde{y}_{0,i}+1/2|}{b_i}\right) - \exp\left(-\frac{|\tilde{y}_{0,i}-1/2|}{b_i}\right)}{\left(\text{sign}\left(\tilde{y}_{0,i}+\frac{1}{2}\right)\left(1-\exp\left(-\frac{|\tilde{y}_{0,i}+1/2|}{b_i}\right)\right)\right) - \text{sign}\left(\tilde{y}_{0,i}-\frac{1}{2}\right)\left(1-\exp\left(-\frac{|\tilde{y}_{0,i}-1/2|}{b_i}\right)\right)}$$

where $\ddot{y}_{0,i} = \ddot{y}_i - \mu_i$. Interestingly if $$\left|\tilde{y}_{0,i}\right| > \frac{1}{2},$$

then $$\text{sign}\left(\tilde{y}_{0,i} + \frac{1}{2}\right) = \text{sign}\left(\tilde{y}_{0,i} - \frac{1}{2}\right)$$

which is +1 if the variable is positive and −1 if it is negative. Taking this into account, we can rewrite Equation (5.17) by breaking up the domain of $\ddot{y}_{0,i}$:

$$\frac{\partial \mathcal{L}_R}{\partial \tilde{y}_i} \begin{cases} -(b_i\ln(2))^{-1}, & \text{if } \tilde{y}_{0,1} < -\frac{1}{2} \\ (b_i\ln(2))^{-1}, & \text{if } \tilde{y}_{0,1} > \frac{1}{2} \\ \frac{\sinh(\tilde{y}_{0,1}/b_i)}{b_i\ln(2)(\exp(1/2b_i)) - \cosh(\tilde{y}_{0,1}/b_i))}, & \text{otherwise} \end{cases} \quad (5.18)$$

We should now be able to see that if the input variable is larger than 4 in magnitude, the gradient of the rate loss is constant. This implies that any gradient biases are guaranteed to vanish for noise quantisation proxies when $|y_{0,i}| > \Delta$ since the additive noise has a maximum magnitude of ½. This entails the nice equality that $$\frac{\partial \mathcal{L}_R}{\partial \tilde{y}_{0,i}} = \frac{\partial \mathcal{L}_R}{\partial \tilde{y}_{0,i}} = \frac{\partial \mathcal{L}_R}{\partial \tilde{y}_{0,i}}.$$

For STE quantisation proxy, the same holds true but for $$|y_{0,i}| > \frac{\Delta}{2}.$$

Figure 40:
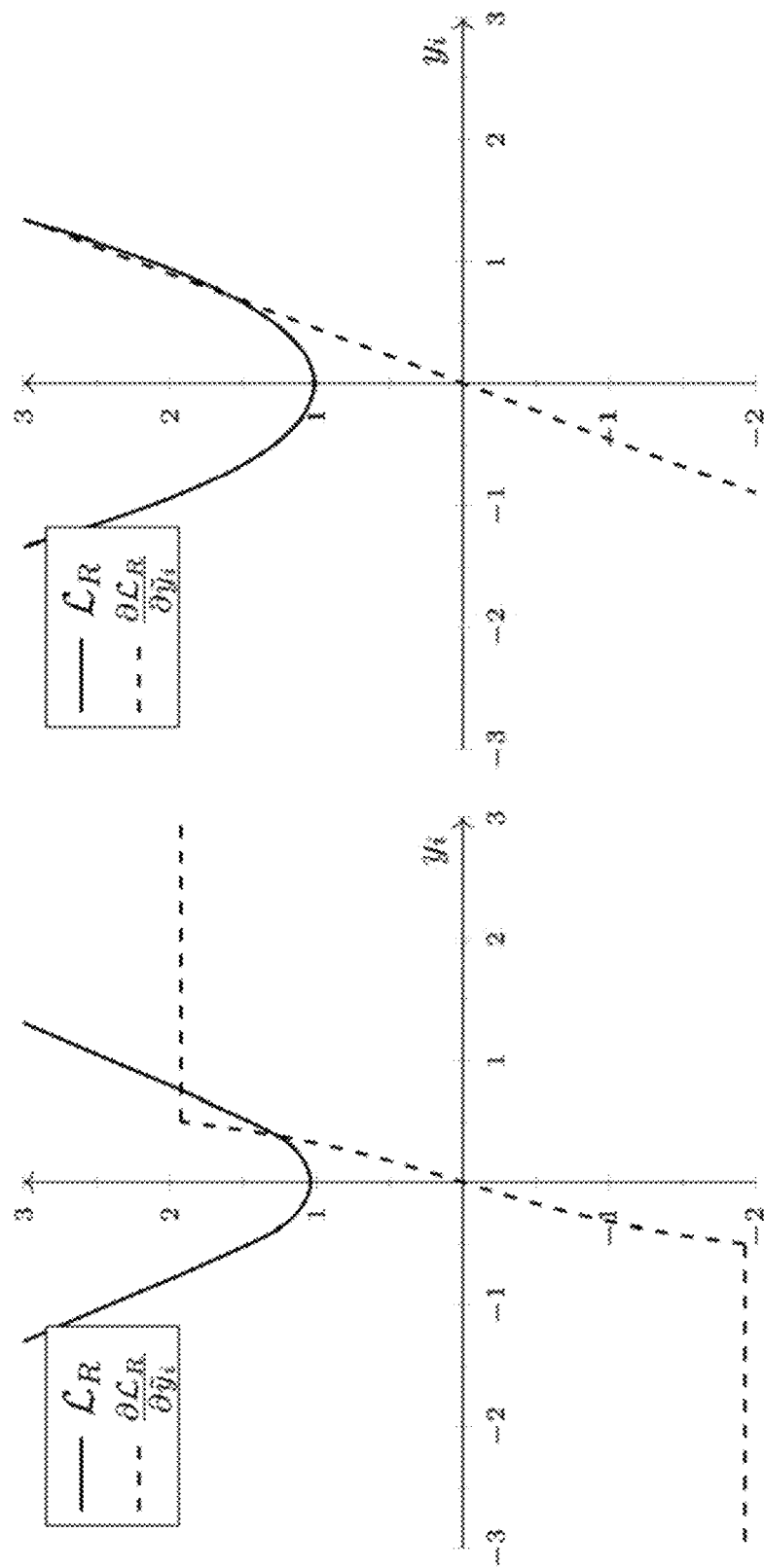
FIG. 40 shows example rate loss curves and their gradients. Left: Laplacian entropy model. Since the gradient magnitude is constant beyond $\Delta/2$, the gradient signal would always be equivalent for a rounded latent variable $\hat{y}_i=\lfloor y_i \rceil=y_i+\varepsilon(y_i)$ as for a noise-added latent if $|y_i|>\Delta$. Right: Gaussian entropy model. The same does not apply for a Gaussian entropy model, where it is clear that $\partial L_R/\partial \hat{y}_i \neq \partial L_R/\partial y_i$.

As justification, FIG. 40 plots the gradients of $\mathcal{L}_R$ of a Laplacian entropy model and compares it against one of a Gaussian model, where the gradients are biased to the quantisation. It shows rate loss curves (solid curves) and their gradients (dashed curves). Left: Laplacian entropy model. Since the gradient magnitude is constant beyond $$\frac{\Delta}{2},$$

the gradient signal would always be equivalent for a rounded latent variable $\hat{y}_i = \lfloor y_i \rceil = y_i + \varepsilon(y_i)$ as for a noise-added latent if $|y_i| > \Delta$. Right: Gaussian entropy model. The same does not apply for a Gaussian entropy model, where it is clear that $$\frac{\partial \mathcal{L}_R}{\partial \tilde{y}_i} \neq \frac{\partial \mathcal{L}_R}{\partial y_i}.$$

5.4.2 Twin Tower Regularisation Loss

One of the unwanted effects of closing the entropy gap, such as with STE quantisation proxies, is that the discretisation of the entropy model inhibits continuity in the gradient flow. Since the probability space is discrete, our gradient signals will also be discrete and dependent on the values of the quantised variables. Unfortunately, this has detrimental effects on the optimisation task.

Figure 41:
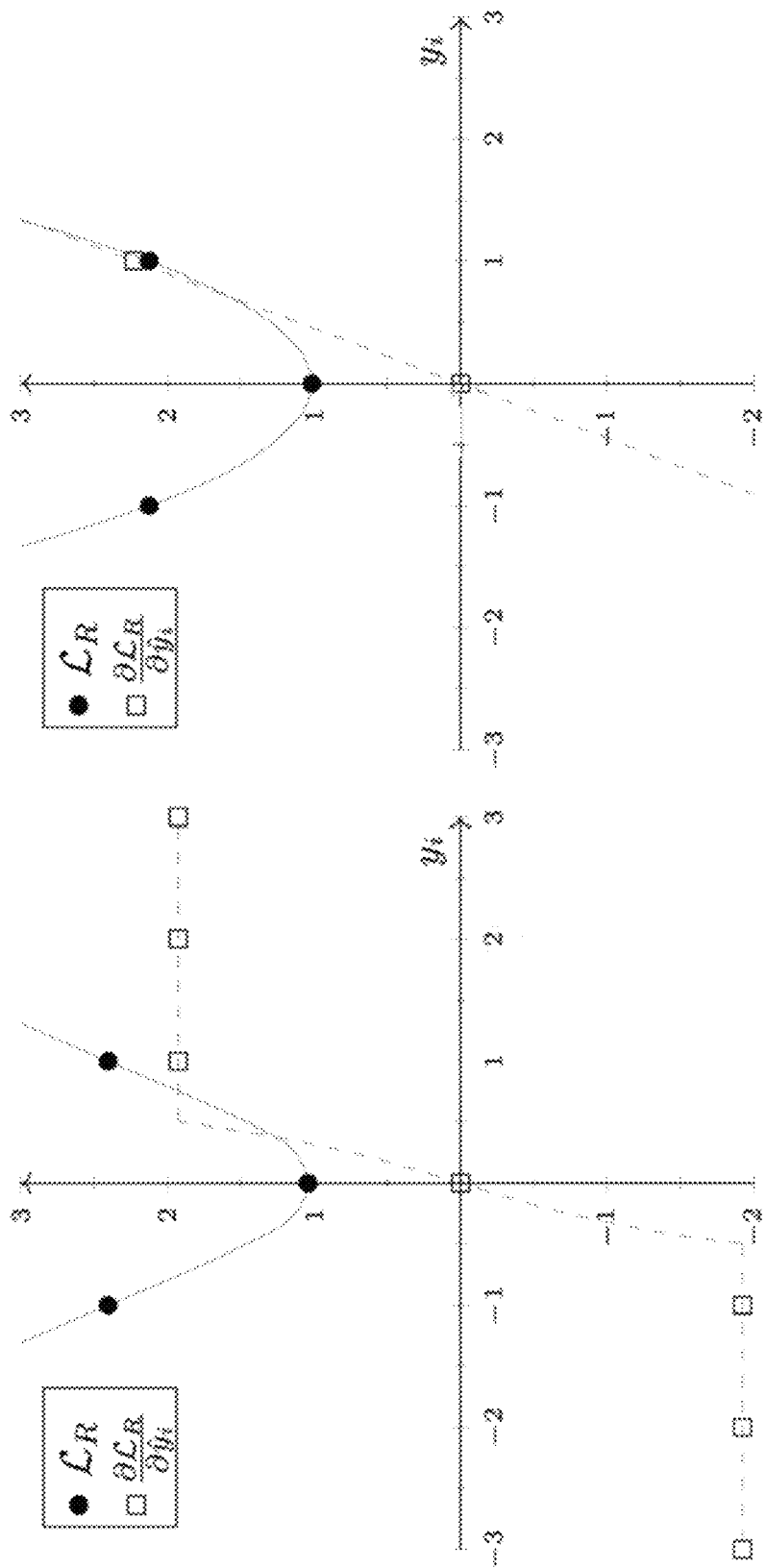
FIG. 41 is an example showing discontinuous loss magnitudes and gradient responses if the variables are truly quantised to each integer position. Left: Laplacian entropy model. Right: Gaussian entropy model.

Consider the dashed plots in FIG. 40. Imagine that the domain is discretised to all integers; the continuous curve plots would be replaced by discontinuous dots/squares for each integer position. This is shown in FIG. 41 for example, which shows the discontinuous loss magnitudes and gradient responses if the variables are truly quantised to each integer position (left: Laplacian entropy model; right: Gaussian entropy model). This has the following three meanings:

The gradient signals will be identical for all values that quantise to the same bin, regardless how similar or different they are;

The latents are maximally optimised for rate if the latent variables quantise to zero;

Once the latents are quantised to zero, it will receive zero gradient signal from the rate loss.

Figure 42:
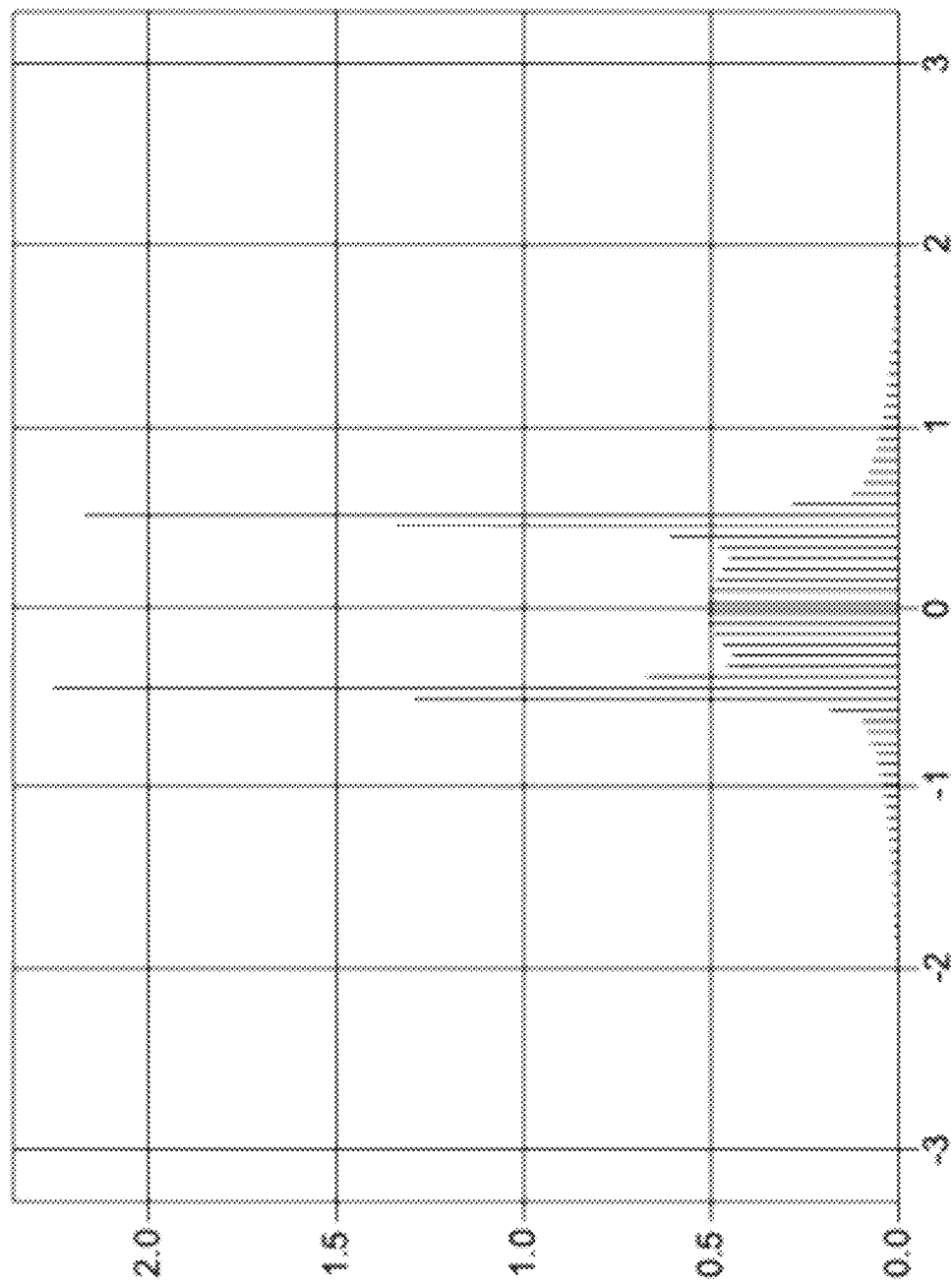
FIG. 42 is an example showing a histogram visualisation of the twin tower effect of latents y, whose values cluster around −0.5 and +0.5.

However, the inherent rate-distortion tradeoff prevents a total collapse of the latent space to zero from happening. The distortion requires information in the latent space to be maintained, and so it encourages the latent variables to spread away from zero. The combined effects of STE quantisation ignoring smoothness of values within a quantisation bin and the counteracting gradient signals of the rate and distortion losses yields a phenomenon which has been dubbed the twin tower effect. The results of this is that latent values cluster heavily around the first quantisation boundaries on each side of zero, most often $-0.5$ and $+0.5$ for integer quantisation. See FIG. 42 for example, which shows an example of a histogram visualisation of the twin tower effect of latents y, whose values cluster around $-0.5$ and $+0.5$.

One immediate remedy for this phenomenon would be to penalise latent density from accumulating at quantisation boundaries. This has the effect of introducing auxiliary gradients which are missing from the rate loss when $\hat{y}_i$ is zero, and thus assists in moderating the gradient gap. This could be done with a penalty function added to the loss function weighted with a coefficient that yields the maximum value when $|y_i|=0.5$.

Example: We could append our loss formulation from Equation (5.1) with a penalty loss term, $\lambda h(y, \sigma)$ where $\lambda$ is a weighting coefficient and $$h(y, \sigma) = \exp\left(-\frac{(y+0.5)^2}{\sigma^2}\right) + \exp\left(-\frac{(y+0.5)^2}{\sigma^2}\right)$$

is a penalty loss that is maximal at magnitude 0.5. The extent of the penalty can be adjusted with the $\sigma$ parameter, which becomes a tunable hyperparameter.

5.4.3 Split Quantisation and Soft-Split Quantisation

Having visited the effects of STE quantisation, we recognise that the negative impact stem from the entropy gap, or in other words due to the fact that the probability model is discretised. In fact, training with STE achieves much lower reconstruction losses than training with noise quantisation proxies, indicating that the decoder $f_{dec}$ seems to benefit from being aware of the true quantised variables.

Since we have distinguished two separate components for the discretisation gap (FIG. for example), one with respect to the rate loss and one with respect to the distortion loss, we can assign different quantisation proxies for each one. In order to avoid gradient issues when discretising the entropy model, we use noise quantisation $\ddot{Q}_R(y_i)=y_i+\varepsilon_i=\ddot{y}_i^{[R]}$, $\varepsilon_i \sim \mathcal{U}(-0.5, +0.5)$ for the rate component of the quantised latents. For the distortion component of the quantised latents, we leverage true quantisation in the forward function and override the backward function with a differentiable straight-through estimator, $$\tilde{Q}_D(y_i)\lfloor y_i \rceil = \hat{y}_i^{[D]}, \frac{\partial \tilde{Q}_D}{\partial y_i} = 1.$$

We call this quantisation scheme split quantisation. Whilst the discretisation gap remains open for the rate loss, the distortion discretisation gap is effectively closed. On the flip side, this also introduces a gradient gap for $\ddot{Q}_D$.

We can address the issue of the new gradient gap for $\ddot{Q}_D$ by simply rerouting the gradient signal through $\ddot{Q}_R(y_i)$ instead using detaching (or stop-gradient) operations. These exist in automatic differentiation packages which breaks the gradient flow through the detached quantities. With this knowledge, we introduce the soft-split quantisation $\ddot{Q}_{SS}$:

$$\ddot{Q}_{SS}(y_i)=\text{detach}(\ddot{Q}_D(y_i)-\ddot{Q}_R(y_i))+\ddot{Q}_R(y_i) \quad (5.19)$$

Now, since the gradients are flowing through the rate quantisation proxy, which has a closed gradient gap, we have successfully closed the discretisation gap for the distortion without yielding negative side-effects.

Figure 43:
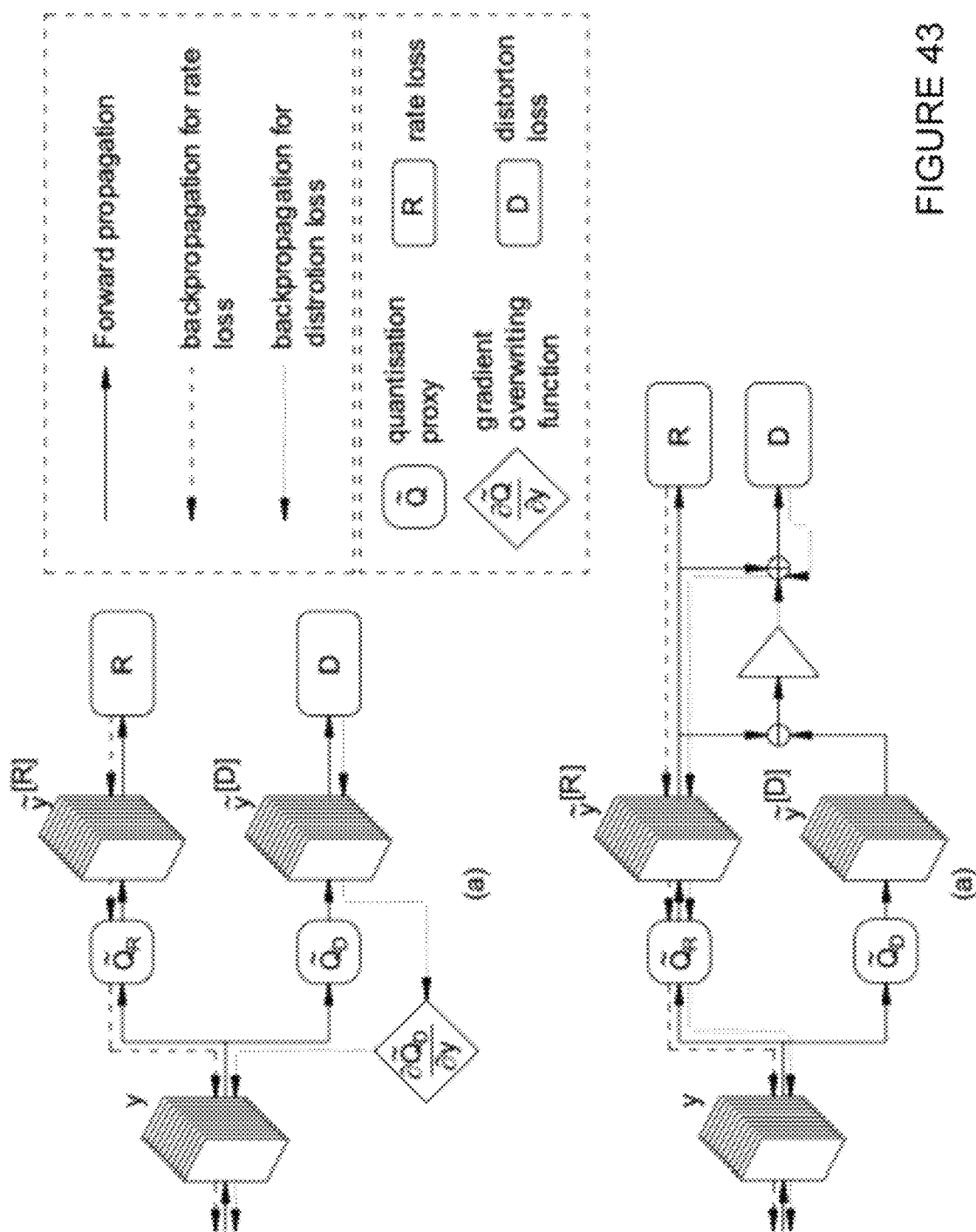
FIG. 43 shows an example with (a) split quantisation with a gradient overwriting function for the distortion component of quantisation. (b) Soft-split quantisation with a detach operator as per Equation (5.19) to redirect gradient signals of the distortion loss through the rate quantisation proxy.

Schematics for both split quantisation and soft-split quantisation can be seen in FIG. 43.

5.4.4 QuantNet

Mathematically, the derivative of a true quantisation function is zero almost everywhere and infinity at quantisation boundaries. Hence, this prevents us from using automatic differentiation packages to compute its gradient for further backpropagation. However, since most true quantisation functions can be seen as non-linear operators, we can assign a differentiable neural network $f_{QN}$ to simulate the task of the true quantisation function, which we call QuantNet. By supervising it to output the truly quantised variables $\hat{y}=f_{QN}(y) \approx \hat{y}$, we could leverage its differentiability to back propagate signals through the quantisation operation.

For each set of latents y, we compute the non-differentiable true quantised latents using, for instance, a rounding function $\hat{y}=\lfloor y \rceil$. Then, we supervise the QuantNet with a regularisation term (a norm-distance of degree p, which is the user's input choice) from the ground-truth quantised variables $$\mathcal{L}_{QN}=\|f_{QN}(y)-\hat{y}\|_p \quad (5.20)$$

which we minimise jointly with the standard rate-distortion objective (Equation (5.1)). As a result, the QuantNet is trained to output the true quantised variables which can be used or further propagation through the decoder and entropy model. In order to avoid the network from cheating (for instance by setting the QuantNet to the identity function which would in effect imply no quantisation), the regularisation term has to be appropriately scaled to enforce the intended behaviour of QuantNet.

The architectural details are not specific to this innovation, and can be arbitrarily composed by traditional deep learning operations (linear layers, convolution layers, activation functions, etc.). From the standpoint of the quantisation gaps, QuantNet attempts to narrow the gap of the discretisation gap and entropy gap, and definitely close the gradient gap thanks to its differentiability.

Variations and alternative strategies of QuantNet-based quantisation include, but are not limited to:

$f_{QN}$ can be pre-trained in isolation on arbitrary data to learn the quantisation mapping. After retaining a sufficiently high accuracy, we can slot the network into our autoencoder model and freeze its parameters, such that they will not get updated with optimiser steps (gradients will just flow through backwards).

$f_{QN}$ can be initialised at beginning of network training of the original autoencoder, but optimised separately in a two-step training process. After a full forward and backward propagation, firstly the parameters for the autoencoder are updated with the first set of optimisation configurations. Then, the parameters of the QuantNet (and, optionally, the encoder in addition to allow for more "quantisation-friendly" inputs) are optimised with its own set of optimisation configurations. This allows for better control of the balance between the necessities of the autoencoder (minimising rate and distortion) and the QuantNet (actually producing quantised outputs).

The QuantNet can also be designed so as to predict the quantisation residuals rather than the quantised variables themselves, $\ddot{\varepsilon}=f_{QN}(y)$. The functional expression then becomes $\hat{y}=y+f_{QN}(y)$, akin to a residual connection. The advantages of this is two-fold: a) $\ddot{\varepsilon}$ can be more easily restricted to output values limited to the range of actual quantisation variables (such as [−0.5, +0.5]), and b) the gradients from the distortion loss do not have to flow through the QuantNet which otherwise may render the gradients uninformative; instead, they flow directly to the encoder.

The regularisation term can also be extended to incorporate generative losses, such as a discriminator module trained to separate between real and fake quantisation residuals.

Figure 44:
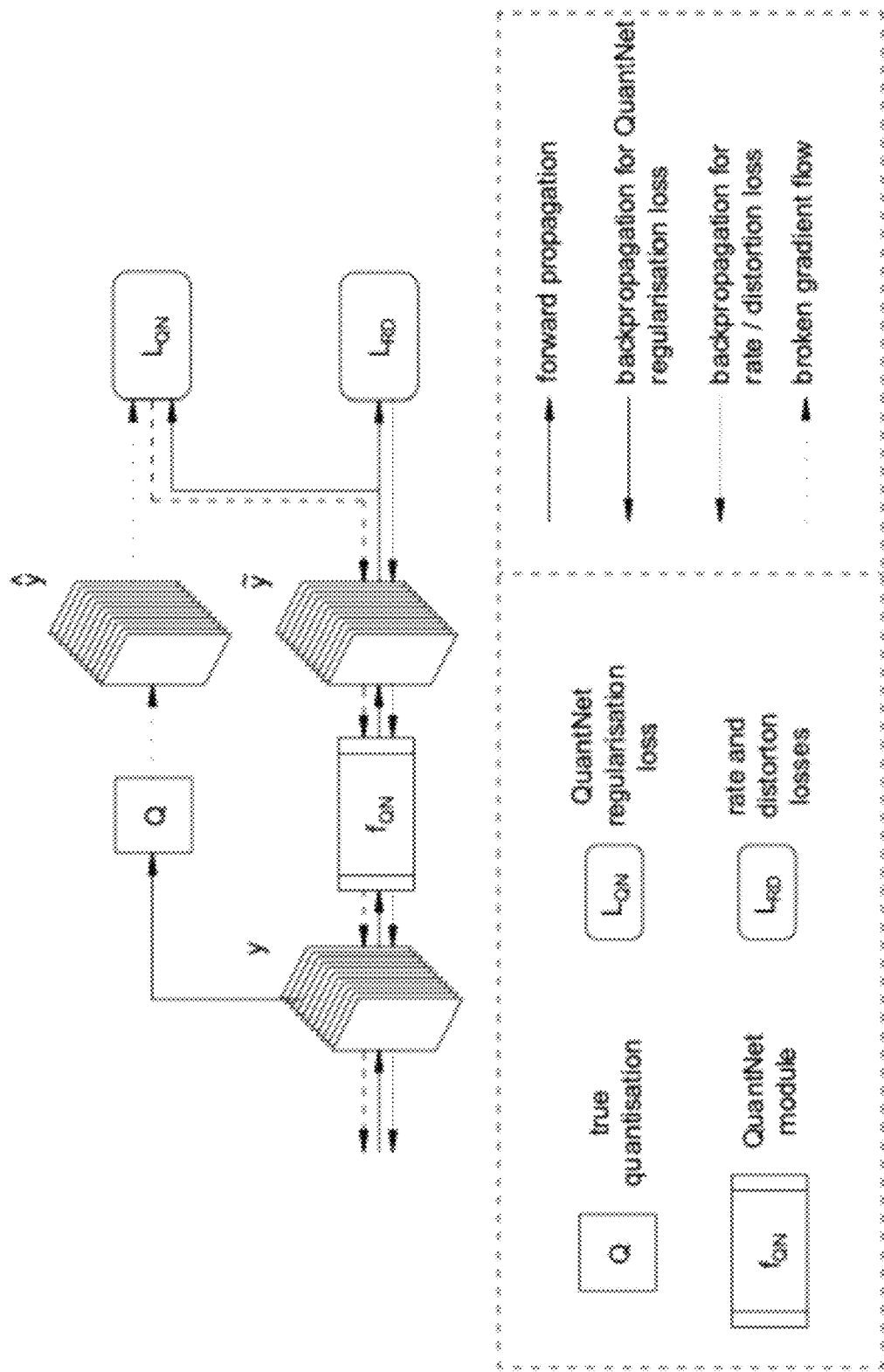
FIG. 44 shows an example flow diagram of a typical setup with a QuantNet module, and the gradient flow pathways. Note that true quantisation breaks any informative gradient flow.

FIG. 44 shows an example of a flow diagram of a typical setup with a QuantNet module, and the gradient flow pathways. Note that true quantisation breaks any informative gradient flow.

5.4.5 Learned Gradient Mapping

The learned gradient mapping approach can be seen as being related to the QuantNet concept. In contrast to parametrising a network to compute the forward function (and its derivative), this approach utilises the chain rule (Equation (5.4)) to parametrise and learn an alternative gradient function $$\frac{\partial^- Q}{\partial y} \approx \frac{\partial \hat{y}}{\partial y}$$

of a true quantisation operation $\hat{y}=Q(y)$. It can be seen as the generalisation of STE quantisation with a learned overriding function instead of the (fixed) identity function.

A flexible way of learning a gradient mapping is by using a neural network $f_{GM}: \frac{\partial \mathcal{L}}{\partial \hat{y}} \mapsto \frac{\partial \mathcal{L}}{\partial y}$ and optimise over its parameters. If the quantisation gradient $$\frac{\partial \hat{y}}{\partial y}$$

can be appropriately learned, this innovation contributes to closing the gradient gap for-STE quantisation proxies (since in the forward pass, we would be using true quantisation).

There exists at least two possible ways of training $f_{GM}$:

1. Simulated annealing approach: This method relies on stochastic updates of the parameters of $f_{GM}$ based on an acceptance criterion. Algorithm 5.1 demonstrates an example of such an approach.
2. Gradient-based approach: Similar to the previous method, but purely utilising gradient descent. Since $f_{GM}$ influences the encoder weights θ, the back-propagation flows through weight updates Δθ (so second-order gradients) in order to update the weights of $f_{GM}$, ψ.

5.4.6 Soft Discretisation of Continuous Probability Model

Figure 45:
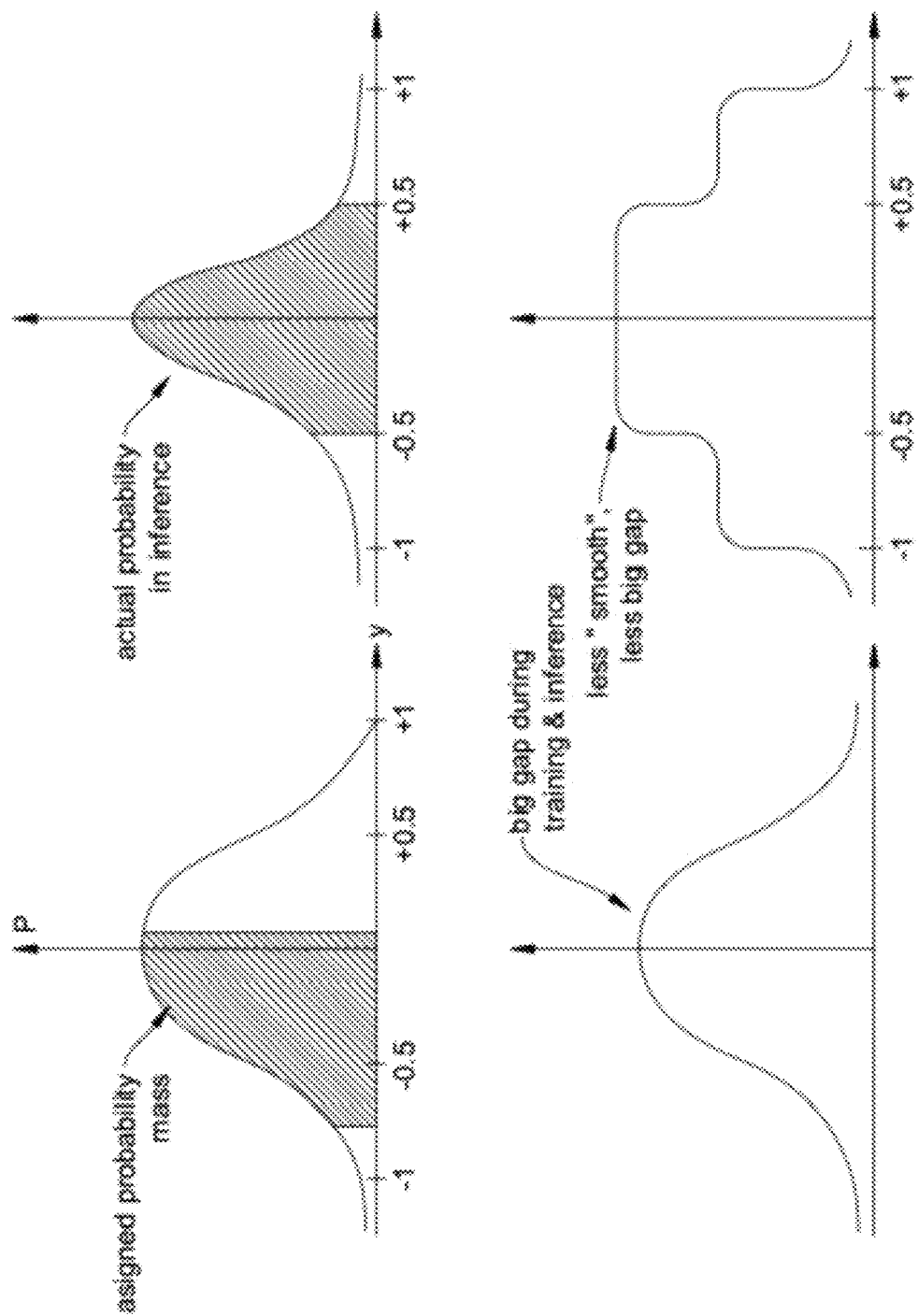
FIG. 45 shows an example in which there is provided, in the upper two plots: Visualisation of the entropy gap, and the difference in assigned probability per point for unquantised (or noise quantised) latent variable versus quantised (or rounded) latent variable. Lower two plots: Example of the soft-discretisation of the PDF for a less "smooth" continuous relaxations of the discrete probability model.

With a continuous relaxation for our probability model, the network spends efforts to optimise for small perturbations in y. From the perspective of the forward function of quantisation, these perturbations yield very little meaning since most of them get rounded away in inference. However, in network training, thanks to our rate formulation (Equations (5.11) and (5.12)), the probability mass evaluated differs by large margin from the actual probability mass assigned in inference, when we actually quantise (see upper two plots in FIG. 45 for example). This is also known as the entropy gap.

---

Algorithm 5.1 Simulated annealing approach of learning a gradient mapping for the true quantisation function. The parameters are perturbed stochastically and the perturbation causing encoder weight updates that reduce the loss the most is accepted as the weight update for $f_{GM}$.

---

1: Variables:

ψ: Parameters for $f_{GM}$: $\frac{\partial \mathcal{L}}{\partial \hat{y}} \to \frac{\partial \mathcal{L}}{\partial y}$ θ: Parameters for $f_{ene}$: x ↦ y (encoder)
2: for x in dataset do
3:   $\psi^{[0]} \leftarrow \psi$
4:   $\theta^{[0]} \leftarrow \theta$
5:   $\mathcal{L}^{[0]} \leftarrow$ autoencoder(x, $\theta^{[0]}$)
6:   for k ← 1 to K do
7:     Δψ ← sample( )         ▷ Arbitrary random distribution
8:     $\psi^{[k]} \leftarrow \psi^{[0]} + \Delta\psi$
9:     $\psi \leftarrow \psi^{[k]}$
10:    $\theta \leftarrow \theta^{[0]}$         ▷ Reset encoder weights to initial state
11:    backward($\mathcal{L}^{[0]}$)      ▷ Backpropagate with $\psi^{[k]}$ which influences $\theta^{[k]}$
12:    optimise(θ)         ▷ Gradient descent step for θ
13:    $\mathcal{L}^{[k]} \leftarrow$ autoencoder(x, θ)
14:  end for
15:  $k_{min} \leftarrow \arg\min_k \{\mathcal{L}^{[0]}, \mathcal{L}^{[1]}, \ldots, \mathcal{L}^{[K]}\}$
16:  $\psi \leftarrow \psi^{[k_{min}]}$         ▷ Update parameters for $f_{GM}$
17:  $\theta \leftarrow \theta^{[0]}$
18:  backward ($\mathcal{L}^{[0]}$)
19:  optimise(θ)
20: end for

---

We can counteract this effect by utilising more "discrete" density models, by soft-discretising the PDF to obtain less "smooth" continuous relaxation, such that the entropy gap can be reduced between training and inference. See the lower two plots in FIG. 45, for example, for a visualisation.

5.4.7 Context-Aware Quantisation

Since quantisation affects both the rate and distortion terms, it has a major impact on the optimisation task. However, in most cases, we set the bin widths Δ to be constant for all the elements that we quantise. This makes an implicit assumption that every element has the same sensitivity to quantisation errors. We have established that this is unlikely to be the ideal case. For instance, if a certain element $y_1$ is more sensitive to small perturbations than other elements $y_2$, then we would ideally like its error magnitude $|\varepsilon(y_1)|=|Q(y_1)-y_1|\varepsilon[0, \Delta_1]$ to be smaller in general than the error magnitude of the latter $|\varepsilon(y_2)|=|Q(y_2)-y_2|\varepsilon[0, \Delta_2]$. This is achieved by reducing the bin width of the former with respect to the latter element, $\Delta_1 < \Delta_2$.

Inspired by traditional compression whose main source of lossiness stems from the coarseness of the quantisation, we provide a learned method of context-aware quantisation for which Δ is predicted or optimised for. It can be an add-on to (uniform) noise quantisation, for which $\Delta_i=1.0$ normally for integer quantisation, on top of which we provide the following enhancements:

1. Making $\Delta_i$ learnable (of any granularity: element, channel or layer) such that the quantisation proxy becomes $$\tilde{Q}(y_i) = y_i + \varepsilon_i \quad \varepsilon_i \sim u\left(-\frac{\Delta_i}{2}, +\frac{\Delta_i}{2}\right)$$

and the true quantisation function becomes $$Q(y_i) = \left\lfloor \frac{y_i}{\Delta_i} \right\rceil \Delta_i$$

and then take into account the bin widths in the rate estimation. Optimise for $\Delta_i$ or its precursor during training.

Example: Assume we make the vector $\delta \varepsilon \mathbb{R}^M$ for our latent space $\mathbb{R}^M$, and truncating its values within $[-1, 1]$ (using a clamping or the hyperbolic tangent operation). $\Delta$ could be parametrised by choosing a positive base b, and compute $\Delta = b^\delta$. This approach maintains the elements within a fixed, positive bounds, $$\Delta \in \left[\frac{1}{b}, b\right]^M.$$

2. Similar to the previous point, but with the addition of encoding the meta-information regarding $\Delta_i$. This could be achieved through the usage of for instance a hyperprior, or a similar construct.
3. Transforming the latent space (or partitions of the space) into a frequency domain with a bijective mapping $T: \mathbb{R}^M \to \mathbb{R}^M$. This mapping T can be (a) fixed, using known discrete frequency bases such as discrete cosine transforms, discrete Fourier transforms, or discrete wavelet transforms etc., (b) learned using either the Householder transformation (since a bijective linear mapping constitutes an orthonormal basis) or (c) parametrised (and learned) using normalising flows. Then, in the transformed space, the latents are quantised with learned bin sizes A, each element of which pertains to a frequency band.

Example: Suppose the latent space is partitioned into B contiguous blocks of size L, and let us consider one such blocks, $y^{[b]} \in \mathbb{R}^L$, $\forall b \in \{1, \ldots, B\}$. We then transform this partitioned vector with an orthogonal basis matrix $M \in \mathbb{R}^{L \times L}$ into the transformed space, $T(y^{[b]}) = My^{[b]} = z^{[b]}$. In this space, the transformed vector is quantised with learned bin sizes $\hat{z}^{[b]} = Q(z^{[b]}, \Delta)$ and the rate loss is evaluated (or the bitstream is coded). Subsequently, the inverse transformation $T^{-1}$ is applied on the quantised transformed vector to retrieve $\hat{y}^{[b]} = T^{-1}(\hat{z}^{[b]}) = M^T \hat{z}^{[b]}$.

Note that this method does not necessarily aim to close any of the three gaps of quantisation. Rather, its goal is to assist in the parametrisation of the entropy model, of which quantisation is closely linked, to achieve lower bitrates in the compression pipeline.

5.4.8 Dequantisation

We have seen multiple cases of where dealing with discrete values encumbers gradient-based optimisation approaches such as gradient descent. However, the task of compression, in particular the inevitable quantisation process within it, is inherently a discrete one. Hence, there is interest in bridging the gap between the discrete and continuous spaces, and one effective way of doing so is through dequantisation. This is the process of producing a continuous distribution of an inherently discrete one (so a kind of quantisation inverse), which can be modelled with a continuous density model.

This concept has strong applicability in areas where a continuous density model (such as our entropy model) is necessary. Different dequantisation methods impose different assumptions of the underlying discrete model. For instance, adding independent uniform noise to dequantise discrete variables imply no assumptions of the dependency between the underlying variables. This is the most naïve form of dequantisation; in reality, for the case of latent variables exhibiting strong spatially local dependencies, quantisation residuals are strongly correlated. Therefore, it makes sense to incorporate more sophisticated dequantisation techniques that can support more realistic continuous probability models.

Some of the dequantisation techniques that we consider in our innovations include, but are not limited to:
- Uniform dequantisation
- Gaussian dequantisation
- Renyí dequantisation
- Weyl dequantisation
- Regularised dequantisation
- Autoregressive dequantisation
- Importance-weighted dequantisation
- Variational dequantisation with flow-based models
- Variational dequantisation with generative adversarial networks 5.4.9 Minimising Quantisation Error with Vector-Jacobian Products Intuitively, one may associate the minimisation of quantisation residuals to having the least adverse effect on the compression optimality. However, due to the highly non-convex nature of neural networks, this is not necessarily true. Rather, we have established theory that the that the minimisation of the adverse effects of quantisation on the global loss definition of compression (Equation (5.1)) is related to minimising second-order effects on the quantisation residuals.

The theory that underpins this assertion can be derived by assuming that the loss term is a function of the input vector x and a feature (latent) vector y, $\mathcal{L}(x, y)$. Then, given a (discrete) perturbation on the feature vector, $\Delta y$, we would like to minimise the following:

$$\mathbb{E}\left[\mathcal{L}(x, y + \Delta y) - \mathcal{L}(x, y)\right] \quad (5.21)$$

Expanding Equation (5.21) using the second-order Taylor series approximation, we obtain $$\mathbb{E}\left[\Delta y^T \cdot \nabla_y \mathcal{L}(x, y) + \frac{1}{2} \Delta y^T \cdot \nabla_y^2 \mathcal{L}(x, y) \cdot \Delta y\right] \quad (5.22)$$

where we can denote for the expected value of the loss gradient vector and Hessian matrix with respect to y:

$$g_y = \mathbb{E}\left[\nabla_y \mathcal{L}(x, y)\right] \quad (5.23)$$

$$H_y = \mathbb{E}\left[\nabla_y^2 \mathcal{L}(x, y)\right] \quad (5.24)$$

The loss gradient $g_y$ is computable through automatic differentiation packages (through vector-Jacobian product computation). Although the Hessian $H_y$ is also retrievable in the same way, the Hessian is an order of complexity larger than the gradient, and may not be feasible to compute. However, we can often evaluate Hessian-vector (or vector-Hessian) product directly with automatic differentiation tools, circumventing the issue of storing the Hessian matrix explicitly. Nevertheless, we may also use techniques to approximate the Hessian, such as Second-order finite difference methods;
Broyden-Fletcher-Goldfarb-Shanno (BFGS) algorithm;
Limited-memory BFGS (L-BFGS) algorithm;
Other quasi-Newton algorithms.

Example: Assume we have a fully trained network and that a set of unquantised latents y with corresponding data point x minimises a loss function $\mathcal{L}(x, y)$. Instead of rounding to the nearest integer, we optimise for the quantisation perturbation $\Delta y$ that has the least impact on the loss value $$\hat{y} = y + \operatorname*{argmin}_{\Delta y} \Delta y^T H_y \Delta y \quad (5.25)$$

where the loss gradient is ignored since it theoretically evaluates to zero for a fully trained network. Here, each set of element in $\Delta y$ are chosen such that each $y_i$ is either rounded up or down:

$$\Delta y_i \in \{\lfloor y_i \rfloor - y_i, \lceil y_i \rceil - y_i\} \quad (5.26)$$

This turns the optimisation task defined in Equation (5.25) into a quadratic unconstrained binary optimisation problem; an NP-hard problem, unluckily. However, there exist methods that we could use to approximate the global solution to Equation (5.25), for instance using AdaRound which turns the optimisation into a continuous optimisation problem with soft quantisation variables.

5.4.10 Quantisation in Parameter Space

Up until now, we have assumed that the quantisation is performed in feature space, in particular the latent space in which vectors ultimately get encoded and transmitted. However, all forms of quantisation, both introduced as known in the introduction sections as well as our innovations within this field, are similarly applicable in the quantisation of parameter space. This is particularly in the interest of low-bit network architecture, for which low-bit network quantisation plays an important role. It is also useful for innovations involving the transmission of quantised network parameters included in the bitstream, which is employed for instance in finetuning processes. Hence, our advances do not solely pertain to quantisation in feature space, but similarly in parameter space.

5.5 Concepts

In this section, we present the following concepts regarding quantisation, both scalar and vector quantisation considered, in both feature and parameter space for AI-based data compression with details outlined in the referenced sections. All concepts listed below are considered under the context of quantisation in the wider domain of AI-based data compression.

Section 5.4.1, "Eliminating Gradient Bias with Laplacian Entropy Model"
  Application of entropy models of distributions families with unbiased (constant) gradient rate loss gradients to quantisation, for example the Laplacian family of distributions, and any associated parametrisation processes therein.

Section 5.4.2, "Twin Tower Regularisation Loss"
  Application of mechanisms that would prevent or alleviate the twin tower problem, such as adding a penalty term for latent values accumulating at the positions where the clustering takes place (for integer rounding, and for STE quantisation proxies, this is at −0.5 and +0.5).

Section 5.4.3, "Split Quantisation and Soft-Split Quantisation"
  Application of split quantisation for network training, with any arbitrary combination of two quantisation proxies for the rate and distortion term (most specifically, noise quantisation for rate and STE quantisation for distortion);
  Application of soft-split quantisation for network training, with any arbitrary combination of two quantisation proxies for the rate and distortion term (most specifically, noise quantisation for rate and STE quantisation for distortion), where either quantisation overriding the gradients of the other (most specifically, the noise quantisation proxy overriding the gradients for the STE quantisation proxy).

Section 5.4.4, "QuantNet"
  Application of QuantNet modules, possibly but not necessarily parametrised by neural networks, in network training for learning a differentiable mapping mimicking true quantisation, with associated loss (regularisation terms) that actively supervises for this behaviour;
  Application of variations of QuantNet modules in terms of functional expression, for example learning the quantisation residuals, and in terms of training strategies such as pre-training or two-stage training processes;
  Application of other types of loss functions such as generative (adversarial) losses.

Section 5.4.5, "Learned Gradient Mapping"
  Application of learned gradient mappings, possibly but not necessarily parametrised by neural networks, in network training for explicitly learning the backward function of a true quantisation operation;
  Application of any associated training regime to achieve such a learned mapping, using for instance a simulated annealing approach or a gradient-based approach, or any other strategy that would achieve the intended effect.

Section 5.4.6, "Soft Discretisation of Continuous Probability Model"
  Application of more discrete density models in network training, by soft-discretisation of the PDF or any other strategy that would achieve the intended effect.

Section 5.4.7, "Context-Aware Quantisation"
  Application of context-aware quantisation techniques, which include learnable noise profiles for noise quantisation proxies in training and commensurate quantisation bin widths employed during inference and deployment;
  Application of any parametrisation scheme for the bin width parameters, at any level of granularity (elements, channel, layer), including any form of encoding strategy of the parametrisation as meta-information;
  Application of context-aware quantisation techniques in a transformed latent space, achieved through bijective mappings such as normalising flows or orthogonal basis transforms that are either learned or fixed.

Section 5.4.8, "Dequantisation"
  Application of dequantisation techniques for the purpose of modelling continuous probability distributions out of discrete probability models;
  Application of dequantisation techniques for the purpose of recovering the quantisation residuals through the usage of context modelling or other parametric learnable neural network module, both in training and in inference and deployment.

Section 5.4.9, "Minimising Quantisation Error with Vector-Jacobian Products"

Application of the modelling of second-order effects for the minimisation of quantisation errors, both during network training and in post-training contexts for fine-tuning purposes;

Application of any arbitrary techniques to compute the Hessian matrix of the loss function, either explicitly (using finite difference methods, BFGS or quasi-Newton methods) or implicitly (by evaluating Hessian-vector products);

Application of adaptive rounding methods (such as AdaRound that utilises the continuous optimisation problem with soft quantisation variables) to solve for the quadratic unconstrained binary optimisation problem posed by minimising the quantisation errors.

6. Exotic Data Type Compression

6.1 Introduction

The end-to-end AI-based Compression pipeline usually gets applied to standard format images (single images of arbitrary resolution) and videos (single videos of arbitrary resolution). However, this limits the true potential of the end-to-end based principle that the AI-based Compression pipeline pioneers. Here we describe the usage of AI-based Compression on specific data types and for specific markets and show how, and why, AI-based Compression is ideally suited for exotic data type compression.

Specifically, we will look at the extension of the AI-based Compression pipeline for:

Stereo-image data (e.g. VR/AR data, depth-estimation)

Multi-view data (e.g. self-driving cars, image/video stitching, photogrammetry)

Satellite/Space data (e.g. multispectral image/videos)

Medical data (e.g. MRI-scans)

Other image/video data with specific structure

There are numerous exotic data types for which traditional compression approaches (non-end-to-end learned techniques, e.g. JPEG, WebP, HEIC, AVC, HEVC, VVC, AV1) do not work. This is because of three reasons: First, the traditional compression methods have long, costly development processes with a lot of hand-crafting and human input required. Thus, exotic data compression is not a sufficiently big market to justify developing a stand-alone compression approach. Second, the exotic data types often come with a "specific" structure that could be exploited for better compression, but this structure is too complex and challenging to model for the traditional compression approaches. Third, the exotic data often requires different optimisation criteria than compression wrt "pleasing visual images/videos". E.g. for medical data, the visual aspect is less relevant compared to the accuracy of medical post-processing algorithms that use the compressed data as input. Given these difficulties, until now, there exist only general-purpose compression codecs without specialised sub-codecs. If "sub-codecs" exists, they are often naively-applied traditional methods without any specialisation or modifications.

In contrast to the traditional compression techniques, the AI-based Compression pipeline is an end-to-end learnable coded based on neural networks. As neural networks are universal function approximators, the AI-based Compression can, theoretically, model any dependencies as long as sufficient training data with these structures are given. Also:

1. Changing the AI-based Compression pipeline to different input data can be achieved by creating a new dataset and retraining the neural networks.
2. Modelling different and challenging structures in the AI-based Compression pipeline can be achieved by modifying its neural architecture.
3. Modelling for other objectives than "visual quality" can be achieved by changing the pipeline/neural network's loss function.

Thus, the AI-based Compression is ideally suited to not only create a better general-purpose compression codec but to create numerous sub-codecs that, for the first time, can compress exotic data optimally. In general, these techniques can be extended to arbitrary image and video related exotic data.

6.2 Stereo Data Compression

In video compression, we have input across the temporal domain, $x_{1,t}$ and $x_{1,t+1}$, and have temporal constraints on the data: $x_{1,t+1}$ will depend in $x_{1,t}$. The temporal constraints are motion-constraints and come from prior knowledge how things move in the time direction.

In stereo data compression, we have two input images or videos, $x_{1,t}$ and $x_{2,t}$, at the same temporal position. Additionally, if the data's viewpoints overlapped to any degree or have overlapped in the past, the stereo data has spatial constraints given by its common (3D) viewpoint.

Compression can be just another word for redundancy reduction. Stereo data compression aims to use these spatial constraints to lower the entropy/filesize by using the given spatial constraints to reduce information. Thus, it is crucial that AI-based Compression processes and entropy-encodes $x_{1,t}$ and $x_{2,t}$ simultaneously using their joint probability distribution $P(x_1, x_2)$ (omitting index t). Note that this is different to video compression where we require their conditional probability function $P_{(x_{t+1}|x_t)}$ or single input compression using $P_{x_1}$.

Figure 46:
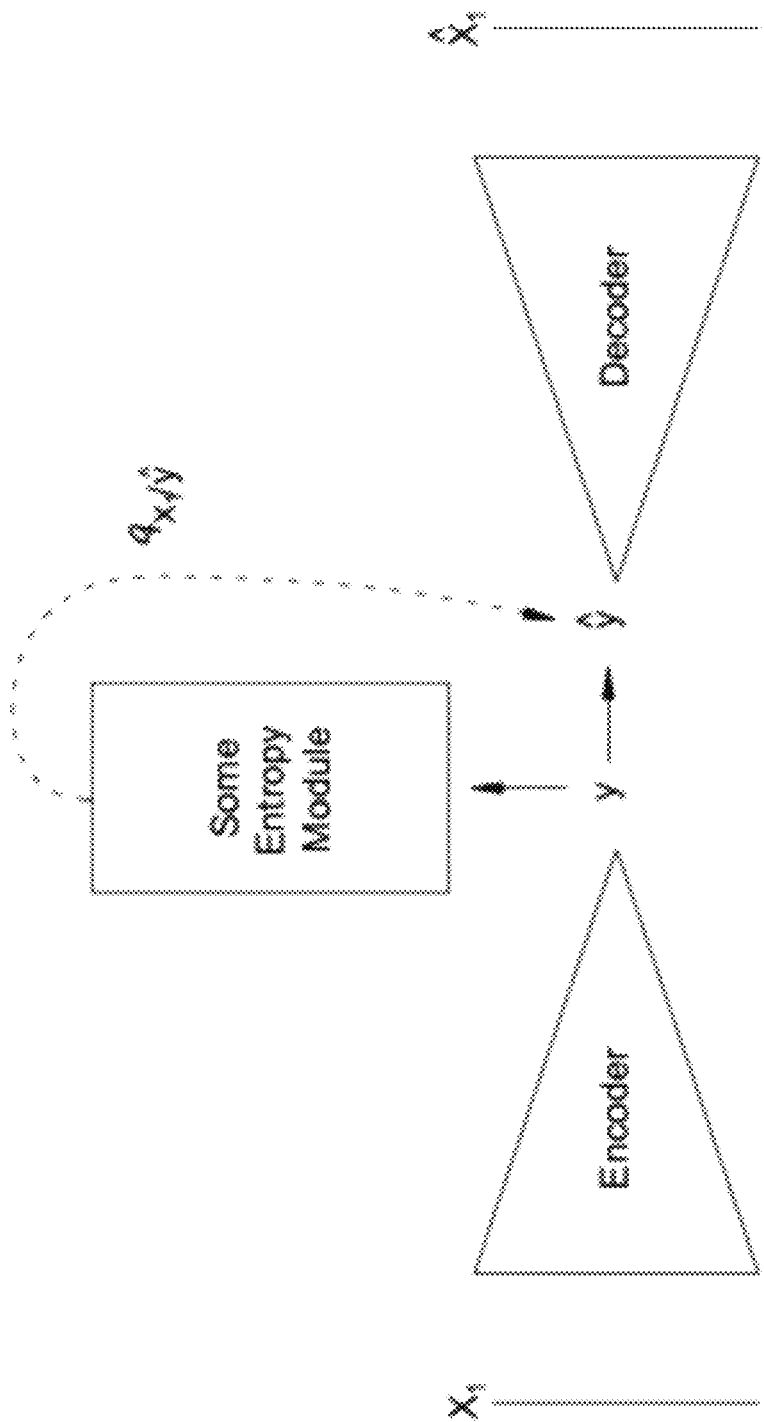
FIG. 46 shows an example of a single-input AI-based Compression setting.
Figure 47:
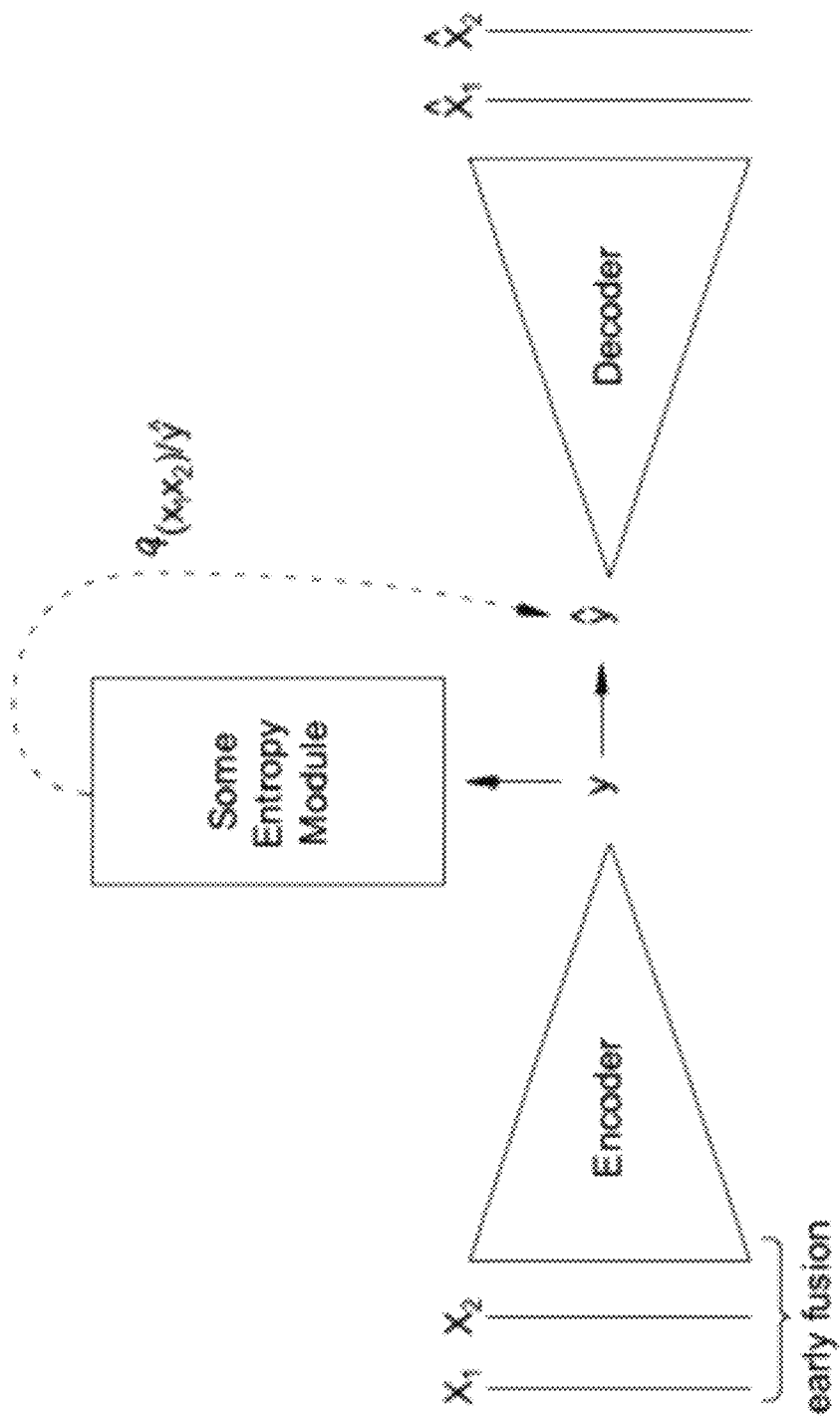
FIG. 47 shows an example of AI-based Compression for stereo inputs.

The AI-based compression pipeline's extension to model stereo data is to give both as input data for the neural network (→early fusion); FIG. 46 & FIG. 47 illustrates these modifications. Additionally, the compression formulation naturally extends to stereo data. Let $(x_1, x_2)$ be the input data, y be the bottleneck latent space and p(•) be the ground-truth distributions (unknown) and q(•) be our approximate distributions. Minimising the KL divergence of the posterior distribution is equivalent to:

In a compression with input $x_1$:

$$\mathbb{E}_{x_1 \sim p_{x_1}}[p_{y|x_1} \| q_{y|x_1}] \propto \mathbb{E}_{x_1 \sim p_{x_1}}\left[\mathbb{E}_{y \sim p_y}\left[\underbrace{-\log(q_{x_1|y}(x_1|y))}_{\text{Distortion}} \underbrace{-\log(q_y(y))}_{\text{Rate}}\right]\right]$$

In stereo compression with input $(x_1, x_2)$:

$$\mathbb{E}_{(x_1,x_2) \sim p_{(x_1,x_2)}}[p_{y|(x_1,x_2)} \| q_{y|(x_1,x_2)}] \propto$$
$$\mathbb{E}_{(x_1,x_2) \sim p_{(x_1,x_2)}}\left[\mathbb{E}_{y \sim p_y}\left[\underbrace{-\log(q_{(x_1,x_2)|y}(x_1,x_2|y))}_{\text{Distortion}} \underbrace{-\log(q_y(y))}_{\text{Rate}}\right]\right]$$

6.2.1 the Loss Function

Compression relates to the rate-distortion trade-off: a distortion term that models human perception vision and a rate term that models the filesize.

However, in stereo-image compression, there is a high likelihood that we are not only interested in the visual quality of output $\hat{x}_1$ and $\hat{x}_2$, but also care about keeping the integrity of the 3D-viewpoint. For instance, Stereoscopy (in VR) requires more constraints than just the visual quality of $\hat{x}_1$ and $\hat{x}_2$. Stereoscopy also requires that the re-projection of the 2d-plan into the 3d-world is consistent, aka. that the depth information encoded between $\hat{x}_1$ and $\hat{x}_2$ is (sufficiently) accurate.

Figure 48:
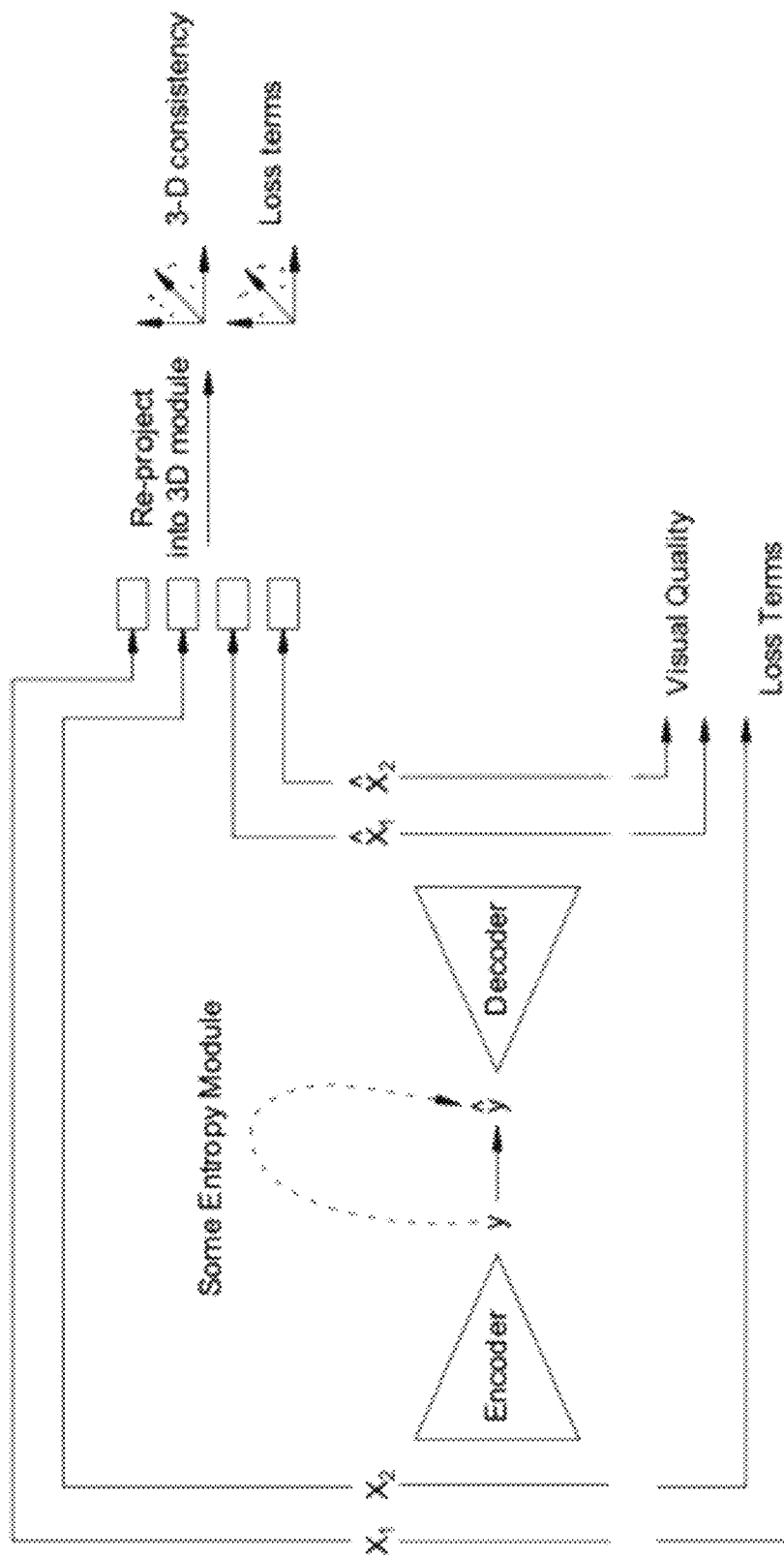
FIG. 48 shows an example of stereo image compression which requires an additional loss term for 3D-viewpoint consistency.

To model this constraint, the AI-based Compression pipeline requires and additional (differentiable) loss term; FIG. 48 illustrates an example of this add-on. Possible loss terms are:

1. Single image depth-map estimation of $x_1$, $x_2$, $\hat{x}_1$, $\hat{x}_2$, and then measuring the distortion between the depths maps of $x_1$, $\hat{x}_1$ and $x_2$, $\hat{x}_2$. For single-image depth map generation we can use Deep Learning methods such as self-supervised monocular depth estimation or self-supervised monocular depth hints. For distortion measures, we can use discriminative distance measures or generative metrics.
2. A reprojection into the 3-d world using $x_1$, $x_2$ and one using $x\hat{x}_1$, $\hat{x}_2$ and a loss measuring the difference of the resulting 3-d worlds (point-cloud, vortexes, smooth surface approximations). For distortion measures, we can use discriminative distance measures or generative metrics.
3. Optical flow methods (e.g. DispNet3, FlowNet3) that establish correspondence between pixels in $x_1$, $x_2$ and $x\hat{x}_1$, $\hat{x}_2$ and a loss to minimise these resulting flow-maps. For flow-map distortion measures, we can use discriminative distance measures or generative metrics.

6.2.2 Other Considerations

Another observation is that with a stereo-camera setting, we have a new type of meta-information that can be helpful: The positional location information of the cameras/images and their absolute/relative configuration. For instance, in Stereoscopy the baseline, the FoV (field-of-view), sensor-type, resolution, and other metainformation is invaluable.

Figure 49:
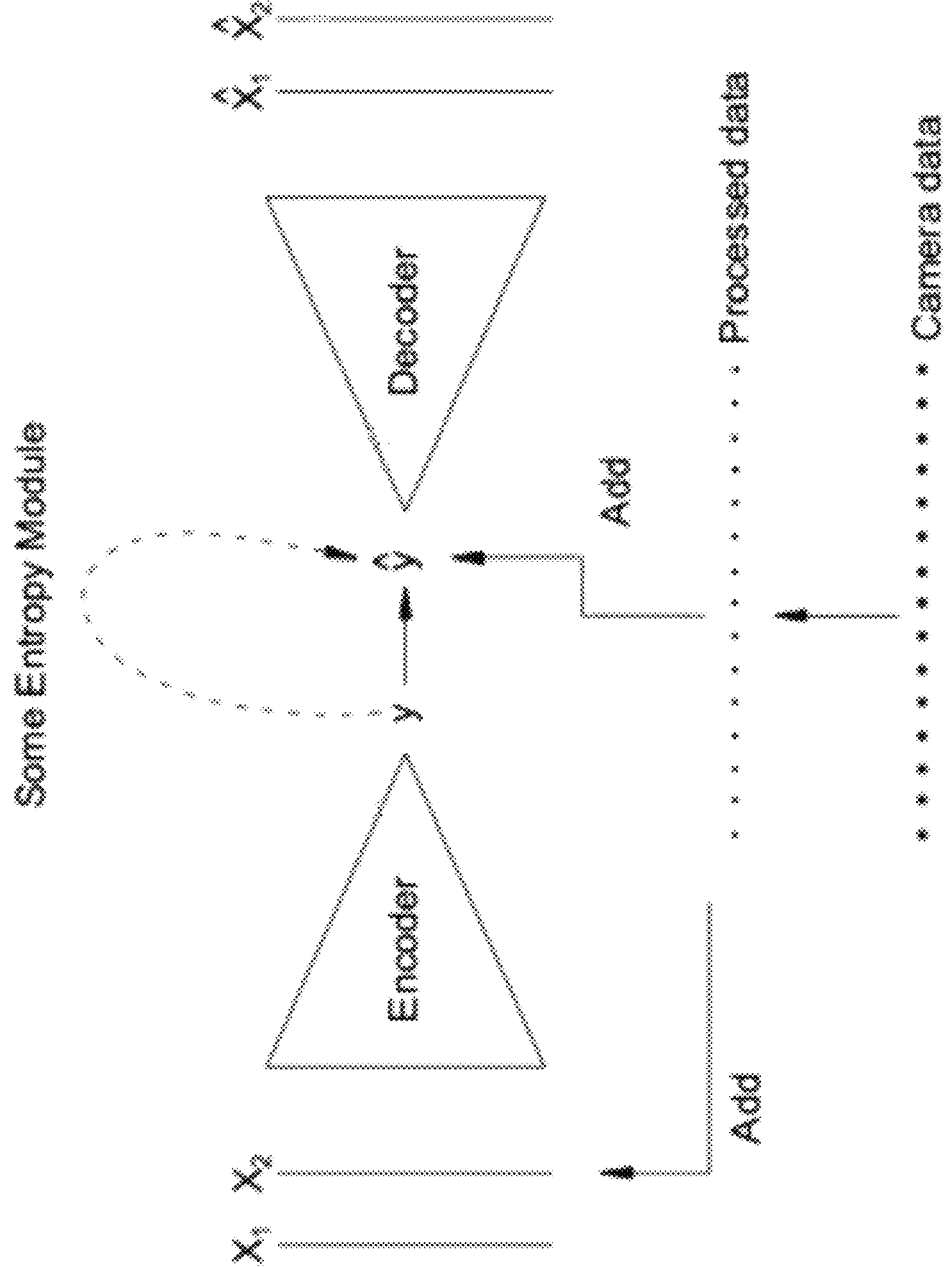
FIG. 49 shows an example including adding stereo camera position and configuration data into the neural network.

For stereo data compression, we can either have our neural network encode this information as a prior through the training process. Or we can explicitly feed this information into our neural network through architecture modification. For instance, we can bring the metadata to the same resolution as the image/video data through processing with fully connected layers and then concatenate it to the inputs $(x_1, x_2)$ and to the bottleneck latent y. FIG. 49 illustrates an example of this step.

If we use early fusion in the compression pipeline, it also makes sense to provide the ground-truth dependencies between $x_1$ and $x_2$ as additional input. This is crucial as a more proper modelling of the joint-probability function of $x_1$ and $x_2$ is a conditional joint distribution given the spatial restrictions and dependencies. E.g. using $p_{(x_1,x_2)|spatial\text{-}restriction\text{-}data}$ is a much better model to reduce entropy than simply using $p_{(x_1,x_2)}$. For example: If we have access to the depth-maps; or approximate the actual depth maps via advanced algorithms, e.g. DispNet3, we can use it as additional, helpful input. The input to our Encoder gets extended from $(x_1, x_2, \text{camera-data})$ to $(x_1, x_2, \text{camera-data}, \text{spatial-restriction-data})$, with spatial-restriction-data being the depth-map, optical-flow or other useful data.

6.3 Multi-View Data Compression

Multi-view data is the natural extension of stereo-data to a more complex setting. Instead of $x_{1,t}$ and $x_{2,t}$, we now have N input images/video $\{x_{1,t}, x_{2,t}, \ldots, x_{N,t}\}$ that might come from different devices with different settings. Good examples include 2D-to-3D, Photogrammetry, Self-driving cars, SLAM-applications, (online) visual odometry, 360°-video (can be interpreted as multi-view data), n-D simulation, 360°-images/videos on a website, panoramic images/videos, and others.

Each of these examples has its unique constraints, which if we can phrase as a differentiable loss function, we can incorporate in the AI-based Compression pipeline. Suppose we can not express the constraints into a differentiable loss function. In that case, we can still use either a proxy network similar to "QuantNet" or "VMAF Proxy" and/or can use reinforcement learning techniques to model it.

Figure 50:
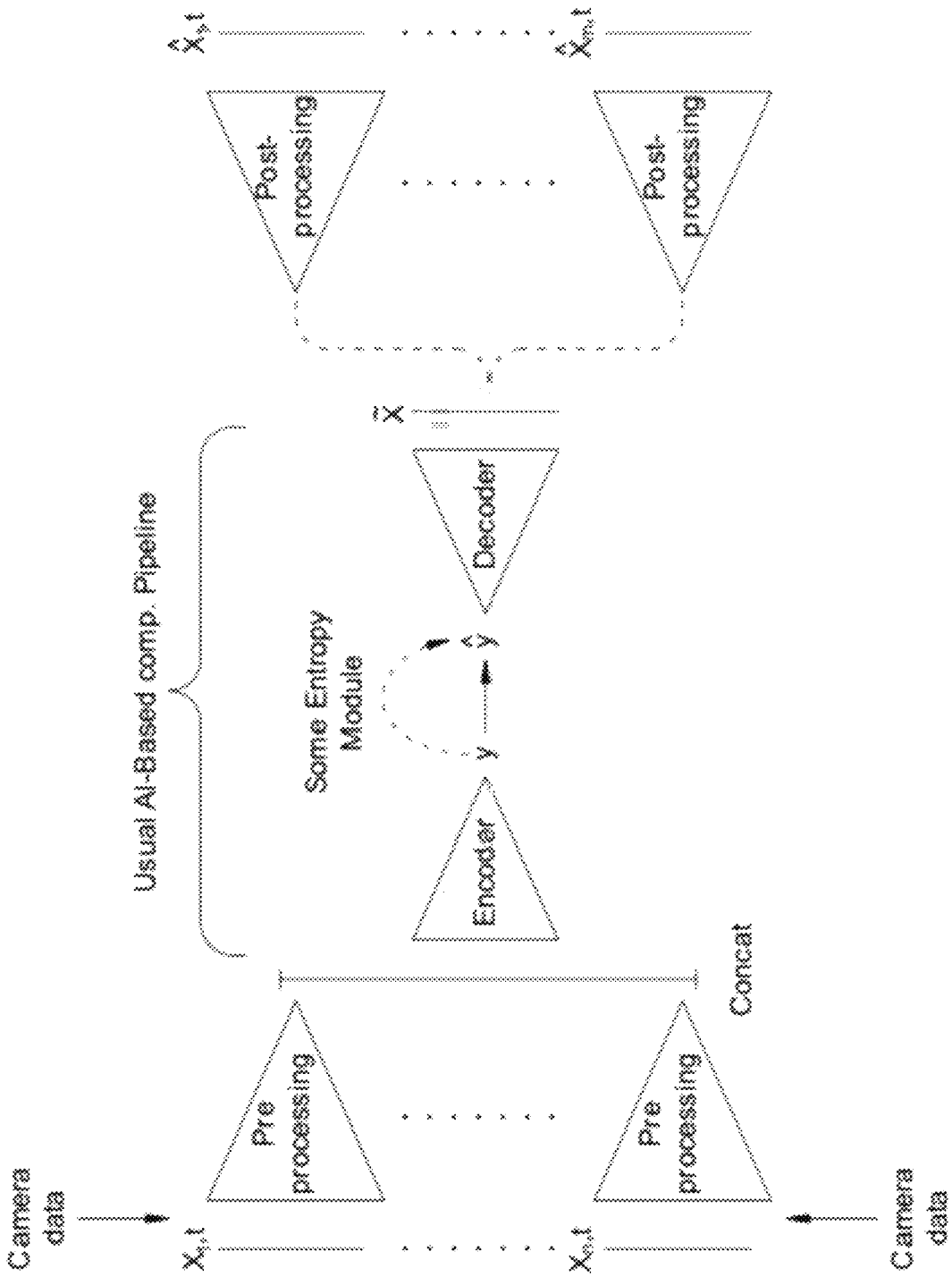
FIG. 50 shows an example including pre- and post-processing data from different sensors.

If we have data that does not come from the same sensors, e.g. in self-driving cars, the camera sensors around the vehicle can vary; it makes sense to use pre-processing layers to bring all data into the same feature space. FIG. 50 illustrates an example of this extension to the AI-based Compression pipeline.

6.3.1 Other Considerations

In stereo data compression, we have spatial constraints, usually given by a common 3-D viewpoint. In video compression, we have temporal constraints, traditionally given by motion-vectors and motion/acceleration/momentum restrictions. In multi-view data (especially multi-view video), we tend to have both of these constraints.

Figure 51:
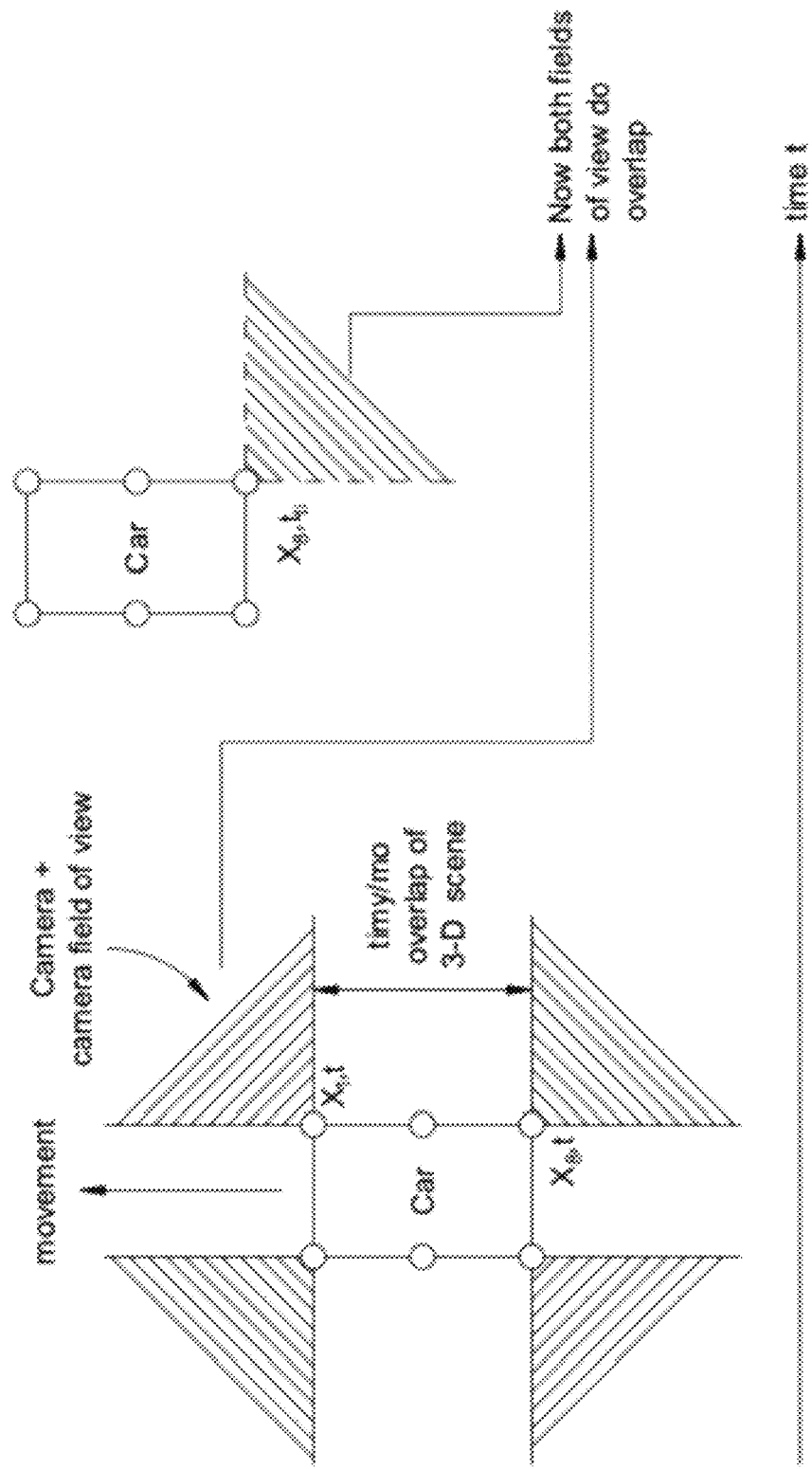
FIG. 51 shows an example of temporal-spatial constraints.

Suppose we have a self-driving car with eight cameras at the top-left, top, top-right, middle-left, middle-right, bottom-left, bottom-middle, bottom-right. At the same time, t, some of these cameras will have overlapping viewpoints from a common 3D-scene and thus, have spatial constraints. However, some of the cameras will not have a common 3D-scene at t (e.g. top-right and bottom-right). FIG. 51 visualises an example. However, if the car continues to move forward, at some time (t+i), the 3D-scene that the bottom right camera is capturing will have a spatial-temporal constraint from a previous frame captured by the top-right camera. Thus, multi-view video data is, in some sense, the combination of spatial and temporal constraints that can be exploited for redundancy reduction/compression.

Figure 52:
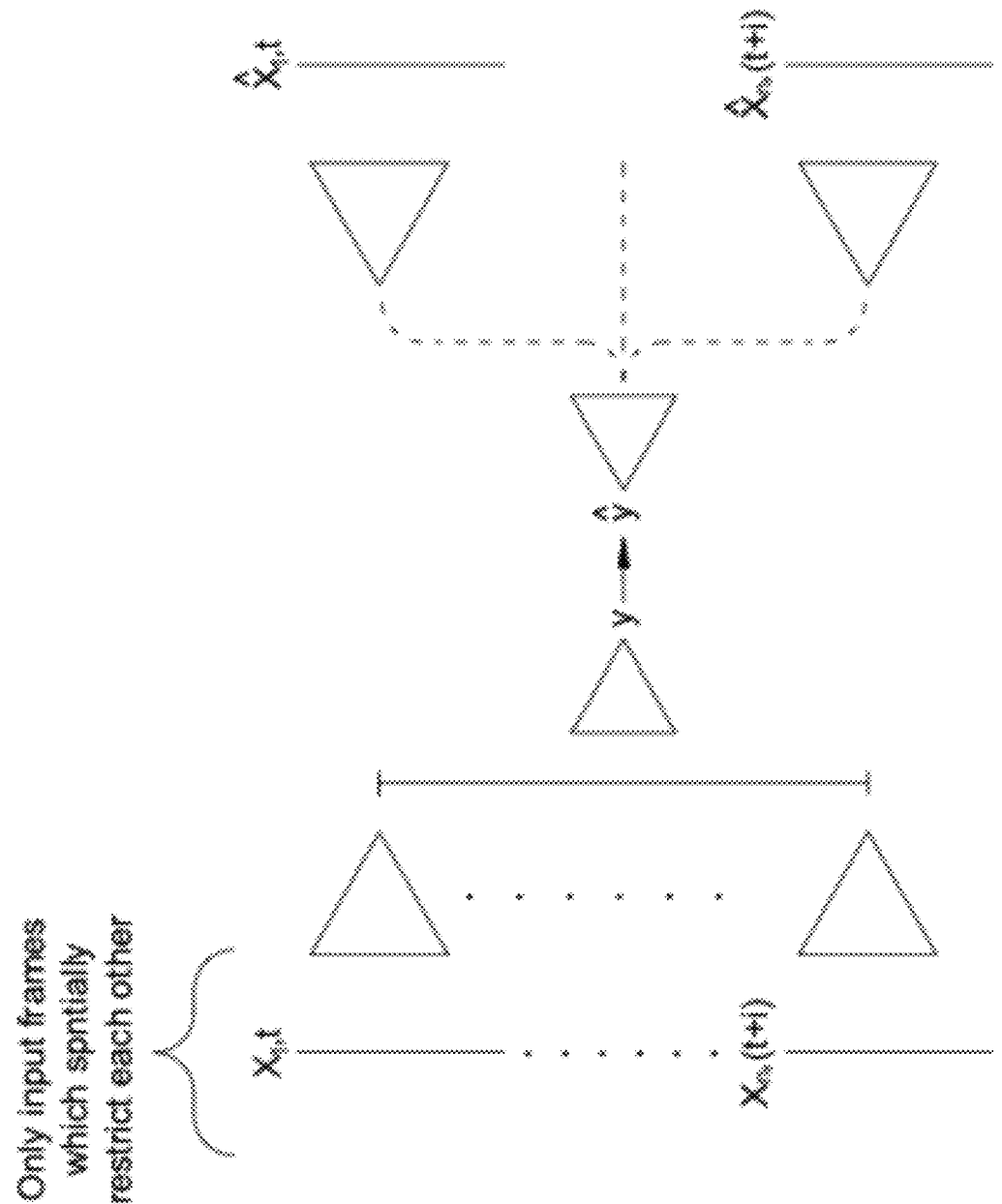
FIG. 52 shows an example including changing inputs to model spatial-temporal constraints.
Figure 53:
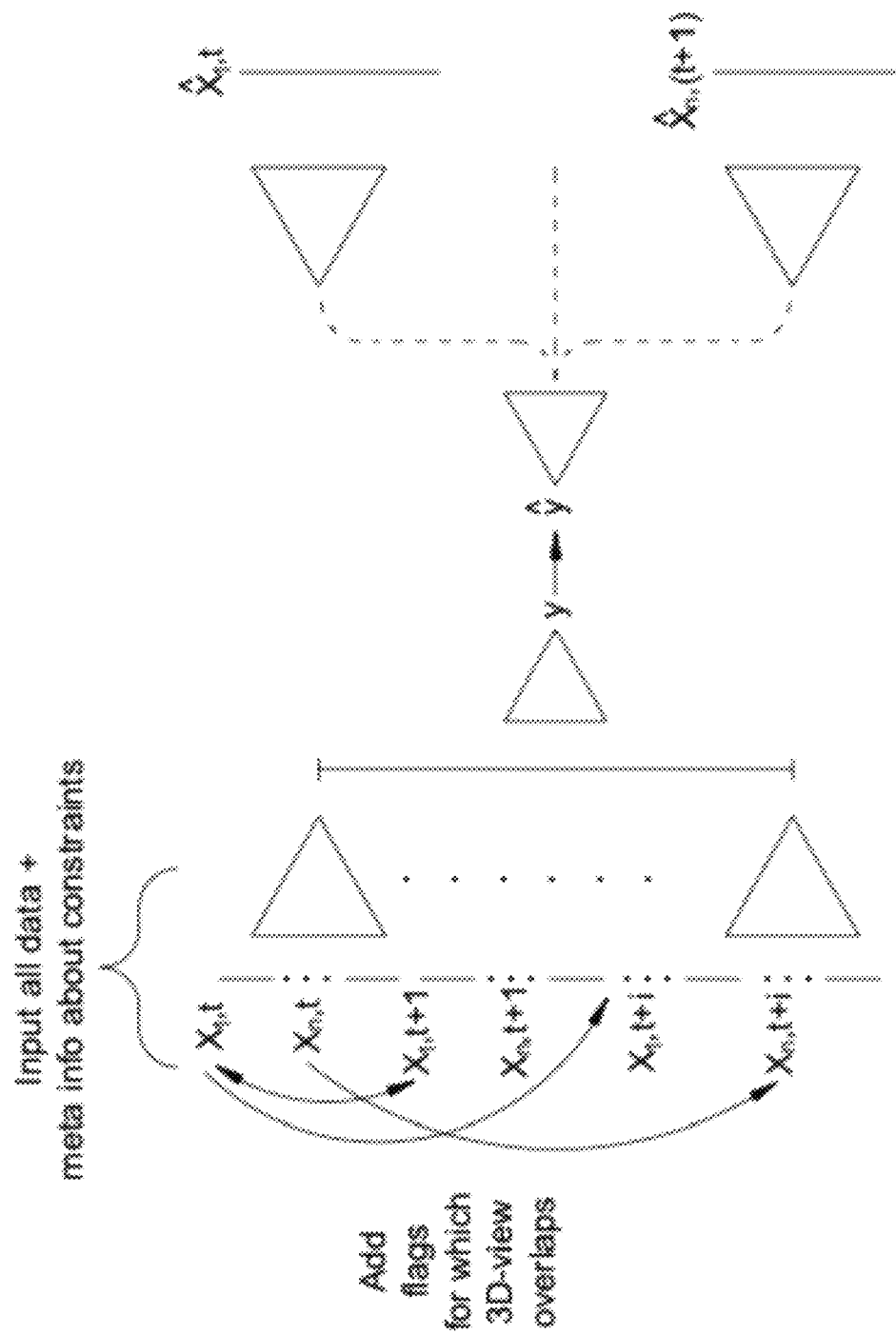
FIG. 53 shows an example including keeping inputs and model spatial-temporal constraints through meta-information on the input data.
Figure 54:
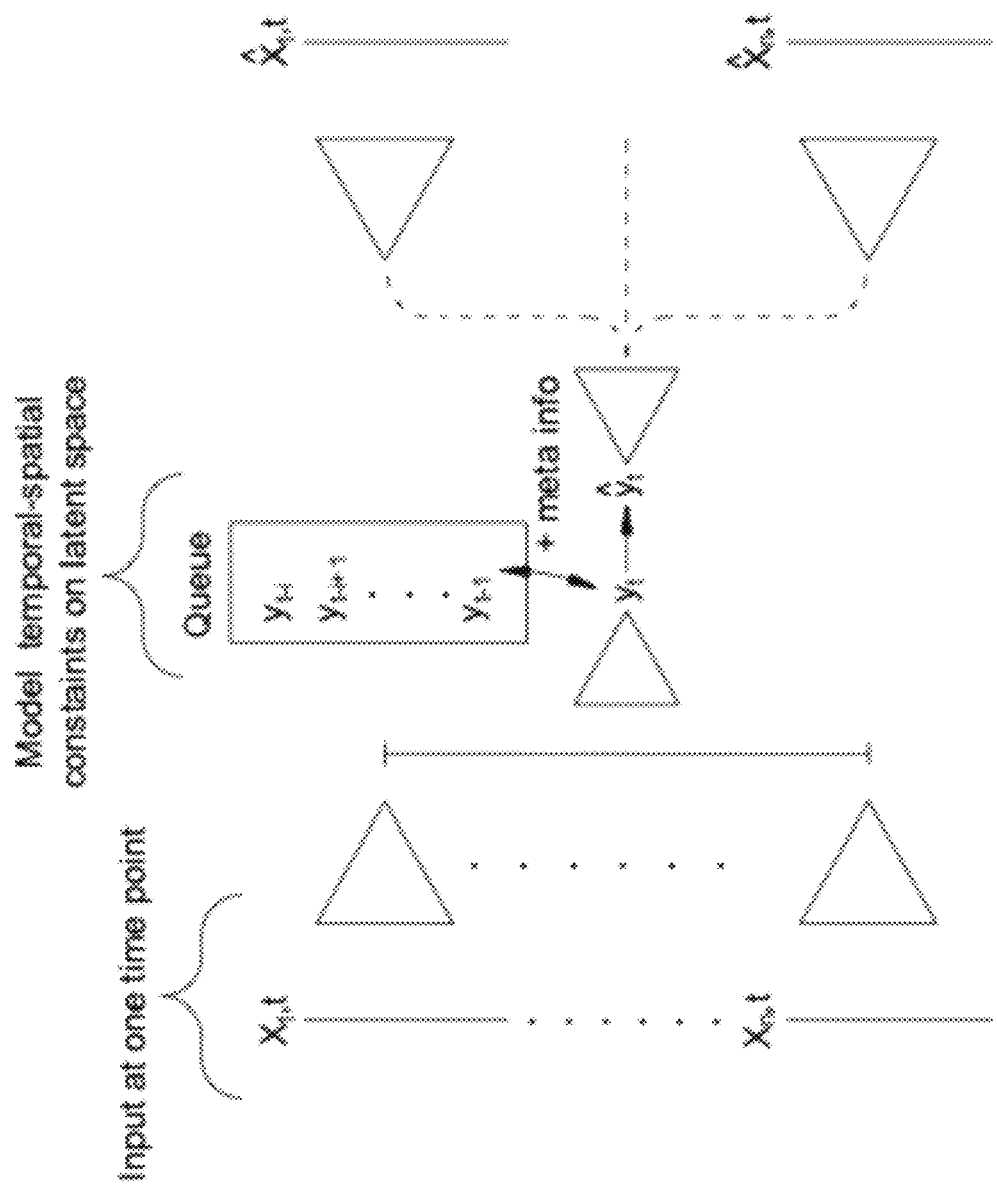
FIG. 54 shows an example including keeping inputs and model spatial-temporal constraints through meta-information on (previously) queued latent-space data.

If we know the approximate rate at which different temporal data leads to spatial constraints, we can use this prior as helpful information in the AI-based Compression pipeline. There are three ways to do so: First, we use $x_{1,t}$ and $x_{2,(t+i)}$ as input, if we know that the past frame at t from camera 1 spatially constraints the current frame at (t+i) from camera 2. Second, we include multiple spatial and temporal inputs and indicate video meta-information, which inputs tie to each other spatially. Finally, we can keep a queue of bottleneck-layers $\{\hat{y}_{1,t}, \ldots, \hat{y}_{n,t}; \hat{y}_{1,t+1}, \ldots, \hat{y}_{n,t+1}; \ldots; \hat{y}_{1,t+i}, \ldots, \hat{y}_{n,t+i}\}$ and model which inputs tie to each other spatially on the entropy-level. FIGS. 52, 53, 54 illustrate examples of these options.

Note that FIG. 53 is an example of a human-designed form of a restriction. Instead of using human-designed input data that the network can use, we could also provide additional data about the 3-D viewpoint and let the network figure out these restrictions by itself. We could provide multi-view depth maps (ground-truth or learned) and or optical flow data as additional input. Like the stereo case, the multi-view case will benefit from the auxiliary input data by better conditioning the probability model to its restricted input.

6.4 Satellite/Space Data Compression

Satellite image and video sensors usually capture more spectral bands than just the visual spectrum. Thus, instead of the standard format of a 3-channel image/video, we get n-channel image/video with each channel representing a particular band (different wavelengths).

This data type can be seen as a particular case of multi-view data. The viewpoints all overlap, but we get different information about the scene, like having various camera sensors with variable calibration data. Thus, all previously mentioned methods for stereo-data and multi-view data apply, too.

However, in addition to the previous cases, satellite data often comes with an objective which is not primarily scene quality but there are classification or segmentation questions. For instance: Atmosphere forecasting and monitoring, weather predictions, event classification, detection of geological or human events, agriculture monitoring, military purposes, and many others. This provides the opportunity to compress spectral data with a non-visual based loss term for distortion but an event-driven loss based on the exact question that we want to answer. Also, this is not limited to one auxiliary loss but can easily extend to n-auxiliary losses.

Suppose we have satellite data and want to monitor a forest's health and detect oil spills (dual objective). Instead of only having the visual quality as the distortion term, we can model the data-post processing methods' accuracy. Let's assume we have a spectral-image/video algorithm to detect oil spills $O(x)$ and an algorithm to monitor forest health $F(x)$ with some distortion metric $D(\cdot)$. Our satellite data compression objective for input data x with n-channels becomes:

$$\mathbb{E}_{x \sim p_x}\left[p_{\hat{y}|x} \| q_{\hat{y}|x}\right] \propto \mathbb{E}_{x \sim p_x}\left[\mathbb{E}_{y \sim p_y}\left[\underbrace{-\log(q_{x|y}(x_1 \mid y))}_{Image/Video\,Quality\,Distortion} \underbrace{-\log(q_y(y))}_{Rate} + \underbrace{D\big(O(x), O(\hat{x})\big) + D(F(x), F(\hat{x}))}_{Post\text{-}Processing\,Losses}\right]\right]$$

Figure 55:
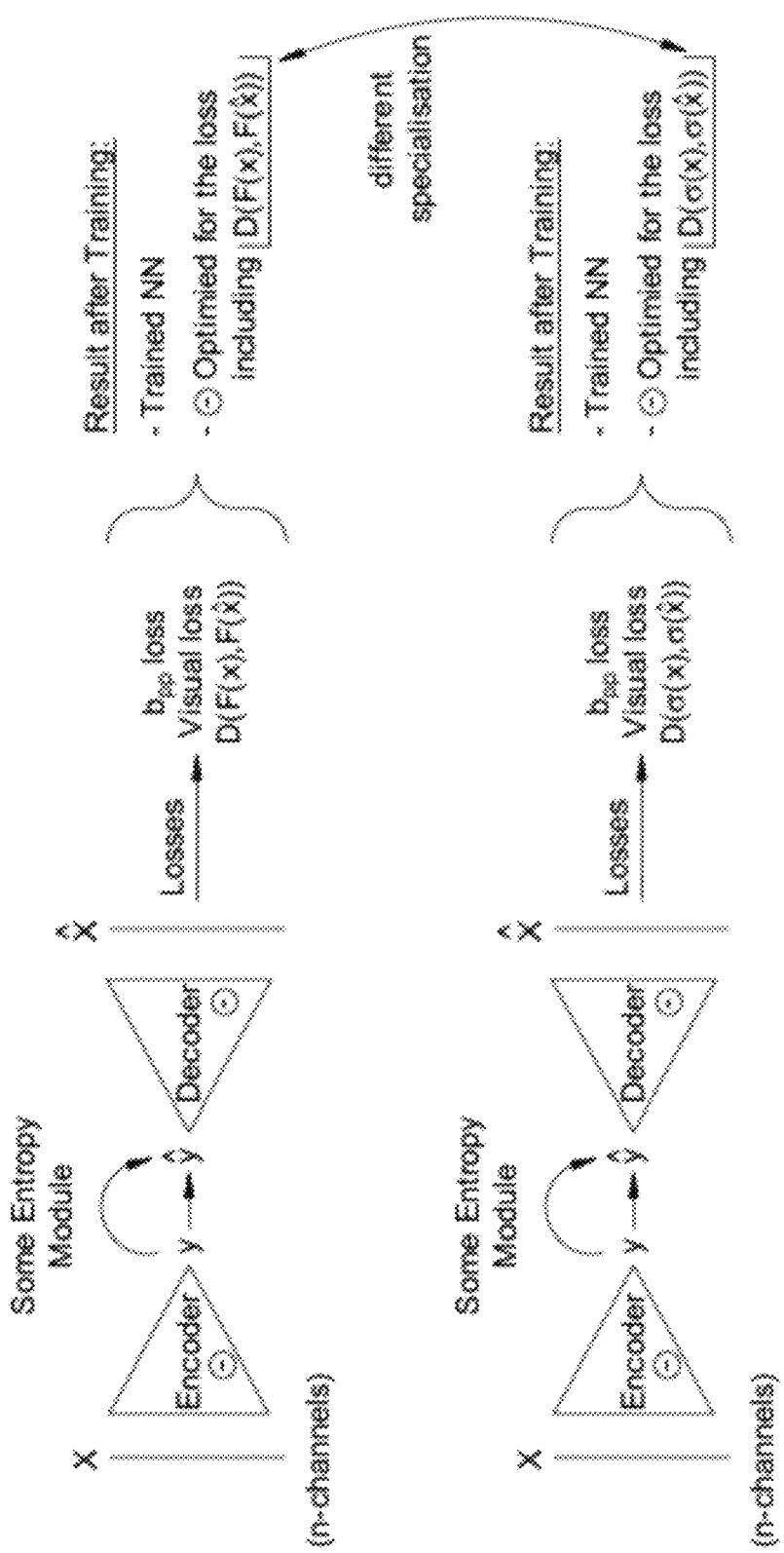
FIG. 55 shows an example including specialising a codec on specific objectives. This implies changing Theta after re-training.

Using this approach in combination with AI-based Compression, we can quickly and cheaply design numerous neural networks specialised in compressing Satellite data with given objectives. Even better, we can switch between different approaches easily. Let's assume we have a compression codec trained on forest-data monitoring, but after a week, we want to reprogram our Satellite for oil spill monitoring. In AI-based Compression, having a codec specialised means having the network trained on specific loss-terms and using the trained network parameters Θ for inference. If we want to change our objective, we have to re-train another network, get another Θ optimised for our new goal, and replace the neural network weights. This can all be done in software, with no hardware replacements and can be seen as "streaming a codec"—an invaluable property of AI-based Compression. FIG. 55 illustrates an example of these methods.

6.5 Medical Data Compression

Compression with medical data follows the same guidelines as mentioned in the Satellite/Space data section. Often, we have special image and video data (Saitellite==multi-band data; Medical: health-care scans), which will be the input for post-processing algorithms. Thus, we require training over a particular input data training set, and the compression objective needs to be updated (→new θ).

The auxiliary loss terms can be, amongst others, related to:

Computer-aided detection/diagnosis (e.g., for lung cancer, breast cancer, colon cancer, liver cancer, acute disease, chronic disease, osteoporosis)

Machine learning post-processing (e.g., with support vector machines, statistical methods, manifold-space-based methods, artificial neural networks) applications to medical images with 2D, 3D and 4D data.

Multi-modality fusion (e.g., PET/CT, projection X-ray/CT, X-ray/ultrasound)

Medical image analysis (e.g., pattern recognition, classification, segmentation) of lesions, lesion stage, organs, anatomy, status of disease and medical data Image reconstruction (e.g., expectation maximization (EM) algorithm, statistical methods) for medical images (e.g., CT, PET, MRI, X-ray)

Biological image analysis (e.g., biological response monitoring, biomarker tracking/detection)

Image fusion of multiple modalities, multiple phases and multiple angles

Image retrieval (e.g., lesion similarity, context-based)

Gene data analysis (e.g., genotype/phenotype classification/identification)

Molecular/pathologic image analysis

Dynamic, functional, physiologic, and anatomic imaging.

6.6 Concepts

1. Using AI-based Compression for Stereo Data (Stereo Images or Stereo Video).
2. Using AI-based Compression for VR/AR-Data and VR/AR-applications.
3. Using 3D-scene consistency loss objectives for stereo data compression.
4. Using flow-based consistency loss objectives for stereo data compression.
5. Using camera/sensor data as additional input data for AI-based compression.
6. Using AI-based Compression for multi-data compression using its joint probability density interpretation.
7. Using AI-based Compression for Multi-View Data (multi-view images or Video).
8. Using multi-view scene constraints as an additional loss term within AI-based Compression.
9. Using temporal-spatial constraints in AI-based Compression via additional meta-information at the input or the bottleneck stage.
10. Using AI-based Compression for Satellite and Space image/video compression.
11. Using AI-based compression for stereo/multi-view on Satellite/Space data.
12. The application of "streaming a codec". E.g. upstreaming NN-weights for quickly changing compression algorithm specialisation using AI-based Compression.
13. Using AI-based Compression for Medical Image/video compression.
14. Using medical auxiliary losses for post-processing objective-detection.

15. Using AI-based compression on Medical data.

7. Invertible Neural Networks for Image and Video Compression

7.1 Introduction

Learnt image and video compression is based on neural networks which are non-invertible transformations. We provide multiple ways of integrating the standard learnt pipeline with Invertible Neural Networks (INNs), also known as Normalising Flows, which are bijective mappings that can be used to transform a random variable to an alternative representation and back. The bijective ability of INNs allows us greater flexibility in enforcing a prior distribution on the latent space, in addition to providing a point of contact between adversarial and Maximum Likelihood Estimation (MLE) training.

7.1.1 Change of Variable and Normalising Flows

Let us consider a random variable $y \in \mathbb{R}^N$. We can transform this variable using a mapping $f: \mathbb{R}^N \to \mathbb{R}^N$ (it is important that the input space has the same dimensionality as the output space). The probability distribution of the output variable z can then be calculated in terms of the probability distribution on the input variable y, as shown below:

$$p(z) = p(y) \left| \det\left(\frac{df^{-1}}{dy}\right) \right|^{-1} \quad (7.1)$$

This formula has two requirements:

The determinant of the Jacobian matrix of the transformation $$\left(i.e. \ \frac{df}{dz}\right)$$

must be defined, in other words the Jacobian matrix has to be square. This has important implications because it means that the normalising flow can't change the dimensionality of the input.

The determinant has to be nonzero, otherwise its inverse in the equation is undefined.

In order to satisfy both of these conditions, and thus to be able to calculate the probability distribution of z in terms of the probability distribution of y, the transformation $f$ needs to be invertible, hence the need for an invertible neural network (although in order to be defined as a normalising flow, the transformation is not required to contain a neural network).

Why do we want to define the output distribution in terms of the input distribution?

Because our objective is to map a complex distribution (such as the distribution of the latent space of our autoencoder when there is no entropy model enforced) to a simple distribution (such as a normal or laplacian prior), so that we can enforce an entropy model on z while retaining the spatial information in y that improves reconstruction quality.

In addition to the hard requirements listed above, there is one more "soft" requirement, that is, the determinant of the Jacobian matrix has to be easy to compute. This is not the case for any matrix, so the calculation can become expensive when the Jacobian matrix has a high rank, especially if we chain multiple transformations together in a normalising flow (a feat that is quite common to increase representational power).

How can we make the determinant of the Jacobian easy to compute?

If the square matrix is upper- or lower-triangular, i.e. it has non-zero elements as shown, for example, in FIG. 56 which shows an example including an upper triangular matrix form U and lower triangular matrix form L. Then the determinant is simply the product of the elements on the diagonal.

7.1.2 how to Make Jacobian Matrix Triangular

We remind the reader that the Jacobian matrix of a mapping $f: \mathbb{R}^N \to \mathbb{R}^N$ has the form shown in FIG. 57.

I.e. it is an N×N matrix for an input x containing elements $\{x_1, x_2, \ldots x_N\}$ and an output containing elements $\{f_1, f_2, \ldots f_N\}$.

For simplicity, we will describe only the process by which to make this matrix lower triangular, because making it upper triangular consists in a very similar process.

We introduce the concept of a coupling transformation that splits the input x into two partitions $x_a$ and $x_b$. The output of the coupling transformation is then:

$$z_a = x_a$$

$$z_b = g(x_b, m(x_a)) \quad (7.2)$$

Where g and m are arbitrary functions.

In an additive coupling transformation, we define g as the arithmetic addition, and m as a neural network. This results in the below transformation:

$$z_a = x_a$$

$$z_b = m(x_a) + x_b \quad (7.3)$$

This transformation is both trivial to invert, and has a triangular Jacobian.

If we want to retrieve x from z, we only need to apply the following operations:

$$x_a = z_a$$

$$x_b = -m(z_a) + z_b \quad (7.4)$$

It is important to note that the neural network transformation needs not be inverted. This greatly simplifies the process, as standard neural network architectures are hard to invert.

Additionally, the form of the Jacobian is shown below:

$$J = \begin{bmatrix} I & 0 \\ \frac{\partial f}{\partial x_o} & I \end{bmatrix} \quad (7.5)$$

Not only this Jacobian is lower triangular, but its diagonal entries are all 1. Hence, the determinant of the Jacobian is 1, meaning that the computational cost of calculating it is O(1) for any kind of additive coupling.

It should be noted that additive coupling is not the only invertible transformation: there are such things as multiplicative or affine coupling layers, where the mapping g is the element-wise multiplication operation, and the joint multiplication and addition operation respectively.

7.1.3 Volume-Preserving Vs Non-Volume-Preserving Transformations

The additive coupling transformation is said to be a volume-preserving transformation. This stems from the fact that the determinant is 1. Volume-preserving (VP) transformations generally have lower transformational power than non-volume-preserving (NVP) ones, since the formers are prevented from making some eigenvalues bigger and others smaller, resulting in more variation with respect to some input elements than others.

Multiplicative and affine coupling transformations are non-volume preserving. Let us consider an affine coupling:

$$z_a = x_a$$

$$z_b = x_b \odot s(x_a) + m(x_a) \quad (7.6)$$

Where s is another arbitrary transformation that in practice is defined as a neural network. The Jacobian of an affine layer is below:

$$J = \begin{bmatrix} I & 0 \\ \frac{\partial f}{\partial x_a} & \text{diag}(s(x_a)) \end{bmatrix} \quad (7.7)$$

Now, since the diagonal entries of this Jacobian are not all ones, the determinant of the matrix is not 1 anymore, instead being the product of the diagonal elements of the scaling transformation s.

7.1.4 Squeeze Layers and Factor-Out Layers

Here we describe two additional operations that we use in our normalising flows.

The first operation is the squeeze layer. Although we previously stated that the dimensionality of the input of a normalising flow cannot be different from the dimensionality of the output, we can change the spatial resolution and the number of channels of the feature maps, provided that the total number of elements is unchanged. The change in dimensions is actuated with a squeeze layer that changes the dimensionality of the input tensor $R^{H \times W \times C}$ into $R^{H/2 \times W/2 \times 4C}$. This allows the convolutional layers in the neural networks inside the coupling transformations to operate on different scales at different stages in the normalising flow.

The squeezing operation reallocates pixels from the spatial dimensions into different channels using a checkerboard pattern. FIG. 58 shows an example of a diagram of squeezing operation. Input feature map on left, output on right. Note, the output has a quarter of the spatial resolution, but double the number of channels.

The checkerboard pattern ensures that pixels that are spatially close are allocated to pixels in different channels that have the same spatial location. This mitigates the distortion of spatial information, which is important for the convolutional layers.

The second operation we describe is the factor-out layer. The factor-out operation splits the feature map in two parts along the channel dimension (although it can also split the feature map in the spatial dimensions). Then, one part is passed as the input to the next normalising flow block, while the other part is passed directly to the final output of the pipeline.

This has two implications: firstly it reduces the computation that needs to be done, which can add up to a great amount given that normalising flows must maintain the dimensionality of the input; and secondly, the loss function is distributed through the whole network, so gradients are directly passed from the loss to all blocks of the chain instead of the last block only.

Finally, there is a trick that we can use to circumvent the limitation of not being able to change dimensionality: if we need to increase the dimensionality of the input, we can pad it with zero values, thus increasing the dimensionality from $H \times W \times C$ to $H \times W \times C + D$. The normalising flow will then produce as output of the same dimensionality as the padded input, that is $H \times W \times C + D$: note that this is larger than the actual input size of $H \times W \times C$. We just showed this trick in the channel dimension, but we can just as easily apply it in the spatial dimension as well.

7.1.5 FlowGAN

As the name suggests, FlowGAN is a generative model obtained by combining a normalising flow and a GAN setup.

In a GAN setup there is a generator and a discriminator network. The input to the generator z is sampled from a prior distribution and the generator network transforms it to the underlying distribution of the training data, i.e. if the training data is natural images the generator learns a mapping from P(z) to the distribution of pixel colours in natural images, that we define as P(G(z)).

The discriminator network is a classifier trained on both the generated images and the real training images: its aim is to differentiate between the training images and the images generated by the generator. Intuitively, when the discriminator is unable to properly classify the two classes of images, then the generator is outputting realistic images that look like the training images.

This adversarial training strategy presents a problem: the losses of the two networks have poor interpretability. For example, there is no correlation between the loss of the generator and how realistic the generated images look, often requiring the addition of visual quality scores to estimate it. This poor interpretability stems from the absence of an explicit likelihood function in the density model, which in the case of GANs is implicit (it has no clearly-defined density model for the generated data y). Unfortunately, it is impossible to obtain an explicit model of P(G(z)), because its density can't be defined in terms of P(z).

Figure 59:
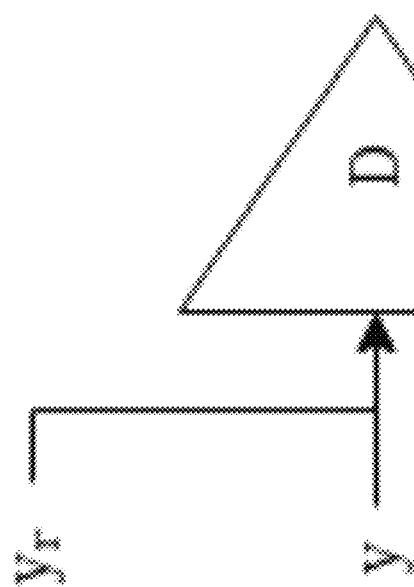
FIG. 59 shows an example FlowGAN diagram.

FlowGAN solves this problem by using a normalising flow as the generator network. An example structure is illustrated in FIG. 59.

Such a setup allows to train the generator in two ways: either with adversarial training, against the discriminator network; or directly with Maximum Likelihood Estimation, using the change of variable formula in Equation (7.1).

Given discriminator losses $h_\phi$ (on the training images) and $h'_\phi$ (on the images created by the generator), the complete training objective of FlowGAN is below:

$$L = \min_\theta \max_\phi \mathbb{E}_{y \sim P_\theta}[h_\phi(y)] - \mathbb{E}_{y \sim P_{data}}[h'_\phi(y)] - \lambda \mathbb{E}_{y \sim P_{data}}[\log p_\theta(y)] \quad (7.8)$$

The first two terms in the equation above are the adversarial terms for "real" and "fake" images, that need to be maximised with respect to the discriminator weights $\phi$ and minimised w.r.t. the generator weights $\theta$ (we remind the reader that the generator needs to fool the discriminator into classifying the fake images as real). The third term is the likelihood of the training data, which is normally intractable in an adversarial setup; however, since the generator is an INN, we can express p(y) in terms of p(z) which has a tractable analytical distribution, so the likelihood is tractable in FlowGAN. The scaler $\lambda$ determines whether training is joint adversarial and MLE, or only adversarial (in the case where $\lambda$ is zero).

7.2 Innovation

7.2.1 Replacing Encoder and Decoder Transformations with INN

In this subsection we describe the substitution of both the encoder and decoder networks with a single INN. The types of normalising flow layers we use include (but are not limited to):

- additive coupling layers;
- multiplicative coupling layers;
- affine coupling layers;
- invertible 1×1 convolution layers.

Figure 60:
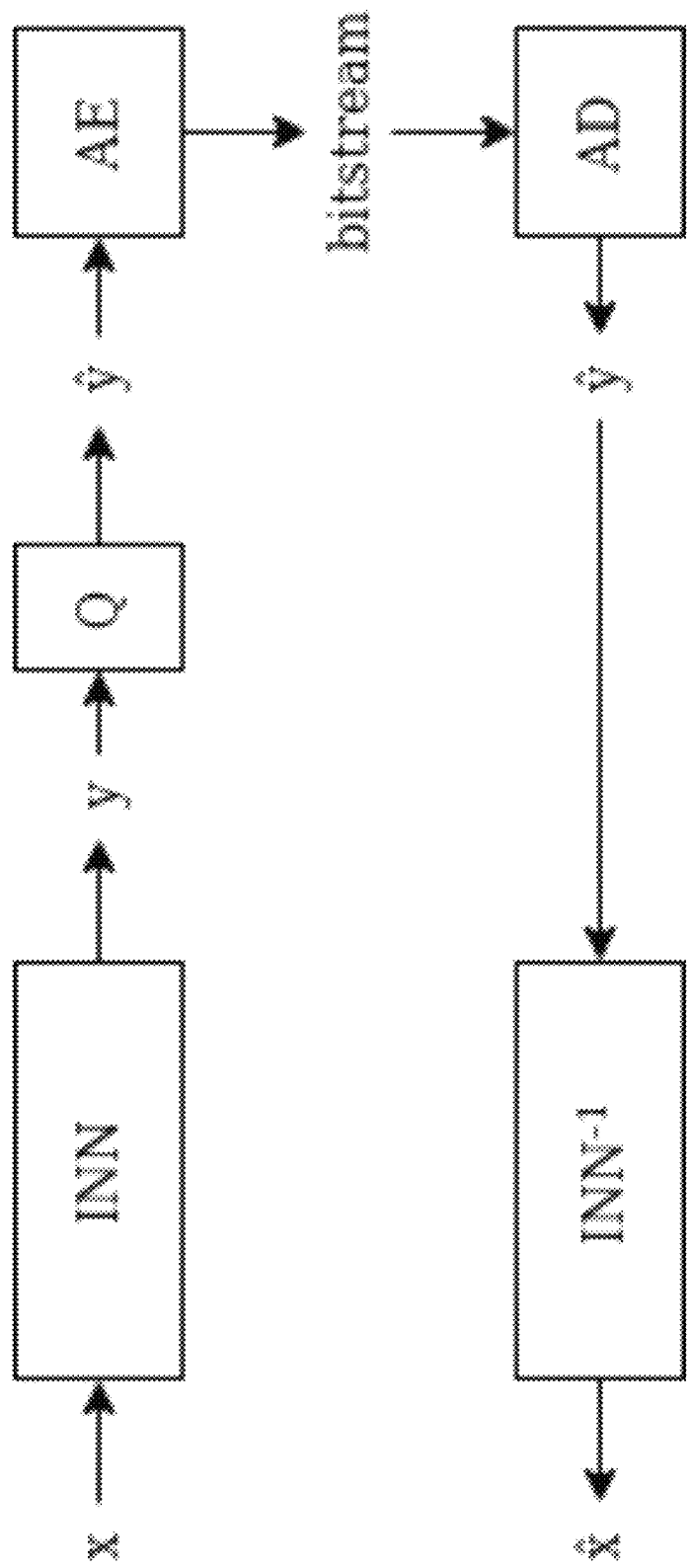
FIG. 60 shows an example compression and decompression pipeline of an image x using a single INN (drawn twice for visualisation purposes). Q is quantisation operation, AE and AD are arithmetic encoder and decoder respectively. Entropy models and hyperpriors are not pictured here for the sake of simplicity.

FIG. 60 shows an example of a compression and decompression pipeline of an image x using a single INN (drawn twice for visualisation purposes), where Q is quantisation operation and AE and AD are arithmetic encoder and decoder, respectively. Entropy models and hyperpriors are not pictured here for the sake of simplicity.

Using an INN instead of two networks results in an overall smaller size on computer disk which translates to faster transfer of the compression pipeline over communication networks, facilitating the transfer of fine-tuned codecs for specific sets of images or videos on-the-fly.

This pipeline is valid with a continuous flow, but it can be used with discrete flows as well with a small modification. In the case where a continuous flow is used, the quantisation operation is necessary in order to obtain a quantised latent space that can then be arithmetic coded.

Figure 61:
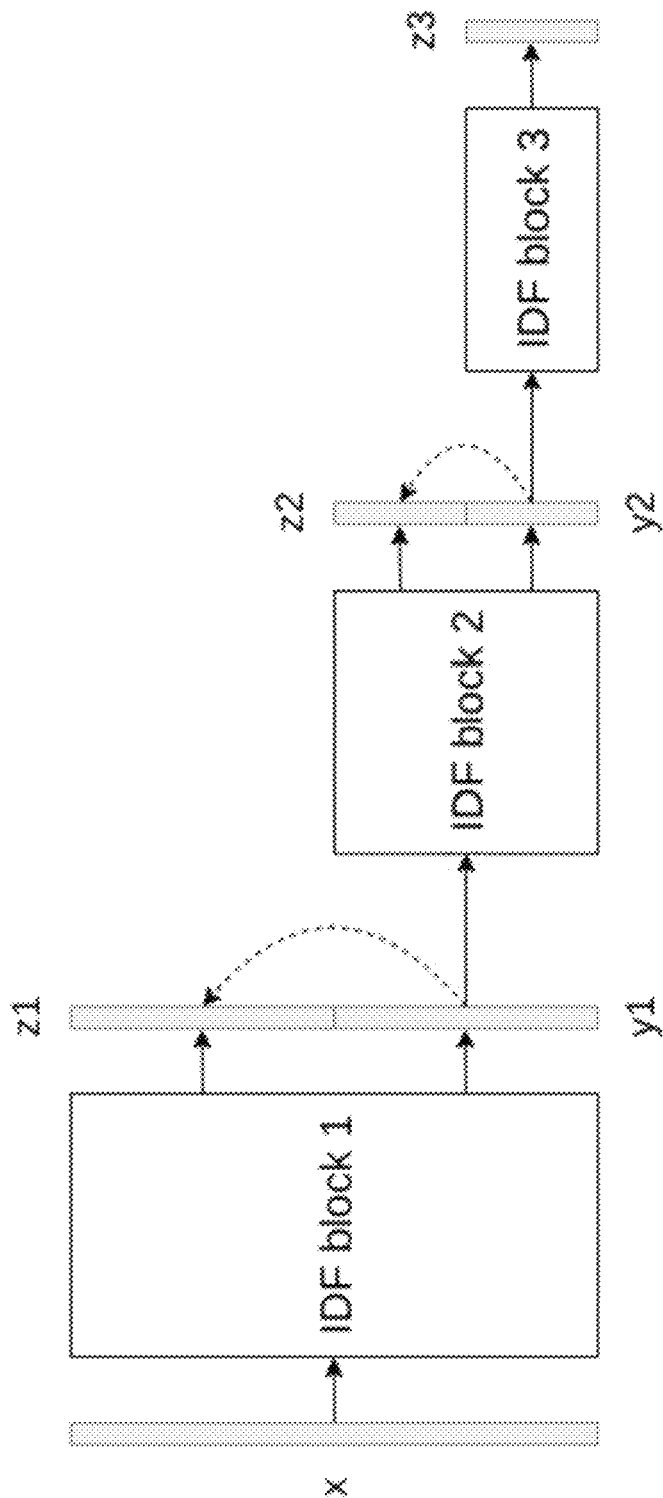
FIG. 61 shows an example architecture of Integer Discrete Flow transforming input x into z, split in $z_1$, $z_2$ and $z_3$.
Figure 62:
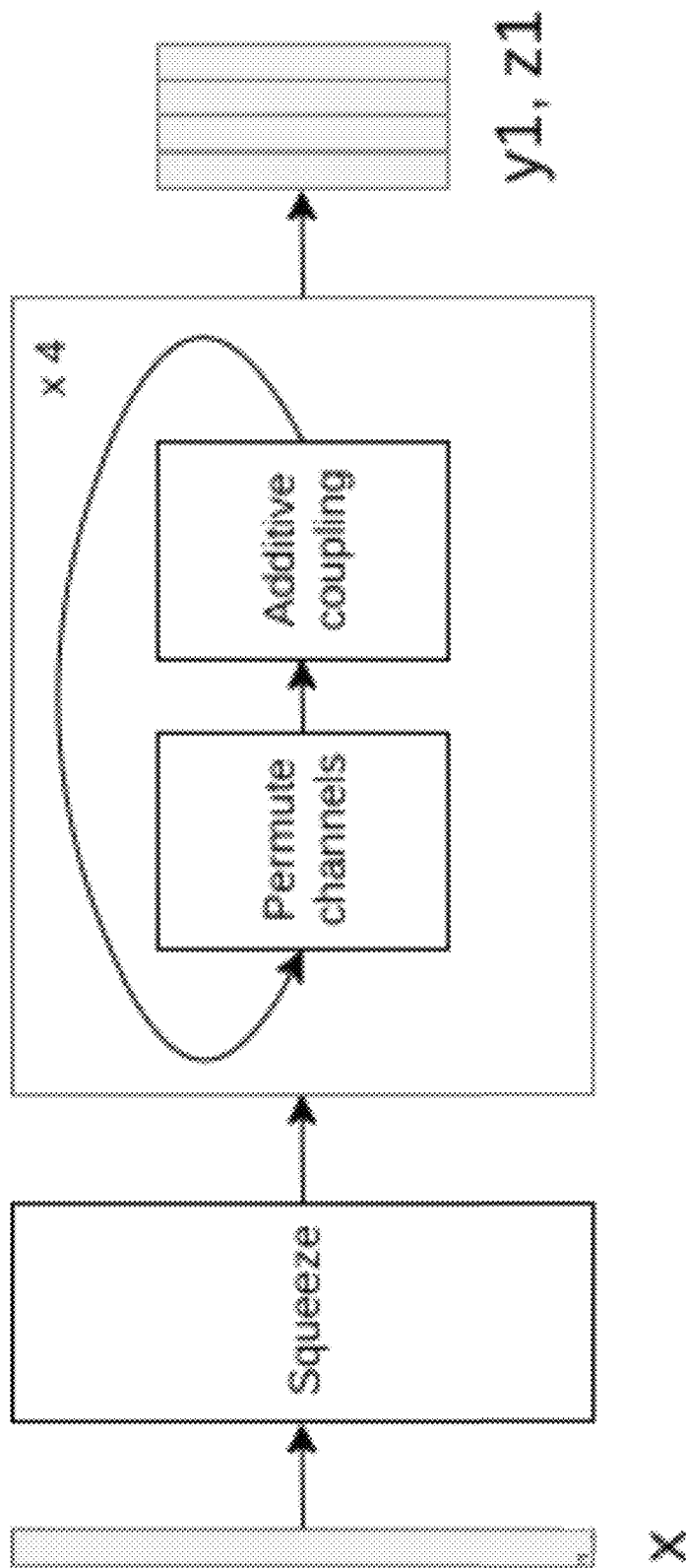
FIG. 62 shows an example architecture of a single IDF block. It contains the operations and layers described in the Introduction section 7.1, except for Permute channels, which randomly shuffles the order of the channels in the feature map. This is done to improve the transformational power of the network by processing different random channels in each block.

Now let us consider the case where a discrete flow is used. Discrete flows have a similar structure to continuous flows. For reference, we illustrate the architecture of the Integer Discrete Flow in FIGS. 61 and 62, by way of example.

The peculiarity of a discrete normalising flow is in its coupling layers, where a quantisation operation is included (see below).

$$x_a = z_a \qquad (7.9)$$

$$x_b = \lfloor -m(z_a) \rfloor + z_b$$

Assuming a discrete input x, the output z will also be discrete, since the only possible source of non-discretised output is the neural network transformation m, and that is explicitly quantised in the coupling layer above. Thus, the quantisation operation described in the pipeline illustrated in FIG. 60 for example becomes unnecessary.

We also remind the reader that images are stored on computer disk using integer values, so they are already quantised before processing. This changes the compression pipeline from lossy to lossless, as the latent space can be arithmetic coded as it is, because it is already discrete when it is output by the integer normalising flow.

Figure 63:
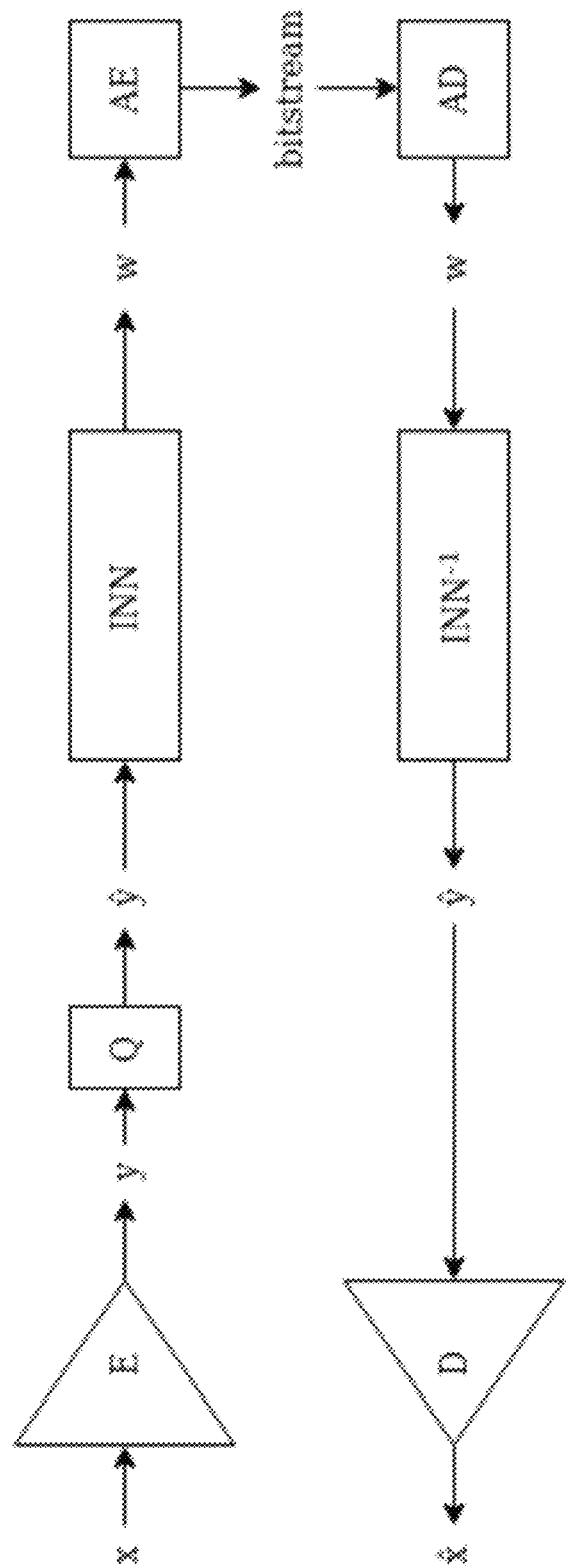
FIG. 63 shows an example compression pipeline with an INN acting as an additional compression step, similarly to a hyperprior. We introduce an additional variable w and apply the entropy model on this variable instead of the latent space $\hat{y}$.

7.2.2 Integrating the HP with an INN to Map y to z where Entropy is Computed Over z In addition to the pipelines described in the previous subsection, we provide the addition of a normalising flow to the encoder-decoder pipeline to help model the prior distribution. In particular, we provide the substitution of the hyperprior network with a normalising flow. The additional variable w decouples y from the entropy model, resulting in better reconstruction fidelity. Additionally, the encoder and decoder downsample the input, acting as a preprocessing step that is complementary to the INN transformation that is unable to down- or up-sample. We highlight the necessity of a discrete normalising flow in this pipeline, since the input y is already quantised, and w is also required to be discrete since it is directly fed to the arithmetic coder. An example is shown in FIG. 63.

7.2.3 Adding Hyperpriors to the Blocks of a Normalising Flow

In this subsection we describe a modification we make to normalising flows using hyperprior networks. This modification has wide applications, being virtually useful for any application of normalising flows in image compression. The advantage they provide is a further reduction in bitstream size, due to the application of a hyperprior network at each factor-out layer inside a normalising flow.

Figure 64:
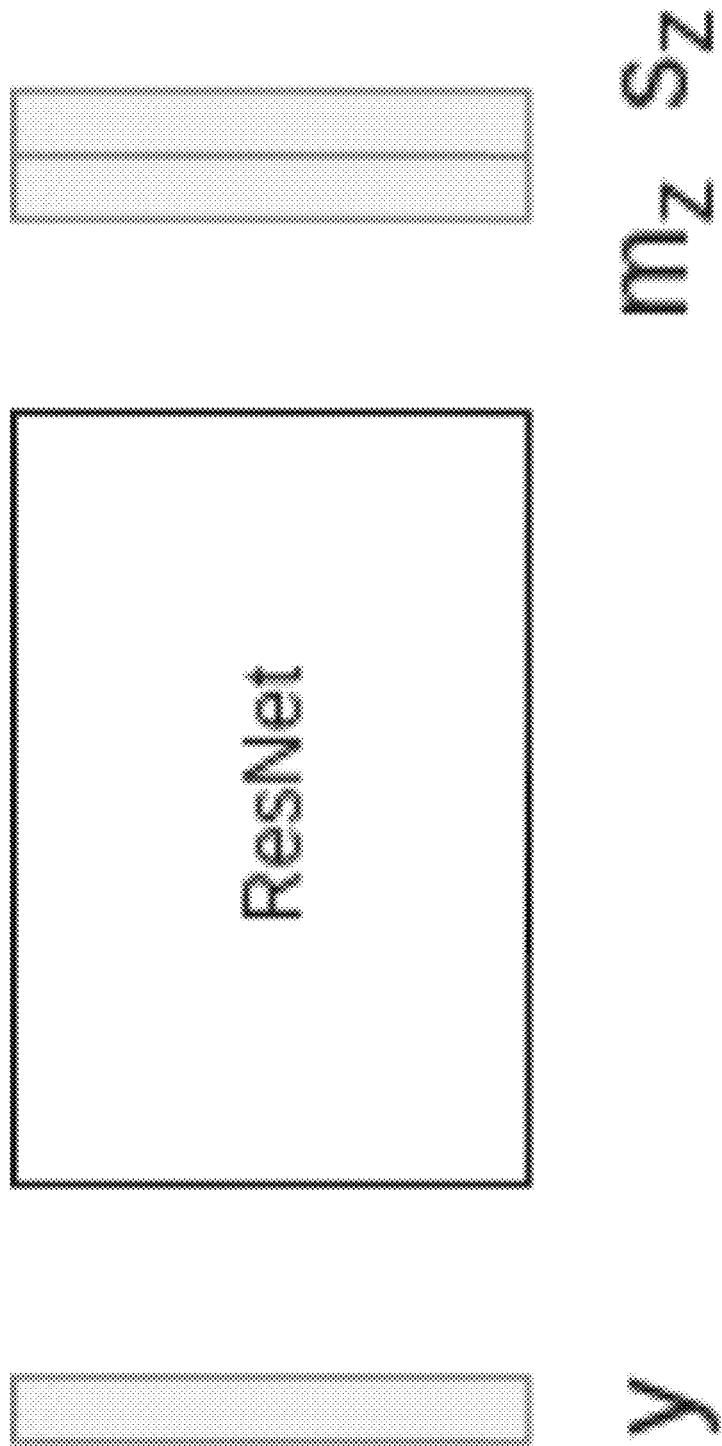
FIG. 64 shows an example in which partial output y of factor-out layer is fed to a neural network, that is used to predict the parameters of the prior distribution that models the output.

Normally, the factor-out layers of a normalising flow are connected to a parameterisation of the prior distribution modelled with a neural network. FIG. 64 shows an example in which partial output y of factor-out layer fed to a neural network, that is used to predict the parameters of the prior distribution that models the output.

Figure 65:
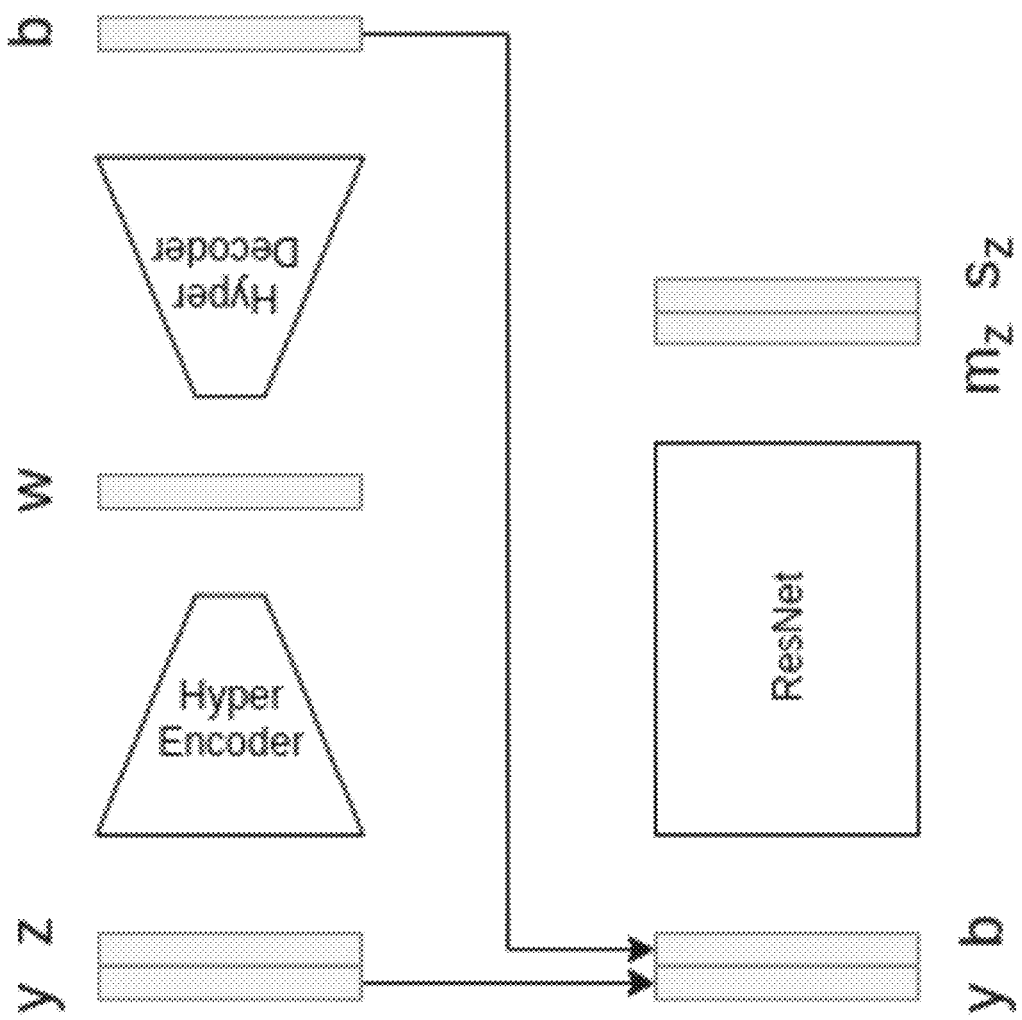
FIG. 65 shows an example in which output of factor-out layer, is processed by a hyperprior and then is passed to the parameterisation network.

In this integration, illustrated for example in FIG. 65, we modify this block to include a hyperprior model. The figure shows an example in which output of factor-out layer is processed by a hyperprior and then is passed to the parameterisation network.

Both the outputs of a factor-out layer (y and z) are fed to a hyperprior autoencoder that outputs a feature map b. This feature map is then concatenated to y and fed to the parameter estimation model. By compressing y and z into w and sending this latent as side-information, we further improve the compression ability of the pipeline.

7.2.4 Using INN to Model p(X) and p(N) for Mutual Information

Mutual information (MI) between X and Y is defined as follows:

$$I(X;Y) = \mathbb{E}_{p(x,y)}\left[\log\frac{p(x|y)}{p(x)}\right] = \mathbb{E}_{p(x,y)}\left[\log\frac{p(y|x)}{p(y)}\right] \qquad (7.10)$$

We model p(y) and p(y|x) using INNs. This gives us approximations to these values, which we can use to compute the I(X; Y). By being able evaluate I(X; Y), we are able to maximize the mutual information between X and Y. A use case for this method is further described in our Mutual information section, Section 8.

FIG. 66 shows an example illustration of MI, where p(y) and p(y|x) is computed using INN transformations. Here [x, y] represents a depth concatenation of the inputs.

7.2.5 Using INN Wherever we are Required to Model a Complex Density in Our Pipeline In this subsection we introduce a form of meta-compression that sends model weights along with image data. Sending model-specific information enables a more flexible compression scheme, where the coding system is tuned to the compressed image.

The neural weights of the network need to be compressed in order to be sent as bitstream, in a similar way to how the latent space of the autoencoder is compressed. This requires two things:

1. Model the entropy of the weights;
2. Quantise the representation.

Figure 67:
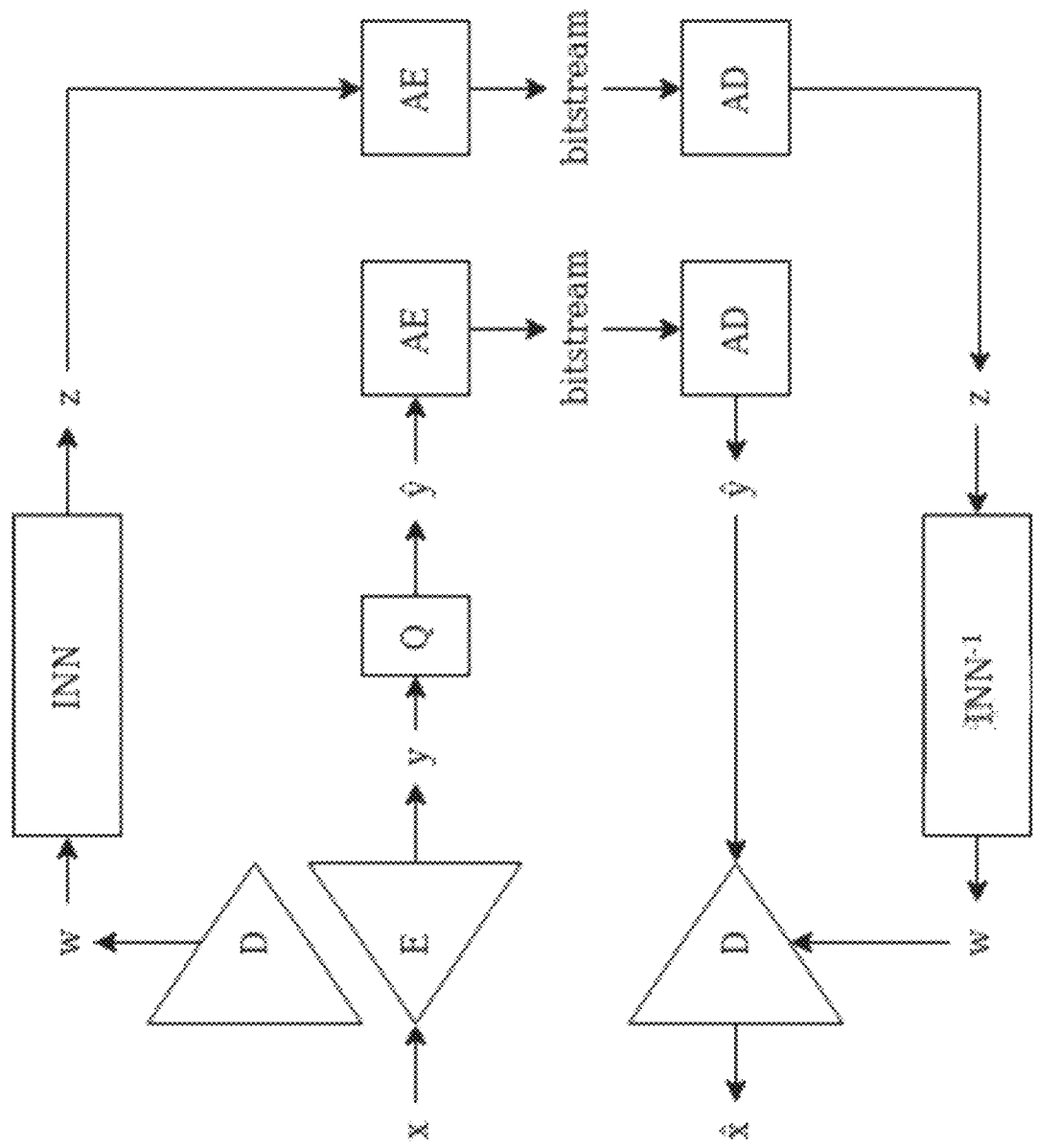
FIG. 67 shows an example compression pipeline that sends meta-information in the form of the decoder weights. The decoder weights w are retrieved from the decoder at encode-time, then they are processed by an INN to an alternate representation z with an entropy model on it. This is then sent as part of the bitstream.

Generally, the distribution of the weights of a neural network can be very complex. Hence, this is a suitable application for normalising flows; not only that, we can quantise the weights readily with minimal loss of performance by taking advantage of Quantisation Aware Training (QAT), a standard feature of deep learning frameworks such as PyTorch and TensorFlow. After quantisation, we pass the weights of the neural network to an INN, that returns a processed representation of the weights following the prior distribution, and then we can encode this representation with an arithmetic encoder. The decoding process comprises using an arithmetic decoder to retrieve the processed weights, and then undo the transformation by passing them to the inverse of the normalising flow. An example illustration of such a pipeline is shown in FIG. 67.

7.3 Concepts

Below we enumerate the concepts which relate to the present section.
1. The use of FlowGAN, that is an INN-based decoder with a traditional neural encoder, for image and video compression;
2. The substitution of the encoder-decoder construct in media compression with a continuous normalising flow, which reduces the total size of the codec by reusing parameters;
3. A variation of concept 2 where a discrete flow is used instead, resulting in a lossless compression pipeline;
4. Integrating the hyperprior network of a compression pipeline with a normalising flow;
5. A modification to the architecture of normalising flows that introduces hyperprior networks in each factor-out block;
6. INN for mutual information;
7. A meta-compression strategy where the decoder weights are compressed with a normalising flow and sent along within the bitstream.

8. Mutual Information for Efficient Learnt Image & Video Compression

8.1 Introduction

In the field of learnt image and video compression, an aim is to produce the most efficient encoding of an image, meaning that there are no redundancies that are not required by the decoder to re-produce an accurate compressed output. Another way this can be viewed is the requirement that the encoder must discard redundant information; this is implicitly happening, however a way to further improve compression efficiency is to explicitly model the inherent dependency between the input and output, known as mutual information. Here mutual information for learnt compression is discussed and novel methods of training compression pipelines with this metric are given.

Mutual information is a quite esoteric yet fundamental property that is useful to represent relationships between random variables. It cannot be well understood without a background in statistics and probability theory. For two random variables the mutual information $I(X; Y)$ may be most intuitively expressed in terms of entropies H:

$$I(X;Y)=H(X)-H(X|Y) \qquad (8.1)$$

This means that the mutual information between X and Y is equal to the reduction in the uncertainty (or entropy) of X (H(X)) reduced by how much we know about X if we are given Y (H(X|Y)). H(X|Y) is a measure of what Y does not tell us about X, i.e. the amount of uncertainty that remains about X after Y is known. The equation above can thus be reformulated in terms of text as follows:

The amount of uncertainty in X, minus the amount of uncertainty in X that remains after Y is known, which is equivalent to the amount of uncertainty in X that is removed by knowing Y.

Figure 68:
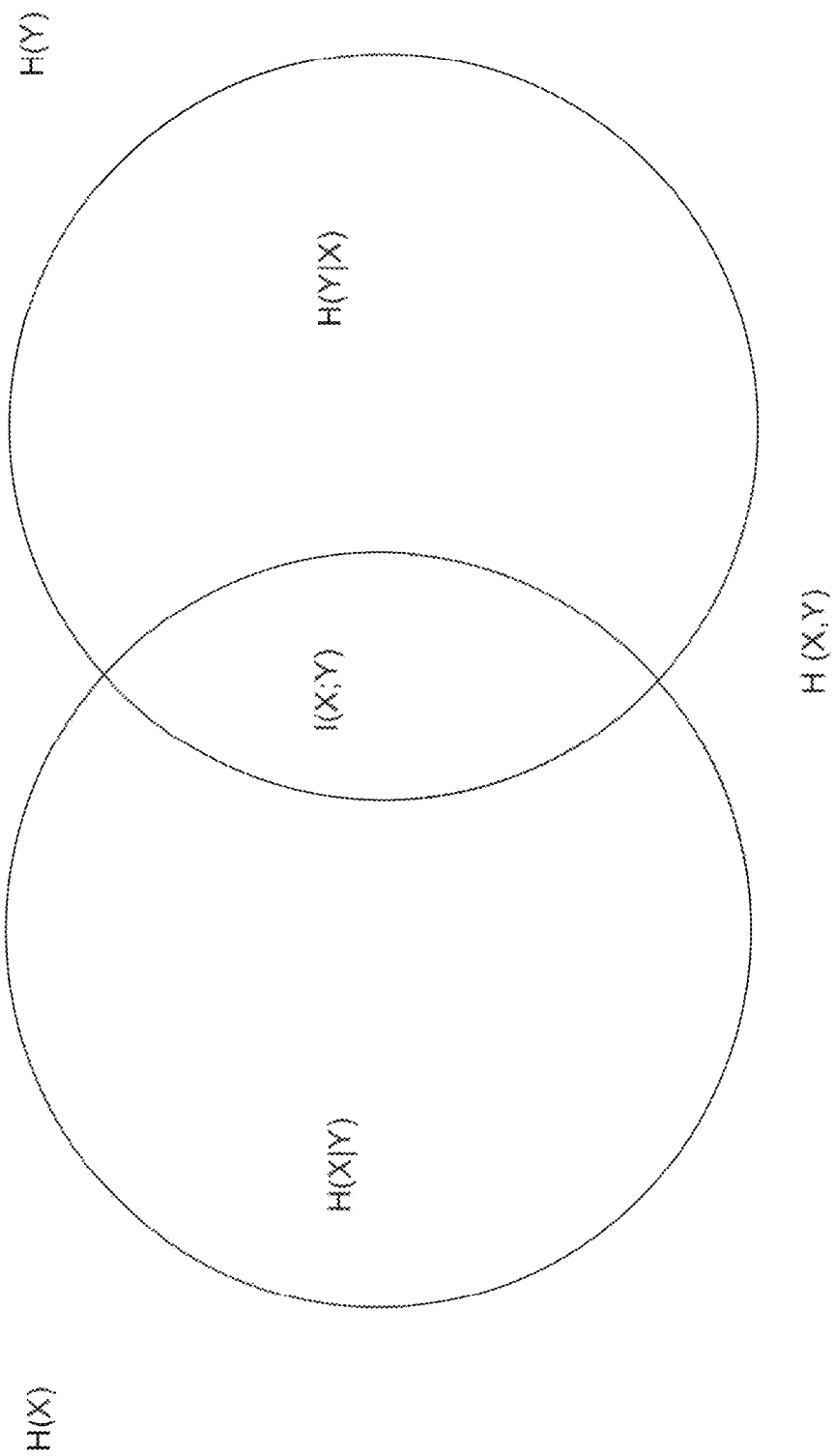
FIG. 68 shows an example Venn diagram of the entropy relationships for two random variables X and Y.
Figure 69:
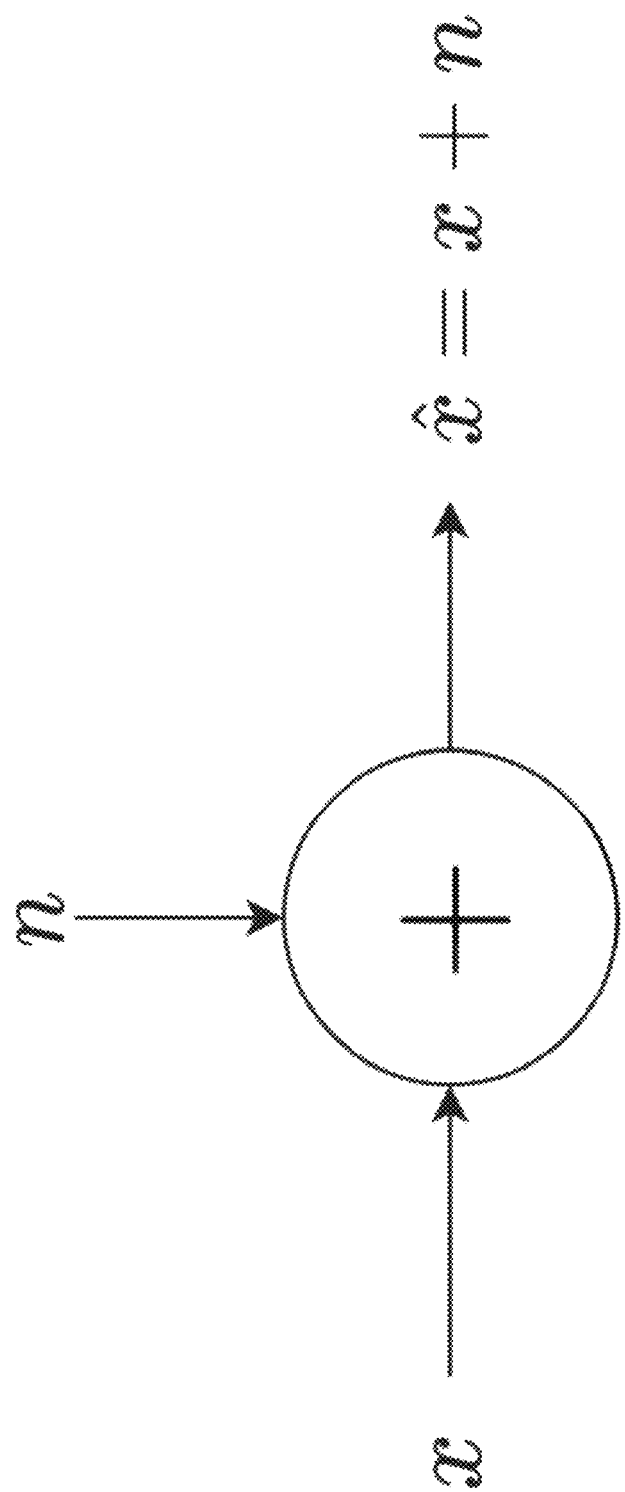
FIG. 69 shows an example in which a compression pipeline is modelled as a simple channel where the input x is corrupted by noise n.

This is shown in FIG. 68 for example, in the form of a Venn diagram. Note that the area of the intersection of the two circles can be expressed as H(X)−H(X|Y) which again represents the reduction in entropy when Y is known.

Mutual information may also be expressed for probability density functions as follows:

$$I(X;Y) = \mathbb{E}_{p(x,y)}\left[\log \frac{p(x|y)}{p(x)}\right] = \mathbb{E}_{p(x,y)}\left[\log \frac{p(y|x)}{p(y)}\right] \qquad (8.2)$$

This is equivalent to the KL divergence between a joint distribution p(x, y) and marginal distributions p(x), p(y). Mutual information can be more succinctly expressed in terms of this F divergence:

$I(X; Y)=D_{KL}(p(x, y)\|p(x)\otimes p(y))$ since the joint p(x, y) may be expressed as a conditional p(x, y)=p(x|y)p(y). The intuitive meaning of mutual information expressed with the KL divergence is that the larger the divergence between the joint and the product of marginals, the stronger the dependence between X and Y.

Mutual information has found a wide range of meaningful applications within the field of data science.

For our field of image compression, it should be clear that there is a notion of mutual information between an input image and its corresponding compressed output from our compression pipeline. In fact, it turns out that for an autoencoder that is trained with an MSE loss, the network is learning to maximise (a lower bound on) the mutual information between the input and the latent representation Y, $I(X; Y)$. This should make intuitive sense because by maximising $I(X; Y)$ we are compressing away information in Y that is not necessary to retrieve X from Y, hence why a strong correlation between the input X and Y is expected, which is what we observe for the latents (the compressed bitstream) of our models.

8.2 Mutual Information Estimation

Notwithstanding the usefulness of mutual information for a wide range of fields, estimation of mutual information for unknown probability densities still remains intractable to compute. It's only tractable for discrete variables, or for a limited set of cases where known probability distributions may be applied.

Therefore there have been a number of efforts to provide estimators that can provide a tight lower or upper bound on the mutual information. In this section, the Barber & Agakov and InfoNCE bound is defined.
8.2.1 Unstructured Bounds
Barer & Agakov The Barber & Agakov upper bound bound is defined as follows:

$$I(X;Y) = \mathbb{E}_{p(x,y)}\left[\log \frac{p(y|x)}{q(y)}\right] = D_{KL}(p(y|x)\|q(y)) \qquad (8.3)$$

For the case of the lower bound on the mutual information, we replace the intractable conditional distribution p(x y) with a tractable problem over a variational distribution q(x|y):

$$I(X;Y) = \mathbb{E}_{p(x,y)}\left[\log\frac{q(x|y)}{p(x)}\right]\mathbb{E}_{p(y)}[D_{KL}(p(x|y)\|q(x|y)) \quad (8.4)$$

$$\geq \mathbb{E}_{p(x,y)}[\log q(x|y)] + \mathbb{E}_{p(x,y)}\log p(x) = \mathbb{E}_p(x,y)[\log q(x|y)] + h(X)$$

The Barber & Agarov lower bound is tight when $q(x|y) = p(x|y)$.

InfoNCE

InfoNCE is a lower bound where a critic may be used to estimate the joint and marginals.

$$I_{NCE}(X;Y) \geq \mathbb{E}_{p^K(x,y)}\left[\frac{1}{K}\sum_{i=1}^{K}\log\frac{p(y_i|x_i)}{\frac{1}{K}\sum_{j=1}^{K}p(y_i|x_j)}\right] \quad (8.5)$$

$$= \mathbb{E}_{p^K(x,y)}\left[\frac{1}{K}\sum_{i=1}^{K}\left(\log p(y_i|x_i) - \log\frac{1}{K}\sum_{i=1}^{K}p(y_i|x_j)\right)\right]$$

$$= \mathbb{E}_{p^K(x,y)}\left[\frac{1}{K}\sum_{i=1}^{K}\left(\log p(y_i|x_i) - \log\sum_{i=1}^{K}p(y_i|x_j) + \log K\right)\right]$$

The role of the critic is to learn to predict $p(y|x)$. The critic may be parameterized by a neural network.

8.3 An Innovation

8.3.1 Closed-Form Solution

In this section, a novel approach that seeks to maximize the mutual information between the reconstructed output of the compression pipeline and the input is explored. As explained in the introduction, maximizing the mutual information is a method of producing a tight coupling between two parameters.

In general, it is not clear how well mutual information estimators work for high dimensional problems, such as image compression and the extent of the lower and upper bounds is hard to define. The estimators may be biased or provide inaccurate estimates. A novel way around this issue is to treat the compression pipeline as a simple channel, the aim is to increase the channel capacity—increasing channel capacity equates to increasing the amount of information that can flow through the corrupted channel. The highest channel capacity is achieved when the noise added by our channel is zero. When the input x passes through the channel it is corrupted by noise n, as shown in Equation (8.6). Our aim is to maximize the channel capacity by maximizing the mutual information between the input x and the output $\hat{x}$, essentially learning to remove corruptions introduced by the noisy channel.

$$\hat{x} = x + n \quad (8.6)$$

Modelling the input x and the noise n as zero-mean independent Gaussian tensors, $\mathcal{N}(0, \sigma^2)$ it is possible to compute a closed-form solution of the mutual information $I(x; \hat{x})$ where x is the input and $\hat{x}$ is the compressed media.

$$I(x;\hat{x}) = H(x) - H(x|\hat{x}) = \frac{1}{2}\log\left(1 + \frac{\sigma_x^2}{\sigma_n^2}\right) \quad (8.7)$$

The parameters $\sigma_x$ and $\sigma_n$ of Equation (8.7) are learnt by neural networks. In terms of entropy modelling, the MVND entropy model may be used to model our source x and our noise n. However, in general, any type of density estimation approach (such as Maximum likelihood or Maximum a posteriori) as well as any generative model (such as a PixelCNN, Normalizing flow, Variation auto encoders) can be used. The aim of the training is to force our encoder-decoder compression pipeline to maximise the mutual information between x and z, which forces our output to share information with our ground truth image. The training may be executed in multiple different ways.

Figure 70:
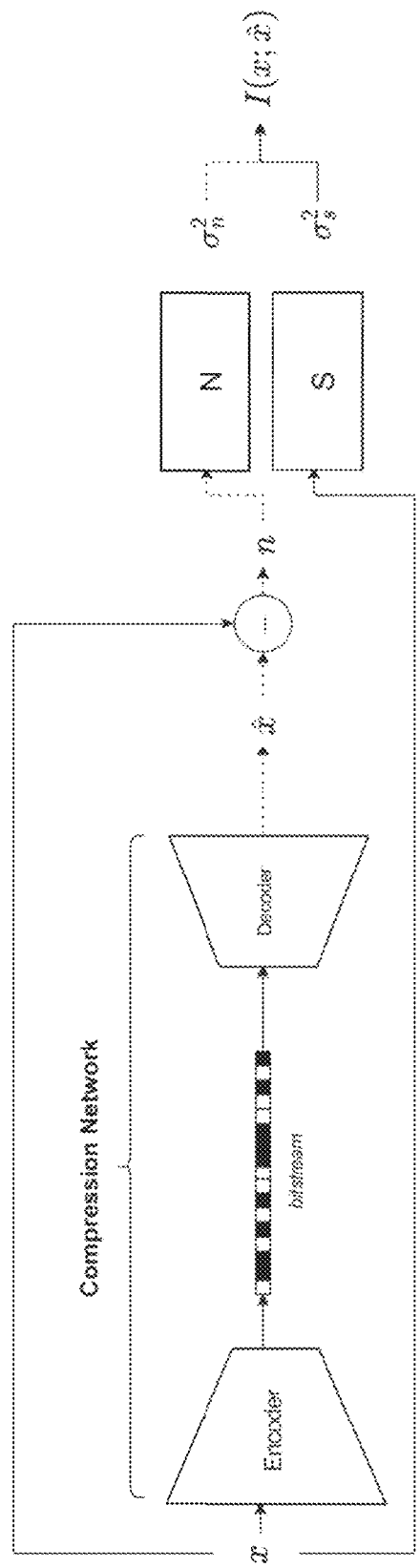
FIG. 70 shows an example of training of the compression pipeline with the mutual information estimator. The gradients propagate along the dashed lines in the figure. N and S are neural networks to predict $\sigma_n^2$ and $\sigma_s^2$, using eq. (8.7). n=$\hat{x}$−x.

The first method of training is to directly maximise mutual information in a one-step training process, where the x and n are fed into their respective probability networks S and N. The mutual information over the entire pipeline is maximised jointly. This is shown in FIG. 70 for example, where the black arrows represent information flow in the forward pass and dashed-lines show gradient flow in the backward pass. The loss is modified to include the mutual information estimation $I(x; \hat{x})$.

$$\mathcal{L}(x,\hat{x}) = R(x) + \lambda D(x,\hat{x}) + \alpha I(x;\hat{x}) \quad (8.8)$$

Figure 71:
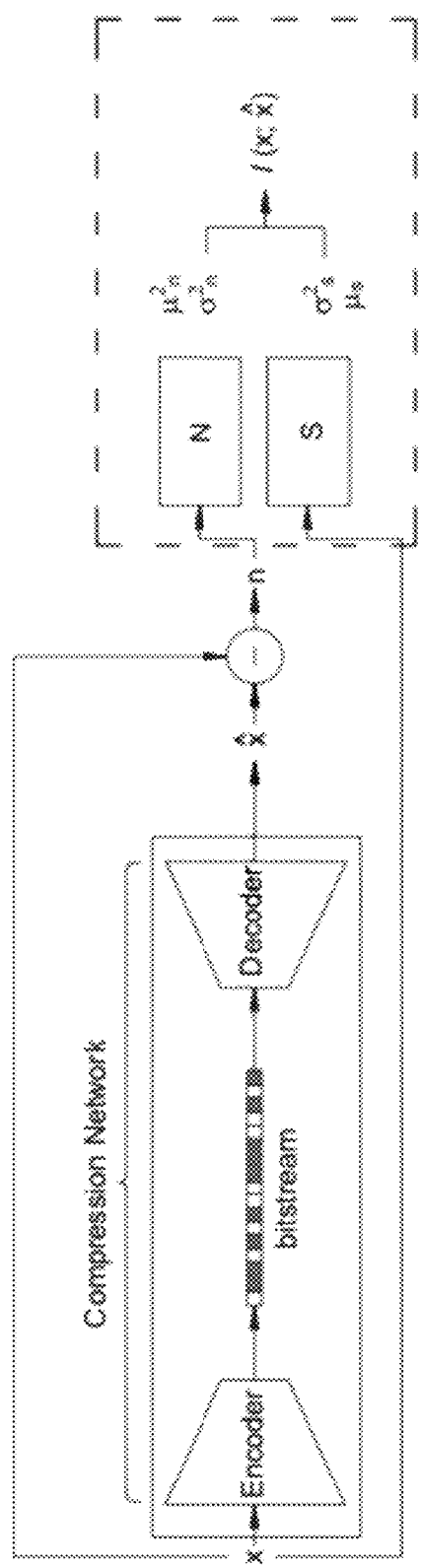
FIG. 71 shows an example of training of the compression pipeline with the mutual information estimator in a bi-level fashion. The gradients for the compression network propagate within the compression network area. Gradients for the networks N and S propagate only within the area bounded by the dashed lines. N and S are trained separately from the compression network using negative log-likelihood loss. N and S are neural networks to predict $\sigma_n^2$ and $\sigma_s^2$ using eq. (8.7). n=$\hat{x}$−x.

The second approach is a bi-level or two-step process. Firstly, the network S and N is trained using negative log-likelihood to learn a useful representation of $\sigma_n$ and $\sigma_x$, based on the closed-form solution of the distribution selected. This part of the process is shown in FIG. 71 for example, where only N and S are trained. Secondly, estimates of $\sigma_n$ and $\sigma_x$ are then used to estimate the mutual information and train the compression network, however gradients only impact the components within the area of the compression network; components are trained separately.

In general, for any function $f$ and $g$ it holds that $I(X; Y) \geq I(g(X); f(Y))$ where $I(X; Y) = I(g(X); f(Y))$ if and only if $f$ and $g$ are invertible and volume-preserving, i.e. $\det(f) = 1$ and $\det(g) = 1$. As such the noise n and/or the input x can be transformed by an arbitrary function as long as the constraints above apply, e.g. $f$ and $g$ could be an invertible neural networks (INN). The invertible transformation can be applied to either X or Y or both. A particular analytical example of $f$ and $g$ could be an orthogonal basis transform into another basis, or converted into another domain, such as the wavelet domain, to better model the probability distributions.

In addition, the approach may also be applied on patches or segments of images. Also a multi-scale approach may be used, this is naturally the case when the transformation above provides multiple different scales, such as the case given the wavelet transform, where mutual information for each scale is computed and then aggregated. This approach may also be further generalised to a multivariate distribution where the tensor to be modelled is split into blocks (in spatial and or channel dimensions) of variable sizes and modeled using a multivariate normal distribution with a mean vector and co-variance matrix per block of elements.

Finally the distribution used to model the source and noise is not limited to a multivariate Gaussian distribution, but may be extended to any continuous distribution such as Behrens-Fisher distribution, Cauchy distribution, Chernoff's distribution, Exponentially modified Gaussian distribution, Fisher-Tippett, log-Weibull distribution, Fisher's z-distribution, skewed generalized t distribution, generalized logistic distribution, generalized normal distribution, geometric stable distribution, Gumbel distribution, Holtsmark distribution, hyperbolic distribution, hyperbolic secant distribution, Johnson SU distribution, Landau distribution, Laplace distribution, Lévy skew alpha-stable distribution or stable distribution, Linnik distribution, logistic distribution, map-Airy distribution, etc. This allows for more accurate modelling of the source and noise while maintaining a close formed solution.

8.3.2 Bounded Estimators for Compression

Figure 72:
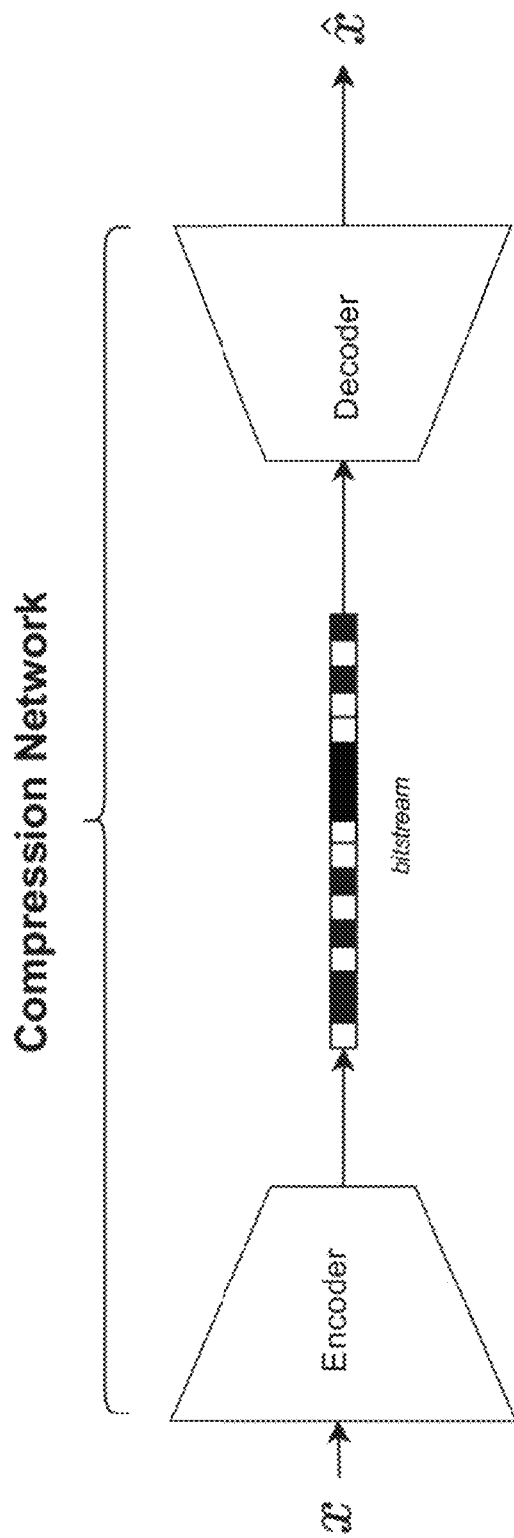
FIG. 72 shows an example simplified compression pipeline with an input x, output $\hat{x}$, and an encoder-decoder component.

A novel method of performing compression using mutual information, that does not involve a noisy channel, is to explicitly optimise the mutual information of the output and the input of the neural network such that this metric is maximised. The mutual information estimator used is not restricted to the bounds presented in the earlier sections such as Barber & Agakov or InfoNCE, along with bounds not presented explicitly, such as TUBA, Nguyen-Wainwright-Jordan (NWJ), Jensen-Shannon (JS), TNCE, BA, MBU, Donsker-Varadhan (DV), IWHVI, SIVI, IWAE, etc., Moreover, neural networks (non-limiting examples include: INN, auto-encoders, conditional model) can also be applied to estimate probability estimates p (x, y), p(x|y) for mutual information estimates. The loss of the neural network is therefore augmented in the following way:

$$\mathcal{L}(x,\hat{x}) = R(x) + \lambda D(x,\hat{x}) + \alpha I(x;\hat{x}) \tag{8.9}$$

where x is the input, $\hat{x}$ the output, R the estimated rate, D compression distortion, I the estimated mutual information. $\lambda$ and $\alpha$ are scaling coefficients. A simplified generic example of the compression network can be seen in FIG. 72, which shows a simplified compression pipeline.

8.3.3 Temporal Mutual Information

An extension of the mutual information, defined in Equation (8.2), appropriate for video content or temporally correlated media is to condition the joint and the marginals based on N past data points, c. The conditioning may be applied using the compressed output $c_i = \hat{x}_i$ or the ground truth input $c_i = x_i$. Conditioning on the compressed media allows for a temporal reduction of artifacts by enforcing logical and temporally consistent consecutive frames.

$$I(X;Y|C) = \tag{8.10}$$
$$\mathbb{E}_{p(x_i,y_i|c_{i-1},...,c_{i-N})}\left[\log \frac{p(x_i,y_i|c_{i-1},...,c_{i-N})}{p(x_i,y_i|c_{i-1},...,c_{i-N})p(y|c_{i-1},...,c_{i-N})}\right]$$

During variational approximations, the conditional or marginal may be parameterised as a neural network; the conditional approximation would be given as input the previous N samples, in addition to the current ith sample.

8.3.4 Optimising for Entropy

In the previous sections, mutual information optimisations was performed for the input and output of the compressed media, by computing I(x; $\hat{x}$), however, this can be extended to optimise for bit-rate R. Maximising mutual information of the latent parameter y and a particular distribution $\mathcal{P}$, as seen in Equation (8.11), can be used to optimise for rate.

$$\operatorname*{argmax}_{y} I(y;n), n \sim \mathcal{P}(.) \tag{8.11}$$

This is because rate is computed using Equation (8.12), where $q_y$ is the tractable probability distribution estimate of $p_y$ by an entropy model.

$$R = H(p_y, q_y) = \mathbb{E}_{y \sim p_y}[-\log_2(q_y(y))] \tag{8.12}$$

When I(y; n) is maximised, $p_y \approx \mathcal{P}$, such that the unknown distribution $p_y$ can be modelled as a noisy known distribution $\mathcal{P}$, this provides a more efficient entropy computation. The mutual information of I(y; n), as shown in Equation (8.13), requires that $p_y$ and $\mathcal{P}$ be dependent. In simplified form $$\log(\tfrac{p_{p_y,\mathcal{P}}(y,n)}{p_{p_y}(y)p_{\mathcal{P}}(n)}) = \log(p_{p_y,\mathcal{P}}(y,n)) - \log(p_{p_y}(y)p_{\mathcal{P}}(n)); y \sim p_y, n \sim \mathcal{P} \tag{8.13}$$

which is maximised if the joint probability is large and the marginal probability is small, i.e. strong dependence.

Figure 73:
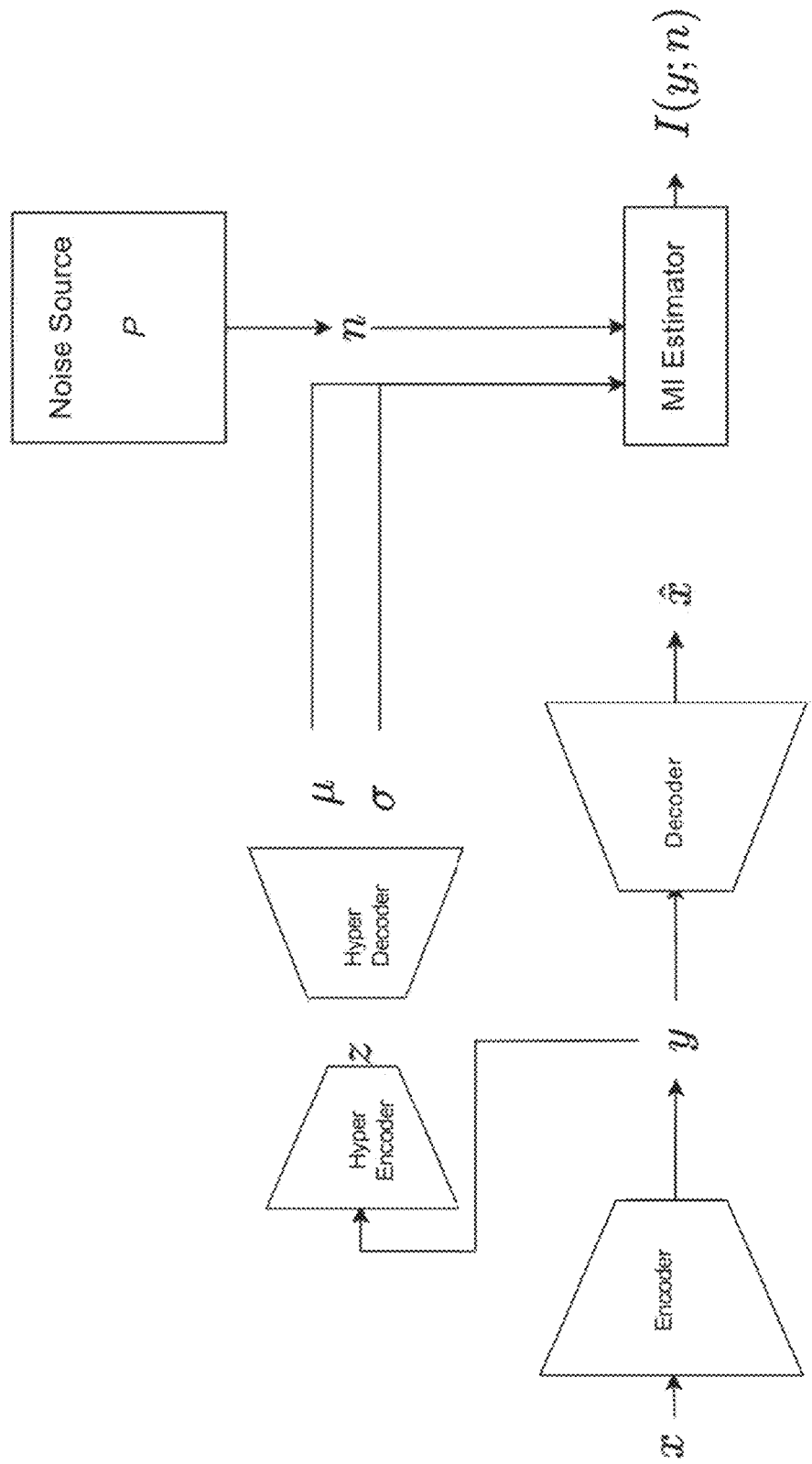
FIG. 73 shows an example including maximising the mutual information of I(y; n) where the MI Estimator can be parameterized by a closed form solution given by P.

For the case where $\mathcal{P}$ has a known closed-form solution, this can be optimised for directly using negative log-likelihood, as shown in for example FIG. 73. In addition, since the hyper-prior models provide estimates for $\mu$ and $\sigma$ these values are used to guide the optimisation. For this case, the rate loss R of y has to be computed with a cross entropy term, as shown above, such that $\mu$ and $\sigma$ learn useful parameters. If $\mathcal{P} = \mathcal{N}(0, 1)$, the mutual information can be computed using Equation (8.7).

Figure 74:
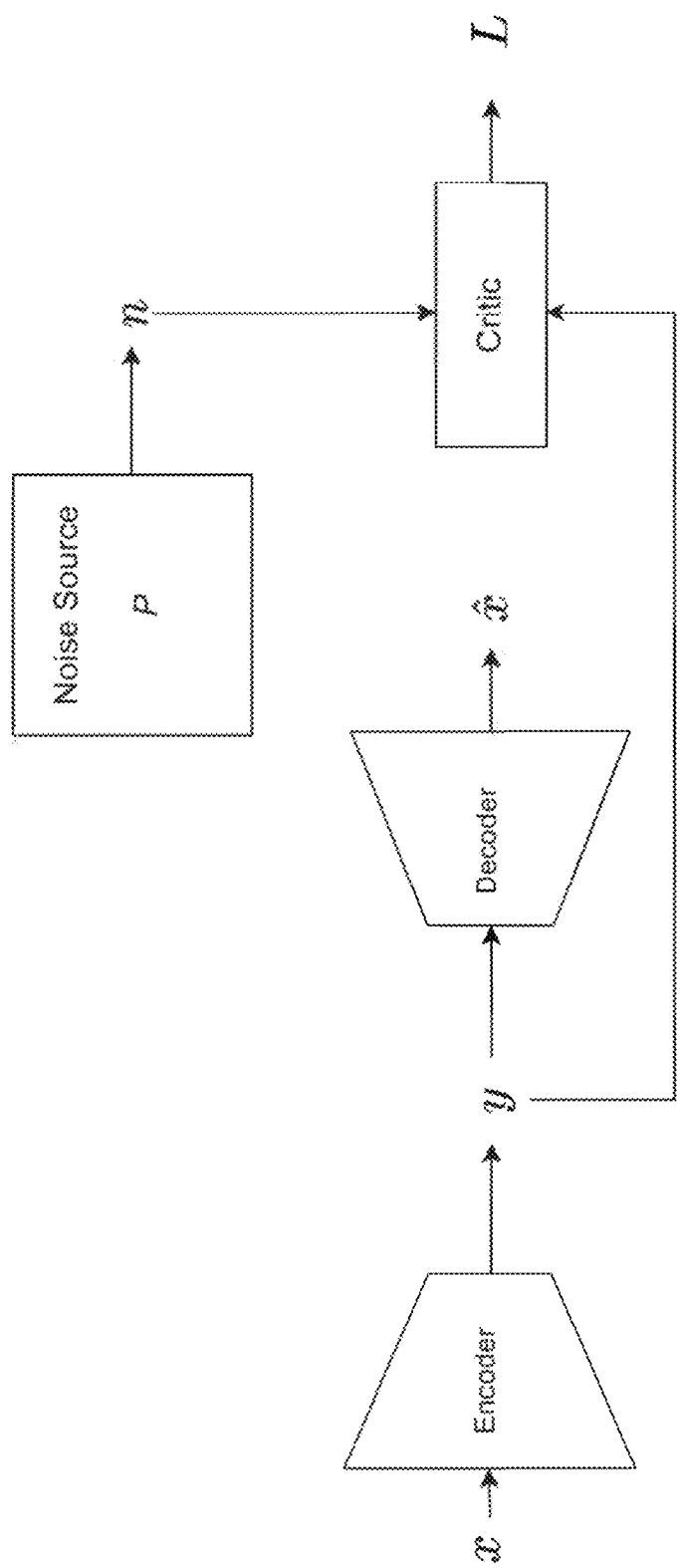
FIG. 74 shows an example including maximising the mutual information of L=I(y; n) where the Critic can be parameterized as a neural network. The mutual information estimate of the critic depends on the mutual information bound, such as InfoNCE, NWJ, JS, TUBA etc. The compression network and critic are trained in a bi-level fashion.

In the example of FIG. 74, the bit-rate is only controlled by the mutual information estimate L, where L is a particular mutual information estimate, such as InfoNCE given by Equation (8.5). The loss to train the critic is given by $\mathcal{L} = -L$.

8.3.5 Concepts

1. Maximising mutual information of the input and output by modelling the difference $\hat{x} - x$ as noise
2. Maximising mutual information of the input and output of the compression pipeline by explicitly modelling the mutual information using a structured or unstructured bound
3. A temporal extension of mutual information that conditions the mutual information of the current input based on N past inputs.
4. Maximising mutual information of the latent parameter y and a particular distribution $\mathcal{P}$ is a method of optimising for rate in the learnt compression pipeline 9. From AAE to WasserMatch: Alternative Approaches for Entropy Modelling in Image and Video Compression 9.1 Introduction In learnt image and video compression, the latent space is normally conditioned to follow a certain distribution using maximum likelihood estimation (MLE). We describe alternative approaches to learnt compression that integrate and exploit other methods of enforcing specific densities on latent spaces. This allows us to circumvent some limitations of MLE and obtain greater flexibility in the classes of distributions that can be modelled.

9.1.1 Maximum Likelihood Estimation of Entropy Model in Learnt Compression

Learnt image and video compression mainly consists in three components: an encoder neural network, an entropy model, and a decoder neural network (the encoder and decoder networks together are referred to as an auto-encoder). The encoder network processes the image or video into a representation called a latent space, and the decoder network applies the reverse transformation. The encoder network applies a first pre-processing step before the entropy model is applied.

The entropy model is represented as a uni- or multivariate probability distribution $p_m(y)$, normally assumed to have a parametric form (for example, a standard Normal distribution, or a Laplacian distribution, etc). The parameters of the entropy model are usually fitted to the training data (using methods like maximum likelihood), although this is not a requirement—it only improves the compression efficiency of the pipeline. On the other hand, the actual marginal distribution of the data $p(y)$ is not known in advance.

With an entropy model in place, we can further compress the latent space using an entropy code such as Huffman coding or arithmetic coding: the amount of bits B contained in this code (which is the bitstream that is used as the final compressed representation) can be calculated using Shannon's cross-entropy.

$$B = \Sigma p(y) \log_2(p_m(y)) \tag{9.1}$$

This quantity is minimised when $p(y)$ and $p_m(y)$ are the same probability distribution, i.e. when the distribution in the entropy model matches the real distribution of the latent space.

Fortunately, we can directly train our models towards this objective, in fact the usual form of the loss function of a learnt compression model is $$L = D(x, \hat{x}) + \lambda B(y) \tag{9.2}$$

Where D is a distortion loss between the original image and the compressed+decompressed image (less distortion equals better fidelity).

An important concept to keep in mind is that Shannon entropy is only valid on discrete sets of symbols. This means that, in order to apply arithmetic coding on the numerical values inside the latent space, we need to quantise these values.

Quantisation is a big problem in learnt image and video compression, because the quantisation operation has no gradient, and our networks are trained using gradient descent, so it requires all operations inside the pipeline to be differentiable. In practice, a differentiable substitute is used instead of quantisation during training, for example the addition of noise, or the Straight-Through Estimator (STE); however, this is just an approximation of the real operation.

What if we could bypass the quantisation operation?

Here we address this question.

9.1.2 Generative Adversarial Networks (GANs)

GANs are often used when it is not clear what form the loss function should have. This is especially applicable to generation tasks, where the loss needs to define what a realistic-looking image looks like. For instance, if a model is trained to generate human faces, the loss should contain information such as what is a realistic-looking nose, a realistic location for eyes and mouth, a realistic skin color, etc. Such a loss is impossible to craft manually, hence we substitute the loss function with a second neural network referred to as a Discriminator.

The discriminator is trained as a classifier that needs to differentiate between the images generated by the generator, and the images in the training dataset. The generator network has the opposite objective: to generate images that will be classified as real, despite being generated by the network. In artificial intelligence, this is referred to as a zero-sum minimax game: zero-sum because the loss of the generator is directly opposite to the loss of the discriminator; and minimax because the objective of the networks is to minimise the loss of each network in the worst possible case, that is when the loss of the other network is at a minimum.

9.1.3 Adversarial Auto-Encoders (AAEs)

As described in a previous subsection, learnt compression pipelines make use of an entropy model to further compress data. This is done with maximum likelihood estimation on the latent space, under the prior assumption that the probabilities of its values follow a certain distribution. Adversarial training can be an effective alternative to maximum likelihood: indeed, AAEs make use of GAN-style training to enforce a specific distribution on their latent space.

Figure 75:
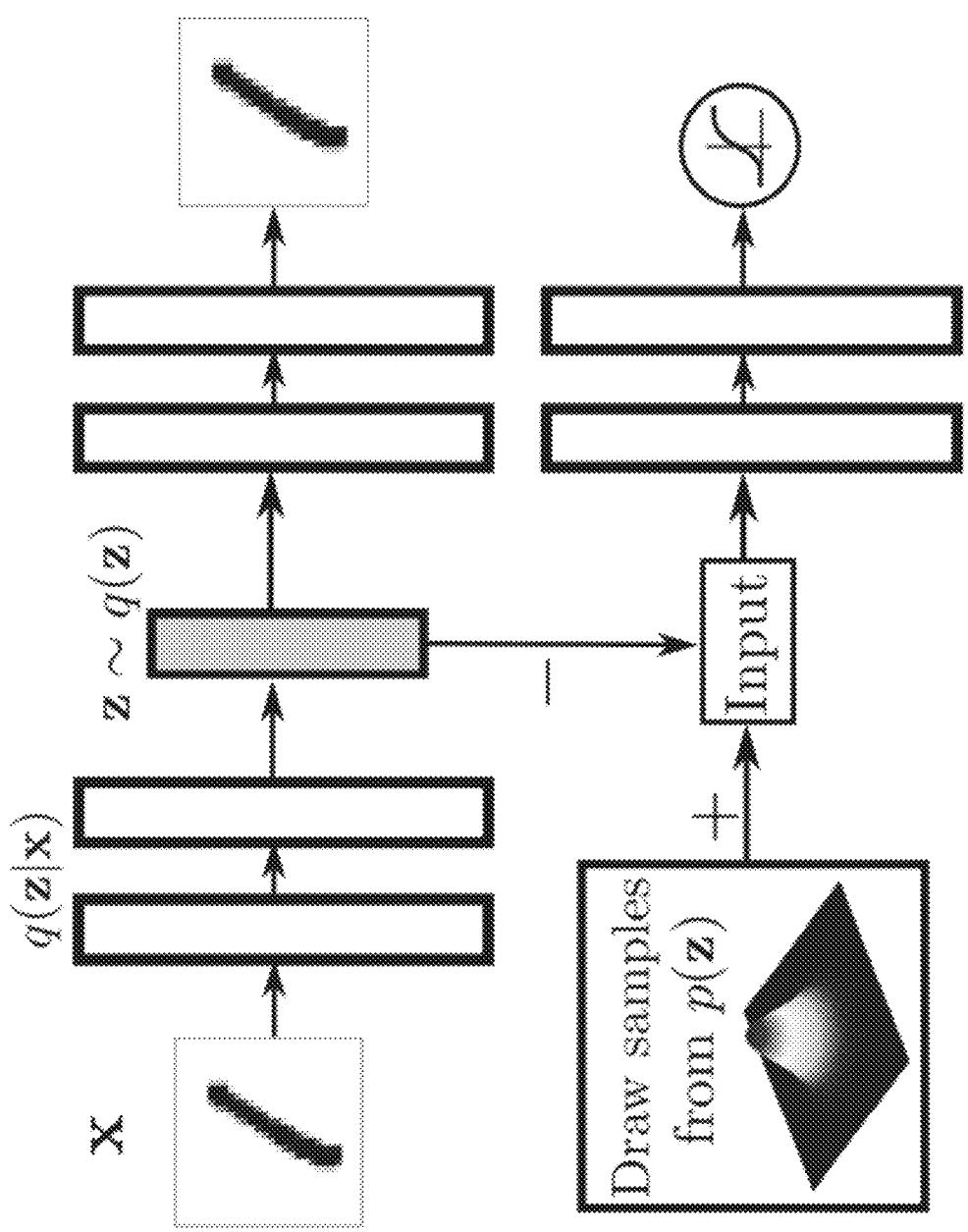
FIG. 75 shows an example of an AAE where the input image is denoted as x and the latent space is z. The encoder network q(z|x) generates the latent space that is then fed to both the decoder (top right) and the discriminator (bottom right). The discriminator is also fed samples from the prior distribution p(z) (bottom left).

The task of the discriminator network is to differentiate between the latent space and samples from a known prior distribution. Conversely, the task of the generator network (in AAEs, the generator is the encoder) is to generate latent spaces that are indistinguishable from the prior distribution. FIG. 75 shows an example illustration of a typical AAE setup.

AAEs are autoencoders that use GAN-style training.

The biggest advantage of AAEs as opposed to autoencoders trained with MLE is that AAE training is sample-based, while MLE requires parametric distributions with analytical form. Examples of parametric distributions include normal, laplacian, beta distributions, etc. This puts a strict limit on what class of distribution the latent space is allowed to follow, because many distributions have no analytical form but can be useful priors (for example, categorical distributions where the values can only assume one of a finite set of values).

9.1.4 Analytical Vs Sample-Based Distributions

Analytical distributions have a density that can be represented as a formula. For example, a Normal distribution has a probability density function defined as $$d(x) = \frac{1}{\sigma \sqrt{2\pi}} \exp \frac{(x - \mu)^2}{\sigma} \tag{9.3}$$

This means that the density can be simply calculated at any point in the distribution's support (the set of numbers it is defined on). Having an analytical form also enables a range of techniques such as differentiable sampling in the form of the reparametrisation approach (we remind the reader that operations used in a learnt pipeline need to be differentiable in order to work).

On the other hand, an example of a non-analytical distributions is a categorical distribution where the only information we have is a few samples as listed below:

$$l = \{0,0,3,1,0,2,3,0,2\} \tag{9.4}$$

We cannot back propagate through such a distribution, hence it is more problematic to include in a learnt compression pipeline.

9.1.5 Measures of Distance Between Distributions

It is useful to understand how the difference between one probability distribution and the other can be calculated, as there are innumerable methods for estimating distance between distributions.

KL Divergence: a widely used method in machine learning is the Kullback-Leibler (KL) divergence, sometimes referred to as relative entropy. The KL divergence between distributions P and Q is defined as $$D_{KL}(P \| Q) = \int_{-\infty}^{+\infty} p(x) \log\left(\frac{q(x)}{p(x)}\right) dx \tag{9.5}$$

Where p(x) and q(x) are the densities of the distributions at point x.

This distance has a limitation. As shown in (9.5), the density p(x) at all points needs to be known, and this is only the case when the distribution has an analytical form. So, the KL divergence can't be used for all distributions.

Moment Matching: a simpler way of comparing distributions is simply to calculate their moments and compare the corresponding moment of one distribution against the moment of the other. Moments of a distributions are numbers that describe the shape of its density, for example the first moment of a distribution is its mean, the second moment is its variance, the third moment is the skewness, etc. In order to quickly calculate a measure of difference between two distributions, we can calculate the difference between the mean of one and the mean of the other, then the difference between the variance of one and the other, etc. This has the advantage of being completely sample-based, that is, we don't need to know the analytical form of the distribution, we just need to be able to draw samples from it.

MMD: maximum mean discrepancy is another method that does not require the distributions to have an analytical form. It is weakly related to moment matching, and could be considered a generalisation of it.

Let us define a kernel h that maps from the set $\mathcal{X}$ to the set $\mathcal{H}$. Maximum mean discrepancy is then defined as $$MMD(P,Q) = \|\mathbb{E}_{X \sim P}[h(X)] - \mathbb{E}_{Y \sim Q}[h(Y)]\|_{\mathcal{H}} \quad (9.6)$$

That is, the norm of the difference between the expected value of the kernel embedding of the first distribution and the second. As a simple example, if we pick h to be the identity function, MMD reduces to first moment matching (i.e. the embeddings collapse into the mean of the distributions).

Optimal Transport: this family of methods stems from the field of operations research. The distance between distributions is formulated in terms of finding the most efficient transportation plan that moves probability mass from one distribution to the other.

The most well-known measures of distance in optimal transport theory are Wasserstein distances.

Mathematically, if we define a transportation plan between distributions as γ from the set containing all transport plans Γ, and a cost of transport c, W-distances are defined as below:

$$W(P, Q) = \inf_{\gamma \in \Gamma(P,Q)} \int c(x, y) d\gamma(x, y) \quad (9.7)$$

That is, the minimum-cost transportation plan to move all the mass of P into Q. The transportation cost is usually the L1 norm, in which case the distance is the Wasserstein-1 distance.

Just as MMD, Wasserstein metrics are also purely sample-based, i.e. they can be used with any probability distribution regardless of whether they have an analytical form. However, W-distances are non-trivial to compute because they require finding the minimum-cost transportation plan. This is an optimisation problem, which is non-differentiable and can be extremely computationally intensive when the distributions are very high-dimensional.

Sinkhorn Divergences

Sinkhorn divergences can be considered a generalisation of both MMD and Wasserstein metrics. Mathematically they are formulated as below:

$$S(P, Q) = W_\epsilon(P, Q) - \frac{1}{2} W_\epsilon(P, P) - \frac{1}{2} W_\epsilon(Q, Q) \quad (9.8)$$

Where $W_\epsilon$ is a regularised form of Wasserstein distances defined as below:

$$W_\epsilon(P, Q) = \inf_{\gamma \in \Gamma(P,Q)} \int_{\mathbb{R}^d \times \mathbb{R}^d} c(x, y) d\gamma(x, y) + \epsilon KL(\gamma \| P \times Q) \quad (9.9)$$

If we compare against Equation (9.7) we can see that an additional KL divergence term has been added. This has the effect of mitigating the main problem with Wasserstein distances (their non-smoothness and subsequent computational expensiveness).

9.2 Innovation

9.2.1 Learning Latent Distribution Through Divergence Minimisation

We present three general frameworks where the latent space of an auto-encoder is forced to follow a particular distribution by a joint training process.

Framework 1 comprises a one-step training pipeline, usable with analytical prior distributions;

Framework 2 comprises a two-step process with adversarial training, used with sample-based distributions;

Framework 3 comprises a two-step process without adversarial training, also suitable for sample-based distributions.

The algorithm of the first framework is detailed below:

---

Algorithm 9.1 Training process for auto-encoder trained with framework 1. The backpropagate( ) method is assumed to retrieve gradients of the loss with respect to the network weights. Backpropagation optimiser is assumed to have a step( ) method that updates the weights of the neural network.

Inputs:
Encoder Network: $f_\theta$
Decoder Network: $g_\phi$
Reconstruction Loss: $L_R$
Entropy Loss: $L_B$
Input tensor: $x \in \mathbb{R}^{H \times W \times C}$
Training step:
$y \leftarrow f_\theta(x)$
$\hat{x} \leftarrow g_\phi(y)$
$L \leftarrow L_R(x, \hat{x}) + \lambda L_B(y)$ $\frac{dL}{d\theta}, \frac{dL}{d\phi} \leftarrow$ backpropagate $(L)$ $\theta \leftarrow$ optimizer.step$\left(\theta, \frac{dL}{d\theta}\right)$ $\phi \leftarrow$ optimizer.step$\left(\phi, \frac{dL}{d\phi}\right)$ Repeat Training step for i iterations.

---

This framework is equivalent to the standard learnt compression pipeline, where the prior distribution is embedded inside the entropy loss. The difference in our approach is the choice of $L_B$: while the standard pipeline uses KL divergence, our choice is more free in that we also use moment matching as one of the divergence measures, which has not been done previously.

The algorithm for the second framework is below:

---

Algorithm 9.2 Training process for auto-encoder trained with framework 2. We define a prior distribution P, then in training step 2 we sample p from it and feed both the sample and the latent space to the discriminator, which outputs "realness" scores for each. The encoder/generator is then trained to output latent spaces that look more "real", akin to the samples from the prior distribution.

---

Inputs:
Encoder/Generator Network: $f_\theta$
Decoder Network: $g_\phi$
Discriminator Network: $h_\psi$
Reconstruction Loss: $L_R$
Generator Loss: $L_g$
Discriminator Loss: $L_d$
Input tensor: $x \in \mathbb{R}^{H \times W \times C}$
Prior distribution: P
Training step 1:
$y \leftarrow f_\theta(x)$
$\hat{x} \leftarrow g_\phi(y)$
$L \leftarrow L_R(x, \hat{x})$ $\frac{dL}{d\theta}, \frac{dL}{d\phi} \leftarrow \text{backpropagate } (L)$ $\theta \leftarrow \text{optimizer.step}\left(\theta, \frac{dL}{d\theta}\right)$ $\phi \leftarrow \text{optimizer.step}\left(\phi, \frac{dL}{d\phi}\right)$ Training step 2 (adversarial):
p~P
$s_r \leftarrow h_\psi(p)$
$s_f \leftarrow h\psi(y)$
$L_d \leftarrow \lambda L_d(s_r, s_f)$
$L_g \leftarrow \lambda L_g(s_r, s_f)$ $\frac{dL}{d\theta} \leftarrow \text{backpropagate } (L_g)$ $\frac{dL}{d\psi} \leftarrow \text{backpropagate } (L_d)$ $\theta \leftarrow \text{optimizer.step}\left(\frac{dL}{d\theta}\right)$ $\psi \leftarrow \text{optimizer.step}\left(\frac{dL}{d\psi}\right)$ Repeat Training steps 1 and 2 for i iterations.

---

The above algorithm describe the adversarial auto-encoder setup that we use for image compression. This allows us to force the latent to follow a sample-based distribution that has no analytical form.

In addition, we use a variety of adversarial setups for the generator and discriminator. The first category is class probability estimation, which includes all losses in FIG. 76.

The second category is direct divergence minimisation using f-divergences such as:

Kullbach-Leibler divergence;

Jensen-Shannon divergence;

Inverse KL divergence.

The third category is the direct minimisation of a Bregman divergence, and the fourth category is moment-matching.

The algorithm for the third framework is below:

---

Algorithm 9.3 Training process for auto-encoder trained with framework 3. We define a prior distribution P, then in training step 2 we sample p from itand compute our divergence measure between it and the latent y.

---

Inputs:
Encoder Network: $f_\theta$
Decoder Network: $g_\phi$
Reconstruction Loss: $L_R$
Entropy Loss (divergence): $L_B$
Input tensor: $x \in \mathbb{R}^{H \times W \times C}$
Prior distribution: P
Training step 1:
$y \leftarrow f_\theta(x)$
$\hat{x} \leftarrow g_\phi(y)$
$L \leftarrow L_R(x, \hat{x})$ $\frac{dL}{d\theta}, \frac{dL}{d\phi} \leftarrow \text{backpropagate } (L)$ $\theta \leftarrow \text{optimizer.step}\left(\theta, \frac{dL}{d\theta}\right)$ $\phi \leftarrow \text{optimizer.step}\left(\phi, \frac{dL}{d\phi}\right)$ Training step 2:
p~P
$L \leftarrow \lambda L_B(y, p)$ $\frac{dL}{d\theta} \leftarrow \text{backpropagate } (L)$ $\theta \leftarrow \text{optimizer.step}\left(\frac{dL}{d\theta}\right)$ Repeat Training steps 1 and 2 for i iterations.

---

This framework is easier to train than framework 2 because there is no adversarial training. Additionally, it is more flexible than framework 1, in that the entropy loss calculation depends purely on sampling from the prior distribution and comparing the sample against the latent space using one of the following measures:

Mean Maximum Discrepancy

Optimal Transport (Wasserstein Distances)

Sinkhorn Divergences

Mean Maximum Discrepancy is differentiable, and so are Sinkhorn Divergences. But pure Optimal Transport measures are not. A contribution of ours is a simplification of Wasserstein distances that exploits the fact that W-distances are differentiable in the special case where the distributions are univariate.

In the 1-dimensional case, Wasserstein collapses to the following definition:

$$W_{1D}(P, Q) = \frac{1}{M} \sum_{m=1}^{M} c(p_{i[m]}, y_{j[m]}) \tag{9.10}$$

Where M is the number of elements in p and y, which are the sample from the prior distribution and the latent space respectively. Indices i[m] and j[m] are the indices of the sorted values of the tensors in ascending order.

Figure 77:
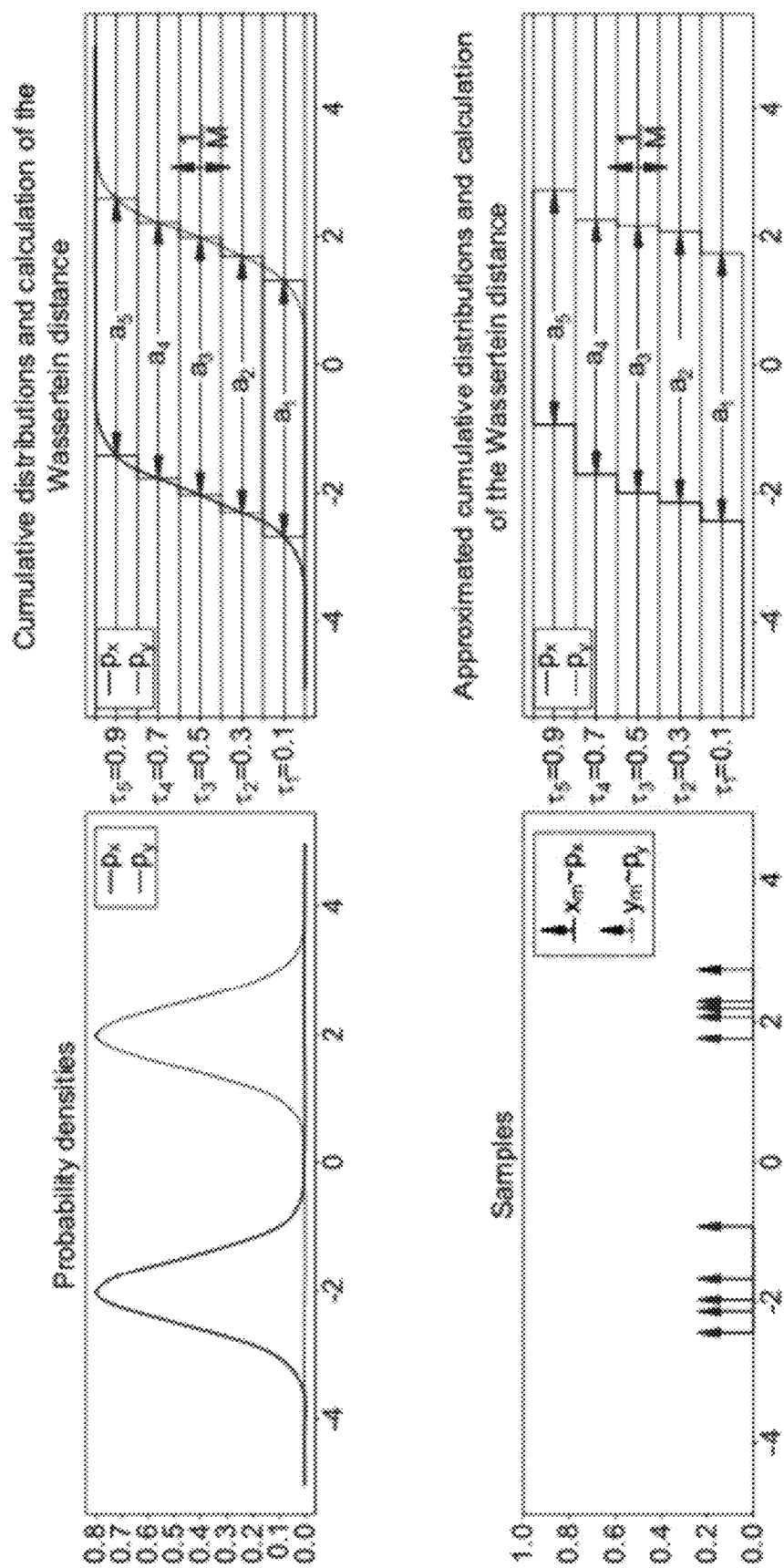
FIG. 77 shows an example diagram of the Wasserstein distance between two univariate distributions, in the continuous (above) and discrete (below) cases. The operation in Equation (9.10) is equivalent to calculating the difference between the cumulative density/mass functions. Since we compare samples drawn from distributions, we are interested in the discrete case.

As we can see in the equation above, we no longer need to find the infimum of the transport plans, so the optimisation problem is done away with completely. An illustration of what this divergence measures is shown in FIG. 77.

With univariate distributions, calculating the Wasserstein-1 distance is equivalent to calculating the L1 norm between the sample and the latent, once their elements have been sorted by value. This results in a simple code implementation, defined below:

---
Algorithm 9.4 Pseudocode of Wasserstein distance with univariate distributions. Note, the sampled tensor and latent space tensor are flattened before processing.

---
Inputs:
Sample from prior distribution: $p \in \mathbb{R}^N$
Latent space: $y \in \mathbb{R}^N$
Define:
L1(p,y): $\|\hat{p} - \hat{y}\|_1$
Calculate W-1 distance:
    $\hat{p}$ = sorted(p)
    $\hat{y}$ = sorted(y)
    W = L1($\hat{p}$, $\hat{y}$)
    return W

---

Naturally, the algorithm outlined in Algorithm 9.4 is not limited to use the Wasserstein-1 distance: for example, if calculating the Wasserstein-2 distance is required, all that is needed is to substitute the L1 norm with an L2 norm.

A limitation with Algorithm 9.4 is that the input tensors are flattened before sorting, thus it only supports univariate distributions, which have a much smaller representational power compared to multivariate distributions. However, we circumvent this limitation by defining a separate prior distribution for each channel or pixel in the latent space, then sampling from each of these distributions (see FIG. 78 for example).

Figure 78:
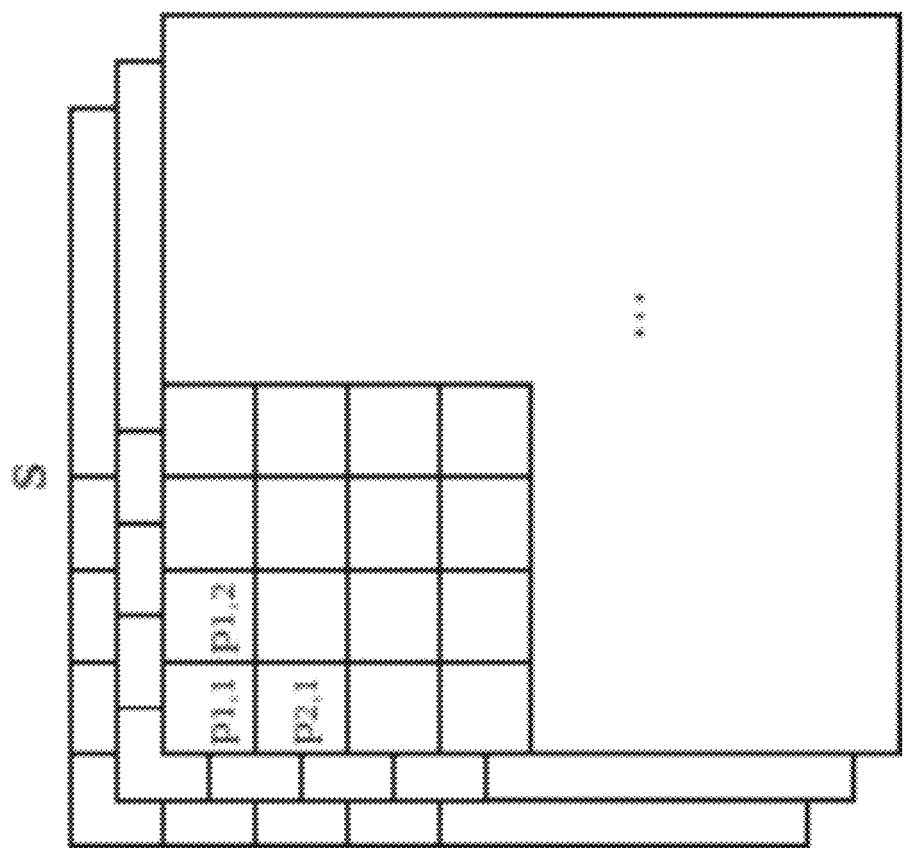
FIG. 78 shows an example of multivariate sampling used with Wasserstein distance. We sample a tensor s with 3 channels and whose pixels we name $p_{u,v}$ where u and v are the horizontal and vertical coordinates of the pixel. Each pixel is sampled from a Normal distribution with a different mean and variance.

Note that in FIG. 78 we sample all channels of a pixel from the same probability distribution; in practice we can also sample each channel from a separate distribution.

After sampling the target tensor, we calculate the Wasserstein distance separately for each pair of corresponding pixels in the latent space and sampled tensor, as below:

$$W_{u,v} = W_{1D}(s_{u,v}, y_{u,v}) \quad (9.11)$$

And finally we aggregate all these individual Wasserstein distances by averaging:

$$W(s, y) = \frac{1}{MN} \sum_u^M \sum_v^N W_{u,v} \quad (9.12)$$

Note that when using W-1 distance channel- or pixel-wise, a large batch of images is required to obtain a large enough sample size.

9.2.2 Learning a Discrete Distribution with and without Explicit Quantisation

Using sample-based entropy losses, such as what is used in framework 3, unlocks a new capability with our models, that is, enforcing a discrete distribution on the latent space without explicitly using the quantisation operation.

The training pipeline is completely unchanged from the one associated with framework 3, the only difference being that the prior distribution is now a discrete distribution instead of being continuous.

The absence of an explicit quantisation operation means that, during training, the encoder will learn to generate latent spaces that contain a(n approximately) discrete set of values.

Figure 79:
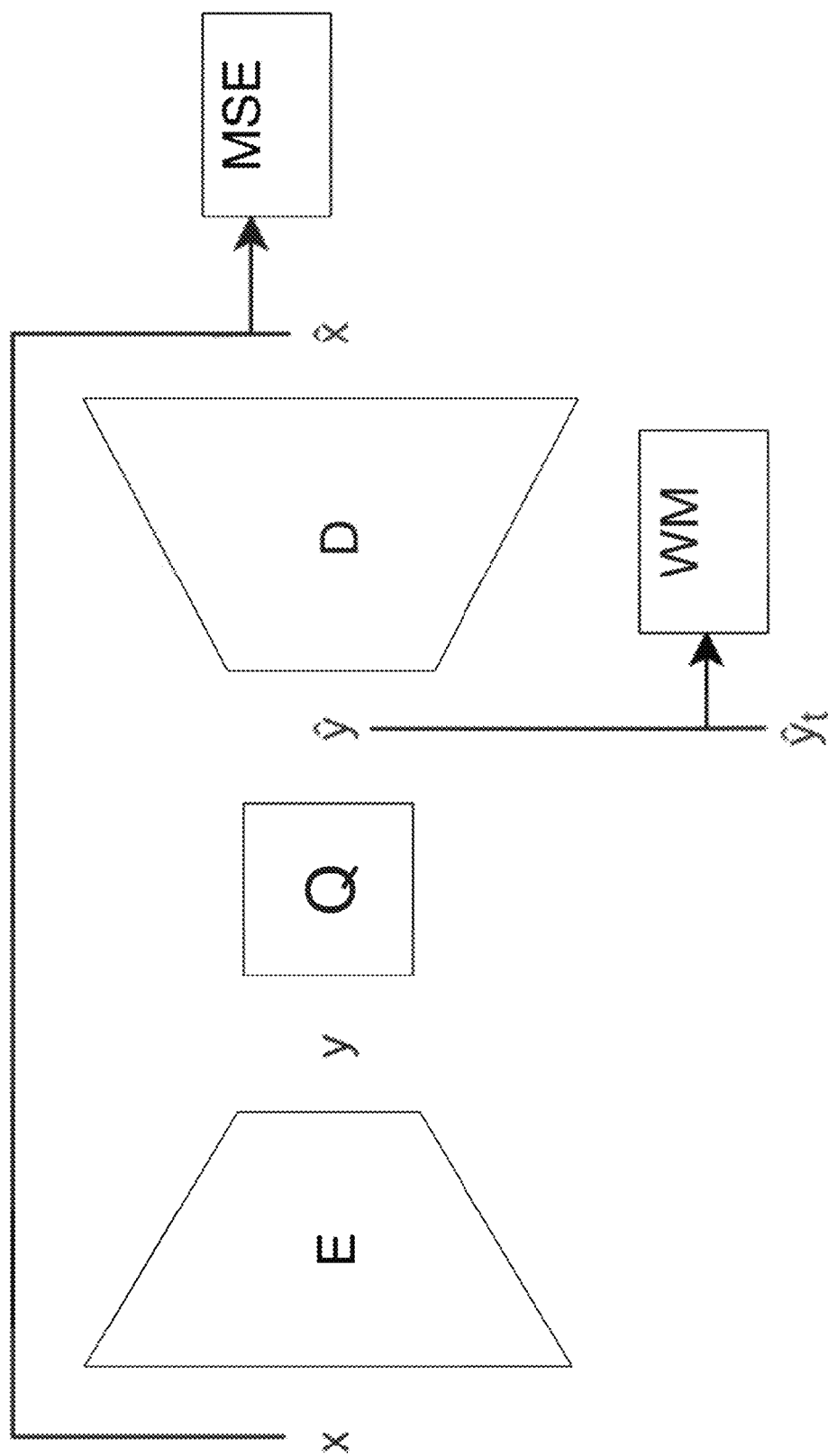
FIG. 79 shows an example of an autoencoder using Wasserstein loss with quantisation. The input image x is processed into a latent space y. The latent space is quantised, and Wasserstein (WM) is applied between this and a target $y_t$ sampled from a discrete distribution.
Figure 80:
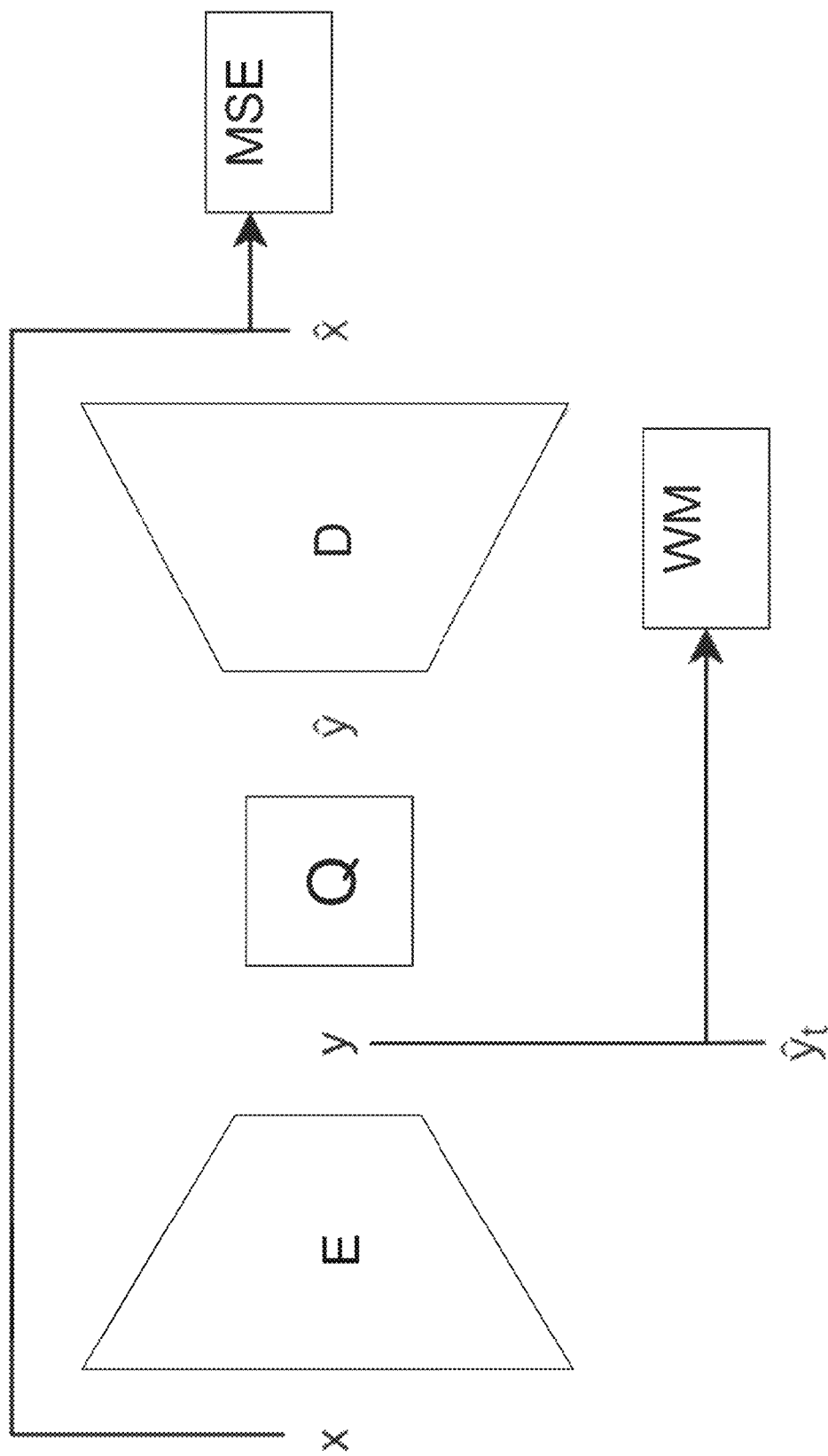
FIG. 80 shows an example of an autoencoder using Wasserstein loss without quantisation. In this method the unquantised y is directly compared against $\hat{y}_t$, which is still sampled from a discrete distribution. Note, during training the quantisation operation Q is not used, but we have to use it at inference time to obtain a strictly discrete latent.

This is a great advantage, as it allows us to apply arithmetic coding on the latent space without it being passed through an operation with ill-defined gradients, such as quantisation is. Additionally, the framework can just as easily be used with an explicit quantisation built-in, where the latent space is trained against a discrete prior after being quantised. The difference between these two schemes is shown in FIGS. 79 and 80.

9.2.3 Incorporating Side-Information by Predicting Probability Values of a Categorical Distribution.

So far, all the entropy models and strategies we have described are fixed at inference time, that is, when we compress any image the entropy distribution will be the same.

An improvement over this fixed entropy approach is to incorporate some side-information in the bitstream: this side-information contains instructions on how to modify the entropy model for that particular image, so that a greater amount of flexibility is allowed, which results in a higher compression performance.

Traditionally, such side-information has been created with hyperprior networks in learnt compression. A hyperprior network predicts the moments of the prior distribution: for instance, it could predict the mean and variance of a normal distribution. This distribution is then used to entropy code and decode the latent space.

Figure 81:
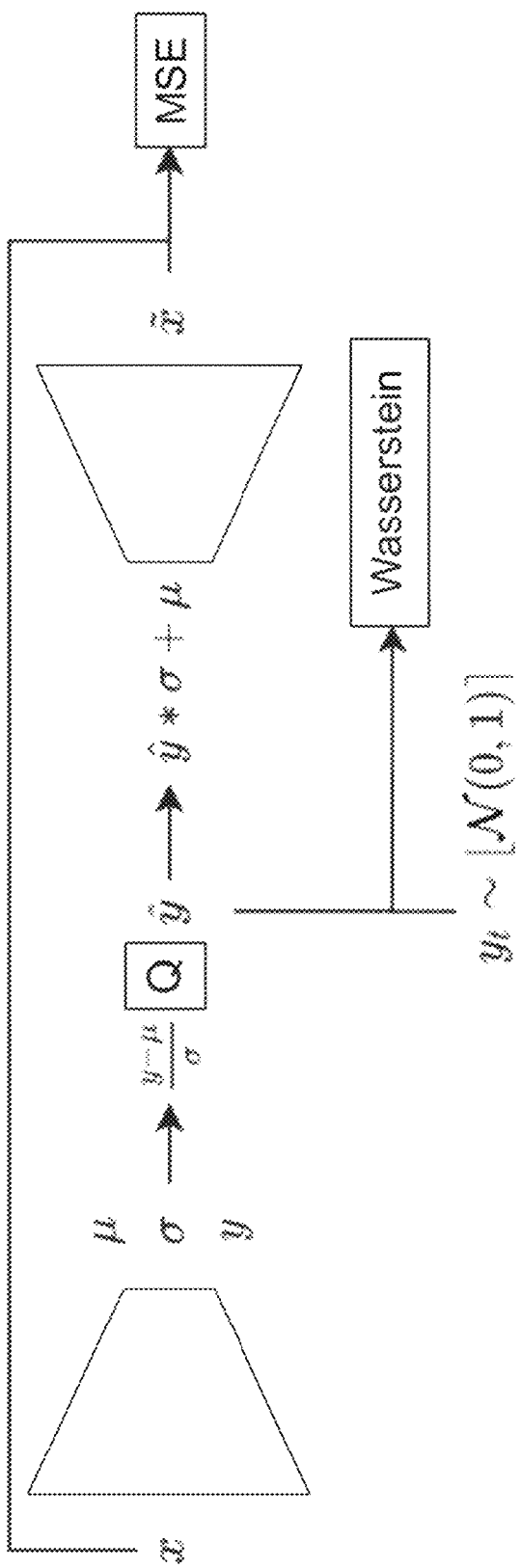
FIG. 81 shows an example model architecture with side-information. The encoder network generates moments μ and σ together with the latent space y: the latent space is then normalised by these moments and trained against a normal prior distribution with mean zero and variance 1. When decoded, the latent space is denormalised using the same mean and variance. Note that the entropy divergence used in this case is Wasserstein, but in practice the pipeline is not limited to that. Additionally, note that the mean and variance are predicted by the encoder itself, but in practice they can also be predicted by a separate hyperprior network.

We provide a similar pipeline for framework 3, illustrated in FIG. 81 by way of example: Additionally, we provide a different strategy. This strategy is based on the premise that for a fixed bitrate there are infinite probability distributions, and thus the objective of our model is to find the distribution that results in the highest reconstruction fidelity for a given bitrate.

Figure 82:
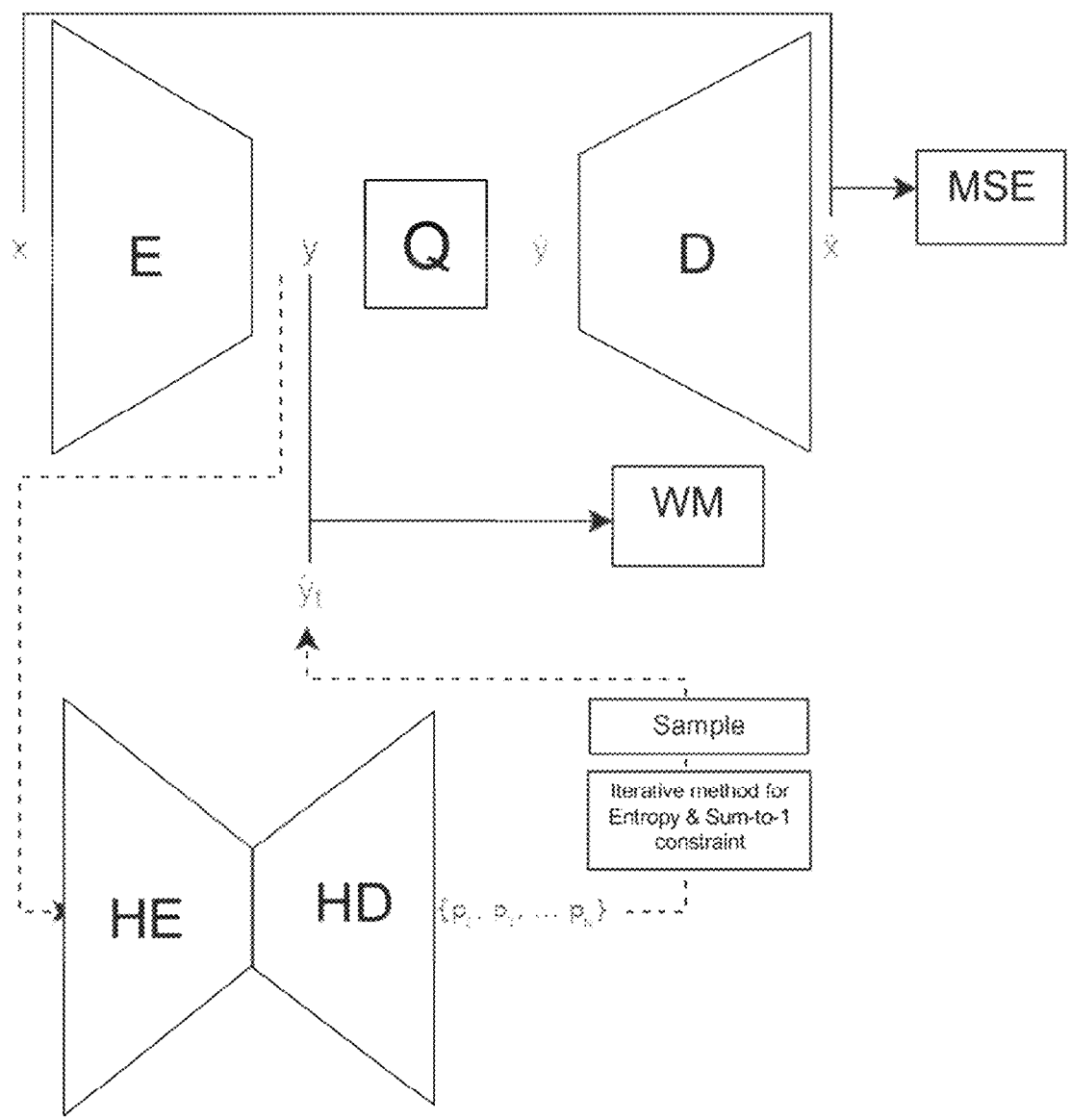
FIG. 82 shows an example of a pipeline using a categorical distribution whose parameters are predicted by a hyperprior network (made up of hyper-encoder HE and hyper-decoder HD). Note that we convert the predicted values to real probabilities with an iterative method, and then use a differentiable sampling strategy to obtain $\hat{y}_t$.

This is achieved by setting the prior distribution to be categorical, i.e. a discrete distribution with a finite set as its support (e.g. the values {0, 1, 2, 3}) and arbitrary probabilities for each value (e.g. {0.1, 0.2, 0.5, 0.2}. These probability values can be either learnt over the training dataset, or predicted by a hyperprior model. This method is illustrated in FIG. 82, by way of example.

Note, in order for gradients to flow back from Wasserstein to the parameters of the hyperprior network (so that the hyperprior can learn to predict good probability values), it is required to back propagate through the Sample operation, but sampling from a categorical distribution is normally not a differentiable operation with respect to the probability values.

Figure 83:
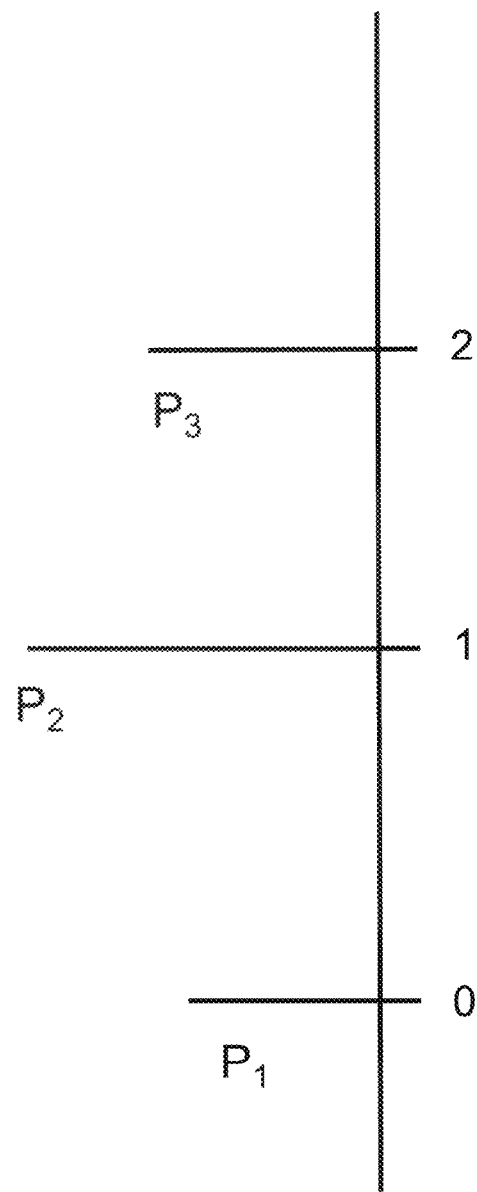
FIG. 83 shows an example PDF of a categorical distribution with support {0, 1, 2}. The length of the bars represents the probability of each value.
Figure 84:
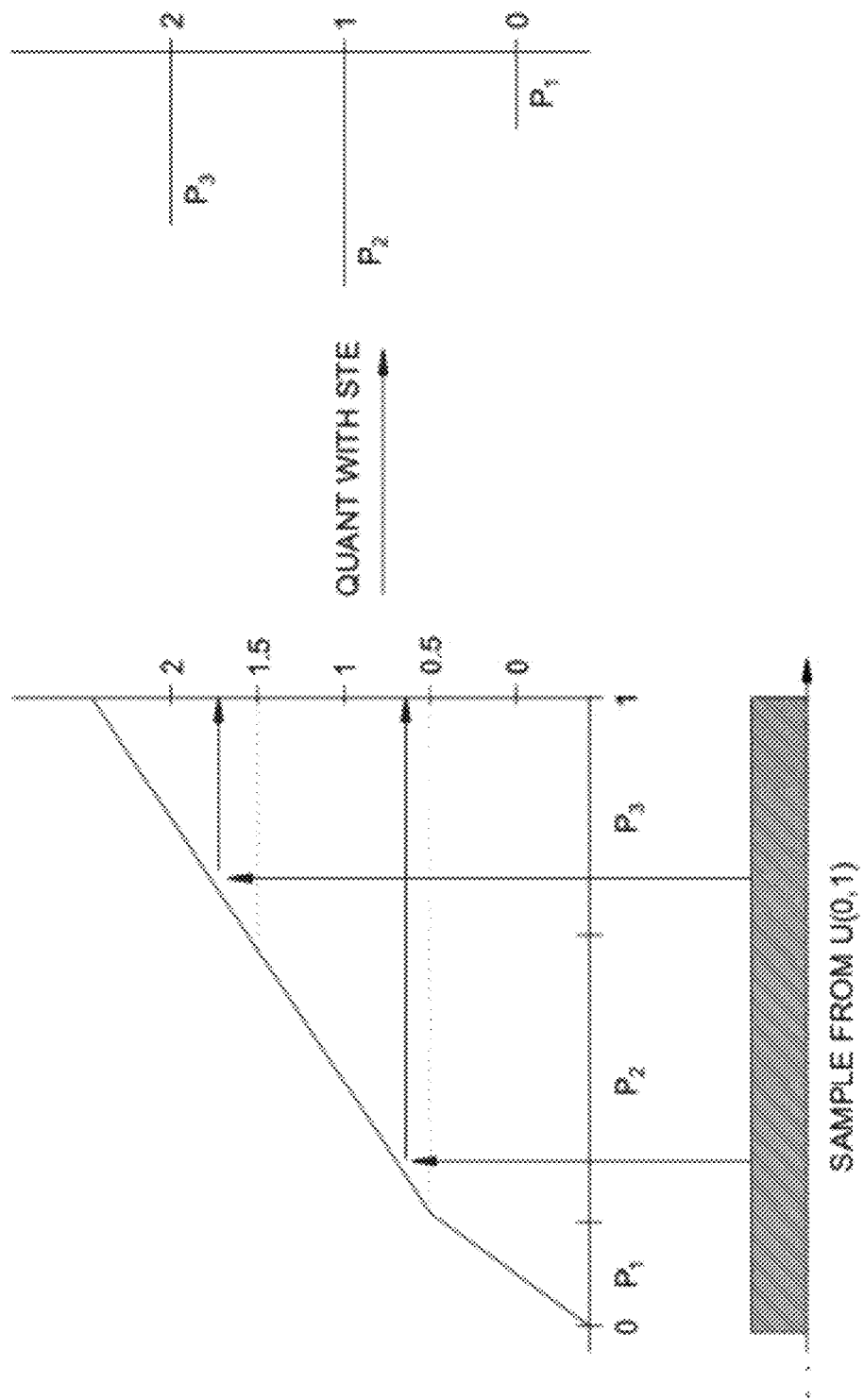
FIG. 84 shows an example of sampling from a categorical distribution while retaining differentiability with respect to the probability values p. Read from bottom-left to right.

We present a differentiable approximation of this operation. The Probability Mass Function (PMF) of a categorical distribution may look as in FIG. 83:

First, we sample from a standard uniform distribution; secondly, we map each sampled value to categorical space with a piecewise linear function, where the width of each segment is dictated by the probability value of the categorical distribution. In order to discretise the values, we finally apply quantisation with a Straight-through Estimator to retain gradients for backpropagation. For an illustration of this process, see the example of FIG. 84.

There is one more hurdle to overcome: since the probability values are predicted by the model, we need a transformation that maps $\mathbb{R}$ to the solution space of the underdetermined system of equations below:

$$\Sigma_i^N p_i = 1$$

$$\Sigma_{i_N} -p_i \log_2(p_i) = B \quad (9.13)$$

Where $p_i$ is the probability of each value in the distribution and B is a target bitrate that is known in advance and can be specified by the user.

We provide a transformation that contains an iterative method. The transformation algorithm is as below:

Algorithm 9.5 Iterative algorithm that produces a vector p that satisfies both conditions in Equation (9.13). The algorithm makes use of a backpropagate( ) method to calculate gradients and an optimizer to update parameters.

Inputs:
Input tensor: $x \in \mathbb{R}^N$
Target Bitrate: B
Step:
p ← Softmax(x)
$H \leftarrow \Sigma_i^N - p_i \log_2(p_i)$
$L \leftarrow \|H - B\|_1$ $\frac{dL}{dx} \leftarrow$ backpropagate (L)

$x \leftarrow$ optimizer.step$\left(x, \frac{dL}{dx}\right)$

Repeat Step until convergence.

9.2.4 Incorporating a Normalising Flow

The final innovation we describe is an additional step on top of framework 3. The step comprises in taking the latent space of the auto-encoder and passing it to a normalising flow. The normalising flow is perfectly invertible, which means that if we take its output and pass it back to the flow, we will obtain the original input without any distortion.

We exploit this property by inserting the normalising flow between the latent and the entropy loss, i.e. we take the latent y, pass it to our normalising flow, obtain an alternative representation w and calculate our divergence measures on w instead of y. The pipeline is illustrated in FIG. 85, by way of example.

The normalising flow becomes part of the compression pipeline, so we only need to send w as bitstream and then reconstruct y from it at decoding time. The training process of such a system is described in Algorithm 9.6.

Figure 85:
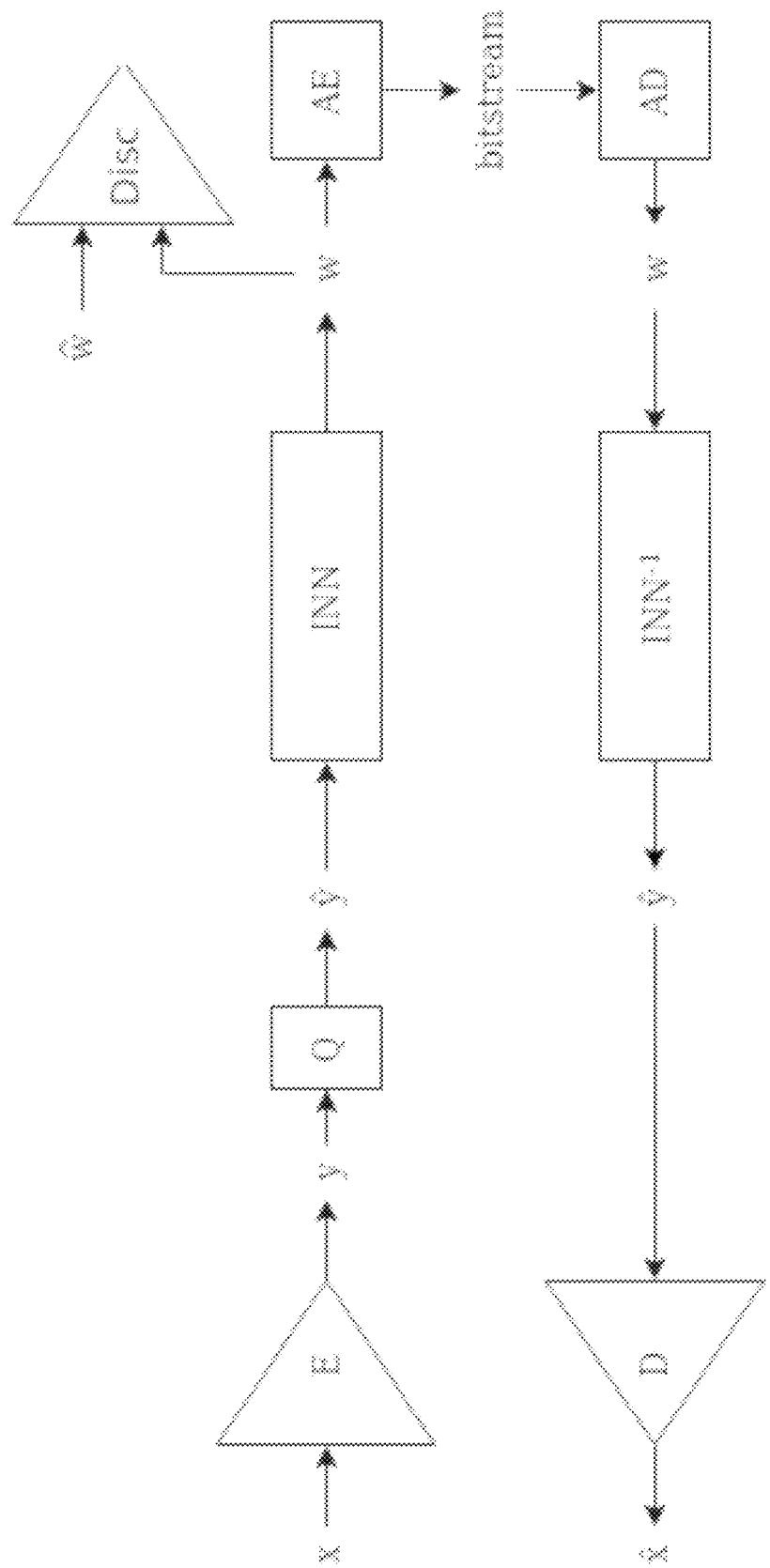
FIG. 85 shows an example of a compression pipeline with INN and AAE setup. An additional latent w is introduced, so that the latent y is decoupled from the entropy loss (joint maximum likelihood and adversarial training with the help of Disc). This pipeline also works with non-adversarial losses such as Wasserstein, where the discriminator network is not needed.

Algorithm 9.6 Training algorithm of compression pipeline from FIG. 85 for example.

Inputs:
Encoder/Generator Network: $f_\theta$
Decoder Network: $g_\phi$
Discriminator Network: $h_\psi$
INN: $j_\omega$
Reconstruction Loss: $L_R$
Generator Loss: $L_g$
Discriminator Loss: $L_d$
INN MLE loss: $L_{INN}$
Input tensor: $x \in \mathbb{R}^{H \times W \times C}$
Prior distribution: P
INN training scale: λ
Training step 1:
$y \leftarrow f_\theta(x)$
$w \leftarrow j_\omega(y)$
$\hat{x} \leftarrow g_\phi(y)$
$L \leftarrow L_R(x, \hat{x}) + \lambda L_{INN}(w)$ $\frac{dL}{d\theta}, \frac{dL}{d\phi}, \frac{dL}{d\omega} \leftarrow$ backpropagate (L)

$\theta \leftarrow$ optimizer.step$\left(\theta, \frac{dL}{d\theta}\right)$ $\phi \leftarrow$ optimizer.step$\left(\phi, \frac{dL}{d\phi}\right)$ $\omega \leftarrow$ optimizer.step$\left(\omega, \frac{dL}{d\omega}\right)$ Algorithm 9.6 Training algorithm of compression pipeline from FIG. 85 for example.

Training step 2 (adversarial):
p~P
$s_r \leftarrow h_\psi(p)$
$s_f \leftarrow h_\psi(w)$
$L_d \leftarrow \lambda L_d(s_r, s_f)$
$L_g \leftarrow \lambda L_g(s_r, s_f)$ $\frac{dL}{d\theta} \leftarrow$ backpropagate $(L_g)$ $\frac{dL}{d\psi} \leftarrow$ backpropagate $(L_d)$ $\theta \leftarrow$ optimizer.step$\left(\frac{dL}{d\theta}\right)$ $\psi \leftarrow$ optimizer.step$\left(\frac{dL}{d\psi}\right)$ Repeat Training steps 1 and 2 for i iterations. If the scale λ is zero, then the INN is trained purely with adversarial or Wasserstein training. If the scale is greater than zero, the training is joint adversarial and MLE.

Using a normalising flow to further process the latent space allows y to retain spatial correlation information, while making w more similar to the prior distribution.

9.3 Concepts

Below we enumerate the concepts we described.

First, we identify three image and video compression pipelines.

1. The first one comprises a one-step joint training process where the model is trained to minimise reconstruction distortion and divergence between its latent space and a prior distribution with analytical form.
2. The second framework comprises in a two-stage adversarial training process, where the first stage comprises distortion minimisation, and the second stage comprises entropy minimisation in an adversarial manner. This allows distributions without an analytical form to be used as prior.
3. The third framework is a two-stage process without adversarial training. Instead of relying on a GAN setup, this framework makes use of alternative sample-based divergence measures such as MMD or Wasserstein distances.

Furthermore, we identify two novel compression pipelines.

4. A pipeline that incorporates side-information in the form of moments (e.g. mean and variance) of the prior distribution, predicted at encoding time.
5. A pipeline that incorporates side-information in the form of probability values of a categorical prior distribution.

Finally, we identify two methods associated with concept 5.

6. A method for sampling from a categorical distribution in a differentiable manner, by exploiting a piecewise linear mapping on a uniformly distributed sample.
7. A transformation that maps arbitrary numbers predicted by a neural network to the solution space of a system of equations, so that the resulting numbers (probabilities) sum to one and their entropy is a predetermined value.

8. The addition of an INN to the general framework to decouple the latent space from the entropy model; this addition is valid for both adversarially-trained autoencoders, and non-adversarial pipelines.

10. Asymmetric Routing Networks for Neural Network Inference Speedup

10.1 Introduction

Multi-task learning (MTL) with neural networks leverages commonalities in tasks to improve performance, but often suffers from task interference which reduces the benefits of transfer. To address this issue we introduce the routing network paradigm, a novel neural network and training algorithm. A routing network is a kind of self-organizing neural network comprising two components: a router and a set of one or more function blocks. A function block may be any neural network—for example a fully-connected or a convolutional layer. Given an input the router makes a routing decision, choosing a function block to apply and passing the output back to the router recursively, terminating when a fixed recursion depth is reached. In this way the routing network dynamically composes different function blocks for each input.

The introduction will cover the problem setting, the intuition behind the solution, and an overview of how it is implemented.

10.1.1 The Problem Setting

A general challenge of the neural networks is that they are computationally heavy and have a significant memory footprint. Therefore, they can not yet run in real-time on most consumer devices (edge devices). This execution-complexity remains a considerable challenge for the AI-based Compression pipeline, amplified by its strict real-time requirements of 33 ms per decoder pass. Note that we used the word "decoder" and not the "entire algorithm" in the last sentence. Compression can use asymmetric approaches in which encoding the data does not come with "too strict" time requirements, but decoding the data comes with harsh real-time restrictions. For instance, a 30 fps movie requires decoding times below 33 ms; a 60 fps movie requires decoding times below 16.3 ms.

Why are neural networks so slow to execute? There are two primary factors. First, neural networks require a tremendous amount of computations, often in the billions, for an inference pass. They have many (floating-point) operations (FLOPs) to execute; and are bottlenecked to the following fps:

$$\max(\text{algorithm} - \textit{fps}) = \frac{\text{AVAILABLE FLOPS}}{\text{FLOPS PER INFERENCE PASS}} \quad (10.1)$$

Figure 86:
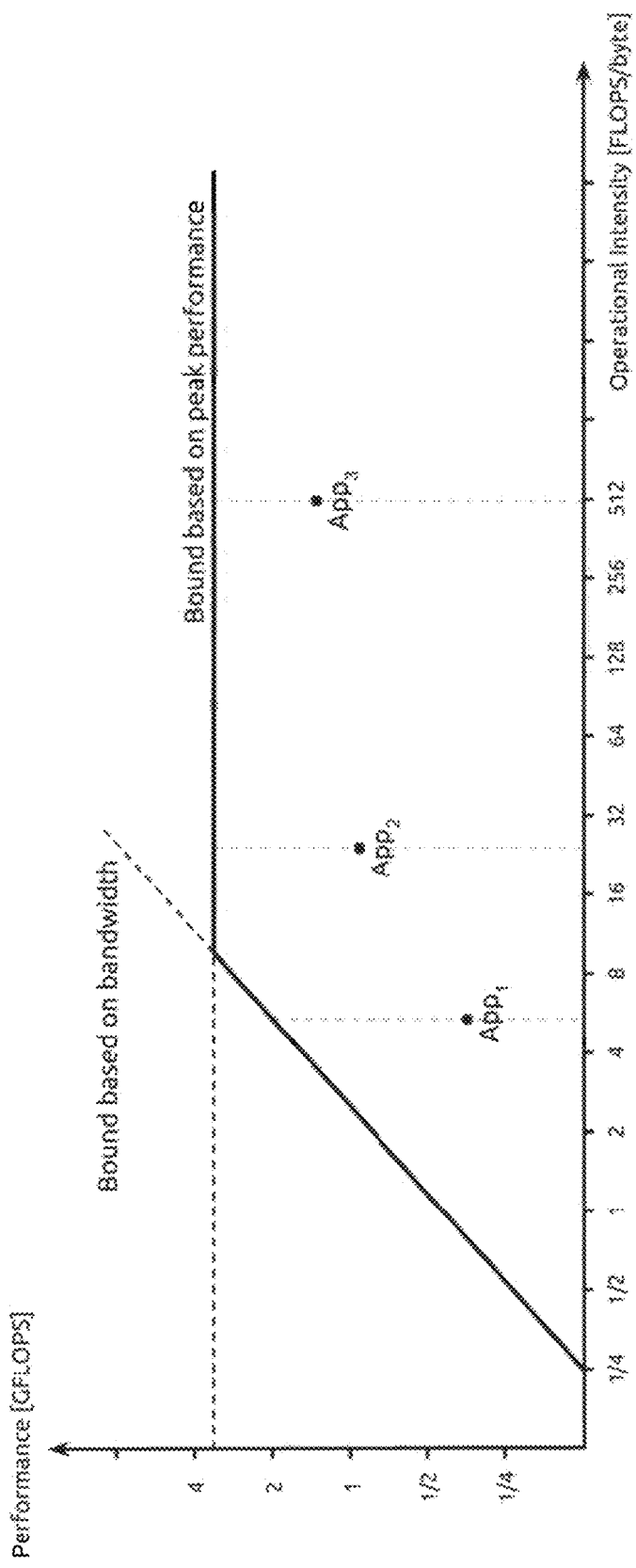
FIG. 86 shows a roofline model showing a trade off between FLOPs and Memory.

Second, neural networks have a tremendous memory footprint and movement. This means that before data can be used for calculations, it has to be moved from one memory location to another. There is a limit to how much memory can be transferred per second, given by the memory-speed. Thus, a neural network fps is either constrained by its FLOP-limit or by its memory-limit (more often the case). The roofline model in FIG. 86 visualises this behaviour.

It is necessary to understand that the runtime issue will not disappear any time soon. While neural engines, specific chips designed for neural network execution-only, are becoming more abundant, they only increase the compute power. With more computing power, we can execute more (floating-point) operations (FLOPs) per second. However, the memory footprint issue remains, and there are not so many advances made on this topic recently.

10.1.2 the Solution—Intuition

It is well known in the Deep Learning community that we can build vastly different looking neural networks/architectures for a similar performance. However, all this achieves is to trade off memory footprint versus memory movement versus flops. For instance, for the same performance, we can build:

- a huge-FLOP model with little memory movement and memory footprint→Use small kernels, little downsampling, low width, high depth, a limited number of skip connections.
- a high memory footprint model with low FLOPs and little memory movement→Use large kernels, a lot of downsampling, high width, abitrary depth, a limited number of skip connections.
- a large memory movement model with low FLOPs and little memory footprint→Use small kernels, little downsampling, low width, high depth, a lot of skip connections.

Neural Network Architecture Search (NAS) helps to find a good trade-off between these three properties. However, this does not help with runtime because we must reduce FLOPS, memory footprint and memory movement for a meaningful runtime reduction. So, what else can we do to get a runtime reduction? The answer is to use fewer operations of all types but use these operations more efficiently.

An example: Let's assume we train a neural network with a generative loss for compression. If we have a dataset that comprises faces and cars, we could train one generalised network for compression; or we could train two networks, one for the faces and one for cars. If we train two networks, we will see that our compression performance will be better than if we train only one network. Why is this the case? It happens because the available network operations specialise given their input data and become more efficient. Essentially, we re-formulated the problem of compressing "all images/videos" into the multi-class dataset problem of compressing numerous different classes of images/videos. If we go to the limit and train one network per class, we will get the maximum efficiency per operation in our network for its given class.

10.1.3 the Solution—Routing Networks

The specialisation described above does not help us reduce runtime due to the necessity of having N different neural networks for N data classes. If we have more neural networks, the memory footprint increases because of the network parameterisations/weights.

Figure 87:
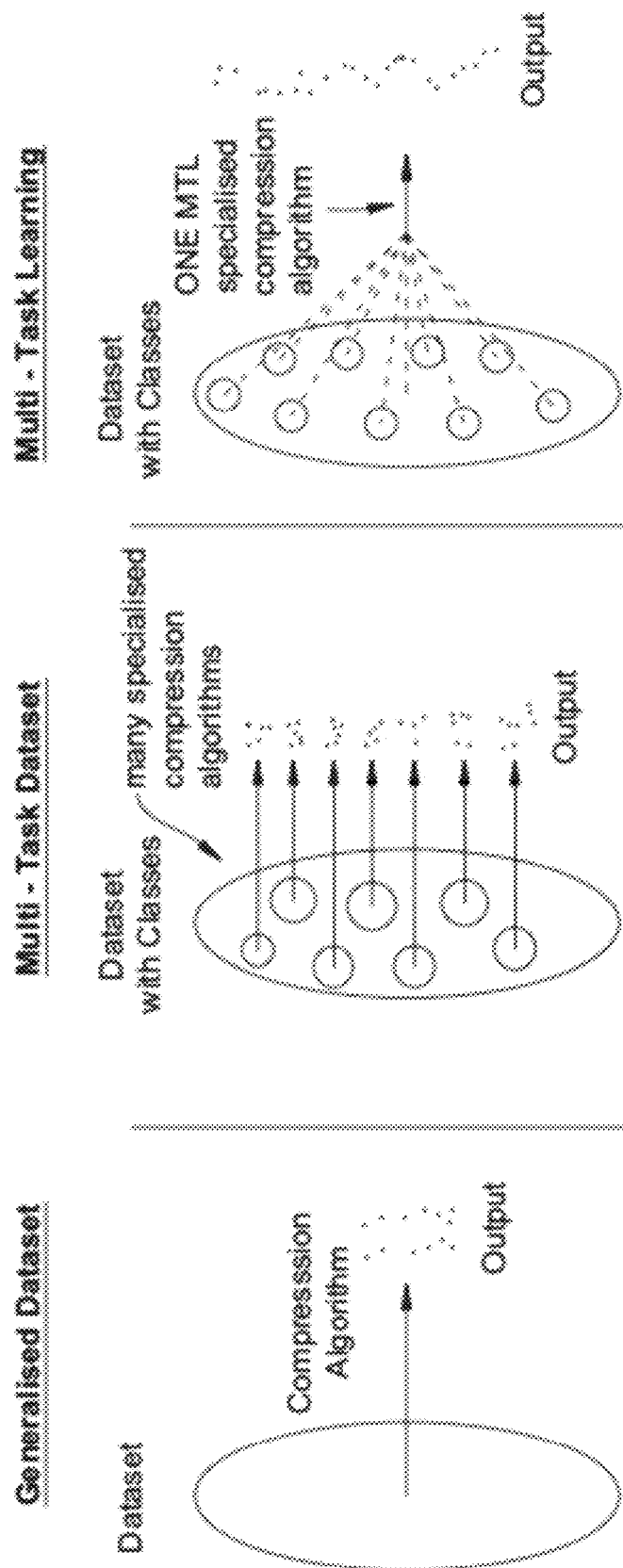
FIG. 87 shows an example of a generalised algorithm vs multi-class multialgorithm vs MTL.

The real solution is to realise that even if we have multiple networks for multiple data classes, there is a high likelihood that "most" operations will be the same—only a few operations will actually specialise. Thus, instead of re-formulating the problem as a multi-class dataset problem, we can re-formulate the issue as a multi-task learning (MLT) problem. Therefore, our new tasks become to find one algorithm that can learn multiple tasks instead of multiple algorithms for multiple tasks. FIG. 87 shows an example of the differences between these interpretations.

This problem interpretation opens up the doors to use techniques from the MTL domain for AI-based Compression. Specifically, we are interested in using Routing Networks for our pipeline. Routing networks are neural networks that have multiple filter options per layer, and during inference, the data itself decides which path it wants to take.

10.2 Routing Networks

A routing network [2] is a neural network for which the data flow through the network is not fixed but is routed. Let's assume we have a neural network that is composed of multiple layers. As a neural network is simply a chronological concatenation of numerous functions, we can write these layers as functions $f$ and the network as $f \circ f \circ \ldots \circ f \circ f$. We call the first layer $f_{X,1}$, the second layer $f_{X,2}$ and the n'th layer $f_{X,N}$. A normal neural network has a fixed function that is executed per layer. However, a routing network has multiple options we can pick from each layer. Let's assume there are M potential options to pick from in each layer. We call option $m \in M$ in layer $n \in N$ function $f_{m,n}$.

Figure 88:
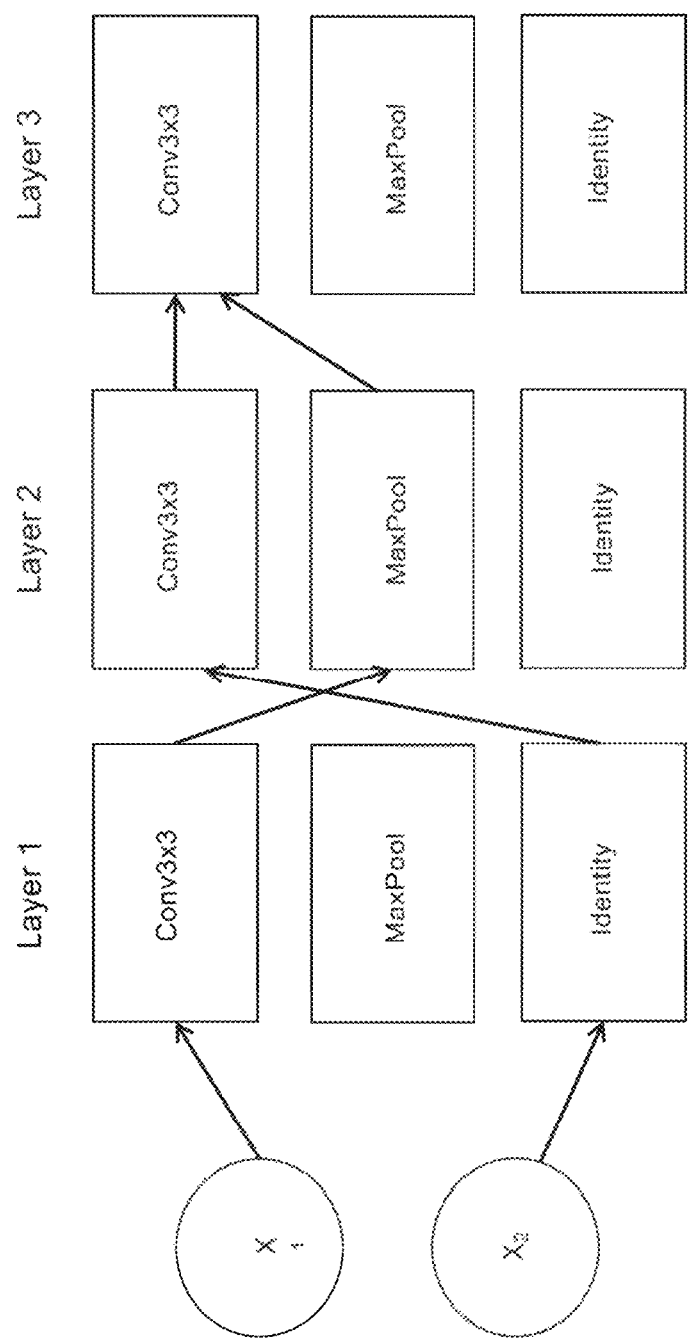
FIG. 88 shows an example in which in a routing network, different inputs can travel different routes through the network.

An input to a routing network flows through all layers of the network $\{f_{x_1,1}, \ldots, f_{x_n,N}\}$. Nevertheless, at each layer, it has to pick one specific function from the function filter bank $\rightarrow x_i \in M$. Thus, various inputs could travel different routes through a fixed routing network. For instance, input one could take the path $\{f_{3,1}, f_{1,2}, f_{4,3}, \ldots, f_{3,N}\}$; whereas input two could take the path $\{f_{7,1}, f_{8,2}, f_{4,3}, \ldots, f_{2,N}\}$. FIG. 88 illustrates this behaviour, by way of example.

Figure 89:
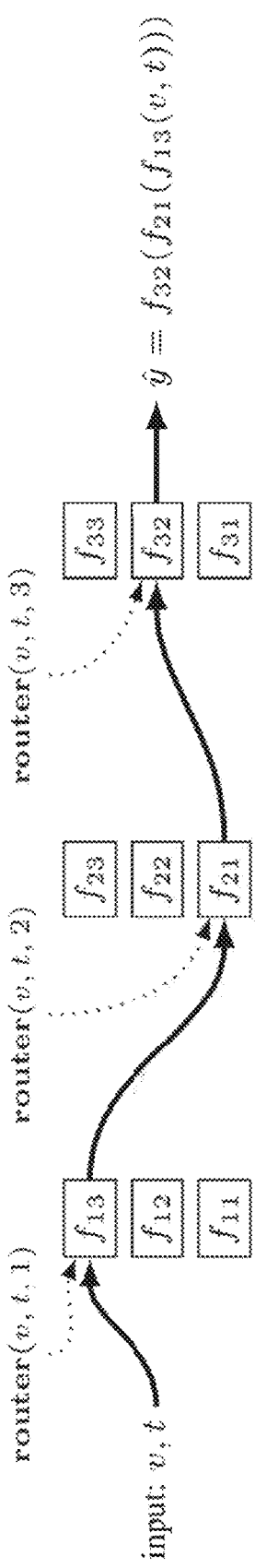
FIG. 89 shows an example data flow of a routing network.
Figure 93:
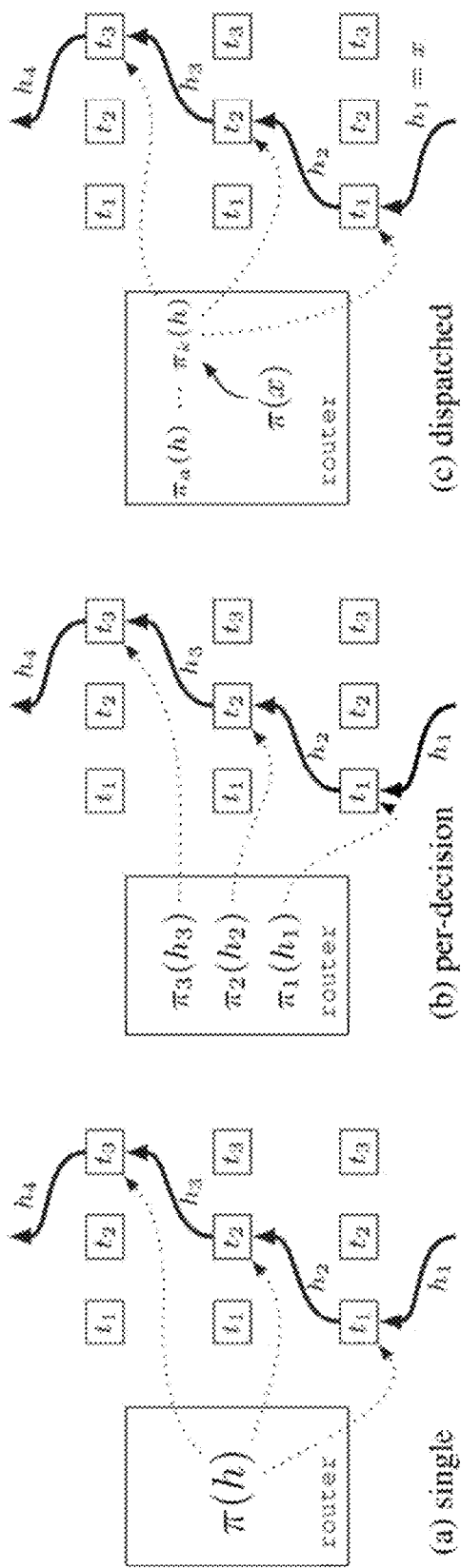
FIG. 93 shows an example of numerous ways of designing a routing network.

In a routing network, the router, or Routing Module, decides the path through the network. There are numerous options for designing a router, a global, a local or a semi-local one (see FIG. 93 for example). For the sake of simplicity, we assume a local routing module. Let's assume we have multiple local routers, input v, and (optional) meta information t. Then FIG. 89 visualises the flow of a typical routing network, by way of example.

Why does a routing network help (in general): A routing network lets us scale the networks total memory footprint through much bigger layers, but during inference, we pick only a subset of the values, thus having a small memory footprint per inference pass. An example: Assume our weight tensor is of shape channels-in=192, channels-out=192, filter-height=5, filter-width=5; our total amount of parameters are 192*192*5*5=921, 600. Assume our routing network, for the same layer, has 100 potential weight tensors of shape channels-in=48, channels-out=48, filter-height=5, filter-width=5. Our total number of parameters are 100*48*48*5*5=5,760, 000. But our parameters for one specific function option in this layer is merely 48*48*5*5=57, 600. Overall, we get more flexibility and more parameters, leading to better operation specialisation. But we also get lower runtime, less parameter, and more specialisation per route in the routing network.

Figure 90:
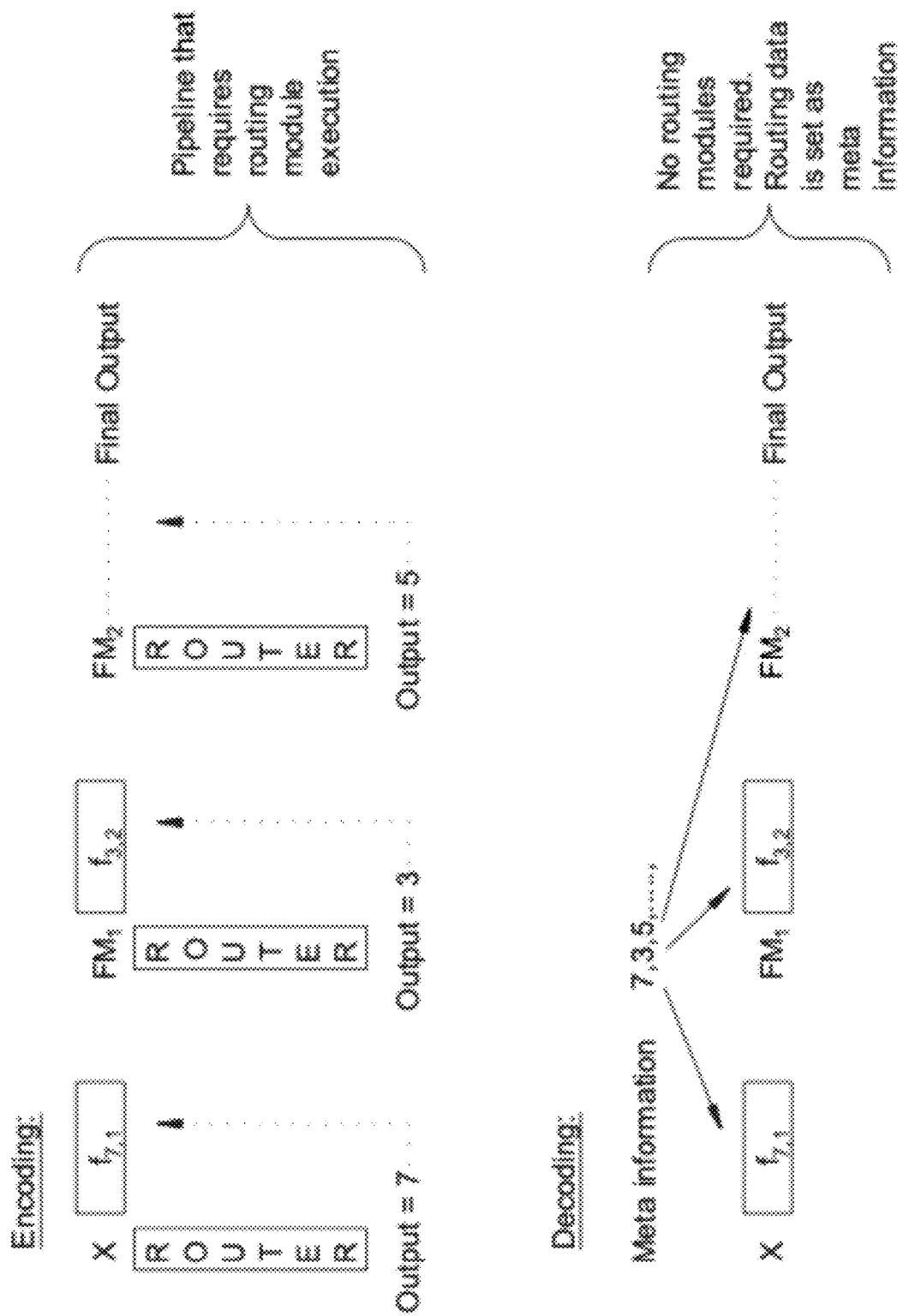
FIG. 90 shows an example of an asymmetric routing network.

Why does a routing network help (AI-based Compression): One could argue that routing networks just shifts the complexity away from the layers into the routing network; e.g. we get less memory/flops in the layer but additional memory/flops in the routing module. While this might, or might not, be true, it is irrelevant for AI-based Compression. As previously mentioned, in compression, we have a considerable time budget for encoding but a minimal time budget for decoding. Thus, we can use asymmetric routing networks to generate the routing information during encoding and send this data in the bitstream as metainformation. Therefore, we would not require the routing network's execution during decoding but instead use the provided meta information. We call this Asymmetric Routing Networks, and the concept is shown in FIG. 90, by way of example. Ultimately, this increases our encoding runtime (irrelevant) but decreases our decoding runtime (essential).

While it might be obvious, note that routing networks come with an explosion of combinatorial possibilities for the final network. Let's assume we have an eight-layer network $f = f_{m,1} \circ f_{m,1} \circ \ldots \circ f_{m,1}$, and each layer has 16 possible choices; $M = \{1, \ldots, 16\}$. Then, the final network $f$ has 4 billion possible routes ($M^N = 16^8 = 2^{4 \times 8} = 4,294, 967,296$).

Thus, routing networks' power comes from its combinatorical flexibility and from each route of the final network specialising in a certain input class.

Figure 94:
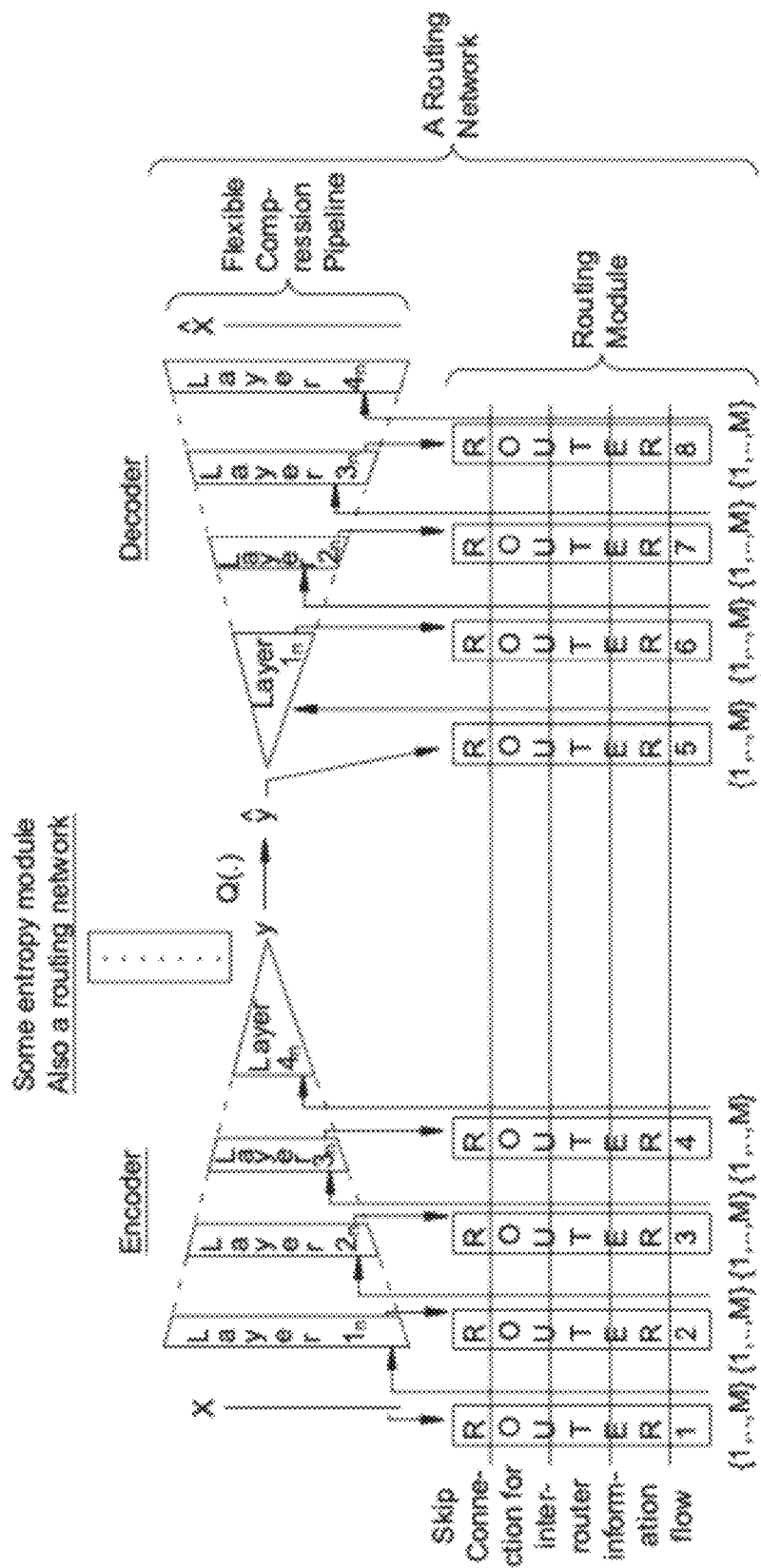
FIG. 94 shows an example illustration of using Routing Networks as the AI-based Compression pipeline.

For a more realistic illustration of how to use routing networks as the AI-based Compression pipeline, see FIG. 94, by way of example.

10.2.1 Training the Routing Network

Figure 91:
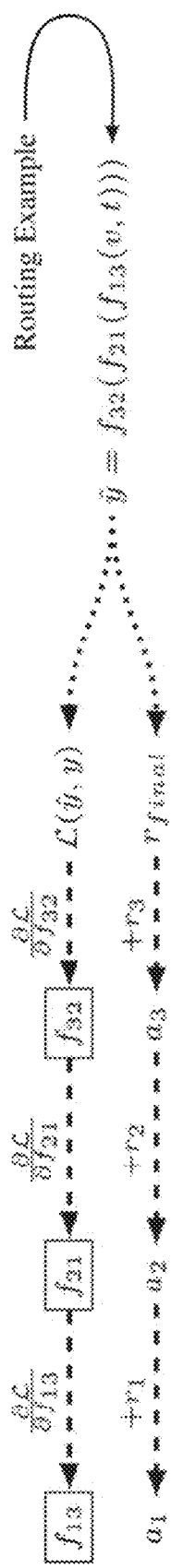
FIG. 91 shows an example of training an (asymmetric) routing network.

When training a routing network, there is one familiar and one new part. The familiar part is the network training through stochastic gradient descent: we get the gradients from a loss function and back propagate them through all layers using the chain rule. Note that while the layers can change with each iteration, this training approach still works. FIG. 91 shows an example of the standard neural network training in the top path.

The more interesting question is, how do we train the routing module? The difficulty from training the router is that the ideal output is a discrete number m from our discrete set of options M. Thus, training the router is no longer in the domain of gradient descent training but requires reinforcement learning (RL) methods. Reinforcement learning faces the same problem of selecting an "action policy" from a discrete set of options given a reward function. FIG. 91 shows an example of a standard RL training approach in the bottom path.

Finally, to build up some intuition about routing networks, the two training stages resemble two different trade-offs. Routing networks always have the exploitation versus exploration challenge. While the standard neural network resembles the exploitation part, the routing module choice resembles the exploration part. The challenge of training routing networks is to train both parts of the network in parallel.

10.2.2 Training the Router

Following is a short overview of the different types of RL approaches to training the routing module. In general, all possible RL methods can be used, with the most popular ones being:

1. Continuous Relaxation: Originally, we want the routing network to output a discrete choice. One approach is to relax this assumption during training and have the router output a vector of probabilities over the choices $P_n$. We can write the next layer as a combination of all possible choices with weight factors, as follows:

$$P_n = \text{Router}_n \quad (10.2)$$

$$\text{Layer}_n = \sum_{i=0}^{M} (P_n(i) \cdot \text{Layer}_{i,n})$$

Using a continuous relaxation of the discrete space allows us to use gradient descent training methods for training the router. Note that in inference, we replace the continuous relaxation with a discrete choice using the maximum function. For instance:

$$P_n = \text{Router}_n$$

$$\text{Layer}_n = \text{Layer}_{\max(P_n),n} \quad (10.3)$$

2. Discrete k-best choices: We can use all kinds of reinforcement learning approaches on either the best choice or the k-best choices of the router with k∈ {1, . . . , M} (these are also called higher cardinality approaches). Amongst others, we can use: deep reinforcement learning, Markov decision process, Dynamic programming, Monte Carlo methods, Temporal Difference algorithms, model free RL, model-based RL, Q-learning, SARSA, SARSA, DQN, DDPG, A3C, TRPO, PPO, TD3, SAC.

Finally, it is essential to complement the training approach for optimising the loss/reward function for the routing module with a diversity loss. The diversity loss has to force the routing network to produce diverse outputs (e.g. routes). Routing networks tend to have much stronger exploitation than exploration, and if there is no additional loss forcing more exploration, they often collapse. In a collapsed routing network, the routing module only produces one route through the network; thus, losing out on its potential flexibility. For more information, see reference [1].

10.2.3 Routing Networks and NAS

This is a short paragraph to link together some of our IP+concepts. Routing Networks are, in fact, a generalisation of Network Architecture Search (NAS). In a more broad sense, they generalise the concepts of NAS, Reinforcement Learning and One-shot Learning.

While NAS is about learning an efficient, fixed architecture for a neural network; routing networks are about learning multiple, efficient, flexible architectures for a neural network.

Thus, all the techniques used in NAS to make the network architecture selection more powerful, e.g. diversity in the layers, kernel size, operations and others, can also be used for routing networks. NAS is simple routing networks without routers: NAS+routing module+RL=Routing Networks. This is important as NAS and RL are their own gigantic domain of research. But we want to identify their methods for potentially training our routing network.

10.3 the Routing Module

Now that we know the concept of Routing Networks, we must look at the Routing Module/Router. The job of the Router is to output data that will lead to a routing path decision. This could either be in the form of a discrete choice {1, . . . , M} or a probability vector over the choices {p(m=1), . . . , p(m=M)}. Afterwards, we need some strategy to pick a path/route given this output, as described in section 2.2.

10.3.1 the Architecture of the Router

There is no a priori restriction on what the Router must look like. For instance, it could be feature-based, neural network-based, or anything else, as would be clear to the skilled person.

Feature-based Routers are approaches that make a decision on classical computer vision features. For instance, we could use image statistics, histograms, gradient magnitude information, patch-wise features, feature-point extraction data such as FAST/SIFT/Others, Edge and/or Corners and/or Ridges detection, and many others. Feature-based approaches fix an image/video feature extraction method and then build a learning-based strategy (decision tree, regression, kernel PCA, support vector machine, or others) on top of this information. The benefits from these approaches are that the feature-extraction reduces the problem's dimensionality, from image space to feature space, and thus, leads to a massive Router runtime acceleration.

Additionally, these approaches are usually resolution-independent and do not worry about different input data height and width.

Neural network-based Routers make a decision on deep-features and use the power of deep learning to make the Router a universal function approximator. The benefits are that it makes the Router more potent than classical feature-based strategies and that we are not using a priori information; everything is learned end-to-end. The drawback is that we require the output to have a fixed form, and for this case, standard neural network architectures are not resolution-independent. We address this issue in the next section.

Some more advanced insights: The encoder and decoder module in the AI-based Compression pipeline look like inverse functions of each other. E.g. it seems as if the decoder has to learn the inverse mapping of the encoder. Interestingly, this relationship appears to hold true for latent regions with high-probability mass, which means that the encoder and decoder's Jacobian are orthogonal at these points. If we use routing networks and make an encoder layer flexible, we need to pick the correct decoding layer to complement the encoding layer change to keep the orthogonality. Thus, there should be information flow between all routing modules, as the routing choice of a decoding layer should be influenced by the routing choice of the corresponding encoding layer. To facilitate optimal information sharing, local Routers have numerous skip connections between each other, as visualised in FIG. 94 for example (see the horizontal lines).

10.3.2 Resolution Independent Neural Network Routers

There are multiple ways of making the Router resolution-independent while still using neural networks:

Adaptive Pooling: We can use an adaptive pooling layer with fixed output, e.g. [1, 12, 20, 20], that pools all input shape into the given output shape. Using adaptive pooling, e.g. AdaptiveMaxPooling, AdaptiveAvgPooling and others, is common knowledge in the Deep Learning field.

Figure 92:
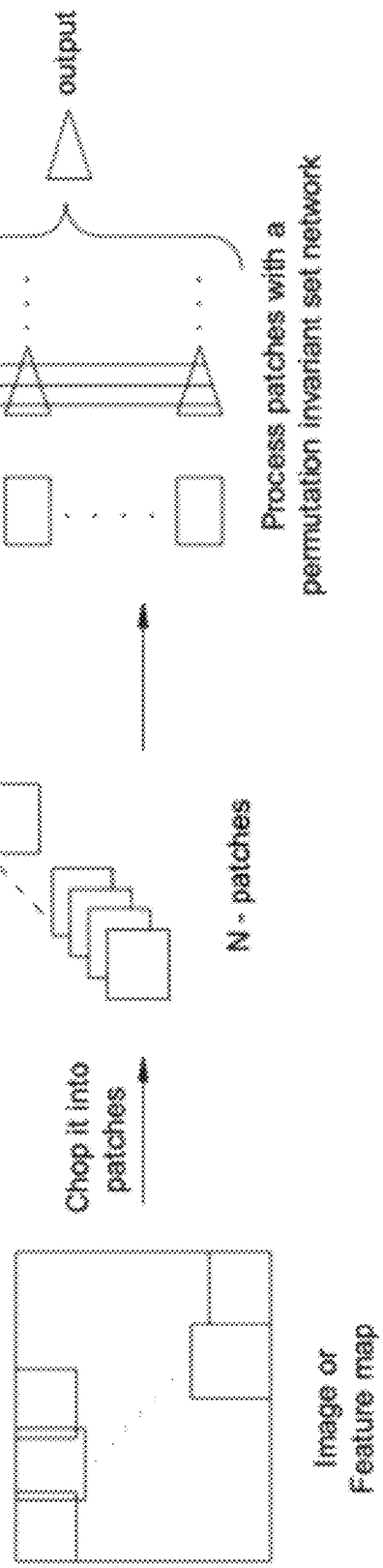
FIG. 92 shows an example of using permutation invariant set networks as routing modules to guarantee size independence when using neural networks as Routers.

Permutation Invariant Set Networks: Originally, Set Networks work by processing an arbitrary number of images with (optional) skip connections and then having a pooling function as the output of these networks (see section "Permutation Invariant Set Networks" for example). For the Router, we can chop the input data into overlapping or non-overlapping blocks and then use a permutation Invariant Set Network. Why does this guarantee equal shape outputs for arbitrary input shapes?Well, we fix the patch size and thus have a fixed shape for the set network. If we have a bigger input shape, we simply get more patches of the same shape. FIG. 92 illustrates an example of using permutation invariant set networks as routing modules to guarantee size-independence when using neural networks as Routers.

10.3.3 Training the Router

It is essential to give special attention to the router training to get the desired outcome. Routing networks, in general, have the challenge of balancing exploration versus exploitation. Specifically, it is a problem for the Router. If we train the Routing Network AI-based Compression pipeline naively, the Router will collapse and produce only one output for any input. Aka. the Router will 100% favour exploitation over exploration, and once it is stuck in a local minimum, it never recovers.

We can get around the collapse of the Router by facilitating exploration with a "diversity loss". Basically, a diversity loss is an additional loss term that penalises the Router if it makes the same choice (selecting the same path) too many times. There are two choices for a diversity loss:

- Temporal Diversity Loss: We keep track of past routing module decision and penalise the temporal data/time series data for more diversity. Meaning, the time-series data of the routing module has to fit a particular distribution, for instance, the uniform distribution. We can use any density matching method to enforce this constraint.
- Batch Diversity Loss: We can train over large-mini batches and enforce routing-choice diversity over the mini-batch. Meaning, the mini-batch routing choices have to fit a particular distribution, for instance, the uniform distribution. We can use any density matching method to enforce this constraint.

10.4 Concepts

1. Use of routing networks for AI-based Compression.
2. Routing Networks give performance and runtime improvement to AI-based Compression through network specialisation.
3. Use of asymmetric routing networks for asymmetric computational loads. This is especially useful for AI-based Compression, but it is more general than this. In fact, the concept is valid for any asymmetric tasks.
4. Use of various training methods for asymmetric routing methods.
5. Routing methods are a generalisation of NAS+RL, thereby including the techniques from these domains for routing networks.
6. Reinterpreting AI-based Compression as a multi-task learning (MTL) problem; thereby, opening the door to network specialisation approaches. This includes the compression network architecture but is not limited to it. For instance, it also includes the loss function (e.g. various tasks require specialised loss functions).
7. Use of the routing module data in the bitstream for other postprocessing algorithms. The routing information contains information about the class of compressed data. Thus, it can be used, amongst others for (non-exclusive): image-search, video-search, image/video filter selection, image/video quality control, classification, and other tasks.
8. Information flow between the Routing Module is important when applying the concept of routing networks to the AI-based Compression pipeline due to its orthogonal property.
9. Permutation invariant set networks+chopping up the latent space is suitable for resolution-independent Router architectures.
10. Different ways a Routing Module's architecture can look like (feature-based, neural network based, neural network based+pooling, set networks).
11. Use of a diversity loss to train the Router.

10.5 Permutation Invariant Set Networks 10.5.1 Neural Networks Over Sets

Before diving into the individual sections on lens distortion and intrinsic calibration, we will first address how a learning based approach is possible over flexible sets of input data. After all, we want to enable the user to select an arbitrary amount of images for the calibration process, thus giving him a trade-off between performance vs accuracy.

Permutation Invariance

Given more than one input for a naive network h(•), the order of the inputs does matter for the outcome. For instance, $h(x_1, x_2, \ldots, x_n) \# h(x_n, x_{n-1}, \ldots, x_1)$. This becomes a challenge when we try to apply deep learning to the problem of camera calibration for a collection of images. In essence, we want a network that considers the input images as a set, independent of their order. This property is called permutation invariance.

There exist a number of options one can use, including sorting the input, training an RNN with the desired property, or using a network structure that is symmetric with respect to the input. In fact, one may argue that using a symmetric network is theoretically the preferred option as it naturally ensures permutation invariance. It does not require additional augmentation and does not rely on any sorting heuristics. We can get a symmetric network $h_s(\bullet)$ by sharing weights across all inputs that are being processed: $h_s(x_1, x_2, \ldots, x_n) = h_s(x_n, x_{n-1}, \ldots, x_1)$.

Cardinality Invariance

However, such a architecture can still only process a fixed amount of input images. We need a network that is agnostic to the amount of input data, thus is invariant to the cardinality of the input data set. For this, we need to accumulate the output of the shared networks via a symmetric accumulation operator $\oplus$, for instance element-wise mean, element-wise maximum or summation. Afterwards, we can (optionally) process the accumulated data further via another network g(•), which now has a fixed input size. Thus, the core structure of our networks is as follows:

$$g\left( \bigoplus_{i=0}^{arbitrary\ n} \left( h_s(x_i) \right) \right) \quad (10.4)$$

10.5.2 Multi-Image, Global-State-Fusion Network

In this section well give an overview about the network architecture we use for both the lens distortion parameter estimation as well as the intrinsic parameter estimation. First we will give an introduction to the naive-version of the model, then introduce our contribution named global state fusion into it.

Naive Architecture

As our model needs to work with arbitrary-sized sets of input images, we first have shared networks which operate on different input images. We use the term shared to mean that all networks share the same weights across the same layers. These networks use blocks of densely connected convolutional layers, interleaved with downsampling layers (conv-layers, stride two) to reduce the dimensionality. Moreover, we use multiple skip connection via concatenations to aid proper gradient flow and reduce the vanishing gradient problem.

Second, after three downsampling operations, we fuse the outputs of the shared networks by averaging them as described in section "Cardinality Invariance", followed by multiple fully connected layers to get our parameters.

Global State Fusion Architecture

We now extend our above-described model by introducing global state information into the shared networks. The key idea is that in the naive model the shared networks only have the information of one image, only fusing their individual knowledge at the end. In contrast, we want the networks to have global information at multiple points, and let them decide if they use it or discard it.

Therefore, after each block of conv-layers we average the output of all shared networks, and concatenate this average global feature map state to each one-image only feature map state. Thus, our shared networks do global state fusion multiple times during an iteration. Moreover, because we concatenate this information, the network can learn to which extent it wants to utilize it.

Let's name the output of conv-block j in the i'th shared network $o_{ij}$. Then before the next conv-block begins, we concatenate the network specific feature state $o_{ij}$ with the global feature state $\bar{o}_j$, where $\bar{o}_j$ equals $\Sigma_{k=1}^{n}(o_{kj})$. This operation keeps permutation and cardinality invariance. For an in-detail overview of the network see FIG. 97 for example. In this figure, all conv. layers have a stride of 1 and all downsample layers have a stride of 2. The concat column represents the previous layers which are depth-concatenated with the current input, a dash (-) represents no concatenation operation. Filter dim is in the format [filter height, filter width, input depth, output depth]. $\bar{o}$ represents the globally averaged state from output of all previous blocks. The compress layer is connected with a fully connected layer with a thousand units, which are all connected to one unit which regresses the parameter.

Figure 95:
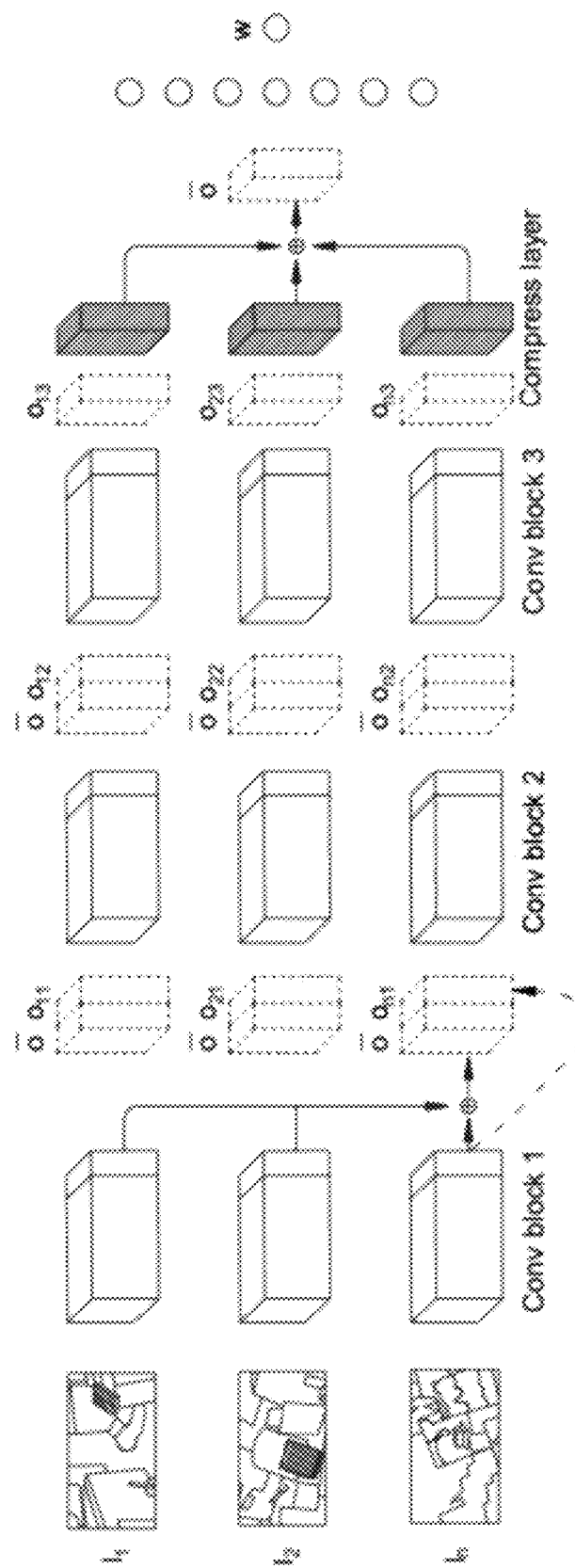
FIG. 95 shows an example including the use of convolution blocks. Symbol $o_{ij}$ represents the output of the ith image and jth conv-block. $\bar{o}$ is the average output over the previous conv-blocks. All conv-blocks across networks share weights and have a downsample layer at the end. Dotted boundaries represent outputs, while solid boundaries are convolutions. For $I_n$, arrows demonstrate how $o_{n1}$ and $\bar{o}$ are computed where $\oplus$ represents a symmetric accumulation operation. Fully connected layers are used to regress the parameter.
Figure 96:
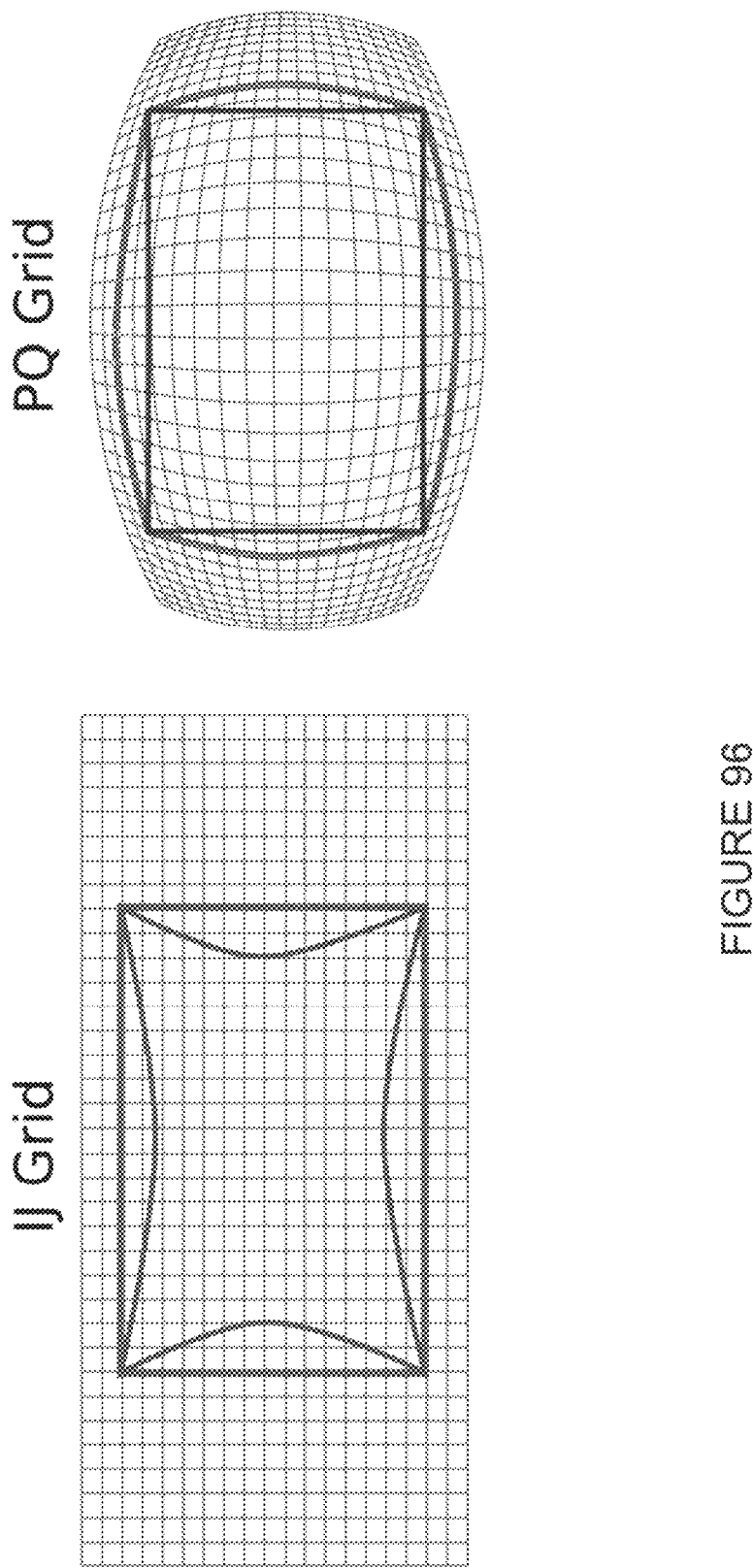
FIG. 96 shows examples of grids.

In FIG. 95, symbol $o_{ij}$ represents the output of the i'th image and j'th conv-block. $\bar{o}$ is the average output over the previous conv-blocks. All conv-blocks across networks share weights and have a downsample layer at the end, shown by the block at the end of each rectangular larger block. Dotted boundaries represent outputs, while solid boundaries are convolutions. For $I_n$, arrows demonstrate how $o_{n1}$ and $\bar{o}$ are computed where $\oplus$ represents a symmetric accumulation operation. Fully connected layers are used to regress the parameter.

10.6 References

[1] Rosenbaum, Clemens, et al. "Routing networks and the challenges of modular and compositional computation." arXiv preprint arXiv:1904.12774 (2019).
[2] Rosenbaum, Clemens, Tim Klinger, and Matthew Riemer. "Routing networks: Adaptive selection of non-linear functions for multi-task learning." arXiv preprint arXiv:1711.01239 (2017).

11. Padé Activation Units

11.1 Introduction

Activation functions, or nonlinearities, are function mappings that transform the input space nonlinearly which are fundamental for effective information processing in neural networks. The Padé Activation Unit, or PAU, is a very efficient and generalised activation function that is capable of approximating many popular activation mappings currently employed in AI literature. This has still the capacity to be extended with variations in its parametrisation structure, evaluation algorithms and stability mechanisms. Furthermore, a multivariate PAU is also possible, extending the concept to process intervariable relationships between the input variables.

Neural networks are famously able to model highly complex relationships between observed data and latent features. It owes most of this to the activation functions, which grant the network its nonlinear modelling capacity. Activation functions, or nonlinearities as they are often called, are nonlinear function mappings that transform the inputted feature vector (or, simply, feature map) to an activated feature vector (or activation map). There exists a large variety of activation functions in deep learning literature, with names such as tan h, sigmoid, ReLU and Leaky ReLU being popular in the research field. Many of these differ in their functional expression, and there is little consensus of which activation function to choose for a given optimisation task. Moreover, if the activation function is not sufficiently flexible (or even fully static), this induces an arbitrary prior on the model. This can either aid the network in its task if the activation function is well-suited, or stifle its modelling capacity if it is poorly chosen.

A logical workaround would be to design and parametrise an activation function with ample degrees of freedom such that it can approximate most of the common activation functions to a sufficient degree, as well as embody less conventional or even completely novel nonlinear mappings. Ideally, the number of parameters for this should be small to facilitate modelling capacity and promote generalisation to the data. One elegant method for such a method is the Padé approximant.

The Padé approximant comprises a rational function $$f(x) = \frac{p_m(x)}{q_n(x)} \quad (11.1)$$

where $p_m(\bullet)$ is a polynomial of order m, $q_n(\bullet)$ is a polynomial of order n and x is some arbitrary input. In full, the Padé approximant can be expressed as:

$$f(x) = \frac{a_0 + a_1 x + a_2 x^2 + \ldots + a_m x^m}{1 + b_1 x + b_2 x^2 + \ldots + b_n x^n} = \frac{\sum_{j=0}^{m} a_j x^j}{1 + \sum_{k=1}^{n} b_k x^k} \quad (11.2)$$

As we shall see, with only a few parameters, the Padé approximant has the capacity to model virtually all activation functions that are used in neural networks within a reasonable range of operation. With such a generalised mapping, there is abundant design space for extending its parametrisation to encourage expressivity or to limit it to promote generality. This mathematical construct is the foundation of the provided activation function, the Padé Activation Unit or PAU, which we employ within the domain of AI-based data compression.

The focus here is to
(a) present and outline in detail the Padé Activation Unit, its associated configuration space and the possible variations and extensions of this construct as a generic concept but under the framework of machine learning;
(b) describe and exemplify the provided innovation in, but not limited to, AI-based data compression in its present form.

11.2 Preliminaries

Please see Section 2.2 for mathematical preliminaries.

11.3 Padé Activation Units

Figure 98:
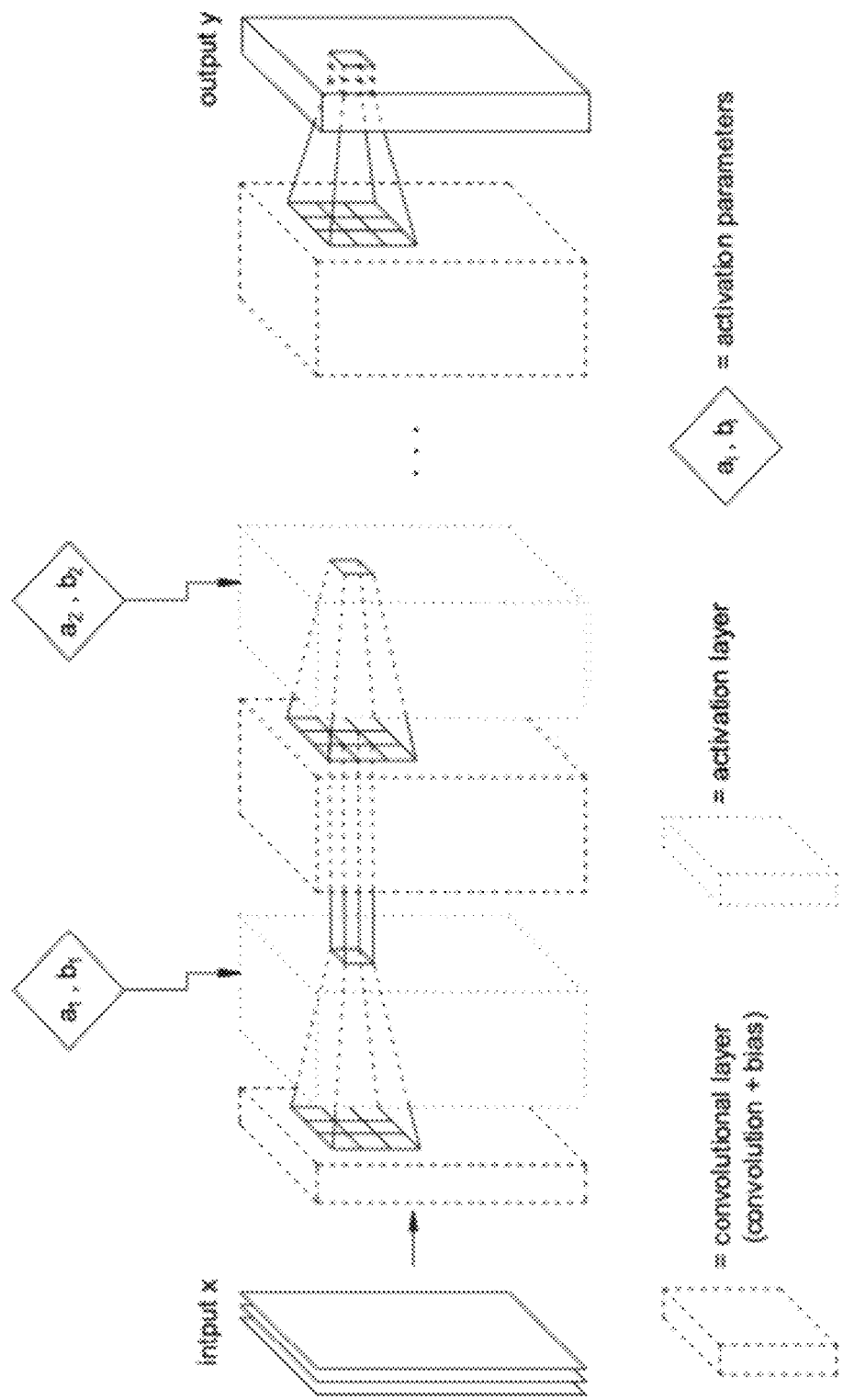
FIG. 98 shows an example flow diagram of forward propagation through a neural network module (possibly be an encoder, decoder, hypernetwork or any arbitrary functional mapping), which here is depicted as constituting convolutional layers but in practice could be any linear mapping. The activation functions are in general interleaved with the linear mappings, giving the neural network its nonlinear modelling capacity. Activation parameters are learnable parameters that are jointly optimised for with the rest of the network.

Normally in neural networks, activation functions are interleaved with linear and convolutional layers, with the optional normalisation and pooling layer. This is the usual structure of a module such as the encoder or decoder (see FIG. 98 for example). However, we will reasonably assume that the innovation in question will be discussed without further consideration of its point of application, but rather as a concept of its own that can be utilised in the capacity of an activation function.

The innovation of the Padé Activation Unit will be clearly detailed in the subsections below, comprised by the following:

Forward functional expression and associated parametrisation structure, evaluation algorithm and stability mechanisms;
Backward functional expression and associated evaluation algorithms and stability mechanism;
Variations in parametrisation structures;
Variations in evaluation algorithms;
Variations in numerical stability mechanisms;
Possible extensions to multivariate and higher-order variants of PAU.

Figure 99:
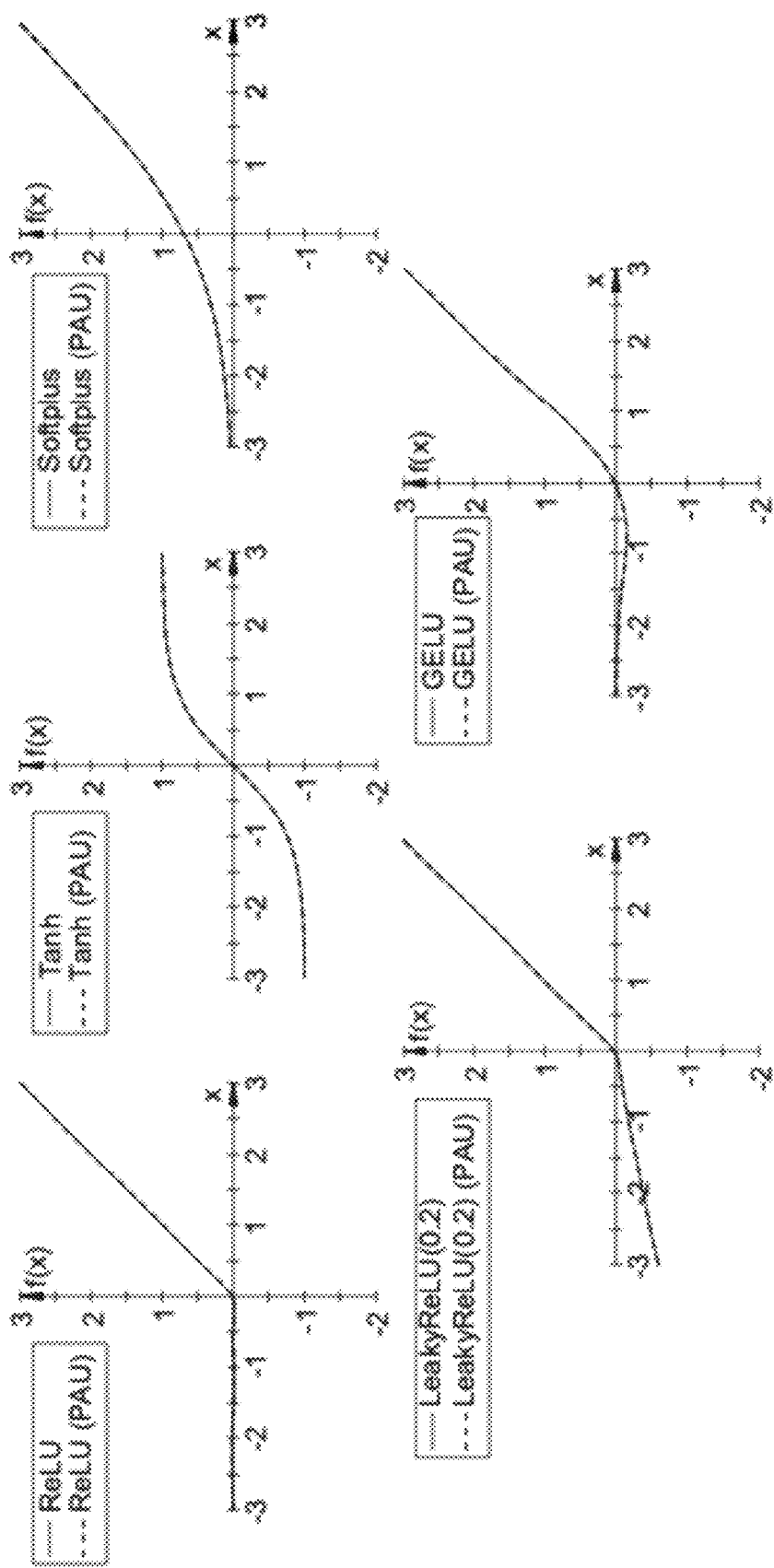
FIG. 99 shows examples of common activation functions in deep learning literature such as ReLU, Tanh, Softplus, LeakyReLU and GELU. The PAU of order (m=5, n=4) can very precisely mimic each mapping within the displayed range $x\in[-3, 3]$.

FIG. 99 shows an example of common activation functions in deep learning literature such as ReLU, Tanh, Softplus, (bottom row, left to right) LeakyReLU and GELU. The PAU of order (m=5, n=4) can very precisely mimic each mapping within the displayed range $x \in [-3,3]$.

11.3.1 Forward Function

In a forward (propagation) pass, the data is processed sequentially through each neural network module and the forward functions of its singular components. In the case of the PAU as activation function, for the input $h_l$, the forward functional expression is $$h_{l+1} = f(h_l) = \frac{p_m(h_l)}{q_n(h_l)} = \frac{a_0 + a_1 h_l + a_2 h_l^2 + \ldots + a_m h_l^m}{1 + |b_1 h_l| + |b_2 h_l^2| + \ldots + |b_n h_l^n|} = \frac{\sum_{j=0}^{m} a_j h_l^j}{1 + \sum_{k=1}^{n} |b_k h_l^k|} \quad (11.3)$$

where (m, n) is the order of the Padé approximant and in effect determines the parametrisation structure of $f(\bullet)$, given by $\alpha = \{\alpha_0, \alpha_1, \ldots, \alpha_m\} \in \mathbb{R}^{m+1}$ and $b = \{b_1, b_2, \ldots, b_n\} \in \mathbb{R}^n$. Initially, it is assumed that a and b are global parameters for the activation layer (i.e. layer-wise activation function), but we shall see in later subsections that we can easily extend this to a channel-wise parametrisation structure.

This expression differs from the formal definition of a Padé approximant (Equation (11.2)) in that the terms in the denominator are kept positive with the absolute value operator. In its current form, the denominator of the PAU is guaranteed to be larger than one. This is to ensure the absence of poles causing numerical instabilities, which occurs when the denominator evaluates to (or approaches) zero.

Since the PAU consists of two polynomials, we can leverage efficient polynomial evaluation algorithms in our forward function. One such efficient algorithm is Horner's method, which expresses a polynomial as follows:

$$p_m(x) = a_0 + a_1 x + a_2 x^2 + \ldots + a_m x^m \quad (11.4)$$
$$= a_0 + x(a_1 + x(a_2 + \ldots + (x(a_{m-1} + a_m x)\ldots)))$$

This algorithm requires m additions and m multiplications to run. Although it relies on serial execution where each addition/multiplication depends on the previous term, in most practical applications m is fairly low (see FIG. 99 for example). This means the algorithm runs very quickly, and can even be sped up further by evaluating the two polynomials of PAU in parallel (see Algorithm 11.1). Furthermore, since we can modify the output in-place, it is also memory-efficient. In fact, the forward function of PAU requires roughly 3 N (where $x \in \mathbb{R}^N$) in memory (two polynomials plus the input).

---

Algorithm 11.1 Forward function of (layer-wise) "safe" PAU or order (m, n), using Horner's method for polynomial evaluations. Note that lines 6 and 9 can be executed in parallel, allowing for a significant algorithmic speedup.

---

1: Inputs:
    $h_l \in \mathbb{R}^N$: input feature vector
    $a = \{a_0, a_1, \ldots, a_m\} \in \mathbb{R}^{m+1}$: PAU numerator coefficients
    $b = \{b_1, b_2, \ldots, b_n\} \in \mathbb{R}^n$: PAU dominator coefficients
2: Outputs:
    $h_{l+1} \in \mathbb{R}^N$: activated feature vector
3: Initialise:
    $p \leftarrow a_m 1_N$
    $q \leftarrow b_n 1_N$
4:                                                              ▷ $1_N$ is a N-dimensional vector of ones
5:
6: for $j \leftarrow m - 1$ to 0 do                              ▷ Can be parallelised with line 9
7:     $p \leftarrow p \odot h_l + a_j$
8: end for
9: for $k \leftarrow n - 1$ to 0 do                              ▷ Can be parallelised with line 6
10:     $q \leftarrow |q \odot h_l| + b_k$
11: end for
12: $q \leftarrow |q \odot h_l| + 1$
13: memoryBuffer($h_l$, p, q, a, b]                              ▷ Saved for backward pass
14: $h_{l+1} \leftarrow p/q$

---

11.3.2 Backward Function

The backward function is defined to allow for the gradients to flow through the PAU to upstream modules, as well as update the parameters {a, b}, during network training. Automatic differentiation packages usually take care of the backpropagation process, however the backward functions can also be custom-defined, such that their computation can be optimised for (using CUDA kernels, for instance):

$$\frac{\partial f}{\partial h_{i,l}} = \frac{\partial p_m}{\partial h_{i,l}} \frac{1}{q_n(h_{i,l})} - \frac{\partial q_n}{\partial h_{i,l}} \frac{p_m(h_{i,l})}{q_n(h_{i,l})^2} \quad (11.5)$$

$$\frac{\partial f}{\partial a_j} = \frac{h_{i,l}^j}{q_n(h_{i,l})} \quad (11.6)$$

$$\frac{\partial f}{\partial b_k} = -\text{sign}(b_k) |h_{i,l}^k| \frac{p_m(h_{i,l})}{q_n(h_{i,l})^2} \quad (11.7)$$

Here, $h_{i,l}$ is a scalar-element of the input vector $$\frac{\partial p_m}{\partial h_{i,l}} = a_1 + 2a_2 h_{i,l} + 3a_3 h_{i,l}^2 + \ldots + m a_m h_{i,l}^{m-1}$$

and $$\frac{\partial q_n}{\partial h_{i,l}} = \text{sign}(h_{i,l})(b_1 + 2b_2 h_{i,l} + 3b_3 h_{i,l}^2 + \ldots + n b_n h_{i,l}^{n-1}).$$

These can also be evaluated using Horner's method or alternative polynomial evaluation strategies.

---

Algorithm 11.2 Backward function of (layer-wise) "safe" PAU or order (m, n). In order to expedite processing speed, the polynomials p and q are stored in memory buffers from the forward function and subsequently used in the backward pass.

---

1: Inputs $\frac{\partial \mathcal{L}}{\partial h_{l+1}} \in \mathbb{R}^N$: incoming loss gradient Algorithm 11.2 Backward function of (layer-wise) "safe" PAU or order (m, n). In order to expedite processing speed, the polynomials p and q are stored in memory buffers from the forward function and subsequently used in the backward pass.

2: Outputs $\frac{\partial \mathcal{L}}{\partial h_l} \in \mathbb{R}^N$: outgoing loss gradient $\frac{\partial \mathcal{L}}{\partial a} = \left\{ \frac{\partial \mathcal{L}}{\partial a_0}, \frac{\partial \mathcal{L}}{\partial a_1}, \ldots, \frac{\partial \mathcal{L}}{\partial a_m} \right\} \in \mathbb{R}^{m+1}$:

loss gradients for PAU numerator coefficients $\frac{\partial \mathcal{L}}{\partial b} = \left\{ \frac{\partial \mathcal{L}}{\partial b_1}, \frac{\partial \mathcal{L}}{\partial b_2}, \ldots, \frac{\partial \mathcal{L}}{\partial b_n} \right\} \in \mathbb{R}^n$:

loss gradients for PAU denominator coefficients

3: Initialise $\frac{\partial p}{\partial h_l} \leftarrow a_m 1_N$ $\frac{\partial q}{\partial h_l} \leftarrow b_n 1_N$ $h_l$, p, q, a, b ← memoryBuffer
4:                                                Saved from forward pass
5:
6: for j ← m − 1 to 1                   Can be parallelised with line 9

7: $\quad \frac{\partial p}{\partial h_l} \leftarrow (j+1)\frac{\partial p}{\partial h_l} \odot h_l + a_j$ 8: end for
9: for k ← n − 1 to 1                   Can be parallelised with line 6

10: $\quad \frac{\partial q}{\partial h_l} \leftarrow (k+1)\left|\frac{\partial q}{\partial h_l} \odot h_l\right| + b_k$ 11: end for 12: $\quad \frac{\partial q}{\partial h_l} \leftarrow \text{sign}(h_l) \odot \frac{\partial q}{\partial h_l}$ 13: $\quad \frac{\partial h_{l+1}}{\partial h_l} \leftarrow \frac{\partial p}{\partial h_l}/q - \frac{\partial q}{\partial h_l} \odot p/q^2$ 14: $\quad \frac{\partial \mathcal{L}}{\partial h_l} \leftarrow \frac{\partial \mathcal{L}}{\partial h_{l+1}} \odot \frac{\partial h_{l+1}}{\partial h_l}$ 15: $\quad \frac{\partial h_{l+1}}{\partial a_0} = 1/q$ 16: $\quad \frac{\partial \mathcal{L}}{\partial a_0} = \sum_{i=1}^N \left( \frac{\partial \mathcal{L}}{\partial h_{l+1}} \odot \frac{\partial h_{l+1}}{\partial a_0} \right)$ 17: for j ← 1 to m                      Can be parallelised with line 23

18: $\quad \frac{\partial h_{l+1}}{\partial a_j} = \frac{\partial h_{l+1}}{\partial a_{j-1}} \odot h_l$ 19: $\quad \frac{\partial \mathcal{L}}{\partial a_j} = \sum_{i=1}^N \left( \frac{\partial \mathcal{L}}{\partial h_{l+1}} \odot \frac{\partial h_{l+1}}{\partial a_j} \right)$ 20: end for
21: $\quad \frac{\partial h_{l+1}}{\partial b_1} = -|h_l| \odot p/q^2$ Algorithm 11.2 Backward function of (layer-wise) "safe" PAU or order (m, n). In order to expedite processing speed, the polynomials p and q are stored in memory buffers from the forward function and subsequently used in the backward pass.

22: $\quad \frac{\partial \mathcal{L}}{\partial b_1} = \sum_{i=1}^N \left( \text{sign}(b_1) \frac{\partial \mathcal{L}}{\partial h_{l+1}} \odot \frac{\partial h_{l+1}}{\partial b_1} \right)$ 23: fork ← 2 to n                       Can be parallelised with line 17

24: $\quad \frac{\partial h_{l+1}}{\partial b_k} = \frac{\partial h_{l+1}}{\partial b_{k-1}} \odot |h_l|$ 25: $\quad \frac{\partial \mathcal{L}}{\partial b_k} = \sum_{i=1}^N \left( \text{sign}(b_k) \frac{\partial \mathcal{L}}{\partial h_{l+1}} \odot \frac{\partial h_{l+1}}{\partial b_k} \right)$ 26: end for

11.3.3 Variations in Parametrisation Structure

The PAU can be parametrised such that its parameters are:
- Global for the entire input vector (layer-wise PAU): each PAU is parametrised by $\{\alpha \in \mathbb{R}^{m+1}, b \in \mathbb{R}^n\}$ which is applied for every element in $h_l$;
- Partitioned for disaggregate components of the input vector, such as channels (channel-wise PAU): each PAU is parametrised by $\{A=\{a^{[c]}\}_{c=1}^C \in \mathbb{R}^{C\times(m+1)}, B=\{b^{[c]}\}_{c=1}^C \in \mathbb{R}^{C\times n}\}$, where each $a^{[c]}$ and $b^{[c]}$ is applied on the corresponding channel of the input vector, $h_l^{[c]} \in \mathbb{R}^{\frac{N}{C}}.$ The partitioning can also be of finer structure, such as patch-wise or element-wise.

11.3.4 Alternative Evaluation Algorithms

If the polynomial order of either $p_m(\bullet)$ or $q_n(\bullet)$ is large, we can employ Estrin's scheme and evaluate the polynomial in parallel (assuming that we have sufficient memory capacity). Given the polynomial or order m, we can rewrite it in a way that allows for parallelism $$p_m(x) = a_0 + a_1 x + a_2 x^2 + \ldots + a_m x^m = \quad (11.8)$$
$$= (a_0 + a_1 x) + (a_2 + a_3 x)x^2 + (a_4 + a_5 x)x^4 + \ldots =$$
$$= r_{\lfloor m/2 \rfloor}(x^2)$$

where $r_{\lfloor m/2 \rfloor}(x^2)$ is a $\lfloor m/2 \rfloor$-degree polynomial in $x^2$. Every bracketed term can be evaluated in parallel, hence the speed-up, and the scheme can operate further recursively, resulting in lower-degree polynomials in higher orders of x.

Alternatively, when the parametrisation is static and not under weight optimisation (so during deployment), Newton's method can be used to factorise the polynomials and simplify or approximate the functional expression of the PAU forward pass in order to optimise for the algorithmic evaluation speed and memory.

11.3.5 Variations in Numerical Stability Mechanisms

To avoid poles from arising in Equation (11.2), we implement "safe" PAU by restricting the terms in the denominator polynomial to nonnegative values. However, these can hurt expressivity and there may be better alternatives for the forward function that also safeguard against poles. Some of the stability mechanisms that are possible are:

Alternative absolute valuing: We can ensure that the denominator is always positive by taking the absolute value as such:

$$f(x) = \frac{a_0 + a_1 x + a_2 x^2 + \ldots + a_m x^m}{1 + |b_1 x + b_2 x^2 + \ldots + b_n x^n|} = \frac{\sum_{j=0}^{m} a_j x^j}{1 + \left|\sum_{k=1}^{n} b_k x^k\right|} \quad (11.9)$$

This is a more representative version of the Padé approximant formulation (Equation (11.2)) since it aggregates denominator terms before the absolute value is taken. However, the poles that otherwise would cause discontinuities are now manifesting as sharp peaks or troughs, which may disrupt the learning process.

Introducing $b_0$ with positivity constraint: We can replace the one in the denominator polynomial with a bias term, $b_0$, which we have to restrict to be larger than zero for stability purposes:

$$f(x) = \frac{a_0 + a_1 x + a_2 x^2 + \ldots + a_m x^m}{b_0 + |b_1 x| + |b_2 x^2| + \ldots + |b_n x^n|} = \frac{\sum_{j=0}^{m} a_j x^j}{b_0 + \sum_{k=1}^{n} |b_k x^k|}, \quad (11.10)$$

$$b_0 > 0$$

We can do this with a small constant stability term, E, to the absolute value of $b_0$ such that no poles arise.

11.3.6 Multivariate PAU

As of yet, the PAU has only been discussed in terms of the input directly, without modelling relationships between input variables. It would therefore be reasonable to consider the extension of the PAU to multivariate PAU, which consists of the quotient of two matrix polynomials $$f(x) = \frac{a_0 + A_1 x + A_2 x^2 + \ldots + A_m x^m}{1_N + |B_1 x| + |B_2 x^2| + \ldots + |B_n x^n|} = \frac{a_0 + \sum_{j=1}^{m} A_j x^j}{1_N + \sum_{k=1}^{n} |B_k x^k|} \quad (11.11)$$

where the set of numerator coefficients, $\{\alpha_0, A_1, A_2, \ldots, A_m\}$ are all matrices of dimensionality $\mathbb{R}^{N \times N}$ except for $a_0$, which is an N-dimensional vector. Likewise for the set of denominator coefficients, $\{B_1, B_2, \ldots, B_n\}$, which are all $\mathbb{R}^{N \times N}$. To keep dimensionality tractable, it is likely that this scheme will be employed for partitions of the input, such that N is for instance the number of channels. The matrix-vector product in each term, for example $A_2 x^2$, can be expressed as a linear layer or a convolutional layer with weight matrix $A_2$, for which the input elements will be taken to the corresponding power.

In fact, the multivariate PAU as formulated above generalises the concept of divisive normalisation, an operation in neuroscience, relating closely to how the visual cortex processes information. Assuming a bias term with a positivity constraint in the denominator, the multivariate PAU is very similar to the formulation of generalised divisive normalisation (GDN), a popular activation function in AI-based image compression $$f(x) = \frac{Hx}{(\beta + \Gamma x^2)^\varepsilon} \quad (11.12)$$

with the constraints that $\beta_i > 0$, $\forall \beta_i \in \beta$ and $\gamma_{i,j} \geq 0$, $\forall \gamma_{i,j} \in \Gamma$. If $\varepsilon$ is all ones, this formulation is easily encapsulated in the scheme of multivariate PAU.

11.4 Concepts

In this section, we present the following concepts regarding the Padé Activation Unit as activation function. All concepts listed below are considered under the context of the wider domain of AI-based data compression.

Application of the PAU as described here, with corresponding forward and backward function algorithms and parametrisation structure, as an activation function or other types of processes within a neural network module.

Application of extensions to the PAU, with regards to parametrisation structures, alternative evaluation algorithms (both in training/inference and in deployment) and numerical stability mechanisms.

Application of multivariate PAU, its associated parametrisation structures, evaluation algorithms and numerical stability mechanisms.

12. Fourier Accelerated Learned Image & Video Compression Pipeline with Receptive Field Decomposition & Reconstruction

12.1 Introduction

A goal for the current state of the art neural image and video compression pipelines deployed for any type of streaming media is massively reduced latency and computational cost to manage the demands of modern and future VR streaming, cloud gaming, and any other innovative electronic media streaming service. Up until this point, there are no learned image and video compression pipelines capable of this feat. Here, we outline the building blocks for a neural image and video compression pipeline that runs wholly in the frequency domain to realize orders of magnitude lower latency and computational costs compared to any other published state of the art learned image and video compression pipeline.

Image compression pipelines powered by deep neural networks have in recent years been shown to consistently outperform the best traditional image compression codecs based on the High Efficiency Video Coding (HVEC) avd Versatile Video Codec (VVC). However for novel image and video applications such as live streaming, VR, AR and cloud gaming, satellite and medical imaging, 3D films, etc., these state of the art neural compression pipelines are still completely unsuitable due to strict latency requirements, high resolutions and slow run-time. To meet the stringent latency and compute restrictions of current and future media streaming services we present novel neural compression building blocks created to realize learned image and video compression pipelines in the spectral domain.

A building block in state of the art neural image and video compression pipelines is the convolutional operation which constitutes close to all of the computational cost. Mathematically a convolution with kernel $\omega$ with the original image $f(x, y)$ may be defined as in Equation (12.1).

$$g(x, y) = \omega \otimes f(x, y) = \sum_{dx=-a}^{a} \sum_{dy=-b}^{b} \omega(s, t) * f(x + dx, y + dy) \quad (12.1)$$

Within the field of machine learning, and more recently deep learning, several efforts have been published improving the performance of convolutions that involve very large kernels using the mathematical theorem known as the convolution theorem, shown in Equation (12.2) where $\mathfrak{F}$ refers to the Fourier transformation. Briefly, the Fourier related transformations also referred to as integral transformations, are mathematical operations that are typically employed to shift to a more advantageous domain to operate within. The advantage for an image and video compression pipeline to transform into a spectral domain is evident in Equation (12.2)—pointwise multiplications in the spectral domain correspond to convolutions in the spatial domain, drastically reducing the number of floating-point operations.

$$\mathfrak{F}\{f \otimes g\} = \mathfrak{F}\{f\} * \mathfrak{F}\{g\} \qquad (12.2)$$

The traditional building blocks of the learned image and video compression pipeline such as convolutional layers, pooling layers, batch normalization layers, activation layers, etc., do not work within this domain. There is no neural image and video compression pipelines operating completely in the frequency domain. The domain is still unexplored—published research papers related to this area are surprisingly scarce. In this document, these types of neural compression pipelines of electronic media operating within the spectral domain may also be referred to as spectral compression pipelines. There are two large open questions within this niche field that most likely act as the bottleneck for academic and research interest:

1. What are good non-linearities within the frequency domain?
2. How do you perform up and downsampling?

Here we provide a novel toolkit of neural image and video compression building blocks to realize a neural image and video compression pipeline that runs completely within the spectral domain—the first spectral image and video compression pipeline.

12.2 Spectral Neural Image & Video Compression Toolkit

The building blocks utilized in our spectral compression pipeline will be briefly discussed below.

12.2.1 Spectral Integral Transform

We utilized a Fourier related integral transformation known as the Hartley Transformation. However, the specific integral transformation may not be important as long as the transforms are continuous (integral) transforms of continuous functions. Thus, the following methods may be applied in addition to the traditional Fourier Transformation: Hartley Transform, Wavelet Transform, Chirplet Transform, Sine and Cosine Transform, Mellin Transform, Hankel Transform, Laplace Transform, and others, for example.

12.2.2 Spectral Activation Function

As mentioned above, the traditional spatial neural activation functions that ensure nonlinearity in typical learned compression networks may not be employed in a spectral compression pipeline. This is because in the spectral domain the effect of an activation function typically employed in the spatial domain is mathematically completely different. As such a variety of spectral specific activation functions were implemented, such as the spectral non-linear activation seen in Equation (12.3) below, where $F_{conv_a}$ and $F_{conv_b}$ represent spectral convolutional operations, each with a different learnable kernel. In Equation (12.3) the operator "*" refers to a pointwise multiplication in the spectral domain and conversely a convolution in the spatial domain.

$$F_{act}(x) = F_{conv_a}(x) * F_{conv_b}(x) \qquad (12.3)$$

12.2.3 Spectral Convolutional Layer

An immediate limitation of spectral convolutions, based on Equation (12.2) is that point-wise multiplication between the kernel $\omega$ and image $f(x, y)$ necessarily requires that the shapes match. A method was implemented to ensure that the kernel $\omega$ and input $f(x, y)$ are of compatible shapes.

12.2.4 Spectral Upsampling & Downsampling

A spectral based learned compression pipeline may not necessarily require image scaling in the same sense as for traditional neural image compression. Nevertheless, as a way of achieving additional performance benefits a novel type of upsampling and downsampling was created specifically for the spectral domain, shown below in FIGS. 100(*a*) and 100(*b*).

Specifically in FIG. 100(*a*) the input is divided into several blocks—four blocks in the figure—that are concatenated in a separate dimension. A convolution operation with a 1×1 kernel is then applied such that the number of channels is reduced by half. The upsampling follows a reverse and mirrored methodology.

12.2.5 Spectral Receptive Field Based Decomposition & Reconstruction

Two varieties of receptive field based spectral image decomposition and image reconstruction for the spectral compression pipeline are discussed in this section.

Figure 101:
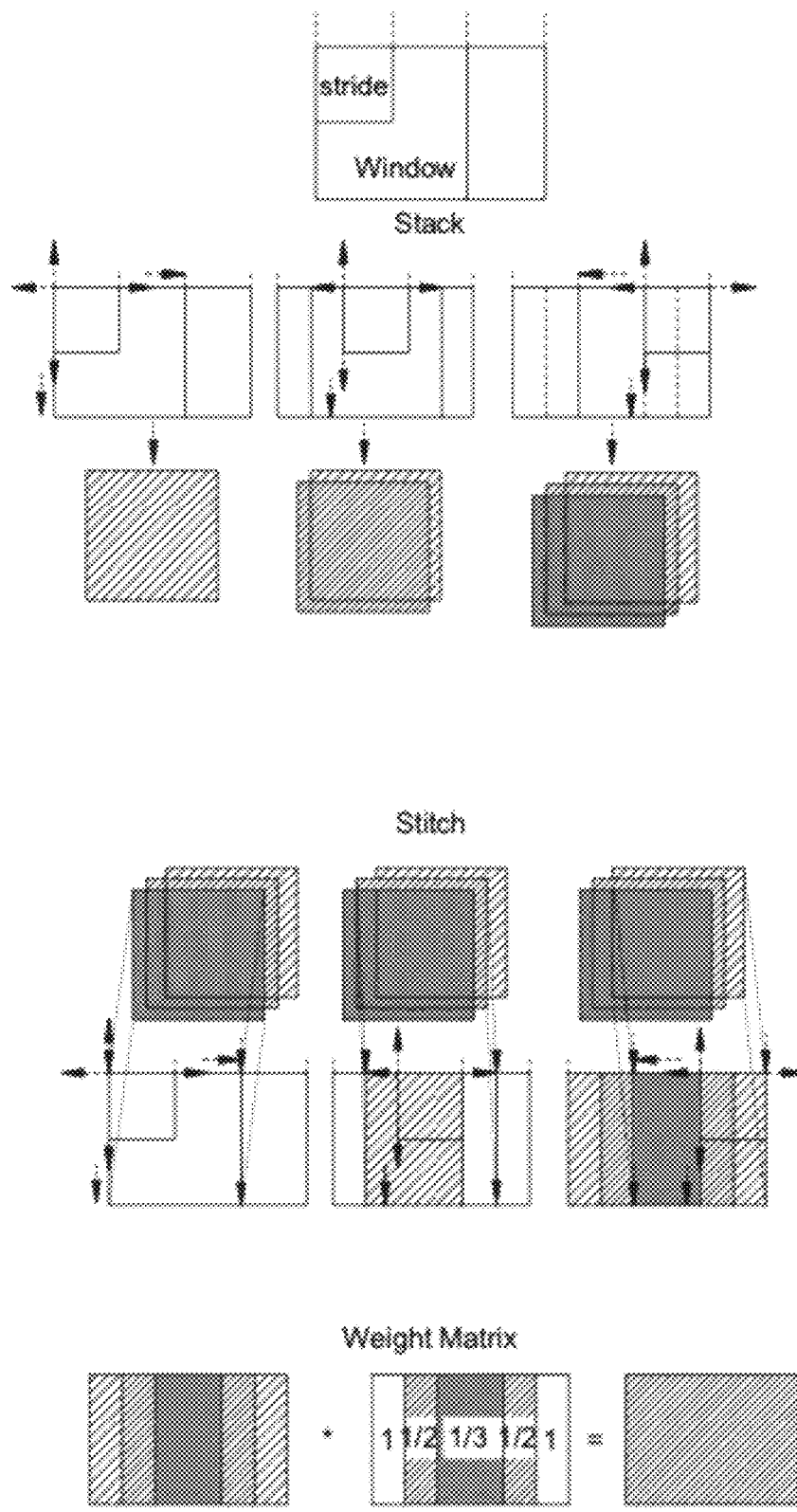
FIG. 101 shows an example of a stacking and stitching method (with overlap) which are shown for a simple case where the window height $W_H$ is the same as the image height and the width $W_W$ is half of the image width. Similarly, the stride window's height and width are half of that of the sliding window.

The image decomposition is known as stacking: smaller image patches or blocks are stacked in a new dimension, whereas the image reconstruction is known as stitching. Specifically, a window of size $W_H$, $W_W$ slides across the image based on a stride $S_H$, $S_W$. For each window position, a patch is created that is stacked in a batch dimension. The overlap between successive windows is based on the difference between the window size and the stride, for an example see FIG. 101.

Figure 102:
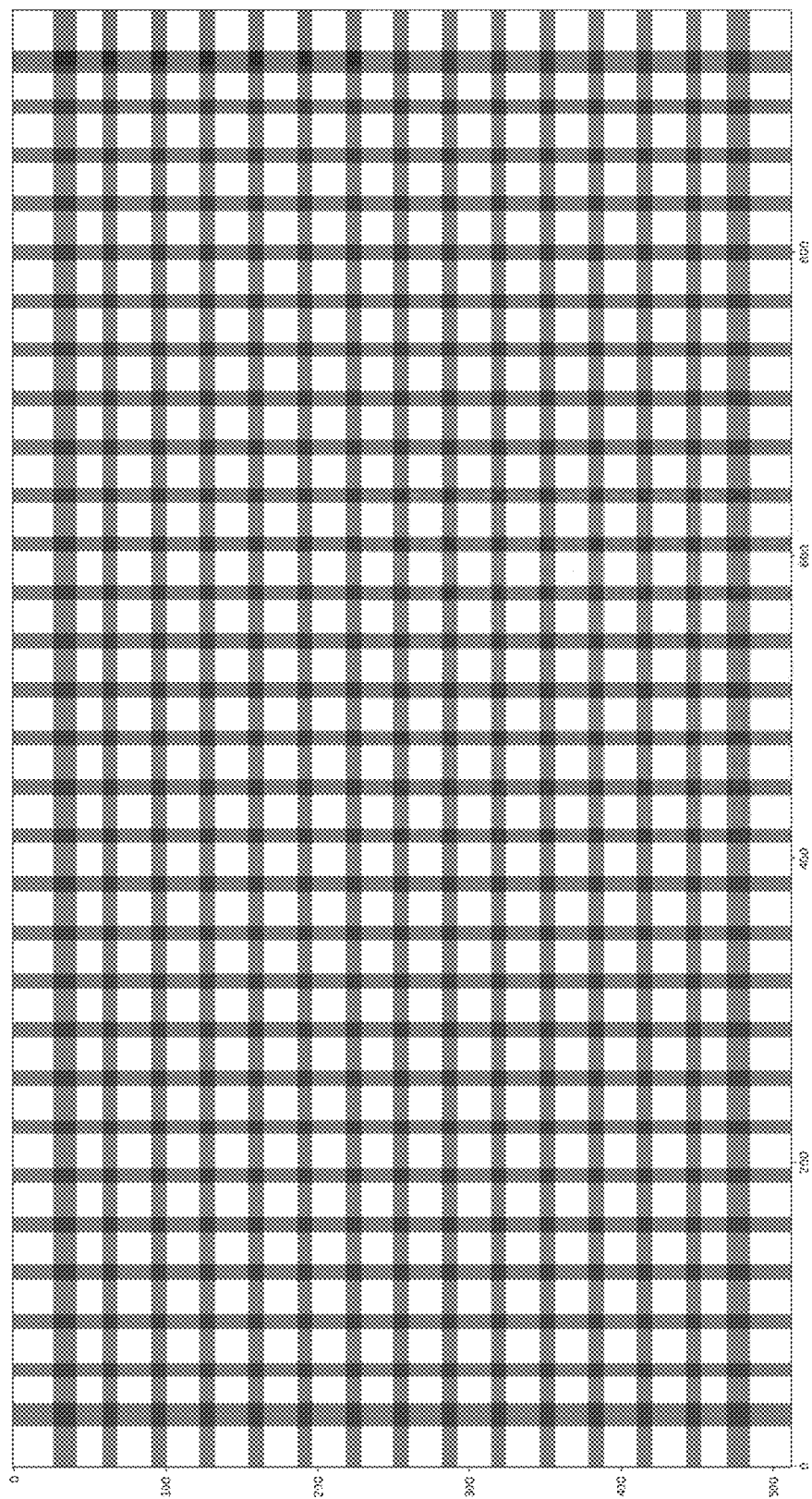
FIG. 102 shows an example visualisation of an averaging mask used for the case when the stacking operation includes the overlapping regions.

When reconstructing the image back together there are two methods of stitching. Firstly by stitching with the overlapping regions averaged (see FIG. 102 for an example of executing an averaging mask). Secondly by stitching it back together such that there are no overlapping regions to account for.

12.3 Concepts

1. Executing an entire AI-based Compression pipeline in the Frequency Domain. This realises massive speed-ups. Required building blocks are listed here.
2. Use of Spectral Convolution for AI-based Image and Video Compression.
3. Use of Spectral Activations for AI-based Image and Video Compression.
4. Use of Spectral Upsampling and Downsampling for AI-based Image and Video Compression.
5. Use of a Spectral Receptive Field Decomposition Method for AI-based Image and Video Compression.

13. AI-Based Compression and Neural Architecture Search

13.1 Introduction

Neural Network Architecture Search (NAS) is an approach in which we attempt to remove human bias from decision-making regarding neural network architecture design. AI-based Compression is an approach in which we attempt to remove human bias from designing a compression pipeline to get to the next generation of compression technology. In their core approaches, AI-based Compression and NAS overlap. It is the next step to apply NAS to the network design of AI-based Compression to also remove human bias in the codec design.

Here we describe methods (NAS) of determining one or multiple candidate architectures for a neural network for performing AI-based Image/Video Compression for different use cases. These methods include: maintaining a sequence of neural layer (or operator) selection processes, repeatedly performing the candidate architecture forward pass, updating the Neural Architecture Search system by using the feedback of the current candidate sets, and selecting one, or a group, of candidates of neural architectures as the final AI-based Image/Video Compression sub-system; or as a particular function module for the final AI-based Image/Video compression sub-system.

The innovations include applying the NAS-process to
The AutoEncoder of the AI-based Image and Video Compression pipeline; and/or
The Entropy Model of the AI-based Image and Video Compression pipeline; and/or
The loss function of the AI-based Compression (discriminative & generative); and/or
The assumed model-distribution over the latent space of the AI-based Compression pipeline
with the goals of getting
faster decoding runtimes during inference;
faster encoding runtimes during inference;
faster training runtime;
faster training network convergence;
better loss modelling of the human-visual-system;
better probability model-distribution selection and/or creation;
better entropy modelling through better density matching;
optimising platform (hardware architecture) specific goals.
Let us define a few NAS related terms:
Operator/(Neural) Layer: A possible operation/function that we apply to input to transform it. For instance: Tanh, Convolution, Relu, and others.
Neural Architecture: A set of hyperparameters which detail the organisation of a group of operators.
(Neural) Cell: A repetitive structure that combines multiple operations.
Search Space: The space over all possible combinations and architectures given some constraints.
Search Strategy: A method that outlines how we want to explore the search space.
Performance Estimation: A set of metrics that measure or estimate how well a specific neural architecture performs given a specific loss objective.
Micro Neural Search: Searching for a neural cell that works well for a particular problem.
Macro Neural Search Searching to build the entire network by answering questions such as the number of cells, the connections between cells, the type of cells and others.

Here we apply NAS to optimal operator selection, optimal neural cell creation, optimal micro neural search, optimal macro neural search under the context of AI-based Image and Video Compression. We will consider different performance estimation methods and search space limitations to reduce search times; and use efficient search strategies.

13.2 Operator Selection

For operator selection, the question is which function should we use at which position in the neural network. Given a fixed-architecture and a set of pre-selected operators, picking the best ones becomes a challenge. For example, suppose the set of possible operators is as follows:

O={convolution-layer-1×1, convolution-layer-3×3, convolution-layer-5×5, convolution-layer-7×7, activation-function-1, activation-function-2, activation-function-3, activation-function-4, Identity Function, Skip Connection, Attention-Module, adding bias, . . . }

Figure 103:
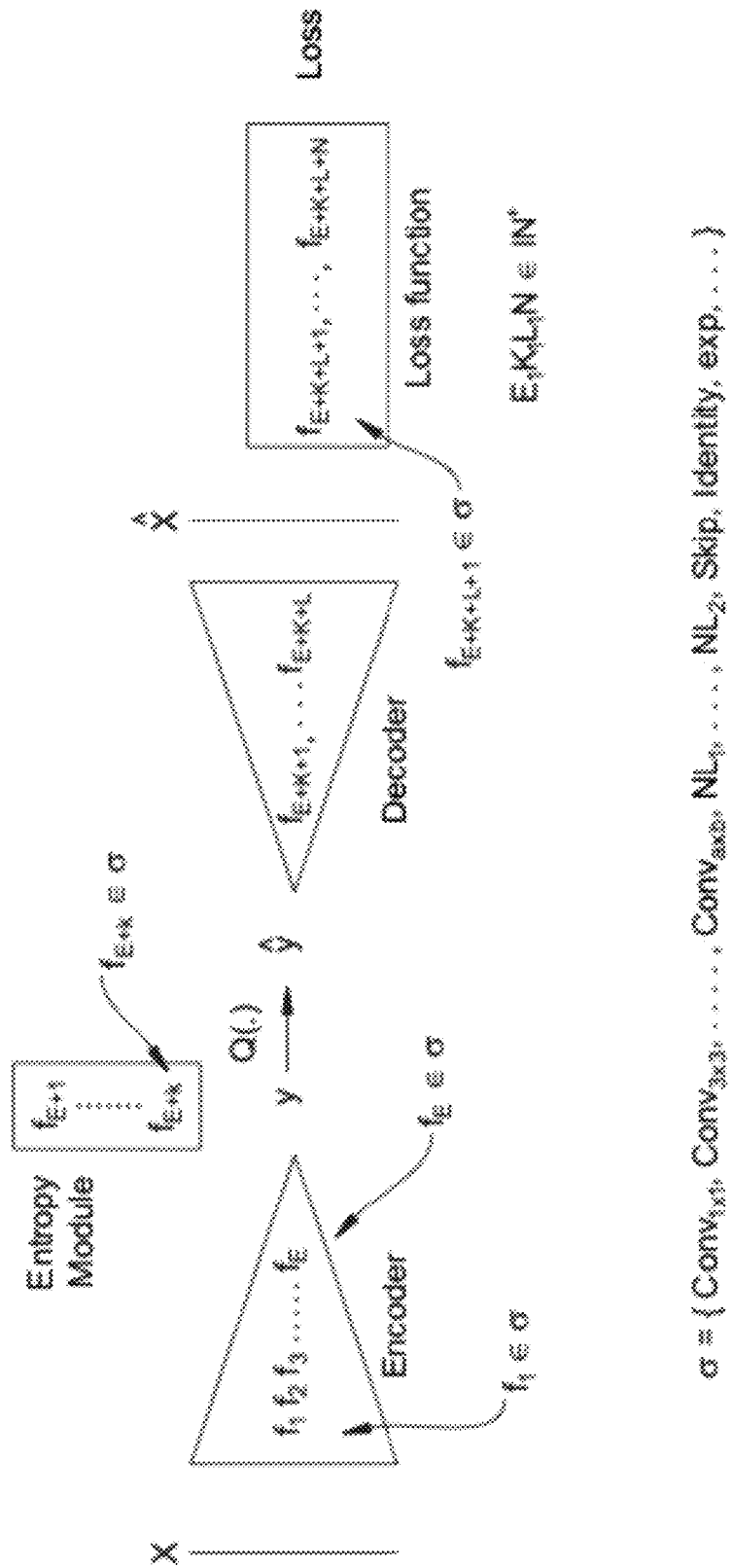
FIG. 103 shows an example visualising the Operator Selection process within an AI-based Compression Pipeline.

Each time we select an operator in the network we must pick a specific function from O->$f_i \in$O. FIG. 103 shows an example which illustrates this process within an AI-based Compression pipeline.

Once we have O defined, the question becomes, how can we train such a network, and how can we select one operator per function. In general, there exist two approaches:

1. We can treat the problem as a discrete selection process and use Reinforcement Learning tools to select a discrete operator per function. Reinforcement Learning treats this as an agent-world problem in which an agent has to choose the proper discrete operator, and the agent is training using a reward function. We can use Deep Reinforcement Learning, Gaussian Processes, Markov Decision Processes, Dynamic Programming, Monte Carlo Methods, Temporal Difference algorithm, and other approaches in practice.

2. We can use Gradient-based NAS approaches by defining $f_i$ as a linear (or non-linear) combination over all operators in O. Then, we use gradient descent to optimise the weight factors in the combination during training. It is optional to include a loss to incentive the process to become less continuous and more discrete over time by encouraging one factor to dominate (e.g. GumbelMax with temperature annealing). In inference, we use only one operation, the operation with the highest weight-factor.

Note that such a setup can give us additional possibilities to model non-standard loss objectives. For instance, we can associate auxiliary variables with the operators such as runtime, FLOPs, memory usage and others. Suppose we use these auxiliary terms in the loss equation. In that case, this gives us a straightforward way to optimise our pipeline for objectives such as runtime, computational complexity, memory usage, and others.

13.3 Macro Architecture

To search for an optimal Macro Architecture, we have two options: Either we start with a massive network and select strategies to prune connections/filters/weights (top-down approach) or build up an efficient architecture from scratch (bottom-up approach). There are also mixed-approaches which iterate between pruning and building (e.g. Morph-Net).

Figure 104:
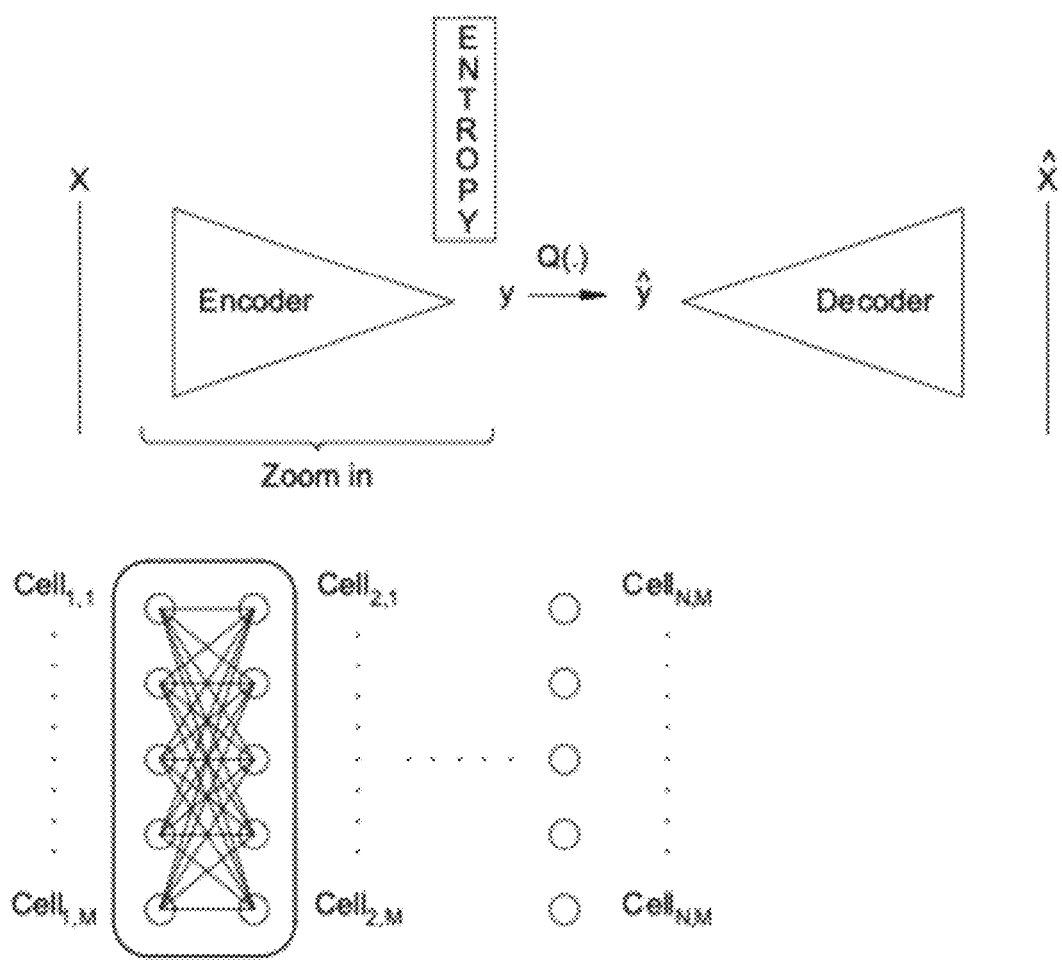
FIG. 104 shows an example Macro Architecture Search by pruning an overcomplex start architecture.

We can combine any of these methods with AI-based Compression specific auxiliary losses. For instance, we select a pruning-approach and add runtime/memory/FLOPS/visual-quality/filesizes constraints to each operation and connection to train an optimal final model for our particular objective. FIG. 104 provide an example of this approach for the Encoder (can be applied to any part of the pipeline). Well-known NAS approaches that we can use at this stage are (versions of DARTS): Continuous relaxation of the search space where each edge is a mixture of all candidate operations, joint optimization of the probability of mixed operations and network weights, and discrete searched neural architecture using reinforcement learning techniques or evolutionary algorithms.

Figure 105:
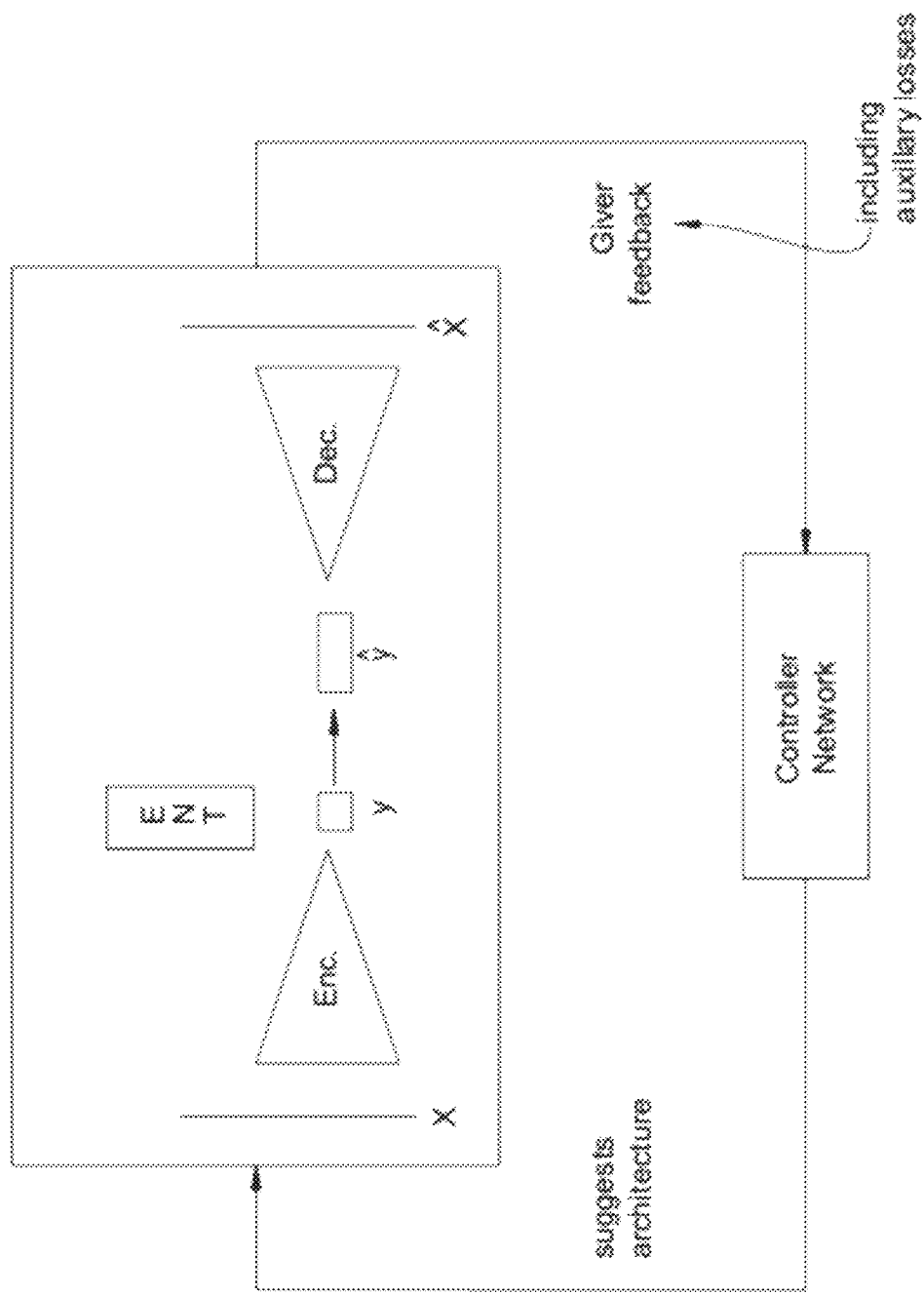
FIG. 105 shows an example Macro Architecture Search with a bottom-up approach using a controller-network.

The Macro Architecture design's bottom-up approach relies on Supernetworks (Also called: controller networks, mother networks). We have an architecture we want to optimise (AI-based Compression pipeline), also called child-network, and a controller determining how good a child-network is. Known approaches are early-stopping criteria, building up result tables and using RL on these result-tables, using accuracy predictors. Examples include: FBNet, SparseNAS, and others. FIG. 105 provides an example of Macro Architecture Search with a bottom-up approach using a controller-network.

13.4 Concepts

- Using NAS's Macro-Architecture approaches to find better neural architectures for the AI-based Compression pipeline at: the Encoder, Decoder, Quantisation Function, Entropy Model, Autoregressive Module and Loss Functions.
- Using NAS's Operator-Search techniques to find more efficient neural operators for the AI-based Compression pipeline at: the Encoder, Decoder, Quantisation Function, Entropy Model, Autoregressive Module and Loss Functions.
- Combining NAS with auxiliary losses for AI-based Compression for compression-objective architecture training. These auxiliary losses can be runtime on specific hardware-architectures and/or devices, FLOP-count, memory-movement and others.

14. Finetuning of AI-Based Image and Video Compression Algorithms

14.1 Introduction

AI-based compression uses neural networks that are trained to perform well and generalize across all inputs. However this leaves room for improvement on a per-input basis (say, for one particular image or video). The role of finetuning is to improve an AI-based compression pipeline on a per-input basis. Here we outline several approaches: fine-tuning the latent variables; finetuning the decoder network's weights (parameters); and fine-tuning the decoder's execution path.

In a compression pipeline, an encoder sends a media file as a binary stream of bits. The encoder sends this bitstream to a decoder, which attempts to reconstruct the original media file from the bitstream. There are two competing tasks: on the one hand, the encoder wants to send as few bits as possible; yet on the other hand, the reconstructed media file should be as close as possible to the original file. This is the so-called "rate-distortion trade-off": the compression pipeline must somehow minimize both rate (number of bits), and distortion, the reconstruction error between the original and decoded files.

Figure 106:
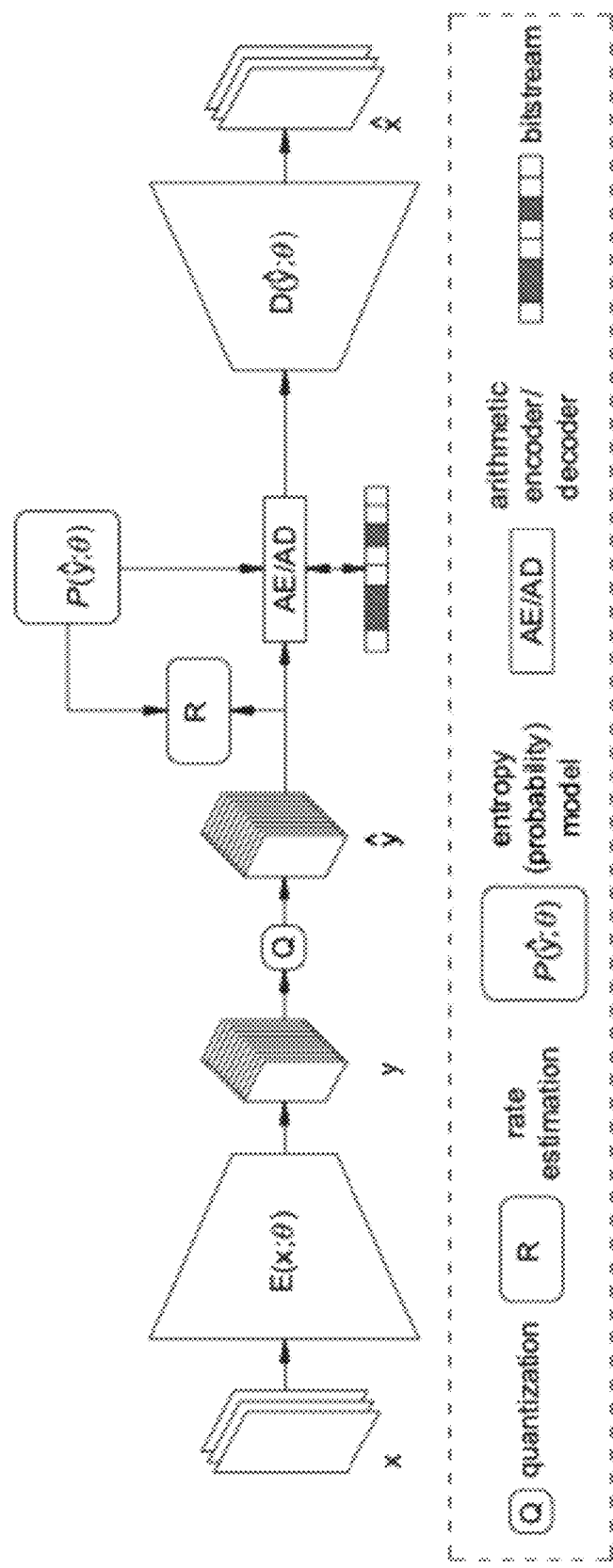
FIG. 106 shows an example of an AI-based compression pipeline. Input media $\hat{x}\in \Re^M$ is transformed through an encoder E, creating a latent $y\in \Re^n$. The latent y is quantized, becoming an integer-valued vector $\hat{y}\in Z^n$. During training of the pipeline, a probability model on $\hat{y}$ is used to compute estimate the rate R (the length of the bitstream). During use, the probability model is used by an arithmetic encoder & arithmetic decoder, which transform the quantized latent into a bitstream (and vice versa). On decode, the quantized latent is sent through a decoder D, returning a prediction $\hat{x}$ approximating x.

Before delving into the rate-distortion trade-off, let's first outline a generic AI-based compression pipeline (see FIG. 106 for example). The media file to be compressed is a real-valued vector $x \in \mathbb{R}^M$ (such as an image or a video file) in an M-dimensional space. In an AI-based compression pipeline, the encoder is a function $E: \mathbb{R}^M \mapsto \mathbb{R}^n$, typically parameterized by a neural network. The encoder transforms the media into a latent vector $y=E(x)$, y being a real-valued vector in an n-dimensional space. Usually n<M, so that the latent lives in a smaller dimensional space than the original media file.

Now, the pipeline must somehow turn the latent y into a binary bitstream. This is accomplished as follows. First, the latent y is quantized into a integer-valued vector $\hat{y}$. This quantized latent is given to a probability (entropy) model, which assigns a likelihood of each element in the latent occurring. These likelihoods are then sent to an arithmetic encoder, turning the likelihoods into a bitstream. The bitstream is what is actually sent by the encoder. On decode, an arithmetic decoder reverses the binarization procedure, taking binary values, likelihoods, and returning a faithful reproduction of $\hat{y}$. This recovered quantized latent is then sent through a decoder neural network, returning the final prediction $\hat{x}=D(\hat{y})$.

14.1.1 Network Training & the Rate-Distortion Trade-Off

How do we actually ensure that the prediction is as close as possible to the original input media x? Moreover, how do we control length of the bitstream (number of bits)?

These two issues are resolved during network training. Each of the encoder E, quantization function Q, probability model P, and decoder D may be parameterized by a large vector $\theta$ (sometimes called network weights). The parameters $\theta$ can be thought of as dials controlling the behaviour of the entire pipeline, and must be optimized. The parameters are chosen to minimize (1) the distortion between $\hat{x}$ and x, and (2) the rate (length) of the bitstream.

During network training, the rate can be estimated without running the arithmetic encoder/decoder, using a rate estimation function R (see FIG. 106 for example). The rate estimation function provides an upper bound on the number of bits that the arithmetic encoder will use. A distortion function $\text{dist}: \mathbb{R}^M \times \mathbb{R}^M \mapsto \mathbb{R}$ is chosen to measure the difference between x and $\hat{x}$. These two quantities, rate and distortion, are combined into a value called the loss, $\mathcal{L} := R(\hat{y}) + \lambda \, \text{dist}(\hat{x}, x)$. A small loss means that the compression pipeline performs well. The coefficient $\lambda > 0$ controls the relative importance of the distortion compared to the rate. Higher values of $\lambda$ mean that the loss cares more about minimizing distortion than minimizing rate; low values of $\lambda$ mean that the loss cares more about minimizing the rate (bitstream length).

The training procedure then attempts to minimize the rate-distortion loss over all input media files. That is, the training procedure tries to find a set of parameters $\theta$ that work equally well across all typical input media. In mathematical terms, the training procedure attempts to solve the optimization problem $$\min_{\theta} \mathbb{E}_x [R(\hat{y}) + \lambda \, dist(x, \hat{x})] \qquad (14.1)$$

The symbol $\mathbb{E}$ is the expectation symbol, which means that the loss should be minimized in expectation (on average), over all possible media inputs. That is, during training we try to find parameters $\theta$ (for the encoder, decoder, quantization function, and probability model) that work well on average. Though obviously it is not possible to train a compression pipeline over all inputs (there are infinitely many), modern training methods are still able to find parameters $\theta$ that generalize well, so that the pipeline's compression performance generalizes to unseen typical images.

14.1.2 the Need for Finetuning

This points to the need for finetuning. The optimization procedure does not consider finding parameters that are particularly good for any one particular media file. Once training is finished, we have a set of parameters that work "pretty good"—the encoder, decoder, quantization function, and probability model all perform reasonably well on typical inputs. In other words, the compression pipeline generalizes well; but it is not specialized to perform superbly on any one particular image. It is a "jack of all trades, but master of none".

The question that arises is then, can we somehow boost the performance of the compression algorithm on a case-by-case basis? I.e. given a particular input, can we design a per-image algorithm that improves the compression algorithm on a per image basis? This is the process of finetuning. Finetuning seeks to bring out extra compression performance (either in rate, or distortion, or both) on a per-input basis. Finetuning takes the already "pretty good" compression algorithm, which generalizes well, and somehow specializes the algorithm to perform very well on a particular input.

Figure 107:
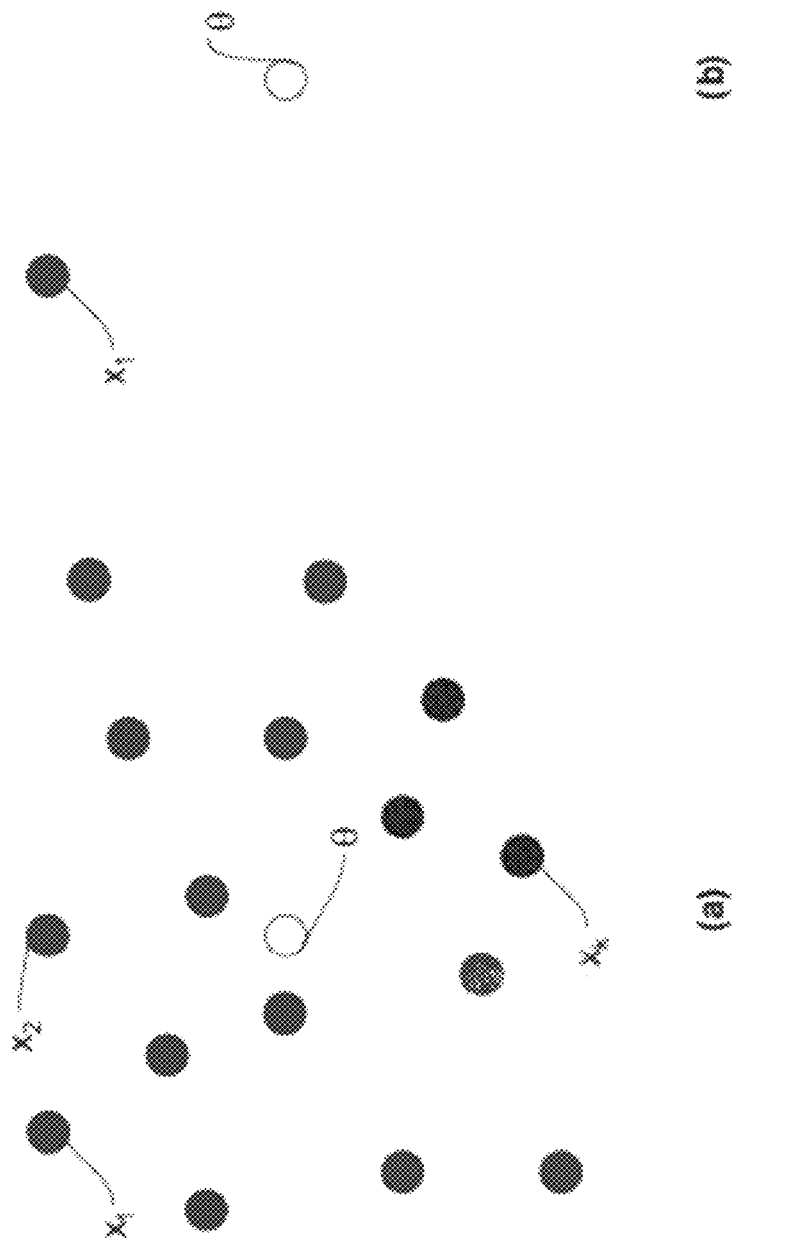
FIG. 107 shows an example illustration of generalization vs specialization for Example 1 of section 14.1.2. In (a), $\theta$ is the closest to all other points, on average. In (b), $\theta$ is not the closest point to $x_1$.

Example 1. To illustrate the idea, consider the following toy example, illustrated in FIG. 107 by way of example. Suppose we have a set of points $\{x_1, x_2, \ldots, x_k\}$, and we want to find a parameter $\theta$ that is the closest, on average, to all other points. (In this example disregard rate.) The optimization procedure would be to find $$\min_{\theta} \frac{1}{k} \sum_{i=1}^{k} dist(\theta, x_i) \quad (14.2)$$

See for example FIG. 107(a), where the optimal $\theta$ is plotted for some toy data. Now however, on a per-instance basis this $\theta$ is not the best choice: if we want to minimize distance to a particular point, say $x_1$ in FIG. 107(b), $\theta$ is actually quite far away. Of course the best choice in FIG. 107(b) is $x_1$ itself. In this example, $\theta$ generalizes well, in that it is the closest point to all other points, but it is not the closest to any one particular point.

Here we are concerned with all possible ways of finetuning an AI-based compression algorithm. We consider three broad ways of fine-tuning:

1. Finetune latent variables ($\hat{y}$) (see Section 14.2). In general, the idea of latent finetuning is to replace the quantized latents $\hat{y}$ returned by the encoder E with "better" latents. These new latents could improve the rate, the distortion, or some other metric.
2. Finetune the decoder function (see Section 14.3), so-called functional fine-tuning. Broadly, the idea here is to send a small amount of additional "side-information" in the bitstream, that will modify the decoder D so that it is better adapted to the particular image at hand.
3. Architectural finetuning (see Section 14.4). This is a slightly different than previous point, although related. In architectural fine tuning, the neural network path of the decoder is modified, by sending additional information to activate/deactivate some of the operations executed by the decoder, on a per-instance basis.

14.2 Innovation: Latent Finetuning

In this section we discuss the technique of latent finetuning, and possible instances of this technique. The basic framework algorithm for latent finetuning works as follows (refer to Algorithm 14.1). For a particular input x, the finetuning algorithm begins by initializing with the quantized latents first produced by the encoder, setting $\hat{y}_0 = Q(E(x))$. The initial latents $\hat{y}_0$ are generic latents, produced by the compression algorithm optimized to perform well on all possible inputs. These generic latents will be modified (finetuned) in some way to improve the compression performance. In a loop, the latent finetuning algorithm iteratively improves the latents, progressively perturbing the latents so that some performance metric

---

Algorithm 14.1 A framework for latent finetuning algorithms

1: Input:
   input media $x \in \mathbb{R}^M$, encoder $E : \mathbb{R}^M \mapsto \mathbb{R}^n$, decoder $D : \mathbb{R}^n \mapsto \mathbb{R}^M$,
   finetuning loss $\mathcal{L} : \mathbb{R}^M \times \mathbb{R}^M \times \mathbb{R}^M \mapsto \mathbb{R}$
2: Initialize:
   set $\hat{y}_0 = Q(E(x))$; $\hat{x}_0 = D(\hat{y}_0)$
3: while $\hat{y}_k$ not optimal do
4:   evaluate $\mathcal{L}(x, \hat{y}_k, \hat{x}_k)$
5:   generate perturbation p
6:   update $\hat{y}_{k+1} \leftarrow \hat{y}_k + p$
7:   get decoder prediction $\hat{x}_{k+1} \leftarrow D(\hat{y}_{k+1})$
8:   $k \leftarrow k + 1$
9: end while
10: Output:
    finetuned latent $\hat{y}_k$

--- of the compression pipeline improves. The performance of the compression pipeline is measured by a finetuning loss $\mathcal{L}$, which could for example measure:

- the rate (bitstream length) of the new perturbed latent $\hat{y}_k$;
- the distortion between the current decoder prediction $\hat{x}_k$ and the ground-truth input x;
- or other measures, like the distortion between the current decoder prediction $\hat{x}_k$ and the original decoder prediction $\hat{x}_0$;
- or a combination of any of the above.

At each iteration of the loop, a perturbation is generated, which is used to modify the latent. Perturbations are generated to improve the finetuning loss in some way. The prediction $\hat{x}_k$ is created from the current latent (which may be needed to determine how well the new latent performs, e.g. with respect to distortion). The iteration the begins anew. The loop ends when the latent is deemed optimal in some sense, and returns the finetuned latent.

Why is latent finetuning necessary? Remember that in a trained AI-based compression pipeline, the encoder E is optimized to perform well on all typical inputs; E is generalized, not specialized to the particular input at hand. Thus it is very likely that the initial latent $\hat{y}_0=Q(E(x))$ is not the best latent for the particular input x, and that we can improve on the latent in some way. Notably, changing the latent $\hat{y}$ may come with no increase to the bitstream length: no additional information is needed if we perturb $\hat{y}$ in a sensible fashion (compare this with the methods of Sections 14.3 and 14.4, where extra information [bits] must be sent).

In mathematical language, the finetuning algorithm detailed in Algorithm 14.1 seeks to solve the following optimization problem $$\min_{\hat{y}} \mathcal{L}(x, \hat{y}, \hat{x}) \qquad (14.3)$$

where $\mathcal{L}$ is the finetuning loss; and $\hat{x}=D(\hat{y})$ is the output of the decoder.

The latent finetuning framework can be fleshed out in various ways. For example,
  the finetuning loss can be customized in any number of ways, depending on the desired properties of the latent and the prediction (see Section 14.2.2)
  the perturbation can be generated from a host of strategies (see Section 14.2.3)
  the variable stopping criteria must be specified in some way
  the latents could themselves be parameterized, so that the finetuning algorithm performs updates in a parameterized space (refer to Section 14.2.1)

The remainder of this section will flesh out these various modifications to the latent finetuning framework.

14.2.1 Choosing the Variable to be Finetuned

The variable $\hat{y}$ is ultimately the variable sent (via the probability model, c.f. FIG. 106, for example) to the arithmetic encoder, and so it is the most natural variable to be finetuned. This is sometimes called STE finetuning (STE being short for "straight through estimator"). However, note that $\hat{y}$ is the output of a series of transformations, in particular $\hat{y}$ depends on y and x. Therefore, rather than finetuning $\hat{y}$ itself, we could "pull-back" the optimization to any one of the prior variables in the compression pipeline (e.g. any one of the prior variables to $\hat{y}$ in FIG. 106). Note that, once optimization is finished, we would calculate $\hat{y}$ from the optimized prior variable, and $\hat{y}$ is still the variable that is sent to the arithmetic encoder.

So for example, rather than optimizing $\hat{y}$, we may optimize y. The mathematical problem to be solved then is $$\min_{y} \mathcal{L}(x, \hat{y}=Q(y), \hat{x}=D(Q(y))) \qquad (14.4)$$

Note the subtle difference to Equation (14.3). The optimization variable $\hat{y}$ has been replaced with y. And in the finetuning loss, we have made the relationship between $\hat{y}$ and y clear by explicitly setting $\hat{y}=Q(y)$. How does this change affect Algorithm 14.1? Because now the optimization is performed on the unquantized latent, initialization begins by setting $y_0=E(x)$. Perturbations will be generated for the variable $y_k$, and the update will be $y_{k+1} \leftarrow y_k+p$. Wherever $\hat{y}_k$ is needed in the algorithm, it will be calculated on the fly as $\hat{y}_k=Q(y_k)$.

As another example, the variable to be optimized could be the input to the entire compression pipeline. Let's denote a generic input as $\ddot{x}$, and the specific image at hand as simply x. The mathematical problem to be solved then is $$\min_{\ddot{x}} \mathcal{L}(x, \hat{y}=Q(E(\ddot{x})), \hat{x}=D(Q(E(\ddot{x})))) \qquad (14.5)$$

The optimization variable here is $\ddot{x}$, which effectively parameterizes $\hat{y}$ via a pull-back $\hat{y}=Q(E(\ddot{y}))$. The changes to the framework Algorithm 14.1 are that: (1) initialization begins with $\ddot{x}_0=x$; (2) perturbations are generated for $\ddot{x}$, so that the update rule is $\ddot{x}_{k+1} \leftarrow \ddot{x}_k+p$. Whenever $\hat{y}$ is needed, it is calculated as $\hat{y}_k=Q(E(\ddot{x}_k))$.

14.2.2 Designing the Finetuning Loss

The finetuning loss, which measures how well the latent performs, plays a critical role in the finetuning algorithm. The finetuning loss may be used to generate the perturbations of the latent in the latent. In addition, the finetuning loss may be used to decide when to stop the iterations of the finetuning algorithm. The finetuning loss could measure
  the distortion between the prediction returned by decoding the fine tuned latent, and the original input image. In mathematical terms, this is written dist(x, D($\hat{y}$)), where $\hat{x}=D(\hat{y})$ is the decoded prediction of the finetuned latents.
  the distortion between the original prediction (created from the original latents), and the prediction created by the finetuned latents. In mathematical terms, this is written dist($\hat{x}_{orig}$, $\hat{x}_{ft}$), where $\hat{x}_{orig}$ and $\hat{x}_{ft}$ are respectively the original and finetuned predictions from the decoder, created using the original and finetuned latents.
  the rate (bitstream length), or an estimate of the rate (e.g. using the cross-entropy loss).
  regularization quantities of the predicted output. This includes quantities such as Total Variation, a measure of the regularity of the output image.
  any combination of the above There are many possibilities for what the distortion metric in the finetuning loss. Possibilities include
  any of the $\ell_p$ norms, including Mean Squared Error
  distortion metrics in a particular colour space, such as CIELAB's $\Delta E^*$. These distortion metrics are designed to be perceptually uniform to the human eye, so that changes are accurately captured across all colours
  hard constraints that prevent the distortion from increasing above a certain threshold
  Generative Adversarial Network (GAN) based distortion metrics. GAN-based distortion metrics use a separate "discriminator" neural network (different from the neural networks in the compression pipeline), whose job is to determine whether or not an image (video, etc) is naturally occurring. For instance, a discriminator could be trained to determine whether or not images are real (natural, uncompressed), or predicted (from a compression pipeline). In this example, minimizing the distortion metric would mean "fooling" a GAN-based discriminator, so that the discriminator thinks compressed images are real.

14.2.3 Strategies for Perturbing the Latent

Algorithm 14.1 provides a framework for perturbing the initial latent vector $\hat{y}$, however it lacks details of how the perturbation is actually constructed. There are many possibilities; this section will discuss some possible strategies for perturbing the latent.

Gradient Descent and Other 1st-Order Optimization Methods

The perturbation vector p of Algorithm 14.1 may be found by using a 1st-order optimization method, which solves the particular minimization problem (e.g. equations (14.3), (14.4), and (14.5)). A 1st-order optimization method is any method that approximates the loss (in this case, the finetuning loss), using the loss value at a point, and its gradient at this point (the direction of steepest ascent). So for example, the gradient descent method could be used to update the latents:

$$\hat{y}_{k+1} = \hat{y}_k - \tau \nabla_{\hat{y}} \mathcal{L}(x, \hat{y}_k, \hat{x}_k) \quad (14.6)$$

Here $\nabla_{\hat{y}} \mathcal{L}$ is the gradient of the finetuning loss, with respect to the latent variable $\hat{y}$. To be explicit, the perturbation is given by $p = -\tau \mathcal{L}(x, \hat{y}, \hat{x}_k)$. The scalar $\tau$ is a small parameter that controls the magnitude of the perturbation, the so-called "step-size". $\tau$ can be calculated using any step-size rule.

This is just one of many 1st-order optimization methods. Other examples of 1st-order optimization methods that may be used are: Adam; any accelerated 1st-order method such as Nesterov's momentum; and proximal gradient methods.

The 1st-order optimization method can be applied to any one of the variables discussed above in the latent finetuning optimization methods (e.g. problems (14.3), (14.4), and (14.5)).

2nd-Order Optimization Methods

2nd-order optimization methods may also be used. A 2nd-order optimization method is like a 1st-order optimization method (using the loss value and its gradient at a point), but also uses the Hessian (the matrix of second-order derivatives of the loss). In a 2nd-order optimization method, the perturbation p is chosen to minimize a 2nd-order approximation of the finetuning loss $$\min_{\|p\| < \tau} \mathcal{L}(x, \hat{y}_k, \hat{x}_k) + p^T \nabla_{\hat{y}} \mathcal{L}(x, \hat{y}_k, \hat{x}_k) + \frac{1}{2} p^T \nabla^2 \mathcal{L}_{\hat{y}}(x, \hat{y}_k, \hat{x}_k) p \quad (14.7)$$

Here $\nabla_{\hat{y}}^2 \mathcal{L}$ is the Hessian of the finetuning loss. The perturbation p is chosen to be no larger than some step-size threshold $\tau$ (the search radius).

The expression $\mathcal{L}$ p can be evaluated using efficient automatic differentiation techniques such as the Hessian-vector product.

Note that the perturbation may also be constrained so that the update to the quantized latents is still an integer-valued vector. In this case, the problem is a quadratic-integer valued problem, which can be solved using algorithms for the Closest Vector Problem.

Monte-Carlo, Metropolis-Hastings, Simulated Annealing, and Other Greedy Approaches The latent perturbation need not be generated explicitly from local approximations of the finetuning loss (as in the previous two subsections, which used gradient and Hessian information). The perturbation could be chosen as a vector from a random distribution. This is the idea behind Monte-Carlo methods and their many variants.

Algorithm 14.2 A framework for Monte-Carlo-like latent finetuning

```
1: Input:
      input media x ∈ R^M, encoder E : R^M ↦ R^n, decoder D : R^n ↦ R^M,
      finetuning loss L : R^M × R^M × R^M ↦ R
2: Initialize
      set ŷ_0 = Q(E(x)); x̂_0 = D(ŷ_0)
3: While ŷ_k not optimal do
4:      sample perturbation p ~ P
5:      set candidate latent ŷ' ← ŷ_k + p
6:      get decoder prediction x̂' ← D(ŷ')
7:      evaluate L(x, ŷ', x̂')
8:      if L(x, ŷ', x̂') satisfies improvement criteria then
9:           set ŷ_{k+1} ← ŷ'
10:          k ← k + 1
11:     end if
12: end while
13: Output:
      finetuned latent ŷ_k
```

The general procedure is outlined in Algorithm 14.2. At each iteration, the perturbation is sampled from a probability distribution P, defined over the space of integer-valued vectors.

A new candidate latent $\hat{y}' = \hat{y} + p$ is set. Then, this candidate is checked to see if it improves the latent finetuning loss in some way. If it does, then the candidate latent is accepted as the new latent. The loop begins anew, until a stopping criteria is reached.

There are several variants to this algorithm:
the probability distribution P could depend on
  the iteration count k
  the current latent $\hat{y}$. For example, the likelihood of a latent pixel being perturbed could be correlated with the size of the latent pixel.
  the current finetuning loss, including the gradient of the finetuning loss. For example the likelihood of a latent pixel being perturbed could be linked to the size of the gradient at that pixel.
  the input image or the predicted image
similarly the improvement criteria, used to determine whether or not to accept the candidate latent is acceptable, could
  depend on the current iteration count k (for example, as is done in Simulated Annealing)
  only accept candidates if the finetuning loss improves (as in a greedy approach)
  accept non-improving perturbations with some probability (as in Metropolis-Hastings and simulated annealing)

Parallelization and the Receptive Field

The latent perturbation can be chosen to only affect a small portion of the latent vector. At the extreme end, the perturbation could be applied to only one pixel (element) in the latent vector. In this scenario, it may not be necessary to run the entire perturbed latent $\hat{y}_k$ through the decoder network (to check the prediction $\hat{x}_k$'s quality). Instead, only a small portion of the latent may be needed: all those pixels adjacent to the perturbed pixel, in the receptive field of the perturbed pixel. The receptive field of the perturbed pixel are all latent pixels needed to compute prediction pixels that are influenced by the perturbed latent pixel.

When only a small portion of latents are needed each iteration, the entire finetuning process can be parallelized. That is, on each iteration a "batch" of many small subsets of the latent vector are processed in parallel. For example, in Algorithm 14.2, at each iteration, a batch of single pixel perturbations could be generated in parallel. Each of these perturbations may then be tested to see if they improve the finetuning loss (where only the local receptive field is checked, for every single-pixel perturbation in the batch). Only those single-pixel perturbations that improve the loss are accepted, and are used to update the latent.

Latent Perturbations as a Gaussian Process

The latent perturbations may be modeled as a Gaussian process. In this scenario, the perturbation itself is modeled as a parameter, to be learned as a Gaussian process. The perturbation is assumed to follow a multivariate Normal distribution. The Gaussian process modelling the perturbation is learned by updating the kernel function of the Gaussian process.

This is similar to interpreting the perturbation as hyperparameters from a given set, and learning these hyperparameters with a Gaussian Process. This can be viewed as an image-specific, natural extension of learning other hyperparameters, e.g. the learning-rate and/or the weight-decay, with Gaussian Processes. The details of how to execute this "smart" hyperparameter search using GP is common industry knowledge. Note, that for scalability we need overlapping GPs, Mixture-of-Experts (MoE) GPs or other modern techniques to make the computations feasible in practice.

Sparsity Inducing Methods: Hard Thresholding and Iterative Shrinkage

In a compression pipeline, latent values that are zero are extremely easy to compress, and come with almost no bit cost. Therefore, it may be desirable to encourage the latent vector to be as sparse as possible (A vector is sparse when it is made mostly of entries with value zero).

Thus, sparsity inducing methods may be used on the latent vector. For example, the following optimization problem may be solved $$\min_{\hat{y}} dist(x, D(\hat{y})) + \|\hat{y}\|_0 \quad (14.8)$$

where $\|\hat{y}\|_0$ is the $\ell_0$ counting "norm", which counts the number of non-zero elements in $\hat{y}$.

Figure 108:
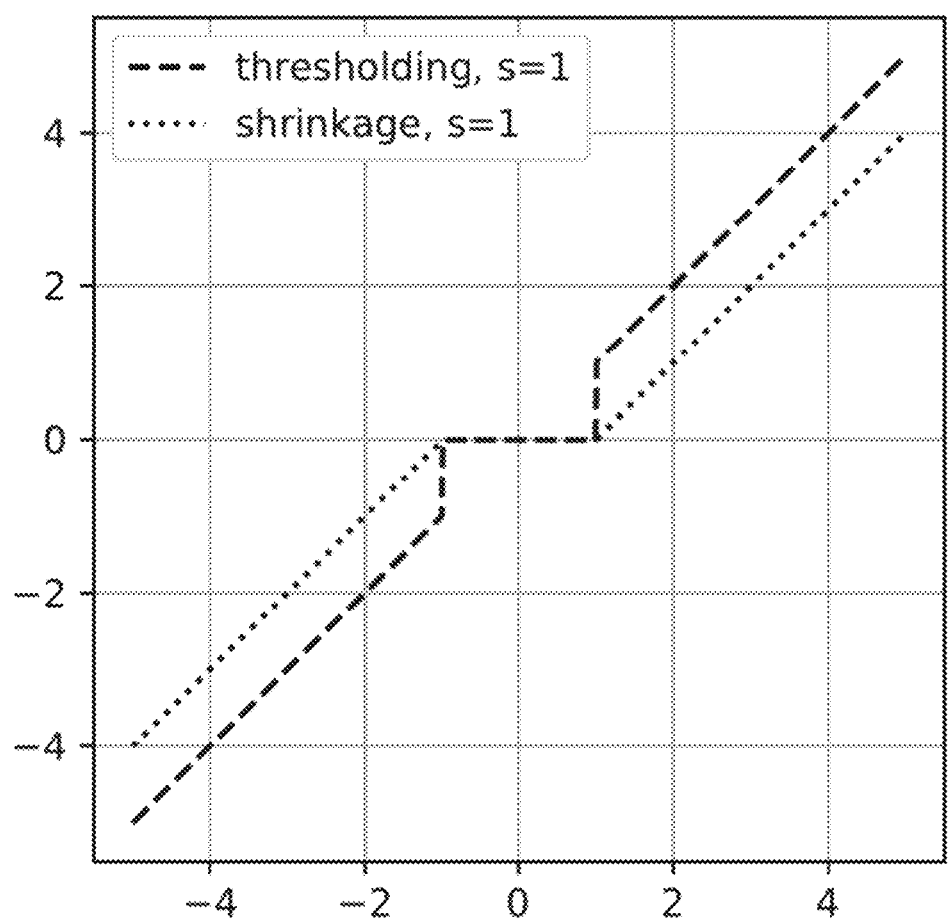
FIG. 108 shows an example plot of the hard thresholding and shrinkage functions, with s=1.

Several optimization strategies can be used to tackle this problem. For instance, hard thresholding may be used; FIG. 108 shows an example plot of the hard thresholding and shrinkage functions, with s=1. Define the thresholding operator $$\mathcal{H}_s(y) = \begin{cases} y & \text{if } |y| > s \\ 0 & \text{otherwise} \end{cases}$$

This function zeros any values that have magnitude less than s, but leaves all others untouched. Then an example of a hard-thresholding update rule is to set $\hat{y}_{k+1} = \mathcal{H}_s(\hat{y}_k + E(x) - E(D(\hat{y}_k)))$. Effectively, this update rule pushes the latents towards sparsity while still keeping distortion of the prediction small.

Another strategy is to relax the counting norm to the $\ell_1$ norm, $\|y\|_1 = \Sigma |y_i|$, so that the sparsity inducing optimization problem is $$\min_{\hat{y}} dist(x, D(\hat{y})) + \|\hat{y}\|_1 \quad (14.9)$$

A method of tackling this problem is via iterative shrinkage. Define the shrinkage operator $$\mathcal{T}_s(y) = \begin{cases} y - s & \text{if } y > s \\ y + s & \text{if } y < -s \\ 0 & \text{otherwise} \end{cases}$$

An iterative shrinkage update rule would set $\hat{y}_{k+1} = \mathcal{T}_s(\hat{y}_k + E(x) - E(D(\hat{y}_k)))$. This too has the effect of sparsifying the latent space, while still maintaining minimal distortion.

Reinforcement Learning Approaches

The problem of latent finetuning can also be cast as one of Reinforcement Learning. In this setting, the construction of the latent perturbation is tasked to an agent, which for example could be another neural network. In a Reinforcement Learning setting, the agent takes an action, which in our setting is the choice of perturbation. If the perturbation chosen by the agent improves the finetuning loss, the agent receives a reward. If, on the other hand, the agent worsens the finetuning loss, the agent receives a penalty. The agent's goal is to maximize its rewards (and minimize its penalties). A Reinforcement Learning algorithm is used to train the agent to make good actions (good latent perturbations).

Once the agent has been trained, it can be deployed into an AI-based compression pipeline to finetune the latent variable. So for example in Algorithm 14.1, the agent will be responsible for updating the latent $\hat{y}_k$ with a choice of perturbation p. Note that the reinforcement learning algorithm could also be used to update any of the "pull-back" variables, such as y or x, parameterizing $\hat{y}$.

14.2.4 Relation to Adversarial Attacks

Latent finetuning shares many similarities with the Deep Learning subfield of adversarial attacks. Research has shown that neural networks can be extremely sensitive to tiny perturbations to their input (for example, an input image; or in our case, the latent vector). In the subfield of adversarial attacks, perturbations are created to break the network in some way. For example, if the network's job is to classify an image (say, as a cat or a dog), then an adversarial attack could be a tiny perturbation, imperceptible to the human eye, that causes the network to mis-classify the input image. It turns out that creating these types of adversarial perturbations is often surprisingly easy.

Most often, the route to creating an adversarial perturbation is (as is common in machine learning) through a loss function. The loss function measures the performance of the neural network (smaller loss values meaning that the network is performing well). In adversarial attack—unlike in latent finetuning—the perturbation must make the performance of the network worse. Therefore, perturbations are created which maximize the loss. Typically, there will also be a constraint keeping the perturbation imperceptible to the human eye.

Thus, there are many similarities between adversarial attacks and latent finetuning. Whereas an adversarial attack seeks to maximize a loss, latent finetuning seeks to minimize a performance loss. Both however attempt to keep perturbations minimal in some way, so that the perturbations effect is not (or barely) visible to the human eye.

Therefore, any adversarial attack method can be used for latent finetuning, simply by using a finetuning loss that should be minimized (rather than maximized). In a certain sense, latent finetuning is a kind of "reverse adversarial attack", or a "friendly attack".

Examples of adversarial attacks that can be used for latent finetuning include
- Projected Gradient Descent (& Proximal Gradient). These algorithms minimize the performance loss subject to a constraint that perturbations do not grow larger than a threshold size.
- Fast Gradient Sign Method. These algorithms calculate the perturbation p from the sign of the loss gradient.
- Carlini-Wagner type attacks. These algorithms minimize perturbation size subject to a requirement that the performance loss below some threshold.
- Backward Pass Differentiable Approximation. These algorithms approximate the gradients of non-smooth functions (such as the quantization function) with another function.

14.3 Innovation: Functional Finetuning

The behaviour of the decoder D, which takes the latent variable $\hat{y}$ and outputs a prediction $\hat{x}$, is controlled by the parameters of the decoder's neural network. These parameters include:
- The matrices of each linear function in the decoder. These are sometimes called weight matrices. In a convolutional neural network, these are the kernel weights of the convolutional kernel. For example, in one layer of a convolutional neural network, the output of a layer may be given as y=K*x+b. Here K is a convolutional kernel, and b is a bias vector. Both K and b are parameters of this layer.
- The activation functions (non-linearities) of the neural network may be parameterized in some way. For example a PReLU activation function has the form PReLU(x)=max{ax,x}

The parameter a could act on a particular channel; could be a single scalar; or could act on a per-element basis.
- The quantization function may be parameterized by the 'bin size' of the quantization function. For example, let round(x) be the function that rounds real numbers to the nearest integer. Then the quantization function Q may be given as $$Q(y) = \delta \text{ round}\left(\frac{y}{\delta}\right)$$

The parameter $\delta$ controls the bin size of the rounding function. The parameter $\delta$ could act on a particular channel of y; could be a single scalar; or could act on a per-element basis.

Figure 109:
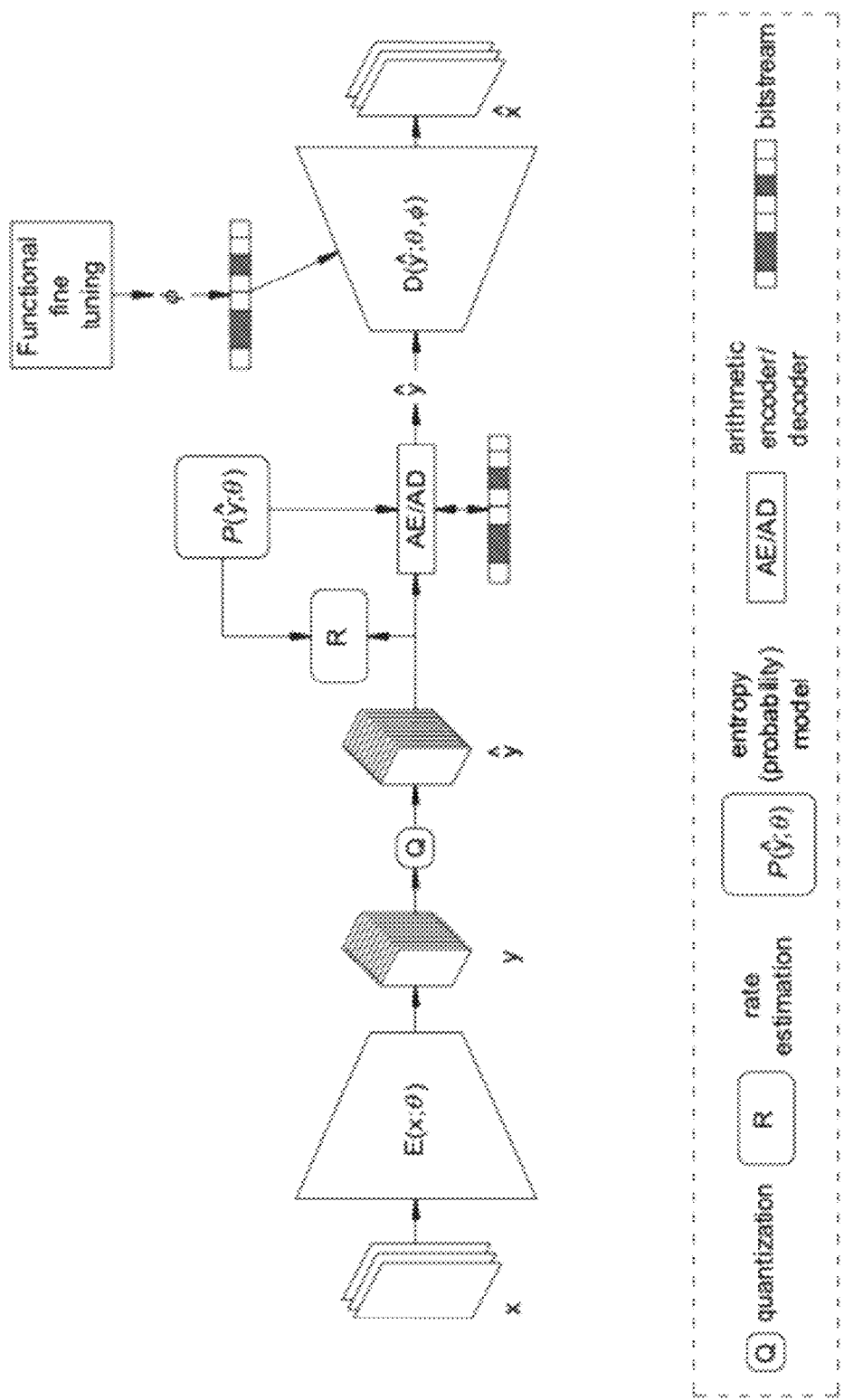
FIG. 109 shows an example of an AI-based compression pipeline with functional fine-tuning. In addition to encoding the latents $\hat{y}\in Z^n$, an additional parameter $\phi$ is encoded and decoded. $\phi$ is a parameter that controls some of the behaviour of the decoder. The variable $\phi$ is computed via a functional fine-tuning unit, and is encoded with a $\phi$ lossless compression scheme.

After a compression pipeline has been trained, in a standard pipeline all of the parameters (denoted $\theta$) of the decoder are fixed and immutable. The innovation of functional fine-tuning is that in fact, some or all of the parameters of the decoder may be modified on a per-input basis. That is, a functional finetuning unit (see FIG. 109 for example) may calculate some additional parameters $\phi$. These additional parameters may modify the original parameters $\theta$ in some way, or could parameterize aspects of the decoder (such as the weight matrices, the activation functions, or the bin size). These additional parameters are able to powerfully modify the behaviour of the decoding function, and can offer impressive performance gains.

Of course, since the additional parameters $\phi$ are calculated on a per-input basis, and so they must be encoded in the bitstream in some way, as meta-information in the bitstream. Thus, the additional parameters $\phi$ come with the cost of additional bits. However it is hoped that the extra information needed to represent $\phi$ is compensated by improvements to the bitstream length of $\hat{y}$ and/or with a reduction in distortion between x and $\hat{x}$.

Figure 110:
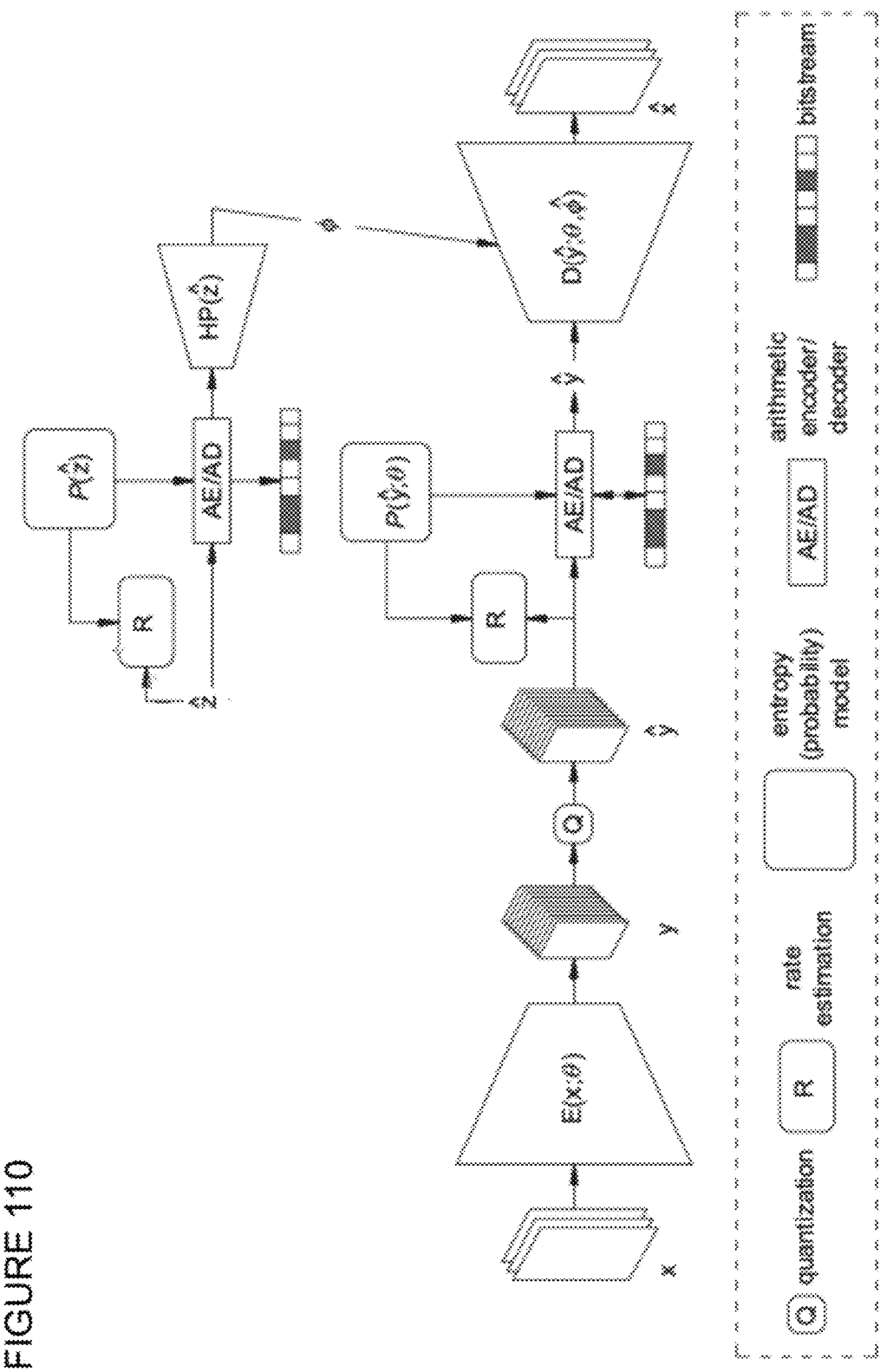
FIG. 110 shows an example of an AI-based compression pipeline with functional fine-tuning, using a hyper-prior HP to represent the additional parameters $\phi$. An integer-valued hyper-parameter $\hat{z}$ is found on a per-image basis, which is encoded into the bitstream. The parameter $\hat{z}$ is used to parameterize the additional parameter $\phi$. The decoder D uses $\phi$ as an additional parameter.

The additional parameters $\phi$ may be encoded in the bitstream in one of several ways.
- The additional parameter $\phi$ may be the output of an additional hyper-prior network (see FIG. 110 for example). In this setup, an integer valued hyper-parameter $\hat{z}$ is encoded to the bitstream using an arithmetic encoder/decoder, and a probability model on $\hat{z}$. In other words, $\phi$ is itself parameterized by $\hat{z}$. The hyper-parameter $\hat{z}$ could be chosen in several ways:
    - Given an input x and latent $\hat{y}$, the variable $\hat{z}$ can be chosen on a per-input basis, so as to minimize the standard rate-distortion trade-off (since the bitstream length of $\hat{z}$ can be estimated with the probability model on $\hat{z}$).
    - Given a latent $\hat{y}$, the variable $\hat{z}$ could be defined as $\hat{z}=Q(HE(\hat{y}))$, where HE is a 'hyper-encoder', i.e. another neural network.
- The additional parameter $\phi$ may be the output of a context model. A context model is any model that uses previously decoded information (say, $\hat{x}$ or $\hat{y}$). For example, if an image is decoded in a pixel-by-pixel fashion, a context model takes in all previously decoded pixels. An autoregressive model is an example of a context model.
- The additional parameter $\phi$ could be encoded with a lossless encoder. This includes for example run-length encoding.

Other ways to use the additional parameter in the decoder include:
- The additional parameters could be a discrete perturbation of the decoder weights $\theta$. That is, the decoder could take as weights $\theta+\hat{\phi}$, where $\hat{\phi}$ belongs to some discrete set of perturbations. A lossless encoding scheme would be used to encode symbols from this discrete set of perturbations.
- The general parameters $\theta$ could be modified by a perturbation p, where the perturbation is parameterized by $\phi$. So for example the decoder could take as weights $\theta+p(\phi)$. This perturbation could be modeled by a low dimensional parameterization, such as a normal distribution, or any other low-dimensional approximation. For instance, the weight kernels of a convolutional network could be perturbed on a channel-by-channel basis by a parametric function of $\phi$.
- The additional parameters could multiply the decoder weights $\theta$. This could be on a per-channel basis, or a per-layer basis (or both per-channel and per-layer). distribution An illustration of how $\phi$ could be used is the following. Suppose $\phi$ could be drawn from a finite set, so that it can be encoded using a lossless encoder. Then, for a given $\hat{y}$ (the quantized latent produced from x by the encoder), $\phi$ could be chosen to minimize the rate-distortion trade-off (where now rate measures the additional bitstream length of encoding $\phi$):

$$\min_{\phi} R(\phi) + dist(x, D(\hat{y}; \theta, \phi)) \tag{14.10}$$

Here $R(\phi)$ is the rate (bitsteam length) of $\phi$, and $\hat{x}=D(\hat{y}; \theta, \phi)$ is the output of the decoder. In this example the decoder is parameterized by both the general parameters $\theta$ (fixed after the compression pipeline has been trained), and $\phi$ (which are chosen on a per-input basis according to the optimization procedure).

Note that finetuning the decoder D (this section) and finetuning the latents (Section 14.2), are not mutually exclusive procedures, and can complement each other.

14.4 Innovation: Finetuning the Network Path

A convolutional neural network is made up of a series of convolutional operations, and activation functions. Let's let the input to one of these convolutional operations be a tensor of shape $C_{in} \times H \times W$. Given an input x and a convolutional kernel K with $C_{in}$ input channels, and $C_{out}$ output channels, the convolutional operation can be written as $$y_j = \sum_{i=1}^{C_{in}} K_{ji} * x_i \tag{14.11}$$

Figure 111:
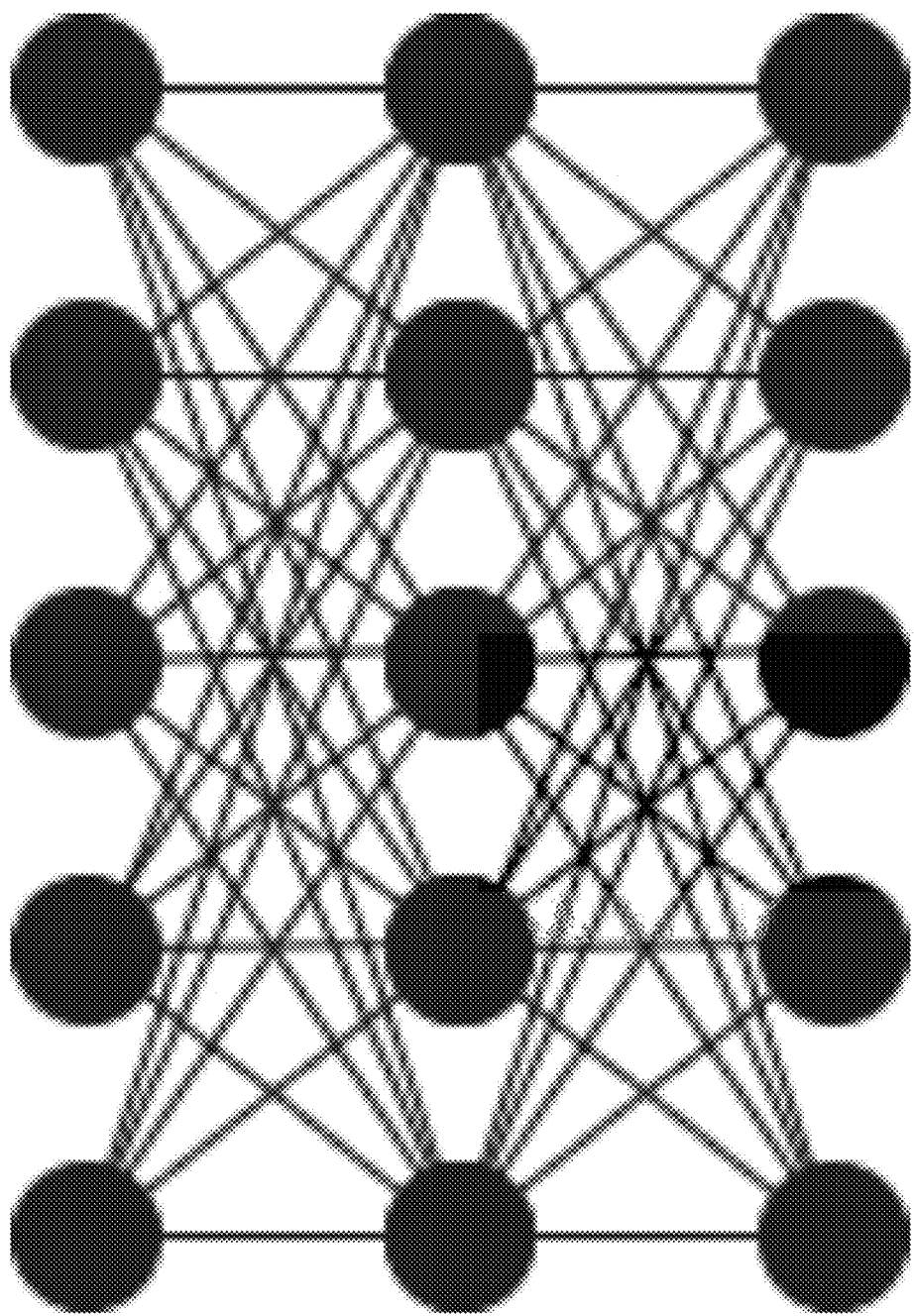
FIG. 111 shows an example of a channel-wise fully connected convolutional network. Network layers (convolutional operations) proceed from top to bottom in the diagram. The output of each layer depends on all previous channels.

That is, the j-th output channel is the sum of convolutions over the input channels. This can be viewed as a fully-connected network over the input channels: the output of each layer depends on all previous channels. See for example FIG. 111.

The idea of this section is to sparsify the convolutional kernels of each layer, on a per-input basis (to sparsify means to render an object sparse, in that it has few non-zero elements). This means that, given a fixed input to the neural network, many of the channel weights will be inactivated, and not used in the computation. This can be done for example with a binary mask M, where M has shape $C_{out} \times C_{in}$. I.e. $m_{ij} \in \{0, 1\}$. Then, $$y_j = \sum_{i=1}^{C_{in}} (m_{ij} K_{ji}) * x_i \tag{14.12}$$

Figure 112:
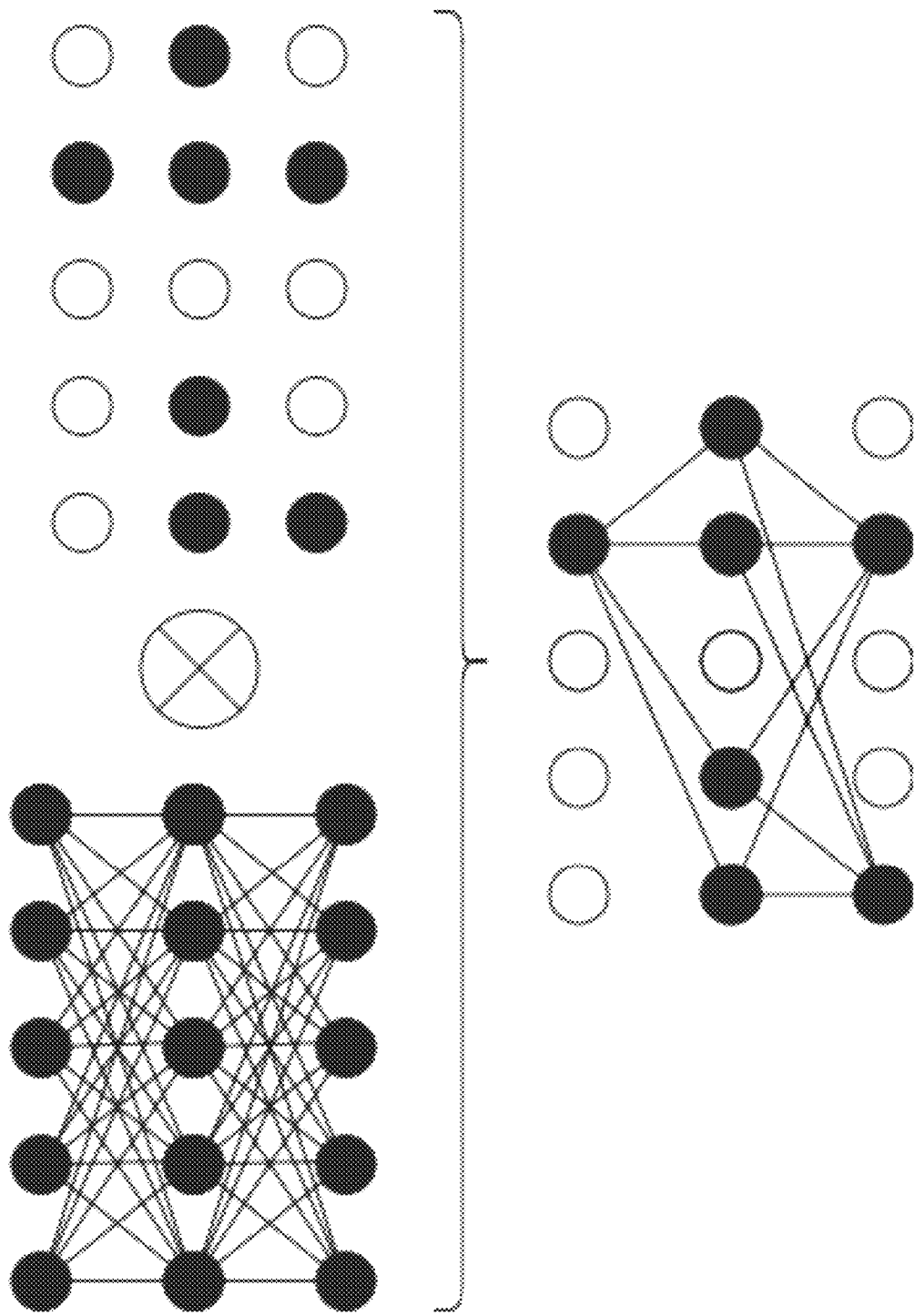
FIG. 112 shows an example of a convolutional network with a sparse network path. A mask (on the right-hand side) has been applied to the fully-connected convolutional weights (left-hand side) on a per-channel basis. Each layer has a masked convolution (bottom) with output channels that do not depend on all previous channels.

If the mask has many zero elements, this can massively reduce the number of computations needed in each layer, for only channels with non-zero masks will be used in the computation. This is illustrated for example in FIG. 112.

Importantly, the mask can be optimized on a per-input basis. For example, the mask can be chosen to improve the rate-distortion loss of the input. The optimization of the mask can be done in several ways:

Ranking-based mask Each connection (input-output pair) in each layer is assigned a score. The score is mapped to the interval [0, 1]. During optimization, the scores for each layer are chosen to minimize a loss, such as the rate-distortion trade-off of the input. Then, only those scores with a cutoff above a certain threshold are used. The mask used at decode time is the binarized scores (1 for those scores above the threshold; 0 for those below the threshold).

Stochastic mask At the beginning of optimization, connections are sampled randomly as Bernoulli trials from $\{0, 1\}$, with equal probability. However, as training progresses, connections that appear to improve the performance of the network become more likely to be activated (set to 1.). Connections that harm the network, or appear not to be useful, become more likely to be deactivated (set to 0).

Sparsity regularization The mask values may be penalized by a sparsity regularization term, such as the $\ell_1$ norm of the mask values, encouraging sparsity of the mask weights. Updates to the mask weights may be done using proximal update rules, including hard thresholding or iterative shrinkage.

The binary mask must be transmitted in the bitstream. The binary mask can be encoded with any lossless encoder.

Note that choosing the optimal mask is itself a non-linear operation. Therefore, it may be possible to use a decoder D without any other non-linear activation functions. Once the mask has been chosen, the masked decoder network is a series of linear transformations, which may massively speed up decode time.

14.5 Concepts

1. The innovation of post-processing image/video-specific finetuning for the AI-based compression pipeline. In this context, finetuning includes: Latent fine-tuning, Functional Finetuning and Path Finetuning. See Sections 14.2, 14.3, 14.4.
2. The innovation of post-processing image/video-specific finetuning for the AI-based compression pipeline using the method: Gradient descent and other 1st order approximation methods. See 14.2.3.
3. The innovation of post-processing image/video-specific finetuning for the AI-based compression pipeline using the method: 2nd order approximation methods. See 14.2.3.
4. The technique of receptive field methods and finetune-batching to make the fine-tuning algorithms significantly faster. This approach is not restricted to the fine-tuning method and works with most approaches. See 14.2.3.
5. Post-processing image/video-specific finetuning for the AI-based compression pipeline using the method: Gaussian Processes. See 14.2.3.
6. Post-processing image/video-specific finetuning for the AI-based compression pipeline using the method: Hard Thresholding and Iterative Shrinkage Processes. See 14.2.3.
7. Post-processing image/video-specific finetuning for the AI-based compression pipeline using Reinforcement Learning methods. See 14.2.3.
8. Finetuning anything in the AI-based Compression pipeline as a reverse adversarial attack. Thus, all literature and methods from this domain may apply to us. See 14.2.4.
9. Post-processing image/video-specific finetuning for the AI-based compression pipeline using metainformation through different approaches. See 14.3.
10. Post-processing image/video-specific finetuning for the AI-based compression pipeline using path-specific data through different approaches. See 14.4.

15. KNet—Conditional Linear Neural Network Decoder

15.1 Introduction

The current media compression advances of state-of-the-art AI-based image and video compression pipelines are still severely limited by the computational demand of these algorithms. Practical use of better compression methods requires these approaches to run in real-time, defined as at least 25 frames per second decoding time. Up until this point, there are no learned image and video compression pipelines capable of this feat. In fact, current AI-based compression approaches are at least 1,000×too slow and computational-heavy to run in real-time [3]. Here novel methods of offloading decoding cost to the encoding phase for a learned image and video compression pipeline are presented. Our innovation uses metadata to transform the conditioned decoder into a linear function to realise real-time decoding times for high-resolution data. These methods may be collectively referred to as KNet.

Lossless data compression is about minimising the amount of information required to explain the data. The data could be an image, video, VR-data, AR-data, satellite data, medical data, text et cetera, so long as it can be represented in some latent, compressed form, that holds the same amount of information as the original data. Lossy compression is the same as lossless compression without the requirement to recreate the original data perfectly but allowed to have some distortion in the output. Our described innovation can be applied to lossy and lossless compression.

Compression algorithms have an encoding part which compresses the data, and a decoding part which decompresses the compressed data into the original data (with some distortion). Compression codecs are well-researched and standardised compression algorithms.

We call all compression codecs that do not utilise neural networks "traditional compression" approaches. The vast majority of all codecs, and all commercially available codecs, are from the traditional compression approach. In the past three years, there is a new class of compression algorithms being researched. These new algorithms are based around neural networks, have entirely different properties compared to the traditional approaches, and we call them "AI-based compression" methods.

15.1.1 the Importance of Decoding Runtime

Recently, AI-based image and video compression has shown tremendous promise and is already at a maturity level to outperform traditional-based image and video compression methods such as JPEG, JPEG2000, WEBP, BPG, HEIC, HEIF, H.264, H.265, AV1, H.266 [4].

A remaining challenge to transition this technology from "research" into an application is the issue of runtime. An image and video compression codec that cannot run in real-time is not a viable product. Especially noteworthy is the decoding time; users expect to see content, e.g. movies, with 25/30/60/90 frames-per-second (fps). Thus, the decoding time of a compression algorithm must be under 40/33.3/16.6/11.1 milliseconds per frame, respectively, to satisfy the demand of the user.

Figure 113:
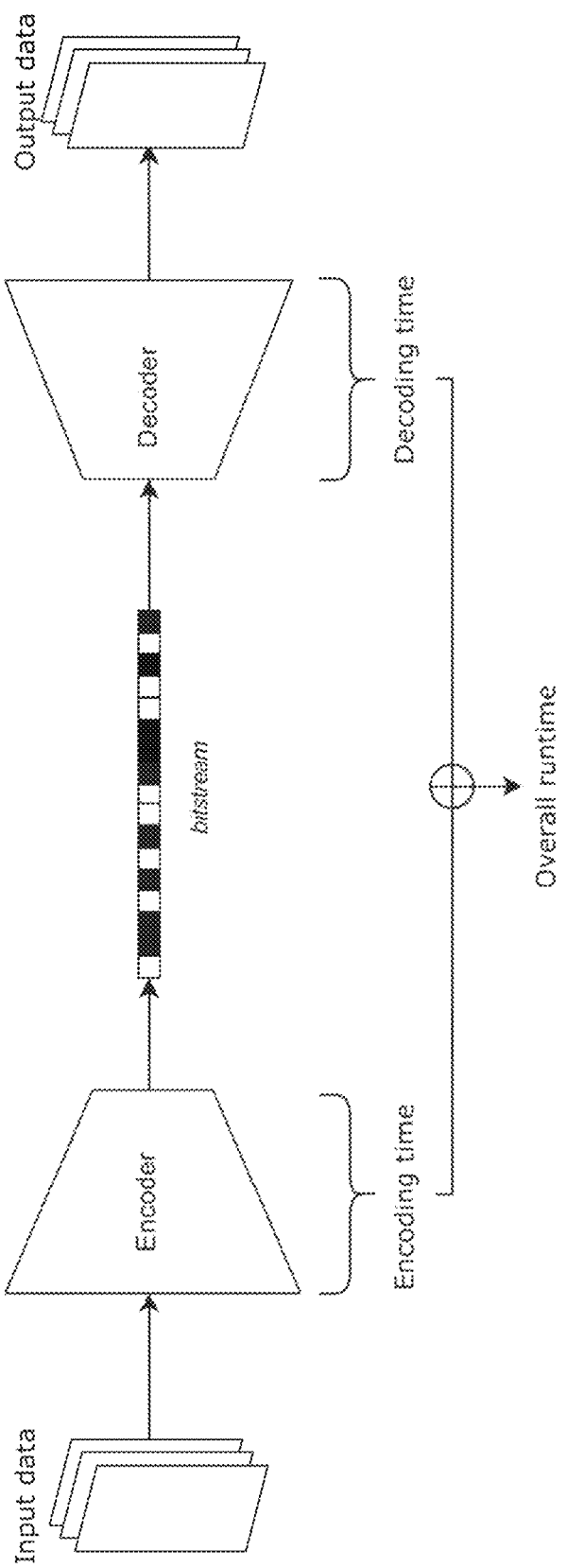
FIG. 113 shows an example high-level overview of a neural compression pipeline with encoder-decoder modules. Given the input data, the encoder spends encoding time producing a bitstream. Decoding time is spent by the decoder to decode the bitstream to produce the output data, where, typically, the model is trained to minimise a trade-off between the bitstream size and the distortion between the output data and input data. The total runtime of the encoding-decoding pipeline is the encoding time+decoding time.

Note that the algorithm's runtime and the decoding runtime are related but not the same properties. The codec's overall runtime is the encoding time plus the decoding time. The encoding time is measured as the time it takes to compress raw content into the compressed bitstream. The decoding time is measured as the time it takes to decompress the bitstream into the final output content. FIG. 113 illustrates an example of this concept.

In the vast majority of the use cases for image and video data, decoding time is significantly more important than encoding time. This asymmetry is reflected by the asymmetric encoding-decoding process of traditional image and video compression approaches. Algorithms such as WebP, HEIC, HEIF, HEVC, AV1 and others, have 100×-1000× runtime differences between encoding and decoding, with decoding being quick and encoding being slow. For instance, for the use case of video-on-demand, Netflix states [5] that a 100× complexity increase in encoding would be acceptable without causing any problems, given that it is accompanied by better compression performance with adequate transmission time of the data to all end users.

The current state-of-the-art neural networks used in AI-based compression approaches do not utilise this asymmetry property and are mostly symmetric. Thus, the state-of-the-art of AI-based compression approaches have similar decoding and encoding times, both of which are, in most cases, too slow to be marketable.

15.1.2 the Challenge of Decoding Runtime in AI-Based Compression

Every compression codec faces the challenge of balancing runtime and performance this is especially true for AI-based compression. AI-based compression builds its framework around the usage of neural networks, and neural networks require immense computational efforts. To give three examples:

First, using the performance-optimised AI-based compression pipeline from [6], the runtime is 230 ms for a 768×512 image on a non-mobile CPU, with smartphone CPUs being 5×-10× slower than non-mobile CPUs. Extrapolating this data to higher-resolutions, we can find approximate decoding time for various resolutions in the table below:

| Decoding Runtime for Kodak, 4K, 8K Resolutions | | | |
|---|---|---|---|
| Device | Kodak (768 × 512) | 4K-Frame | 8K Frame |
| Non-Mobile | 0.23 sec | 4.90 sec | 19.61 sec |
| Mobile | 1.15 sec | 24.50 sec | 98.05 sec |

Thus, the "efficient" AI-based compression pipeline is 150× (non-mobile) to 750× (mobile) times too slow to be used in practice for 4K 30 fps video. And the "efficient" AI-based compression pipeline is 600× (non-mobile) to 3,000× (mobile) times too slow to be used in practice for 8K 30 fps video.

Second, we can calculate the number of floating-point operations (FLOPs) required by the decoding neural network using the architecture described in [4]. The decoding neural network requires 48 TFLOPs. Modern smartphones can, at best, process up to 100 GFLOPS to 1 TFLOPs. Thus, running a 4K decoding pass with 30 fps would require 1,440 TFLOPS or 1,440× the processing power of modern smartphones, assuming 100% of the theoretical FLOP-capacity can be used.

Finally, we can look at the decoding times of different AI-based image compression approaches of the CLIC challenge [7]. The leaderboard of the CLIC challenge 2020 shows the average decoding times of different compression approaches over the CLIC Validation image dataset, consisting of 102 mobile and professional photos of varying resolutions, ranging from 384 to 2048 pixels per dimension. While BPG, a traditional compression approach, requires 696 ms, the AI-based approaches require on average roughly 100s (some algorithms up to 300s) per image. Thus, the AI-based methods are 150×-450× times slower than the traditional approaches. This comparison would be even worse for practical use cases, as the BPG algorithm was executed on a CPU, whilst the AI-based algorithms were executed on computationally-powerful GPU platforms. In practice, GPUs are rarely available, and CPUs are up to 10×-100× slower than GPUs for neural network executions.

In short, current AI-based compression pipelines can not be run in real-time. In fact, decoding times are multiple orders of magnitude too slow for even 30 fps-streaming. We need radical change to make it work.

15.2 Background Knowledge

15.2.1 Linear and Nonlinear Functions

A linear function is a function $f(x)$ for which Properties 15.1 and 15.2 below hold:

$$f(a+b)=f(a)+f(b) \quad (15.1)$$

$$f(\lambda \cdot a)=\lambda \cdot f(a) \quad (15.2)$$

We can represent any linear function as a matrix multiplication and an addition. For an input $x \in \mathcal{L}^{N \times 1}$, a weight matrix $W \in \mathcal{L}^{M \times N}$, a bias $b \in \mathcal{L}^{M \times 1}$, and $[\cdot]$ being the standard matrix-vector multiplication operator, a generalised formulation of linear functions is thus:

$$f(x)=W \cdot x+b \quad (15.3)$$

A striking property of linear functions is that the function-wise composition of two, or multiple, linear functions remains a linear function. For instance:

$$f(x) \text{ is linear}, g(x) \text{ is linear} \rightarrow h(x)=g(f(x))=(g \circ f)(x) \text{ is linear} \quad (15.4)$$

Mathematically, with the above-mentioned matrix-bias-vector notation, this is easy to prove. Let x be the input, $W_f$ and $b_f$ be the parameters for the first generalised linear function $f(\bullet)$, and $W_g$ and $b_g$ be the parameters for the second generalised linear function $g(\bullet)$. Then, the function composition $(g \circ f)(\bullet)=h(\bullet)$ can be written as $$\begin{aligned}(g \circ f)(x) &= W_g \cdot (W_f \cdot x + b_f) + b_g \quad (15.5) \\ &= W_g \cdot W_f \cdot x + W_g \cdot b_f + b_g \\ &= (W_g \cdot W_f) \cdot x + (W_g \cdot b_f + b_g) \\ &= W_h \cdot x + b_h \\ &= h(x)\end{aligned}$$

where the function-wise composition of the two linear functions $f$ and $g$ give rise to a new linear function h with parameters $W_h$ and $b_h$.

Nonlinear functions are all functions for which either of the Properties 15.1 or 15.2 do not hold. Nonlinear functions have significantly higher expressive power and modelling capabilities than linear functions. For a conceptual intuition, linear functions are only able to represent straight lines, whereas nonlinear functions can also represent curves, something which is much more difficult for linear functions. Therefore, a nonlinear function has much more modelling flexibility than a linear one.

Figure 114:
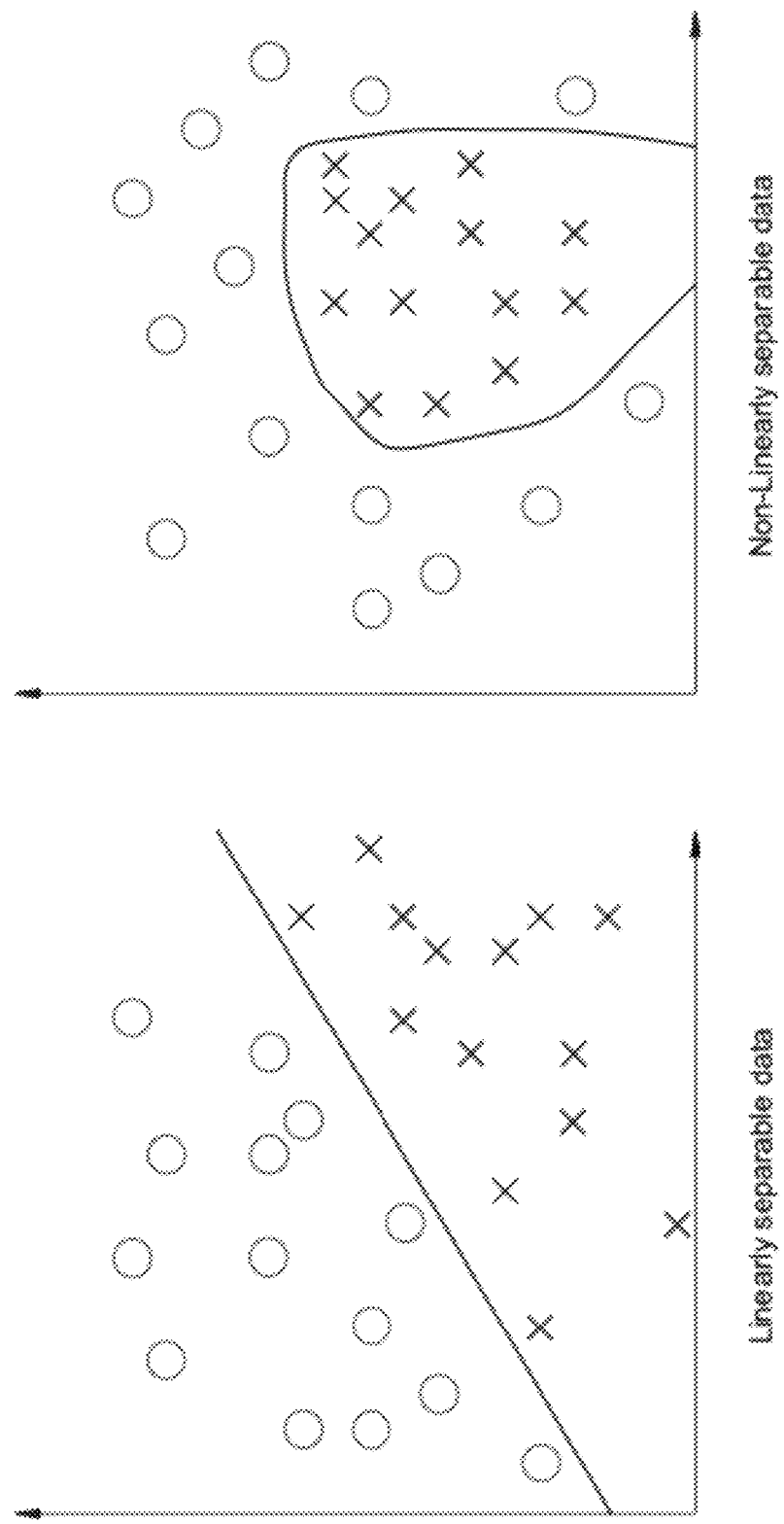
FIG. 114 shows examples relating to modelling capacity of linear and nonlinear functions.

For example, in FIG. 114, a linear function can be expressed as to easily separate the two different classes of data points in the left plot. However, it will be more difficult to perform the same task in the right plot, whereby a nonlinear function would be more capable for this problem.

15.2.2 Nonlinearities within Neural Networks

A neural network is conventionally comprised of alternating linear and nonlinear operations cascaded iteratively. Most neural networks are based around the repeating structure:

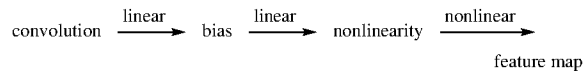

Figure 115:
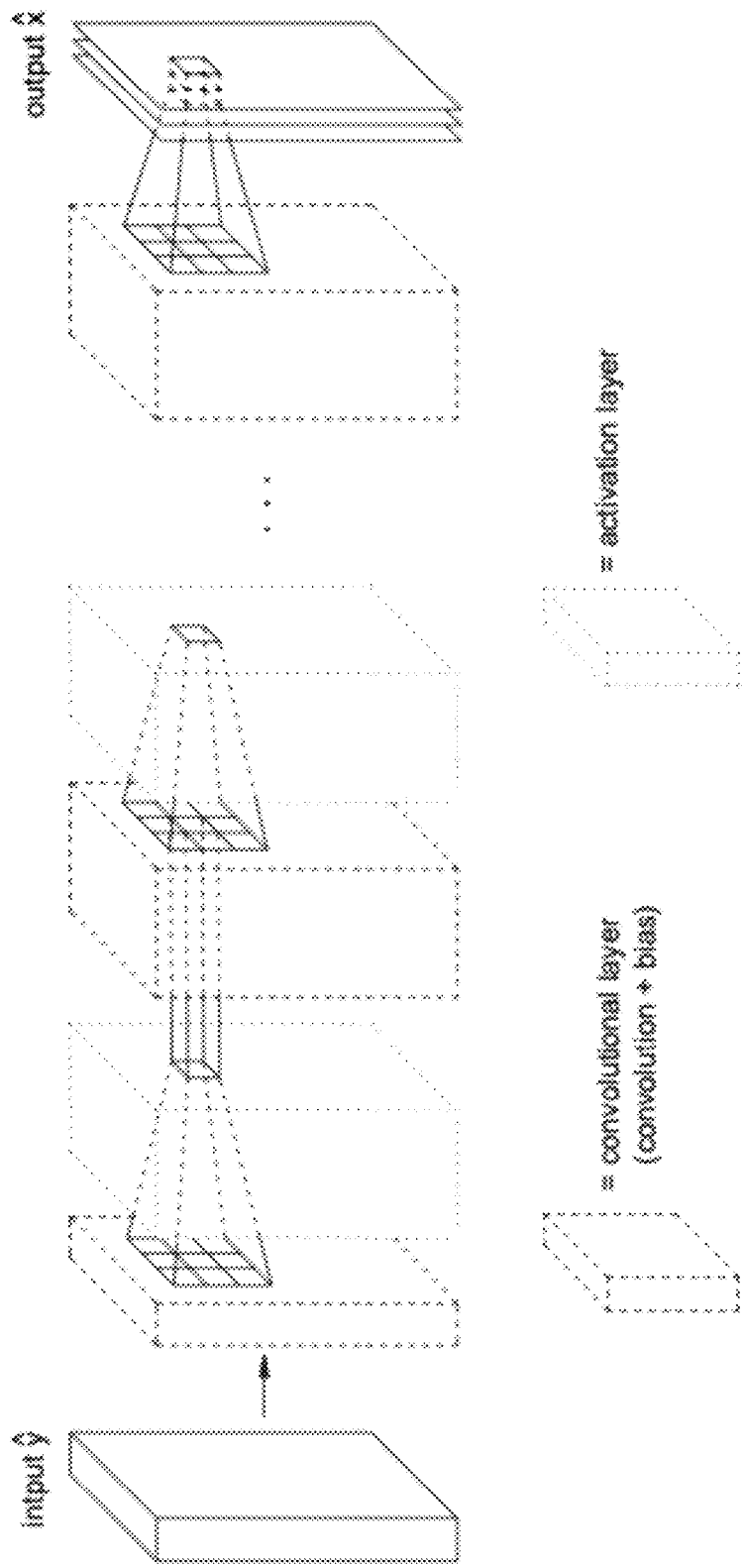
FIG. 115 shows an example of interleaving of convolutional and nonlinear activation layers for the decoder, as is typically employed in learned image compression.

As illustrated for example in FIG. 115, chaining together multiple of these operations is the backbone of every modern neural network.

Please note that there are numerous ways of expressing n-dimensional convolution operations. We can either use the convolution symbol [$\otimes$], or instead, flatten the input and use the matrix-vector product. Both expression are equivalent; after all, a convolution is a linear function, and thus, can be written in the generalised linear function format mentioned earlier.

$$\text{input } x \in \mathbb{R}^{N \times M} \quad (15.6)$$

$$\text{convolution kernel } k \in \mathbb{R}^{U \times V}$$

$$x_{flat} \in \mathbb{R}^{(N \cdot M) \times 1}$$

$$W_k = k_{reshaped} \in \mathbb{R}^{(\lfloor N - \frac{U}{2} \rfloor \lfloor M - \frac{V}{2} \rfloor) \times (N \cdot M)}$$

$$f(x) = k \otimes x \Leftrightarrow f(x) = W_k \cdot x_{flat}$$

In neural network semantics, a nonlinearity is interchangeable with the term activation function, which inherits its name based on the idea of the action potential firing within biological neurons. Typical nonlinear activation functions include sigmoid, Tanh, ReLU and PreLU. Training a neural network can be seen as fitting a nonlinear function to input data.

It is essential to understand the significance behind nonlinearities inside a neural network. The nonlinear operations that follow the convolution and bias operations are the reason for the nonlinearity of the entire network and are the reason for the expressive power of neural networks. It is commonly accepted that the more nonlinear a neural network is, the better its problem modelling capacity. Even further, the entire proof of neural networks being universal function approximators relies on the nonlinearity, and the proof does not work without these operations [8][9].

In short, nonlinearities are an essential part of neural networks, and cannot be removed without significant penalties to the network's expressive power.

Mathematically, we can write a neural network with N repeated convolution-bias-activation structures as:

$$f_N(W_N \cdot f_{N-1}(W_{N-1} \cdot (\ldots f_1(W_1 \cdot x+b_1))+b_{N-1})+b_N) \quad (15.7)$$

With $f_i(\bullet)$ being the ith layer nonlinearity, $W_i$ representing the ith layer convolution and bi representing the ith layer bias.

15.2.3 Purely Linear Neural Networks

Let us now assume that we would remove the nonlinear operations from a neural network. Then the typical neural network chain would devolve to a sequence of purely linear operations:

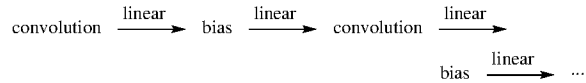

Mathematically, we end up with a composition of linear functions. Owing to (15.5), we can thus write the entire network as one single linear function:
Proof:

$$f(x) = f_N(W_N \cdot (f_{N-1}(W_{N-1} \ldots (f_1(W_1 \cdot x) + b_1)) + b_{N-1}) + b_N) \quad (15.8)$$

$\downarrow$

Figure 116:
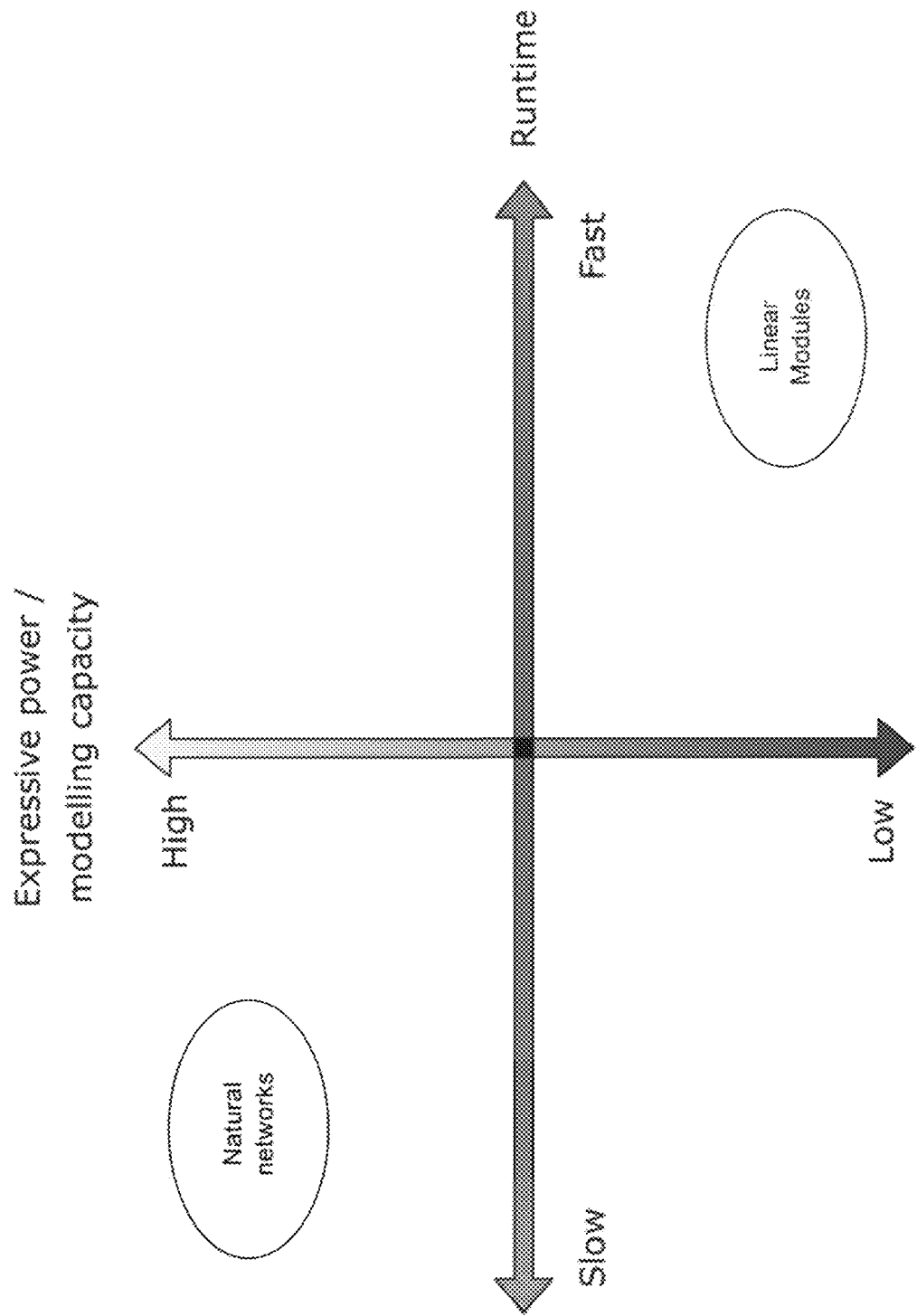
FIG. 116 shows an example outline of the relationship between runtime and modelling capacity of linear models and neural networks.

Remove nonlinear functions $f_N(\cdot)$ $\downarrow$ $= W_N \cdot (W_{N-1} \cdot x + b_{N-1}) + b_N$ $= (W_N \cdot W_{N-1}) \cdot x + (W_N \cdot b_{N-1} + b_N)$ $= W_{new} \cdot x + b_{new}$ Thus, a purely linear N-layer neural network is equivalent to a 1-layer neural network. Mathematically, such a network is equivalent to using multivariate linear regression. Since this neural network has demoted to a purely linear function, it loses expressive power. However, thanks to the ability to squash a chain of linear functions into one linear composition function, the number of operations necessary to perform a forward pass has been reduced dramatically. As a result, the network can gain significantly in runtime performance, since a linear single-layer network can be executed much faster, and with substantially less memory footprint (memory access time) than an N-layer network. In essence, choosing the network complexity induces an implicit trade-off between predictive performance and runtime. We visualise this trade-off in FIG. 116 by example.

Nonlinear Neural Network: conv→bias→nonlinearity→conv→bias→non-linearity→ . . .

Linear Neural Network: conv→bias→conv→bias→conv→bias→ . . .

15.3 an Innovation

15.3.1 a Novel Class of Nonlinearities

The current state-of-the-art in neural network architecture design is to use element-wise nonlinearities. In other words, every element in an input tensor is activated independently from one and another, and only depends on its current value as it is passed into the activation function. FIG. 117 showcases some of the most popular non-linearities.

Instead of thinking of an element-wise nonlinearity as a function, alternatively, we can think of it as an element-wise multiplication with a tensor that is dependent on its input. For instance, without loss of generality, the ReLU function in Equation (15.9) can be thought of as an element-wise multiplication between the input x and a mask R, consisting of 1s and 0s, that has been conditioned on the input x (15.10). Thus, ReLU can be restated as (15.11), where $\odot$ is the element-wise multiplication operation.

$$ReLU(x) = \begin{cases} x, & \text{if } x > 0 \\ 0, & \text{otherwise} \end{cases} \quad (15.9)$$

$$ReLU(x) \Leftrightarrow x \odot R(x), R \in \{0,1\}^{N \times M}, x \in \mathbb{R}^{N \times M} \quad (15.10)$$

$$ReLU(x) = x \odot R(x) \quad (15.11)$$

With this interpretation of activation functions, our innovation is to replace the element-wise nonlinearity with a convolution operation whose parameters have been conditioned on its inputs. The values attained by the parameters of these convolutions, comprised by a convolution kernel, are dependent on the input with the dependency being fully described by a nonlinear function.

Let's assume we have a neural network with two convolutional layers represented by $W_1$ and $W_2$. We will ignore the bias without loss of generality. The exact definitions of the kernel weights of $W_1$ and $W_2$ determine whether the neural network is a linear function or a nonlinear function. If $W_1$ and $W_2$ are both operations with fixed convolution kernel, e.g. the kernel weights are constant across all input, the network is linear. However, if one of the operations, let's say $W_2(\bullet)$ without loss of generality, is dependent on the input, the situation changes. If the function determining the weights of $W_2$, namely $W_2(\bullet)$, is nonlinear, then the neural network is nonlinear. If not, then the network is linear.

$W_2 \cdot W_1 \cdot x$ is linear $\Leftrightarrow$ If $W_2$ and $W_1$ are constant $W_2(W_1 \cdot x) \cdot W_1 \cdot x$ is linear $\Leftrightarrow$ Only if $W_2(W_1 \cdot x)$ is linear $W_2(W_1 \cdot x) \cdot W_1 \cdot x$ is non linear $\Leftrightarrow$ Only if $W_2(W_1 \cdot x)$ is non linear $\quad (15.12)$ Chaining multiple layers of a neural network together with the novel convolution nonlinearity, and ignoring the bias for simplicity and without loss of generality, we get:

$$f(x) = W_N(\text{input}_{N-1}) \cdot W_N \cdot W_{N-1}(\text{input}_{N-2}) \cdot W_{N-1} \cdot \ldots \cdot x \quad (15.13)$$
$$\text{input}_0 = x$$
$$\text{input}_1 = W_1 \cdot x$$
$$\text{input}_2 = W_2(\text{input}_1) \cdot W_1 \cdot x$$
$$\vdots$$
$$\text{input}_M = W_M(\text{input}_{M-1}) \cdot W_M \cdot W_{M-1}(\text{input}_{M-2}) \cdot W_{M-1} \cdot \ldots \cdot x$$

This chaining procedure can be termed kernel composition, since the resulting kernel from the sequential convolution kernels is a composite convolution kernel encapsulating all of its constituent kernels. The algorithm of this procedure can be seen in Section 15.3.4 and an example visualisation can be seen under Section 15.5 in FIG. 119.

15.3.2 a Meta-Information Conditioned Decoder

The mathematical structure of the proposed nonlinearities can be expressed as a linear function (such as a convolution operation), whilst the values they attain have originated as a result of nonlinear transformations on the input.

With the above-described innovation, the nonlinear convolution operation, what do we win? It is crucial to note that the entire neural network, composed of convolutions, nonlinear convolutions and biases remains a nonlinear function, with high predictive power but slow runtime.

However, if we condition the neural network on the convolution-kernels of the nonlinear convolution, we end up with a linear network, with the power of a nonlinear network.

The entire network (encoder and decoder) network $\Leftrightarrow$ is a nonlinear function The encoder network $\Leftrightarrow$ is a nonlinear function The decoder network $\Leftrightarrow$ is a nonlinear function The decoder network conditioned on meta-information $\Leftrightarrow$ is a linear function $\quad (15.14)$ Mathematically, this is easy to see, as the conditioning simply crosses out the input-dependencies:

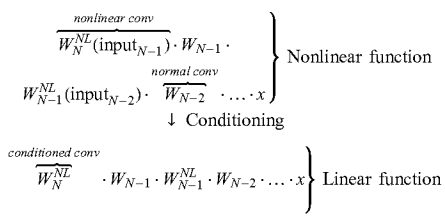

The innovation is to use nonlinear convolution in the Decoder of the AI-based compression pipeline. During the encoding path, the user predicts the nonlinear convolution kernels.

Additional to the compressed bitstream, the encoding-user sends these kernels as meta-information to the receiving user. The receiving user uses the additional meta information and conditions the decoding network on that information, resulting in, from his point-of-view, a purely linear neural network.

Figure 118:
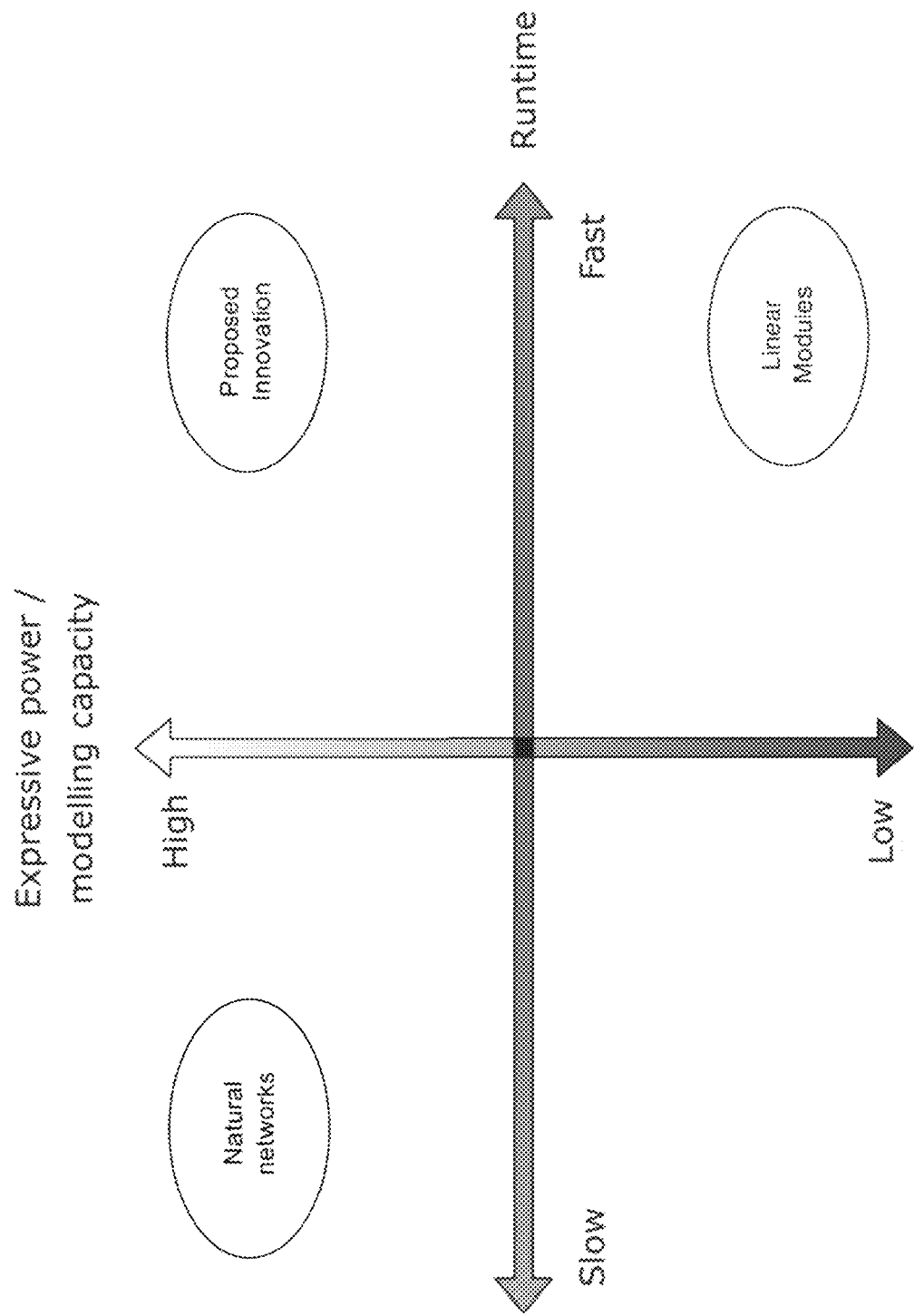
FIG. 118 shows an example outline of the relationship between runtime and modelling capacity of linear models, neural networks and a proposed innovation, which may be referred to as KNet.

Thus, we can combine the predictive power of nonlinear neural networks, with the runtime benefits of purely linear neural network—All at the cost of some additional meta-information. FIG. 118 conceptualises the innovation, in an example.

15.3.3 Notes on the Generalisation

We use nonlinear convolutions as an operation that is nonlinear if it is unconditioned, but which becomes linear once it is conditioned on appropriate meta-information.

We use the nonlinear convolution as an example for numerous potential classes of operations with this property, as it showed the best performance in our tests. However, the innovation comprises all classes of operations with these properties and not merely nonlinear convolutions. For instance, the innovation of conditioned linear decoders will also hold true if we replace the nonlinear convolutions with nonlinear element-wise matrix multiplication; or nonlinear matrix multiplication; or a nonlinear addition operation. The innovation is about the conditioning the make a nonlinear function linear in the context of neural networks; not about the exact way we use doing it.

Let's assume we have a function space $\mathcal{F}$ which we can describe as the union of two disjoint sub-spaces $\mathcal{F}_L$ and $\mathcal{F}_{NL}$. $\mathcal{F}_L$ being the set of linear functions in $\mathcal{F}$, $\mathcal{F}_{NL}$ being the set of nonlinear functions in $\mathcal{F}$.

$$\mathcal{F} = \mathcal{F}_L \cup \mathcal{F}_{NL}$$

$$\mathcal{F}_L \cap \mathcal{F}_{NL} = \emptyset \quad (15.15)$$

Functions in $\mathcal{F}_L$ have fast execution time but limited expressiveness, whereas functions in $\mathcal{F}_{NL}$ have slow execution time but strong expressiveness. Our innovation proposes an efficient way of finding a function $f$ in $\mathcal{F}$ which is in the set $\mathcal{F}_{NL}$, but which is part of the set $\mathcal{F}_{NL}$ when conditioned on additional meta information m.

$$f \in \mathcal{F}_{NL} \text{ and } f|m \in \mathcal{F}_L \quad (15.16)$$

15.3.4 Algorithms

Table 15.1 and Table 15.2 show an example layout of the network architectures used during training and inference of KNet.

TABLE 15.1

Training refers to the layers used by the KNet component in the decoder shown in table 15.2 during network training. Whereas, Inference refers to the layers or operations used during inference. A more generic algorithm of the KNet training procedure is shown in algorithm 15.1. Kernel Composition is described by algorithm 15.2.

KNet Example

| Training | Inference |
|---|---|
| Conv 7 × 7 c192 | Kernel Composition |
| KNet Activation Kernel | Conv 27 × 27 c3 |
| KNet Conv 3 × 3 c192 | |
| KNet Activation Kernel | |
| KNet Conv 3 × 3 c192 | |
| KNet Activation Kernel | |
| KNet Conv 5 × 5 c3 | |

TABLE 15.2

For each module of the proposed network, each row indicates the type of layer in a sequential order. See table 15.1 for the definition of KNet.

| Encoder | Decoder | Hyper Encoder | Hyper Decoder | KNet Encoder | KNet Decoder |
|---|---|---|---|---|---|
| Conv 5 × 5 c192 | Upsample ×4 | Conv 3 × 3 c192 | Conv 3 × 3 c192 | Conv 3 × 3 c192 | Conv 3 × 3 c576 |
| PAU | KNet | PReLU | PReLU | PReLU | PReLU |
| Conv 3 × 3 c192/s2 | | Conv 3 × 3 c192/s2 | Upsample ×2 | AdaptiveAvgPool | Conv 3 × 3 c576/s2 |
| PAU | | PReLU | Conv 3 × 3 c192 | Conv 3 × 3 c384 | PReLU |
| Conv 3 × 3 c192/s2 | | Conv 3 × 3 c192/s2 | PReLU | PReLU | Conv 3 × 3 c192 |
| PAU | | PReLU | UPsample ×2 | AdapativeAvgPool | |
| Conv 5 × 5 c12 | | Conv 3 × 3 c12 | Conv 3 × 3 c192 | Conv 3 × 3 c576 | |
| | | | PReLU | PReLU | |
| | | | Conv 3 × 3 c24 | Adaptive Pool | |
| | | | | Conv 3 × 3 c192 | |

Algorithm 15.1 Example training forward pass for KNet

Inputs:
Input tensor: $x \in \mathbb{R}^{B \times C \times H \times W}$
Target kernel height: $kH \in \mathbb{N}$
Target kernel width: $kW \in \mathbb{N}$
Result:
  Activation Kernel: $K \in \mathbb{R}^{C \times 1 \times kH \times kW}$
  Bitrate loss: $R_k \in \mathbb{R}^+$
Initialize:
m ← # encoder layers
n ← # decoder layers
k ← x
for i ← (1,...,m) do
  | k ← Convolution$_i$(k)

-continued

Algorithm 15.1 Example training
forward pass for KNet

|    k ← Activation$_i$(k)
|    k ← AdaptivePooling$_i$(k, kH, kW)
end
k̂ ← Quantize(k)
R$_k$ ← EntropyCoding(k̂)
for j ← (1,...,n) do
|    k̂ ← Convolution$_j$(k̂)
|    k̂ ← Activation$_j$(k̂)
end
K ← TranposeDims1_2(k̂)

Algorithm 15.2

Kernel Composition

Inputs:
Decoder Weight Kernels: $\{W_i\}_{i=1}^N \in \mathbb{R}^{C_{out,i} \times C_{in,i} \times wH_i \times wW_i}$
Decoder Biases: $\{b_i\}_{i=1}^N \in \mathbb{R}^{C_{out,i}}$
Activation Kernels: $\{K_i\}_{i=1}^{N-1} \in \mathbb{R}^{C_{out,i} \times 1 \times kH_i \times kW_i}$
Result:
Composed Decoder Weight Kernel: $W_d \in \mathbb{R}^{3 \times C_{in,i} \times dH \times dW}$
Composed Decoder Bias: $b_d \in \mathbb{R}^3$
Initialize:
$W_d \leftarrow W_N$
$b_d \leftarrow b_N$
$dH \leftarrow wH_N$
$dW \leftarrow wW_N$
for i ← (N − 1, N − 2, . . . , 1) do
|    $W_d$ ← Pad($W_d$, (kH$_i$, kW$_i$))
|    $W_d$ ← DepthwiseSeparableConvolution($W_d$, Flip(K$_i$))
|    dH ← dH + kH$_i$ − 1
|    dW ← dW + kW$_i$ − 1

|    $b_d \leftarrow b_d + \sum_{c=1}^{C_{out,i}} \sum_{p=1}^{dH} \sum_{q=1}^{dw} b_i W_{d,(\ldots,c,p,q)}$

|    $W_d$ ← Pad($W_d$, (wH$_i$, wW$_i$))
|    $W_d$ ← Convolution($W_d$, Flip(TransposeDims1_2(W$_i$)))
end

15.4 Facilitating KNet Module Training Regression Analysis

One of the problems with the KNet-based architecture is that it is incredibly difficult to train in an end-to-end fashion. This challenge originates from the KNet module requiring a stable input-distribution to train, but the input to the KNet module is constantly changing via backpropagation in an end-to-end setting. This section provides details on how we can train the KNet module in a non-end-to-end fashion.

There are two ways of doing so:
1. We can start off training with a generic convolution module as a temporary stand-in for the KNet module, which is referred to as conv-gen. Then, possibly after convergence has been reached, we could replace the generic convolution module with the KNet module, freeze all the other layers in the network and resume training. This allows the KNet module to be optimised for separately, given the remainder of the network.
2. Similar to the above point, but instead of starting o training with a generic convolution module, we can fit a regression model given the inputted feature vector and the target vector (the ground truth image, for example). This is referred to as conv-reg. For example, a linear regression analysis produces the optimal filter that the KNet module ideally would learn, and using this optimum as an initial proxy for our actual KNet module prediction aids the subsequent training process of actually optimising the KNet module with a frozen autoencoder backbone.

The challenge with the second point described immediately above is that linear regression only works with the assumption of no multicollinearity and assuming it processes semi-sensible inputs (ensuring stable training throughout). Generally, we cannot guarantee either of these. However, there are ways that can help us in the process. For example, for training stability, we can start o training with both a conv-gen and a conv-reg simultaneously, operating in parallel on the same inputs and yielding two different outputs and therefore two different loss components, $\mathcal{L}_{gen}$ and $\mathcal{L}_{reg}$, respectively. The final loss metric $\mathcal{L}$ is hence a weighted sum of these two as such:

$$\mathcal{L} = \alpha \mathcal{L}_{gen} + (1-\alpha) \mathcal{L}_{reg} \quad (15.17)$$

Initially, the weighting factor $\alpha \in [0, 1]$ can be set to its maximum value (or near it), and gradually annealed towards zero. This has the effect of weighing the loss term from giving emphasis to the conv-gen operation, which is stable, to the conv-reg operation, which is closer to the desired behaviour of the KNet module.

To deal with the multicollinearity in our input space, we can use Tikhonov regularisation in our regression analysis. This ensures that the regression calculations are stable given any arbitrary input features. Contrast an ordinary least squares approach (linear regression analysis) with the Tikhonov regression analysis:

$$W_{linear} = (Z^T Z)^{-1} Z^T x \quad (15.18)$$

$$W_{Tikhonov} = (Z^T Z + \lambda I)^{-1} Z^T x \quad (15.19)$$

Here, Z is the design matrix (representing input features to the KNet module), x is the regression target (representing the target data, for example the ground truth image) and $W_{linear}$ and $W_{Tikhonov}$ are the optimal weights produced from linear regression and Tikhonov regression, respectively.

15.5 Supplementary Figures

Figure 119:
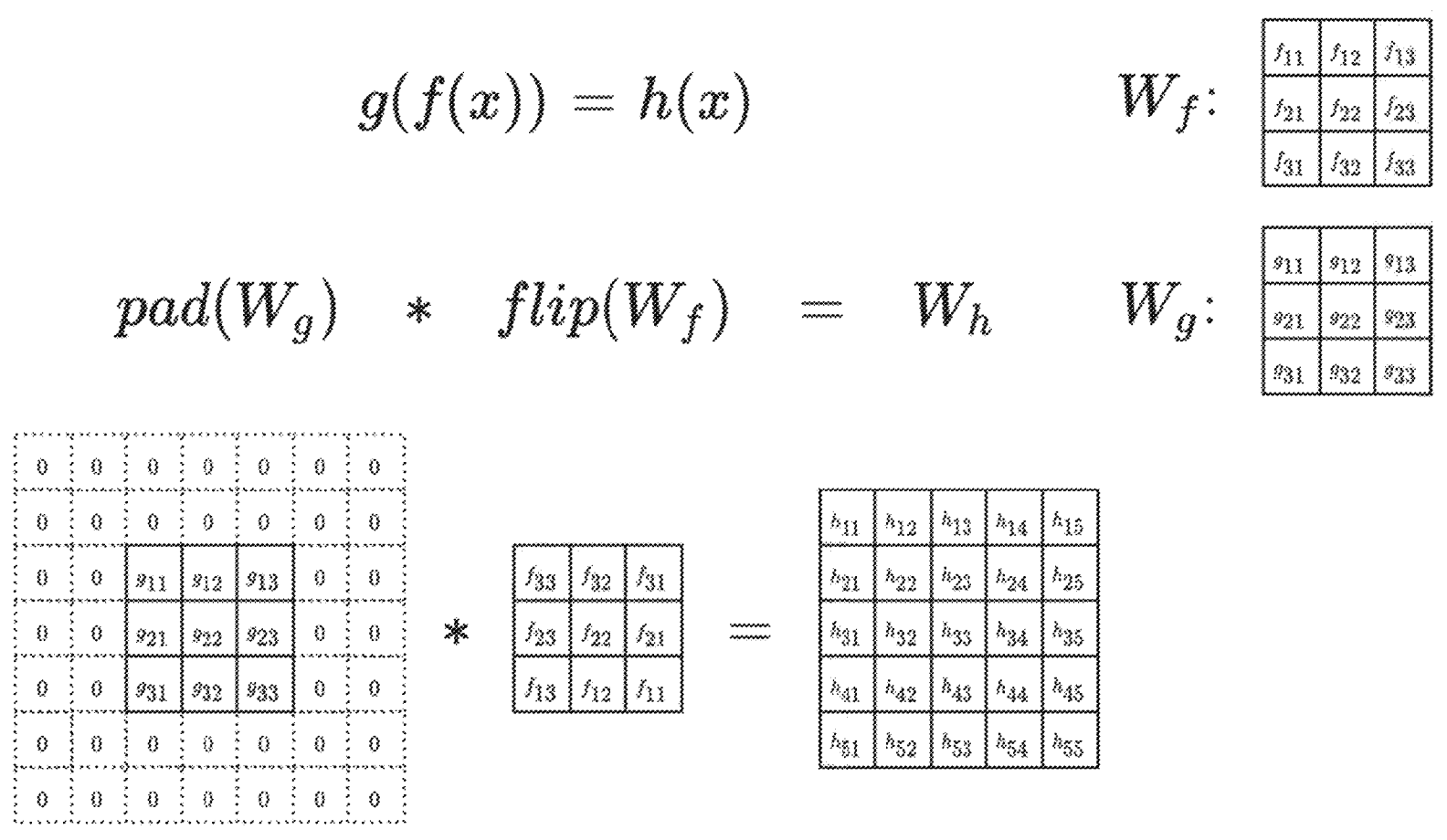
Figure 120A:
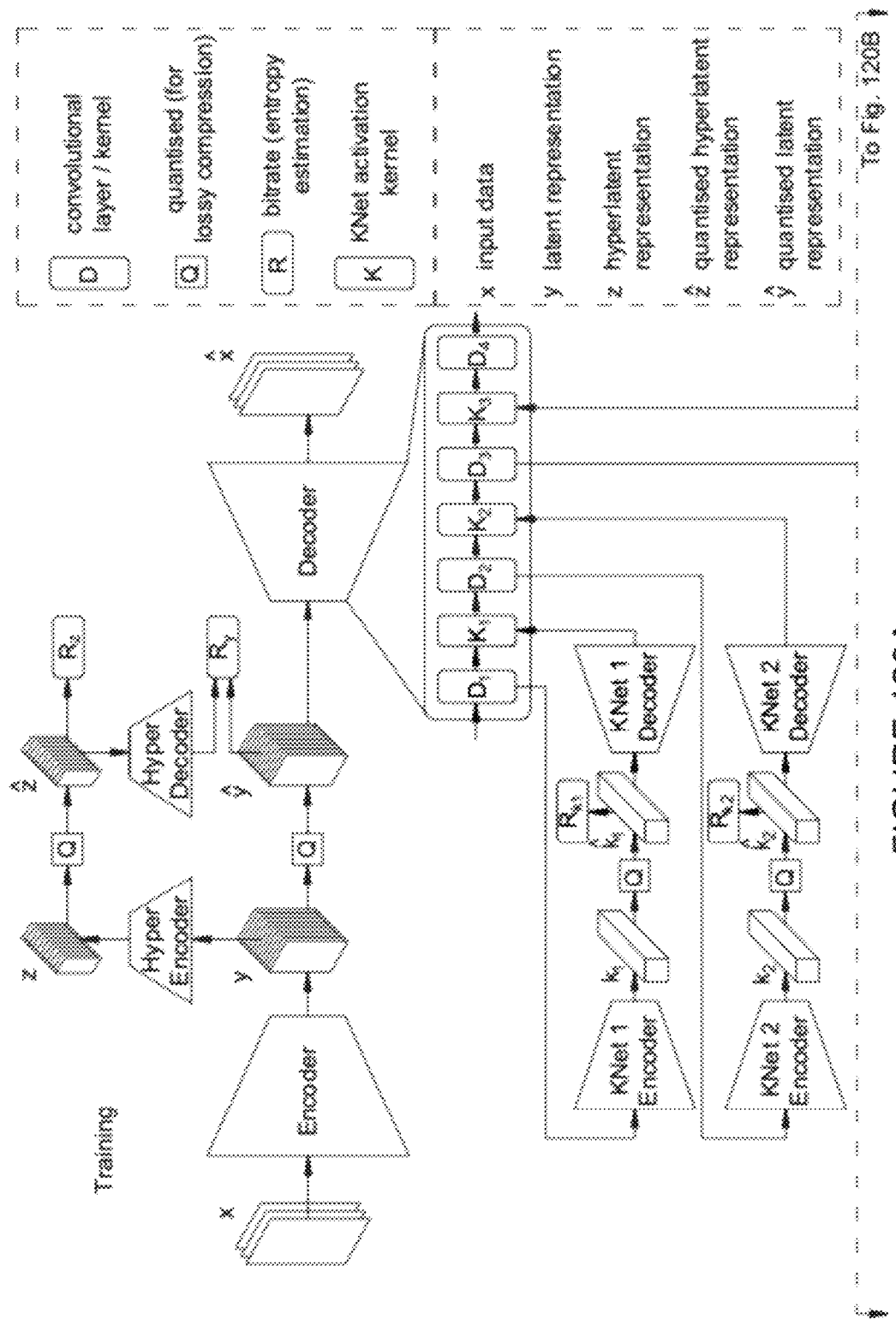
Figure 120B:
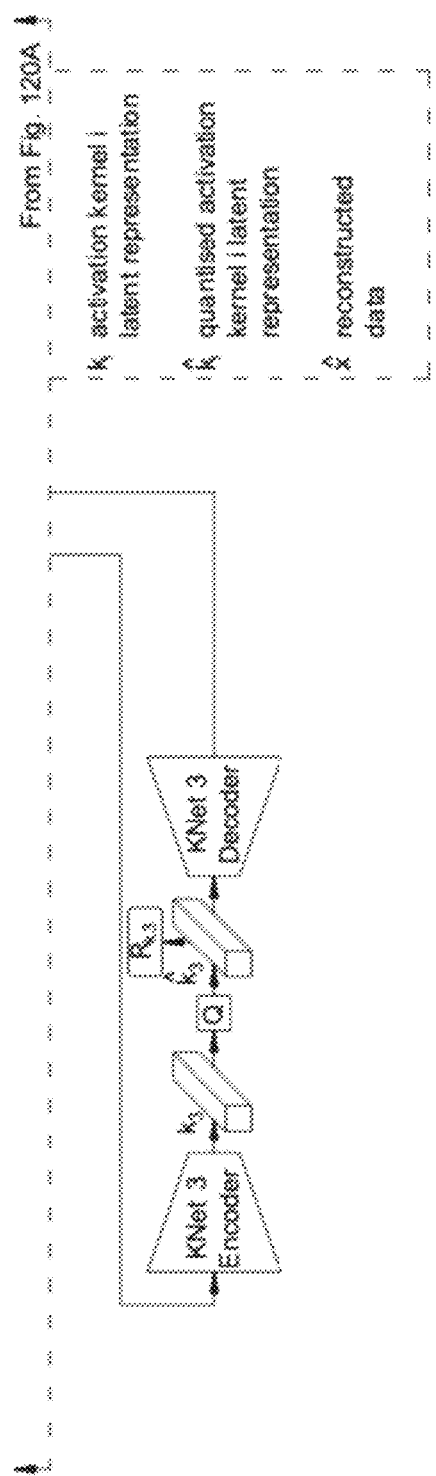

FIGS. 119, 120 and 121 are examples which visualise import properties and processes of KNet.

15.6 Concepts

1. Using metainformation to transform the conditioned decoder into a linear function to realise real-time decoding times for high-resolution data, which may be collectively referred to as KNet.
2. Substituting element-wise nonlinear functions in neural network with linear or convolution operations whose parameters have been conditioned on their inputs.
3. A chaining procedure of sequential convolution kernels into a composite convolution kernel, for example all convolution layers in a decoder (both unconditioned and conditioned on inputs).
4. Nonlinear element-wise matrix multiplication, nonlinear matrix multiplication and nonlinear addition operation whose parameters have been conditioned on their inputs.
5. Stabilising KNet module training by initial training with a generalised convolution operation in its place, and then freezing the autoencoder backbone and replacing the generalised convolution operation with a KNet module that is further optimised.

6. Proxy training of the KNet module with a regression operation, either linear or Tikhonov regression or possibly other forms.
7. Jointly optimising for a generalised convolution operation and a regression operation with a weighted loss function, whose weighting is dynamically changed over the course of network training, and then freezing the autoencoder backbone and replacing the generalised convolution operation and regression operation with a KNet module that is further optimised.

15.7 References

[3] Sayed Omid Ayat, Mohamed Khalil-Hani, Ab AI Hadi Ab Rahman, and Hamdan Abdellatef Rosenbaum. "Spectral-based convolutional neural network without multiple spatial-frequency domain switchings." Neurocomputing, 364, pp. 152-167 (2019).
[4] Ciro Cursio, Dimitrios Kollias, Chri Besenbruch, Arsalan Zafar, Jan Xu, and Alex Lytchier. "Efficient context-aware lossy image compression." CVPR 2020, CLIC Workshop (2020).
[5] Jan De Cock, and Anne Aaron. "The end of video coding?" The Netflix Tech Blog (2018).
[6] Nick Johnston, Elad Eban, Ariel Gordon, and Johannes Ballé. "Computationally efficient neural image compression." arXiv preprint arXiv:1912.08771 (2019).
[7] Lucas Theis, and George Toderici. "CLIC, workshop and challenge on learned image compression." CVPR 2020 (2020).
[8] George Cybenko. "Mathematics of control." Signals and Systems, 2, p. 337 (1989).
[9] Moshe Leshno, Vladimir Ya Lin, Allan Pinkus, and Shimon Schocken. "Multilayer feedforward networks with a nonpolynomial activation function can approximate any function." Neural networks, 6(6), pp. 861-867 (1993).

The invention claimed is:
1. A computer implemented method of training a first neural network and a second neural network, the neural networks being for use in lossy image or video compression, transmission and decoding, the method including the steps of:
(i) receiving an input training image;
(ii) segmenting the input training image into training image segments using a segmentation algorithm;
(iii) encoding the training image segments using the first neural network, to produce a latent representation;
(iv) quantizing the latent representation to produce a quantized latent;
(v) using the second neural network to produce an output image from the quantized latent, wherein the output image is an approximation of the input training image;
(vi) evaluating a loss function based on differences between the output image and the input training image;
(vii) evaluating a gradient of the loss function;
(viii) back-propagating the gradient of the loss function through the second neural network and through the first neural network, to update weights of the second neural network and of the first neural network; and
(ix) repeating steps (i) to (viii) using a set of training images, to produce a trained first neural network and a trained second neural network, and
(x) storing the weights of the trained first neural network and of the trained second neural network
wherein a first distortion loss type of the loss function is applied to a first training image segment and a second distortion loss type that is different from the first distortion loss type is applied to a second training image segment.
2. The method of claim 1, wherein the loss function is a sum of respective rate and respectively weighted respective distortion, over respective training image segments, of a plurality of training image segments.
3. The method of claim 2, wherein a higher weight is given to training image segments which relate to human faces.
4. The method of claim 2, wherein a higher weight is given to training image segments which relate to text.
5. The method of claim 1, wherein the segmentation algorithm is implemented using a neural network.
6. The method of claim 5, wherein the segmentation algorithm neural network is trained separately to the first neural network and to the second neural network.
7. The method of claim 5, wherein the segmentation algorithm neural network is trained end-to-end with the first neural network and the second neural network.
8. The method claim 1, wherein gradients from a compression network do not affect the segmentation algorithm neural network training, and the segmentation network gradients do not affect the compression network gradients.
9. The method of claim 1, wherein a training pipeline includes a plurality of Encoder-Decoder pairs, wherein each Encoder-Decoder pair produces patches with a particular loss function which determines the types of compression distortion each compression network produces.
10. The method of claim 1, wherein the loss function is a sum of respective rate and respectively weighted respective distortion, over respective training image segments, of a plurality of training image colour segments.
11. The method of claim 1, wherein an adversarial generative adversarial network (GAN) loss is applied for high frequency regions, and an mean squared error (MSE) is applied for low frequency areas.
12. The method of claim 1, wherein a classifier trained to identify optimal distortion losses for image or video segments is used to train the first neural network and the second neural network.
13. The method of claim 1, wherein the segmentation algorithm is trained in a bi-level fashion.
14. The method of claim 11, wherein the segmentation algorithm is trained in a bi-level fashion to selectively apply losses for each segment during training of the first neural network and the second neural network.

* * * * *